US008666579B2

(12) United States Patent
Akutsu et al.

(10) Patent No.: US 8,666,579 B2
(45) Date of Patent: Mar. 4, 2014

(54) HYBRID VEHICLE

(75) Inventors: Shigemitsu Akutsu, Saitama (JP); Noriyuki Abe, Saitama (JP); Kota Kasaoka, Saitama (JP); Masashi Bando, Saitama (JP); Satoyoshi Oya, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 134 days.

(21) Appl. No.: 13/501,383

(22) PCT Filed: Jul. 23, 2010

(86) PCT No.: PCT/JP2010/062475
§ 371 (c)(1),
(2), (4) Date: Apr. 11, 2012

(87) PCT Pub. No.: WO2011/045964
PCT Pub. Date: Apr. 21, 2011

(65) Prior Publication Data

US 2012/0197475 A1 Aug. 2, 2012

(30) Foreign Application Priority Data

Oct. 13, 2009 (JP) ................................ 2009-236716

(51) Int. Cl.
*B60L 9/00* (2006.01)

(52) U.S. Cl.
USPC ........... 701/22; 180/65.29; 318/432; 318/148

(58) Field of Classification Search
USPC ........ 701/22; 180/65.29; 318/432, 148, 400.3
See application file for complete search history.

(56) References Cited

U.S. PATENT DOCUMENTS 5,917,248 A 6/1999 Seguchi et al.
6,205,379 B1 3/2001 Morisawa et al.
6,232,733 B1 5/2001 Obayashi et al.

(Continued)

FOREIGN PATENT DOCUMENTS

JP 2009-073472 A 4/2009
JP 2009-227195 A 10/2009
WO WO2008/081893 A1 7/2008

OTHER PUBLICATIONS

U.S. Office Action U.S. Appl. No. 13/501,527 dated Mar. 1, 2013.

(Continued)

*Primary Examiner* — Thomas Black
*Assistant Examiner* — Luke Huynh
(74) *Attorney, Agent, or Firm* — Squire Sanders (US) LLP

(57) ABSTRACT

A hybrid vehicle is driven by a power unit which includes: a first rotating machine including a first rotor, a first stator, and a second rotor, wherein the number of magnetic poles generated by an armature row of the first stator and one of the first rotor and the second rotor are connected to a drive shaft; a power engine, wherein an output shaft of the power engine is connected to the other of the first rotor and the second rotor; a second rotating machine; and a capacitor. The hybrid vehicle includes: a state detector that detects a charge state of the capacitor; and a controller that controls the power unit. The controller controls the output of the power engine, based on a remaining capacity of the capacitor when driving the power engine in order to start the hybrid vehicle. Accordingly, it is possible to achieve reduction in the size and cost of the power unit and enhance the driving efficiency of the power unit.

8 Claims, 141 Drawing Sheets

(56) References Cited

U.S. PATENT DOCUMENTS

| | | | |
|---|---|---|---|
| 6,478,705 | B1 | 11/2002 | Holmes et al. |
| 6,710,492 | B2 | 3/2004 | Minagawa |
| 6,798,104 | B2 | 9/2004 | Kajiura et al. |
| 6,879,125 | B2 | 4/2005 | Akatsu |
| 7,086,977 | B2 * | 8/2006 | Supina et al. .................... 475/5 |
| 7,584,813 | B2 | 9/2009 | Yoshida |
| 2004/0231897 | A1 | 11/2004 | Kimura et al. |
| 2006/0114702 | A1 | 6/2006 | Yamada et al. |
| 2006/0176028 | A1 | 8/2006 | Schulte et al. |
| 2007/0137908 | A1 | 6/2007 | Fujiwara et al. |
| 2007/0213158 | A1 | 9/2007 | Laeuffer |
| 2008/0018291 | A1 | 1/2008 | Atarashi et al. |
| 2008/0026898 | A1 | 1/2008 | Supina et al. |
| 2008/0040016 | A1 | 2/2008 | Fujishiro |
| 2008/0041648 | A1 | 2/2008 | Gardner |
| 2008/0211437 | A1 | 9/2008 | Tamai et al. |
| 2009/0039831 | A1 | 2/2009 | Ichikawa |
| 2009/0114462 | A1 | 5/2009 | Tahara et al. |
| 2009/0160247 | A1 | 6/2009 | Nakamura et al. |
| 2009/0230901 | A1 | 9/2009 | Amano |
| 2009/0251021 | A1 | 10/2009 | Atarashi et al. |
| 2012/0323430 | A1 * | 12/2012 | Nakamura et al. .............. 701/22 |

OTHER PUBLICATIONS

U.S. Office Action U.S. Appl. No. 13/501,529 dated Mar. 14, 2013.

International Search Report corresponding to International Patent Application No. PCT/JP2010/062475 dated Oct. 26, 2010 and English translation thereof.

* cited by examiner (a)

(b)

(a)

(b)

(a)

(b)

(a)

(b)

(a)

(b)

(a)

(b)

(a)

(b)

(a)

(b)

(a)

(b)

HYBRID VEHICLE

TECHNICAL FIELD

The present invention relates to a hybrid vehicle driven by a power unit for driving driven parts.

BACKGROUND ART

Conventionally, as the power unit of this kind, a power unit disclosed in Patent Document 1, for example, is known. This power unit is for driving left and right drive wheels of a vehicle, and is equipped with an internal combustion engine, which is a motive power source, and a transmission connected to the internal combustion engine and the drive wheels. The transmission includes first and second planetary gear units of a general single pinion type and first and second rotating machines each having a rotor and a stator.

As shown in FIG. 141, the first planetary gear unit has a first ring gear, a first carrier, and a first sun gear which are mechanically connected to the internal combustion engine, a second carrier of the second planetary gear unit, and the first rotating machine, respectively. The second planetary gear unit has a second sun gear, a second carrier, and a second ring gear which are mechanically connected to the second rotating machine, the drive wheels, and the first rotating machine, respectively. Moreover, the first and second rotating machines are electrically connected to each other through a controller. It should be noted that in FIG. 141, mechanical connections between elements are indicated by solid lines, and electrical connections therebetween are indicated by one-dot chain lines. Moreover, flows of motive power and electric power are indicated by thick lines with arrows.

In the conventional power unit configured as above, during traveling of the vehicle, the motive power from the internal combustion engine is transmitted to the drive wheels, for example, in the following manner. That is, as shown in FIG. 141, the motive power from the internal combustion engine is transmitted to the first ring gear, and is then combined with motive power transmitted to the first sun gear, as described later. This combined motive power is transmitted to the second carrier through the first carrier. Moreover, in this case, electric power is generated by the second rotating machine, and the generated electric power is supplied to the first rotating machine through the controller. In accordance with the electric power generation, part of the combined motive power transmitted to the second carrier is distributed to the second sun gear and the second ring gear, and the remainder of the combined motive power is transmitted to the drive wheels. The motive power distributed to the second sun gear is transmitted to the second rotating machine, and the motive power distributed to the second ring gear is transmitted to the first sun gear through the first rotating machine. Furthermore, the motive power of the first rotating machine generated along with the above-described supply of the electric power is transmitted to the first sun gear.

PRIOR ART DOCUMENT

Patent Document

[Patent Document 1] U.S. Pat. No. 6,478,705

SUMMARY OF INVENTION

Problem to be Solved by the Invention

In this conventional power unit, not only the first and second rotating machines but also at least two planetary gear units for distributing and combining motive power are indispensable for the construction thereof, and this increases the size of the power unit by the corresponding extent. Moreover, as described above, in the conventional power unit, motive power is recirculated through a path formed by the first carrier→the second carrier→the second ring gear→the first rotating machine→the first sun gear→the first carrier, and a path formed by the first carrier→the second carrier→the second sun gear→the second rotating machine→the first rotating machine→the first sun gear→the first carrier. This recirculation of the motive power causes very large combined motive power from the first ring gear and the first sun gear to pass through the first carrier and then pass through the second carrier as it is, so that in order to withstand the above large combined motive power, it is inevitable to increase the size of the first and second planetary gear units, which results in further increases in size and cost of the power unit. Moreover, with the increases in the size of the above power unit and the motive power passing through the power unit, losses generated in the power unit are also increased which decrease the driving efficiency of the power unit.

An object of the present invention is to provide a hybrid vehicle driven by a power unit which is capable of attaining reduction in the size and cost of the power unit and enhancing the driving efficiency thereof.

Means for Solving the Problem

In order to achieve the object, a hybrid vehicle of the invention as claimed in claim 1 is driven by a power unit. The power unit comprises: a first rotating machine (for example, first rotating machine 21 or first rotating machine 10 in the embodiment) comprising: a first rotor (for example, A1 rotor 24, first rotor 14 in the embodiment) comprising a magnetic pole row arranged in a circumferential direction, wherein the magnetic pole row has a plurality magnetic poles and the adjacent magnetic poles have different polarities; a first stator (for example, stator 23, stator 16 in the embodiment) disposed to face the first rotor in a radial direction and comprising an armature row comprising a plurality of armatures arranged in the circumferential direction, wherein a rotating magnetic field moving in the circumferential direction is generated by a change in magnetic poles generated by the plurality of armatures; and a second rotor (for example, A2 rotor 25, second rotor 15 in the embodiment) disposed between the first rotor and the first stator and comprising a plurality of soft magnetic material elements arranged in the circumferential direction with a gap therebetween, wherein the ratio between the number of magnetic poles generated by the armature row of the first stator, the number of magnetic poles of the magnetic pole row of the first rotor, the number of the soft magnetic material elements of the second rotor is set to $1:m:(1+m)/2$ $(m \neq 1)$, and one of the first rotor and the second rotor is connected to a drive shaft; a power engine (for example, engine 3 in the embodiment), wherein an output shaft of the power engine is connected to the other of the first rotor and the second rotor; a second rotating machine (for example, second rotating machine 31, first planetary gear unit PS1 and rotating machine 101, second rotating machine 20 in the embodiment) configured to exchange a motive power with the drive shaft and to exchange an electric power with the first rotating machine; a capacitor (for example, battery 43, battery 33 in the embodiment) configured to exchange an electric power between the first rotating machine and the second rotating machine. The vehicle comprises: a state detector (for example, current-voltage sensor 56 in the embodiment) that detects a charge state of the capacitor; a controller (for example, ECU 2 in the embodiment) that controls the power unit, wherein the controller controls the output of the power engine, based on a remaining capacity of the capacitor when driving the power engine in order to start the hybrid vehicle.

In the hybrid vehicle of the invention as claimed in claim 2, the controller controls the power unit such that the remaining capacity of the capacitor falls within a range from a lower limit value to an upper limit value. When the controller drives the power engine in order to start the hybrid vehicle in a forward direction in a state where the remaining capacity of the capacitor is higher than a first threshold value lower than the upper limit value, the controller controls a magnetic field rotational speed of the rotating magnetic field generated by the first stator of the first rotating machine and restricts a rotational speed of the power engine to a low speed so as to decrease the output of the power engine.

In the hybrid vehicle of the invention as claimed in claim 3, the controller controls the power unit such that the remaining capacity of the capacitor falls within a range from a lower limit value to an upper limit value. When the controller drives the power engine in order to start the hybrid vehicle in a rearward direction in a state where the remaining capacity of the capacitor is lower than a second threshold value higher than the lower limit value, the controller controls a magnetic field rotational speed of the rotating magnetic field generated by the first stator of the first rotating machine and restricts a rotational speed of the power engine to a low speed so as to decrease the output of the power engine.

In the hybrid vehicle of the invention as claimed in claim 4, the controller controls the power engine so as to maintain an output torque of the power engine.

In the hybrid vehicle of the invention as claimed in claim 5, when regenerative energy per unit time, which is generated by the first stator of the first rotating machine, with respect to the torque required for the power engine exceeds a prescribed value, the controller controls the power engine so as to restrict the output torque of the power engine to a low speed.

In the hybrid vehicle of the invention as claimed in claim 6, the controller controls the power unit such that the remaining capacity of the capacitor falls within a range from a lower limit value to an upper limit value. If the remaining capacity of the capacitor is not higher than a second threshold value higher than the lower limit value when the hybrid vehicle travels with the motive power from the rotating machine, the controller drives the power engine to decrease the magnetic field rotational speed of the rotating magnetic field generated by the first stator of the first rotating machine.

In the hybrid vehicle of the invention as claimed in claim 7, the second rotating machine comprises: an electric motor (for example, rotating machine 101 in the embodiment) comprising a rotator (for example, rotor 103 in the embodiment) and an armature (for example, stator 102 in the embodiment); and a rotating mechanism (for example, first planetary gear unit PS1 in the embodiment) comprising: a first rotary element (for example, first sun gear S1 in the embodiment); a second rotary element (for example, first carrier C1 in the embodiment); and a third rotary element (for example, first ring gear R1 in the embodiment) connected to the rotator. The first rotary element, the second rotary element and the third rotary element operate while holding a collinear relationship. The rotating mechanism is configured to distribute energy input to the second rotary element to the first and third rotary elements, and is configured to combine the energy input to the first and third rotary elements and output the combined energy to the second rotary element. One of a combination of the first rotor and the second rotary element and a combination of the second rotor and the first rotary element is connected to the output shaft of the power engine, and the other combination is connected to the drive shaft.

In the hybrid vehicle of the invention as claimed in claim 8, the second rotating machine comprises: a third rotor (for example, B1 rotor 34 in the embodiment) comprising a magnetic pole row arranged in a circumferential direction, wherein the magnetic pole row has a plurality of magnetic poles and the adjacent magnetic poles have different polarities; a second stator (for example, stator 33 in the embodiment) disposed to face the third rotor in a radial direction and comprising an armature row comprising a plurality of armatures arranged in the circumferential direction, wherein a rotating magnetic field moving in the circumferential direction is generated by a change in magnetic poles generated by the plurality of armatures; and a fourth rotor (for example, B2 rotor 35 in the embodiment) disposed between the third rotor and the second stator and comprising a plurality of soft magnetic material elements arranged in the circumferential direction with a gap therebetween. The ratio between the number of magnetic poles generated by the armature row of the second stator, the number of magnetic poles of the magnetic pole row of the third rotor, the number of the soft magnetic material elements of the fourth rotor is set to $1:m:(1+m)/2$ $(m \neq 1)$. When the drive shaft and the first rotor are connected to each other, and the output shaft of the power engine and the second rotor are connected to each other, the fourth rotor is connected to the drive shaft, and the third rotor is connected to the output shaft of the power engine. When the drive shaft and the second rotor are connected to each other, and the output shaft of the power engine and the first rotor are connected to each other, the third rotor is connected to the drive shaft, and the fourth rotor is connected to the output shaft of the power engine.

Effect of the Invention

According to the hybrid vehicle of the invention as claimed in claim 1, it is possible to prevent overcharge and overdischarge of the capacitor.

According to the hybrid vehicle of the invention as claimed in claim 2, it is possible to prevent overcharge of the capacitor.

According to the hybrid vehicle of the invention as claimed in claim 3 or 6, it is possible to prevent overdischarge of the capacitor.

According to the hybrid vehicle of the invention as claimed in claims 4 and 5, it is possible to prevent overcharge and overdischarge of the capacitor.

According to the hybrid vehicle of the invention as claimed in claims 7 and 8, it is possible to attain reduction of the size and costs of the power unit and enhance the driving efficiency thereof.

BRIEF DESCRIPTION OF THE DRAWINGS

FIG. 120 is a collinear chart showing an example of the relationship between three electrical angular velocities and three torques when the pole pair number ratio α in the first rotating machine of the power unit of the twenty-third embodiment is set to a desired value.

FIG. 121 is a diagram showing the relationship between an output ratio RW and the speed reducing ratio R when the pole pair number ratio α in the first rotating machine of the power unit according to the twenty-third embodiment is set to values of 1, 1.5, and 2.

FIG. 122 is a diagram showing a variation of the arrangement of the first rotating machine and the second rotating machine.

FIG. 123 is a diagram showing another variation of the arrangement of the first rotating machine and the second rotating machine.

FIG. 124 is a diagram showing an example in which a transmission is provided in the power unit according to the twenty-third embodiment.

FIG. 125 is a diagram showing another example in which a transmission is provided in the power unit according to the twenty-third embodiment.

FIG. 126 is a diagram showing still another example in which a transmission is provided in the power unit according to the twenty-third embodiment.

FIG. 127 is a diagram showing the range of battery SOC when a battery is repeatedly charged and discharged.

Figure 128:
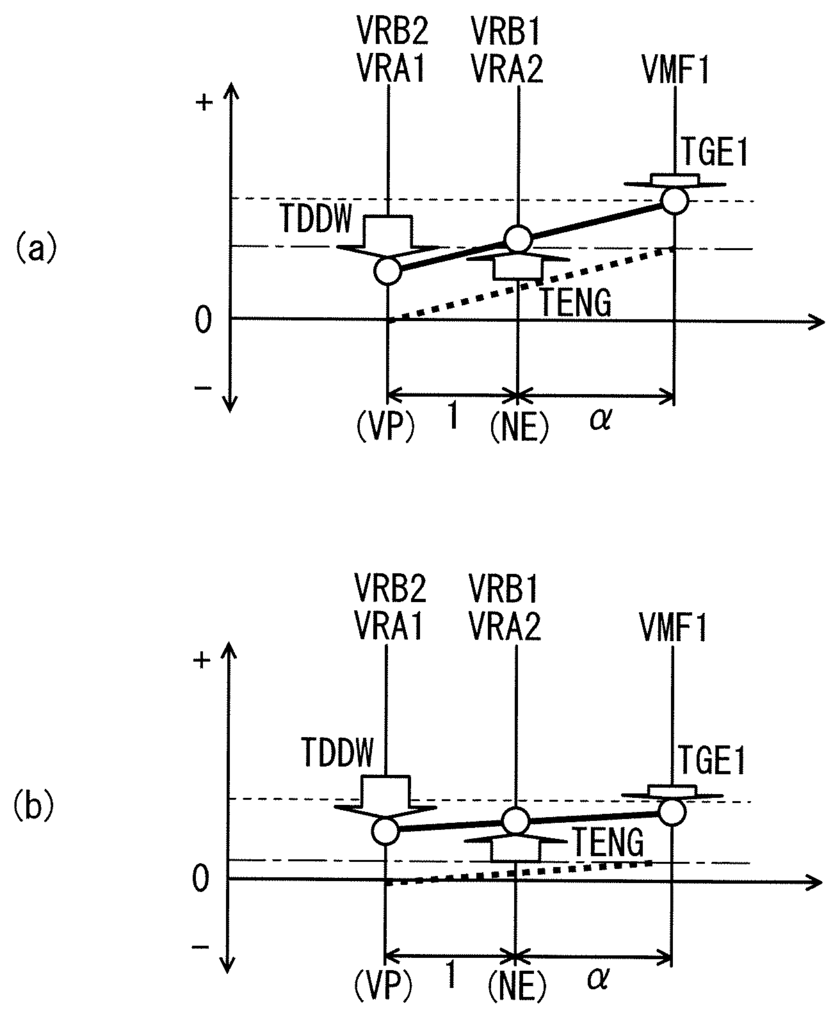

FIGS. 128(*a*) and 128(*b*) show collinear charts when the operation mode of the power unit 1 is "ENG-based start," wherein FIG. 128(*a*) shows a collinear chart when the battery SOC is lower than a first threshold value, and FIG. 128(*b*) shows a collinear chart when the battery SOC is not lower than the first threshold value.

Figure 129:
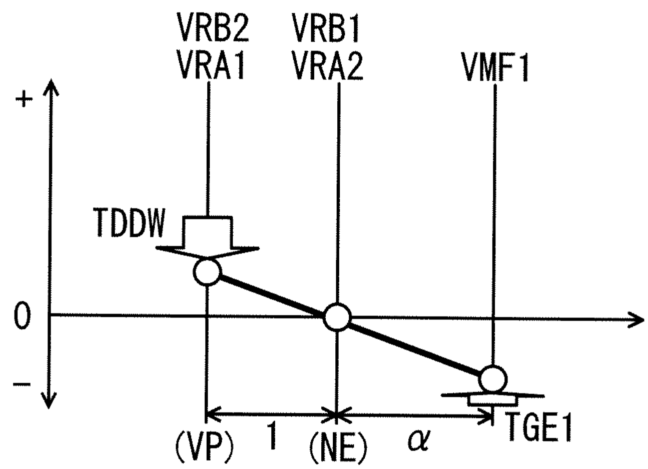
Figure 129:
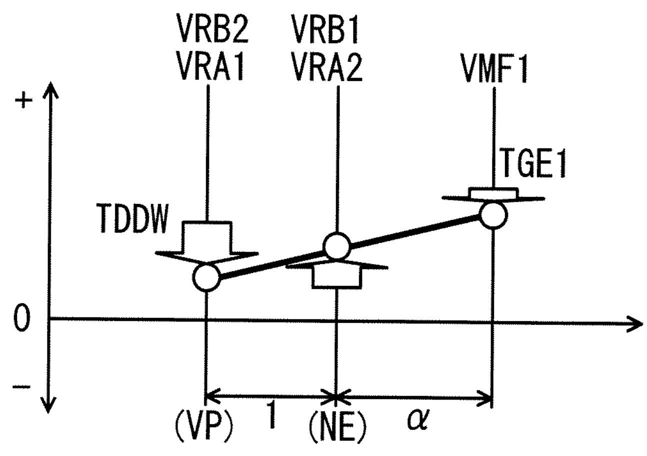

FIGS. 129(*a*) and 129(*b*) show collinear charts when the operation mode of the power unit 1 is "EV traveling,", wherein FIG. 129(*a*) shows a collinear chart when the battery SOC is higher than a second threshold value, and FIG. 129(*b*) shows a collinear chart when the battery SOC is not higher than the second threshold value.

Figure 130:
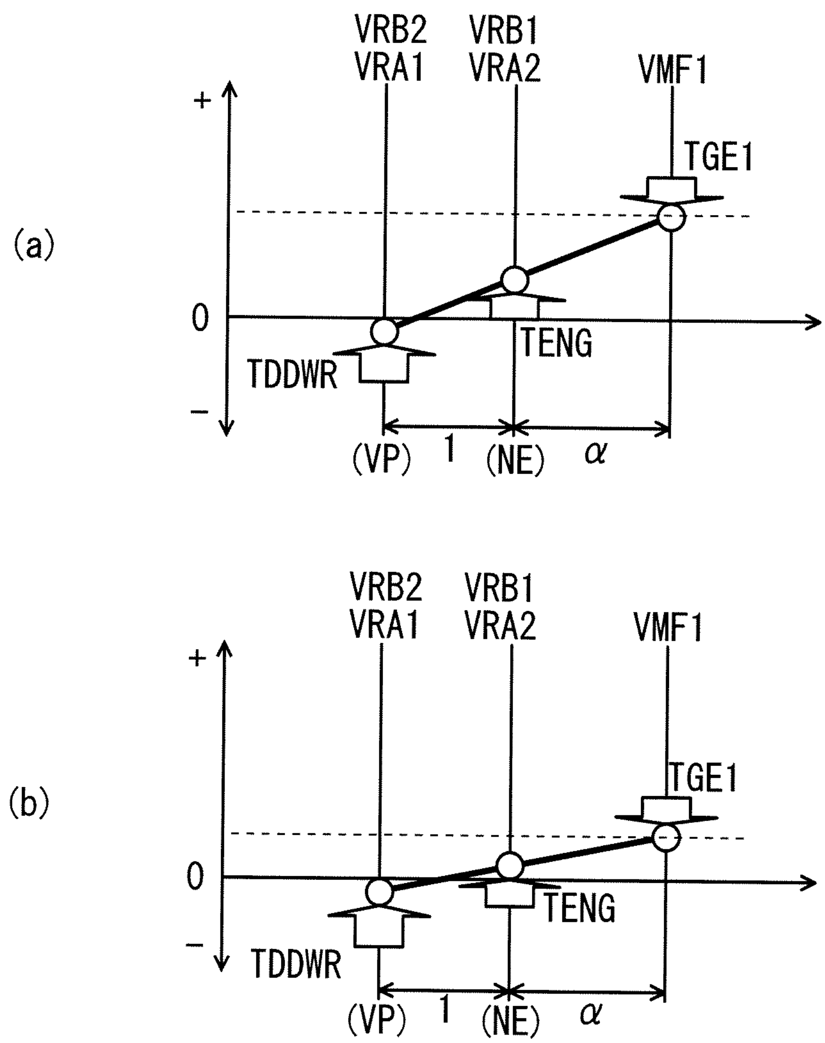

FIGS. 130(*a*) and 130(*b*) show collinear charts when the operation mode of the power unit 1 is "ENG-based rearward start,", wherein FIG. 130(*a*) shows a collinear chart when the battery SOC is higher than a first threshold value, and FIG. 130(*b*) shows a collinear chart when the battery SOC is not higher than the first threshold value.

Figure 131:
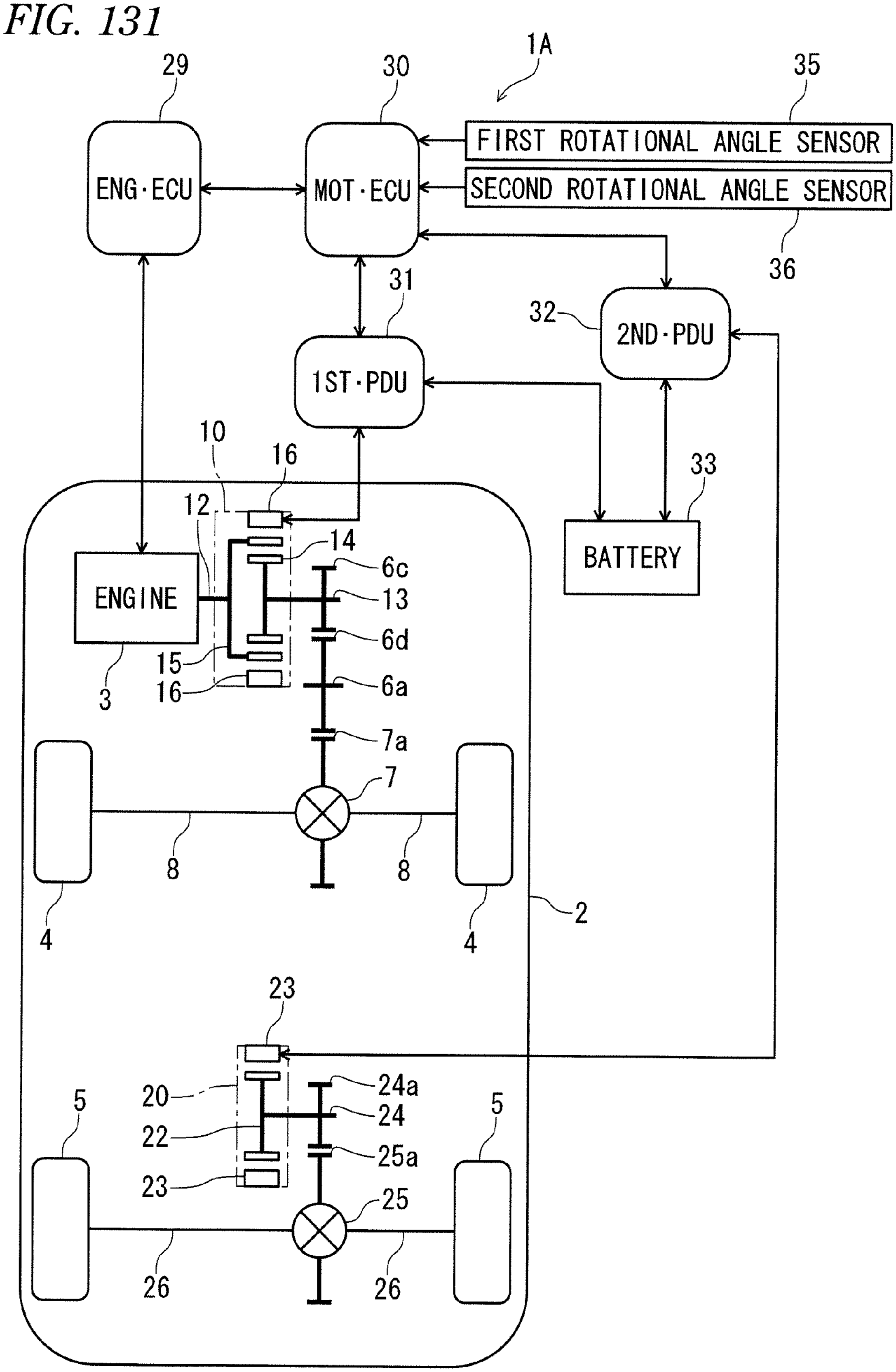

FIG. 131 is a diagram showing the general arrangement of the power unit according to the twenty-fourth embodiment.

Figure 132:
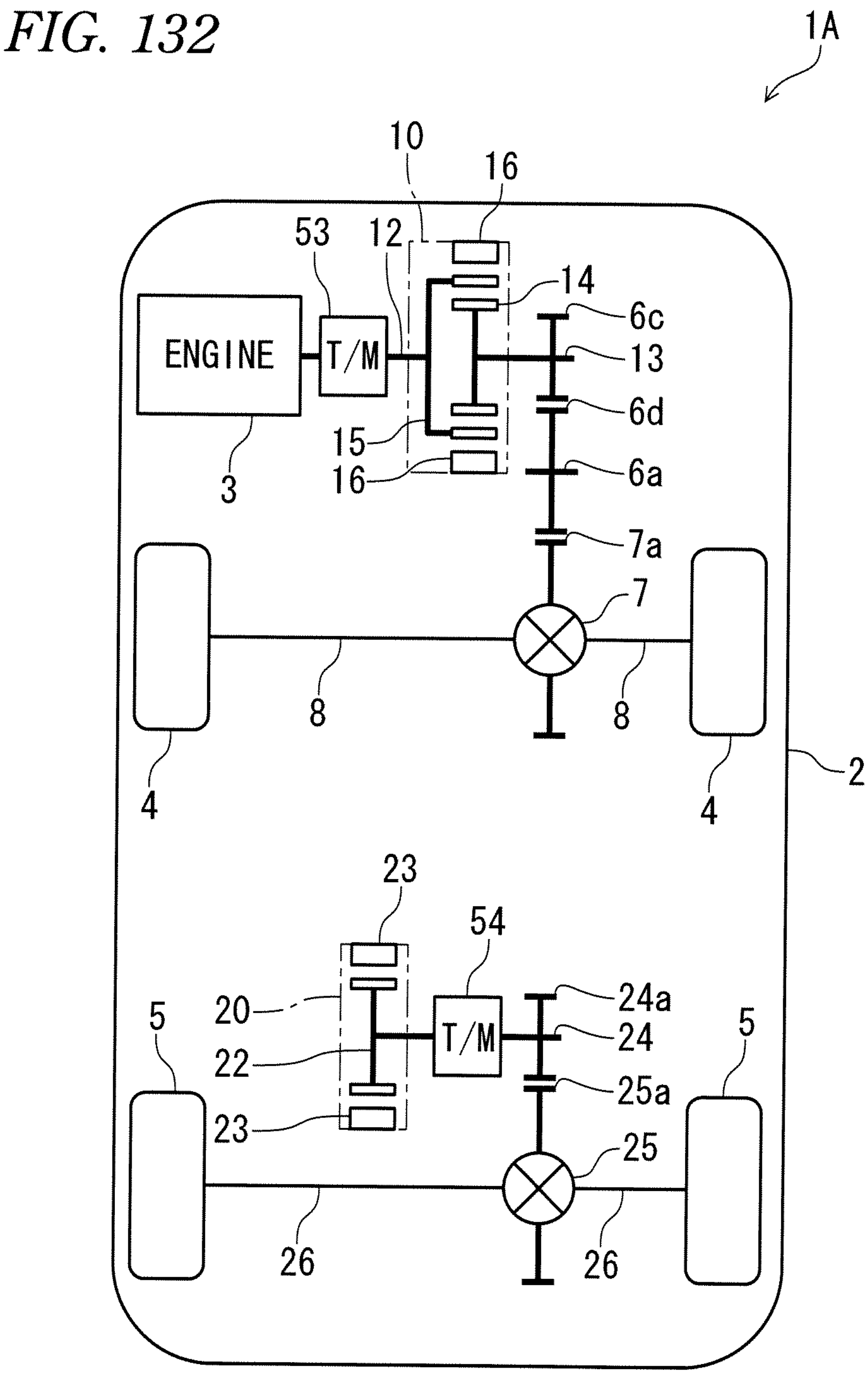

FIG. 132 is a diagram showing an example in which a transmission is provided in the power unit according to the twenty-fourth embodiment.

Figure 133:
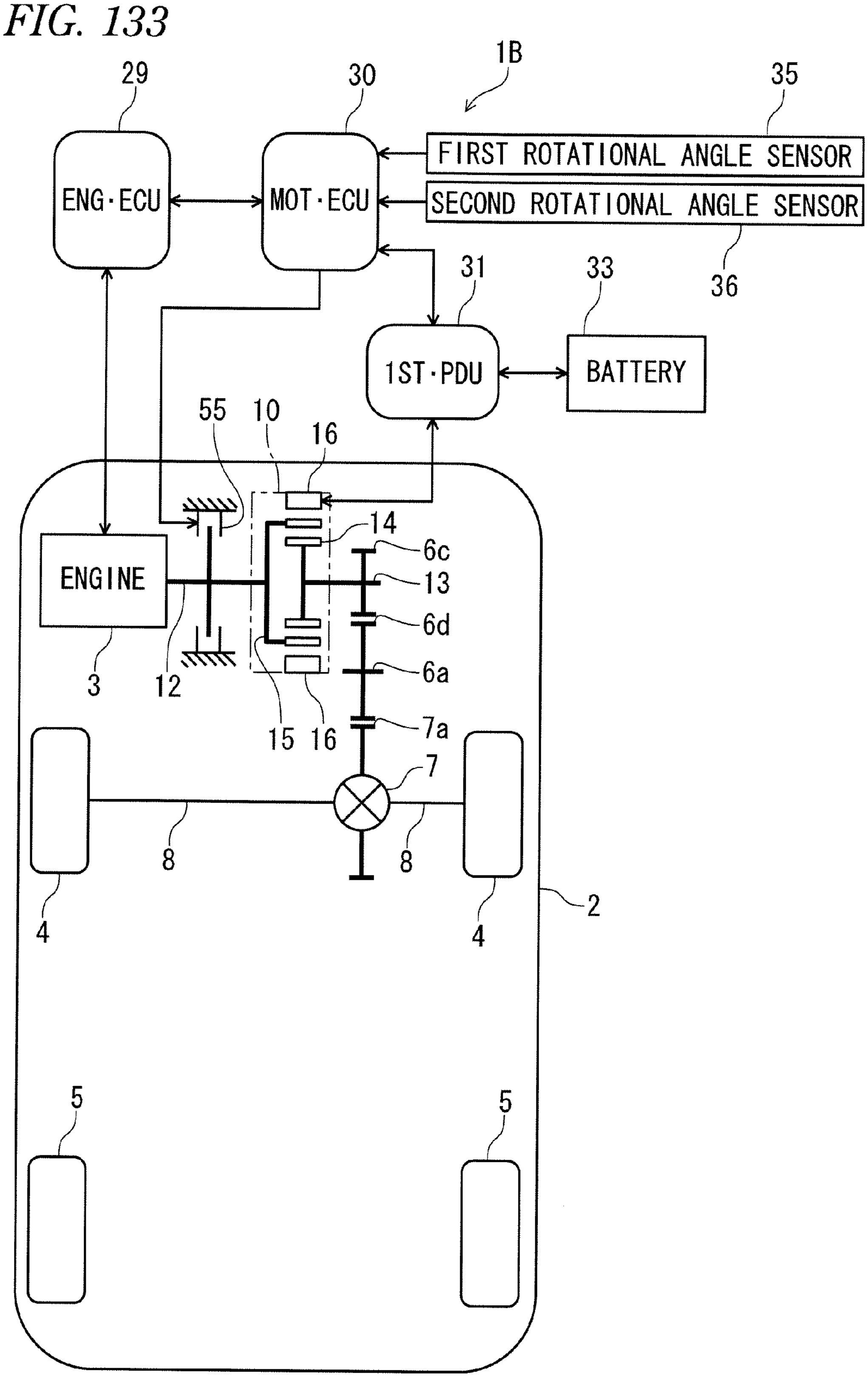

FIG. 133 is a diagram showing an example in which a transmission is provided in the power unit according to the twenty-fifth embodiment.

Figure 134:
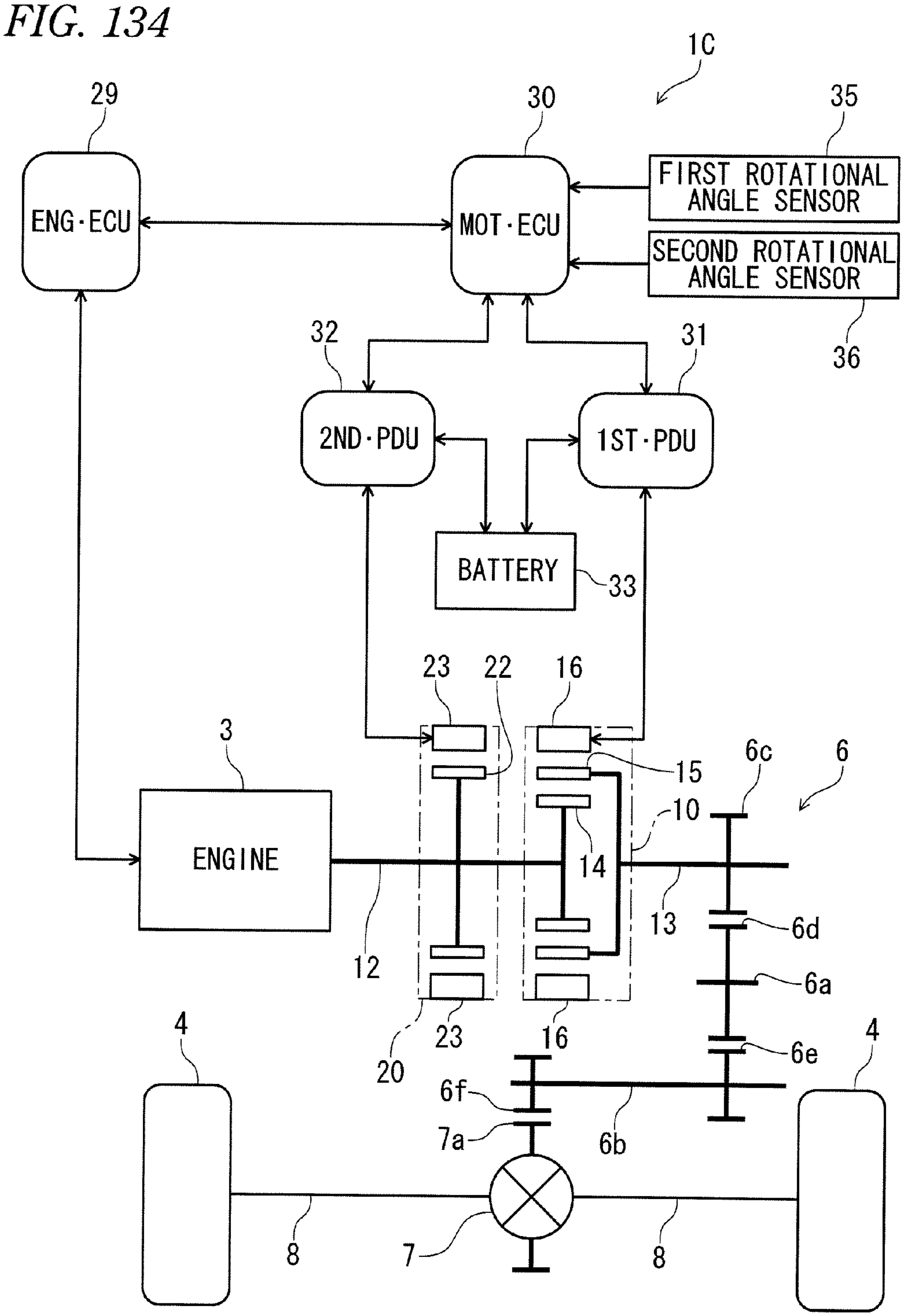

FIG. 134 is a diagram showing an example in which a transmission is provided in the power unit according to the twenty-sixth embodiment.

Figure 135:
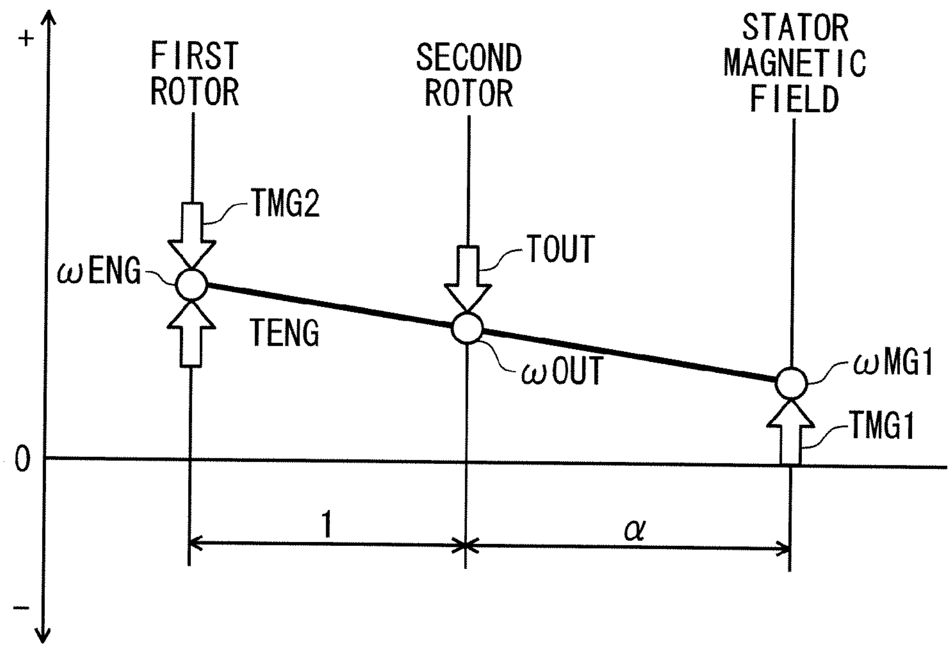

FIG. 135 is a collinear chart showing an example of the relationship between three electrical angular velocities and three torques when the pole pair number ratio α in the first rotating machine of the power unit of the twenty-sixth embodiment is set to a desired value.

Figure 136:
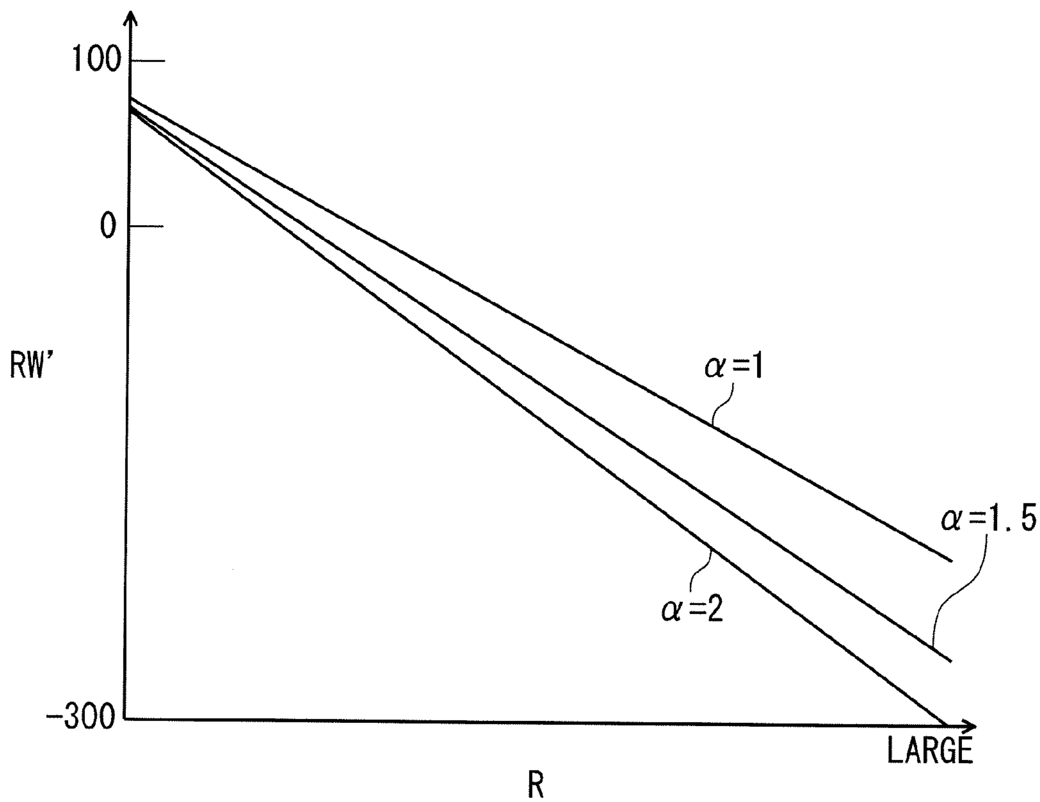

FIG. 136 is a diagram showing the relationship between an output ratio RW' and the speed reducing ratio R when the pole pair number ratio α in the first rotating machine of the power unit according to the twenty-sixth embodiment is set to values of 1, 1.5, and 2.

Figure 137:
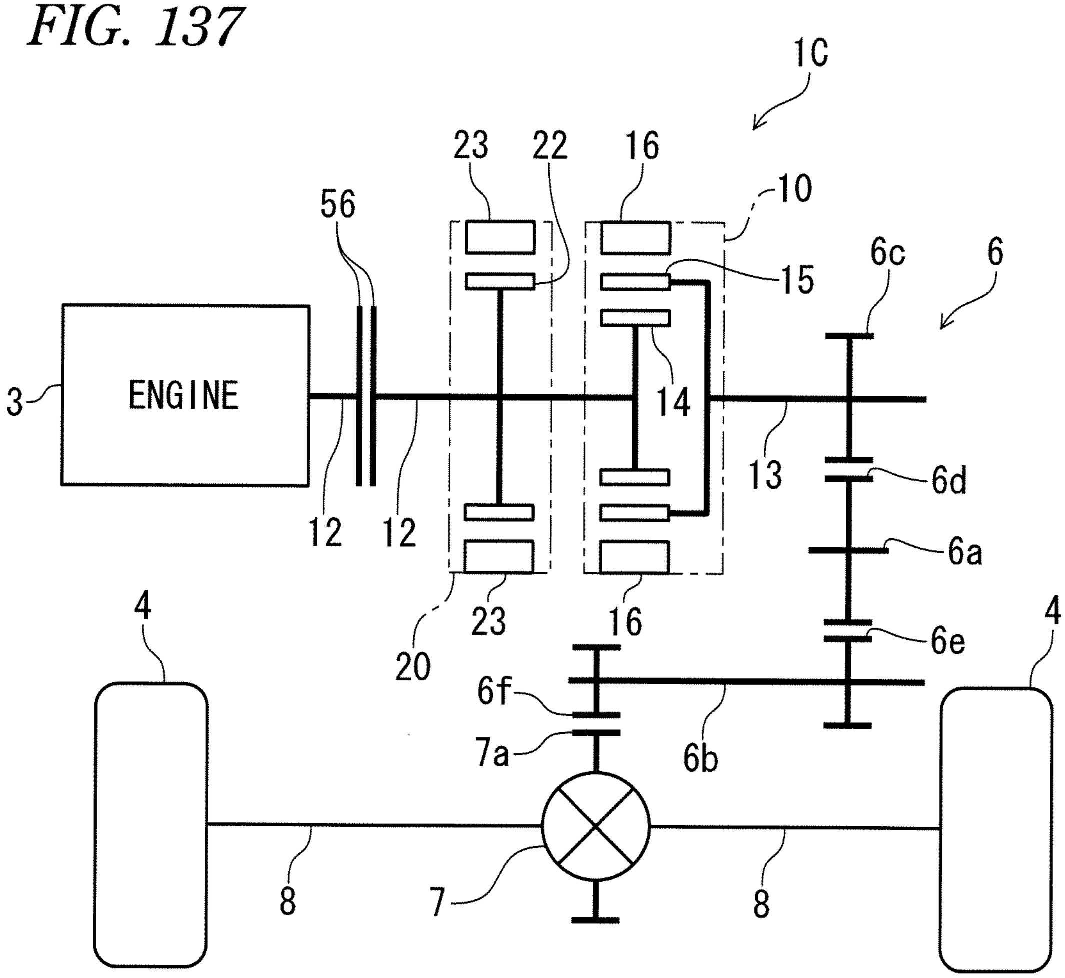

FIG. 137 is a diagram showing an example in which a clutch is provided in the power unit according to the twenty-sixth embodiment.

Figure 138:
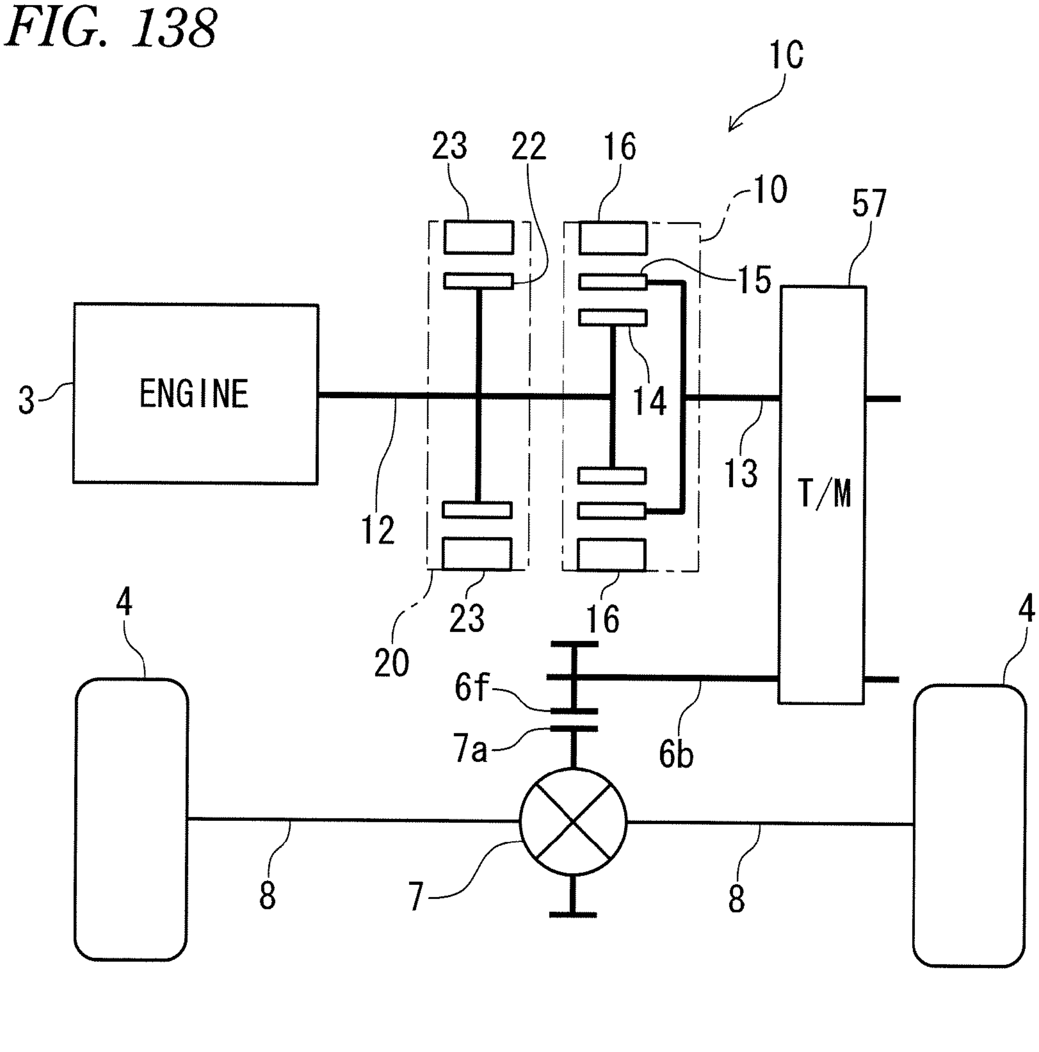

FIG. 138 is a diagram showing an example in which a transmission is provided in the power unit according to the twenty-sixth embodiment.

Figure 139:
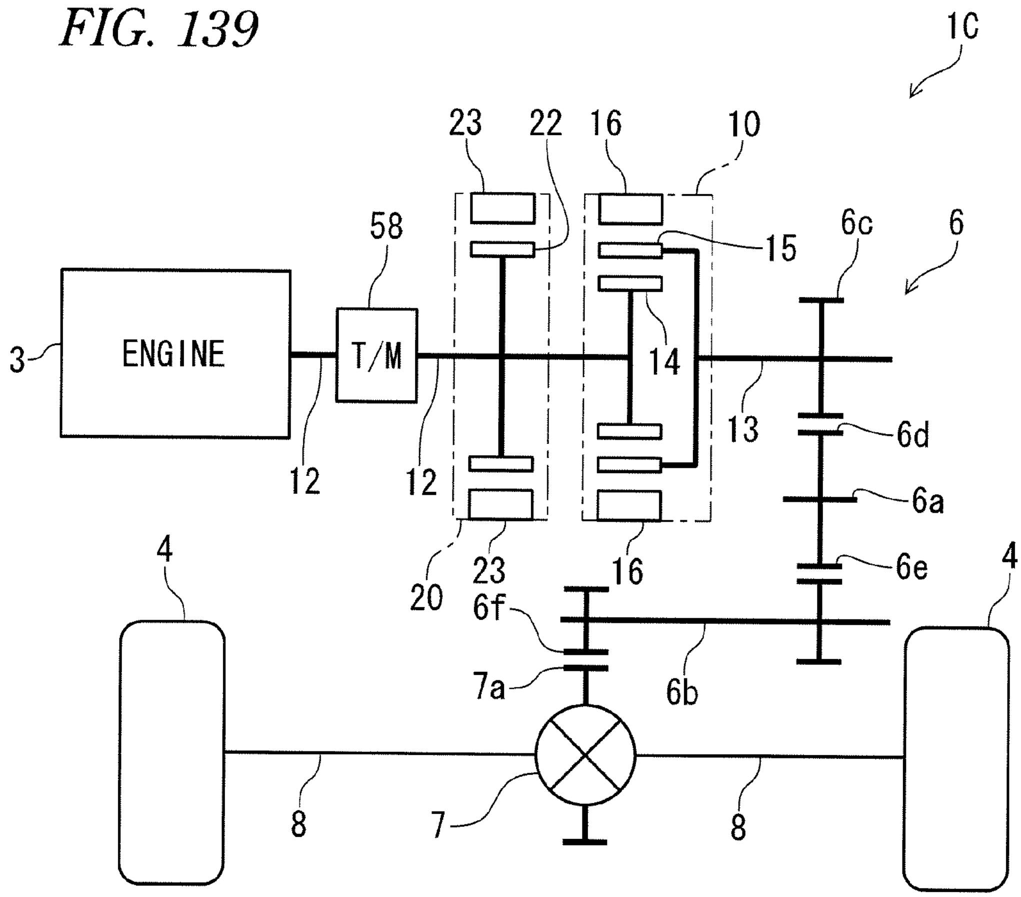

FIG. 139 is a diagram showing another example in which a transmission is provided in the power unit according to the twenty-sixth embodiment.

Figure 140:
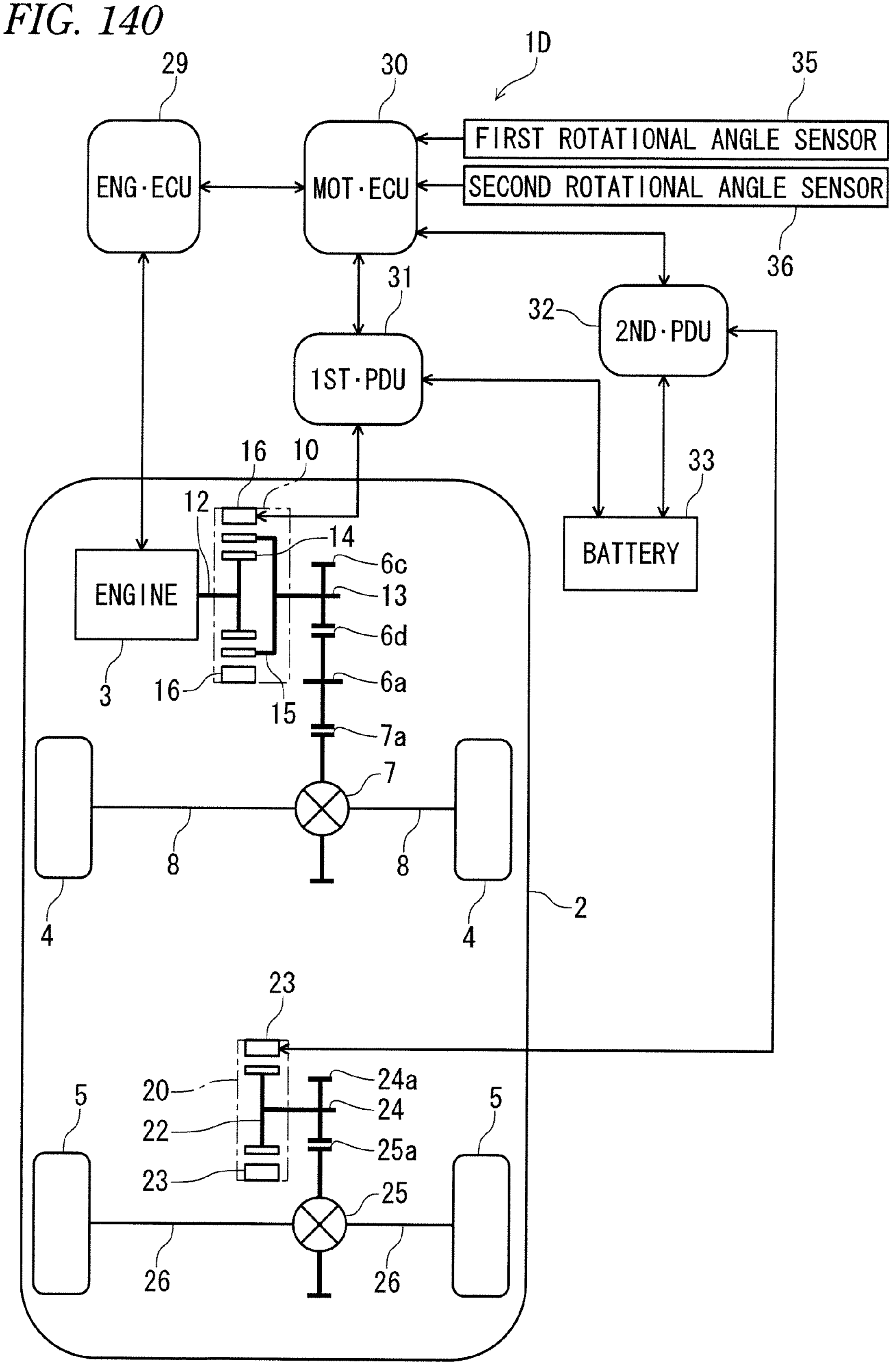

FIG. 140 is a diagram showing the general arrangement of the power unit according to the twenty-seventh embodiment.

Figure 141:
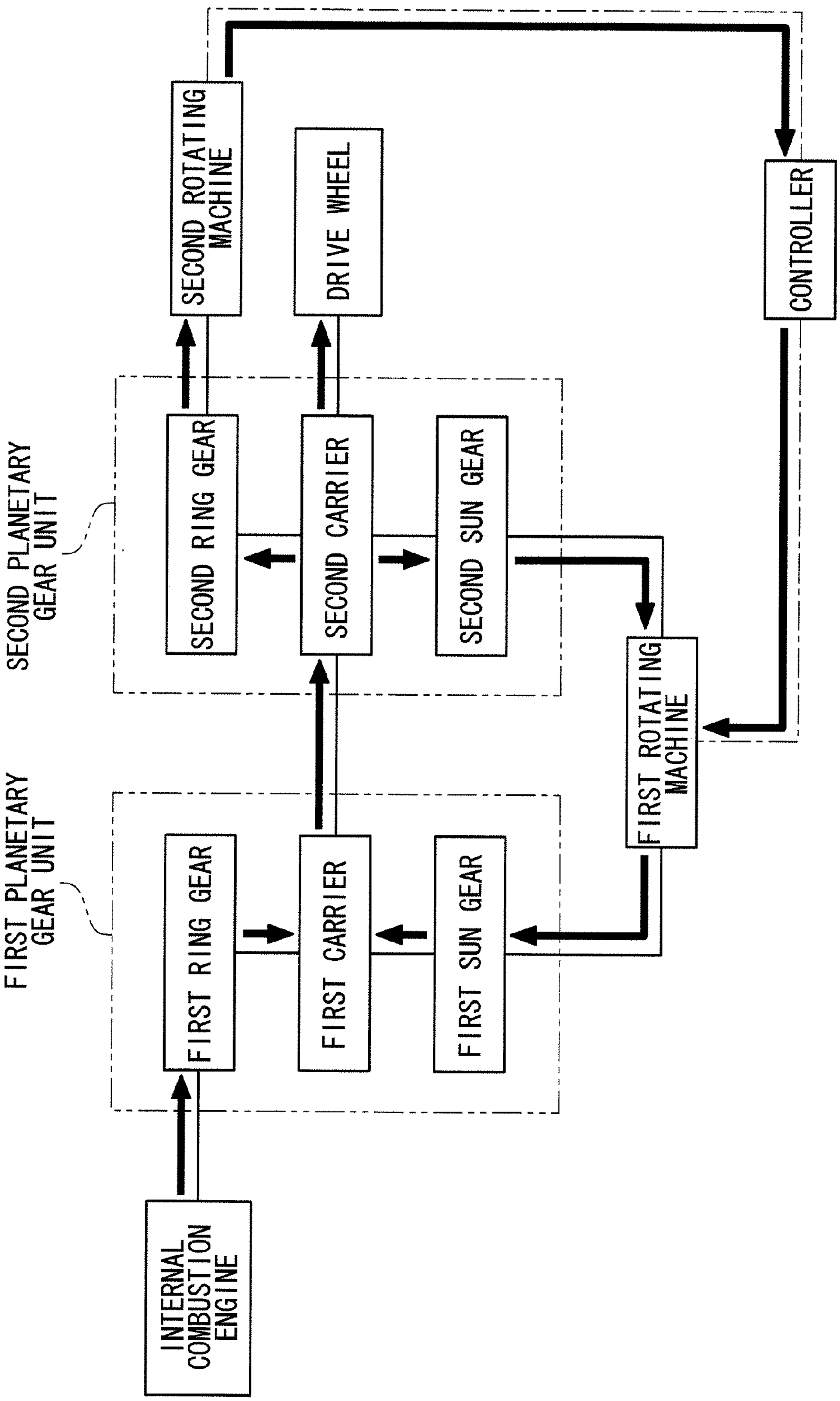

FIG. 141 is a diagram for explaining an example of the operation of the conventional power unit.

MODE FOR CARRYING OUT THE INVENTION

<1-Common Line 4-Element>

Hereinafter, embodiments of a power unit having a 1-common line 4-element structure according to the present invention will be described with reference to the drawings. It should be noted in the figures, that, where appropriate, hatching in portions showing cross-sections is not depicted for the sake of convenience.

First Embodiment

Figure 1:
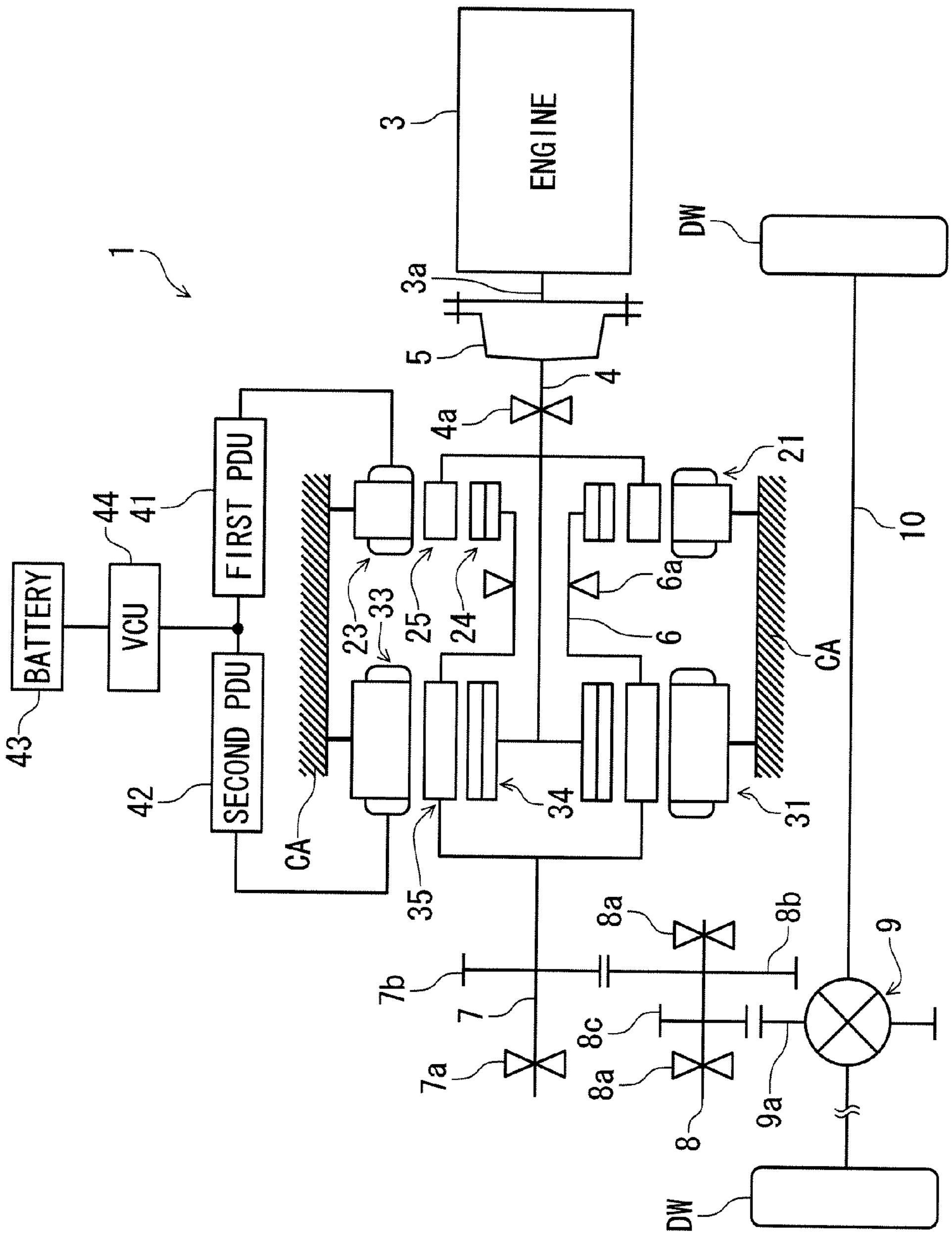
FIG. 1 is a diagram schematically showing a power unit according to a first embodiment.
Figure 2:
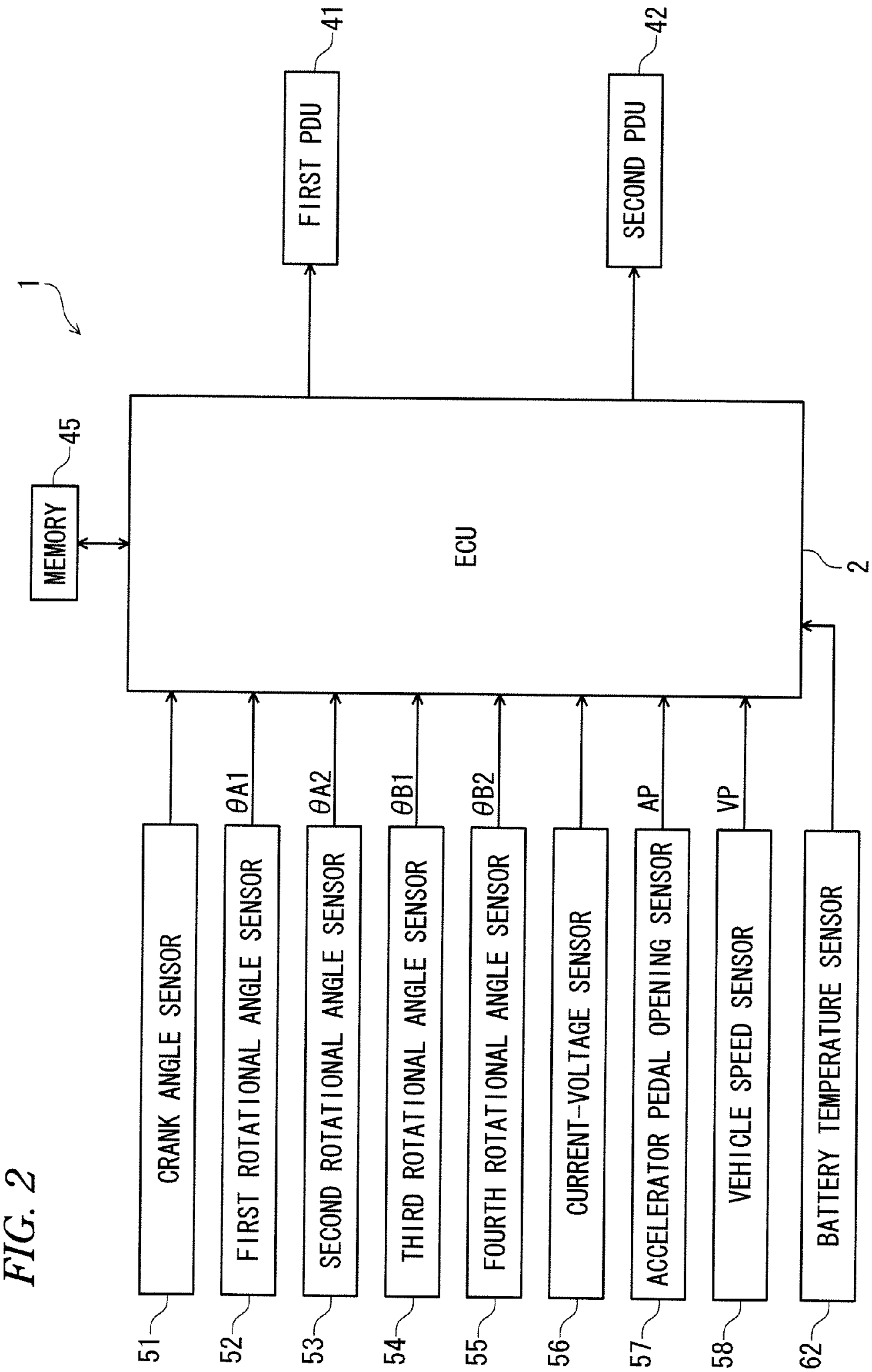
FIG. 2 is a block diagram showing a control system for controlling an engine and the like shown in FIG. 1.

FIGS. 1 and 2 schematically show a power unit 1 according to a first embodiment. The power unit 1 is for driving left and right drive wheels DW and DW (driven parts) of a vehicle (not shown). As shown in FIG. 1, the power unit 1 includes an internal combustion engine 3 (heat engine) which is a motive power source, a first rotating machine 21 and a second rotating machine 31, a differential gear mechanism 9 connected to the drive wheels DW and DW through drive shafts 10 and 10, a first power drive unit (hereinafter referred to as a "first PDU") 41 and a second power drive unit (hereinafter referred to as a "second PDU") 42, and a bidirectional step-up/down converter (hereinafter referred to as a "VCU") 44. Moreover, as shown in FIG. 2, the power unit 1 includes an ECU 2 for controlling the respective operations of the internal combustion engine 3 and the first and second rotating machines 21 and 31. The first and second rotating machines 21 and 31 also function as stepless transmissions, as will be described later.

The internal combustion engine (hereinafter referred to as an "engine") 3 is, for example, a gasoline engine, and a first rotating shaft 4 rotatably supported by a bearing **4*a* is directly connected to a crankshaft 3*a* of the engine 3 through a flywheel 5. Moreover, a connection shaft 6 and a second rotating shaft 7 are arranged concentrically with respect to the first rotating shaft 4, and an idler shaft 8 is disposed in parallel with the first rotating shaft 4. The connection shaft 6, the second rotating shaft 7, and the idler shaft 8 are rotatably supported by bearings 6*a*, 7*a*, and 8*a* and 8*a***, respectively.

The connection shaft 6 is formed to be hollow, and the first rotating shaft 4 is rotatably fitted to the inner side of the connection shaft 6. A first gear **8*b* and a second gear 8*c* are formed to be integral with the idler shaft 8. The first gear 8*b* is in mesh with a gear 7*b* integrally formed with the second rotating shaft 7, and the second gear 8*c* is in mesh with a gear 9*a* of the differential gear mechanism 9. With the above arrangement, the second rotating shaft 7 is connected to the drive wheels DW and DW through the idler shaft 8 and the differential gear mechanism 9. Hereinafter, the direction of circumference, the direction of axis, and the direction of radius, of the first rotating shaft 4, the connection shaft 6, and the second rotating shaft 7** are simply referred to as "the circumferential direction," "the axial direction," and "the radial direction," respectively.

<First Rotating Machine 21>

Figure 3:
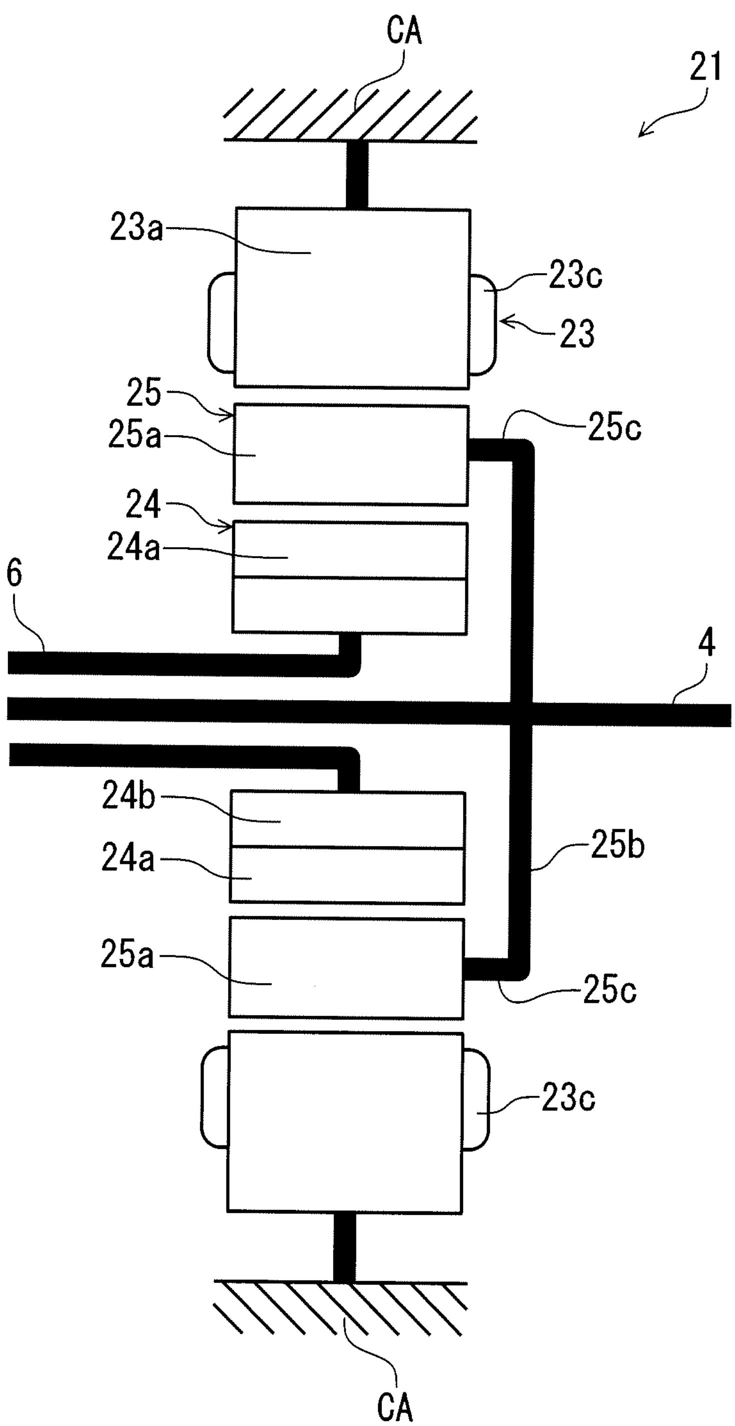
FIG. 3 is an enlarged cross-sectional view of a first rotating machine shown in FIG. 1.

As shown in FIGS. 1 and 3, the first rotating machine 21 includes a stator 23, an A1 rotor 24 disposed so as to be opposed to the stator 23, and an A2 rotor 25 disposed between the two 23 and 24. The stator 23, the A2 rotor 25, and the A1 rotor 24 are arranged in the radial direction from the outer side in the mentioned order and are arranged concentrically with each other. In FIG. 3, some elements such as the first rotating shaft 4 are shown in a skeleton diagram-like manner for the sake of convenience of illustration.

Figure 4:
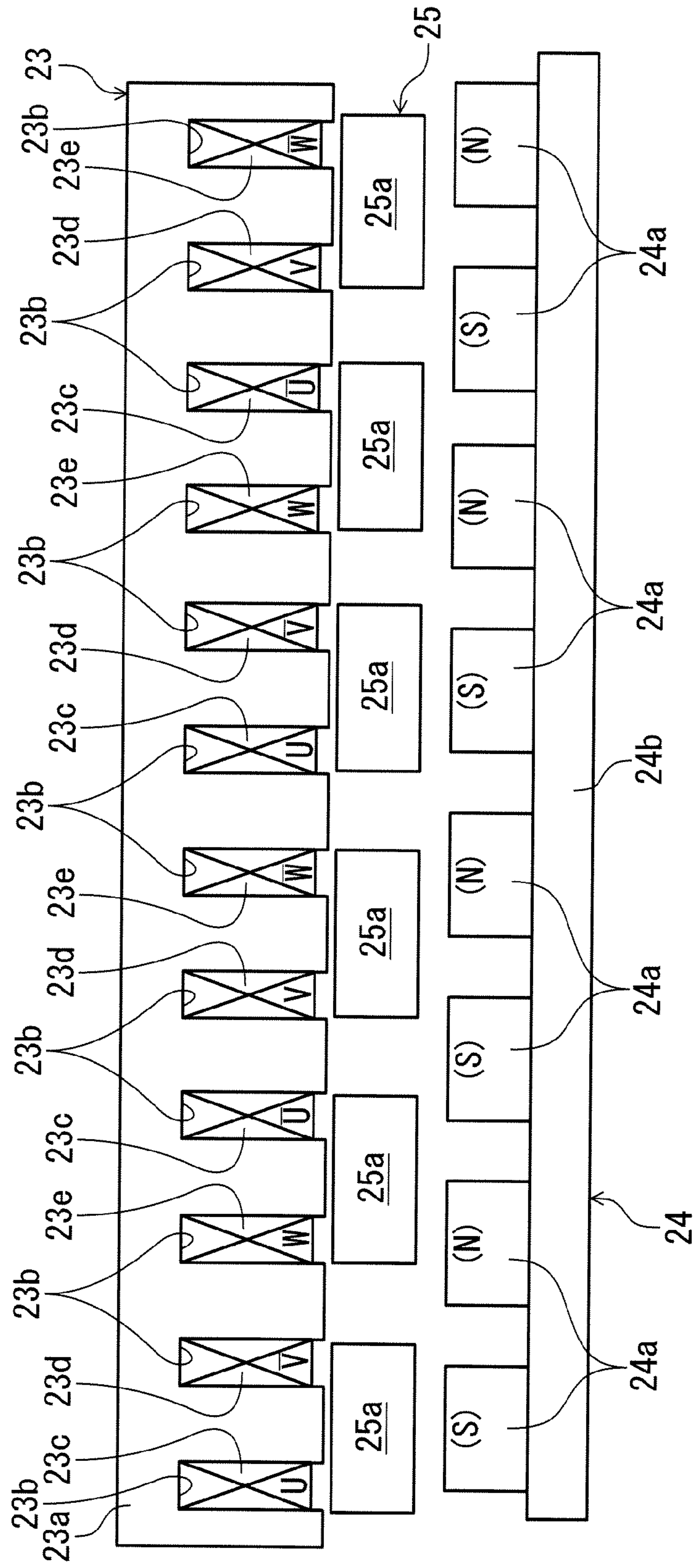
FIG. 4 is a diagram schematically showing a stator and A1 and A2 rotors of the first rotating machine shown in FIG. 1, wherein the stator and A1 and A2 rotors are developed in the circumferential direction.

The above-described stator 23 is for generating a first rotating magnetic field. As shown in FIGS. 3 and 4, the stator 23 includes an iron core 23*a* and U-phase, V-phase, and W-phase coils 23*c*, 23*d* and 23*e* provided on the iron core 23*a*. It should be noted that in FIG. 3, only the U-phase coil 23*c* is shown for the sake of convenience. The iron core 23*a* which has a hollow cylindrical shape formed by laminating a plurality of steel plates extends in the axial direction, and is fixed to an immovable casing CA. Moreover, twelve slots 23*b* are formed on the inner peripheral surface of the iron core 23*a*. These slots 23*b* extend in the axial direction and are arranged at equal intervals in the circumferential direction. The U-phase to W-phase coils 23*c* to 23*e* are wound in the slots 23*b* by distributed winding (wave winding) and are connected to a battery 43 through the first PDU 41 and the VCU 44 described above. The first PDU 41 is implemented as an electric circuit including an inverter and is connected to the second PDU 42 and the ECU 2 (see FIG. 1).

In the stator 23 configured as above, when electric power is supplied from the battery 43, to thereby cause electric currents to flow through the U-phase to W-phase coils 23*c* to 23*e*, or when electric power is generated, as described later, four magnetic poles are generated at an end of the iron core 23*a* close to the A1 rotor 24 at equal intervals in the circumferential direction (see FIGS. 7(*a*) to 7(*c*)), and the first rotating magnetic field generated by these magnetic poles moves in the circumferential direction. Hereinafter, the magnetic poles generated on the iron core 23*a* will be referred to as the "first stator magnetic poles". Moreover, each two first stator magnetic poles which are adjacent to each other in the circumferential direction have different polarities. It should be noted that in FIGS. 7(*a*) to 7(*c*) and other figures described later, the first stator magnetic poles are represented by (N) and (S) over the iron core 23*a* and the U-phase to W-phase coils 23*c* to 23*e*.

As shown in FIG. 4, the A1 rotor 24 includes a first magnetic pole row made up of eight permanent magnets 24*a*. These permanent magnets 24*a* are arranged at equal intervals in the circumferential direction, and the first magnetic pole row is opposed to the iron core 23*a* of the stator 23. Each permanent magnet 24*a* extends in the axial direction, and the length thereof in the axial direction is set to be the same as that of the iron core 23*a* of the stator 23.

Moreover, the permanent magnets 24*a* are attached to an outer peripheral surface of a ring-shaped fixed portion 24*b*. This fixed portion 24*b* is formed of a soft magnetic material, such as iron or a laminate of a plurality of steel plates, and an inner peripheral surface thereof is attached to the outer peripheral surface of a toroidal plate-shaped flange. The flange is integrally formed on the above-described connection shaft 6. Thus, the A1 rotor 24 including the permanent magnets 24*a* is rotatable integrally with the connection shaft 6. Moreover, the permanent magnets 24*a* are attached to the outer peripheral surface of the fixed portion 24*b* formed of the soft magnetic material, as described above, and hence a magnetic pole of (N) or (S) appears on an end of each permanent magnet 24*a* close to the stator 23. It should be noted that in FIG. 4 and other figures described later, the magnetic poles of the permanent magnets 24*a* are denoted by (N) and (S). Moreover, each two permanent magnets 24*a* adjacent to each other in the circumferential direction have different polarities.

The A2 rotor 25 includes a first soft magnetic material element row made up of six cores 25*a*. These cores 25*a* are arranged at equal intervals in the circumferential direction, and the first soft magnetic material element row is disposed between the iron core 23*a* of the stator 23 and the first magnetic pole row of the A1 rotor 24, in a manner of being spaced therefrom by respective predetermined distances. Each core 25*a* is formed of a soft magnetic material such as a laminate of a plurality of steel plates and extends in the axial direction. Moreover, similarly to the permanent magnet 24*a*, the length of the core 25*a* in the axial direction is set to be the same as that of the iron core 23*a* of the stator 23. Furthermore, the core 25*a* is attached to an outer end of a disk-shaped flange 25*b* with a hollow cylindrical connecting portion 25*c* disposed therebetween. The connecting portion 25*c* slightly extends in the axial direction. This flange 25*b* is integrally formed on the above-described first rotating shaft 4. In this way, the A2 rotor 25 including the cores 25*a* is rotatable integrally with the first rotating shaft 4. It should be noted that in FIG. 4 and FIGS. 7(*a*) to 7(*c*), the connecting portion 25*c* and the flange 25*b* are not depicted for the sake of convenience.

Hereinafter, the principle of the first rotating machine 21 will be described. In the description, the stator 23 will be referred to as a "first stator," the A1 rotor 24 will be referred to as a "first rotor," and the A2 rotor 25 will be referred to as a "second rotor". Moreover, a torque equivalent to the electric power supplied to the first stator and the electrical angular velocity ωmf of the first rotating magnetic field will be referred to as a "first driving equivalent torque Te1". First, a relationship between the first driving equivalent torque Te1 and torques transmitted to the first and second rotors (hereinafter referred to as the "first rotor-transmitted torque T1," and the "second rotor-transmitted torque T2," respectively), and a relationship between the first rotating magnetic field and the electrical angular velocities of the first and second rotors will be described.

Figure 5:
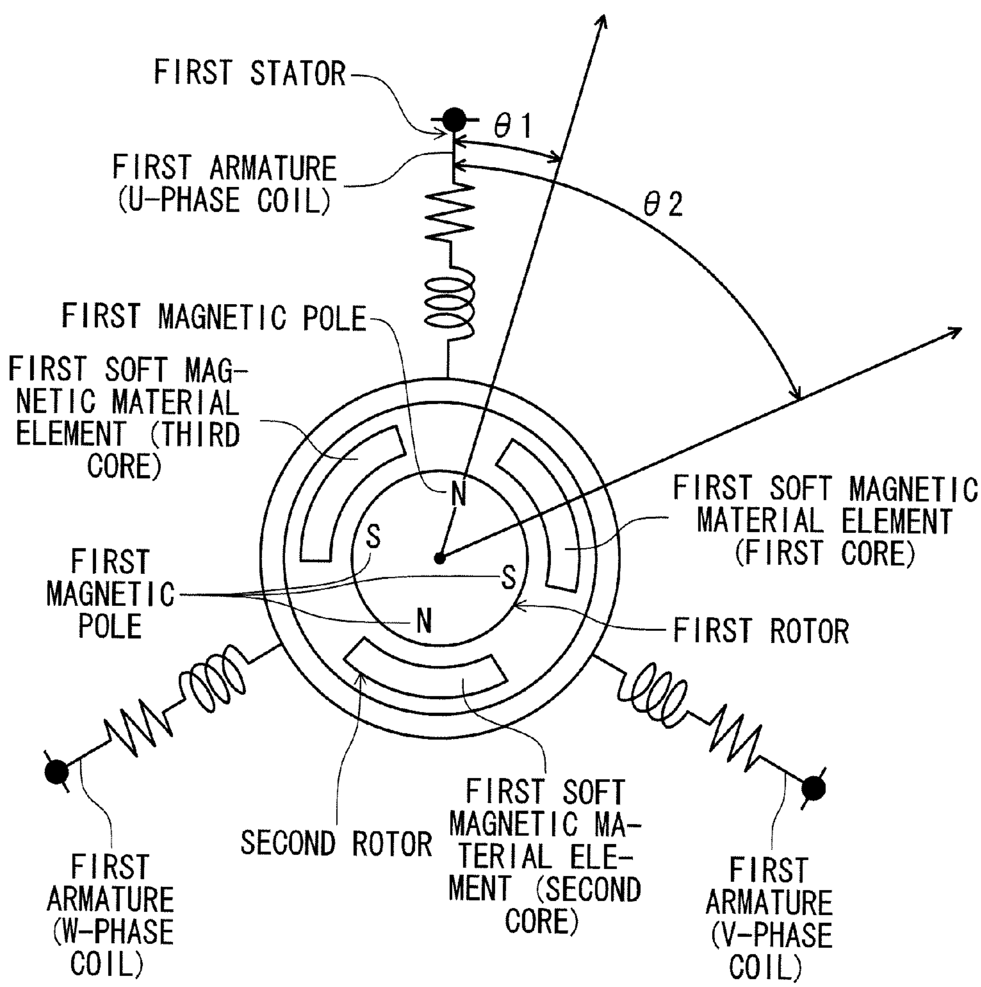
FIG. 5 is a diagram showing an equivalent circuit of the first rotating machine.

When the first rotating machine 21 is configured under the following conditions (A) and (B), an equivalent circuit corresponding to the first rotating machine 21 is expressed as shown in FIG. 5.

(A) The first stators have three-phase coils of U-phase, V-phase, and W-phase.

(B) The number of the first stator magnetic poles is 2, and the number of the first magnetic poles is 4, that is, a pole pair number of the first stator magnetic poles, each pair being made up of an N pole and an S pole of first stator magnetic poles, has a value of 1, a pole pair number of the first magnetic poles, each pair being made up of an N pole and an S pole of first magnetic poles, has a value of 2. The first soft magnetic material elements are made up of three soft magnetic material elements made up of a first core, a second core and a third core.

It should be noted that as described above, the term "pole pair" as used in the present specification means a pair made up of an N pole and an S pole.

In this case, a magnetic flux Ψk1 of a first magnetic pole passing through the first core of the first soft magnetic material elements is expressed by the following equation (1).

[Mathematical Formula 1]

$$\Psi k1=\psi f\cos[2(\theta 2-\theta 1)] \quad (1)$$

In the equation, ψf represents the maximum value of the magnetic flux of the first magnetic pole, and θ1 and θ2 represent a rotational angle position of the first magnetic pole and a rotational angle position of the first core, with respect to the U-phase coil, respectively. Moreover, in this case, since the ratio of the pole pair number of the first magnetic poles to the pole pair number of the first stator magnetic poles is 2.0, the magnetic flux of the first magnetic pole rotates (changes) at a repetition period of twice the repetition period of the first rotating magnetic field, so that in the above-described equation (1), (θ2−θ1) is multiplied by 2.0 to indicate this fact.

Therefore, a magnetic flux Ψu1 of the first magnetic pole passing through the U-phase coil through the first core is expressed by the following equation (2) obtained by multiplying the equation (1) by cos θ2.

[Mathematical Formula 2]

$$\Psi u1=\psi f\cos[2(\theta 2-\theta 1)]\cos\theta 2 \quad (2)$$

Similarly, a magnetic flux Ψk2 of the first magnetic pole passing through the second core of the first soft magnetic material elements is expressed by the following equation (3).

[Mathematical Formula 3]

$$\Psi k2=\psi f\cdot\cos\left[2\left(\theta 2+\frac{2\pi}{3}-\theta 1\right)\right] \quad (3)$$

The rotational angle position of the second core with respect to the first stator leads that of the first core by 2π/3, so that in the above-described equation (3), 2π/3 is added to θ2 to indicate this fact.

Therefore, a magnetic flux Ψu2 of the first magnetic pole passing through the U-phase coil through the second core is expressed by the following equation (4) obtained by multiplying the equation (3) by cos(θ2+2π/3).

[Mathematical Formula 4]

$$\Psi u2=\psi f\cdot\cos\left[2\left(\theta 2+\frac{2\pi}{3}-\theta 1\right)\right]\cos\left(\theta 2+\frac{2\pi}{3}\right) \quad (4)$$

Similarly, a magnetic flux Ψu3 of the first magnetic pole passing through the U-phase coil through the third core of the first soft magnetic material elements is expressed by the following equation (5).

[Mathematical Formula 5]

$$\Psi u3=\psi f\cdot\cos\left[2\left(\theta 2+\frac{4\pi}{3}-\theta 1\right)\right]\cos\left(\theta 2+\frac{4\pi}{3}\right) \quad (5)$$

In the first rotating machine as shown in FIG. 5, a magnetic flux Ψu of the first magnetic pole passing through the U-phase coil through the first soft magnetic material elements is obtained by adding the magnetic fluxes Ψu1 to Ψu3 expressed by the above-described equations (2), (4) and (5), and hence the magnetic flux Ψu is expressed by the following equation (6).

[Mathematical Formula 6]

$$\Psi u=\psi f\cdot\cos[2(\theta 2-\theta 1)]\cos\theta 2+\psi f\cdot\cos\left[2\left(\theta 2+\frac{2\pi}{3}-\theta 1\right)\right]\cos\left(\theta 2+\frac{2\pi}{3}\right)+\psi f\cdot\cos\left[2\left(\theta 2+\frac{4\pi}{3}-\theta 1\right)\right]\cos\left(\theta 2+\frac{4\pi}{3}\right) \quad (6)$$

Moreover, when this equation (6) is generalized, the magnetic flux Ψu of the first magnetic pole passing through the U-phase coil through the first soft magnetic material elements is expressed by the following equation (7).

[Mathematical Formula 7]

$$\Psi u=\sum_{i=1}^{b}\psi f\cdot\cos\left\{a\left[\theta 2+(i-1)\frac{2\pi}{b}-\theta 1\right]\right\}\cos\left\{c\left[\theta 2+(i-1)\frac{2\pi}{b}\right]\right\} \quad (7)$$

In the equation, a, b and c represent the pole pair number of the first magnetic poles, the number of first soft magnetic material elements, and the pole pair number of the first stator magnetic poles, respectively. Moreover, when the above equation (7) is changed based on the formula of the sum and product of the trigonometric function, there is obtained the following equation (8).

[Mathematical Formula 8]

$$\Psi u=\sum_{i=1}^{b}\frac{1}{2}\cdot\psi f\left\{\cos\left[(a+c)\theta 2-a\cdot\theta 1+(a+c)(i-1)\frac{2\pi}{b}\right]+\cos\left[(a-c)\theta 2-a\cdot\theta 1+(a-c)(i-1)\frac{2\pi}{b}\right]\right\} \quad (8)$$

When b=a+c is set in this equation (8), and the rearrangement is performed based on cos(θ+2π)=cos θ, there is obtained the following equation (9).

[Mathematical Formula 9]

$$\Psi u=\frac{b}{2}\cdot\psi f\cdot\cos[(a+c)\theta 2-a\cdot\theta 1]+\sum_{i=1}^{b}\frac{1}{2}\cdot\varphi f\left\{\cos\left[(a-c)\theta 2-a\cdot\theta 1+(a-c)(i-1)\frac{2\pi}{b}\right]\right\} \quad (9)$$

When this equation (9) is rearranged based on the addition theorem of the trigonometric function, there is obtained the following equation (10).

[Mathematical Formula 10]

$$\Psi u = \frac{b}{2}\cdot\psi f\cdot\cos[(a+c)\theta 2 - a\cdot\theta 1] + \frac{1}{2}\cdot\psi f\cdot\cos[(a-c)\theta 2 - a\cdot\theta 1]\sum_{i=1}^{b}\cos\left[(a-c)(i-1)\frac{2\pi}{b}\right] - \frac{1}{2}\cdot\psi f\cdot\sin[(a-c)\theta 2 - a\cdot\theta 1]\sum_{i=1}^{b}\sin\left[(a-c)(i-1)\frac{2\pi}{b}\right] \tag{10}$$

When the equation (10) is rearranged based on the sum total of the series and Euler's formula on condition that $a-c\neq 0$, the second term on the right side of the equation (10) is equal to 0 as is apparent from the following equation (11).

[Mathematical Formula 11]

$$\begin{aligned}\sum_{i=1}^{b}\cos\left[(a-c)(i-1)\frac{2\pi}{b}\right] &= \sum_{i=0}^{b-1}\frac{1}{2}\left\{e^{j[(a-c)\frac{2\pi}{b}i]} + e^{-j[(a-c)\frac{2\pi}{b}i]}\right\} \\ &= \frac{1}{2}\left\{\frac{e^{j[(a-c)\frac{2\pi}{b}b]}-1}{e^{j[(a-c)\frac{2\pi}{b}]}-1} + \frac{e^{-j[(a-c)\frac{2\pi}{b}b]}-1}{e^{-j[(a-c)\frac{2\pi}{b}]}-1}\right\} \\ &= \frac{1}{2}\left\{\frac{e^{j[(a-c)2\pi]}-1}{e^{j[(a-c)\frac{2\pi}{b}]}-1} + \frac{e^{-j[(a-c)2\pi]}-1}{e^{-j[(a-c)\frac{2\pi}{b}]}-1}\right\} \\ &= \frac{1}{2}\left\{\frac{0}{e^{j[(a-c)\frac{2\pi}{b}]}-1} + \frac{0}{e^{-j[(a-c)\frac{2\pi}{b}]}-1}\right\} \\ &= 0\end{aligned} \tag{11}$$

Moreover, when the equation (10) is rearranged based on the sum total of the series and Euler's formula on condition that $a-c\neq 0$, the third term on the right side of the above-described equation (10) is also equal to 0 as is apparent from the following equation (12).

[Mathematical Formula 12]

$$\begin{aligned}\sum_{i=1}^{b}\sin\left[(a-c)(i-1)\frac{2\pi}{b}\right] &= \sum_{i=0}^{n-1}\frac{1}{2}\left\{e^{j[(a-c)\frac{2\pi}{b}-1]} - e^{-j[(a-c)\frac{2\pi}{b}1]}\right\} \\ &= \frac{1}{2}\left\{\frac{e^{j[(a-c)\frac{2\pi}{b}b]}-1}{e^{j[(a-c)\frac{2\pi}{b}]}-1} - \frac{e^{-j[(a-c)\frac{2\pi}{b}b]}-1}{e^{-j[(a-c)\frac{2\pi}{b}]}-1}\right\} \\ &= \frac{1}{2}\left\{\frac{e^{j[(a-c)2\pi]}-1}{e^{j[(a-c)\frac{2\pi}{b}]}-1} - \frac{e^{-j[(a-c)2\pi]}-1}{e^{-j[(a-c)\frac{2\pi}{b}]}-1}\right\} \\ &= \frac{1}{2}\left\{\frac{0}{e^{j[(a-c)\frac{2\pi}{b}]}-1} - \frac{0}{e^{-j[(a-c)\frac{2\pi}{b}]}-1}\right\} \\ &= 0\end{aligned} \tag{12}$$

From the above, when $a-c\neq 0$ holds, the magnetic flux Ψu of the first magnetic pole passing through the U-phase coil through the first soft magnetic material elements is expressed by the following equation (13).

[Mathematical Formula 13]

$$\Psi u = \frac{b}{2}\cdot\psi f\cdot\cos[(a+c)\theta 2 - a\cdot\theta 1] \tag{13}$$

Moreover, in this equation (13), if $a/c=\alpha$, there is obtained the following equation (14).

[Mathematical Formula 14]

$$\Psi u = \frac{b}{2}\cdot\psi f\cdot\cos[(\alpha+1)c\cdot\theta 2 - \alpha\cdot c\cdot\theta 1] \tag{14}$$

Furthermore, in this equation (14), if $c\cdot\theta\mathbf{2}=\theta e\mathbf{2}$ and $c\cdot\theta\mathbf{1}=\theta e\mathbf{1}$, there is obtained the following equation (15).

[Mathematical Formula 15]

$$\Psi u = \frac{b}{2}\cdot\psi f\cdot\cos[(\alpha+1)\theta e2 - \alpha\cdot\theta e1] \tag{15}$$

In this equation, as is clear from the fact that θe2 is obtained by multiplying the rotational angle position θ2 of the first core with respect to the U-phase coil by the pole pair number c of the first stator magnetic poles, θe2 represents the electrical angular position of the first core with respect to the U-phase coil. Moreover, as is clear from the fact that θe1 is obtained by multiplying the rotational angle position θ1 of the first magnetic pole with respect to the U-phase coil by the pole pair number c of the first stator magnetic poles, θe1 represents the electrical angular position of the first magnetic pole with respect to the U-phase coil.

Similarly, since the electrical angular position of the V-phase coil leads that of the U-phase coil by the electrical angle 2π/3, the magnetic flux Ψv of the first magnetic pole passing through the V-phase coil through the first soft magnetic material elements is expressed by the following equation (16). Moreover, since the electrical angular position of the W-phase coil is delayed from that of the U-phase coil by the electrical angle 2π/3, the magnetic flux Ψw of the first magnetic pole passing through the W-phase coil through the first soft magnetic material elements is expressed by the following equation (17).

[Mathematical Formula 16]

$$\Psi v = \frac{b}{2}\cdot\psi f\cdot\cos\left[(\alpha+1)\theta e2 - \alpha\cdot\theta e1 - \frac{2\pi}{3}\right] \tag{16}$$

[Mathematical Formula 17]

$$\Psi w = \frac{b}{2}\cdot\psi f\cdot\cos\left[(\alpha+1)\theta e2 - \alpha\cdot\theta e1 + \frac{2\pi}{3}\right] \tag{17}$$

Moreover, when the magnetic fluxes Ψu to Ψw expressed by the above-described equations (15) to (17), respectively, are differentiated with respect to time, the following equations (18) to (20) are obtained.

[Mathematical Formula 18]

$$\frac{d\Psi u}{dt} = -\frac{b}{2}\cdot\psi f\{[(\alpha+1)\omega e2 - \alpha\cdot\omega e1]\sin[(\alpha+1)\theta e2 - \alpha\cdot\theta e1]\} \quad (18)$$

[Mathematical Formula 19]

$$\frac{d\Psi v}{dt} = -\frac{b}{2}\cdot\psi f\left\{[(\alpha+1)\omega e2 - \alpha\cdot\omega e1]\sin\left[(\alpha+1)\theta e2 - \alpha\cdot\theta e1 - \frac{2\pi}{3}\right]\right\} \quad (19)$$

[Mathematical Formula 20]

$$\frac{d\Psi w}{dt} = -\frac{b}{2}\cdot\psi f\left\{[(\alpha+1)\omega e2 - \alpha\cdot\omega e1]\sin\left[(\alpha+1)\theta e2 - \alpha\cdot\theta e1 + \frac{2\pi}{3}\right]\right\} \quad (20)$$

In the equation, ωe1 represents a time differential value of θe1, that is, a value obtained by converting an angular velocity of the first rotor with respect to the first stator to an electrical angular velocity (hereinafter referred to as the "first rotor electrical angular velocity"). Furthermore, ωe2 represents a time differential value of θe2, that is, a value obtained by converting an angular velocity of the second rotor with respect to the first stator to an electrical angular velocity (hereinafter referred to as the "second rotor electrical angular velocity").

Moreover, magnetic fluxes of the first magnetic poles that directly pass through the U-phase to W-phase coils without passing through the first soft magnetic material elements are very small, and hence the influence thereof is negligible. Therefore, dΨu/dt to dΨw/dt (equations (18) to (20)), which are time differential values of the magnetic fluxes Ψu to Ψw of the first magnetic poles, which pass through the U-phase to W-phase coils through the first soft magnetic material elements, respectively, represent back electromotive force voltages (induced electromotive voltages), which are generated in the U-phase to W-phase coils as the first magnetic poles and the first soft magnetic material elements rotate with respect to the first stator row.

From the above, electric currents Iu, Iv and Iw, flowing through the U-phase, V-phase and W-phase coils, respectively, are expressed by the following equations (21), (22) and (23).

[Mathematical Formula 21]

$$Iu = I\cdot\sin[(\alpha+1)\theta e2 - \alpha\cdot\theta e1] \quad (21)$$

[Mathematical Formula 22]

$$Iv = I\cdot\sin\left[(\alpha+1)\theta e2 - \alpha\cdot\theta e1 - \frac{2\pi}{3}\right] \quad (22)$$

[Mathematical Formula 23]

$$Iw = I\cdot\sin\left[(\alpha+1)\theta e2 - \alpha\cdot\theta e1 + \frac{2\pi}{3}\right] \quad (23)$$

In the equation, I represents the amplitude (maximum value) of electric currents Iu to Iw flowing through the U-phase to W-phase coils, respectively.

Moreover, from the above equations (21) to (23), the electrical angular position θmf of the vector of the first rotating magnetic field with respect to the U-phase coil is expressed by the following equation (24), and the electrical angular velocity ωmf of the first rotating magnetic field with respect to the U-phase coil (hereinafter referred to as the "magnetic field electrical angular velocity") is expressed by the following equation (25).

[Mathematical Formula 24]

$$\theta mf = (\alpha+1)\theta e2 - \alpha\cdot\theta e1 \quad (24)$$

[Mathematical Formula 25]

$$\omega mf = (\alpha+1)\omega e2 - \alpha\cdot\omega e1 \quad (25)$$

Moreover, the mechanical output (motive power) W, which is output to the first and second rotors by the flowing of the respective electric currents Iu to Iw through the U-phase to W-phase coils, is represented, provided that a reluctance-associated portion is excluded therefrom, by the following equation (26).

[Mathematical Formula 26]

$$W = \frac{d\Psi u}{dt}\cdot Iu + \frac{d\Psi v}{dt}\cdot Iv + \frac{d\Psi w}{dt}\cdot Iw \quad (26)$$

When the above equations (18) to (23) are substituted into this equation (26) for rearrangement, there is obtained the following equation (27).

[Mathematical Formula 27]

$$W = -\frac{3\cdot b}{4}\cdot\psi f\cdot 1[(\alpha+1)\omega e2 - \alpha\cdot\omega e1] \quad (27)$$

Furthermore, the relationship between this mechanical output W, the above-described first and second rotor-transmitted torques T1 and T2, and the first and second rotor electrical angular velocities ωe1 and ωe2 is expressed by the following equation (28).

[Mathematical Formula 28]

$$W = T1\cdot\omega e1 + T2\cdot\omega e2 \quad (28)$$

As is clear from the above equations (27) and (28), the first and second rotor-transmitted torques T1 and T2 are expressed by the following equations (29) and (30), respectively.

[Mathematical Formula 29]

$$T1 = \alpha\cdot\frac{3\cdot b}{4}\cdot\psi f\cdot I \quad (29)$$

[Mathematical Formula 30]

$$T2 - (\alpha+1)\cdot\frac{3\cdot b}{4}\cdot\psi f\cdot I \quad (30)$$

Moreover, due to the fact that the electric power supplied to the first stator row and the mechanical output W are equal to each other (provided that losses are ignored), and from the above-described equations (25) and (27), the above-described first driving equivalent torque Te1 is expressed by the following equation (31).

[Mathematical Formula 31]

$$Te1 = \frac{3 \cdot b}{4} \cdot \psi f \cdot I \tag{31}$$

Moreover, by using the above equations (29) to (31), there is obtained the following equation (32).

[Mathematical Formula 32]

$$Te1 = \frac{T1}{\alpha} = \frac{-T2}{(\alpha + 1)} \tag{32}$$

The relationship between the torques expressed by the equation (32) and the relationship between the electrical angular velocities expressed by the equation (25) are exactly the same as the relationship between the torques of the sun gear, ring gear and the carrier of the planetary gear unit and the relationship between the rotational speeds thereof.

Moreover, as described above, on condition that b=a+c and a−c≠0, the relationship between the electrical angular velocities expressed by the equation (25) and the relationship between the torques expressed by the equation (32) hold. The above condition b=a+c is expressed by b=(p+q)/2, that is, b/q=(1+p/q)/2, assuming that the number of the first magnetic poles is p and the number of the first stator magnetic poles is q. Here, as is clear from the fact that if p/q=m, b/q=(1+m)/2 is obtained, the satisfaction of the above condition of b=a+c means that the ratio between the number of the first stator magnetic poles, the number of the first magnetic poles, and the number of the first soft magnetic material elements is 1:m:(1+m)/2. Moreover, the satisfaction of the above condition of a−c≠0 means that m≠1.0 holds. According to the first rotating machine 21 of the present embodiment, since the ratio between the number of the first stator magnetic poles, the number of the first magnetic poles, and the number of the first soft magnetic material elements is set to 1:m:(1+m)/2 (m≠1.0), the relationship of the electrical angular velocities expressed by the equation (25) and the relationship of the torques expressed by the equation (32) hold. From this, it is understood that the first rotating machine 21 properly operates.

Moreover, as is apparent from the equations (25) and (32), by setting α=a/c, that is, the ratio of the pole pair number of the first magnetic poles to the pole pair number of the first stator magnetic poles (hereinafter referred to as the "first pole pair number ratio"), it is possible to freely set the relationship between the magnetic field electrical angular velocity ωmf, and the first and second rotor electrical angular velocities ωe1 and ωe2, and the relationship between the first driving equivalent torque Te1, and the first and second rotor-transmitted torques T1 and T2. Therefore, it is possible to enhance the degree of freedom in design of the first rotating machine. The same advantageous effects can also be obtained when the number of phases of the coils of the plurality of first stators is other than the above-described value of 3.

As described above, in the first rotating machine 21, when the first rotating magnetic field is generated by supplying electric power to the first stators, that is, the first stator, magnetic force lines are generated in a manner of connecting between the above-described first magnetic poles, first soft magnetic material elements, and first stator magnetic poles, and the action of the magnetism of the magnetic force lines converts the electric power supplied to the first stator to motive power. The motive power is output from the first rotor or the second rotor, and the above-described electrical angular velocity and torque hold. Therefore, by inputting motive power to at least one of the first and second rotors in a state where electric power is not being supplied to the first stator, to thereby cause the same to rotate with respect to the first stator, electric power is generated in the first stator, and the first rotating magnetic field is generated. In this case as well, such magnetic force lines that connect between the first magnetic poles, the first soft magnetic material elements, and the first stator magnetic poles are generated, and by the action of the magnetism of the magnetic force lines, the relationship of the electrical angular velocities expressed by the equation (25) and the relationship of the torques expressed by the equation (32) hold.

That is, assuming that torque equivalent to the generated electric power and the magnetic field electrical angular velocity ωmf will be referred to as the "first electric power-generating equivalent torque," a relationship shown in the equation (32) also holds between the first electric power-generating equivalent torque and the first and second rotor-transmitted torques T1 and T2. As is clear from the above, the first rotating machine 21 according to the present embodiment has the same functions as those of an apparatus formed by combining a planetary gear unit and a general one-rotor-type rotating machine.

Hereinafter, the operation of the first rotating machine 21 configured as above will be described. As described above, the first rotating machine 21 includes four first stator magnetic poles, eight magnetic poles of the permanent magnets 24*a* (hereinafter referred to as the "first magnetic poles"), and six cores 25*a*. That is, the ratio between the number of the first stator magnetic poles, the number of the first magnetic poles, and the number of the cores 25*a* is set to 1:2.0:(1+2.0)/2. The ratio of the number of pole pairs of the first magnetic poles to the number of pole pairs of the first stator magnetic poles (hereinafter referred to as the "first pole pair number ratio α") is set to 2.0. As is clear from this configuration and the above-described equations (18) to (20), back electromotive force voltages, which are generated by the U-phase to W-phase coils 23*c* to 23*e* as the A1 rotor 24 and the A2 rotor 25 rotate with respect to the stator 23 (hereinafter referred to as the "U-phase back electromotive force voltage Vcu," the "V-phase back electromotive force voltage Vcv" and the "W-phase back electromotive force voltage Vcw," respectively), are expressed by the following equations (33), (34) and (35), respectively.

[Mathematical Formula 33]

$$Vcu = -3 \cdot \psi F[(3 \cdot \omega ER2 - 2 \cdot \omega ER1)\sin(3 \cdot \theta ER2 - 2 \cdot \theta ER1)] \tag{33}$$

[Mathematical Formula 34]

$$Vcu = -3 \cdot \psi F\left[(3 \cdot \omega ER2 - 2 \cdot \omega ER1)\sin\left(3 \cdot \theta ER2 - 2 \cdot \theta ER1 - \frac{2\pi}{3}\right)\right] \tag{34}$$

[Mathematical Formula 35]

$$Vcw = -3 \cdot \psi F\left[(3 \cdot \omega ER2 - 2 \cdot \omega ER1)\sin\left(3 \cdot \theta ER2 - 2 \cdot \theta ER1 + \frac{2\pi}{3}\right)\right] \tag{35}$$

In these equations, ψF represents the maximum value of the magnetic fluxes of the first magnetic poles. Moreover, θER1 represents an A1 rotor electrical angle, which is a value obtained by converting a rotational angular position of a specific permanent magnet 24*a* of the A1 rotor 24 with respect to a specific U-phase coil 23*c* (hereinafter referred to as the "first reference coil") to an electrical angular position. That is, the A1 rotor electrical angle θER1 is a value obtained by multiplying the rotational angle position of the specific permanent magnet 24*a* (hereinafter referred to as the "A1 rotor rotational angle θA1") by a pole pair number of the first stator magnetic poles, that is, a value of 2. Moreover, θER2 represents an A2 rotor electrical angle, which is a value obtained by converting a rotational angle position of a specific core 25*a* of the A2 rotor 25 with respect to the above-described first reference coil to an electrical angular position. More specifically, the A2 rotor electrical angle θER2 is a value obtained by multiplying the rotational angle position of this specific core 25*a* (hereinafter referred to as the "A2 rotor rotational angle θA2") by a pole pair number (value of 2) of the first stator magnetic poles.

Moreover, ωER1 in the equations (33) to (35) represents a time differential value of θER1, that is, a value obtained by converting an angular velocity of the A1 rotor 24 with respect to the stator 23 to an electrical angular velocity (hereinafter referred to as the "A1 rotor electrical angular velocity"). Furthermore, ωER2 represents a time differential value of θER2, that is, a value obtained by converting an angular velocity of the A2 rotor 25 with respect to the stator 23 to an electrical angular velocity (hereinafter referred to as the "A2 rotor electrical angular velocity").

Moreover, as is clear from the above-described first pole pair number ratio α (=2.0) and the above-described equations (21) to (23), currents flowing through the respective U-phase, V-phase and W-phase coils 23*c*, 23*d* and 23*e* (hereinafter referred to as the "U-phase current Iu," the "V-phase current Iv" and the "W-phase current Iw") are expressed by the following equations (36), (37) and (38), respectively.

[Mathematical Formula 36]

$$Iu = I \cdot \sin(2 \cdot \theta ER2 - 2 \cdot \theta ER1) \tag{36}$$

[Mathematical Formula 37]

$$Iv = I \cdot \sin\left(3 \cdot \theta ER2 - 2 \cdot \theta ER1 - \frac{2\pi}{3}\right) \tag{37}$$

[Mathematical Formula 38]

$$Iw = I \cdot \sin\left(3 \cdot \theta ER2 - 2 \cdot \theta ER1 + \frac{2\pi}{3}\right) \tag{38}$$

In these equations, I represents the amplitude (maximum value) of the currents flowing through the U-phase to W-phase coils 23*c* to 23*e*. Furthermore, as is clear from the first pole pair number ratio α (=2.0) and the above-described equations (24) and (25), the electrical angular position of a vector of the first rotating magnetic field of the stator 23 with respect to the first reference coil (hereinafter referred to as the "first magnetic field electrical angular position θMFR") is expressed by the following equation (39), and the electrical angular velocity of the first rotating magnetic field with respect to the stator 23 (hereinafter referred to as the "first magnetic field electrical angular velocity ωMFR") is expressed by the following equation (40).

[Mathematical Formula 39]

$$\theta MFR = (\alpha+1)\theta ER2 - \alpha \cdot \theta ER1 = 3 \cdot \theta ER2 - 2 \cdot \theta ER1 \tag{39}$$

[Mathematical Formula 40]

$$\omega MFR = (\alpha+1)\omega ER2 - \alpha \cdot \omega ER1 = 3 \cdot \omega ER2 - 2 \cdot \omega ER1 \tag{40}$$

Figure 6:
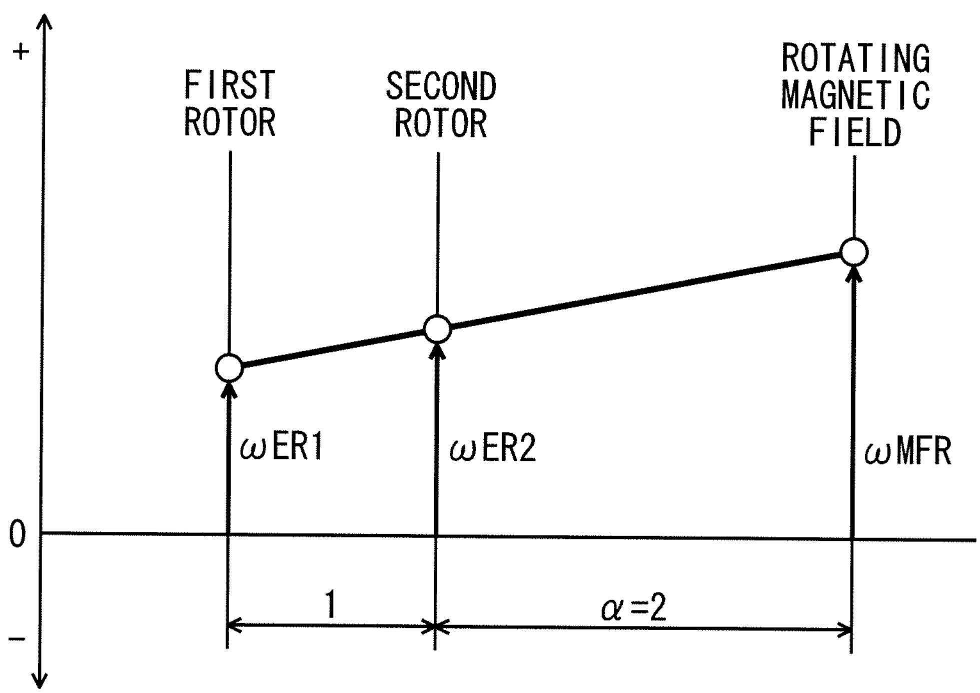
FIG. 6 is a collinear chart showing an example of the relationship between a first magnetic field electrical angular velocity and the A1 and A2 rotor electrical angular velocities of the first rotating machine shown in FIG. 1.

Therefore, the relationship between the first magnetic field electrical angular velocity ωMFR, the A1 rotor electrical angular velocity ωER1, and the A2 rotor electrical angular velocity ωER2, which is represented in a so-called collinear chart, is shown as in FIG. 6, for example.

Moreover, assuming that a torque equivalent to electric power supplied to the stator 23 and the first magnetic field electrical angular velocity ωMFR is a first driving equivalent torque TSE1, as is clear from the first pole pair number ratio α (=2.0) and the above-described equation (32), the relationship between the first driving equivalent torque TSE1, the torque transmitted to the A1 rotor 24 (hereinafter referred to as the "A1 rotor-transmitted torque") TRA1, and the torque transmitted to the A2 rotor 25 (hereinafter referred to as the "A2 rotor-transmitted torque") TRA2 is expressed by the following equation (41).

[Mathematical Formula 41]

$$TSE1 = \frac{TRA1}{\alpha} = \frac{-TRA2}{(\alpha+1)} = \frac{TRA1}{2} = \frac{-TRA2}{3} \tag{41}$$

The relationships between the electrical angular velocities and torques expressed by the equations (40) and (41) are exactly the same as the relationships between the rotational speeds and torques of the sun gear, the ring gear, and the carrier of a planetary gear unit having a gear ratio between the sun gear and the ring gear set to 1:2.

Next, how electric power supplied to the stator 23 is converted to motive power and is output from the A1 rotor 24 and the A2 rotor 25 will be described. First, a case where electric power is supplied to the stator 23 in a state in which the A1 rotor 24 is held unrotatable will be described with reference to FIGS. 7(*a*) to 7(*c*) to FIGS. 9(*a*) and 9(*b*). It should be noted that in FIGS. 7(*a*) to 7(*c*) to FIGS. 9(*a*) and 9(*b*), reference numerals indicative of a plurality of constituent elements are not depicted for the sake of convenience. This also applies to other figures described later. Moreover, in FIGS. 7(*a*) to 7(*c*) to FIGS. 9(*a*) and 9(*b*), one identical first stator magnetic pole and one identical core 25*a* are indicated by hatching for ease of understanding.

Figure 7:
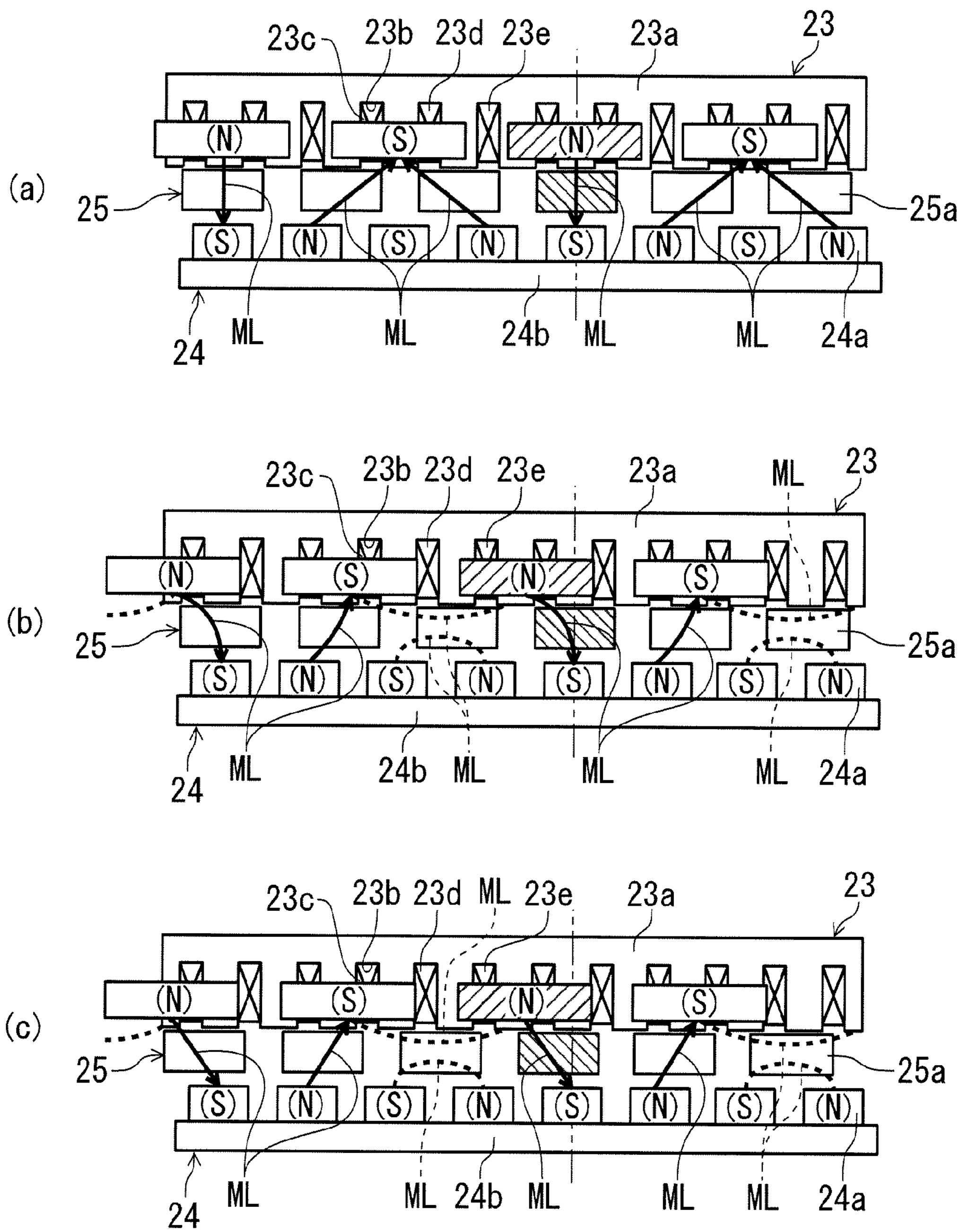
FIGS. 7(*a*) to 7(*c*) are diagrams for explaining the operation in a case where electric power is supplied to the stator in a state where the A1 rotor of the first rotating machine shown in FIG. 1 is held unrotatable.

First, as shown in FIG. 7(*a*), from a state where the center of a certain core 25*a* and the center of a certain permanent magnet 24*a* are circumferentially coincident with each other, and the center of a third core 25*a* from the certain core 25*a* and the center of a fourth permanent magnet 24*a* from the certain permanent magnet 24*a* are circumferentially coincident with each other, the first rotating magnetic field is generated such that it rotates leftward, as viewed in the figure. At the start of generation of the first rotating magnetic field, the positions of every two first stator magnetic poles alternately adjacent to each other that have the same polarity are caused to circumferentially coincide with the centers of the corresponding ones of the permanent magnets 24*a*, the centers of which are coincident with the centers of the cores 25*a*, respectively, and the polarity of these first stator magnetic poles is made different from the polarity of the first magnetic poles of these permanent magnets 24*a*.

Since the first rotating magnetic field is generated by the stator 23, between the same and the A1 rotor 24, and the A2 rotor 25 having the cores 25*a* is disposed between the stator 23 and the A1 rotor 24, as described above, the cores 25*a* are magnetized by the first stator magnetic poles and the first magnetic poles. Because of this fact and the fact that the cores 25*a* adjacent to each other are spaced from each other, magnetic force lines ML are generated in a manner of connecting between the first stator magnetic poles, the cores 25*a*, and the first magnetic poles. It should be noted that in FIGS. 7(*a*) to 7(*c*) to FIGS. 9(*a*) and 9(*b*), magnetic force lines ML at the iron core 23*a* and the fixed portion 24*b* are not depicted for the sake of convenience. This also applies to other figures described later.

In the state shown in FIG. 7(*a*), the magnetic force lines ML are generated in a manner of connecting the first stator magnetic poles, cores 25*a* and first magnetic poles the circumferential positions of which are coincident with each other, and at the same time in a manner of connecting first stator magnetic poles, cores 25*a* and first magnetic poles which are adjacent to the above-described first stator magnetic poles, cores 25*a*, and first magnetic poles, on respective circumferentially opposite sides thereof. Moreover, in this state, since the magnetic force lines ML are straight, no magnetic forces for circumferentially rotating the cores 25*a* act on the cores 25*a*.

When the first stator magnetic poles rotate from the positions shown in FIG. 7(*a*) to the respective positions shown in FIG. 7(*b*) in accordance with rotation of the first rotating magnetic field, the magnetic force lines ML are bent, and accordingly magnetic forces act on the cores 25*a* in such a manner that the magnetic force lines ML are made straight. In this case, the magnetic force lines ML are bent at the cores 25*a* in a manner of being convexly curved in a direction opposite to the direction of rotation of the first rotating magnetic field (hereinafter, this direction will be referred to as the "magnetic field rotation direction") with respect to the straight lines each connecting a first stator magnetic pole and a first magnetic pole which are connected to each other by an associated one of the magnetic force lines ML. Therefore, the above-described magnetic forces act on the cores 25*a* to drive the same in the magnetic field rotation direction. The cores 25*a* are driven in the magnetic field rotation direction by such action of the magnetic forces caused by the magnetic force lines ML, for rotation to the respective positions shown in FIG. 7(*c*), and the A2 rotor 25 provided with the cores 25*a* also rotates in the magnetic field rotation direction. It should be noted that broken lines in FIGS. 7(*b*) and 7(*c*) represent very small magnetic flux amounts of the magnetic force lines ML, and hence weak magnetic connections between the first stator magnetic poles, the cores 25*a*, and the first magnetic poles. This also applies to other figures described later.

Figure 8:
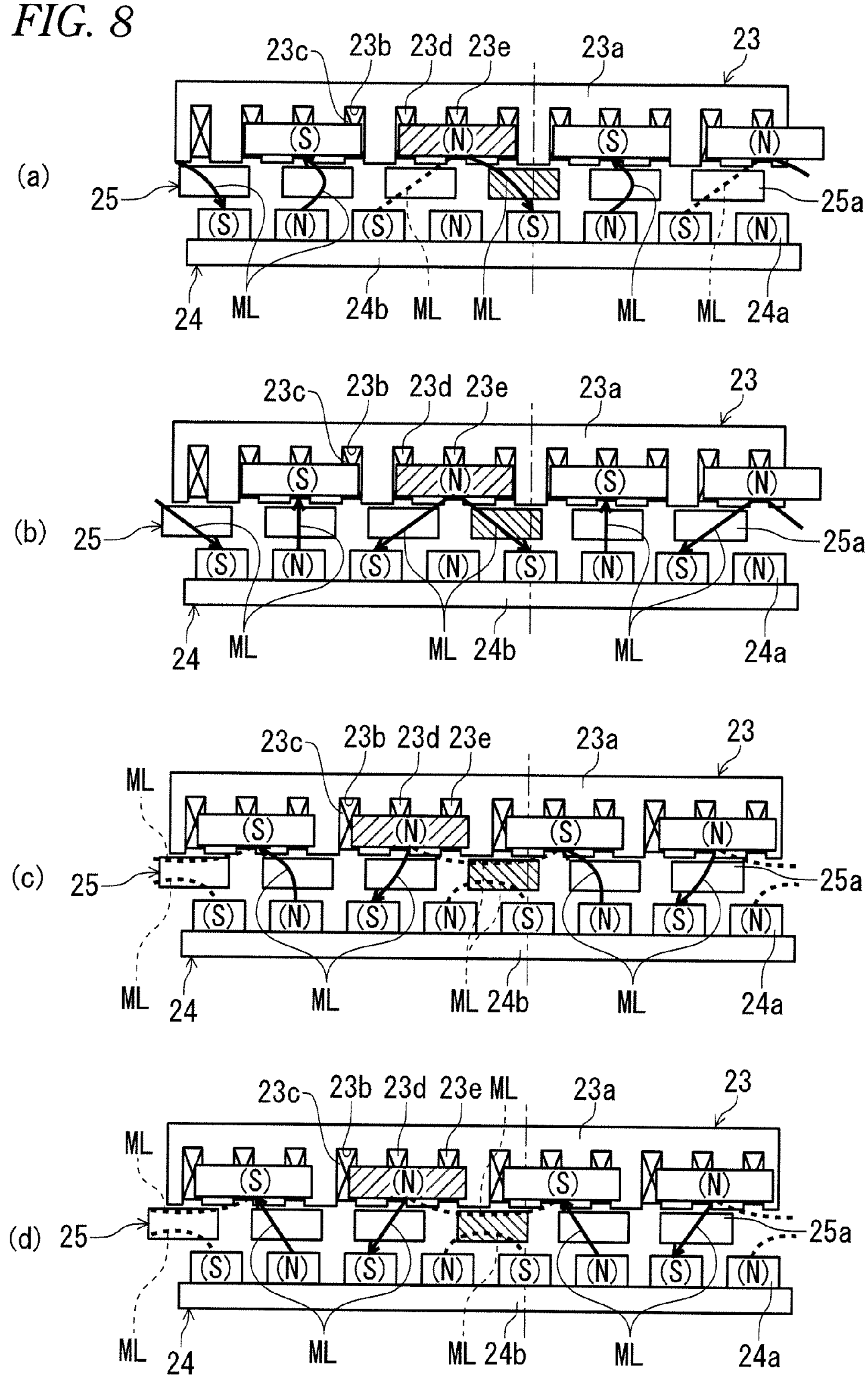
FIGS. 8(*a*) to 8(*d*) are diagrams for explaining a continuation of the operation shown in FIGS. 7(*a*) to 7(*c*).
Figure 9:
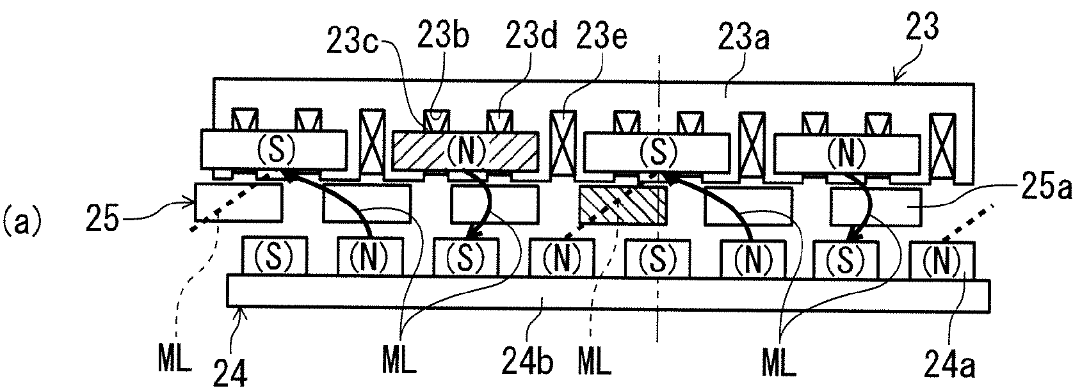
FIGS. 9(*a*) and 9(*b*) are diagrams for explaining a continuation of the operation shown in FIGS. 8(*a*) to 8(*d*).
Figure 9:
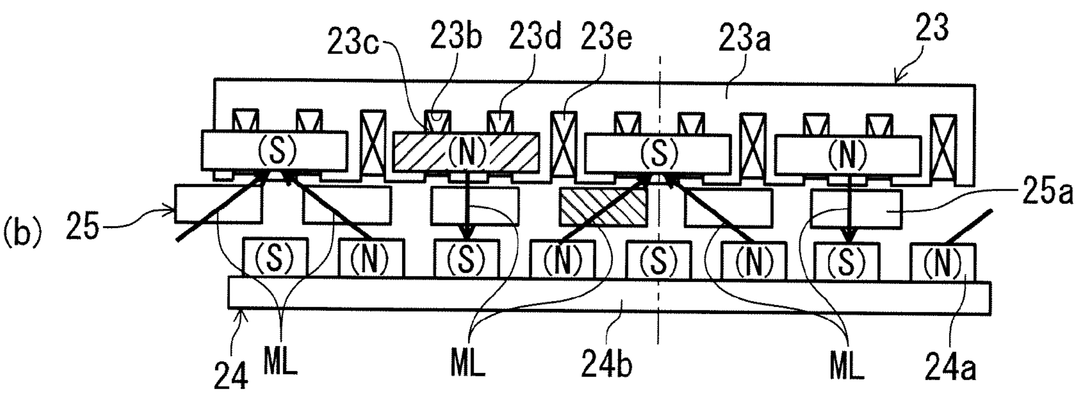

As the first rotating magnetic field rotates further, a sequence of the above-described operations, that is, the operations that "the magnetic force lines ML are bent at the cores 25*a* in a manner of being convexly curved in the direction opposite to the magnetic field rotation direction→the magnetic forces act on the cores 25*a* in such a manner that the magnetic force lines ML are made straight→the cores 25*a* and the A2 rotor 25 rotate in the magnetic field rotation direction" are repeatedly performed as shown in FIGS. 8(*a*) to 8(*d*) and FIGS. 9(*a*) and 9(*b*). As described above, in the case where electric power is supplied to the stator 23 in the state of the A1 rotor 24 being held unrotatable, the action of the magnetic forces caused by the magnetic force lines ML as described above converts electric power supplied to the stator 23 to motive power, and outputs the motive power from the A2 rotor 25.

Figure 10:
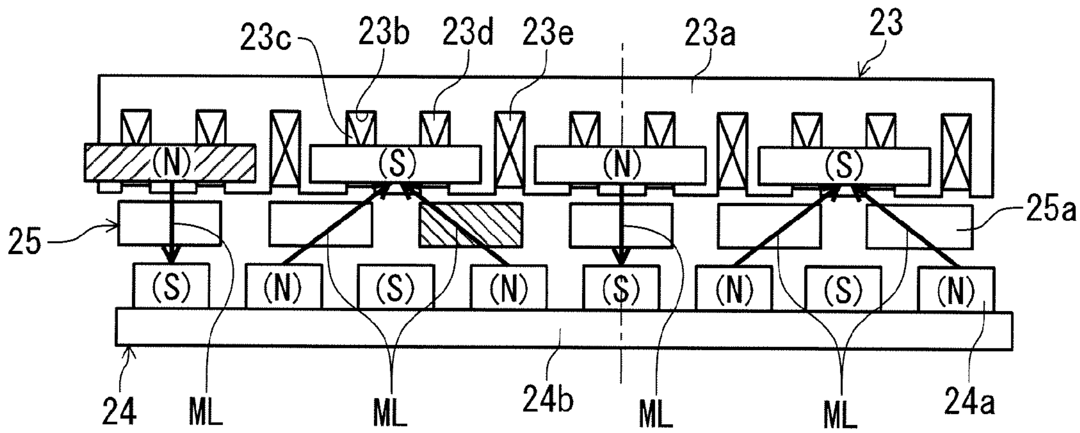
FIG. 10 is a diagram for explaining the positional relationship between first stator magnetic poles and cores in a case where the first stator magnetic poles have rotated through an electrical angle of 2π from the state shown in FIGS. 7(*a*) to 7(*c*).

FIG. 10 shows a state in which the first stator magnetic poles have rotated from the FIG. 7(*a*) state through an electrical angle of $2\pi$. As is apparent from a comparison between FIG. 10 and FIG. 7(*a*), it is understood that the cores 25*a* have rotated in the same direction through ⅓ of the rotational angle of the first stator magnetic poles. This agrees with the fact that by substituting ωER1=0 into the above-described equation (40), ωER2=ωMFR/3 is obtained.

Figure 11:
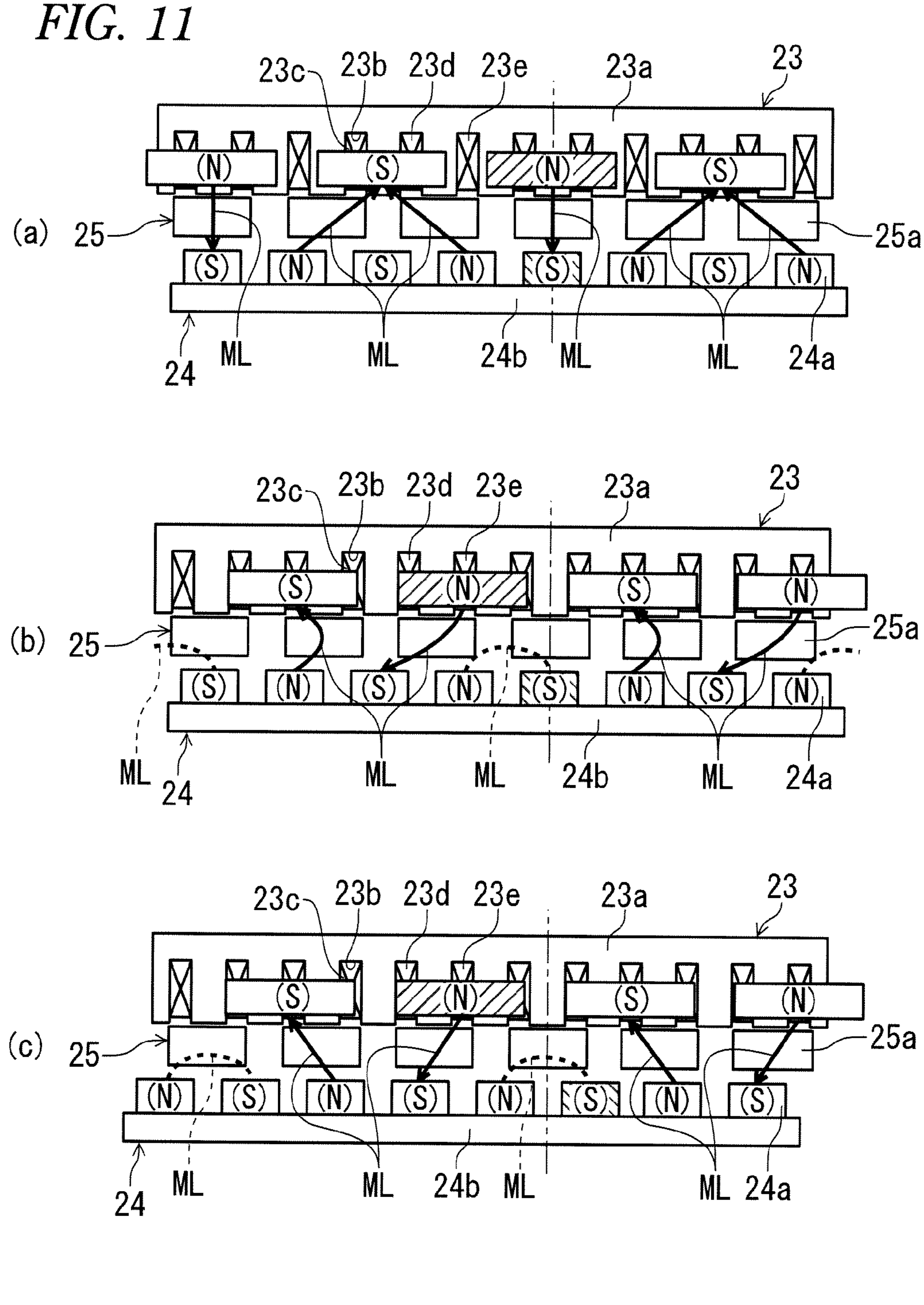
FIGS. 11(*a*) to 11(*c*) are diagrams for explaining the operation in a case where electric power is supplied to the stator in a state where the A2 rotor of the first rotating machine shown in FIG. 1 is held unrotatable.

Next, an operation in a case where electric power is supplied to the stator 23 in a state in which the A2 rotor 25 is held unrotatable will be described with reference to FIGS. 11(*a*) to 11(*c*) to FIGS. 13(*a*) and 13(*b*). It should be noted that in FIGS. 11(*a*) to 11(*c*) to FIGS. 13(*a*) and 13(*b*), one identical first stator magnetic pole and one identical permanent magnet 24*a* are indicated by hatching for ease of understanding. First, as shown in FIG. 11(*a*), similarly to the above-described case shown in FIG. 7(*a*), from a state where the center of a certain core 25*a* and the center of a certain permanent magnet 24*a* are circumferentially coincident with each other, and the center of the third core 25*a* from the certain core 25*a* and the center of the fourth permanent magnet 24*a* from the permanent magnet 24*a* are circumferentially coincident with each other, the first rotating magnetic field is generated such that it rotates leftward, as viewed in the figure. At the start of generation of the first rotating magnetic field, the positions of every two first stator magnetic poles alternately adjacent to each other that have the same polarity are caused to circumferentially coincide with the centers of the corresponding ones of the respective permanent magnets 24*a* having centers coincident with the centers of cores 25*a*, and the polarity of these first stator magnetic poles is made different from the polarity of the first magnetic poles of these permanent magnets 24*a*.

In the state shown in FIG. 11(*a*), similarly to the case shown in FIG. 7(*a*), magnetic force lines ML are generated in a manner of connecting the first stator magnetic poles, cores 25*a* and first magnetic poles the circumferential positions of which are coincident with each other, and at the same time in a manner of connecting first stator magnetic poles, cores 25*a* and first magnetic poles which are adjacent to the above-described first stator magnetic pole, core 25*a*, and first magnetic pole, on respective circumferentially opposite sides thereof. Moreover, in this state, since the magnetic force lines ML are straight, no magnetic forces for circumferentially rotating the permanent magnets 24*a* act on the permanent magnets 24*a*.

When the first stator magnetic poles rotate from the positions shown in FIG. 11(*a*) to the respective positions shown in FIG. 11(*b*) in accordance with rotation of the first rotating magnetic field, the magnetic force lines ML are bent, and accordingly magnetic forces act on the permanent magnets 24*a* in such a manner that the magnetic force lines ML are made straight. In this case, the permanent magnets 24*a* are each positioned forward of a line of extension from a first stator magnetic pole and a core 25*a* which are connected to each other by an associated one of the magnetic force lines ML, in the magnetic field rotation direction, and therefore the above-described magnetic forces act on the permanent magnets 24*a* such that each permanent magnet 24*a* is caused to be positioned on the extension line, that is, such that the permanent magnet 24*a* is driven in a direction opposite to the magnetic field rotation direction. The permanent magnets 24*a* are driven in a direction opposite to the magnetic field rotation direction by such action of the magnetic forces caused by the magnetic force lines ML, and rotate to the respective positions shown in FIG. 11(*c*). The A1 rotor 24 provided with the permanent magnets 24*a* also rotates in the direction opposite to the magnetic field rotation direction.

Figure 12:
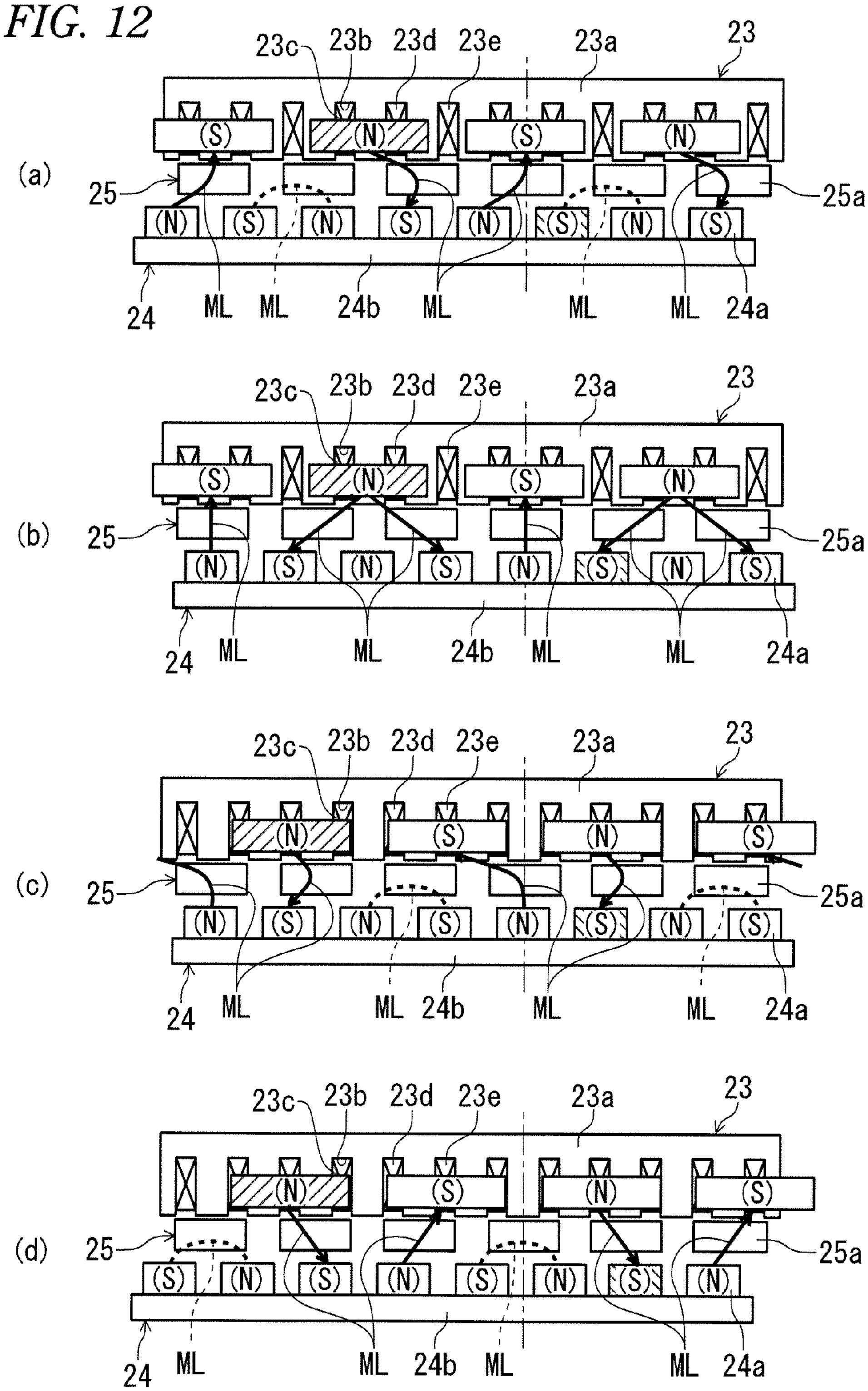
FIGS. 12(*a*) to 12(*d*) are diagrams for explaining a continuation of the operation shown in FIGS. 11(*a*) to 11(*c*).
Figure 13:
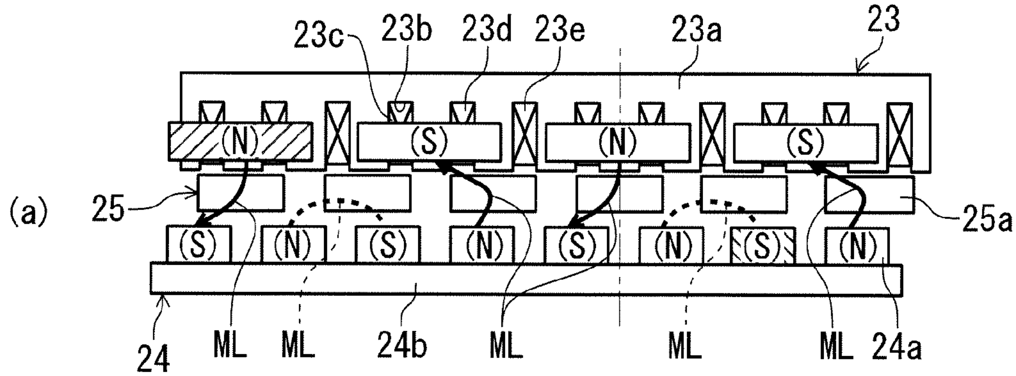
FIGS. 13(*a*) and 13(*b*) are diagrams for explaining a continuation of the operation shown in FIGS. 12(*a*) to 12(*d*).
Figure 13:
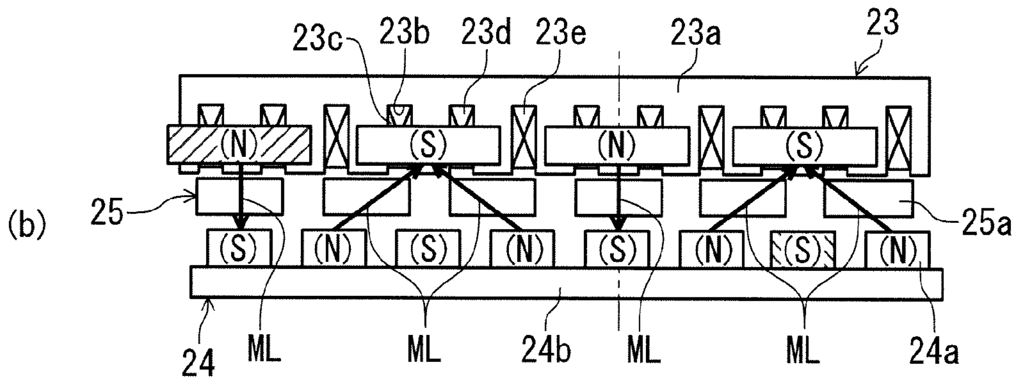

As the first rotating magnetic field rotates further, a sequence of the above-described operations, that is, the operations that "the magnetic force lines ML are bent and the permanent magnets 24*a* are each positioned forward of a line of extension from a first stator magnetic pole and a core 25*a* which are connected to each other by an associated one of the magnetic force lines ML, in the magnetic field rotation direction→the magnetic forces act on the permanent magnets 24*a* in such a manner that the magnetic force lines ML are made straight→the permanent magnets 24*a* and the A1 rotor 24 rotate in the direction opposite to the magnetic field rotation direction" are repeatedly performed as shown in FIGS. 12(*a*) to 12(*d*) and FIGS. 13(*a*) and 13(*b*). As described above, in the case where electric power is supplied to the stator 23 in the state of the A2 rotor 25 being held unrotatable, the above-described action of the magnetic forces caused by the magnetic force lines ML converts electric power supplied to the stator 23 to motive power, and outputs the motive power from the A1 rotor 24.

FIG. 13(*b*) shows a state in which the first stator magnetic poles have rotated from the FIG. 11(*a*) state through the electrical angle of 2π. As is apparent from a comparison between FIG. 13(*b*) and FIG. 11(*a*), it is understood that the permanent magnets 24*a* have rotated in the opposite direction through ½ of the rotational angle of the first stator magnetic poles. This agrees with the fact that by substituting ωER2=0 into the above-described equation (40), −ωER1=ωMFR/2 is obtained.

Figure 14:
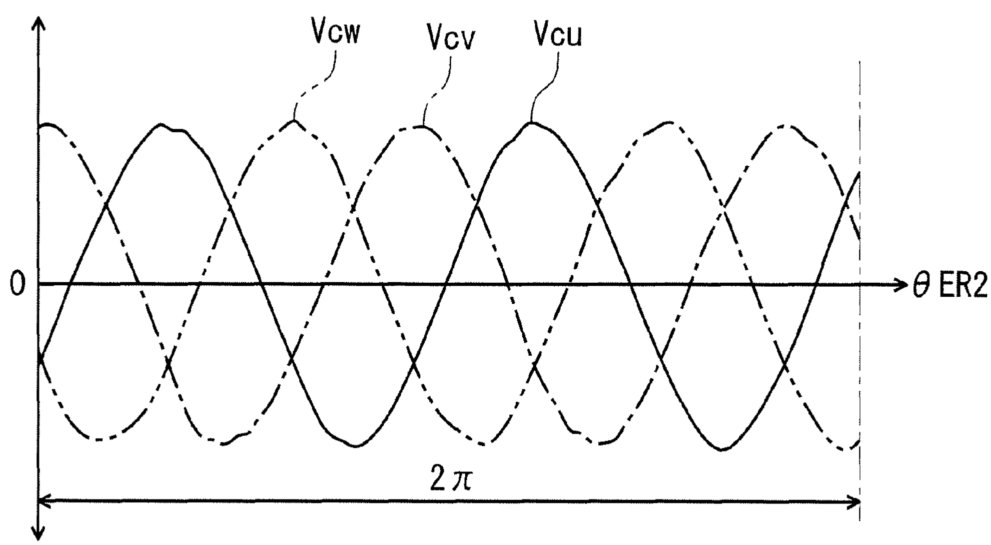
FIG. 14 is a diagram showing an example of changes in U-phase to W-phase back electromotive force voltages in a case where the A1 rotor of the first rotating machine is held unrotatable.
Figure 15:
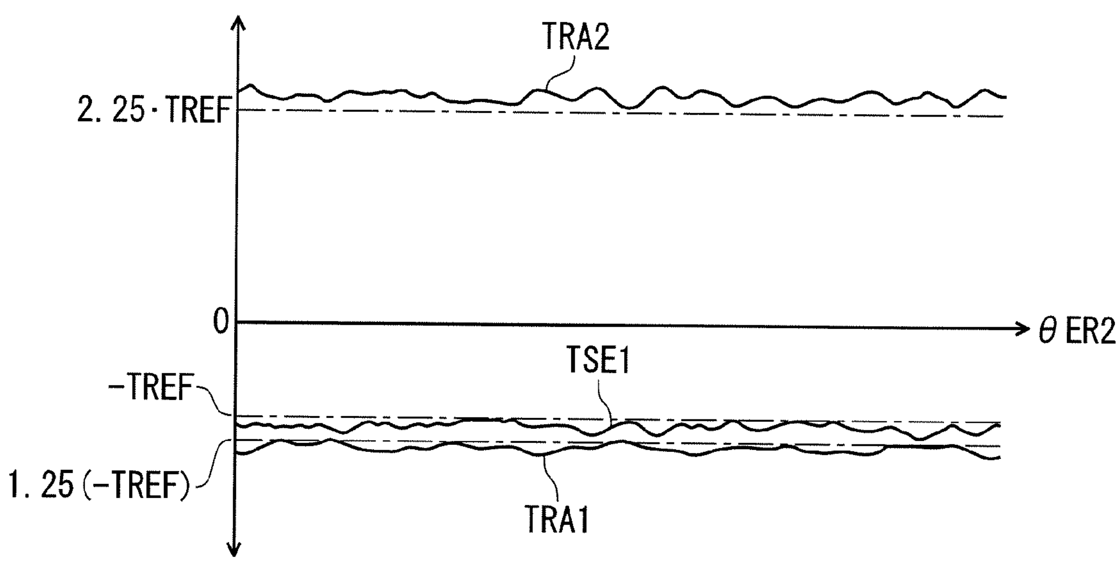
FIG. 15 is a diagram showing an example of changes in a first driving equivalent torque and A1 and A2 rotor-transmitted torques in a case where the A1 rotor of the first rotating machine is held unrotatable.

FIGS. 14 and 15 show the results of a simulation of control in which the numbers of the first stator magnetic poles, the cores 25*a*, and the permanent magnets 24*a* are set to 16, 18 and 20, respectively; the A1 rotor 24 is held unrotatable; and motive power is output from the A2 rotor 25 by supplying electric power to the stator 23. FIG. 14 shows an example of changes in the U-phase to W-phase back electromotive force voltages Vcu to Vcw during a time period over which the A2 rotor electrical angle θER2 changes from 0 to 2π.

In this case, due to the fact that the A1 rotor 24 is held unrotatable, and the fact that the pole pair numbers of the first stator magnetic poles and the first magnetic poles are equal to 8 and 10, respectively, and from the above-described equation (25), the relationship between the first magnetic field electrical angular velocity ωMFR and the A1 and A2 rotor electrical angular velocities ωER1 and ωER2 is expressed by ωMFR=2.25·ωER2. As shown in FIG. 14, during a time period over which the A2 rotor electrical angle θER2 changes from 0 to 2π, the U-phase to W-phase back electromotive force voltages Vcu to Vcw are generated over approximately 2.25 repetition periods thereof. Moreover, FIG. 14 shows changes in the U-phase to W-phase back electromotive force voltages Vcu to Vcw, as viewed from the A2 rotor 25. As shown in the figure, with the A2 rotor electrical angle θER2 as the horizontal axis, the back electromotive force voltages are arranged in the order of the W-phase back electromotive force voltage Vcw, the V-phase back electromotive force voltage Vcv, and the U-phase back electromotive force voltage Vcu. This indicates that the A2 rotor 25 rotates in the magnetic field rotation direction. The above simulation results shown in FIG. 14 agree with the relationship of ωMFR=2.25·ωER2, based on the above-described equation (25).

Moreover, FIG. 15 shows an example of changes in the first driving equivalent torque TSE1, and the A1 and A2 rotor-transmitted torques TRA1 and TRA2. In this case, due to the fact that the pole pair numbers of the first stator magnetic poles and the first magnetic poles are equal to 8 and 10, respectively, and from the above-described equation (32), the relationship between the first driving equivalent torque TSE1, and the A1 and A2 rotor-transmitted torques TRA1 and TRA2 is represented by TSE1=TRA1/1.25=−TRA2/2.25. As shown in FIG. 15, the first driving equivalent torque TSE1 is approximately equal to −TREF; the A1 rotor-transmitted torque TRA1 is approximately equal to 1.25·(−TREF); and the A2 rotor-transmitted torque TRA2 is approximately equal to 2.25·TREF. This TREF represents a predetermined torque value (for example, 200 Nm). The simulation results described above with reference to FIG. 15 agree with the relationship of TSE1=TRA1/1.25=−TRA2/2.25, based on the above-described equation (32).

Figure 16:
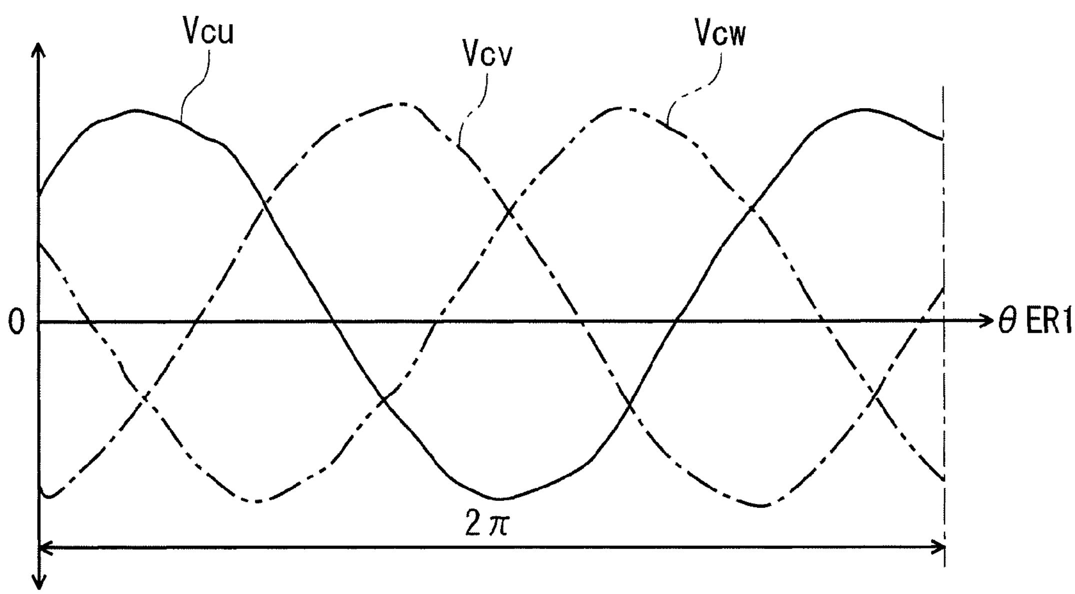
FIG. 16 is a diagram showing an example of changes in the U-phase to W-phase back electromotive force voltages in a case where the A2 rotor of the first rotating machine is held unrotatable.
Figure 17:
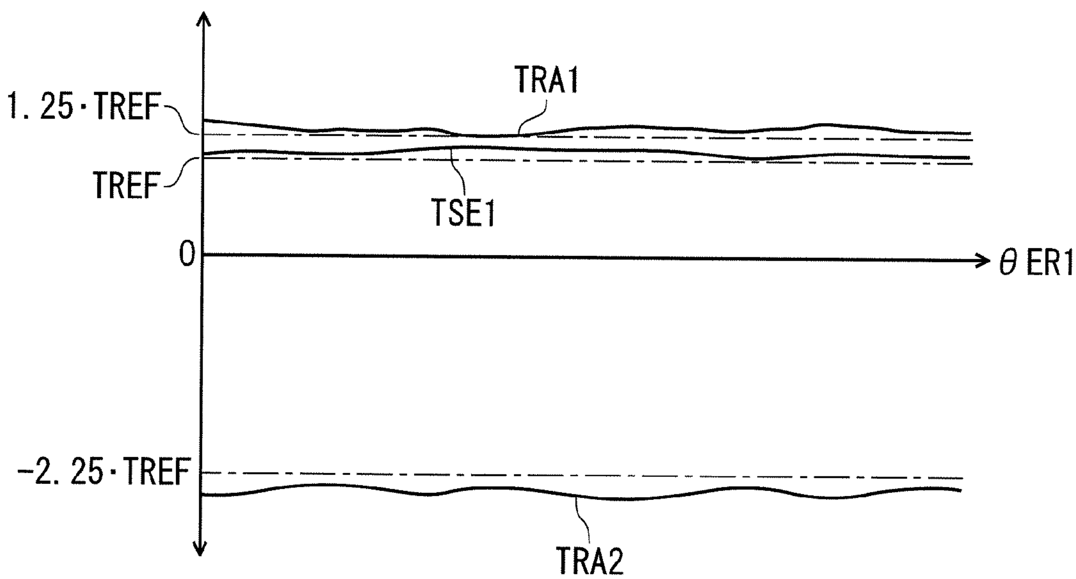
FIG. 17 is a diagram showing an example of changes in the first driving equivalent torque and the A1 and A2 rotor-transmitted torques in a case where the A2 rotor of the first rotating machine is held unrotatable.

FIGS. 16 and 17 show the results of a simulation of control in which the numbers of the first stator magnetic poles, the cores 25*a*, and the permanent magnets 24*a* are set in the same manner as in the cases shown in FIGS. 14 and 15; the A2 rotor 25 is held unrotatable in place of the A1 rotor 24; and motive power is output from the A1 rotor 24 by supplying electric power to the stator 23. FIG. 16 shows an example of changes in the U-phase to W-phase back electromotive force voltages Vcu to Vcw during a time period over which the A1 rotor electrical angle θER1 changes from 0 to 2π.

In this case, due to the fact that the A2 rotor 25 is held unrotatable, and the fact that the pole pair numbers of the first stator magnetic poles and the first magnetic poles are equal to 8 and 10, respectively, and from the above-described equation (25), the relationship between the magnetic field electrical angular velocity wMFR, and the A1 and A2 rotor electrical angular velocities ωER1 and ωER2 is expressed by ωMFR=−1.25·ωER1. As shown in FIG. 16, during a time period over which the A1 rotor electrical angle θER1 changes from 0 to 2π, the U-phase to W-phase back electromotive force voltages Vcu to Vcw are generated for approximately 1.25 repetition periods thereof. Moreover, FIG. 16 shows changes in the U-phase to W-phase back electromotive force voltages Vcu to Vcw, as viewed from the A1 rotor 24. As shown in the figure, with the A1 rotor electrical angle θER1 as the horizontal axis, the back electromotive force voltages are arranged in the order of the U-phase back electromotive force voltage Vcu, the V-phase back electromotive force voltage Vcv, and the W-phase back electromotive force voltage Vcw. This represents that the A1 rotor 24 rotates in the direction opposite to the magnetic field rotation direction. The simulation results described above with reference to FIG. 16 agree with the relationship of ωMFR=−1.25·ωER1, based on the above-described equation (25).

Moreover, FIG. 17 shows an example of changes in the first driving equivalent torque TSE1 and the A1 and A2 rotor-transmitted torques TRA1 and TRA2. Also in this case, similarly to the case of FIG. 15, the relationship between the first driving equivalent torque TSE1, and the A1 and A2 rotor-transmitted torques TRA1 and TRA2 is represented by TSE1=TRA1/1.25=−TRA2/2.25 from the above-described equation (32). As shown in FIG. 17, the first driving equivalent torque TSE1 is approximately equal to TREF; the A1 rotor-transmitted torque TRA1 is approximately equal to 1.25·TREF; and the A2 rotor-transmitted torque TRA2 is approximately equal to −2.25·TREF. The simulation results described above with reference to FIG. 17 agree with the relationship of TSE1=TRA1/1.25=−TRA2/2.25, based on the above-described equation (32).

As described above, in the first rotating machine 21, when the first rotating magnetic field is generated by supplying electric power to the stator 23, the above-described magnetic force lines ML are generated in a manner of connecting between the first magnetic poles, the cores 25*a* and the first stator magnetic poles, and the action of the magnetic forces caused by the magnetic force lines ML converts the electric power supplied to the stator 23 to motive power, and the motive power is output from the A1 rotor 24 or the A2 rotor 25. In this case, the relationship as expressed by the above-described equation (40) holds between the magnetic field electrical angular velocity ωMFR, and the A1 and A2 rotor electrical angular velocities ωER1 and ωER2, and the relationship as expressed by the above-described equation (41) holds between the first driving equivalent torque TSE1, and the A1 and A2 rotor-transmitted torques TRA1 and TRA2.

Therefore, by supplying motive power to at least one of the A1 and A2 rotors 34 and 35, without electric power being supplied to the stator 23, at least one rotor is caused to rotate with respect to the stator 23. This causes electric power to be generated by the stator 23, and generates a first rotating magnetic field. In this case as well, magnetic force lines ML are generated in a manner of connecting between the first magnetic poles, the cores 25a, and the first stator magnetic poles, and by the action of the magnetic forces caused by the magnetic force lines ML, the relationship of the electrical angular velocities shown in the equation (40) and the relationship of the torques shown in the equation (41) holds.

That is, assuming that a torque equivalent to the generated electric power and the first magnetic field electrical angular velocity ωMFR is a first electric power-generating equivalent torque TGE1, the relationship expressed by the equation (42) holds between this first electric power-generating equivalent torque TGE1, and the A1 and A2 rotor-transmitted torques TRA1 and TRA2.

$$TGE1=TRA1/\alpha=-TRA2/(\alpha+1)=TRA1/2=-TRA2/3 \quad (42)$$

Moreover, during supply of electric power to the stator 23 and during generation of electric power by the stator 23, the following equation (43) holds between the rotational speed of the first rotating magnetic field (hereinafter referred to as the "first magnetic field rotational speed VMF1"), and the rotational speeds of the A1 and A2 rotors 24 and 25 (hereinafter referred to as the "A1 rotor rotational speed VRA1" and the "A2 rotor rotational speed VRA2," respectively).

$$VMF1=(\alpha+1)VRA2-\alpha\cdot VRA1=3\cdot VRA2-2\cdot VRA1 \quad (43)$$

As is clear from the above, the first rotating machine 21 has the same functions as those of an apparatus formed by combining a planetary gear unit and a general one-rotor-type rotating machine.

<Second Rotating Machine 31>

Figure 18:
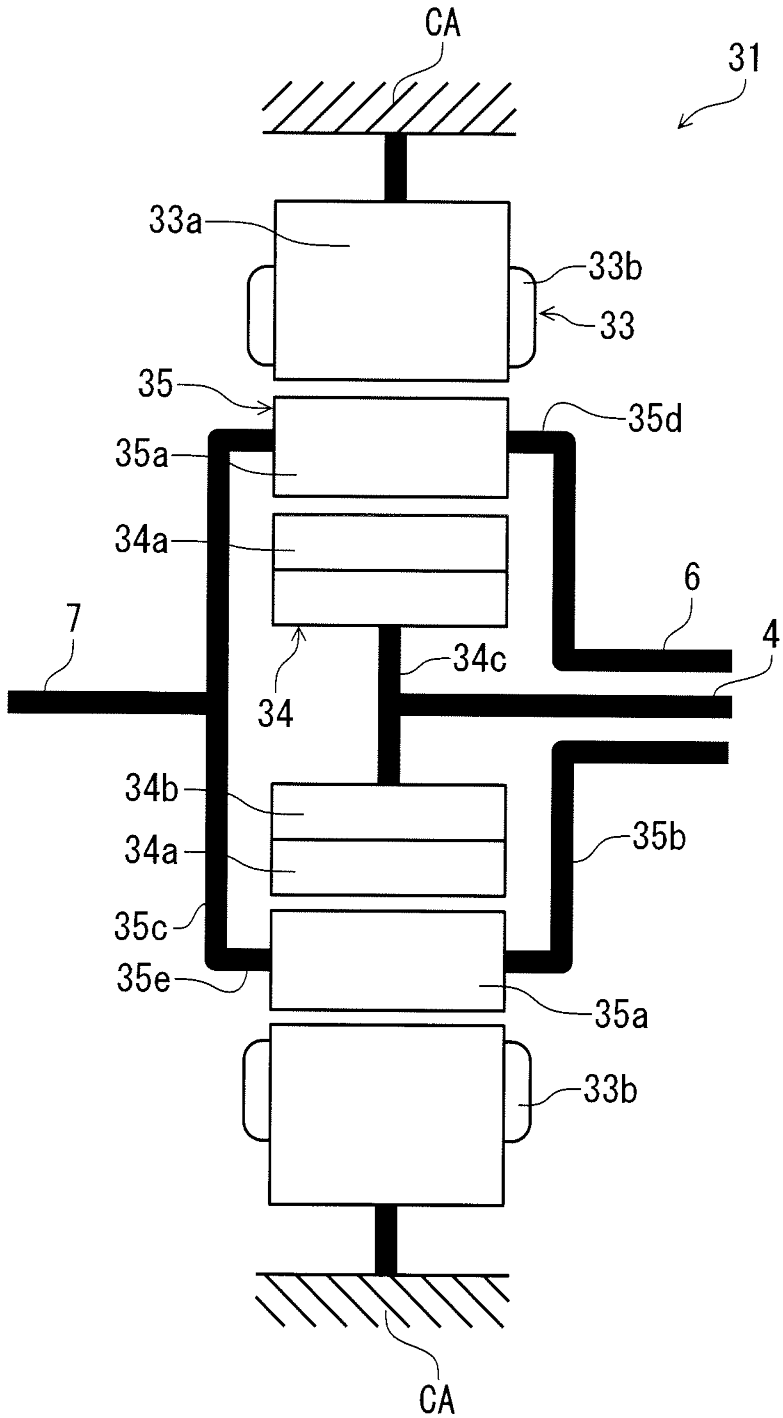
FIG. 18 is an enlarged cross-sectional view of the second rotating machine shown in FIG. 1.

The second rotating machine 31 is configured similarly to the first rotating machine 21, and a brief description will be given hereinafter of the construction and the operations thereof. As shown in FIGS. 1 and 18, the second rotating machine 31 includes a stator 33, a B1 rotor 34 disposed so as to be opposed to the stator 33, and a B2 rotor 35 disposed between the two 33 and 34. The stator 33, the B2 rotor 35, and the B1 rotor 34 are arranged concentrically with each other in the radial direction from outside in the mentioned order. In FIG. 18, similarly to the FIG. 3, some of the elements, such as the first rotating shaft 4 and the like, are shown in a skeleton diagram-like manner for the sake of convenience of illustration.

The above-described stator 33 is for generating a second rotating magnetic field. As shown in FIG. 18, the stator 33 includes an iron core 33a, and U-phase, V-phase and W-phase coils 33b provided on the iron core 33a. The iron core 33a, which has a hollow cylindrical shape formed by laminating a plurality of steel plates, extends in the axial direction, and is fixed to the casing CA. Moreover, twelve slots (not shown) are formed on the inner peripheral surface of the iron core 33a. These slots are arranged at equal intervals in the circumferential direction. The above-described U-phase to W-phase coils 33b are wound in the slots by distributed winding (wave winding), and are connected to the battery 43 through the second PDU 42 and the VCU 44 described above. Similarly to the first PDU 41, the second PDU 42 is implemented as an electric circuit including an inverter, and is connected to the first PDU 41 and the ECU 2 (see FIG. 1).

In the stator 33 configured as above, when electric power is supplied from the battery 43, to thereby cause electric currents to flow through the U-phase to W-phase coils 33b, or when electric power is generated, as described later, four magnetic poles are generated at respective ends of the iron core 33a close to the B1 rotor 34 at equal intervals in the circumferential direction, and the second rotating magnetic field generated by the magnetic poles rotates in the circumferential direction. Hereinafter, the magnetic poles generated on the iron core 33a will be referred to as the "second stator magnetic poles". Moreover, each two second stator magnetic poles which are adjacent to each other in the circumferential direction have different polarities.

The B1 rotor 34 includes a second magnetic pole row made up of eight permanent magnets 34a (only two of which are shown). These permanent magnets 34a are arranged at equal intervals in the circumferential direction, and the second magnetic pole row is opposed to the iron core 33a of the stator 33. Each permanent magnet 34a extends in the axial direction, and the length thereof in the axial direction is set to be the same as that of the iron core 33a of the stator 33.

Moreover, the permanent magnets 34a are attached to an outer peripheral surface of a ring-shaped fixed portion 34b. This fixed portion 34b is formed of a soft magnetic material, such as iron or a laminate of a plurality of steel plates, and has an inner peripheral surface thereof attached to the outer peripheral surface of a disk-shaped flange 34c. The flange 34c is integrally formed on the above-described first rotating shaft 4. Thus, the B1 rotor 34 including the permanent magnets 34a is rotatable integrally with the first rotating shaft 4. Moreover, the permanent magnets 34a are attached to the outer peripheral surface of the fixed portion 34b formed of the soft magnetic material, as described above, and hence a magnetic pole of (N) or (S) appears on an end of each permanent magnet 34a close to the stator 33. Moreover, each two permanent magnets 34a adjacent to each other in the circumferential direction have different polarities.

The B2 rotor 35 includes a second soft magnetic material element row made up of six cores 35a (only two of which are shown). These cores 35a are arranged at equal intervals in the circumferential direction, and the second soft magnetic material element row is disposed between the iron core 33a of the stator 33 and the magnetic pole row of the B1 rotor 34, in a manner of being spaced therefrom by respective predetermined distances. Each core 35a is formed of a soft magnetic material, such as a laminate of a plurality of steel plates, and extends in the axial direction. Moreover, similarly to the permanent magnet 34a, the length of the core 35a in the axial direction is set to be the same as that of the iron core 33a of the stator 33. Furthermore, the core 35a is attached to outer ends of disk-shaped flanges 35b and 35c with respective hollow cylindrical connecting portions 35d and 35e disposed therebetween. The connecting portions 35d and 35e slightly extend in the axial direction. These flanges 35b and 35c are integrally formed on the above-described connection shaft 6 and second rotating shaft 7, respectively. In this way, the B2 rotor 35 including the cores 35a is rotatable integrally with the connection shaft 6 and the second rotating shaft 7.

As described above, since the second rotating machine 31 is configured similarly to the first rotating machine 21, the second rotating machine 31 has the same functions as those of an apparatus formed by combining a planetary gear unit and a general one-rotor-type rotating machine. More specifically, during supply of electric power to the stator 33 and during generation of electric power, a relationship shown in the equation (25) holds between the electrical angular velocity of the second rotating magnetic field and the electrical angular velocities of the B1 and B2 rotors 34 and 35. Moreover, assuming that torque equivalent to the electric power supplied to the stator 33 and the electrical angular velocity of the second rotating magnetic field will be referred to as the "second driving equivalent torque," such a torque relationship as expressed by the equation (32) holds between the second driving equivalent torque and torques transmitted to the B1 and B2 rotors 34 and 35. Furthermore, assuming that torque equivalent to the electric power generated by the stator 33 and the electrical angular velocity of the second rotating magnetic field will be referred to as the "second electric power-generating equivalent torque," such a torque relationship as expressed by the equation (32) holds between the second electric power-generating equivalent torque and the torques transmitted to the B1 and B2 rotors 34 and 35.

Hereinafter, the operation of the second rotating machine 31 configured as above will be described. As described above, the second rotating machine 31 includes four second stator magnetic poles, eight magnetic poles of the permanent magnets 34*a* (hereinafter referred to as the "second magnetic poles"), and six cores 35*a*. That is, the ratio between the number of the second stator magnetic poles, the number of the second magnetic poles, and the number of the cores 35*a* is set to 1:2.0:(1+2.0)/2, similarly to the number of the first stator magnetic poles, the number of the first magnetic poles, and the number of the cores 25*a* of the first rotating machine 21. Moreover, the ratio of the number of pole pairs of the second magnetic poles to the number of pole pairs of the second stator magnetic poles (hereinafter referred to as the "second pole pair number ratio β") is set to 2.0, similarly to the first pole pair number ratio α. As described above, since the second rotating machine 31 is configured similarly to the first rotating machine 21, it has the same functions as those of the first rotating machine 21.

More specifically, the second rotating machine 31 converts electric power supplied to the stator 33 to motive power, for outputting the motive power from the B1 rotor 34 or the B2 rotor 35, and converts motive power input to the B1 rotor 34 and the B2 rotor 35 to electric power, for outputting the electric power from the stator 33. Moreover, during such input and output of electric power and motive power, the second rotating magnetic field and the B1 and B2 rotors 34 and 35 rotate while holding a collinear relationship with respect to the rotational speed, as shown in the equation (40). That is, in this case, between the rotational speed of the second rotating magnetic field (hereinafter referred to as the "second magnetic field rotational speed VMF2"), and the rotational speeds of the B1 and B2 rotors 34 and 35 (hereinafter referred to as the "B1 rotor rotational speed VRB1" and the "B2 rotor rotational speed VRB2," respectively), the following equation (44) holds.

$$VMF2=(\beta+1)VRB2-\beta VRB1=3\cdot VRB2-2\cdot VRB1 \quad (44)$$

Moreover, if torque equivalent to the electric power supplied to the stator 33 and the second rotating magnetic field will be referred to as the "second driving equivalent torque TSE2," the following equation (45) holds between the second driving equivalent torque TSE2, and torques transmitted to the B1 and B2 rotors 34 and 35 (hereinafter referred to as the "B1 rotor-transmitted torque TRB1" and the "B2 rotor-transmitted torque TRB2," respectively).

$$TSE2=TRB1/\beta=-TRB2/(\beta+1)=TRB1/2=-TRB2/3 \quad (45)$$

Furthermore, if torque equivalent to the electric power generated by the stator 33 and the second rotating magnetic field will be referred to as the "second electric power-generating equivalent torque TGE2," between the second electric power-generating equivalent torque TGE2 and the B1 and B2 rotor-transmitted torques TRB1 and TRB2, the following equation (46) holds.

$$TGE2=TRB1/\beta=-TRB2/(1+\beta)=TRB1/2=-TRB2/3 \quad (46)$$

As described above, similarly to the first rotating machine 21, the second rotating machine 31 has the same functions as those of an apparatus formed by combining a planetary gear unit and a general one-rotor-type rotating machine.

<ECU 2>

The ECU 2 controls the VCU 44 that steps up or down the output voltage of the battery 43 or the voltage charged into the battery 43. A voltage transformation ratio of the VCU 44 or the like is changed by the control of the VCU 44 by the ECU 2. Through the control of the first PDU 41, the ECU 2 controls the electric power supplied to the stator 23 of the first rotating machine 21 and the first magnetic field rotational speed VMF1 of the first rotating magnetic field generated by the stator 23 in accordance with the supply of electric power. Moreover, through the control of the first PDU 41, the ECU 2 controls the electric power generated by the stator 23 and the first magnetic field rotational speed VMF1 of the first rotating magnetic field generated by the stator 23 along with the electric power generation.

Through the control of the second PDU 42, the ECU 2 controls the electric power supplied to the stator 33 of the second rotating machine 31 and the second magnetic field rotational speed VMF2 of the second rotating magnetic field generated by the stator 33 along with the supply of electric power. Moreover, through the control of the second PDU 42, the ECU 2 controls the electric power generated by the stator 33 and the second magnetic field rotational speed VMF2 of the second rotating magnetic field generated by the stator 33 along with the electric power generation.

As described above, in the power unit 1, the crankshaft 3*a* of the engine 3, the A2 rotor 25 of the first rotating machine 21, and the B1 rotor 34 of the second rotating machine 31 are mechanically connected to each other through the first rotating shaft 4. Moreover, the A1 rotor 24 of the first rotating machine 21 and the B2 rotor 35 of the second rotating machine 31 are mechanically connected to each other through the connection shaft 6, and the B2 rotor 35 and the drive wheels DW and DW are mechanically connected to each other through the second rotating shaft 7 and the like. That is, the A1 rotor 24 and the B2 rotor 35 are mechanically connected to the drive wheels DW and DW. Moreover, the stator 23 of the first rotating machine 21 and the stator 33 of the second rotating machine 31 are electrically connected to each other through the first and second PDUs 41 and 42. Moreover, the battery 43 is electrically connected to the stators 23 and 33 through the VCU 44 and the first and second PDUs 41 and 42, respectively.

Figure 19:
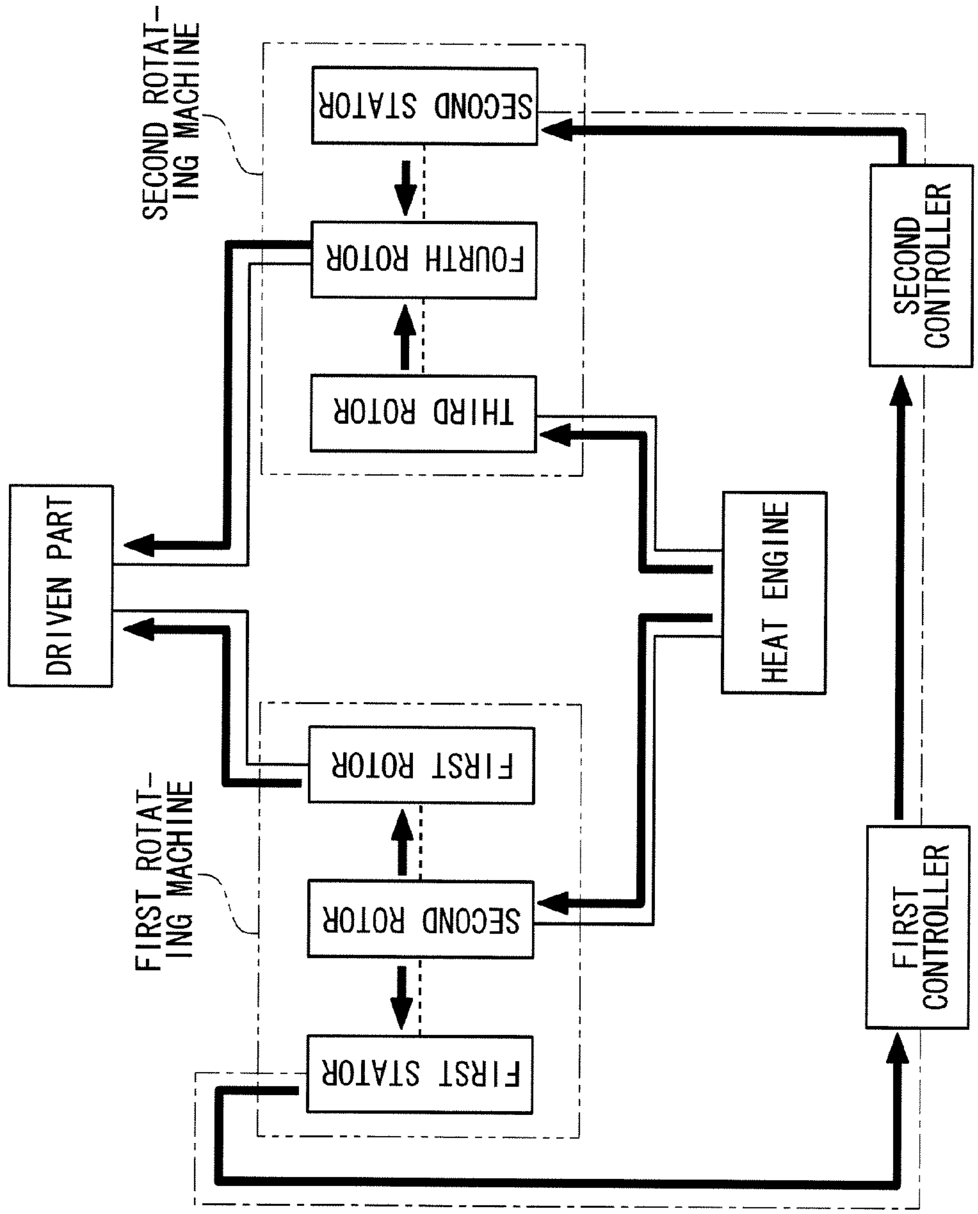
FIG. 19 is a diagram for explaining an example of an operation of a power unit including two rotating machines.

FIG. 19 is a conceptual diagram showing the general arrangement of the power unit 1 and an example of the state of transmission of motive power. It should be noted that in FIG. 19, the first rotating machine 21 is referred to as the "first rotating machine," the stator 23 to as the "first stator," the A1 rotor 24 to as the "first rotor," the A2 rotor 25 to as the "second rotor," the second rotating machine 31 to as the "second rotating machine," the stator 33 to as the "first stator," the B1 rotor 34 to as the "third rotor," the B2 rotor 35 to as the "fourth rotor," the engine 3 to as the "heat engine," the drive wheels DW and DW to as the "driven parts," the first PDU 41 to as the "first controller," and the second PDU 42" to as the "second controller," respectively. As shown in FIG. 19, the second rotor of the first rotating machine and the third rotor of the second rotating machine are mechanically connected to the output portion of the heat engine, and the first rotor of the first rotating machine and the fourth rotor of the second rotating machine are mechanically connected to the driven parts. Moreover, electrically connected to the first stator of the first rotating machine is the first controller for controlling electric power generated by the first stator and electric power supplied to the first stator, and electrically connected to the second stator of the second rotating machine is the second controller for controlling electric power generated by the second stator and electric power supplied to the second stator. The first and second stators are electrically connected to each other through the first and second controllers. It should be noted that in FIG. 19, the mechanical connections between the elements are indicated by solid lines, the electrical connections therebetween are indicated by one-dot chain lines, and magnetic connections therebetween are indicated by broken lines. Moreover, flows of motive power and electric power are indicated by thick lines with arrows.

With the arrangement described above, in the power unit 1, the motive power from the heat engine is transmitted to the driven parts, for example, in the following manner. When the motive power from the heat engine is transmitted to the driven parts, electric power is generated by the first stator of the first rotating machine using part of the motive power from the heat engine under the control of the first and second controllers, and the generated electric power is supplied to the second stator of the second rotating machine. During the electric power generation by the first rotating machine, as shown in FIG. 19, as part of the motive power from the heat engine is transmitted to the second rotor connected to the output portion of the heat engine, and is further transmitted to the first stator as electric power by the above-described magnetism of magnetic force lines, the part of the motive power from the heat engine is also transmitted to the first rotor by the magnetism of magnetic force lines. That is, the motive power from the heat engine transmitted to the second rotor is distributed to the first stator and the first rotor. Furthermore, the motive power distributed to the first rotor is transmitted to the driven parts, while the electric power distributed to the first stator is supplied to the second stator.

Furthermore, when the electric power generated by the first stator is supplied to the second stator as described above, this electric power is converted to motive power, and is then transmitted to the fourth rotor by the magnetism of magnetic force lines. In accordance with this, the remainder of the motive power from the heat engine is transmitted to the third rotor, and is further transmitted to the fourth rotor by the magnetism of magnetic force lines. Moreover, the motive power transmitted to the fourth rotor is transmitted to the driven parts. As a result, motive power equal in magnitude to the motive power from the heat engine is transmitted to the driven parts.

As described above, in the power unit 1 according to the present embodiment, the first and second rotating machines have the same functions as those of an apparatus formed by combining a planetary gear unit and a general one-rotor-type rotating machine, so that differently from the above-described conventional power unit, it is possible to dispense with the planetary gear unit for distributing and combining motive power for transmission. Therefore, it is possible to reduce the size of the power unit by the corresponding extent. Moreover, differently from the above-described conventional case, the motive power from the heat engine is transmitted to the driven parts without being recirculated, and hence it is possible to reduce motive power passing through the first and second rotating machines. In this way, it is possible to reduce the sizes and costs of the first and second rotating machines. As a result, it is possible to attain further reduction of the size and costs of the power unit. Moreover, the first and second rotating machines having torque capacity corresponding to reduced motive power, as described above, are used, whereby it is possible to suppress the loss of motive power to improve the driving efficiency of the power unit.

Moreover, the motive power from the heat engine is transmitted to the driven parts in a divided state through a total of three paths: a first transmission path formed by the second rotor, the magnetism of magnetic force lines and the first rotor, a second transmission path formed by the second rotor, the magnetism of magnetic force lines, the first stator, the first controller, the second controller, the second stator, the magnetism of magnetic force lines and the fourth rotor, and a third transmission path formed by the third rotor, the magnetism of magnetic force lines and the fourth rotor. In this way, it is possible to reduce electric power (energy) passing through the first and second controllers through the second transmission path, so that it is possible to reduce the sizes and costs of the first and second controllers. As a result, it is possible to attain further reduction of the size and costs of the power unit. Moreover, although in the third transmission path, the motive power from the heat engine is once converted to electric power, and is then converted back to motive power to be transmitted to the driven parts through a so-called electrical path, whereas in the first and second paths, the motive power is transmitted to the driven parts without being converted to electric power, in a non-contacting manner by the magnetism of magnetic force lines, through a so-called magnetic path, so that the first and second transmission paths are higher in transmission efficiency than the third transmission path.

Furthermore, when motive power is transmitted to the driven parts, as described above, by controlling the rotational speeds of the first and second rotating magnetic fields using the first and second controllers, respectively, it is possible to transmit the Motive power from the heat engine to the driven parts while changing the speed thereof. Hereinafter, this point will be described. In the first rotating machine, as is clear from the above-described functions, during distribution and combination of energy between the first stator and the first and second rotors, the first rotating magnetic field and the first and second rotors rotate while holding a collinear relationship with respect to the rotational speed, as shown in the equation (25). Moreover, in the second rotating machine, as is clear from the above-described functions, during distribution and combination of energy between the second stator and the third and fourth rotors, the second rotating magnetic field and the third and fourth rotors rotate while holding the collinear relationship with respect to the rotational speed, as shown in the equation (25).

Moreover, in the above-described connection relationship, when both the second and third rotors are directly connected to the output portion of the heat engine without passing through a transmission, such as a gear, the rotational speeds of the second and third rotors are both equal to the rotational speed of the output portion of the heat engine (hereinafter referred to as the "rotational speed of the heat engine"). Moreover, when both the first and fourth rotors are directly connected to the driven parts, the rotational speeds of the first and fourth rotors are both equal to the speed of the driven parts.

Hereinafter, it is assumed that the rotational speeds of the first to fourth rotors are the "first to fourth rotor rotational speeds VR1, VR2, VR3, and VR4," respectively, and the rotational speeds of the first and second rotating magnetic fields are the "first and second magnetic field rotational speeds VMF1 and VMF2," respectively. From the above-described relationship between the rotational speeds of the respective rotary elements, the relationship between these rotational speeds VR1 to VR4, VMF1 and VMF2 are indicated, for example, by thick solid lines in FIG. 20.

Figure 20:
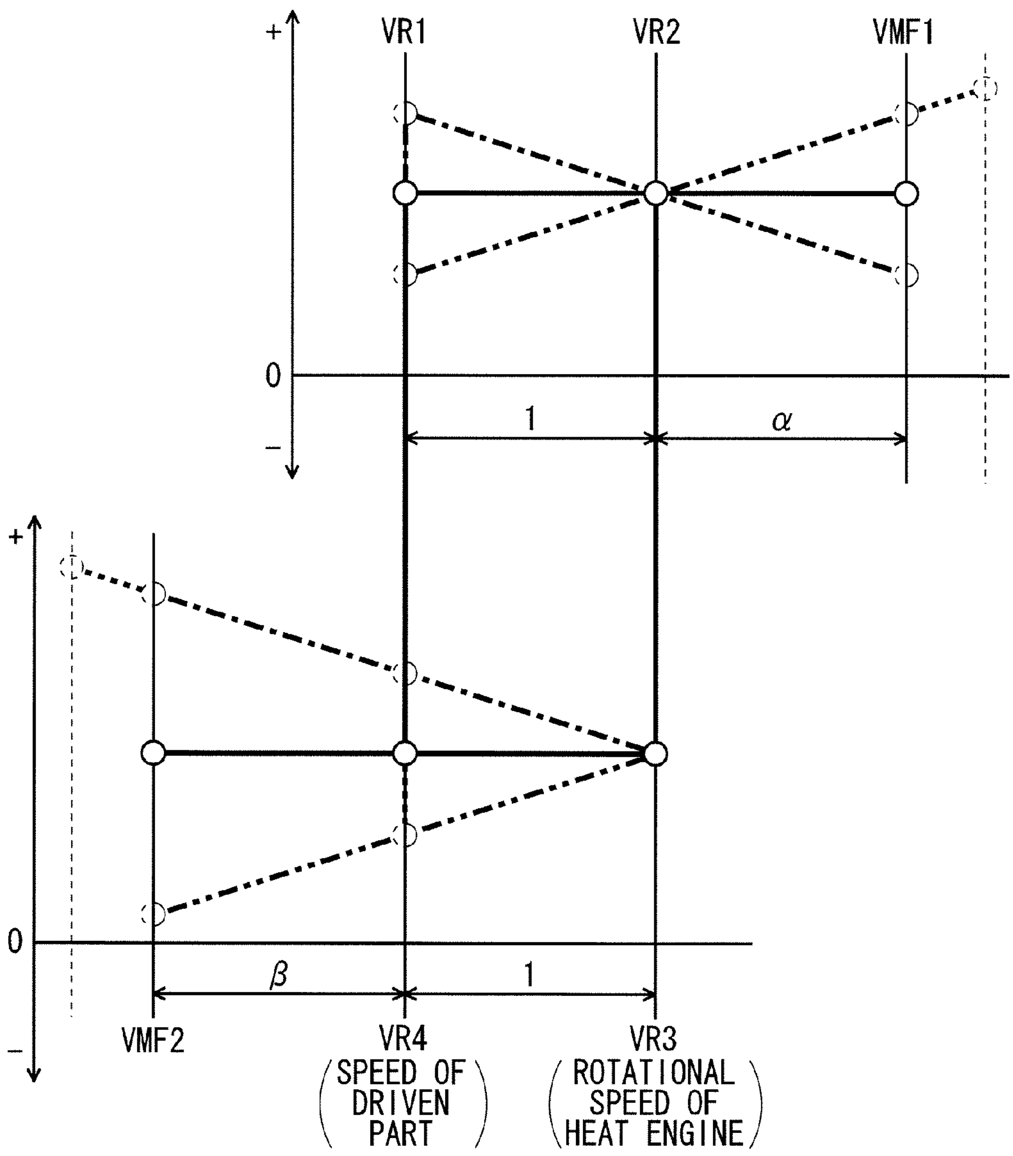
FIG. 20 is a diagram for explaining a speed-changing operation of the power unit shown in FIG. 19.

It should be noted that in FIG. 20, actually, vertical lines intersecting horizontal lines indicative of a value of 0 are for representing the rotational speeds of various rotary elements, and the distance between each white circle shown on the vertical lines and an associated one of the horizontal lines corresponds to the rotational speed of each rotary element, the reference numeral indicative of the rotational speed of each rotary element is shown at one end of each vertical line for the sake of convenience. Moreover, the direction of normal rotation and the direction of reverse rotation are represented by "+" and "−". Furthermore, in FIG. 20, β represents the ratio of the number of pole pairs of the second magnetic poles to the number of pole pairs of the second stator magnetic poles of the second rotating machine (hereinafter referred to as the "second pole pair number ratio β"). These also apply to other collinear charts described later.

Therefore, as indicated by two-dot chain lines in FIG. 20, for example, by increasing the first magnetic field rotational speed VMF1 and decreasing the second magnetic field rotational speed VMF2 with respect to the second and third rotor rotational speeds VR2 and VR3, it is possible to transmit the motive power from the heat engine to the driven parts while steplessly reducing the speed thereof. Conversely, as indicated by one-dot chain lines in the figure, by decreasing the first magnetic field rotational speed VMF1 and increasing the second magnetic field rotational speed VMF2 with respect to the second and third rotor rotational speeds VR2 and VR3, it is possible to transmit the motive power from the heat engine to the driven parts while steplessly increasing the speed thereof.

Moreover, when the first pole pair number ratio α of the first rotating machine is relatively large, if the rotational speed of the heat engine is higher than the speed of the driven parts (see the two-dot chain lines in FIG. 20), the first magnetic field rotational speed VMF1 becomes higher than the rotational speed of the heat engine and sometimes becomes too high. Therefore, by setting the first pole pair number ratio α to a smaller value, as is apparent from a comparison between the broken lines and the two-dot chain lines in the collinear chart in FIG. 20, the first magnetic field rotational speed VMF1 can be reduced, whereby it is possible to prevent the driving efficiency from being lowered by occurrence of loss caused by the first magnetic field rotational speed VMF1 becoming too high. Furthermore, when the second pole pair number ratio β of the second rotating machine is relatively large, if the speed of the driven parts is higher than the rotational speed of the heat engine (see the one-dot chain lines in FIG. 20), the second magnetic field rotational speed VMF2 becomes higher than the speed of the driven parts and sometimes becomes too high. Therefore, by setting the second pole pair number ratio β to a smaller value, as is apparent from a comparison between the broken lines and the one-dot chain lines in the collinear chart in FIG. 20, the second magnetic field rotational speed VMF2 can be reduced, whereby it is possible to prevent the driving efficiency from being lowered by occurrence of loss caused by the second magnetic field rotational speed VMF2 becoming too high.

Figure 21:
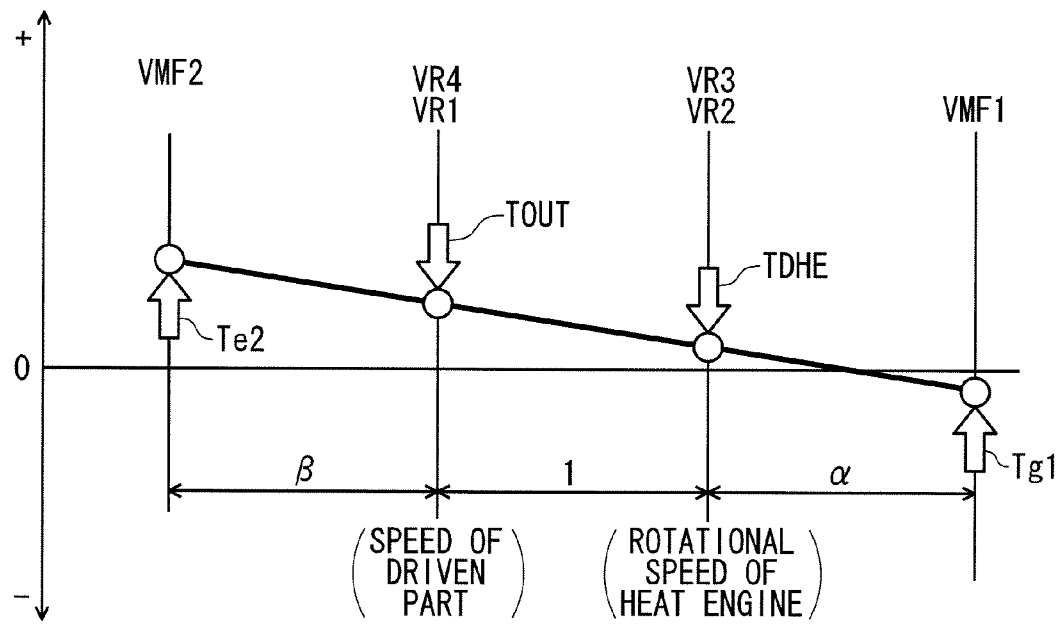
FIG. 21 is a diagram showing an example of the relationship between the rotational speeds and torques of various rotary elements of the power unit shown in FIG. 19 in a case where a heat engine is started during driving of driven parts by the first and second rotating machines.

Moreover, in the power unit, for example, by supplying electric power to the second stator of the second rotating machine and generating electric power by the first stator of the first rotating machine, it is possible to transmit the above-described second driving equivalent torque of the second rotating machine to the driven parts in a state where the output portion of the heat engine is stopped, using the first electric power-generating equivalent torque of the first rotating machine as a reaction force, and thereby drive the driven parts. Furthermore, during such driving of the driven parts, it is possible to start the internal combustion engine if the heat engine is an internal combustion engine. FIG. 21 shows the relationship between torques of various rotary elements in this case together with the relationship between the rotational speeds of the rotary elements. In the figure, TDHE represents torque transmitted to the output portion of the heat engine (hereinafter referred to as the "heat engine-transmitted torque"), and TOUT represents torque transmitted to the driven parts (hereinafter referred to as the "driven part-transmitted torque"). Moreover, Tg1 represents the first electric power-generating equivalent torque, and Te2 represents the second driving equivalent torque.

When the heat engine is started as described above, as is clear from FIG. 21, the second driving equivalent torque Te2 is transmitted to both the driven parts and the output portion of the heat engine using the first electric power-generating equivalent torque Tg1 as a reaction force, and hence the torque required of the first rotating machine becomes larger than otherwise. In this case, the torque required of the first rotating machine, that is, the first electric power-generating equivalent torque Tg1 is expressed by the following equation (47).

$$Tg1=-\{\beta\cdot TOUT+(\beta+1)TDHE\}/(\alpha+1+\beta) \quad (47)$$

As is apparent from the equation (47), as the first pole pair number ratio α is larger, the first electric power-generating equivalent torque Tg1 becomes smaller with respect to the driven part-transmitted torque TOUT and the heat engine-transmitted torque TDHE assuming that the respective magnitudes thereof are unchanged. Therefore, by setting the first pole pair number ratio α to a larger value, it is possible to further reduce the size and costs of the first rotating machine.

Figure 22:
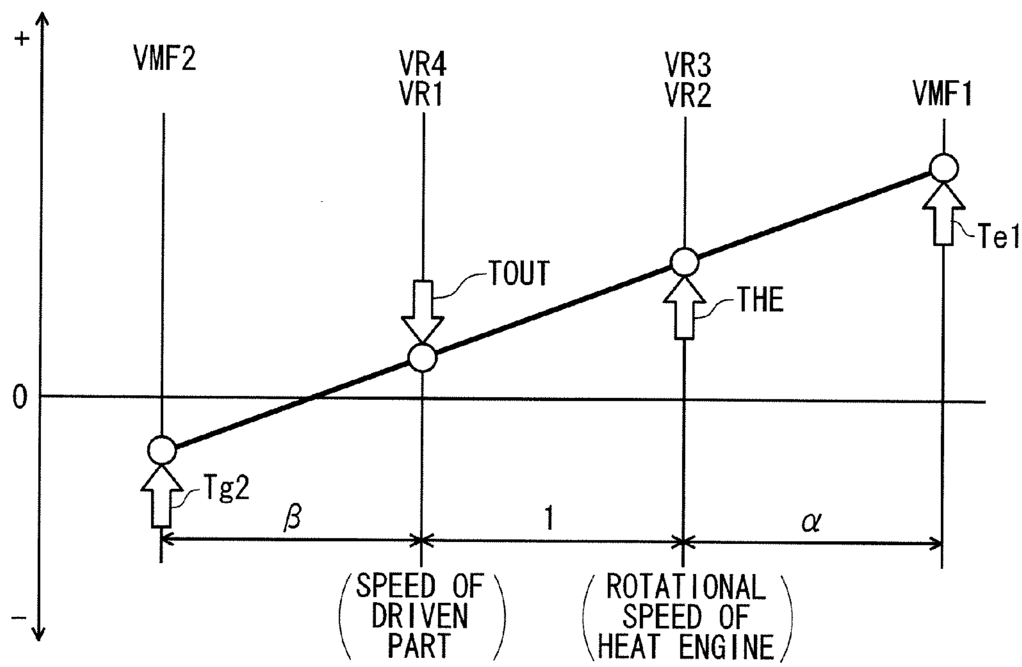
FIG. 22 is a diagram showing an example of the relationship between the rotational speeds and torques of various rotary elements of the power unit shown in FIG. 19 in a case where the speed of the driven parts is rapidly increased.

Moreover, in the power unit, the speed of the driven parts in a low-speed condition can be rapidly increased, for example, by controlling the heat engine and the first and second rotating machines in the following manner. FIG. 22 shows the relationship between the rotational speeds of various rotary elements at the start of such an operation for rapidly increasing the speed of the driven parts together with the relationship between the torques of various rotary elements. In the figure, THE represents torque of the heat engine, and Tg2 represents the second electric power-generating equivalent torque described above. In this case, the rotational speed of the heat engine is increased to such a predetermined rotational speed that the maximum torque thereof is obtained. As shown in FIG. 22, the speed of the driven parts is not immediately increased, and hence as the rotational speed of the heat engine becomes higher than the speed of the driven parts, the difference therebetween increases, whereby the direction of rotation of the second rotating magnetic field determined by the relationship between the rotational speed of the heat engine and the speed of the driven parts becomes the direction of reverse rotation. Therefore, in order to cause positive torque from the second stator that generates such a second rotating magnetic field, to act on the driven parts, the second stator performs electric power generation. Moreover, electric power generated by the second stator is supplied to the first stator and the first rotating magnetic field is caused to perform normal rotation.

As described above, the heat engine torque THE, the first driving equivalent torque Te1 and the second electric power-generating equivalent torque Tg2 are all transmitted to the driven parts as positive torque, which results in a rapid increase in the speed of the driven parts. Moreover, when the speed of the driven parts in a low-speed condition is rapidly increased as described above, as is apparent from FIG. 22, the heat engine torque THE and the first driving equivalent torque Te1 are transmitted to the driven parts using the second electric power-generating equivalent torque Tg2 as a reaction force, and hence the torque required of the second rotating machine becomes larger than in the other cases. In this case, the torque required of the second rotating machine, that is, the second electric power-generating equivalent torque Tg2 is expressed by the following equation (48).

$$Tg2=-\{\alpha\cdot THE+(1+\alpha)TOUT\}/(\beta+\alpha+1) \tag{48}$$

As is apparent from the equation (48), as the second pole pair number ratio β is larger, the second electric power-generating equivalent torque Tg2 becomes smaller with respect to the driven part-transmitted torque TOUT and the heat engine torque THE assuming that the respective magnitudes thereof are unchanged. Therefore, by setting the second pole pair number ratio β to a larger value, it is possible to further reduce the size and costs of the second rotating machine.

As shown in FIG. 2, a crank angle sensor 51 delivers a signal indicative of the detected crank angle position of the crankshaft 3*a* to the ECU 2. The ECU 2 calculates engine speed NE based on the crank angle position. Moreover, a first rotational angle sensor 52 and a second rotational angle sensor 53 are connected to the ECU 2. These first and second rotational angle sensors 52 and 53 detect the above-described A1 and A2 rotor rotational angles θA1 and θA2, respectively, and these detection signals are output to the ECU 2. The ECU 2 calculates the A1 and A2 rotor rotational speeds VRA1 and VRA2 based on the respective detected A1 and A2 rotor rotational angles θA1 and A2.

Moreover, a third rotational angle sensor 54 and a fourth rotational angle sensor 55 are connected to the ECU 2. The third rotational angle sensor 54 detects a rotational angle position of a specific permanent magnet 34*a* of the B1 rotor 34 (hereinafter referred to as the "B1 rotor rotational angle θB1") with respect to a specific U-phase coil 33*b* of the second rotating machine 31 (hereinafter referred to as the "second reference coil"), and delivers the detection signal to the ECU 2. The ECU 2 calculates the B1 rotor rotational speed VRB1 based on the detected B1 rotor rotational angle θB1. The above-described fourth rotational angle sensor 55 detects a rotational angle position of a specific core 35*a* of the B2 rotor 35 (hereinafter referred to as the "B2 rotor rotational angle θB2") with respect to the second reference coil, and delivers the detection signal to the ECU 2. The ECU 2 calculates the B2 rotor rotational speed VRB2 based on the detected B2 rotor rotational angle θB2.

Moreover, detection signals indicative of the current and voltage values input and output to and from the battery 43 are output from a current-voltage sensor 56 to the ECU 2. The ECU 2 calculates a charge state of the battery 43 based on these signals. Furthermore, a detection signal indicative of an accelerator pedal opening AP, which is a stepped-on amount of an accelerator pedal (not shown) of the vehicle is output from an accelerator pedal opening sensor 57 to the ECU 2, and a detection signal indicative of a vehicle speed VP is output from a vehicle speed sensor 58 to the ECU 2. It should be noted that the vehicle speed VP is the rotational speed of the drive wheels DW and DW.

The ECU 2 is implemented by a microcomputer including an I/O interface, a CPU, a RAM and a ROM, and controls the operations of the engine 3 and the first and second rotating machines 21 and 31 based on the detection signals from the above-described sensors 51 to 58. The ECU 2 reads data from a memory 45 storing various maps and the like necessary when performing the control. Moreover, the ECU 2 calculates the temperature of the battery 43 from a signal detected by a battery temperature sensor 62 attached to an outer covering of the battery 43 or the periphery thereof.

<Motive Power Control>

Figure 23:
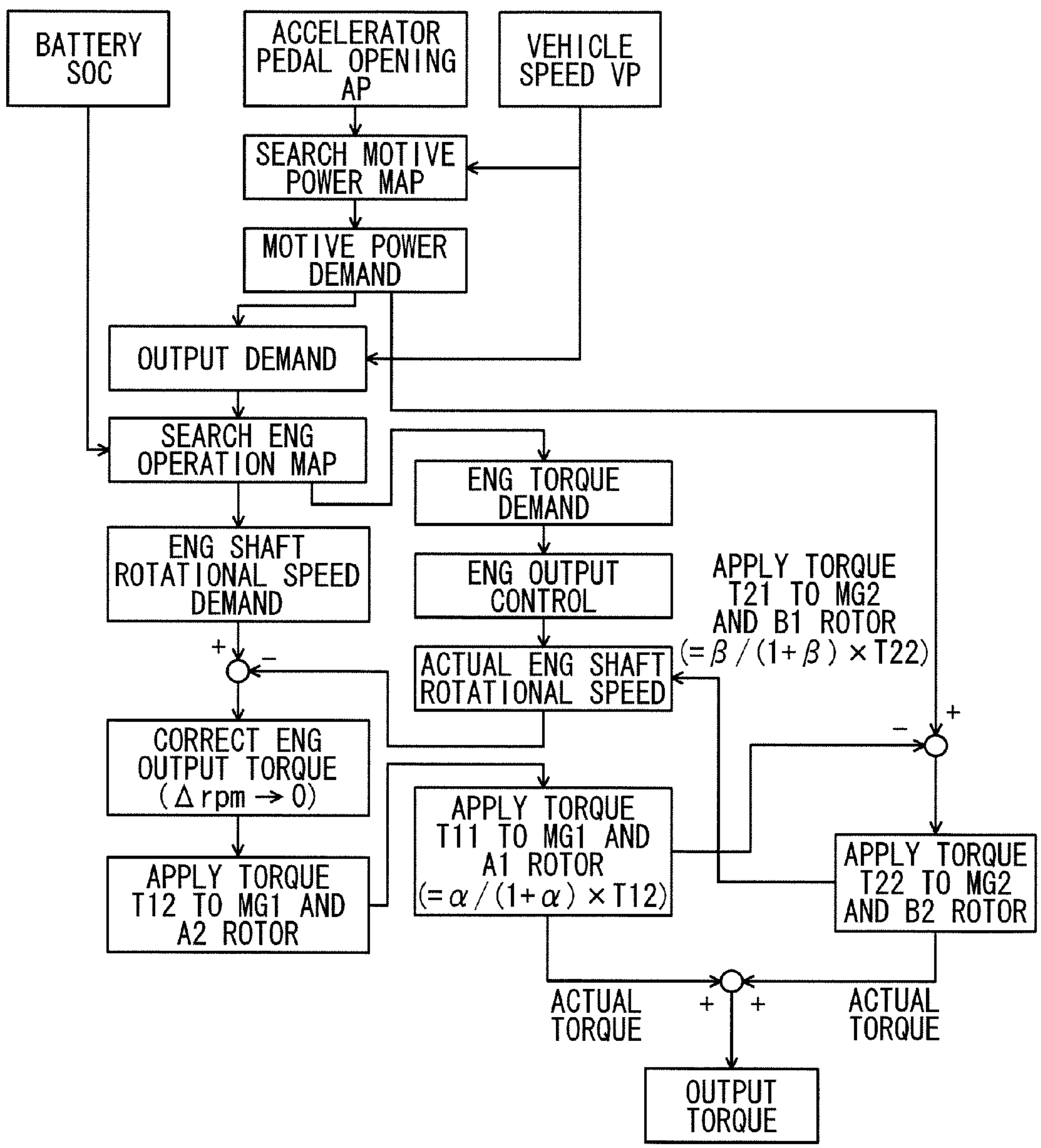
FIG. 23 is a block diagram showing motive power control in the power unit 1 shown in FIG. 1.
Figure 24:
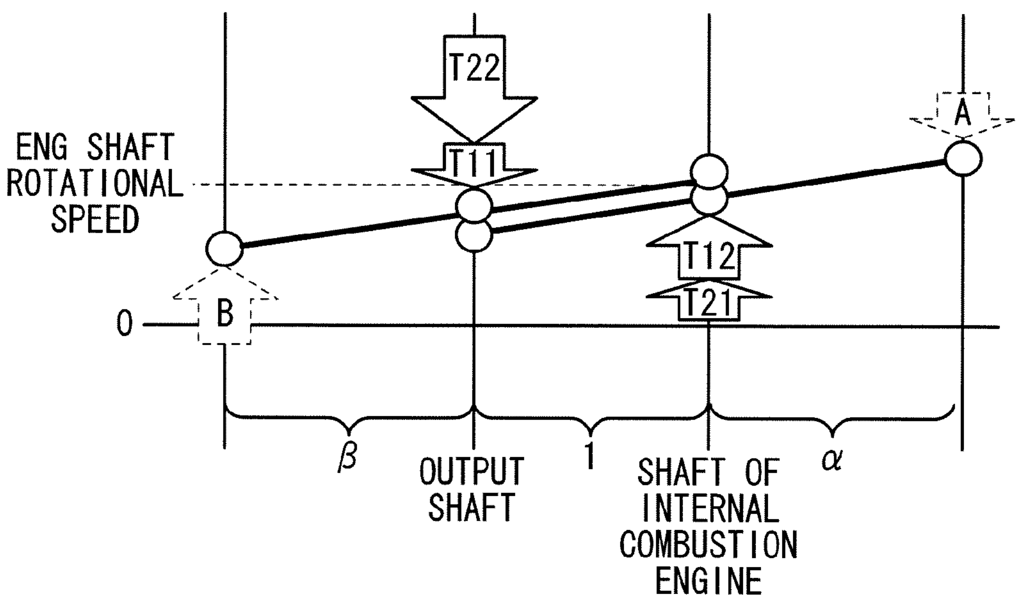
FIG. 24 is a collinear chart of the power unit 1 having a 1-common line 4-element structure.

Hereinafter, motive power control performed by the ECU 2 in the power unit 1 having the 1-common line 4-element structure described above will be described with reference to FIGS. 23 and 24. FIG. 23 is a block diagram showing motive power control in the power unit 1 of the first embodiment. FIG. 24 is a collinear chart in the power unit 1 having the 1-common line 4-element structure.

As shown in FIG. 23, the ECU 2 acquires a detection signal indicative of the aged negative plate AP and a detection signal indicative of the vehicle speed VP. Subsequently, the ECU 2 calculates a motive power (hereinafter referred to as a "motive power demand") corresponding to the accelerator pedal opening AP and the vehicle speed VP using a motive power map stored in the memory 45. Subsequently, the ECU 2 calculates an output (hereinafter referred to as a "output demand") corresponding to the motive power demand and the vehicle speed VP. The output demand is an output required for a vehicle to perform traveling according to an accelerator pedal operation of the driver.

Subsequently, the ECU 2 acquires information on a remaining capacity (SOC: State of Charge) of the battery 43 from the detection signal indicative of the current and voltage values input and output to and from the battery 43 described above. Subsequently, the ECU 2 determines the output ratio of the engine 3 to the output demand, corresponding to the SOC of the battery 43. Subsequently, the ECU 2 calculates an optimum operating point corresponding to the output of the engine 3 using an ENG operation map stored in the memory 45. The ENG operation map is a map based on BSFC (Brake Specific Fuel Consumption) indicative of a fuel consumption rate at each operating point corresponding to the relationship between the shaft rotational speed, torque, and output of the engine 3. Subsequently, the ECU 2 calculates a shaft rotational speed (hereinafter referred to as a "ENG shaft rotational speed demand") of the engine 3 at the optimum operating point. In addition, the ECU 2 calculates the torque (hereinafter referred to as the "ENG torque demand") of the engine 3 at the optimum operating point.

Subsequently, the ECU 2 controls the engine 3 so as to output the ENG torque demand. Subsequently, the ECU 2 detects the shaft rotational speed of the engine 3. The shaft rotational speed of the engine 3 detected at that time is referred to as an "actual ENG shaft rotational speed". Subsequently, the ECU 2 calculates a difference Δrpm between the ENG shaft rotational speed demand and the actual ENG shaft rotational speed. The ECU 2 controls the output torque of the first rotating machine 21 so that the difference Δrpm approaches 0. The control is performed when the stator 23 of the first rotating machine 21 regenerates electric power. As a result, the torque T12 shown in the collinear chart of FIG. 24 is applied to the A2 rotor 25 of the first rotating machine 21 (MG1).

The torque T12 is applied to the A2 rotor 25 of the first rotating machine 21, whereby the torque T11 is generated in the A1 rotor 24 of the first rotating machine 21 (MG1). The torque T11 is calculated by the following equation (49).

$$T11=\alpha/(1+\alpha)\times T12 \tag{49}$$

Moreover, electric energy (regenerative energy) generated by the electric power regenerated by the stator 23 of the first rotating machine 21 is delivered to the first PDU 41. In the collinear chart of FIG. 24, the regenerative energy generated by the stator 23 of the first rotating machine 21 is indicated by dotted lines A.

Subsequently, the ECU 2 controls the second PDU 42 so that the torque obtained by subtracting the calculated torque T11 from the motive power demand calculated previously is applied to the B2 rotor 35 of the second rotating machine 31. As a result, the torque T22 is applied to the B2 rotor 35 of the second rotating machine 31 (MG2). The collinear chart of FIG. 24 shows a case where electric energy is supplied to the stator 33 of the second rotating machine 31, and the electric energy at that time is indicated by dotted lines B. In this case, when supplying electric energy to the second rotating machine 31, regenerative energy obtained by the electric power regenerated by the first rotating machine 21 may be used.

As described above, the torque T11 is applied to the A1 rotor 24 of the first rotating machine 21, and the torque T22 is applied to the B2 rotor 35 of the second rotating machine 31. The A1 rotor 24 of the first rotating machine 21 is connected to the connection shaft 6, and the B2 rotor 35 of the second rotating machine 31 is connected to the second rotating shaft 7. Therefore, the sum of the torque T11 and the torque T22 is applied to the drive wheels DW and DW.

When the torque T22 is applied to the B2 rotor 35 of the second rotating machine 31, the torque T21 is generated in the B1 rotor 34 of the second rotating machine 31 (MG2). The torque T21 is expressed by the following equation (50).

$$T21=\beta/(1+\beta)\times T22 \quad (50)$$

Since the B1 rotor 34 of the second rotating machine 31 is connected to the shaft of the engine 3, the actual ENG shaft rotational speed of the engine 3 is influenced by the torque T21. However, even when the actual ENG shaft rotational speed changes, the ECU 2 controls the output torque of the first rotating machine 21 so that the difference Δrpm approaches 0. The torque T12 is changed by the control, and the torque T11 generated in the A1 rotor 24 of the first rotating machine 21 also changes. Thus, the ECU 2 changes the torque T22 applied to the B2 rotor 35 of the second rotating machine 31. In this case, the torque T21 generated due to the changed torque T22 also changes. As described above, the torques applied to the B1 rotor 34 and the B2 rotor 35 of the second rotating machine 31 and the A1 rotor 24 and the A2 rotor 25 of the first rotating machine 21 circulate (T12→T11→T22→T21), and the respective torques converge.

As described above, the ECU 2 controls the torque generated in the A2 rotor 25 of the first rotating machine 21 so that the engine 3 operates at the optimum operating point, and controls the torque generated in the B2 rotor 35 of the second rotating machine 31 so that the motive power demand is transmitted to the drive wheels DW and DW.

In the above description, although the vehicle speed VP is used when calculating the motive power demand and the output demand, information on the rotational speed of an axle may be used in place of the vehicle speed VP.

<Operation of Power Unit 1 in Respective Operation Modes>

Figure 25:
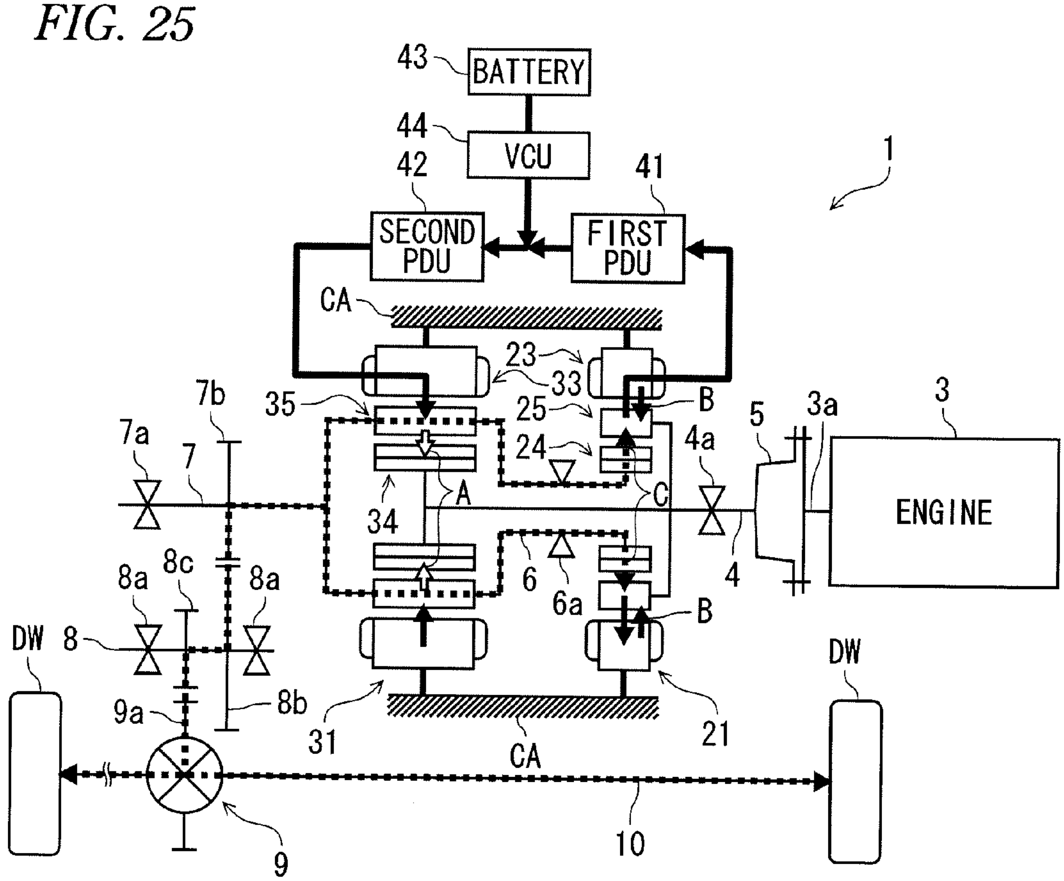
FIG. 25 is a diagram showing a state of transmission of torque in the power unit shown in FIG. 1 during EV creep.

Next, the operation of the power unit 1 performed under the control of the ECU 2 will be described. Operation modes of the power unit 1 include EV creep, EV start, ENG start during EV traveling, ENG traveling, deceleration regeneration, ENG start during stoppage of the vehicle, ENG creep, ENG-based start, EV-based rearward start, and ENG-based rearward start. Hereinafter, these operation modes will be described in order from the EV creep with reference to figures, such as FIG. 25, showing states of transmission of torque, and collinear charts, such as FIGS. 26(*a*) and 26(*b*), showing the relationship between rotational speeds of various rotary elements. Before the description of the operation modes, these collinear charts will be explained.

As is apparent from the above-described connection relationship, the engine speed NE, the A2 rotor rotational speed VRA2 and the B1 rotor rotational speed VRB1 are equal to each other. Moreover, the A1 rotor rotational speed VRA1 and the B2 rotor rotational speed VRB2 are equal to each other, and the vehicle speed VP is equal to the A1 rotor rotational speed VRA1 and the B2 rotor rotational speed VRB2, assuming that there is no change in speed by the differential gear mechanism 9 and the like. Due to the above fact and from the above-described equations (43) and (54), the relationship between the engine speed NE, the vehicle speed VP, the first magnetic field rotational speed VMF1, the A1 rotor rotational speed VRA1, the A2 rotor rotational speed VRA2, the second magnetic field rotational speed VMF2, the B1 rotor rotational speed VRB1, and the B2 rotor rotational speed VRB2 is shown by each of the collinear charts shown in FIGS. 26(*a*) and 26(*b*) and the like. It should be noted that in these collinear charts, the first and second pole pair number ratios α and β are both equal to 2.0, as described above. Moreover, in the following description of the operation modes, as to all the rotary elements of the power unit 1, rotation in the same direction as the direction of normal rotation of the crankshaft 3*a* of the engine 3 will be referred to as "normal rotation," and rotation in the same direction as the direction of reverse rotation of the crankshaft 3*a* will be referred to as "reverse rotation".

<EV Creep>

The EV creep is an operation mode for performing a creep operation of the vehicle using the first and second rotating machines 21 and 31 in a state where the engine 3 is stopped. Specifically, electric power is supplied from the battery 43 to the stator 33 of the second rotating machine 31, and the second rotating magnetic field generated by the stator 33 in accordance with the supply of electric power is caused to perform normal rotation. Moreover, electric power is generated by the stator 23 of the first rotating machine 21 using motive power transmitted to the A1 rotor 24 of the first rotating machine 21, as described later, and the generated electric power is further supplied to the stator 33.

Figure 26:
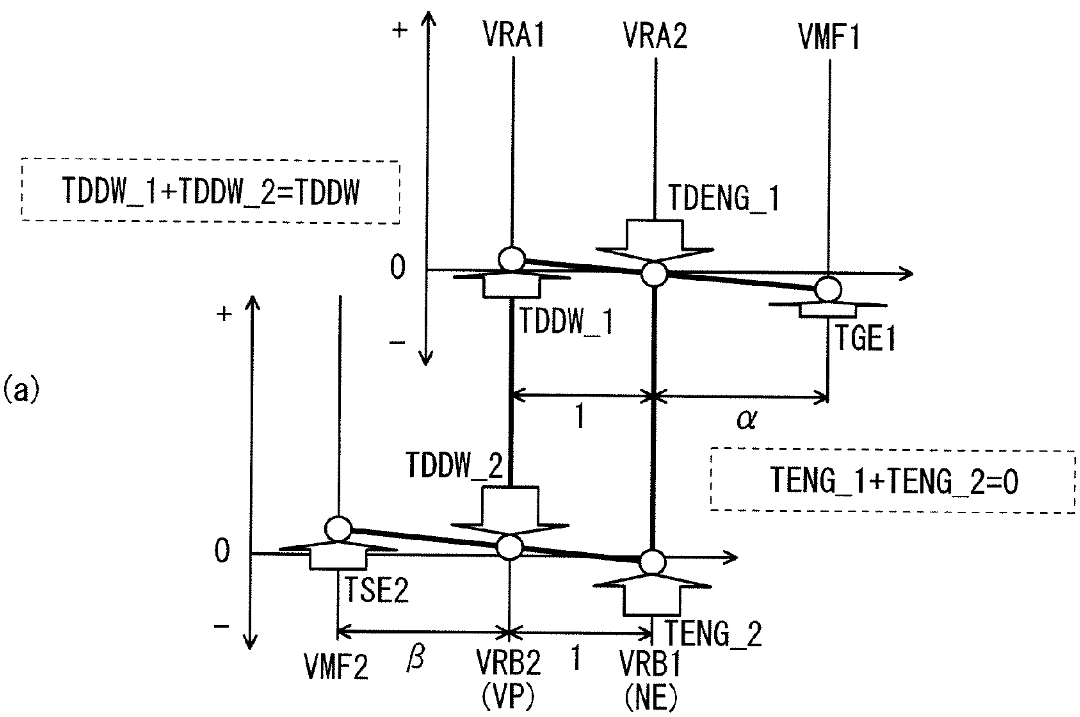
FIG. 26(*a*) shows collinear charts of the first and second rotating machines 21 and 31 during EV creep of the power unit shown in FIG. 1, and FIG. 26(*b*) shows a combined collinear chart obtained by combining two collinear charts.
Figure 26:
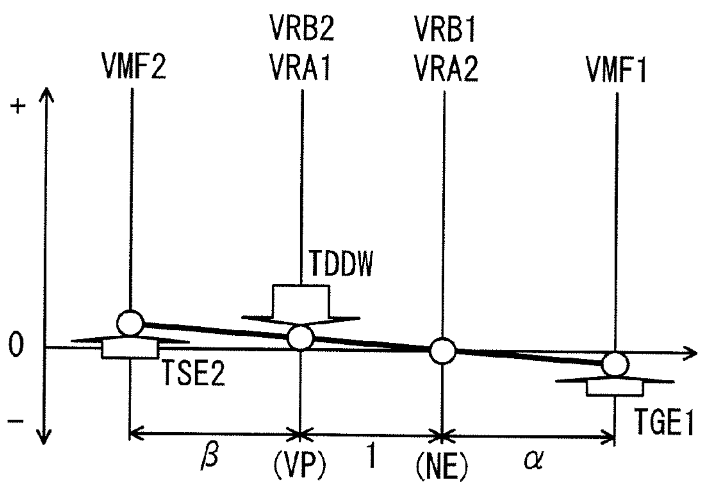

FIG. 25 shows a state of transmission of torque during the above-described EV creep. FIG. 26(*a*) shows examples of collinear charts of the first and second rotating machines 21 and 31 during the EV creep, and FIG. 26(*b*) shows a combined collinear chart obtained by combining the two collinear charts shown in FIG. 26(*a*). Moreover, in FIG. 25 and other figures described later, which show states of transmission of torque, thick broken or solid lines with arrows indicate flows of torque. Moreover, black-filled arrows and hollow arrows show torques acting in the direction of normal rotation and in the direction of reverse rotation, respectively. Moreover, it is assumed that although in the stators 23 and 33, actually, torque is transmitted in the form of electric energy, in FIG. 25 and other figures showing states of transmission of torque described later, the input and output of energy to and from the stators 23 and 33 is indicated by hatching added to the flow of torque, for the sake of convenience. Furthermore, in FIGS. 26(*a*) and 26(*b*) and other collinear charts described later, it is assumed that the direction of normal rotation is indicated by "+," and the direction of reverse rotation is indicated by "−".

As shown in FIG. 25, during the EV creep, as electric power is supplied to the stator 33 of the second rotating machine 31, the second driving equivalent torque TSE2 from the stator 33 acts on the B2 rotor 35 so as to cause the B2 rotor 35 to perform normal rotation, and as indicated by arrows A, acts on the B1 rotor 34 so as to cause the B1 rotor 34 to perform reverse rotation. Moreover, part of the torque transmitted to the B2 rotor 35 is transmitted to the drive wheels DW and DW through the second rotating shaft 7, the differential gear mechanism 9, and the like, whereby the drive wheels DW and DW perform normal rotation.

Furthermore, during the EV creep, the remainder of the torque transmitted to the B2 rotor 35 is transmitted to the A1 rotor 24 through the connection shaft 6, and is then transmitted to the stator 23 of the first rotating machine 21 as electric energy along with the electric power generation by the stator 23. Moreover, as shown in FIGS. 26(*a*) and 26(*b*), the first rotating magnetic field generated along with the electric power generation by the stator 23 performs reverse rotation. As a result, as indicated by arrows B in FIG. 25, the first electric power-generating equivalent torque TGE1 generated along with the electric power generation by the stator 23 acts on the A2 rotor 25 to cause the A2 rotor 25 to perform normal rotation. Moreover, the torque transmitted to the A1 rotor 24 such that it is balanced with the first electric power-generating equivalent torque TGE1 is further transmitted to the A2 rotor 25 (as indicated by arrows C), thereby acting on the A2 rotor 25 to cause the A2 rotor 25 to perform normal rotation.

In this case, the electric power supplied to the stator 33 and the electric power generated by the stator 23 are controlled such that the above-described torque indicated by the arrows A, which causes the B1 rotor 34 to perform reverse rotation, and the torques indicated by the arrows B and C, which cause the A2 rotor 25 to perform normal rotation, are balanced with each other, whereby the A2 rotor 25, the B1 rotor 34 and the crankshaft 3*a*, which are connected to each other, are held stationary. As a consequence, as shown in FIGS. 26(*a*) and 26(*b*), during the EV creep, the A2 and B1 rotor rotational speeds VRA2 and VRB1 become equal to 0, and the engine speed NE as well becomes equal to 0.

Moreover, during the EV creep, the electric power supplied to the stator 33 of the second rotating machine 31, the electric power generated by the stator 23 of the first rotating machine 21, and the first and second magnetic field rotational speeds VMF1 and VMF2 are controlled such that the relationships between the rotational speeds expressed by the above-described equations (43) and (44) are maintained, and at the same time, the A1 and B2 rotor rotational speeds VRA1 and VRB2 become very small (see FIGS. 26(*a*) and 26(*b*)). From the above, the creep operation with a very low vehicle speed VP is carried out. As described above, it is possible to perform the creep operation using the driving forces of the first and second rotating machines 21 and 31 in a state in which the engine 3 is stopped.

<EV Start>

Figure 27:
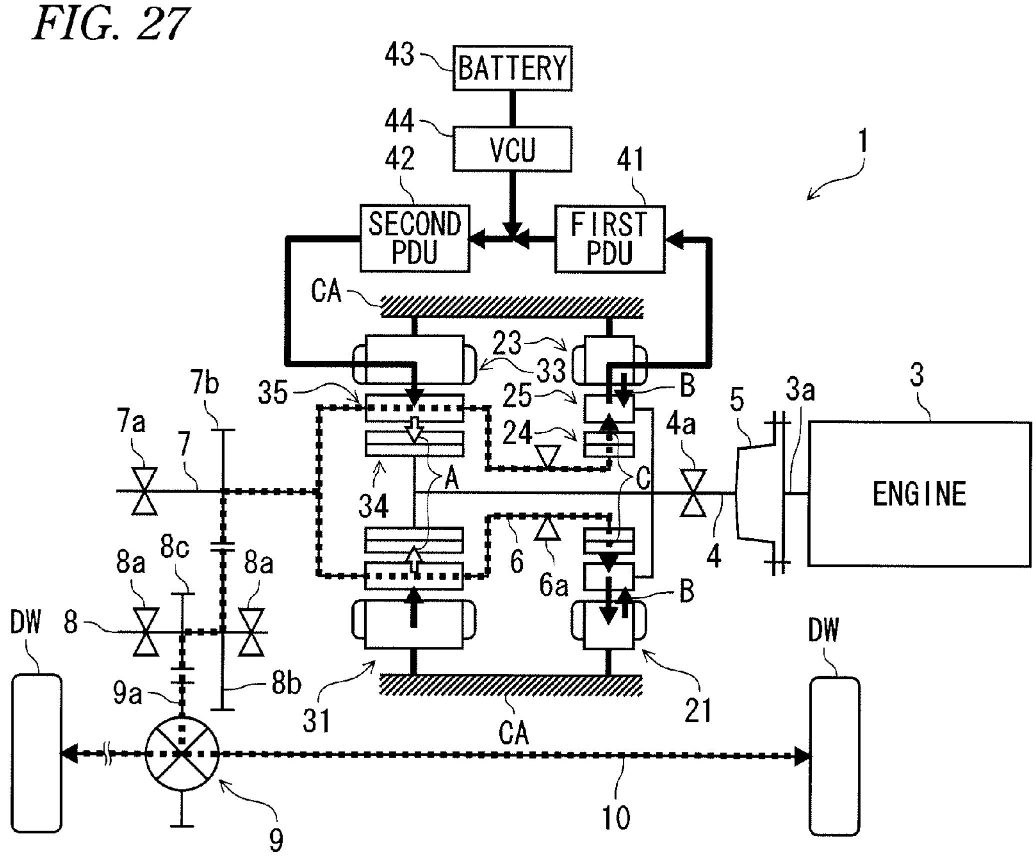
FIG. 27 is a diagram showing a state of transmission of torque in the power unit shown in FIG. 1 during EV start.
Figure 28:
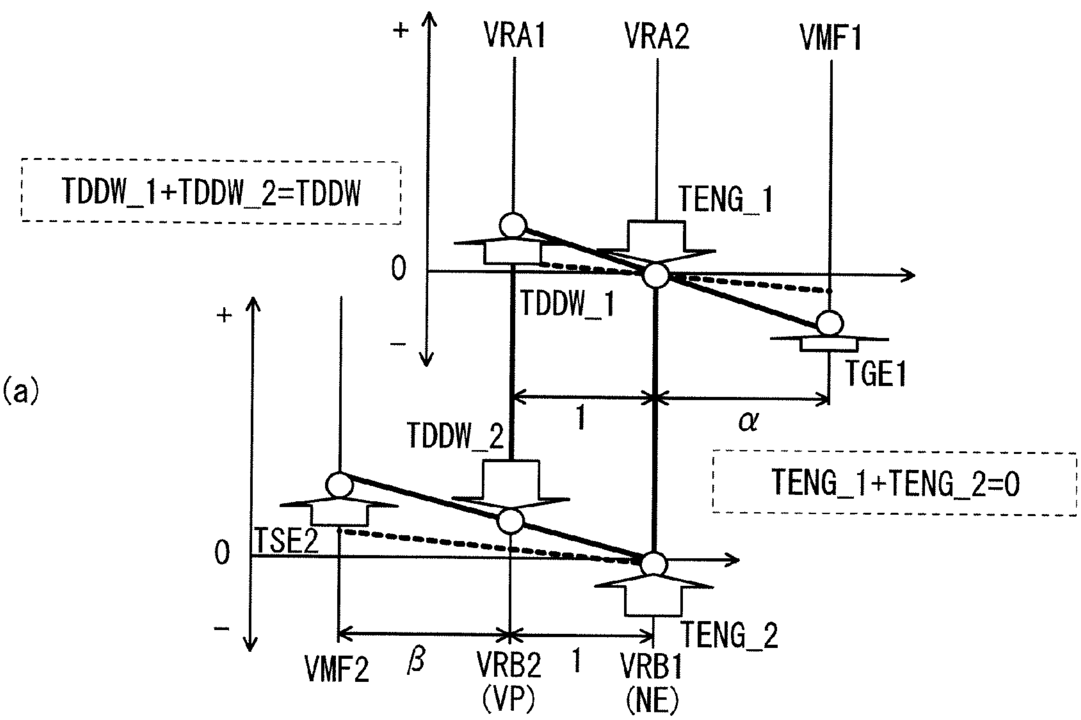
FIG. 28(*a*) shows examples of collinear charts of the first and second rotating machines 21 and 31 during EV start of the power unit shown in FIG. 1, and FIG. 28(*b*) shows a combined collinear chart obtained by combining two collinear charts.
Figure 28:
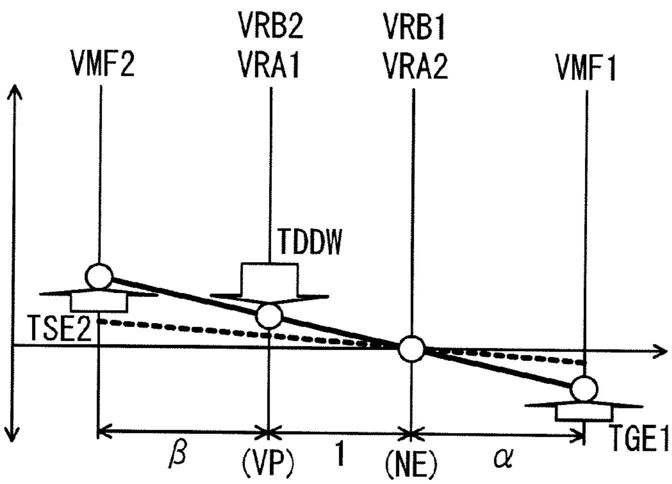

The EV start is an operation mode for causing the vehicle to start and travel from the above-described EV creep, using the first and second rotating machines 21 and 31 in the state where the engine 3 is stopped. At the time of the EV start, the electric power supplied to the stator 33 of the second rotating machine 31 and the electric power generated by the stator 23 of the first rotating machine 21 are both increased. Moreover, while maintaining the relationships between the rotational speeds expressed by the equations (43) and (44) and at the same time holding the A2 and B1 rotor rotational speeds VRA2 and VRB1, that is, the engine speed NE at 0, the first magnetic field rotational speed VMF1 of the first rotating magnetic field that has been performing reverse rotation during the EV creep and the second magnetic field rotational speed VMF2 of the second rotating magnetic field that has been performing normal rotation during the EV creep are increased in the same rotation directions as they have been. From the above, as indicated by thick solid lines in FIGS. 28(*a*) and 28(*b*), the A1 and B2 rotor rotational speeds VRA1 and VRB2, that is, the vehicle speed VP is increased from the state of the EV creep, indicated by broken lines in the figures, causing the vehicle to start. It should be noted that as shown in FIG. 27, the state of transmission of torque during the EV start is the same as the state of transmission of torque during the EV creep shown in FIG. 25.

<ENG Start During EV Traveling>

The ENG start during EV traveling is an operation mode for starting the engine 3 during traveling of the vehicle by the above-described EV start. At the time of the ENG start during EV traveling, while holding the A1 and B2 rotor rotational speeds VRA1 and VRB2, that is, the vehicle speed VP at the value assumed then, the first magnetic field rotational speed VMF1 of the first rotating magnetic field that has been performing reverse rotation during the EV start, as described above, is controlled such that it becomes equal to 0, and the second magnetic field rotational speed VMF2 of the second rotating magnetic field that has been performing normal rotation during the EV start is controlled such that it is lowered. Then, after the first magnetic field rotational speed VMF1 becomes equal to 0, electric power is supplied from the battery 43 not only to the stator 33 of the second rotating machine 31 but also to the stator 23 of the first rotating machine 21, whereby the first rotating magnetic field generated by the stator 23 is caused to perform normal rotation, and the first magnetic field rotational speed VMF1 is caused to be increased.

Figure 29:
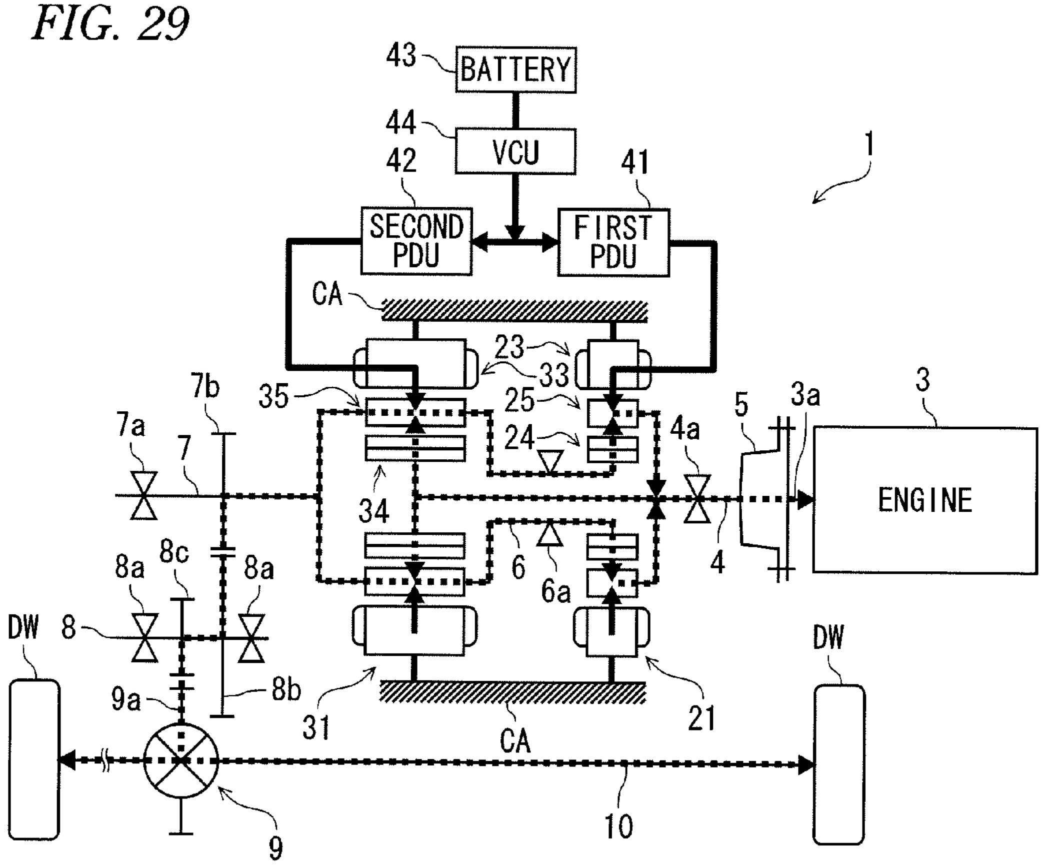
FIG. 29 is a diagram showing a state of transmission of torque in the power unit shown in FIG. 1 during ENG start during EV traveling.

FIG. 29 shows a state of transmission of torque in a state in which electric power is supplied to both of the stators 23 and 33, as described above, at the time of the ENG start during EV traveling. From the above-described functions of the second rotating machine 31, as shown in FIG. 29, the electric power is supplied to the stator 33 as described above, whereby as the second driving equivalent torque TSE2 is transmitted to the B2 rotor 35, torque transmitted to the B1 rotor 34, as described later, is transmitted to the B2 rotor 35. That is, the second driving equivalent torque TSE2, and the B1 rotor-transmitted torque TRB1 transmitted to the B1 rotor 34 are combined, and the combined torque is transmitted to the B2 rotor 35. Moreover, part of the torque transmitted to the B2 rotor 35 is transmitted to the A1 rotor 24 through the connection shaft 6, and the remainder thereof is transmitted to the drive wheels DW and DW through the second rotating shaft 7 and the like.

Moreover, at the time of the ENG start during EV traveling, from the above-described functions of the first rotating machine 21, as shown in FIG. 29, the electric power is supplied from the battery 43 to the stator 23, whereby as the first driving equivalent torque TSE1 is transmitted to the A2 rotor 25, the torque transmitted to the A1 rotor 24, as described above, is transmitted to the A2 rotor 25. That is, the first driving equivalent torque TSE1 and the A1 rotor-transmitted torque TRA1 transmitted to the A1 rotor 24 are combined, and the combined torque is transmitted to the A2 rotor 25. Moreover, part of the torque transmitted to the A2 rotor 25 is transmitted to the B1 rotor 34 through the first rotating shaft 4, and the remainder thereof is transmitted to the crankshaft 3*a* through the first rotating shaft 4 and the flywheel 5, whereby the crankshaft 3*a* performs normal rotation. Furthermore, in this case, the electric power supplied to the stators 23 and 33 is controlled such that sufficient motive power is transmitted to the drive wheels DW and DW and the engine 3.

Figure 30:
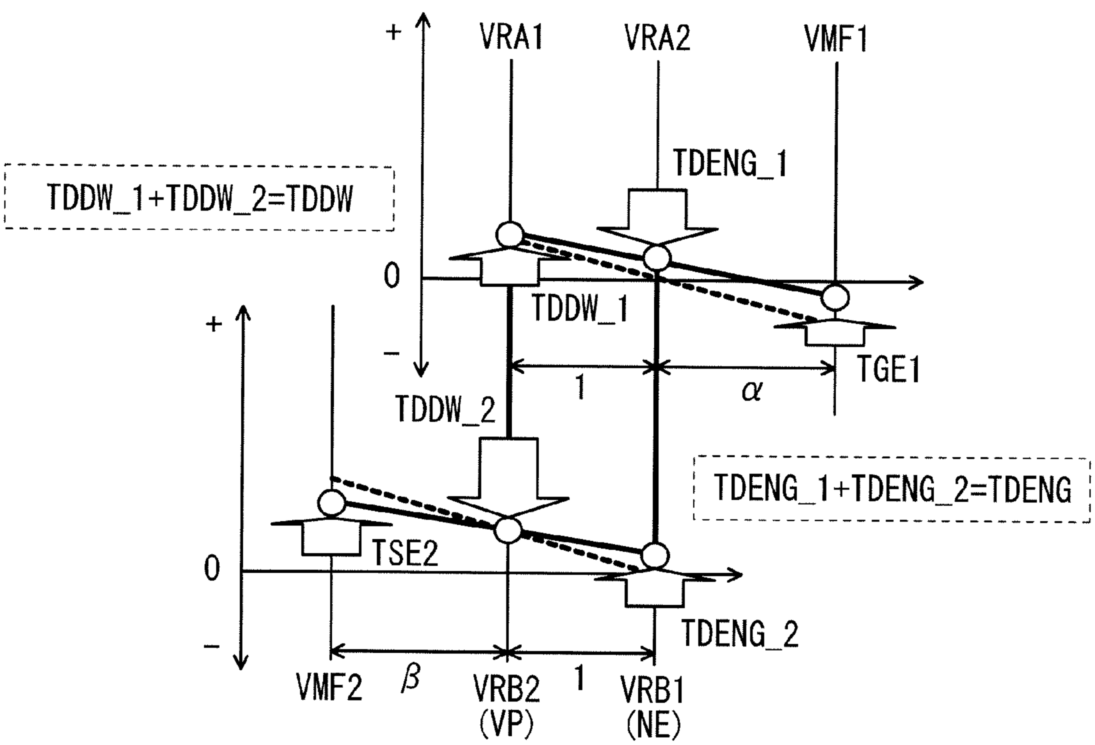
FIG. 30 shows collinear charts of the first and second rotating machines 21 and 31 at the time of ENG start during EV traveling of the power unit shown in FIG. 1.

From the above, as indicated by thick solid lines in FIG. 30, at the time of the ENG start during EV traveling, while the vehicle speed VP is held at the value assumed then, the A2 and B1 rotor rotational speeds VRA2 and VRB1 are increased from a state in which they are equal to 0, indicated by broken lines, and the rotational speed of the crankshaft 3*a* connected to the A2 and B1 rotors 25 and 34, that is, the engine speed NE is also increased. In this state, the ignition operation of fuel injection valves (not shown) and spark plugs (not shown) of the engine 3 is controlled according to the detected crank angle position, whereby the engine 3 is started. Moreover, in this case, by controlling the first and second magnetic field rotational speeds VMF1 and VMF2, the engine speed NE is controlled to a relatively small value suitable for starting the engine 3.

Figure 31:
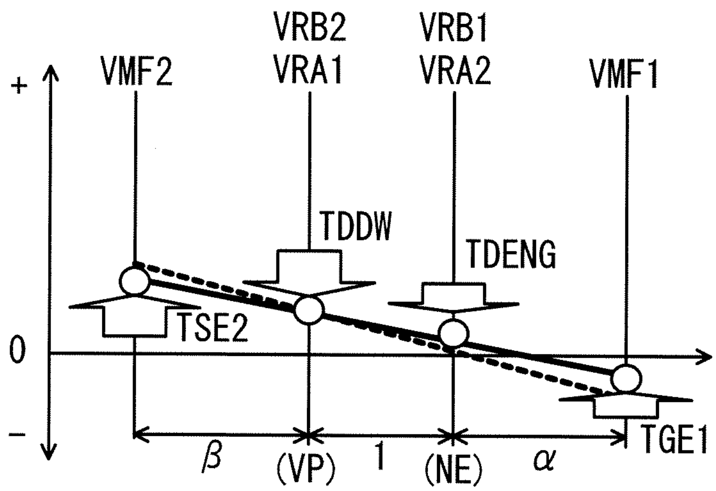
FIG. 31 shows a combined collinear chart obtained by combining the two collinear charts shown in FIG. 30.

FIG. 31 shows a combined collinear chart obtained by combining the two collinear charts shown in FIG. 30. In the figure, TDENG represents torque transmitted to the crankshaft 3*a* of the engine 3 (hereinafter referred to as the "engine-transmitted torque"), and TDDW represents torque transmitted to the drive wheels DW and DW (hereinafter referred to as the "drive wheel-transmitted torque"). In this case, as is apparent from FIG. 31, the second driving equivalent torque TSE2 is transmitted to both the drive wheels DW and DW and the crankshaft 3*a* using the first electric power-generating equivalent torque TGE1 as a reaction force, and hence the torque required of the first rotating machine 21 becomes larger than in the other cases. In this case, the torque required of the first rotating machine 21, that is, the first electric power-generating equivalent torque TGE1 is expressed by the following equation (51).

$$TGE1=-\{\beta\cdot TDDW+(\beta+1)TDENG\}/(\alpha+1+\beta) \quad (51)$$

As is apparent from the equation (51), as the first pole pair number ratio α is larger, the first electric power-generating equivalent torque TGE1 becomes smaller with respect to the drive wheel-transmitted torque TDDW and the engine-transmitted torque TDENG assuming that the respective magnitudes thereof are unchanged. In the present embodiment, since the first pole pair number ratio α is set to 2.0, the first electric power-generating equivalent torque TGE1 can be made smaller than that when the first pole pair number ratio cc is set to a value smaller than 1.0.

<ENG Traveling>

Figure 32:
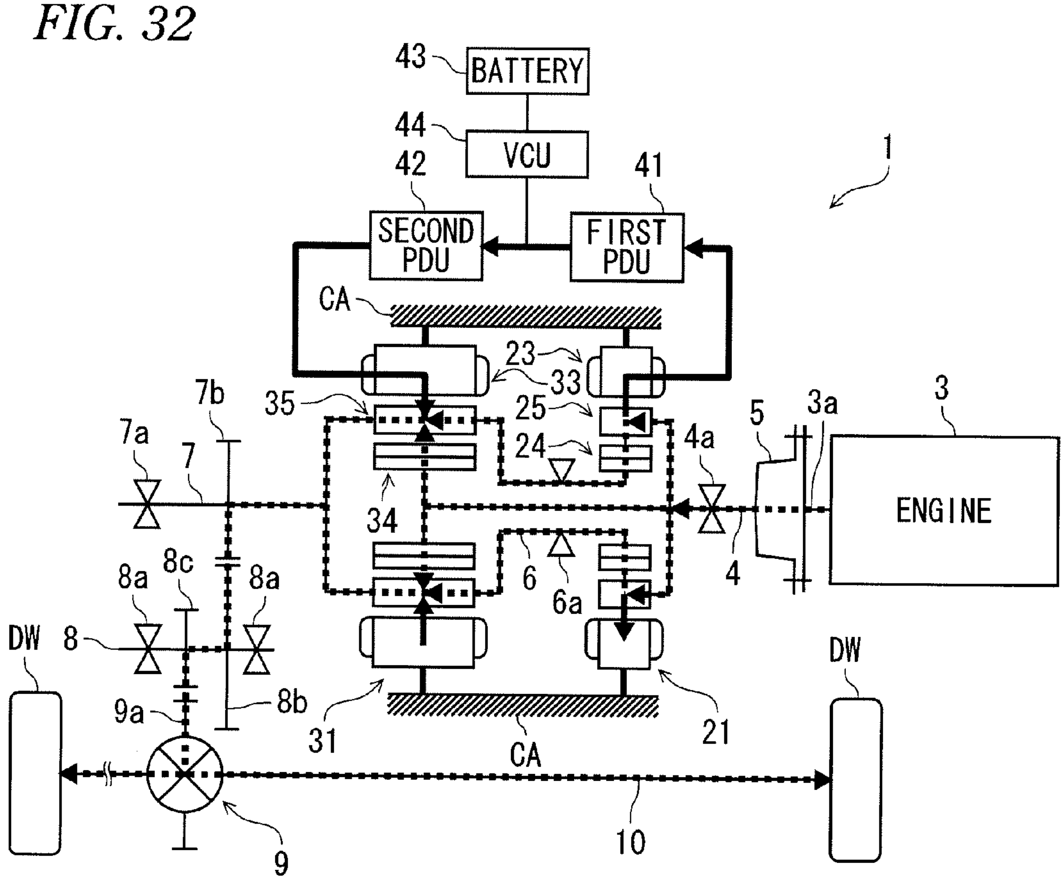
FIG. 32 is a diagram showing a state of transmission of torque in the power unit shown in FIG. 1 during ENG traveling in a battery input/output zero mode.

The ENG traveling is an operation mode for causing the vehicle to travel using the motive power from the engine 3. During the ENG traveling, motive power output to the crankshaft 3*a* by combustion of the engine 3 (hereinafter referred to as the "engine motive power") is basically controlled such that fuel economy which is optimum (hereinafter referred to as the "optimum fuel economy") can be obtained within a range where the required torque can be generated. The required torque is torque required of the vehicle and is calculated, for example, by searching a map (not shown) according to the detected vehicle speed VP and accelerator pedal opening AP. Moreover, during the ENG traveling, by using the engine motive power transmitted to the A2 rotor 25, electric power generation is performed by the stator 23 of the first rotating machine 21, and the generated electric power is supplied to the stator 33 of the second rotating machine 31 without charging the battery 43 therewith. Hereinafter, this operation mode will be referred to as the "battery input/output zero mode". FIG. 32 shows a state of transmission of torque in the battery input/output zero mode.

By the above-described functions of the first rotating machine 21, as shown in FIG. 32, during the battery input/output zero mode, as part of the torque output to the crankshaft 3*a* by combustion of the engine 3 (hereinafter referred to as the "engine torque") is transmitted to the stator 23 as the first electric power-generating equivalent torque TGE1 through the A2 rotor 25, part of the engine torque is also transmitted to the A1 rotor 24 through the A2 rotor 25. That is, part of the engine torque is transmitted to the A2 rotor 25, and the engine torque transmitted to the A2 rotor 25 is distributed to the stator 23 and the A1 rotor 24. Moreover, the remainder of the engine torque is transmitted to the B1 rotor 34 through the first rotating shaft 4.

Moreover, similarly to the case of the ENG start during EV traveling, the second driving equivalent torque TSE2 and the B1 rotor-transmitted torque TRB1 are combined, and the combined torque is transmitted to the B2 rotor 35 as the B2 rotor-transmitted torque TRB2. Therefore, in the battery input/output zero mode, the electric power generated by the stator 23 of the first rotating machine 21 as described above is supplied to the stator 33 of the second rotating machine 31, whereby as the second driving equivalent torque TSE2 is transmitted to the B2 rotor 35, the engine torque transmitted to the B1 rotor 34 as described above is transmitted to the B2 rotor 35. Moreover, the engine torque distributed to the A1 rotor 24 as described above, is further transmitted to the B2 rotor 35 through the connection shaft 6.

As described above, combined torque formed by combining the engine torque distributed to the A1 rotor 24, the second driving equivalent torque TSE2, and the engine torque transmitted to the B1 rotor 34 is transmitted to the B2 rotor 35. Moreover, this combined torque is transmitted to the drive wheels DW and DW through the second rotating shaft 7 and the like. As a consequence, assuming that there is no transmission loss caused by the gears, in the battery input/output zero mode, motive power equal in magnitude to the engine motive power is transmitted to the drive wheels DW and DW.

Furthermore, in the battery input/output zero mode, the engine motive power is transmitted to the drive wheels DW and DW while having the speed thereof steplessly changed through the control of the first and second magnetic field rotational speeds VMF1 and VMF2. In short, the first and second rotating machines 21 and 31 function as a stepless transmission.

Figure 33:
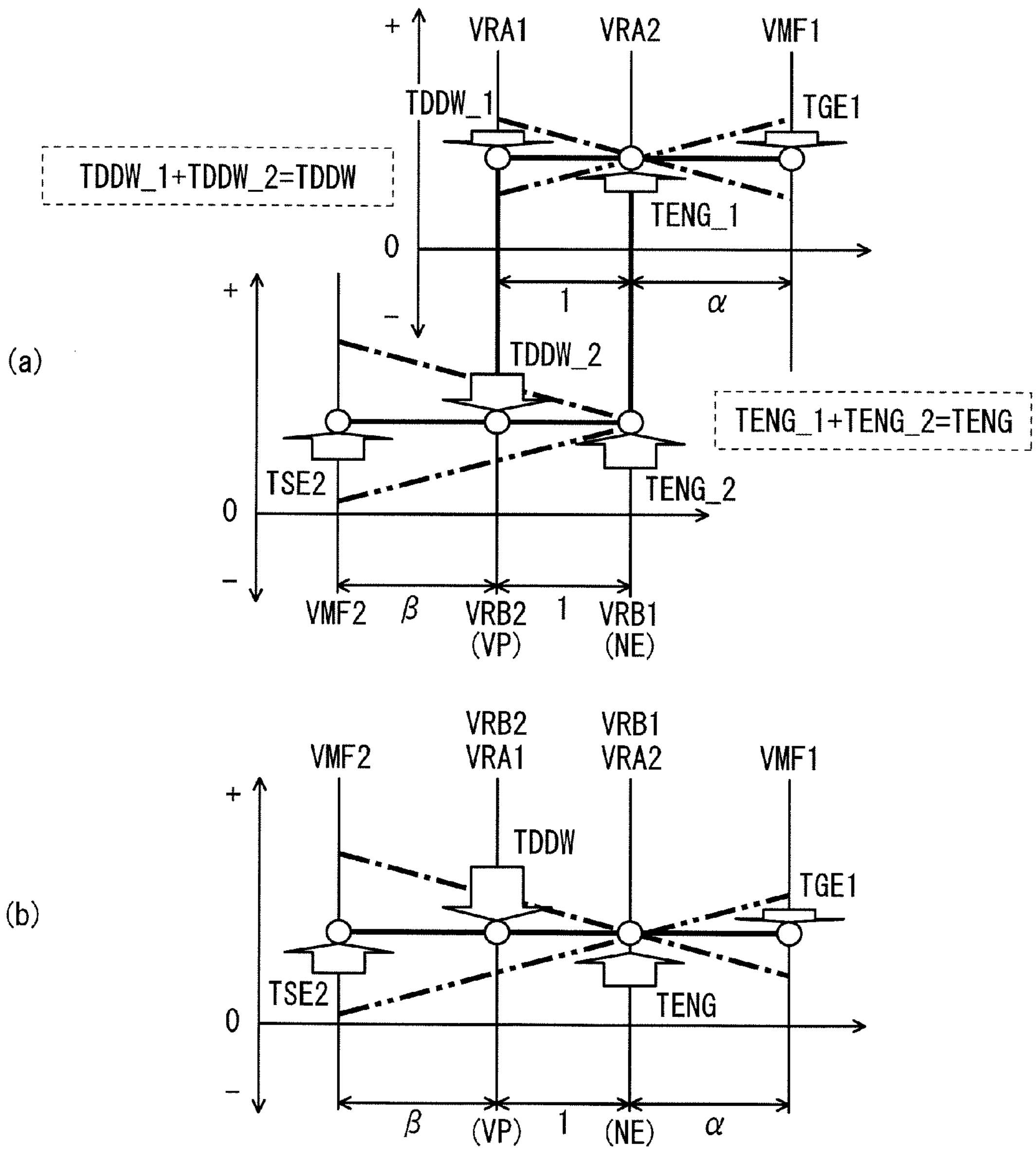
FIG. 33(*a*) shows collinear charts of the first and second rotating machines 21 and 31 during ENG traveling in a battery input/output zero mode, of the power unit shown in FIG. 1, and FIG. 33(*b*) shows a combined collinear chart obtained by combining two collinear charts.

Specifically, as indicated by two-dot chain lines in FIGS. 33(*a*) and 33(*b*), while maintaining the speed relationships expressed by the equations (43) and (44), by increasing the first magnetic field rotational speed VMF1 and decreasing the second magnetic field rotational speed VMF2, with respect to the A2 and B1 rotor rotational speeds VRA2 and VRB1, that is, the engine speed NE, it is possible to steplessly decrease the A1 and B2 rotor rotational speeds VRA1 and VRB2, that is, the vehicle speed VP. Conversely, as indicated by one-dot chain lines in FIGS. 33(*a*) and 33(*b*), by decreasing the first magnetic field rotational speed VMF1 and increasing the second magnetic field rotational speed VMF2 with respect to the A2 and B1 rotor rotational speeds VRA2 and VRB1, it is possible to steplessly increase the vehicle speed VP.

Furthermore, in this case, the first and second magnetic field rotational speeds VMF1 and VMF2 are controlled such that the engine speed NE becomes equal to a target engine speed. The target engine speed is calculated, for example, by searching a map (not shown) according to the vehicle speed VP and the calculated required torque. In this map, the target engine speed is set to such a value that the optimum fuel economy of the engine 3 is obtained with respect to the vehicle speed VP and the required torque assumed then.

As described above, in the battery input/output zero mode, the engine motive power is once divided by the first and second rotating machines 21 and 31, and is transmitted to the B2 rotor 35 through the following first to third transmission paths, and is then transmitted to the drive wheels DW and DW in a combined state.

First transmission path: A2 rotor 25→magnetic forces caused by magnetic force lines ML→A1 rotor 24→connection shaft 6→B2 rotor 35

Second transmission path: B1 rotor 34→magnetic forces caused by magnetic force lines ML→B2 rotor 35

Third transmission path: A2 rotor 25→magnetic forces caused by magnetic force lines ML→stator 23→first PDU 41→second PDU 42→stator 33→magnetic forces caused by magnetic force lines ML→B2 rotor 35

In the above first and second transmission paths, the engine motive power is transmitted to the drive wheels DW and DW by the magnetic forces caused by the magnetic force lines ML through so-called magnetic paths, without being converted to electric power. Moreover, in the above-described third transmission path, the engine motive power is once converted to electric power, and is then converted back to motive power again so as to be transmitted to the drive wheels DW and DW by so-called electrical paths.

Moreover, in the battery input/output zero mode, the electric power generated by the stator 23 and the first and second magnetic field rotational speeds VMF1 and VMF2 are controlled such that the speed relationships expressed by the equations (43) and (44) are maintained.

On the other hand, during the ENG traveling, if the following conditions (a) and (b) based on the calculated required torque and charge state are both satisfied, the engine 3 is assisted by the second rotating machine 31. Hereinafter, this operation mode will be referred to as the "assist mode".

(a) required torque>first predetermined value (b) charge state>lower limit value Here, the first predetermined value is calculated, for example, by searching a map (not shown) according to the vehicle speed VP. In this map, the first predetermined value is set to a torque value such that the optimum fuel economy of the engine 3 is obtained with respect to the vehicle speed VP assumed then. The above-described lower limit value is set to such a value as will not cause excessive discharge of the battery 43. Thus, the operation in the assist mode is performed when motive power required for driving the vehicle (hereinafter referred to as the "required vehicle motive power"), which is represented by the vehicle speed VP and the required torque assumed then, is larger than the engine motive power that will make it possible to obtain the optimum fuel economy of the engine 3, and at the same time when the remaining electric power in the battery 43 is large enough.

Figure 34:
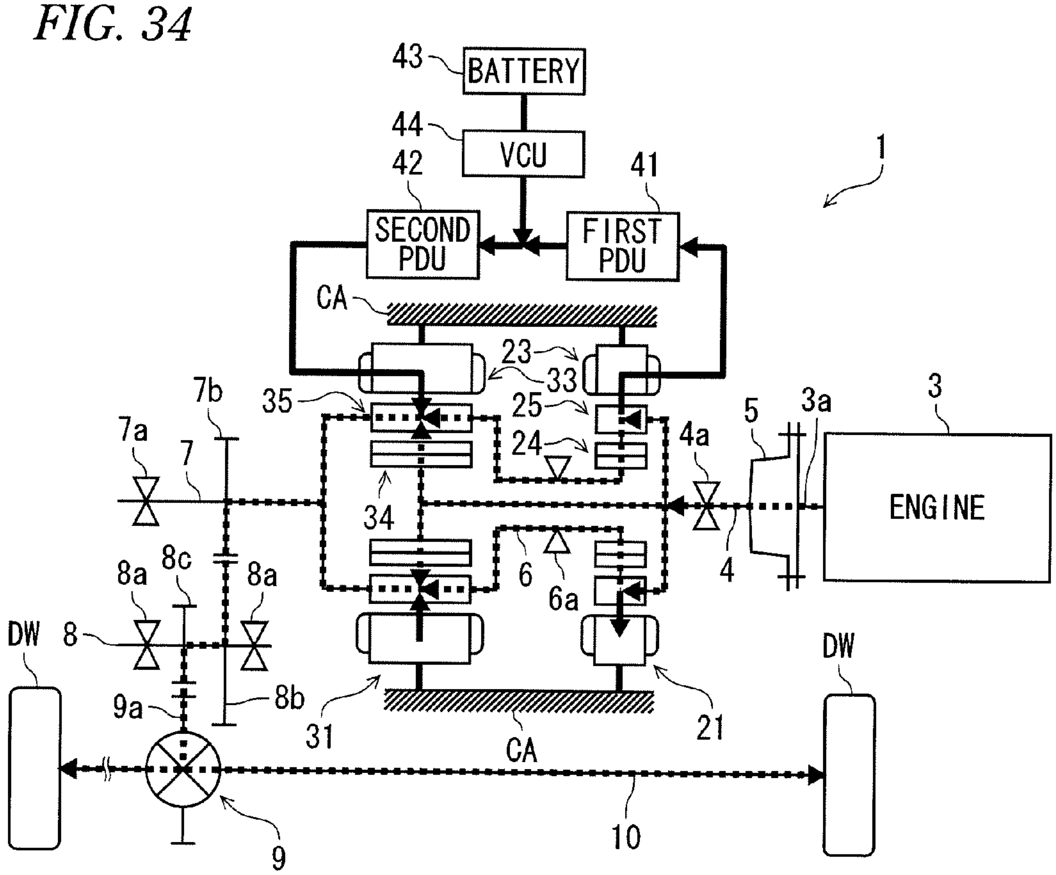
FIG. 34 is a diagram showing a state of transmission of torque in the power unit shown in FIG. 1 during ENG traveling in an assist mode.

Specifically, similarly to the battery input/output zero mode described above, electric power is generated by the stator 23 using the engine motive power transmitted to the A2 rotor 25. Moreover, in this case, differently from the battery input/output zero mode, as shown in FIG. 34, electric power charged in the battery 43 is supplied to the stator 33 in addition to the electric power generated by the stator 23. Therefore, the second driving equivalent torque TSE2 based on the electric power supplied from the stator 23 and the battery 43 is transmitted to the B2 rotor 35. Moreover, similarly to the battery input/output zero mode, torque formed by combining the above second driving equivalent torque TSE2, the engine torque distributed to the A1 rotor 24 along with the electric power generation, and the engine torque transmitted to the B1 rotor 34 is transmitted to the drive wheels DW and DW through the B2 rotor 35. As a result, assuming that there is no transmission loss caused by the gears, in the assist mode, the motive power transmitted to the drive wheels DW and DW becomes equal to the sum of the engine motive power and the electric power (energy) supplied from the battery 43.

Moreover, in the assist mode, the electric power generated by the stator 23, the electric power supplied from the battery 43 to the stator 33, and the first and second magnetic field rotational speeds VMF1 and VMF2 are controlled such that the speed relationships expressed by the equations (43) and (44) are maintained. As a result, the insufficient amount of the engine motive power with respect to the vehicle motive power demand is made up for by supply of electric power from the battery 43 to the stator 33. It should be noted that although the above-described example is an example of a case in which the insufficient amount of the engine motive power with respect to the vehicle motive power demand is relatively small, if the insufficient amount is relatively large, the electric power is supplied from the battery 43 not only to the stator 33 of the second rotating machine 31 but also to the stator 23 of the first rotating machine 21.

On the other hand, during the ENG traveling, if the following conditions (c) and (d) are both satisfied, the battery 43 is charged with part of the electric power generated by the stator 23 of the first rotating machine 21 using the engine motive power, as described above, and the remainder of the generated electric power is supplied to the stator 33 of the second rotating machine 31. Hereinafter, this operation mode will be referred to as the "drive-time charging mode".

(c) torque demand<second predetermined value (d) charge state<upper limit value

Here, the second predetermined value is calculated, for example, by searching a map (not shown) according to the vehicle speed VP. In this map, the second predetermined value is set to a value smaller than a torque value such that the optimum fuel economy of the engine 3 is obtained with respect to the vehicle speed VP assumed then. The upper limit value is set to such a value as will not cause overcharge of the battery 43. Thus, the operation in the drive-time charging mode is performed when the vehicle motive power demand is smaller than the engine motive power that will make it possible to obtain the optimum fuel economy of the engine 3, and at the same time when the charge state is relatively low.

Figure 35:
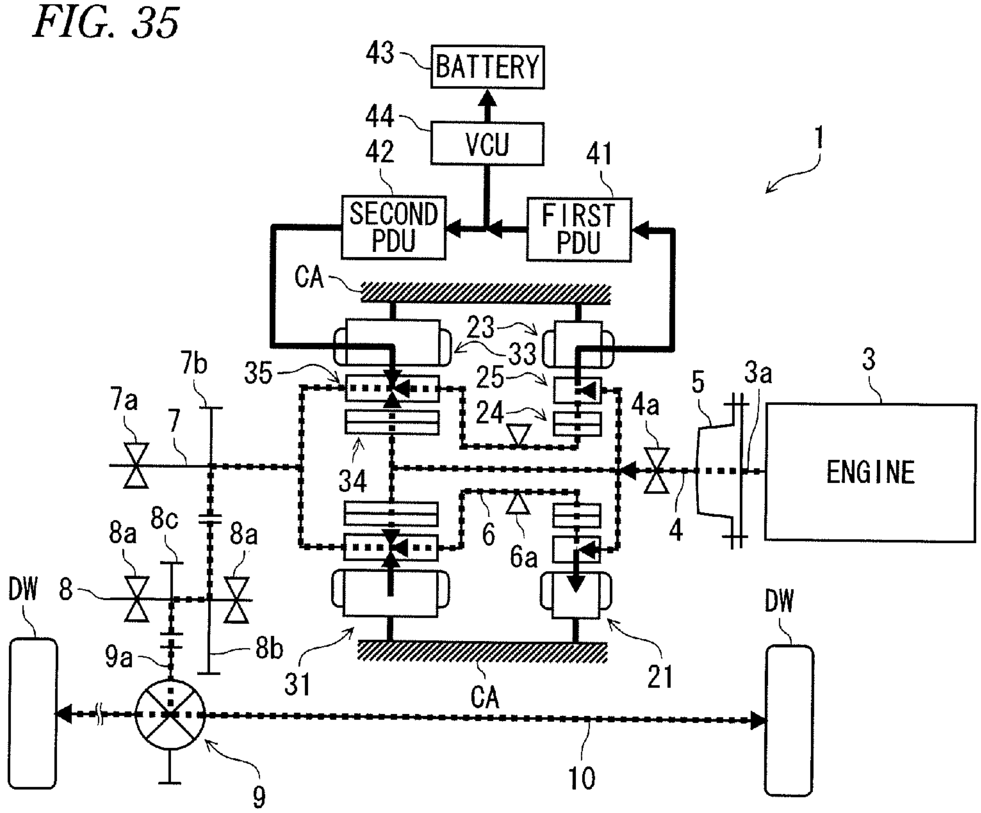
FIG. 35 is a diagram showing a state of transmission of torque in the power unit shown in FIG. 1 during ENG traveling in a drive-time charging mode.

Referring to FIG. 35, in the drive-time charging mode, differently from the above-described battery input/output zero mode, electric power, which has a magnitude obtained by subtracting the electric power charged into the battery 43 from the electric power generated by the stator 23 of the first rotating machine 21, is supplied to the stator 33 of the second rotating machine 31, and the second driving equivalent torque TSE2 based on the electric power having the magnitude is transmitted to the B2 rotor 35. Moreover, similarly to the battery input/output zero mode, torque formed by combining the above second driving equivalent torque TSE2, the engine torque distributed to the A1 rotor 24 along with the electric power generation, and the engine torque transmitted to the B1 rotor 34 is transmitted to the drive wheels DW and DW through the B2 rotor 35. As a result, assuming that there is no transmission loss caused by the gears, in the drive-time charging mode, the motive power transmitted to the drive wheels DW and DW has a magnitude obtained by subtracting the electric power (energy) charged into the battery 43 from the engine motive power.

Moreover, in the drive-time charging mode, the electric power generated by the stator 23, the electric power charged into the battery 43, and the first and second magnetic field rotational speeds VMF1 and VMF2 are controlled such that the speed relationships expressed by the equations (43) and

(44) are maintained. As a result, the surplus amount of the engine motive power with respect to the vehicle motive power demand is converted to electric power by the stator 23 of the first rotating machine 21, and is charged into the battery 43.

Moreover, during the ENG traveling, when the electric power generation is not performed by the stator 23 of the first rotating machine 21 but electric power is supplied from the battery 43 to the stator 33 of the second rotating machine 31, and this electric power is controlled such that the second driving equivalent torque TSE2 becomes equal to a half of the engine torque, as is clear from the above-described equation (45), all of the engine torque and the second driving equivalent torque TSE2 are combined by the B2 rotor 35, and then the combined torque is transmitted to the drive wheels DW and DW. That is, in this case, it is possible to transmit all the engine motive power to the drive wheels DW and DW only by the magnetic paths without transmitting the same by the above-described electrical paths. Moreover, in this case, torque having a magnitude 3/2 times as large as that of the engine torque is transmitted to the drive wheels DW and DW.

Furthermore, when the electric power generated by the stator 23 of the first rotating machine 21 is controlled such that the first electric power-generating equivalent torque TGE1 becomes equal to ⅓ of the engine torque, it is possible to transmit the motive power from the engine 3 to the drive wheels DW and DW only by the magnetic paths. In this case, torque having a magnitude ⅔ times as large as that of the engine torque is transmitted to the drive wheels DW and DW.

Figure 36:
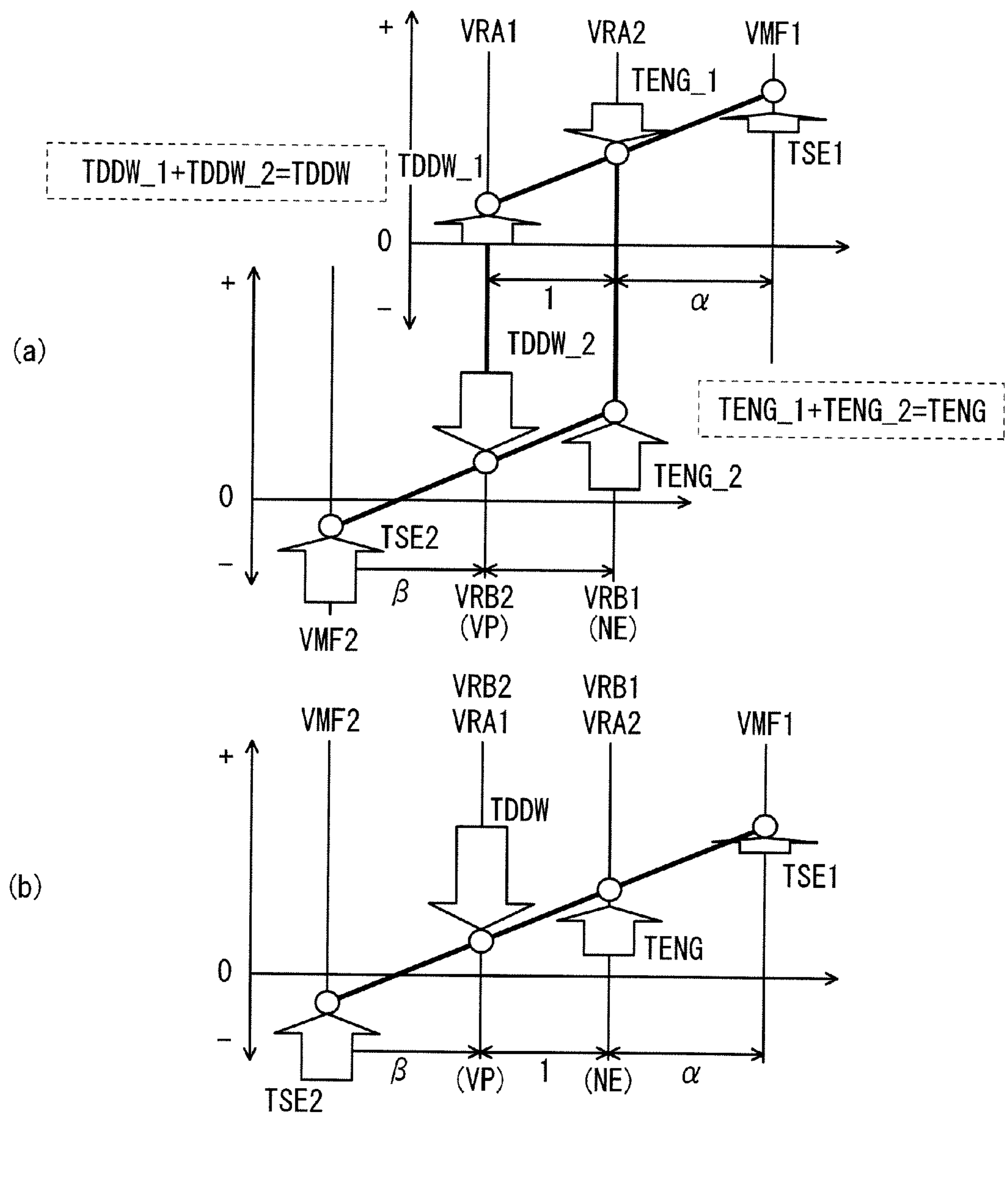
FIG. 36(*a*) shows an example of collinear charts of the first and second rotating machines 21 and 31 at the start of rapid acceleration operation during ENG traveling, of the power unit shown in FIG. 1, and FIG. 36(*b*) shows a combined collinear chart obtained by combining two collinear charts.

Moreover, during the ENG traveling, when the vehicle speed VP in a low-speed condition of the vehicle is rapidly increased (hereinafter such operation of the vehicle will be referred to as the "rapid acceleration operation during the ENG traveling"), the engine 3 and the first and second rotating machines 21 and 31 are controlled in the following manner. FIG. 36(*a*) shows examples of collinear charts of the first and second rotating machines 21 and 31 at the start of the rapid acceleration operation during ENG traveling, and FIG. 36(*b*) shows a combined collinear chart obtained by combining the two collinear charts shown in FIG. 36(*a*). In the figure, TENG represents torque of the engine 3. In this case, the engine speed NE is increased to such a predetermined engine speed that the maximum torque thereof is obtained. As shown in FIGS. 36(*a*) and 36(*b*), the vehicle speed VP is not immediately increased, and hence as the engine speed NE becomes higher than the vehicle speed VP, the difference between the engine speed NE and the vehicle speed VP increases, so that the direction of rotation of the second rotating magnetic field determined by the relationship between the engine speed NE and the vehicle speed VP becomes the direction of reverse rotation. Therefore, in order to cause positive torque from the stator 33 of the second rotating machine 31, which generates such a second rotating magnetic field, to act on the drive wheels DW and DW, the stator 33 performs electric power generation. Moreover, electric power generated by the stator 33 is supplied to the stator 23 of the first rotating machine 21 to cause the first rotating magnetic field to perform normal rotation.

As described above, the engine torque TENG, the first driving equivalent torque TSE1, and the second electric power-generating equivalent torque TGE2 are all transmitted to the drive wheels DW and DW as positive torque, which results in a rapid increase in the vehicle speed VP. Moreover, at the start of the rapid acceleration operation during the ENG traveling, as is apparent from FIGS. 36(*a*) and 36(*b*), the engine torque TENG and the first driving equivalent torque TSE1 are transmitted to the drive wheels DW and DW using the second electric power-generating equivalent torque TGE2 as a reaction force, so that the torque required of the second rotating machine 31 becomes larger than otherwise. In this case, the torque required of the second rotating machine 31, that is, the second electric power-generating equivalent torque TGE2 is expressed by the following equation (52).

$$TGE2=-\{\alpha\cdot TENG+(1+\alpha)TDDW\}/(\beta+1+\alpha) \quad (52)$$

As is apparent from the equation (52), as the second pole pair number ratio 3 is larger, the second electric power-generating equivalent torque TGE2 becomes smaller with respect to the drive wheel-transmitted torque TDDW and the engine torque TENG assuming that the respective magnitudes thereof are unchanged. In the present embodiment, since the second pole pair number ratio β is set to 2.0, the second driving equivalent torque TSE2 can be made smaller than that when the second pole pair number ratio β is set to a value smaller than 1.0.

<Deceleration Regeneration>

The deceleration regeneration is an operation mode for generating electric power by the first rotating machine 21 and the second rotating machine 31 using inertia energy of the drive wheels DW and DW, and charging the battery 43 with the generated electric power, during decelerating traveling of the vehicle, that is, when the vehicle is traveling by inertia. During the deceleration regeneration, when the ratio of torque of the drive wheels DW and DW transmitted to the engine 3 to torque of the drive wheels DW and DW (torque by inertia) is small, electric power generation is performed by both the stators 23 and 33 using part of motive power from the drive wheels DW and DW, and the generated electric power is charged into the battery 43. Specifically, this electric power generation is performed by the stator 23 of the first rotating machine 21 using motive power transmitted to the A2 rotor 25 as described later, and is performed by the stator 33 of the second rotating machine 31 using motive power transmitted to the B2 rotor 35 as described later.

Figure 37:
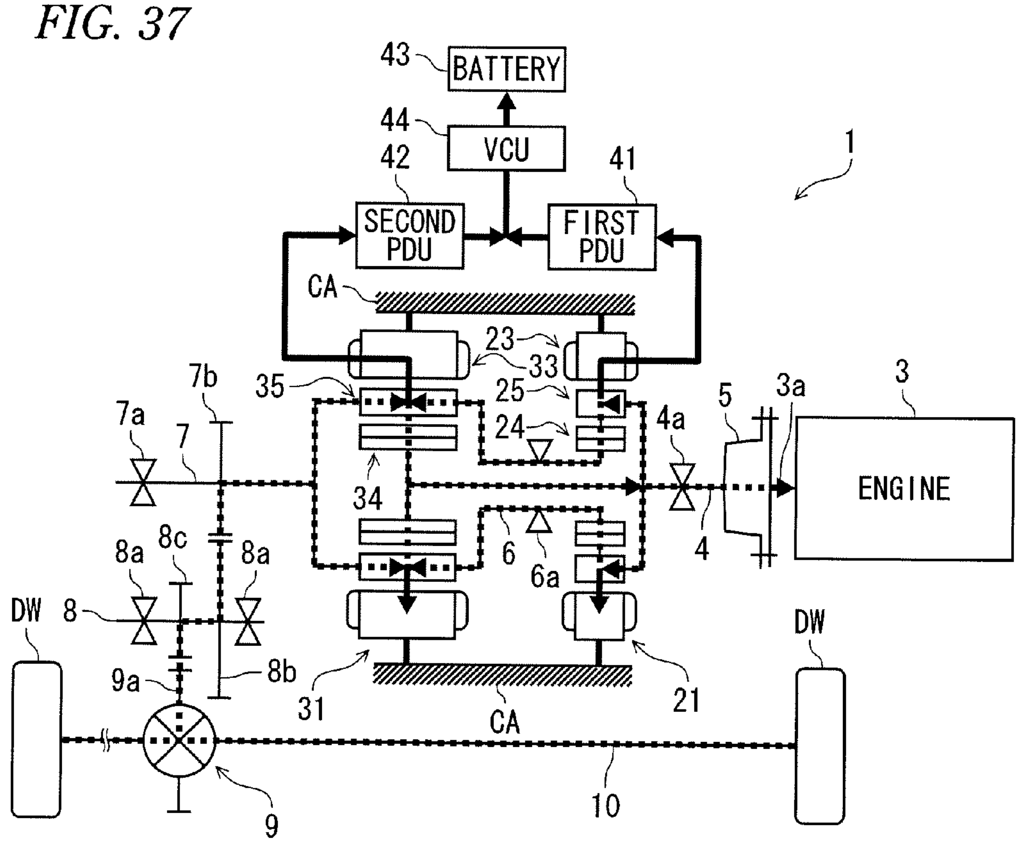
FIG. 37 is a diagram showing a state of transmission of torque in the power unit shown in FIG. 1 during deceleration regeneration.
Figure 38:
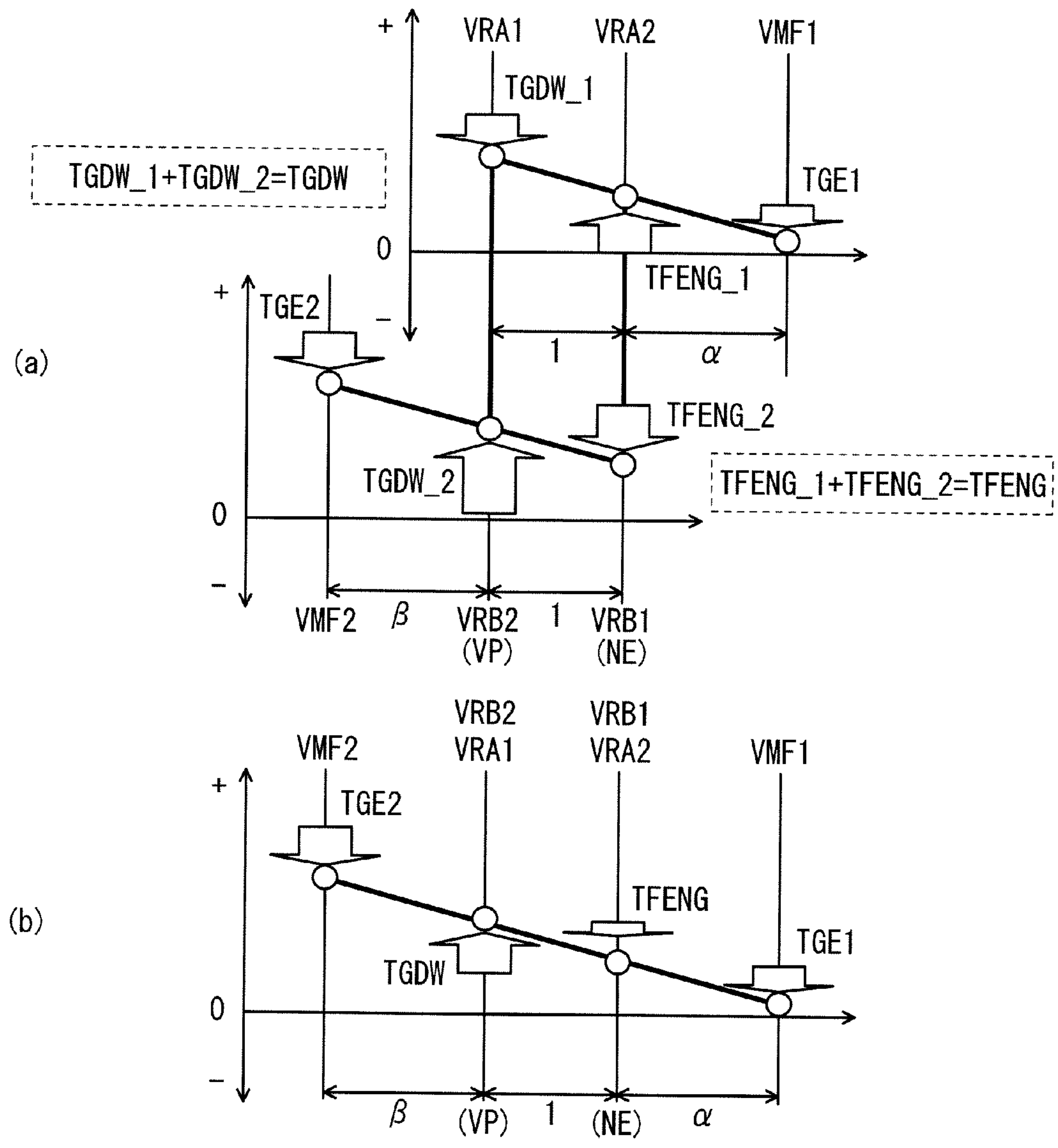
FIG. 38(*a*) shows an example of collinear charts of the first and second rotating machines 21 and 31 during deceleration regeneration, of the power unit shown in FIG. 1, and FIG. 38(*b*) shows a combined collinear chart obtained by combining two collinear charts.

FIG. 37 shows a state of transmission of torque during the above-described deceleration regeneration. FIG. 38(*a*) shows examples of collinear charts of the first and second rotating machines 21 and 31 during the deceleration regeneration, and FIG. 38(*b*) shows a combined collinear chart obtained by combining the two collinear charts shown in FIG. 38(*a*). As shown in the figure, along with the electric power generation by the stator 33, combined torque formed by combining all the torque of the drive wheels DW and DW and torque distributed to the A1 rotor 24, as described later, is transmitted to the B2 rotor 35. Moreover, by the above-described functions of the second rotating machine 31, the above-described combined torque transmitted to the B2 rotor 35 is distributed to the stator 33 and the B1 rotor 34.

Moreover, part of the torque distributed to the B1 rotor 34 is transmitted to the engine 3, and the remainder thereof is, similarly to the case of the above-described battery input/output zero mode, transmitted to the A2 rotor 25 along with the electric power generation by the stator 23, and is then distributed to the stator 23 and the A1 rotor 24. Moreover, the torque distributed to the A1 rotor 24 is transmitted to the B2 rotor 35. As a result, assuming that there is no transmission loss caused by the gears, during the deceleration regeneration, the sum of the motive power transmitted to the engine 3 and the electric power (energy) charged into the battery 43 becomes equal to the motive power from the drive wheels DW and DW.

<ENG Start During Stoppage of the Vehicle>

The ENG start during stoppage of the vehicle is an operation mode for starting the engine 3 during stoppage of the vehicle. At the time of the ENG start during stoppage of the vehicle, electric power is supplied from the battery 43 to the stator 23 of the first rotating machine 21, causing the first rotating magnetic field generated by the stator 23 in accordance with the supply of the electric power to perform normal rotation, and by using motive power transmitted to the B1 rotor 34 as described later, electric power generation is performed by the stator 33 to further supply the generated electric power to the stator 23.

Figure 39:
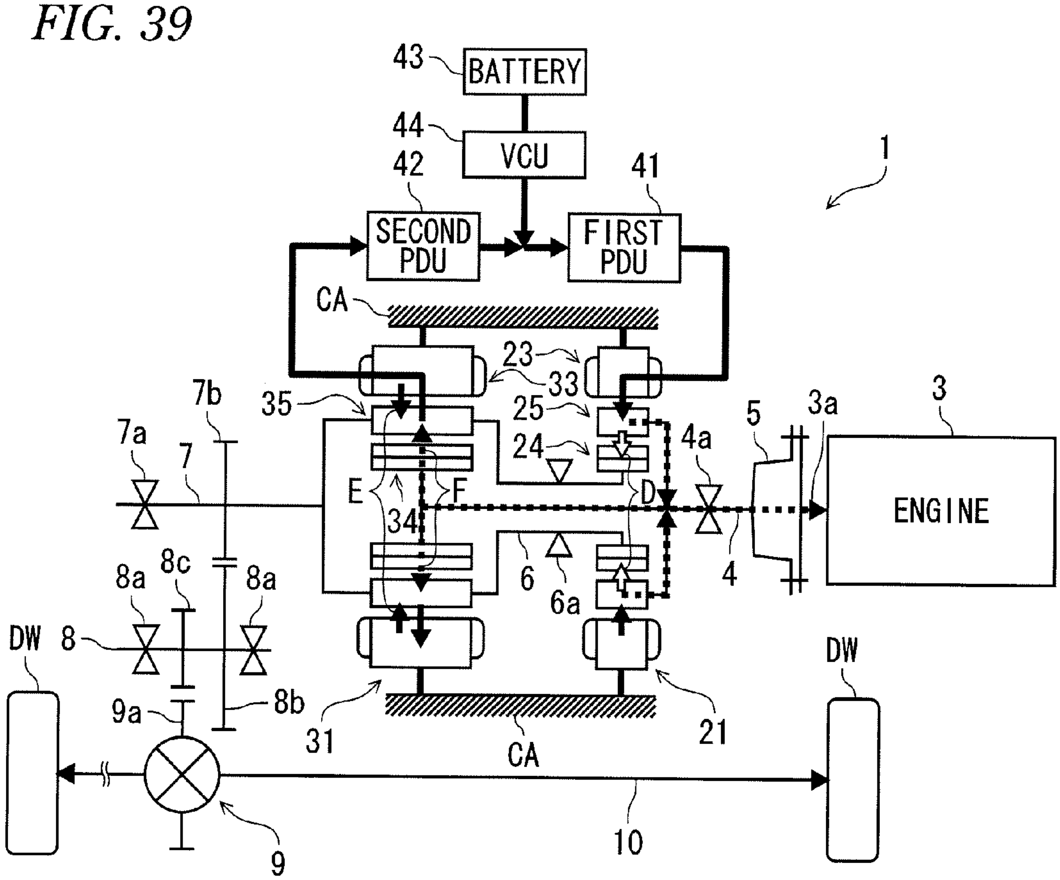
FIG. 39 is a diagram showing a state of transmission of torque in the power unit shown in FIG. 1 at the time of ENG start during stoppage of the vehicle.
Figure 40:
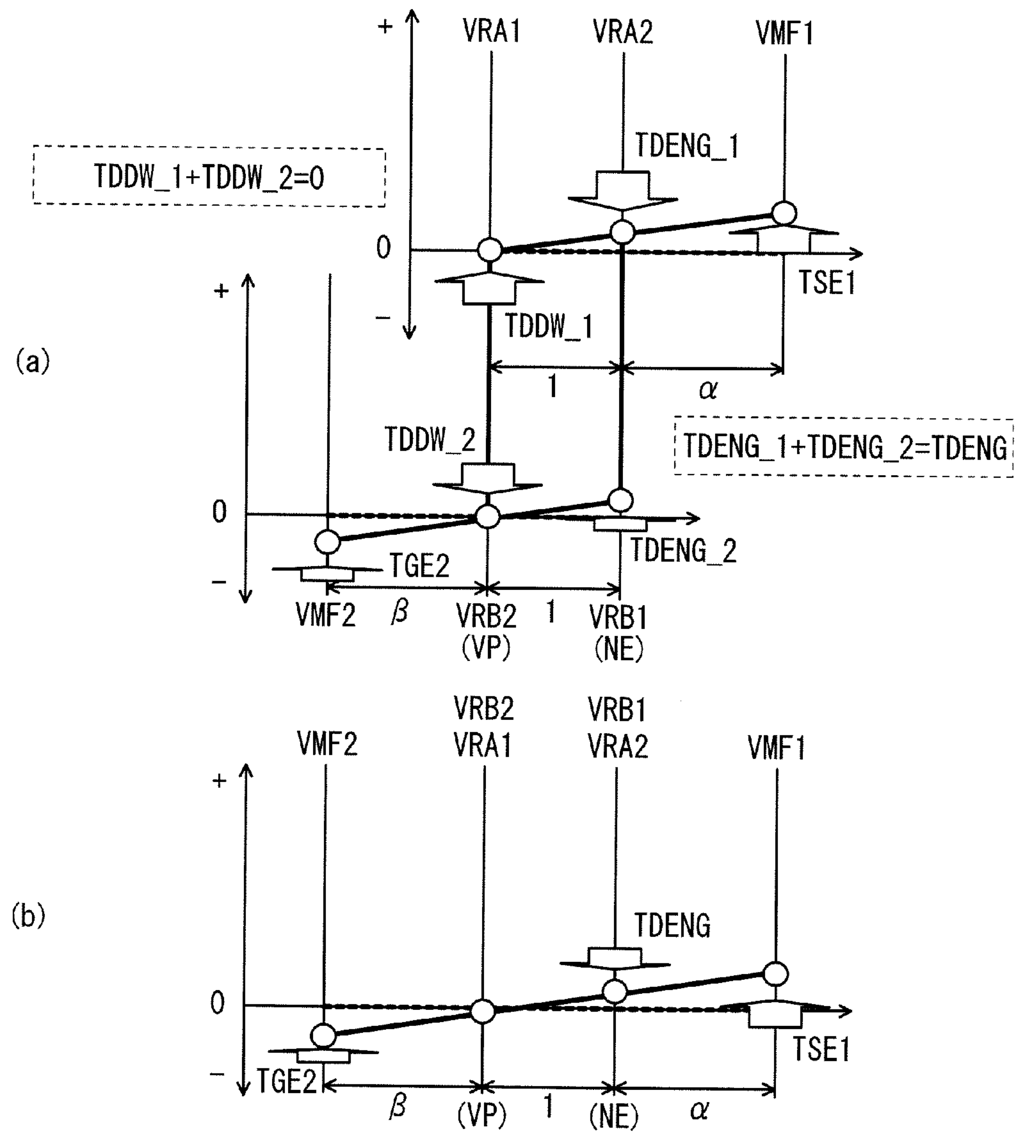
FIG. 40(*a*) shows an example of collinear charts of the first and second rotating machines 21 and 31 during ENG start during stoppage of the vehicle, of the power unit shown in FIG. 1, and FIG. 40(*b*) shows a combined collinear chart obtained by combining two collinear charts.

FIG. 39 shows a state of transmission of torque at the time of above-described ENG start during stoppage of the vehicle. FIG. 40(*a*) shows examples of collinear charts of the first and second rotating machines 21 and 31 at the time of the ENG start during stoppage of the vehicle, and FIG. 40(*b*) shows a combined collinear chart obtained by combining the two collinear charts shown in FIG. 40(*a*). As shown in FIG. 39, at the time of the ENG start during stoppage of the vehicle, as the electric power is supplied to the stator 23, the first driving equivalent torque TSE1 from the stator 23 acts on the A2 rotor 25 to cause the A2 rotor 25 to perform normal rotation, and acts on the A1 rotor 24 to cause the A1 rotor 24 to perform reverse rotation, as indicated by arrows D. Moreover, part of the torque transmitted to the A2 rotor 25 is transmitted to the crankshaft 3*a*, whereby the crankshaft 3*a* performs normal rotation.

Furthermore, at the time of the ENG start during stoppage of the vehicle, the remainder of the torque transmitted to the A2 rotor 25 is transmitted to the B1 rotor 34, and is then transmitted to the stator 33 of the second rotating machine 31 as electric energy along with the electric power generation by the stator 33. Moreover, as indicated by thick solid lines in FIGS. 40(*a*) and 40(*b*), the second rotating magnetic field generated along with the electric power generation by the stator 33 performs reverse rotation. As a result, as indicated by arrows E in FIG. 39, the second electric power-generating equivalent torque TGE2 generated along with the electric power generation of the stator 33 acts on the B2 rotor 35 to cause the B2 rotor 35 to perform normal rotation. Moreover, the torque transmitted to the B1 rotor 34 such that it is balanced with the second electric power-generating equivalent torque TGE2 is further transmitted to the B2 rotor 35 (as indicated by arrows F), thereby acting on the B2 rotor 35 to cause the B2 rotor 35 to perform normal rotation.

In this case, the electric power supplied to the stator 23 of the first rotating machine 21 and the electric power generated by the stator 33 of the second rotating machine 31 are controlled such that the above-described torque, indicated by the arrows D, for causing the A1 rotor 24 to perform reverse rotation, and the torques, indicated by the arrows E and F, for causing the B2 rotor 35 to perform normal rotation are balanced with each other, whereby the A1 rotor 24, the B2 rotor 35 and the drive wheels DW and DW, which are connected to each other, are held stationary. As a consequence, as shown in FIGS. 40(*a*) and 40(*b*), the A1 and B2 rotor rotational speeds VRA1 and VRB2 become equal to 0, and the vehicle speed VP as well become equal to 0.

Moreover, in this case, the electric power supplied to the stator 23, the electric power generated by the stator 33 and the first and second magnetic field rotational speeds VMF1 and VMF2 are controlled such that the speed relationships expressed by the above-described equations (43) and (44) are maintained and at the same time, the A2 and B1 rotor rotational speeds VRA2 and VRB1 takes a relatively small value (see FIGS. 40(*a*) and 40(*b*)). In this way, at the time of the ENG start during stoppage of the vehicle, while holding the vehicle speed VP at 0, the engine speed NE is controlled to a relatively small value suitable for the start of the engine 3. Moreover, in this state, the ignition operation of the fuel injection valves and the spark plugs of the engine 3 is controlled according to the crank angle position, whereby the engine 3 is started.

<ENG Creep>

The ENG creep is an operation mode for performing the creep operation of the vehicle using the motive power from the engine 3. During the ENG creep, by using the engine motive power transmitted to the A2 rotor 25, electric power generation is performed by the stator 23, and by using the engine motive power transmitted to the B1 rotor 34, electric power generation is performed by the stator 33. Moreover, electric power thus generated by the stators 23 and 33 is charged into the battery 43.

Figure 41:
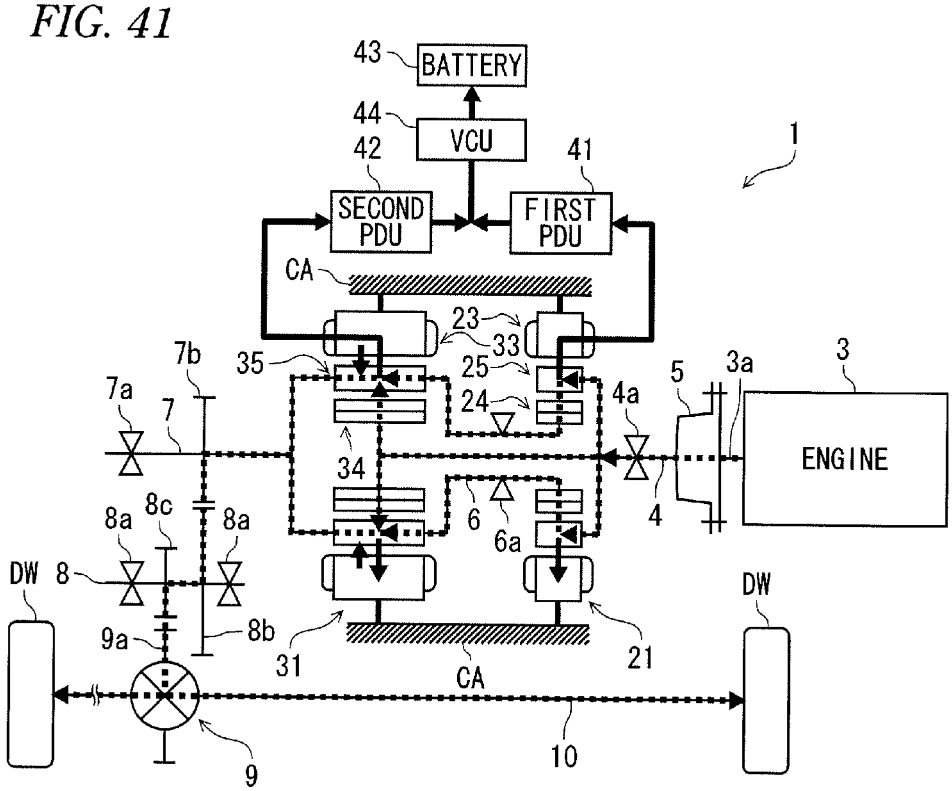
FIG. 41 is a diagram showing a state of transmission of torque in the power unit shown in FIG. 1 during ENG creep.
Figure 42:
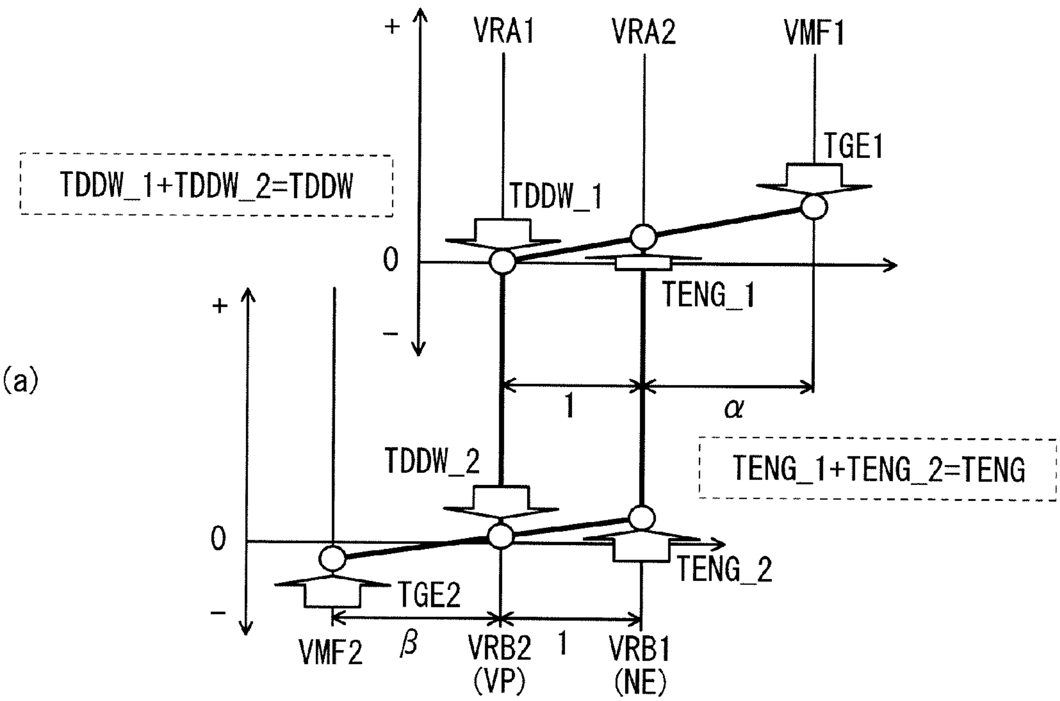
FIG. 42(*a*) shows an example of collinear charts of the first and second rotating machines 21 and 31 during ENG creep, of the power unit shown in FIG. 1, and FIG. 42(*b*) shows a combined collinear chart obtained by combining two collinear charts.
Figure 42:
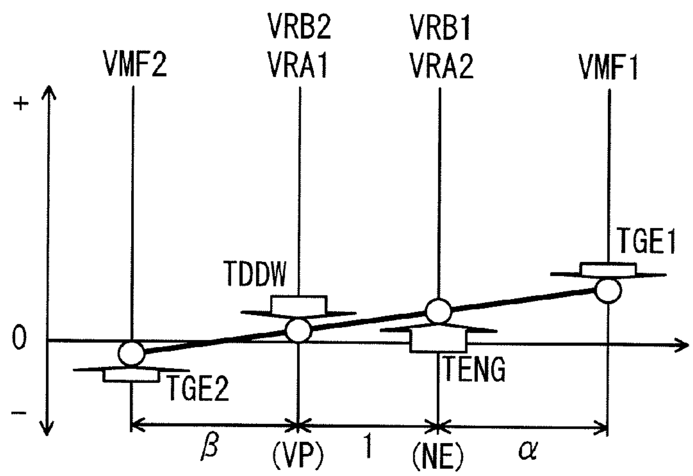

FIG. 41 shows a state of transmission of torque during the above-described ENG creep. FIG. 42(*a*) shows examples of collinear charts of the first and second rotating machines 21 and 31 during the ENG creep, and FIG. 42(*b*) shows a combined collinear chart obtained by combining the two collinear charts shown in FIG. 42(*a*). As shown in FIG. 41, during the ENG creep, similarly to the case of the above-described battery input/output zero mode, along with the above-described electric power generation by the stator 23, part of the engine torque TENG is transmitted to the A2 rotor 25, and the engine torque TENG transmitted to the A2 rotor 25 is distributed to the stator 23 and the A1 rotor 24. Moreover, as shown in FIGS. 42(*a*) and 42(*b*), the second rotating magnetic field generated along with the electric power generation by the stator 33 performs reverse rotation. As a result, as shown in FIG. 41, although the vehicle speed VP is approximately equal to 0, the crankshaft 3*a* is performing normal rotation, so that similarly to the above-described case of the ENG start during stoppage of the vehicle, the second electric power-generating equivalent torque TGE2 generated by the above electric power generation acts on the B2 rotor 35 to cause the B2 rotor 35 to perform normal rotation. Moreover, the engine torque TENG transmitted to the B1 rotor 34 such that it is balanced with the second electric power-generating equivalent torque TGE2 is further transmitted to the B2 rotor 35, thereby acting on the B2 rotor 35 to cause the B2 rotor 35 to perform normal rotation. Furthermore, the engine torque TENG distributed to the A1 rotor 24 as described above, is transmitted to the B2 rotor 35.

As described above, during the ENG creep, combined torque formed by combining the engine torque TENG distributed to the A1 rotor 24, the second electric power-generating equivalent torque TGE2, and the engine torque TENG transmitted to the B1 rotor 34 is transmitted to the B2 rotor 35. Moreover, this combined torque is transmitted to the drive wheels DW and DW, for causing the drive wheels DW and DW to perform normal rotation. Furthermore, the electric power generated by the stators 23 and 33, and the first and second magnetic field rotational speeds VMF1 and VMF2 are controlled such that the A1 and B2 rotor rotational speeds VRA1 and VRB2, that is, the vehicle speed VP, becomes very small (see FIGS. 42(*a*) and 42(*b*)), whereby the creep operation is carried out.

Moreover, during the ENG creep, as described above, the engine torque TENG distributed to the A1 rotor 24 along with the electric power generation by the stator 23, and the engine torque TENG transmitted to the B2 rotor 35 through the B1 rotor 34 along with the electric power generation by the stator 33 are transmitted to the drive wheels DW and DW. That is, since part of the engine torque TENG can be transmitted to the drive wheels DW and DW, it is possible to prevent a large reaction force from the drive wheels DW and DW from acting on the engine 3. As a result, it is possible to perform the creep operation without causing engine stall. It should be noted that the above ENG creep operation is mainly carried out when the charged state is small or when the vehicle is ascending a slope.

<ENG-Based Start>

Figure 43:
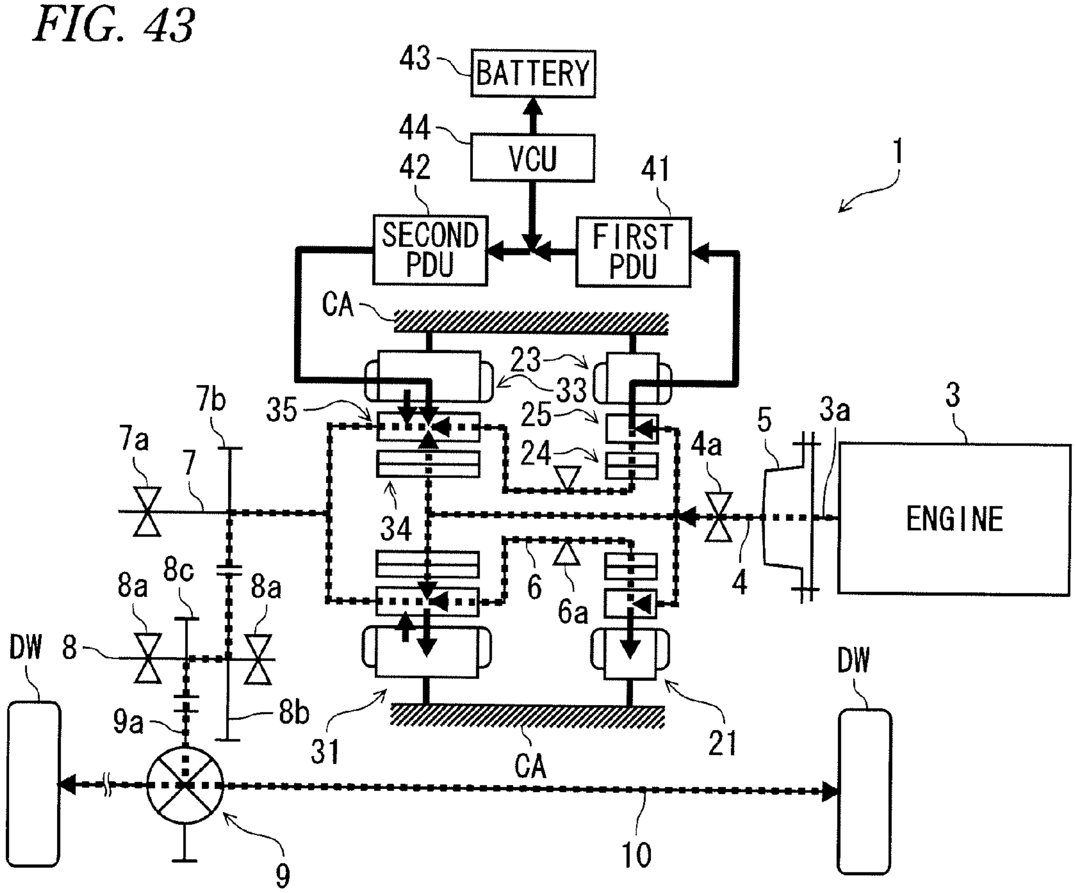
FIG. 43 is a diagram showing a state of transmission of torque in the power unit shown in FIG. 1 at the time of ENG-based start.

The ENG-based start is an operation mode for starting the vehicle using the engine motive power. FIG. 43 shows a state of transmission of torque at the time of the ENG-based start. At the time of the ENG-based start, the second magnetic field rotational speed VMF2 of the second rotating magnetic field that has been performing reverse rotation during the ENG creep is controlled such that it becomes equal to 0, the first magnetic field rotational speed VMF1 of the first rotating magnetic field that has been performing normal rotation during the ENG creep is increased, and the engine motive power is increased. Then, after the second magnetic field rotational speed VMF2 becomes equal to 0, the operation in the above-described battery input/output zero mode is performed. This causes, as indicated by thick solid lines in FIGS. 44(*a*) and 44(*b*), the A1 and B2 rotor rotational speeds VRA1 and VRB2, that is, the vehicle speed VP to be increased from a state of the ENG creep, indicated by broken lines in the figures, causing the vehicle to start.

<EV-Based Rearward Start>

Figure 45:
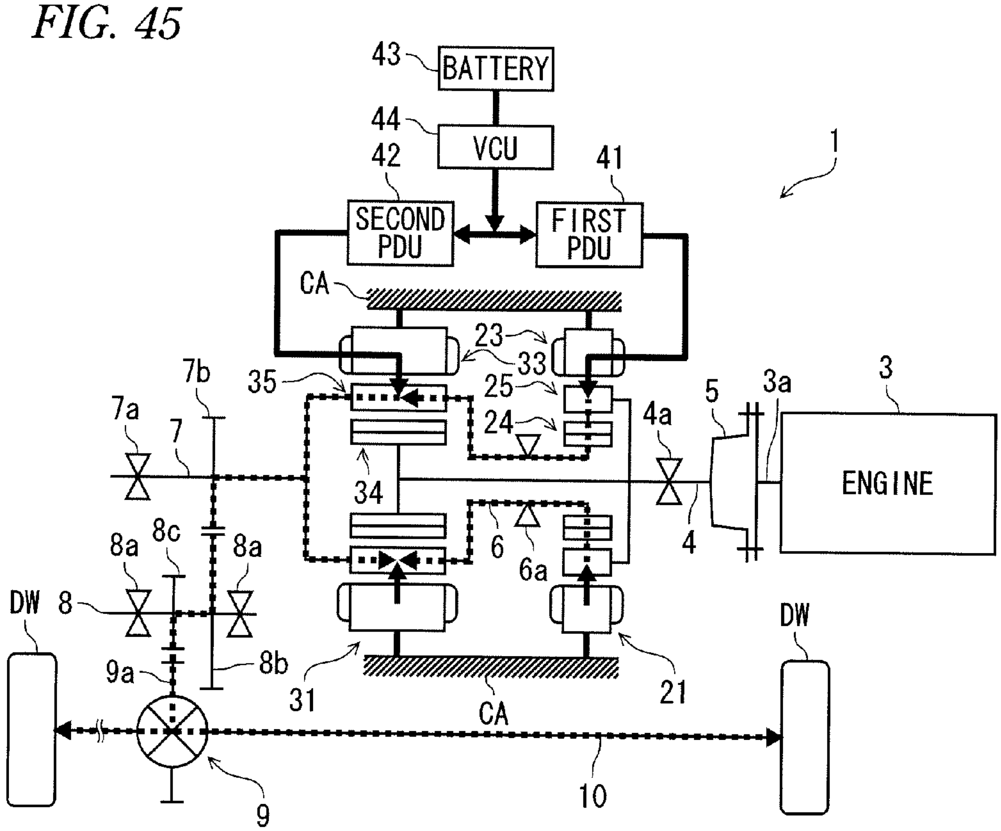
FIG. 45 is a diagram showing a state of transmission of torque in the power unit shown in FIG. 1 at the time of EV-based rearward start.
Figure 46:
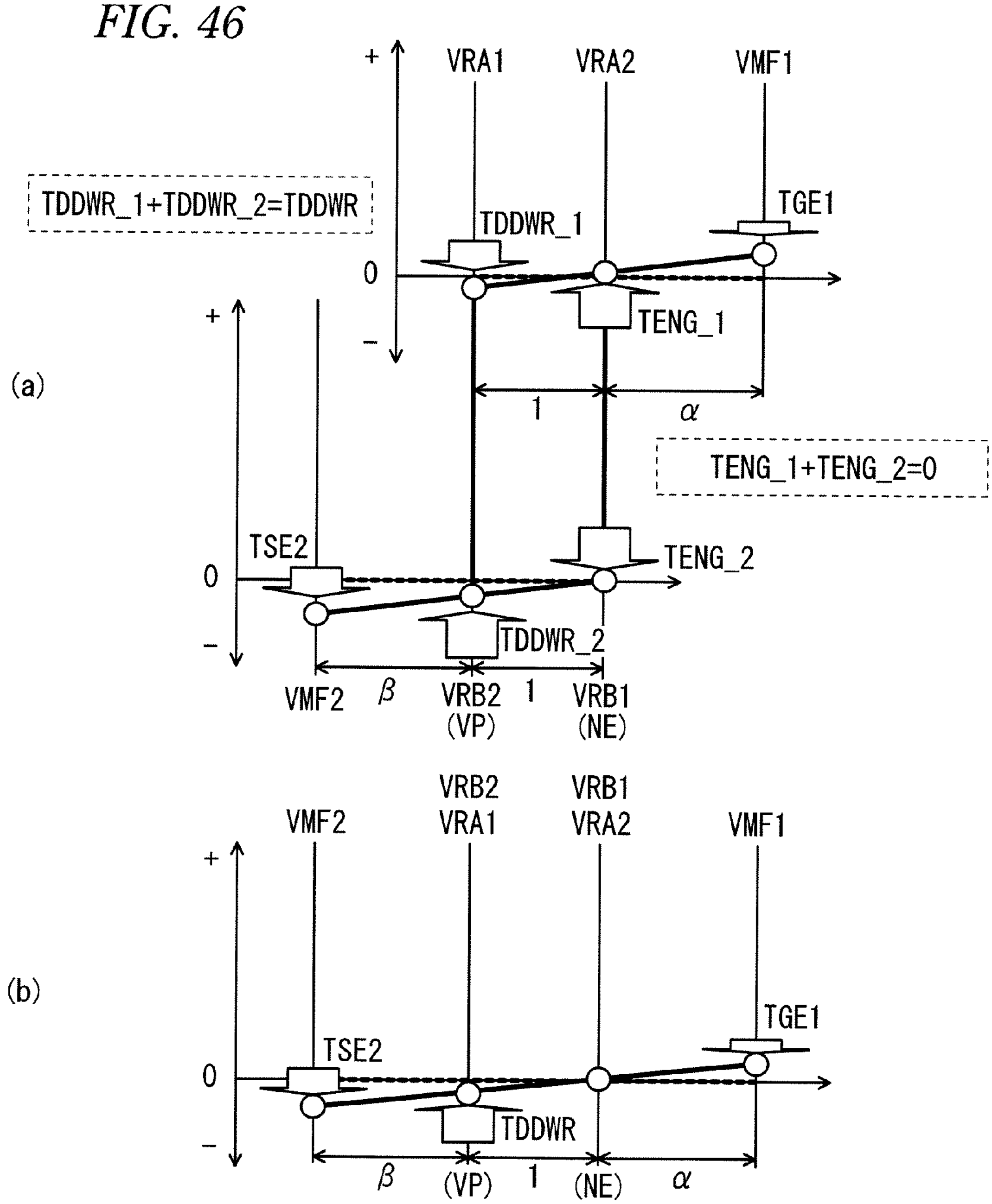
FIG. 46(*a*) shows an example of collinear charts of the first and second rotating machines 21 and 31 at the time of EV-based rearward start, of the power unit shown in FIG. 1, and FIG. 46(*b*) shows a combined collinear chart obtained by combining two collinear charts.

The EV-based rearward start is an operation mode for causing the vehicle to start rearward and travel using the first and second rotating machines 21 and 31 in the state where the engine 3 is stopped. FIG. 45 shows a state of transmission of torque during the EV-based rearward start. FIG. 46(*a*) shows examples of collinear charts of the first and second rotating machines 21 and 31 during the EV-based rearward start, and FIG. 46(*b*) shows a combined collinear chart obtained by the two collinear charts shown in FIG. 46(*a*).

At the time of the EV-based rearward start, electric power is supplied from the battery 43 to both the stator 33 of the second rotating machine 31 and the stator 23 of the first rotating machine 21. As a result, the first rotating magnetic field generated by the stator 23 is caused to perform normal rotation, and the second rotating magnetic field generated by the stator 33 is caused to perform normal rotation. As shown in FIGS. 46(*a*) and 46(*b*), during the EV-based rearward start, as the electric power is supplied to the stator 23 of the first rotating machine 21, the first driving equivalent torque from the stator 23 acts on the A2 rotor 25 to cause the A2 rotor 25 to perform normal rotation, and acts on the A1 rotor 24 to cause the A1 rotor 24 to perform reverse rotation. Moreover, as the electric power is supplied to the stator 33 of the second rotating machine 31, the second driving equivalent torque TSE2 from the stator 33 acts on the B2 rotor 35 to cause the B2 rotor 35 to perform reverse rotation, and acts on the B1 rotor 24 to cause the B1 rotor 24 to perform normal rotation. This causes, as indicated by thick solid lines in FIGS. 46(*a*) and 46(*b*), the A1 and B2 rotor rotational speeds VRA1 and VRB2, that is, the vehicle speed VP to be increased in the negative direction from the stopped state indicated by broken lines in the figures, causing the vehicle to start rearward.

<ENG-Based Rearward Start>

Figure 47:
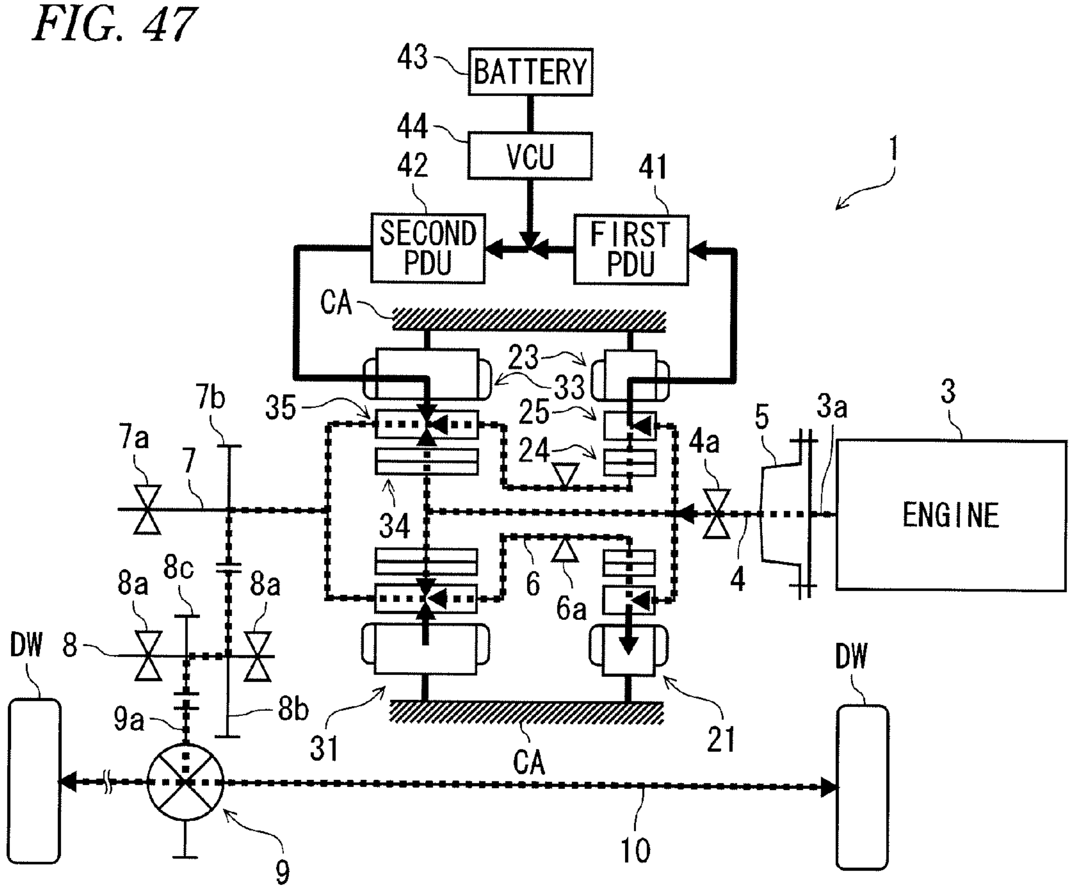
FIG. 47 is a diagram showing a state of transmission of torque in the power unit shown in FIG. 1 at the time of ENG-based rearward start.
Figure 48:
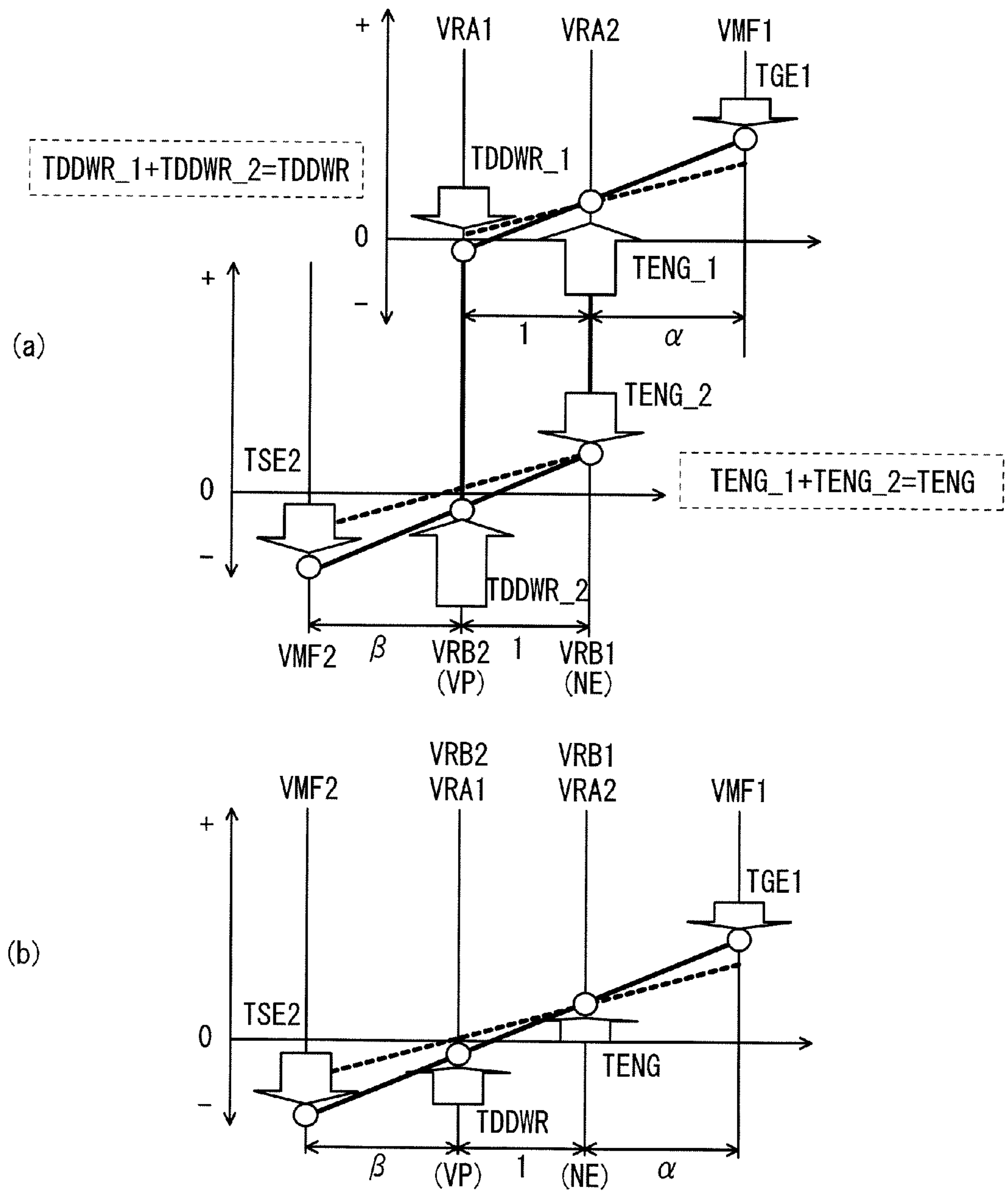
FIG. 48(*a*) shows an example of collinear charts of the first and second rotating machines 21 and 31 at the time of ENG-based rearward start, of the power unit shown in FIG. 1, and FIG. 48(*b*) shows a combined collinear chart obtained by combining two collinear charts.

The ENG-based rearward start is an operation mode for causing the vehicle to start rearward using the engine motive power. FIG. 47 shows a state of transmission of torque during the ENG-based rearward start. At the time of the ENG-based rearward start, the second magnetic field rotational speed VMF2 of the second rotating magnetic field that has been performing reverse rotation during the ENG creep is controlled to be increased further in the negative direction. The first magnetic field rotational speed VMF1 of the first rotating magnetic field that has been performing normal rotation increased, and the engine motive power is increased. This causes, as indicated by thick solid lines in FIGS. 48(*a*) and 48(*b*), the vehicle speed VP to be increased in the negative direction from the state of the ENG creep indicated by broken lines in the figures, causing the vehicle to start rearward.

As described above, according to the present embodiment, the first and second rotating machines 21 and 31 have the same functions as those of an apparatus formed by combining a planetary gear unit and a general one-rotor-type rotating machine. Thus, differently from the above-described conventional power unit, it is possible to dispense with the planetary gear unit for distributing and combining motive power for transmission, which makes it possible to reduce the size of the power unit 1 by the corresponding extent. Moreover, differently from the above-described conventional case, as already described with reference to FIG. 32, the engine motive power is transmitted to the drive wheels DW and DW without being recirculated. Therefore, it is possible to reduce motive power passing through the first and second rotating machines 21 and 31. In this way, it is possible to reduce the sizes and costs of the first and second rotating machines 21 and 31. Accordingly, it is possible to attain further reduction of the size and costs of the power unit 1. Moreover, by using the first and second rotating machines 21 and 31, each having a torque capacity corresponding to motive power reduced as described above, it is possible to suppress the loss of motive power to improve the driving efficiency of the power unit 1.

Moreover, the motive power from the engine is transmitted to the drive wheels DW and DW in a divided state via a total of three paths: the above-described first transmission path (the A2 rotor 25, magnetic forces caused by magnetic force lines ML, the A1 rotor 24, the connection shaft 6, and the B2 rotor 35), the second transmission path (the B1 rotor 34, magnetic forces caused by magnetic force lines ML, and the B2 rotor 35), and the third transmission path (the A2 rotor 25, magnetic forces caused by magnetic force lines ML, the stator 23, the first PDU 41, the second PDU 42, the stator 33, magnetic forces caused by magnetic force lines ML, and the B2 rotor 35). In this way, it is possible to reduce electric power (energy) passing through the first and second PDUs 41 and 42 in the third transmission path, so that it is possible to reduce the sizes and costs of the first and second PDUs 41 and 42. As a result, it is possible to attain further reduction of the size and costs of the power unit 1. Moreover, although in the third transmission path, the engine motive power is transmitted to the drive wheels DW and DW through the electrical paths, in the first and second transmission paths, the motive power is transmitted to the drive wheels DW and DW via the magnetic paths, so that the first and second transmission paths are higher in transmission efficiency than the third transmission path.

Moreover, as described above with reference to FIGS. 33(*a*) and 33(*b*), the engine motive power is transmitted to the drive wheels DW and DW while having the speed thereof steplessly changed by controlling the first and second magnetic field rotational speeds VMF1 and VMF2. Moreover, in this case, the first and second magnetic field rotational speeds VMF1 and VMF2 are controlled such that the engine speed NE becomes equal to the target engine speed set to a value that will make it possible to obtain the optimum fuel economy of the engine 3, and therefore it is possible to drive the drive wheels DW and DW while controlling the engine motive power such that the optimum fuel economy of the engine 3 can be obtained. In this way, it is possible to further enhance the driving efficiency of the power unit 1.

Moreover, the first pole pair number ratio $\alpha$ of the first rotating machine 21 is set to 2.0, and therefore at the time of the ENG start during EV traveling when the torque required of the first rotating machine 21 becomes particularly large, as described above using the above-described equation (51), it is possible to make the first electric power-generating equivalent torque TGE1 smaller than that when the first pole pair number ratio $\alpha$ is set to a value smaller than 1.0. In this way, it is possible to further reduce the size and costs of the first rotating machine 21. Furthermore, since the second pole pair number ratio $\beta$ of the second rotating machine 31 is set to 2.0, it is possible to make the second driving equivalent torque TSE2 smaller than that when the second pole pair number ratio $\beta$ is set to a value smaller than 1.0, at the start of the rapid acceleration operation during the ENG traveling in which torque required of the second rotating machine 31 becomes particularly large, as described above using the above-described equation (52). In this way, it is possible to further reduce the size and costs of the second rotating machine 31.

The operation in the drive-time charging mode is performed when the vehicle motive power demand is smaller than the engine motive power that will make it possible to obtain the optimum fuel economy of the engine, and during the drive-time charging mode, the engine motive power is controlled such that the optimum fuel economy of the engine can be obtained, and the surplus amount of the engine motive power with respect to the vehicle motive power demand is charged into the battery 43 as electric power. Moreover, the operation in the assist mode is performed when the vehicle motive power demand is larger than the engine motive power that will make it possible to obtain the optimum fuel economy of the engine, and during the assist mode, the engine motive power is controlled such that the optimum fuel economy of the engine can be obtained. Moreover, the insufficient amount of the engine motive power with respect to the vehicle motive power demand is made up for by supply of electric power from the battery 43. Therefore, it is possible to further enhance the driving efficiency of the power unit 1 irrespective of the volume of the load of the drive wheels DW and DW.

<Battery SOC-Based Control>

As described above, in accordance with the operation mode of the power unit 1 of the present embodiment, electric power is supplied from the battery 43 to the first rotating machine 21 and/or the second rotating machine 31, and electric power generated by the first rotating machine 21 and/or the second rotating machine 31 is charged into the battery 43. Moreover, as described above, the ECU 2 calculates the charge state of the battery 43 based on the detection signal from the current-voltage sensor 56.

Figure 49:
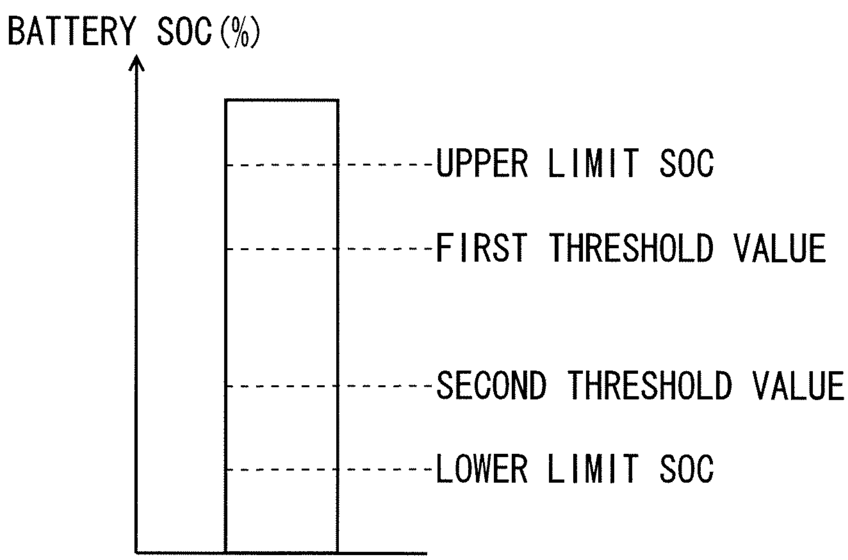
FIG. 49 is a diagram showing the range of battery SOC when a battery is repeatedly charged and discharged.

The battery 43 is formed by a secondary battery such as a nickel-hydrogen battery or a lithium-ion battery. In order to sufficiently utilize the performance of a secondary battery, it is necessary to always monitor the remaining capacity (SOC: State of Charge) thereof and prevent overcharge and overdischarge. Thus, the ECU 2 of the present embodiment performs control according to the SOC (hereinafter referred to as a "battery SOC") of the battery 43. FIG. 49 is a diagram showing the range of battery SOC when a battery is repeatedly charged and discharged. As shown in FIG. 49, the ECU 2 controls the operation of the engine 3 and the first and second rotating machines 21 and 31 so that the battery SOC falls within the range from the lower limit SOC and the upper limit SOC.

<Overcharge Preventing Control at the Time of ENG-Based Start>

When the operation mode of the power unit 1 is "ENG-based start," the stator 23 of the first rotating machine 21 performs regenerative electric power generation as shown in FIG. 43. Moreover, as indicated by broken lines in FIGS. 44(*a*) and 44(*b*), immediately after the power unit 1 performs the operation of ENG-based start, the direction of rotation of the second rotating magnetic field in the stator 33 of the second rotating machine 31 is the direction of reverse direction, and a positive torque from the stator 33 acts on the B2 rotor 35. Thus, regenerative electric power generation is also performed in the stator 33. In this case, the battery 43 is charged with the regenerative energy from both the first rotating machine 21 and the second rotating machine 31.

Figure 44:
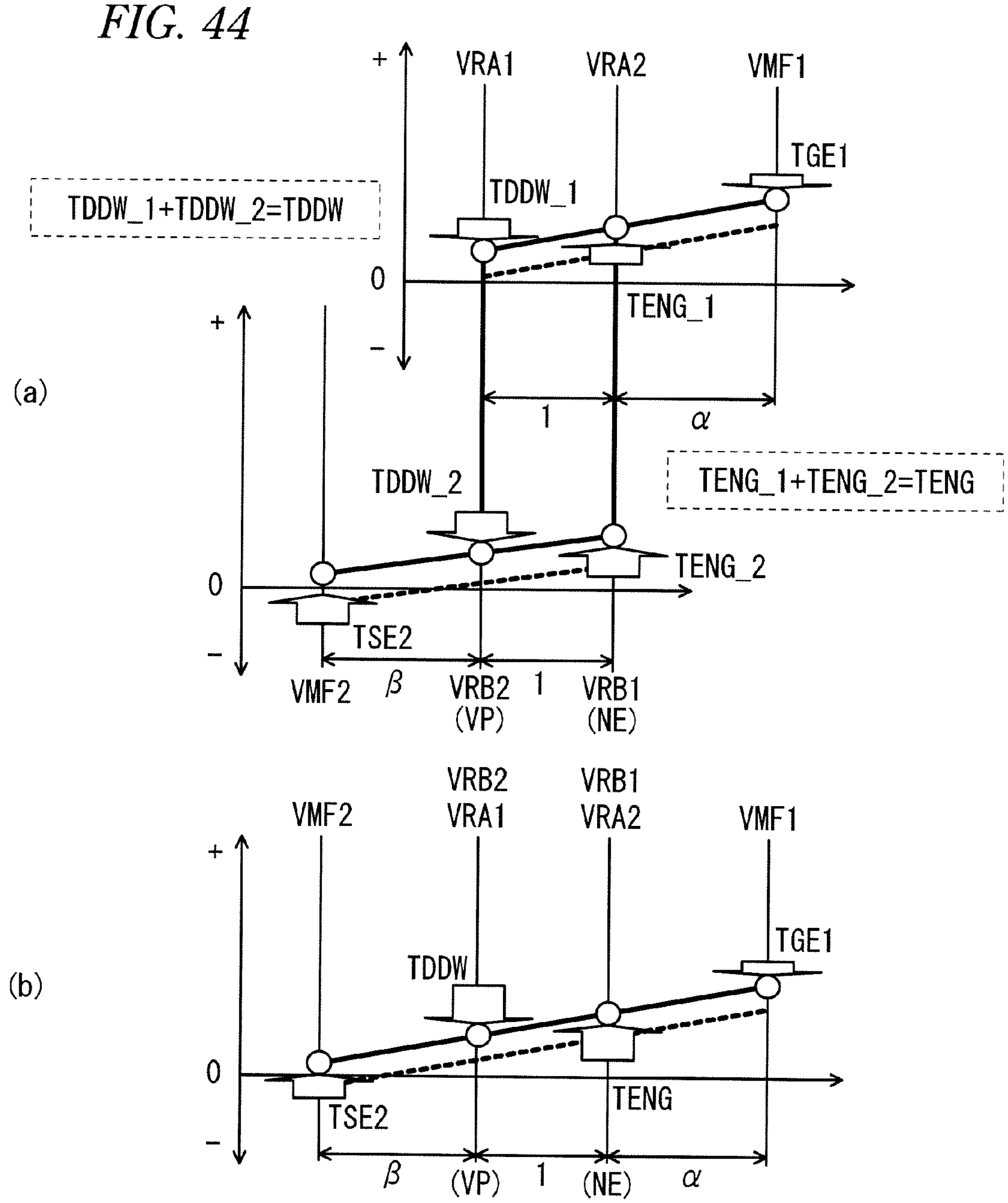
FIG. 44(*a*) shows an example of collinear charts of the first and second rotating machines 21 and 31 at the time of ENG-based start, of the power unit shown in FIG. 1, and FIG. 44(*b*) shows a combined collinear chart obtained by combining two collinear charts.

Moreover, when the power unit 1 continues the operation of ENG-based start, and as indicated by thick solid lines in FIGS. 44(*a*) and 44(*b*), the direction of rotation of the second rotating magnetic field in the stator 33 of the second rotating machine 31 becomes the direction of normal direction, the stator 33 is in a powering operating condition. Thus, electric energy is consumed. In this case, the regenerative energy obtained by regenerative electric power generation of the first rotating machine 21 is used as the electric energy supplied to the second rotating machine 31. When the regenerative energy obtained by the first rotating machine 21 is greater than the electric energy consumed by the second rotating machine 31, the battery 43 is charged with the remaining regenerative energy.

As above, when the operation mode of the power unit 1 is "ENG-based start," the battery 43 is charged with regenerative energy. However, when the battery 43 is charged in a state where the battery SOC is close to the upper limit SOC, the battery SOC may exceed the upper limit SOC. Thus, the ECU 2 performs the following control described later when the battery SOC is not lower than a first threshold value lower than the upper limit SOC shown in FIG. 49.

Figure 50:
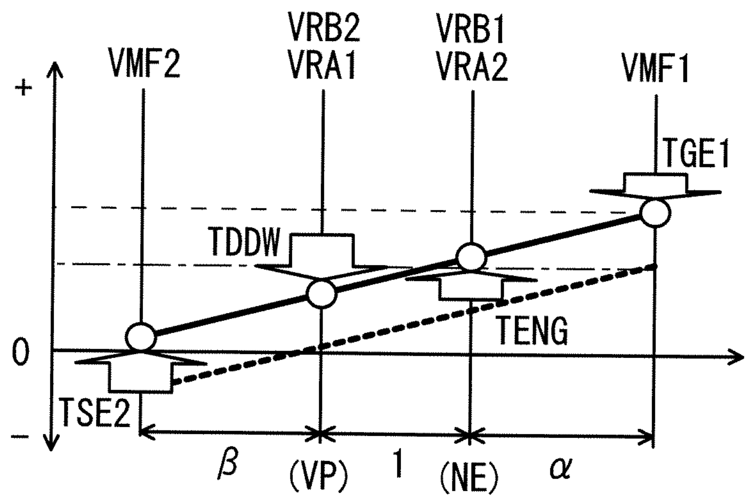
FIGS. 50(*a*) and 50(*b*) show collinear charts when the operation mode of the power unit 1 is "ENG-based start," in which FIG. 50(*a*) shows a collinear chart when the battery SOC is lower than a first threshold value, and FIG. 50(*b*) shows a collinear chart when the battery SOC is not lower than the first threshold value.
Figure 50:
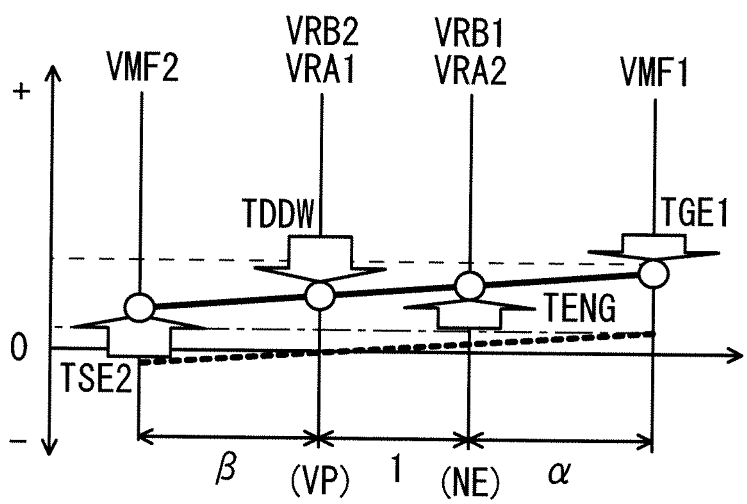

When the operation mode of the power unit 1 is "ENG-based start," and the battery SOC is not lower than the first threshold value, the ECU 2 controls the engine 3 so that the engine 3 operates with a shaft rotational speed lower than the ENG shaft rotational speed demand of the engine 3 described with reference to FIG. 23 without changing the output torque (the torque T12). FIGS. 50(*a*) and 50(*b*) show collinear charts when the operation mode of the power unit 1 is "ENG-based start," in which FIG. 50(*a*) shows a collinear chart when the battery SOC is lower than the first threshold value, and FIG. 50(*b*) shows a collinear chart when the battery SOC is not lower than the first threshold value. As shown in FIG. 50(*b*), when the shaft rotational speed of the engine 3 is restricted to be low, the first magnetic field rotational speed VMF1 of the first rotating magnetic field in the stator 23 of the first rotating machine 21 is controlled to be lower than the first magnetic field rotational speed VMF1 shown in FIG. 50(*a*). As a result, the regenerative energy generated by the first rotating machine 21 of the case shown in FIG. 50(*b*) becomes lower than the regenerative energy of the case shown in FIG. 50(*a*). When the direction of rotation of the second rotating magnetic field in the stator 33 of the second rotating machine 31 is the direction of reverse rotation, the regenerative energy generated by the second rotating machine 31 of the case shown in FIG. 50(*b*) becomes lower than the regenerative energy of the case shown in FIG. 50(*a*). In addition, when the direction of rotation of the second rotating magnetic field in the stator 33 of the second rotating machine 31 is the direction of normal rotation, the energy consumed by the second rotating machine 31 of the case shown in FIG. 50(*b*) becomes higher than the consumed energy of the case shown in FIG. 50(*a*).

As above, when the operation mode of the power unit 1 is "ENG-based start," the ECU 2 controls the engine 3 so that the engine 3 operates with a shaft rotational speed lower than the ENG shaft rotational speed demand without changing the output torque, whereby the amount of electric power charged into the battery 43 decreases. Thus, when the battery SOC is not lower than the first threshold value close to the upper limit SOC, the ECU 2 performs such control, whereby overcharge of the battery 43 can be prevented. In this case, as the result of the control, the output of the engine 3 decreases. However, as shown in FIG. 50(*b*), since the torque from the second rotating machine 31 is added, there is no change in the output torque transmitted to the drive wheels DW and DW.

The torque required of the engine 3 by the ECU 2 at the time of performing the control described above may be smaller than the ENG torque demand described with reference to FIG. 23. When controlling the engine 3 so as to operate at the optimum operating point, the ECU 2 controls the engine 3 so as to output a torque corresponding to the shaft rotational speed at the time of performing the control. Since the torque at the optimum operating point in the low shaft rotational speed of the engine 3 is approximately proportional to the shaft rotational speed, the torque at that time is smaller than the ENG torque demand. Although the output of the engine 3 decreases further if such control is performed, the engine 3 can operate at the optimum operating point.

Moreover, in the above control, the engine 3 is controlled so as to operate with a shaft rotational speed lower than the ENG shaft rotational speed demand of the engine 3. However, when the regenerative energy per unit time generated in the stator 23 of the first rotating machine 21 with respect to the torque required of the engine 3 exceeds a prescribed value, the engine 3 may be controlled so as to output a torque lower than the ENG torque demand described with reference to FIG. 23. In this case, the shaft rotational speed of the engine 3 may be the same as or not be larger than the ENG shaft rotational speed demand described with reference to FIG. 23.

<Overdischarge Preventing Control at the Time of EV Traveling>

When the operation mode of the power unit 1 is "EV traveling," the stator 33 of the second rotating machine 31 is in a powering operating condition, and the stator 23 of the first rotating machine 21 performs regenerative electric power generation as shown in FIG. 27. The regenerative energy obtained by regenerative electric power generation of the first rotating machine 21 is transmitted to the stator 33, and deficient electric power is supplied from the battery 43.

As above, when the operation mode of the power unit 1 is "EV traveling," the battery 43 performs discharge. However, when the battery 43 is discharged in a state where the battery SOC is close to the lower limit SOC, the battery SOC may become lower than the lower limit SOC. Thus, the ECU 2 performs the following control described later when the battery SOC is not higher than a second threshold value higher than the lower limit SOC shown in FIG. 49.

Figure 51:
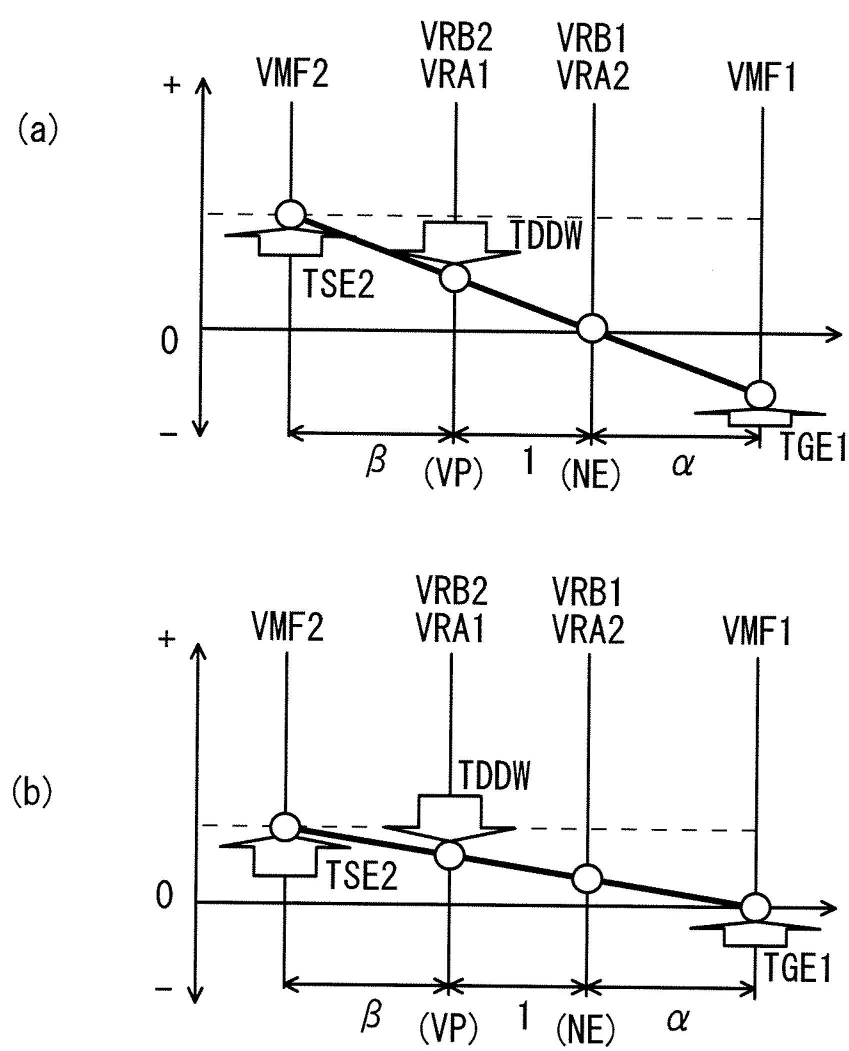
FIGS. 51(*a*) and 51(*b*) show collinear charts when the operation mode of the power unit 1 is "EV traveling," in which FIG. 51(*a*) shows a collinear chart when the battery SOC is higher than a second threshold value, and FIG. 51(*b*) shows a collinear chart when the battery SOC is not higher than the second threshold value.

When the operation mode of the power unit 1 is "EV traveling," and the battery SOC is not higher than the second threshold value, the ECU 2 controls the engine 3 so that the engine 3 operates at the optimum operating point. FIGS. 51(*a*) and 51(*b*) show collinear charts when the operation mode of the power unit 1 is "EV traveling," in which FIG. 51(*a*) shows a collinear chart when the battery SOC is higher than the second threshold value, and FIG. 51(*b*) shows a collinear chart when the battery SOC is not higher than the second threshold value. As shown in FIG. 51(*b*), when the engine 3 is driven, the second magnetic field rotational speed VMF2 of the second rotating magnetic field in the stator 33 of the second rotating machine 31 is controlled to be lower than the second magnetic field rotational speed VMF2 shown in FIG. 51(*a*). As a result, the energy consumed by the second rotating machine 31 decreases. The upper limit of the shaft rotational speed of the engine 3 at the time of performing the control is a rotational speed obtained when the first magnetic field rotational speed VMF1 of the first rotating magnetic field in the stator 23 of the first rotating machine 21 is controlled to be 0.

As above, when the operation mode of the power unit 1 is "EV traveling," the engine 3 is controlled to operate, whereby the amount of electric power discharged from the battery 43 decreases. Thus, when the battery SOC is not higher than the second threshold value close to the lower limit SOC, the ECU 2 performs the control, whereby overdischarge of the battery 43 is prevented.

The second threshold value is variable. The energy required for the first rotating machine 21 to start the engine 3 is different depending on the vehicle speed VP, and the required energy is large as the vehicle speed VP increases. Thus, the ECU 2 sets the second threshold value corresponding to the vehicle speed VP. That is, the ECU 2 sets the second threshold value to be high as the vehicle speed VP increases.

<Overdischarge Preventing Control at the Time of ENG-Based Rearward Start>

When the operation mode of the power unit 1 is "ENG-based rearward start," the stator 33 of the second rotating machine 31 is in a powering operating condition, and the stator 23 of the first rotating machine 21 performs regenerative electric power generation as shown in FIG. 47. The regenerative energy obtained by regenerative electric power generation of the first rotating machine 21 is transmitted to the stator 33, and deficient electric power is supplied from the battery 43.

As above, when the operation mode of the power unit 1 is "ENG-based rearward start," the battery 43 performs discharge. However, when the battery 43 is discharged in a state where the battery SOC is close to the lower limit SOC, the battery SOC may become lower than the lower limit SOC. Thus, the ECU 2 performs the following control described later, when the battery SOC is not higher than a second threshold value higher than the lower limit SOC shown in FIG. 49.

Figure 52:
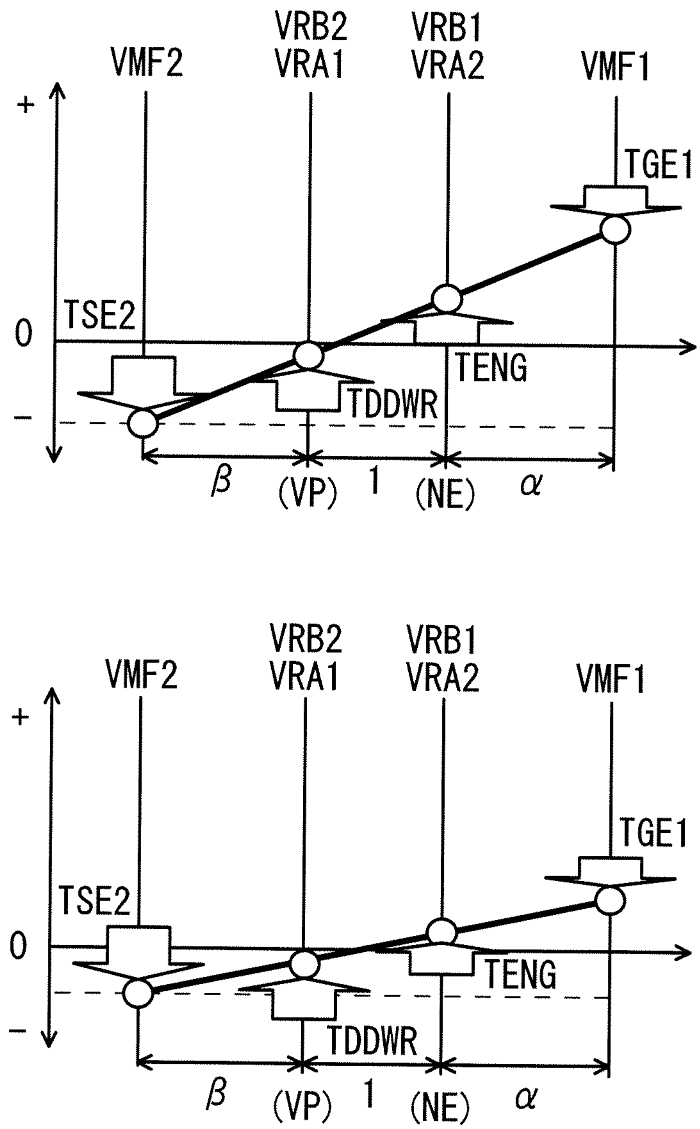
FIGS. 52(*a*) and 52(*b*) show collinear charts when the operation mode of the power unit 1 is "ENG-based rearward start," in which FIG. 52(*a*) shows a collinear chart when the battery SOC is higher than a second threshold value, and FIG. 52(*b*) shows a collinear chart when the battery SOC is not higher than the second threshold value.

When the operation mode of the power unit 1 is "ENG-based rearward start," and the battery SOC is not higher than the second threshold value, the ECU 2 controls the engine 3 so that the engine 3 operates with a shaft rotational speed lower than the ENG shaft rotational speed demand of the engine 3 described with reference to FIG. 23 without changing the output torque (the torque T12). FIGS. 52(*a*) and 52(*b*) show collinear charts when the operation mode of the power unit 1 is "ENG-based rearward start," in which FIG. 52(*a*) shows a collinear chart when the battery SOC is higher than the second threshold value, and FIG. 52(*b*) shows a collinear chart when the battery SOC is not higher than the second threshold value. As shown in FIG. 52(*b*), when the shaft rotational speed of the engine 3 is restricted to be low, the absolute value of the second magnetic field rotational speed VMF2 of the second rotating magnetic field in the stator 33 of the second rotating machine 31 is controlled to be lower than the absolute value of the second magnetic field rotational speed VMF2 shown in FIG. 52(*a*). As a result, the energy consumed by the second rotating machine 31 decreases.

As above, when the operation mode of the power unit 1 is "ENG-based rearward start," the ECU 2 controls the engine 3 so that the engine 3 operates with a shaft rotational speed lower than the ENG shaft rotational speed demand without changing the output torque, whereby the amount of electric power charged into the battery 43 decreases. Thus, when the battery SOC is not higher than the second threshold value close to the upper limit SOC, the ECU 2 performs such control, whereby overdischarge of the battery 43 can be prevented. In this case, as the result of the control, the output of the engine 3 decreases. However, since the output torque of the engine 3 is not changed, there is no change in the output torque transmitted to the drive wheels DW and DW.

The torque required of the engine 3 by the ECU 2 at the time of performing the control described above may be smaller than the ENG torque demand described with reference to FIG. 23. When controlling the engine 3 so as to operate at the optimum operating point, the ECU 2 controls the engine 3 so as to output a torque corresponding to the shaft rotational speed at the time of performing the control. Since the torque at the optimum operating point in the low shaft rotational speed of the engine 3 is approximately proportional to the shaft rotational speed, the torque at that time is smaller than the ENG torque demand. Although the output of the engine 3 decreases further if such control is performed, the engine 3 can operate at the optimum operating point.

Moreover, in the above control, the engine 3 is controlled so as to operate with a shaft rotational speed lower than the ENG shaft rotational speed demand of the engine 3. However, when the energy per unit time consumed in the stator 33 of the second rotating machine 31 with respect to the torque required of the engine 3 exceeds a prescribed value, the engine 3 may be controlled so as to output a torque lower than the ENG torque demand described with reference to FIG. 23. In this case, the shaft rotational speed of the engine 3 may be the same as or not be larger than the ENG shaft rotational speed demand described with reference to FIG. 23.

Second to Fifth Embodiments

Next, power units 1A, 1B, 1C, and 1D according to second to fifth embodiments will be described with reference to FIGS. 53 to 56. These power units 1A to 1D are distinguished from the first embodiment mainly in that they further include transmissions 61, 71, 81 and 91, respectively. In any one of the second to fifth embodiments, the connection relationship between the engine 3, the first and second rotating machines 21 and 31, and the drive wheels DW and DW is the same as the connection relationship in the first embodiment. More specifically, the A2 and B1 rotors 25 and 34 are mechanically connected to the crankshaft 3*a* of the engine 3, and the A1 and B2 rotors 24 and 35 are mechanically connected to the drive wheels DW and DW. Moreover, in FIGS. 53 to 56, constituent elements identical to those of the first embodiment are denoted by the same reference numerals. This also similarly applies to figures for use in describing the other embodiments described later. In the following description, different points of the power units 1A to 1D from the first embodiment will be mainly described in order from the power unit 1A of the second embodiment.

Second Embodiment

Figure 53:
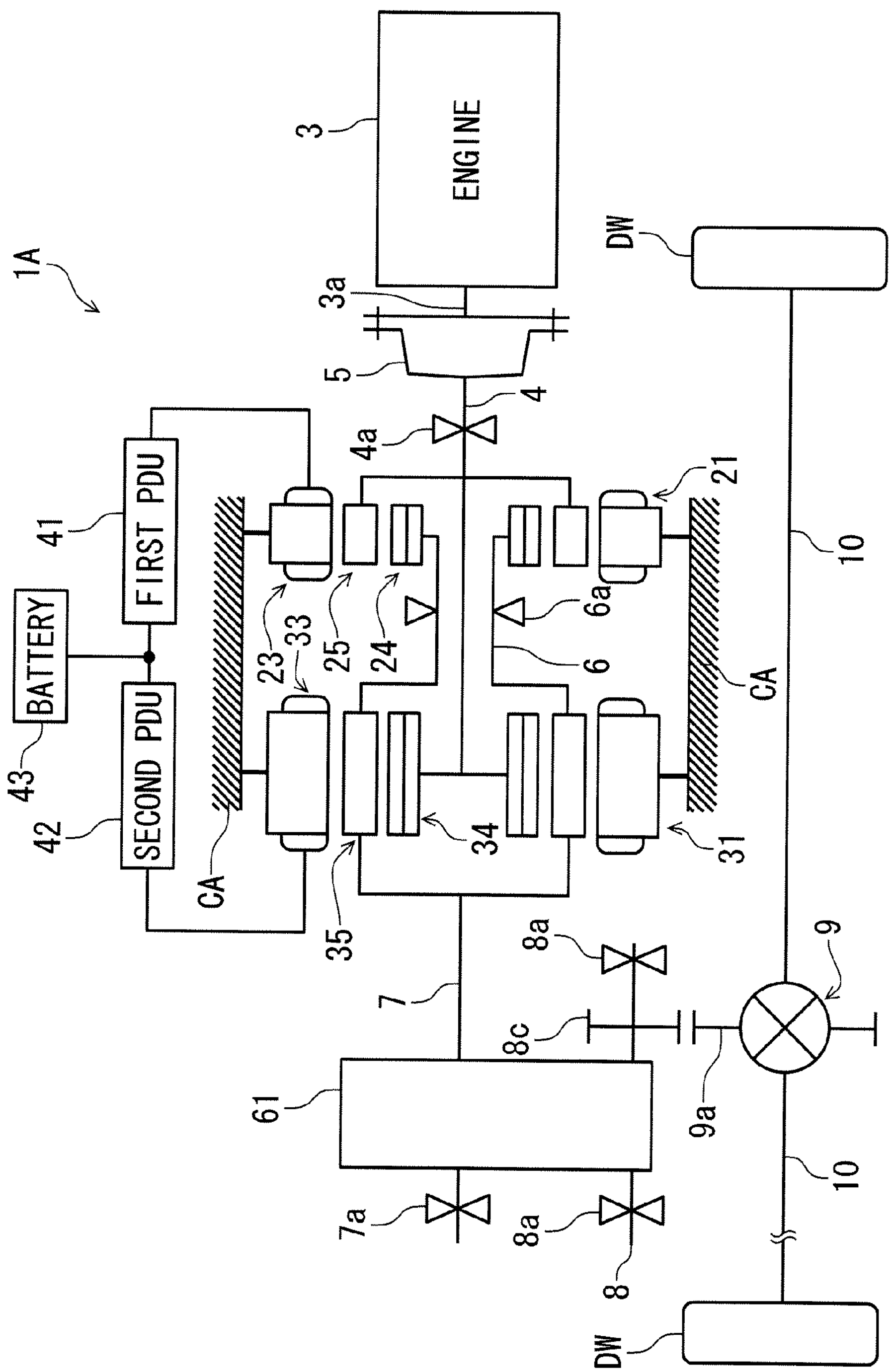
FIG. 53 is a diagram schematically showing a power unit according to a second embodiment.

Referring to FIG. 53, in the power unit 1A, the transmission 61 is provided in place of the gear 7*b* and the first gear 8*b* which are in mesh with each other. This transmission 61 is a belt-type stepless transmission, and includes an input shaft connected to the above-described second rotating shaft 7, an output shaft connected to the idler shaft 8, pulleys provided on the input shaft and the output shaft, respectively, and a metal belt wound around the pulleys, none of which are shown. The transmission 61 changes the effective diameters of the pulleys, thereby outputting motive power input to the input shaft to the output shaft while changing the speed thereof. Moreover, the transmission ratio of the transmission 61 (the rotational speed of the input shaft/the rotational speed of the output shaft) is controlled by the ECU 2.

As described above, the transmission 61 is provided between the A1 and B2 rotors 24 and 35 and the drive wheels DW and DW, and the motive power transmitted to the A1 and B2 rotors 24 and 35 is transmitted to the drive wheels DW and DW while having the speed thereof changed by the transmission 61.

In the power unit 1A configured as above, when a very large torque is transmitted from the A1 and B2 rotors 24 and 35 to the drive wheels DW and DW, for example, during the above-described EV start and ENG-based start, the transmission ratio of the transmission 61 is controlled to a predetermined lower-speed value larger than 1.0. This causes the transmission 61 to increase torque transmitted to the A1 and B2 rotors 24 and 35, and then the increased torque is transmitted to the drive wheels DW and DW. In accordance with this, electric power generated by the first rotating machine 21 and electric power supplied to the second rotating machine 31 (generated electric power) are controlled such that the torque transmitted to the A1 and B2 rotors 24 and 35 becomes smaller. Therefore, according to the present embodiment, the respective maximum values of torque required of the first and second rotating machines 21 and 31 can be reduced. As a result, it is possible to further reduce the sizes and costs of the first and second rotating machines 21 and 31.

Moreover, in cases where the A1 and B2 rotor rotational speeds VRA1 and VRB2 become too high, for example, during the high-vehicle speed operation in which the vehicle speed VP is very high, the transmission ratio of the transmission 61 is controlled to a predetermined higher-speed value smaller than 1.0. In this way, it is possible to lower the A1 and B2 rotor rotational speeds VRA1 and VRB2 with respect to the vehicle speed VP, and hence it is possible to prevent failure of the first and second rotating machines 21 and 31 from being caused by the A1 and B2 rotor rotational speeds VRA1 and VRB2 becoming too high. The above-described control is particularly effective because as described above, the A1 rotor 24 is formed by magnets and the magnets are lower in strength than soft magnetic material elements, so that the above-described inconveniences are liable to occur.

Furthermore, during traveling of the vehicle, including the EV traveling and the ENG traveling, the transmission ratio of the transmission 61 is controlled such that the first and second magnetic field rotational speeds VMF1 and VMF2 become equal to first and second predetermined target values, respectively. The first and second target values are calculated by searching a map according to the vehicle speed VP when only the first and second rotating machines 21 and 31 are used as motive power sources, whereas when the engine 3 and the first and second rotating machines 21 and 31 are used as motive power sources, the first and second target values are calculated by searching a map other than the above-described map according to the engine speed NE and the vehicle speed VP. Moreover, in these maps, the first and second target values are set to such values that high efficiencies of the first and second rotating machines 21 and 31 are obtained with respect to the vehicle speed VP (and the engine speed NE) assumed then. Furthermore, in parallel with the above control of the transmission 61, the first and second magnetic field rotational speeds VMF1 and VMF2 are controlled to the first and second target values, respectively. In this way, according to the present embodiment, during traveling of the vehicle, it is possible to obtain the high efficiencies of the first and second rotating machines 21 and 31.

Moreover, as described above with reference to FIGS. 33(*a*) and 33(*b*), if the first and second rotating machines 21 and 31 are used, it is possible to transmit the engine motive power to the drive wheels DW and DW while steplessly changing the speed thereof. As a result, it is possible to reduce the frequency of the speed-changing operation of the transmission 61. In this way, it is possible to suppress heat losses by the speed-changing operation, whereby it is possible to ensure the high driving efficiency of the power unit 1A. In addition to this, according to the present embodiment, it is possible to obtain the same advantageous effects as provided by the first embodiment.

It should be noted that although in the present embodiment, the transmission 61 is a belt-type stepless transmission, it is to be understood that a toroidal-type stepless transmission or a gear-type stepped transmission may be employed.

Third Embodiment

Figure 54:
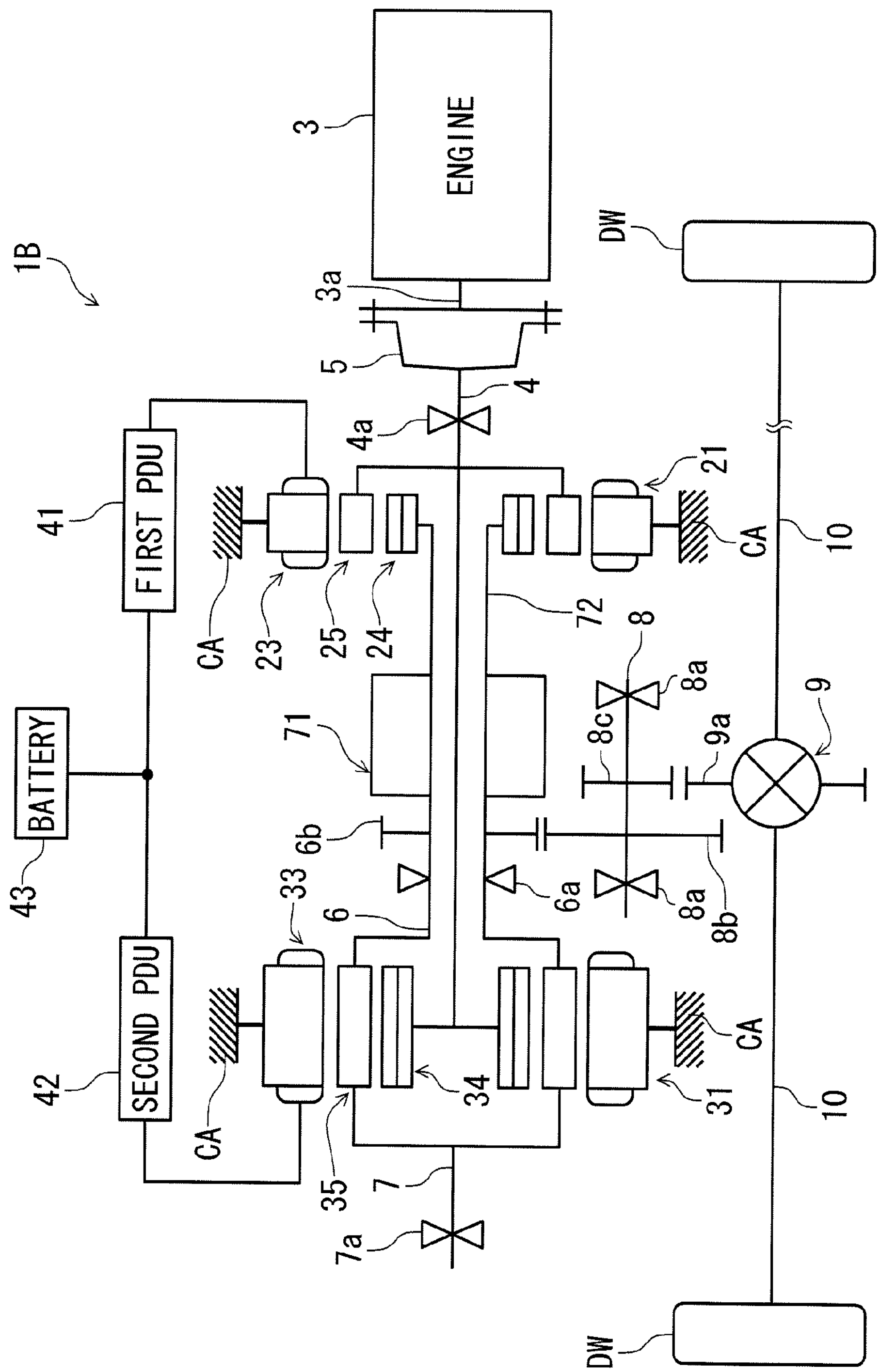
FIG. 54 is a diagram schematically showing a power unit according to a third embodiment.

In the power unit 1B according to the third embodiment shown in FIG. 54, the transmission 71 is a gear-type stepped transmission including an input shaft 72 and an output shaft (not shown), a plurality of gear trains different in gear ratio from each other, and clutches (not shown) for engaging and disengaging between the gear trains, and the input shaft 72 and the output shaft, on a gear train-by-gear train basis. The transmission 71 changes the speed of motive power inputted to the input shaft 72 by using one of the gear trains, and outputs the motive power changed in speed to the output shaft. Moreover, in the transmission 71, a total of four speed positions, that is, a first speed (transmission ratio=the rotational speed of the input shaft 72/the rotational speed of the output shaft>1.0), a second speed (transmission ratio=1.0), a third speed (transmission ratio<1.0) for forward travel, and one speed position for rearward travel can be set using these gear trains, and the ECU 2 controls a change between these speed positions.

Moreover, in the power unit 1B, differently from the first embodiment, the second rotating shaft 7 is not provided with the gear 7*b*, and the A1 and B2 rotors 24 and 35 are connected to the drive wheels DW and DW, in the following manner. The A1 rotor 24 is directly connected to the input shaft 72 of the transmission 71, and the output shaft of the transmission 71 is directly connected to the above-described connection shaft 6. The connection shaft 6 is integrally formed with a gear 6*b*, and the gear 6*b* is in mesh with the above-described first gear 8*b*.

As described above, the A1 rotor 24 is mechanically connected to the drive wheels DW and DW through the transmission 71, the gear 6*b*, the first gear 8*b*, the idler shaft 8, the second gear 8*c*, the gear 9*a* and the differential gear mechanism 9 and the like. Moreover, the motive power transmitted to the A1 rotor 24 is transmitted to the drive wheels DW and DW while having the speed thereof changed by the transmission 71. Furthermore, the B2 rotor 35 is mechanically connected to the drive wheels DW and DW through the connection shaft 6, the gear 6*b*, the first gear 8*b*, and the like, without passing through the transmission 71.

In the power unit 1B configured as above, in cases where a very large torque is transmitted from the A1 rotor 24 to the drive wheels DW and DW, for example, at the time of the ENG-based start, the speed position of the transmission 71 is controlled to the first speed (transmission ratio>1.0). This causes the transmission 71 to increase torque transmitted to the A1 rotor 24, and then the increased torque is transmitted to the drive wheels DW and DW. In accordance with this, the electric power generated by the first rotating machine 21 is controlled such that the torque transmitted to the A1 rotor 24 becomes smaller. In this way, according to the present embodiment, the maximum value of the torque required of the first rotating machine 21 can be reduced. As a result, it is possible to further reduce the size and costs of the first rotating machine 21.

Moreover, in cases where the A1 rotor rotational speed VRA1 becomes too high, for example, during the high-vehicle speed operation in which the vehicle speed VP is very high, the speed position of the transmission 71 is controlled to the third speed (transmission ratio<1.0). According to the present embodiment, this makes it possible to lower the A1 rotor rotational speed VRA1 with respect to the vehicle speed VP, and hence it is possible to prevent failure of the first rotating machine 21 from being caused by the A1 rotor rotational speed VRA1 becoming too high. The above-described control is particularly effective because the A1 rotor 24 is formed by magnets and the magnets are lower in strength than soft magnetic material elements, so that the above-described inconveniences are liable to occur.

Furthermore, during traveling of the vehicle including the EV traveling and the ENG traveling, the speed position of the transmission 71 is controlled such that the first magnetic field rotational speed VMF1 becomes equal to a predetermined target value. This target value is calculated by searching a map according to the vehicle speed VP when only the first and second rotating machines 21 and 31 are used as motive power sources, whereas when the engine 3 and the first and second rotating machines 21 and 31 are used as motive power sources, the target value is calculated by searching a map other than the above-described map according to the engine speed NE and the vehicle speed VP. Moreover, in these maps, the target values are set to such values that will make it possible to obtain high efficiency of the first rotating machine 21 with respect to the vehicle speed VP (and the engine speed NE) assumed at the time. Furthermore, in parallel with the above control of the transmission 71, the first magnetic field rotational speed VMF1 is controlled to the above-described target value. According to the present embodiment, this makes it possible to obtain the high efficiency of the first rotating machine 21 during traveling of the vehicle.

Moreover, during the ENG traveling, and at the same time during the speed-changing operation of the transmission 71, that is, after the input shaft 72 and output shaft of the transmission 71 are disconnected from a gear train having been selected before a speed change and until the input shaft 72 and the output shaft are connected to a gear train selected for the speed change, the first and second rotating machines 21 and 31 are controlled in the following manner. During the speed-changing operation of the transmission 71, by disconnecting the gear train of the transmission 71 from the input shaft 72 and output shaft thereof, the A1 rotor 24 is disconnected from the drive wheels DW and DW, whereby the load of the drive wheels DW and DW ceases to act on the A1 rotor 24. Therefore, no electric power is generated by the first rotating machine 21, and electric power is supplied from the battery 43 to the stator 33 of the second rotating machine 31.

In this way, according to the present embodiment, during the speed-changing operation of the transmission 71, the second driving equivalent torque TSE2 from the stator 33 and part of the engine torque TENG transmitted to the B1 rotor 34 are combined, and the combined torque is transmitted to the drive wheels DW and DW through the B2 rotor 35. In this way, it is possible to suppress a speed-change shock, which can be caused by interruption of transmission of the engine torque TENG to the drive wheels DW and DW through the transmission 71. In this way, it is possible to improve marketability. In addition to this, according to the present embodiment it is possible to obtain the same advantageous effects as provided by the first embodiment.

Fourth Embodiment

Figure 55:
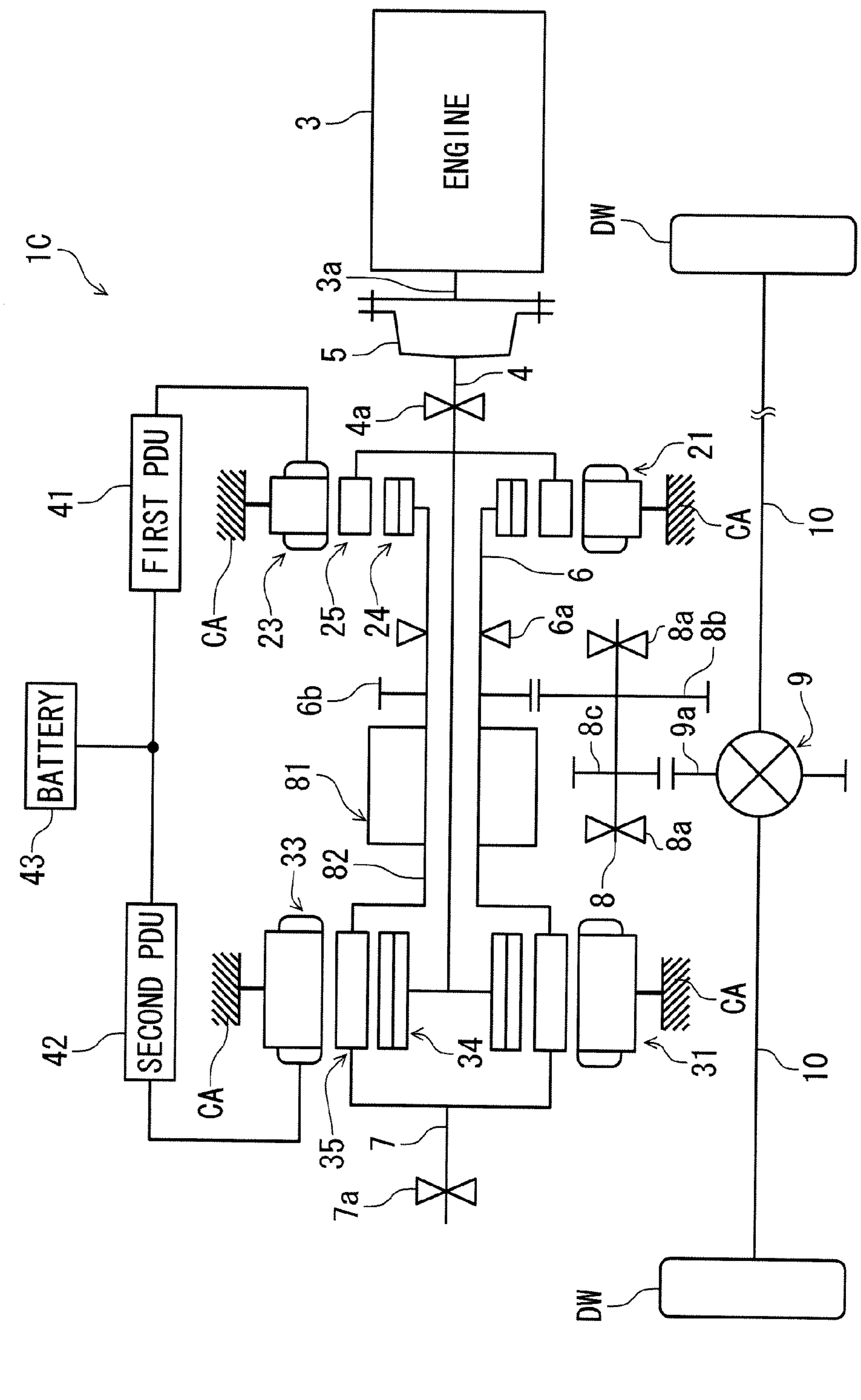
FIG. 55 is a diagram schematically showing a power unit according to a fourth embodiment.

In the power unit 1C according to the fourth embodiment shown in FIG. 55, differently from the first embodiment, the gear 7*b* is not provided on the second rotating shaft 7, and the above-described first gear 8*b* is in mesh with the gear 6*b* integrally formed with the connection shaft 6. This connects the A1 rotor 24 to the drive wheels DW and DW through the connection shaft 6, the gear 6*b*, the first gear 8*b*, the idler shaft 8, the second gear 8*c*, the gear 9*a* and the differential gear mechanism 9, without passing through the transmission 81.

Moreover, the transmission 81 is a gear-type stepped transmission which is configured, similarly to the transmission 71 according to the third embodiment, to have speed positions including a first speed to a third speed. The transmission 81 includes an input shaft 82 directly connected to the B2 rotor 35, and an output shaft (not shown) directly connected to the connection shaft 6, and transmits motive power input to the input shaft 82 to the output shaft while changing the speed of the motive power. Moreover, the ECU 2 controls a change between the speed positions of the transmission 81.

With the above-described arrangement, the B2 rotor 35 is mechanically connected to the drive wheels DW and DW through the transmission 81, the gear 6*b*, the second gear 8*c*, and the like. Moreover, the motive power transmitted to the B2 rotor 35 is transmitted to the drive wheels DW and DW while having the speed thereof changed by the transmission 81.

In the power unit 1C configured as above, when a very large torque is transmitted from the B2 rotor 35 to the drive wheels DW and DW, for example, during the EV start and the ENG-based start, the speed position of the transmission 81 is controlled to the first speed (transmission ratio>1.0). The torque transmitted to the B2 rotor 35 is increased by the transmission 81, and is then transmitted to the drive wheels DW and DW. In accordance with this, the electric power supplied to the second rotating machine 31 is controlled such that the torque transmitted to the B2 rotor 35 becomes smaller. Therefore, according to the present embodiment, it is possible to reduce the maximum value of torque required of the second rotating machine 31. As a result, it is possible to further reduce the size and costs of the second rotating machine 31. This is particularly effective because as described above, during the ENG-based start, the torque from the stator 33 and part of the engine torque TENG transmitted to the B1 rotor 34 are combined and the combined torque is transmitted to the drive wheels DW and DW through the B2 rotor 35, and hence a larger torque acts on the B2 rotor 35 than on the A1 rotor 24.

Moreover, when the B2 rotor rotational speed VRB2 becomes very high, for example, during the high-vehicle speed operation in which the vehicle speed VP is very high, the speed position of the transmission 81 is controlled to the third speed (transmission ratio<1.0). According to the present embodiment, this makes it possible to reduce the B2 rotor rotational speed VRB2 with respect to the vehicle speed VP, and hence it is possible to prevent failure of the second rotating machine 31 from being caused by the B2 rotor rotational speed VRB2 becoming too high.

Furthermore, during traveling of the vehicle including the EV traveling and the ENG traveling, the speed position of the transmission 81 is controlled such that the second magnetic field rotational speed VMF2 becomes equal to a predetermined target value. This target value is calculated by searching a map according to the vehicle speed VP when only the first and second rotating machines 21 and 31 are used as motive power sources, whereas when the engine 3 and the first and second rotating machines 21 and 31 are used as motive power sources, the target value is calculated by searching a map other than the above-described map according to the engine speed NE and the vehicle speed VP. Moreover, in these maps, the target values are set to such values that will make it possible to obtain high efficiency of the second rotating machine 31 with respect to the vehicle speed VP (and the engine speed NE) assumed at the time. Furthermore, in parallel with the above control of the transmission 81, the second magnetic field rotational speed VMF2 is controlled to the above-described target value. According to the present embodiment, this makes it possible to obtain the high efficiency of the second rotating machine 31 during traveling of the vehicle.

Moreover, during the ENG traveling, and at the same time during the speed-changing operation of the transmission 81 (after the input shaft 82 and the output shaft are disconnected from a gear train having been selected before a speed change and until the input shaft 82 and the output shaft are connected to a gear train selected for the speed change), that is, when the B2 rotor 35 is disconnected from the drive wheels DW and DW by the transmission 81, as is clear from the state of transmission of torque, described with reference to FIG. 32, and the like, part of the engine torque TENG is transmitted to the drive wheels DW and DW through the A1 rotor 24. In this way, according to the present embodiment, it is possible to suppress a speed-change shock, which can be caused by interruption of transmission of the engine torque TENG to the drive wheels DW and DW through the transmission 81 during the speed-changing operation of the transmission 81. In this way, it is possible to improve marketability. In addition to this, according to the present embodiment, it is possible to obtain the same advantageous effects as provided by the first embodiment.

Fifth Embodiment

Figure 56:
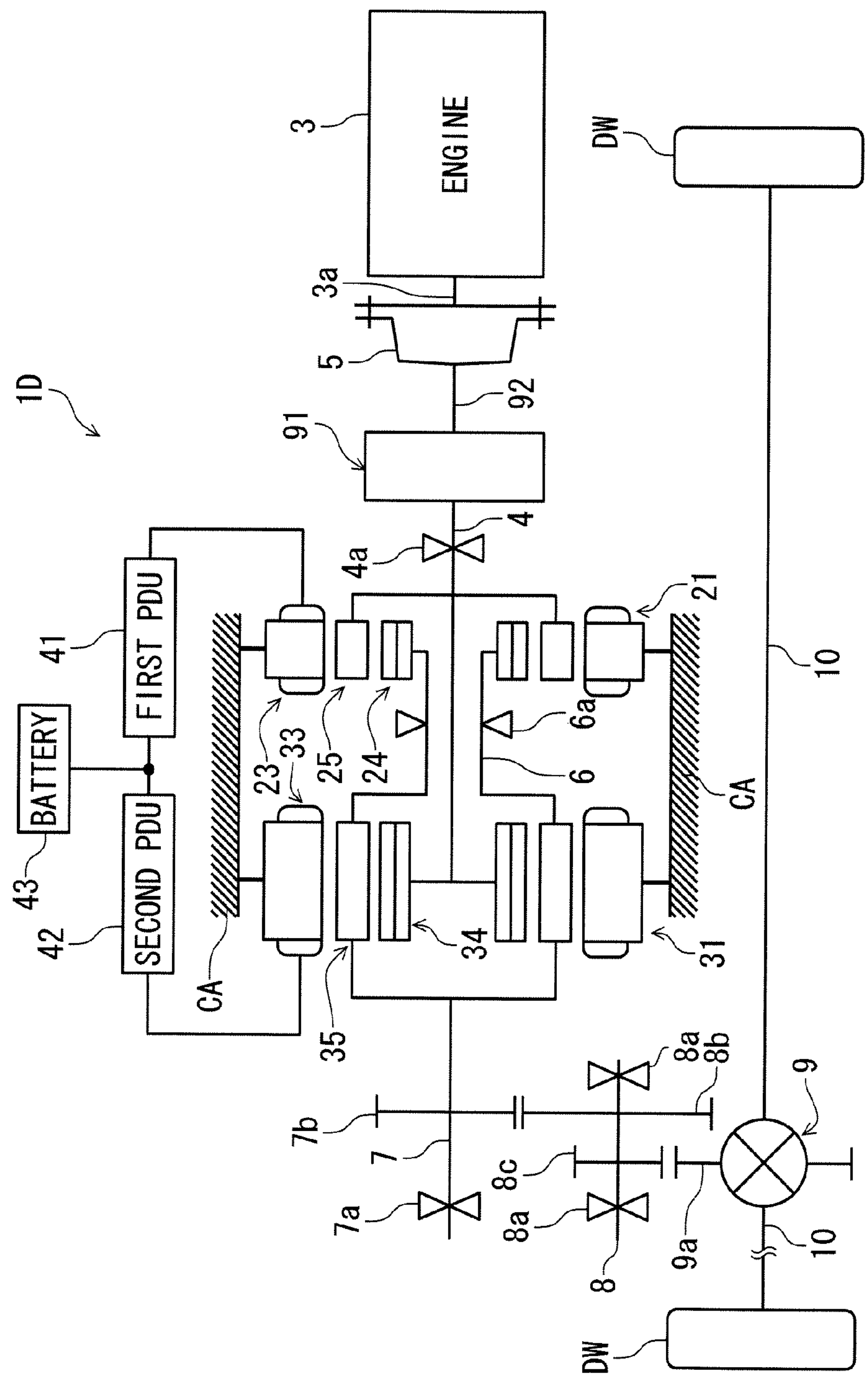
FIG. 56 is a diagram schematically showing a power unit according to a fifth embodiment.

In the power unit 1D according to the fifth embodiment shown in FIG. 56, the transmission 91 is a gear-type stepped transmission formed by a planetary gear unit and the like, and includes an input shaft 92 and an output shaft (not shown). In the transmission 91, a total of two speed positions, that is, a first speed (transmission ratio=the rotational speed of the input shaft 92/the rotational speed of the output shaft=1.0) and a second speed (transmission ratio<1.0) are set as speed positions. The ECU 2 performs a change between these speed positions.

Moreover, the input shaft 92 of the transmission 91 is directly connected to the flywheel 5, and the output shaft (not shown) thereof is directly connected to the first rotating shaft 4. As described above, the transmission 91 is provided between the crankshaft 3*a*, and the A2 and B1 rotors 25 and 34 for transmitting the engine motive power to the A2 rotor 25 and the B1 rotor 34 while changing the speed of the engine motive power. Furthermore, the number of the gear teeth of the gear 9*a* of the above-described differential gear mechanism 9 is larger than that of the gear teeth of the second gear 8*c* of the idler shaft 8, whereby the motive power transmitted to the idler shaft 8 is transmitted to the drive wheels DW and DW in a speed-reduced state.

In the power unit 1D configured as above, in cases where a very large torque is transmitted from the A1 and B2 rotors 24 and 35 to the drive wheels DW and DW, for example, during the ENG-based start, the speed position of the transmission 91 is controlled to the second speed (transmission ratio<1.0).

This reduces the engine torque TENG input to the A2 and B1 rotors 25 and 34. In accordance with this, the electric power generated by the first rotating machine 21 and the electric power supplied to the second rotating machine (generated electric power) are controlled such that the engine torque TENG to be transmitted to the A1 and B2 rotors 24 and 35 becomes smaller. Moreover, the engine torque TENG transmitted to the A1 and B2 rotors 24 and 35 is transmitted to the drive wheels DW and DW in an increased state through deceleration by the second gear 8*c* and the gear 9*a*. In this way, according to the present embodiment, it is possible to reduce the respective maximum values of torque required of the first and second rotating machines 21 and 31. As a result, it is possible to further reduce the sizes and costs of the first and second rotating machines 21 and 31.

Moreover, when the engine speed NE is very high, the speed position of the transmission 91 is controlled to the first speed (transmission ratio=1.0). According to the present embodiment, this makes it possible to make the A2 and B1 rotor rotational speeds VRA2 and VRB1 lower than that when the second speed is selected for the speed position, whereby it is possible to prevent failure of the first and second rotating machines 21 and 31 from being caused by the A2 and B1 rotor rotational speeds VRA2 and VRB1 becoming too high. This control is particularly effective because the B1 rotor 34 is formed by magnets so that the above-described inconveniences are liable to occur.

Furthermore, during the ENG traveling, the speed position of the transmission 91 is changed according to the engine speed NE and the vehicle speed VP such that the first and second magnetic field rotational speeds VMF1 and VMF2 take respective values that will make it possible to obtain the high efficiencies of the first and second rotating machines 21 and 31. Moreover, in parallel with such a change in the speed position of the transmission 91, the first and second magnetic field rotational speeds VMF1 and VMF2 are controlled to values determined based on the engine speed NE, the vehicle speed VP, and the speed position of the transmission 91, which are assumed then, and the above-described equations (43) and (44). According to the present embodiment, this makes it possible to obtain the high efficiencies of the first and second rotating machines 21 and 31 during traveling of the vehicle.

Moreover, during the ENG traveling, and at the same time during the speed-changing operation of the transmission 91, that is, when the engine 3 and the A2 and B1 rotors 25 and 34 are disconnected from each other by the transmission 91, to suppress a speed-change shock, the first and second rotating machines 21 and 31 are controlled, as described hereafter. Hereinafter, such control of the first and second rotating machines 21 and 31 will be referred to as the "speed-change shock control".

Electric power is supplied to the stators 23 and 33, and both the first and second rotating magnetic fields, which are generated by the stators 23 and 33 in accordance with the supply of the electric power, respectively, are caused to perform normal rotation. As a consequence, the first driving equivalent torque TSE1 from the stator 23 and the torque transmitted to the A1 rotor 24, as described hereafter, are combined, and the combined torque is transmitted to the A2 rotor 25. The torque transmitted to the A2 rotor 25 is transmitted to the B1 rotor 34 without being transmitted to the crankshaft 3*a*, due to the above-described disconnection by the transmission 91. Moreover, this torque is combined with the second driving equivalent torque TSE2 from the stator 33, and is then transmitted to the B2 rotor 35. Part of the torque transmitted to the B2 rotor 35 is transmitted to the A1 rotor 24, and the remainder thereof is transmitted to the drive wheels DW and DW.

Therefore, according to the present embodiment, during the speed-changing operation, it is possible to suppress a speed-change shock, which can be caused by interruption of transmission of the engine torque TENG to the drive wheels DW and DW, and therefore it is possible to improve marketability. It should be noted that this speed-change shock control is performed only during the speed-changing operation of the transmission 91. In addition, according to the present embodiment, it is possible to obtain the same advantageous effects as provided by the first embodiment.

It should be noted that although in the third to fifth embodiments, the transmissions 71, 81, and 91 are each a gear-type stepped transmission, it is to be understood that a belt-type or toroidal-type stepless transmission may be employed.

Sixth Embodiment

Figure 57:
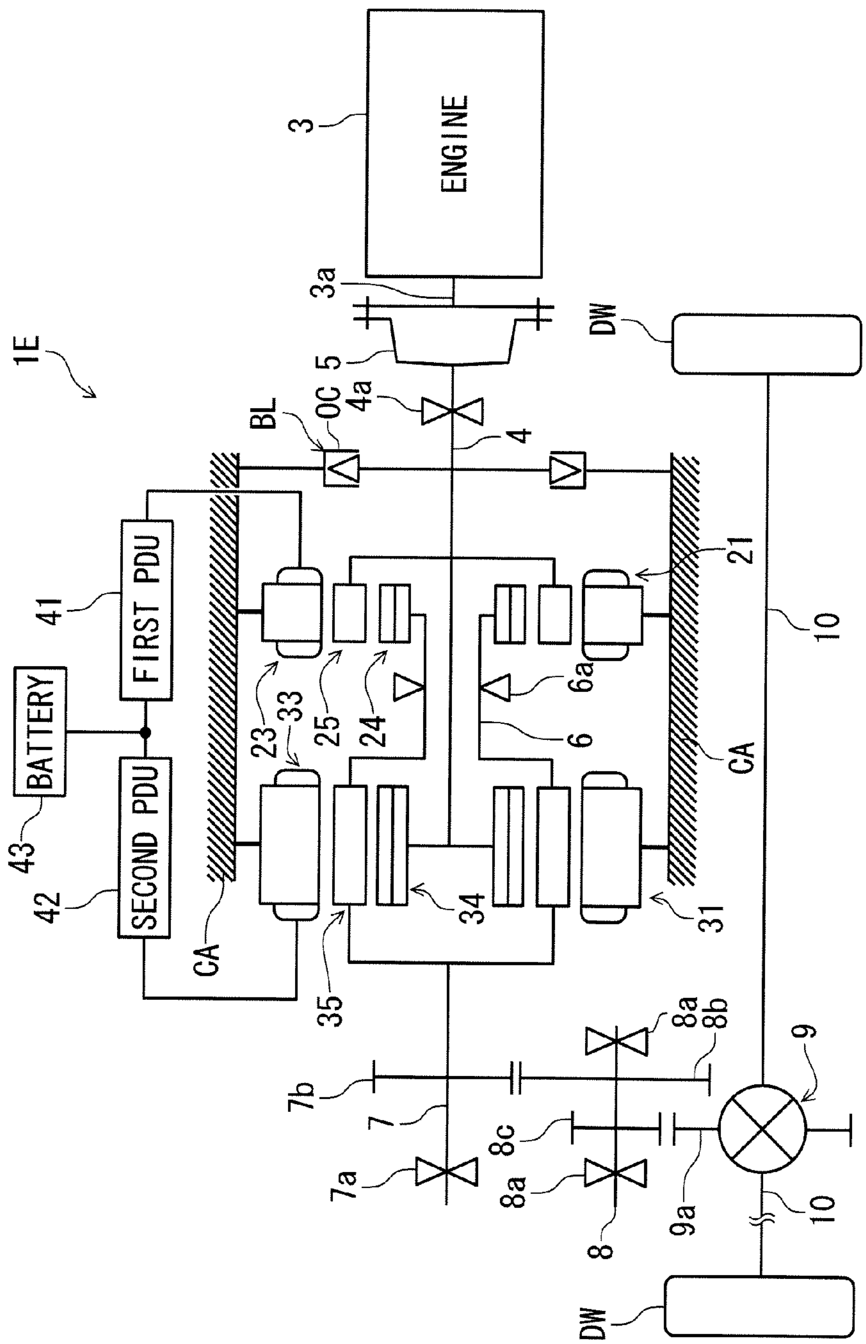
FIG. 57 is a diagram schematically showing a power unit according to a sixth embodiment.

Next, a power unit 1E according to a sixth embodiment will be described with reference to FIG. 57. As shown in the figure, this power unit 1E is configured by adding a brake mechanism BL to the power unit 1 according to the first embodiment. In the following description, different points from the first embodiment will be mainly described.

This brake mechanism BL includes a one-way clutch OC connected to the above-described first rotating shaft 4 and casing CA. The one-way clutch OC is arranged such that it engages between the first rotating shaft 4 and the casing CA configured to be unrotatable, when such motive power as causes the crankshaft 3*a* having the first rotating shaft 4 connected thereto to perform reverse rotation, acts on the crankshaft 3*a*, whereas when such motive power as causes the crankshaft 3*a* to perform normal rotation acts on the crankshaft 3*a*, the one-way clutch OC disengages between the first rotating shaft 4 and the casing CA.

More specifically, the brake mechanism BL formed by the one-way clutch OC and the casing CA permits the first rotating shaft 4 to rotate only when it performs normal rotation together with the crankshaft 3*a*, the A2 rotor 25 and the B1 rotor 34, but blocks the first rotating shaft 4 from performing reserve rotation together with the crankshaft 3*a* and the like.

The power unit 1E configured as above performs the operations by the above-described EV creep and EV start in the following manner. The power unit 1E supplies electric power to the stators 23 and 33, and causes the first rotating magnetic field generated by the stator 23 in accordance with the supply of the electric power to perform reverse rotation and the second rotating magnetic field generated by the stator 33 in accordance with the supply of the electric power to perform normal rotation. Moreover, the power unit 1E controls the first and second magnetic field rotational speeds VMF1 and VMF2 such that $(\beta+1)\cdot|VMF1|=\alpha\cdot|VMF2|$ holds. Furthermore, the power unit 1E controls the electric power supplied to the first and second rotating machines 21 and 31 such that sufficient torque is transmitted to the drive wheels DW and DW.

While the first rotating magnetic field of the stator 23 performs reverse rotation as described above, the brake mechanism BL blocks the A2 rotor 25 from performing reverse rotation as described above, so that as is clear from the above-described functions of the first rotating machine 21, all the electric power supplied to the stator 23 is transmitted to the A1 rotor 24 as motive power, to thereby cause the A1 rotor 24 to perform normal rotation. Moreover, while the second rotating magnetic field of the stator 33 performs normal rotation as described above, the brake mechanism BL blocks the B1 rotor 34 from performing reverse rotation, so that as is clear from the above-described functions of the second rotating machine 31, all the electric power supplied to the stator 33 is transmitted to the B2 rotor 35 as motive power, to thereby cause the B2 rotor 35 to perform normal rotation. Furthermore, the motive power transmitted to the A1 and B2 rotors 24 and 35 is transmitted to the drive wheels DW and DW, and causes the drive wheels DW and DW to perform normal rotation.

Moreover, in this case, on the A2 and B1 rotors 25 and 34, which are blocked from performing reverse rotation by the brake mechanism BL, the first and second driving equivalent torques TSE1 and TSE2 act such that the torques TSE1 and TSE2 attempt to cause the A2 and B1 rotors 25 and 34 to perform reverse rotation, respectively, whereby the crankshaft 3*a* and the A2 and B1 rotors 25 and 34 are not only blocked from performing reverse rotation but are also held stationary.

As described above, according to the present embodiment, it is possible to drive the drive wheels DW and DW by the first and second rotating machines 21 and 31 without using the engine motive power. Moreover, during driving of the drive wheels DW and DW, the crankshaft 3*a* is not only prevented from reverse rotation but also held stationary, and hence the crankshaft 3*a* does not drag the engine 3.

It should be noted that although in the above-described first to sixth embodiments, the first and second pole pair number ratios α and β are set to 2.0, if the first and second pole pair number ratios α and β are set to less than 1.0, it is possible to obtain the following advantageous effects. As is clear from the above-described relationship between the rotational speeds of various rotary elements, shown in FIGS. 33(*a*) and 33(*b*), when the first pole pair number ratio α is set to a relatively large value, if the engine speed NE is higher than the vehicle speed VP (see the two-dot chain lines in FIGS. 33(*a*) and 33(*b*)), the first magnetic field rotational speed VMF1 becomes higher than the engine speed NE, and sometimes becomes too high. In contrast, by setting the first pole pair number ratio cc to less than 1.0, as is apparent from a comparison between broken lines and two-dot chain lines in the collinear chart in FIGS. 33(*a*) and 33(*b*), the first magnetic field rotational speed VMF1 can be reduced, and hence it is possible to prevent the driving efficiency from being lowered by occurrence of loss caused by the first magnetic field rotational speed VMF1 becoming too high.

Moreover, when the second pole pair number ratio β is set to a relatively large value, if the vehicle speed VP is higher than the engine speed NE (see the one-dot chain lines in FIGS. 33(*a*) and 33(*b*)), the second magnetic field rotational speed VMF2 becomes higher than the vehicle speed VP, and sometimes becomes too high. In contrast, by setting the second pole pair number ratio β is set to less than 1.0, as is apparent from a comparison between the broken lines and one-dot chain lines in the collinear chart in FIGS. 33(*a*) and 33(*b*), the second magnetic field rotational speed VMF2 can be reduced, and hence it is possible to prevent the driving efficiency from being lowered by occurrence of loss caused by the second magnetic field rotational speed VMF2 becoming too high.

Furthermore, although in the first to sixth embodiments, the A2 rotor 25 and the B1 rotor 34 are connected to each other, and the A1 rotor 24 and the B2 rotor 35 are connected to each other, if the A2 rotor 25 and the B1 rotor 34 are connected to the crankshaft 3*a*, they are not necessarily required to be connected to each other. Moreover, if the A1 rotor 24 and the B2 rotor 35 are connected to the drive wheels DW and DW, they are not necessarily required to be connected to each other. In this case, the transmission 61 according to the second embodiment may be configured by two transmissions such that one of the two transmissions is disposed between the A1 rotor 24 and the drive wheels DW and DW, and the other thereof is disposed between the B2 rotor 35 and the drive wheels DW and DW. Similarly, the transmission 91 according to the fifth embodiment may be configured by two transmissions such that one of the two transmissions is disposed between the A2 rotor 25 and the crankshaft 3*a*, and the other thereof is disposed between the B1 rotor 34 and the crankshaft 3*a*.

It is to be understood that in the first to fifth embodiments, the brake mechanism BL for blocking the reverse rotation of the crankshaft 3*a* may be provided. Moreover, although the brake mechanism BL is formed by the one-way clutch OC and the casing CA, the brake mechanism BL may be formed by another suitable mechanism, such as a hand brake, insofar as it is capable of blocking the reverse rotation of the crankshaft 3*a*.

Seventh Embodiment

Next, a power unit 1F according to a seventh embodiment will be described with reference to FIG. 58. This power unit 1F is distinguished from the power unit 1 according to the first embodiment only in that the second rotating machine 31 is replaced by a first planetary gear unit PS1 of a general single pinion type and a general one-rotor-type rotating machine 101. It should be noted that in the figure, constituent elements identical to those of the first embodiment are denoted by the same reference numerals. This also applies to the other embodiments, described later. In the following description, different points from the first embodiment will be mainly described.

Figure 58:
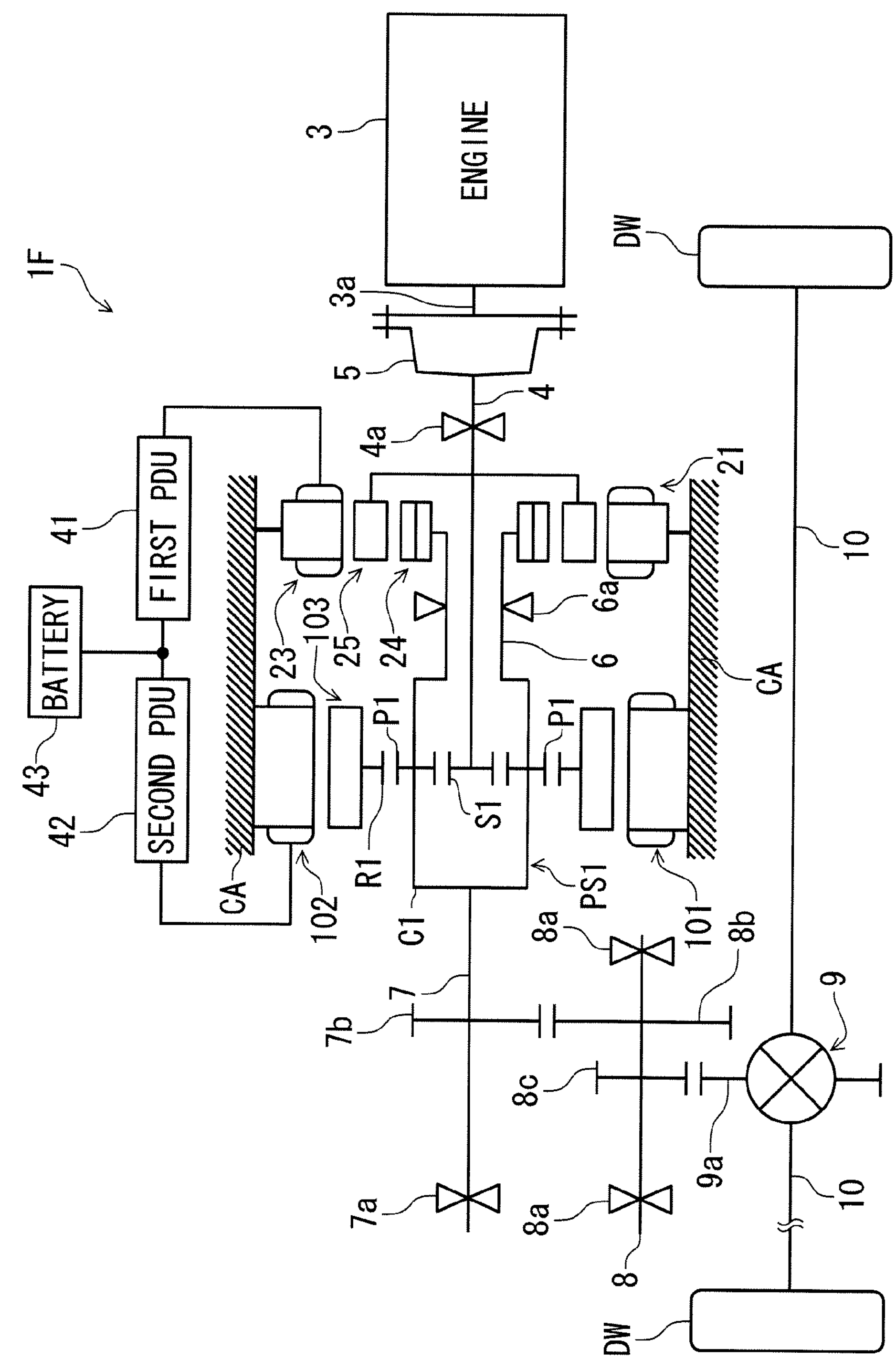
FIG. 58 is a diagram schematically showing a power unit according to a seventh embodiment.

As shown, in FIG. 58, the first planetary gear unit PS1 includes a first sun gear S1, a first ring gear R1 disposed around a periphery of the first sun gear S1, a plurality of (for example, three) first planetary gears P1 (only two of which are shown) in mesh with the gears S1 and R1, a first carrier C1 rotatably supporting the first planetary gears P1. The ratio between the number of the gear teeth of the first sun gear S1 and that of the gear teeth of the first ring gear R1 (the number of the gear teeth of the first sun gear S1/the number of the gear teeth of the first ring gear R1; hereinafter referred to as the "first planetary gear ratio r1") is set to a predetermined value slightly smaller than 1.0, and is set to a relatively large one of the values that can be taken by a general planetary gear unit.

The above-described first sun gear S1 is mechanically directly connected to the A2 rotor 25 through the first rotating shaft 4, and is mechanically directly connected to the crankshaft 3*a* through the first rotating shaft 4 and the flywheel 5. Moreover, the first carrier C1 is mechanically directly connected to the A1 rotor 24 through the connection shaft 6, and is mechanically connected to the drive wheels DW and DW through the second rotating shaft 7, the gear 7*b*, the first gear 8*b*, the idler shaft 8, the second gear 8*c*, the gear 9*a*, the differential gear mechanism 9 and the like. That is, the A1 rotor 24 and the first carrier C1 are mechanically connected to the drive wheels DW and DW.

Moreover, the first planetary gear unit PS1 has the same known functions as those of a general planetary gear unit provided by the arrangement thereof. That is, when the directions of the rotations of the first sun gear S1, the first ring gear R1 and the first carrier C1 are identical to each other, the first planetary gear unit PS1 has the function of distributing motive power input to the first carrier C1 to the first sun gear S1 and the first ring gear R1, and the function of combining the motive power input to the first sun gear S1 and the motive power input to the first ring gear R1 and outputting the combined motive power to the first carrier C1. Moreover, when the first planetary gear unit PS1 is distributing and combining the motive power as described above, the first sun gear S1, the first ring gear R1 and the first carrier C1 are rotating while holding a collinear relationship with respect to the rotational speed. In this case, the relationship between the rotational speeds of the first sun gear S1, the first ring gear R1, and the first carrier C1 is expressed by the following equation (53).

$$VRI1=(r1+1)VCA1-r1\cdot VSU1 \qquad (53)$$

In this equation, VRI1 represents the rotational speed of the first ring gear R1 (hereinafter referred to as the "first ring gear rotational speed"), VCA1 represents the rotational speed of the first carrier C1 (hereinafter referred to as the "first carrier rotational speed"), and VSU1 represents the rotational speed of the first sun gear S1 (hereinafter referred to as the "first sun gear rotational speed").

The rotating machine 101 is a three-phase brushless DC motor, and includes a stator 102 formed, for example, by a plurality of coils, and a rotor 103 formed by magnets or the like. Moreover, the rotating machine 101 has the function of converting electric power supplied to the stator 102 to motive power and outputting the motive power to the rotor 103, and the function of converting the motive power input to the rotor 103 to electric power and outputting the electric power to the stator 102. The rotor 103 is integrally formed with the first ring gear R1 such that it is rotatable together is with the first ring gear R1. The stator 102 is electrically connected to the battery 43 through the second PDU 42. More specifically, the stator 23 of the first rotating machine 21 and the stator 102 of the rotating machine 101 are electrically connected to each other through the first and second PDUs 41 and 42.

Figure 59:
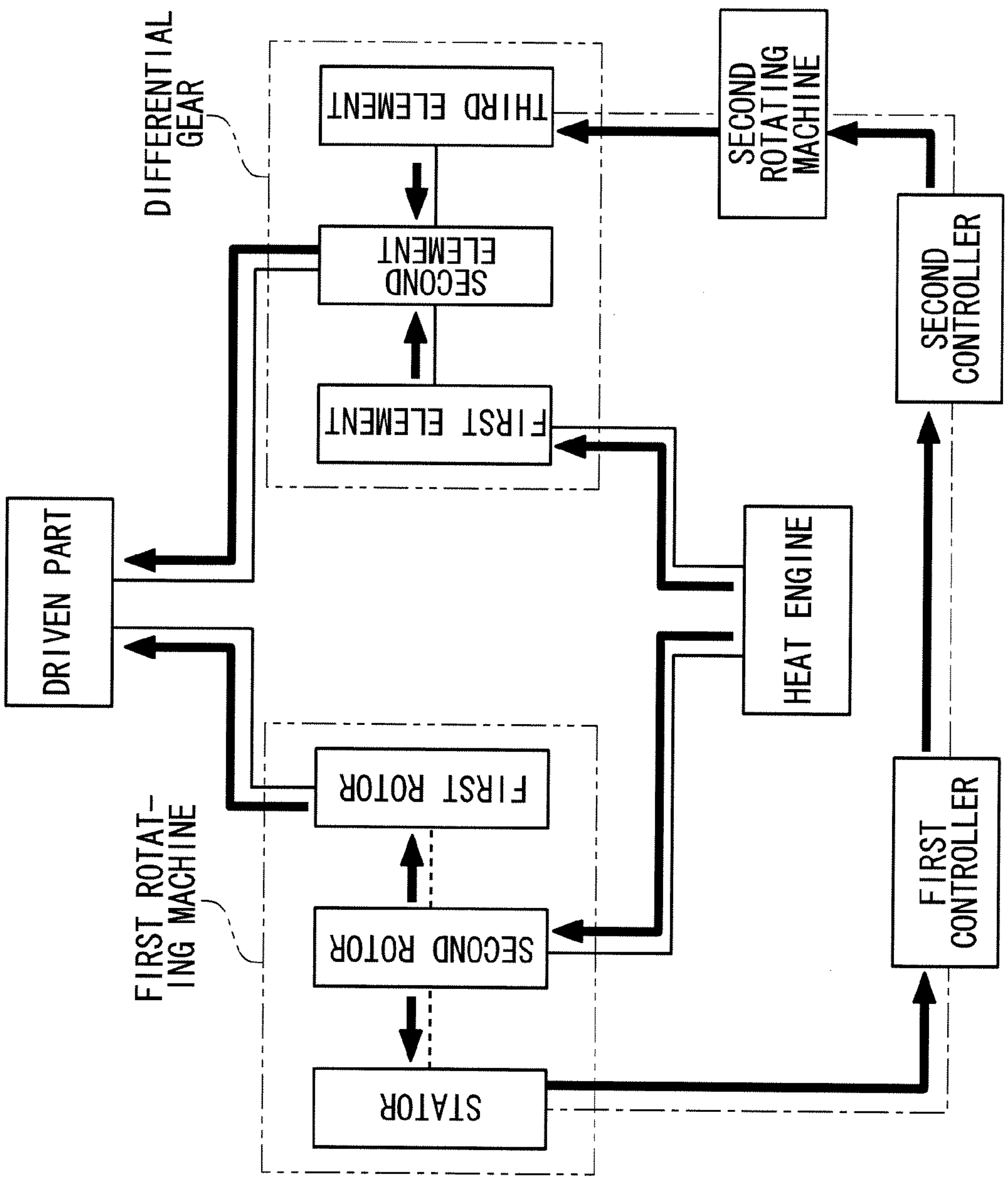
FIG. 59 is a diagram for explaining an example of the operation of a first power unit including a rotating machine and a differential gear.

FIG. 59 is a conceptual diagram showing the general arrangement of the power unit 1F and an example of the state of transmission of motive power. It should be noted that in FIG. 59, the first rotating machine 21 is referred to as the "first rotating machine," the stator 23 to as the "first stator," the A1 rotor 24 to as the "first rotor," the A2 rotor 25 to as the "second rotor," the first planetary gear unit PS1 to as the "differential gear," the first sun gear S1 to as the "first element," the first carrier C1 to as the "second element," the first ring gear R1 to as the "third element," the rotating machine 101 to as the "second rotating machine," the engine 3 to as the "heat engine," the drive wheels DW and DW to as the "driven parts," the first PDU 41 to as the "first controller," and the second PDU 42" to as the "second controller," respectively. The differential gear has the same functions as those of the planetary gear unit. Furthermore, the first rotor and the second element of the differential gear are mechanically connected to the driven parts, and the second rotor and the first element of the differential gear are mechanically connected to the first output portion of the heat engine. Moreover, the third element of the differential gear is mechanically connected to the second output portion of the second rotating machine, and the stator and the second rotating machine are electrically connected to each other through the first and second controllers.

With the above arrangement, in the power unit, the motive power from the heat engine is transmitted to the driven parts, for example, in the following manner. Hereinafter, the power unit in which the second rotor and the first element are connected to the first output portion of the heat engine, and the first rotor and the second element are connected to the driven parts will be referred to as the "first power unit," and the power unit in which the first rotor and the second element are connected to the first output portion of the heat engine, and the second rotor and the first element are connected to the driven parts will be referred to as the "second power unit". Moreover, transmission of the motive power from the heat engine to the driven parts in the first and second power units will be sequentially described starting with the first power unit. It should be noted that in FIG. 59, similarly to FIG. 19, the mechanical connections between the elements are indicated by solid lines, electrical connections therebetween are indicated by one-dot chain lines, and magnetic connections therebetween are indicated by broken lines. Moreover, flows of motive power and electric power are indicated by thick lines with arrows.

When the motive power from the heat engine is transmitted to the driven parts, electric power is generated by the first rotating machine using part of the motive power from the heat engine under the control of the first and second controllers, and the generated electric power is supplied to the second rotating machine. During the electric power generation by the first rotating machine, as shown in FIG. 59, part of the motive power from the heat engine is transmitted to the second rotor connected to the first output portion of the heat engine, and is further distributed to the first rotor and the stator by the above-described magnetism of magnetic force lines. In this case, part of the motive power transmitted to the second rotor is converted to electric power and is distributed to the stator. Moreover, the motive power distributed to the first rotor, as described above, is transmitted to the driven parts, and the electric power distributed to the stator is supplied to the second rotating machine. Furthermore, when the electric power generated by the first rotating machine, as described above, is supplied to the second rotating machine, the electric power is converted to motive power, and then the resulting motive power is transmitted to the third element. Moreover, the remainder of the motive power from the heat engine is transmitted to the first element, and is combined with the motive power transmitted to the third element, as described above, whereafter the combined motive power is transmitted to the driven parts through the second element. As a result, motive power equal in magnitude to the motive power from the heat engine is transmitted to the driven parts.

As described above, in the first power unit according to the present embodiment, similarly to the power unit 1 according to the first embodiment, the first rotating machine has the same functions as those of an apparatus formed by combining a planetary gear unit and a general one-rotor-type rotating machine, and hence differently from the above-described conventional power unit, which requires two planetary gear units for distributing and combining motive power for transmission, the first power unit requires only one differential for the same purpose. In this way, it is possible to reduce the size of the first power unit by the corresponding extent. This applies to the above-described second power unit. Moreover, in the first power unit, differently from the above-described conventional case, the motive power from the heat engine is transmitted to the driven parts without being recirculated, as described above, and hence it is possible to reduce motive power passing through the first rotating machine, the differential gear and the second rotating machine. In this way, it is possible to reduce the sizes and costs of the first rotating machine, the differential gear and the second rotating machine. As a result, it is possible to attain further reduction of the size and costs of the first power unit. Moreover, by using the first rotating machine, the differential gear and the second rotating machine each having a torque capacity corresponding to the reduced motive power, as described above, it is possible to suppress the loss of the motive power to improve the driving efficiency of the first power unit.

Moreover, the motive power from the heat engine is transmitted to the driven parts in a divided state through a total of three paths: a first transmission path formed by the second rotor, the magnetism of magnetic force lines and the first rotor, a second transmission path formed by the second rotor, the magnetism of magnetic force lines, the stator, the first controller, the second controller, the second rotating machine, the third element and the second element, and a third transmission path formed by the first and second elements. In this way, it is possible to reduce electric power (energy) passing through the first and second controllers through the second transmission path, so that it is possible to reduce the sizes and costs of the first and second controllers. As a result, it is possible to attain further reduction of the size and costs of the first power unit.

Furthermore, when motive power is transmitted to the driven parts, as described above, by controlling the rotational speed of the rotating magnetic field of the stator and the rotational speed of the second output portion of the second rotating machine by the first and second controllers, respectively, it is possible to transmit the motive power from the heat engine to the driven parts while steplessly changing the speed thereof. Hereinafter, this point will be described. In the first rotating machine, as is clear from the above-described functions, during distribution and combination of energy between the stator and the first and second rotors, the rotating magnetic field and the first and second rotors rotate while holding a collinear relationship with respect to the rotational speed, as shown in the equation (25). Moreover, in the differential, during distribution and combination of energy between the first to third elements, the first to third elements rotate while holding a collinear relationship with respect to the rotational speed. Moreover, in the above-described connection relationship, if the second rotor and the first element are directly connected to the first output portion of the heat engine, the rotational speeds of the second rotor and the first element are both equal to the rotational speed of the first output portion of the heat engine. Moreover, if both the first rotor and the second element are directly connected to the driven parts, the rotational speeds of the first rotor and the second element are both equal to the speed of the driven parts. Furthermore, if the second output portion of the second rotating machine and the third element are directly connected to each other, the rotational speeds of the second rotating machine and third element are equal to each other.

Hereinafter, the rotational speed of the first output portion of the heat engine will be referred to as the "rotational speed of the heat engine," and the rotational speed of the second output portion of the second rotating machine will be referred to as the "rotational speed of the second rotating machine". Moreover, the rotational speed of the rotating magnetic field will be referred to as the "magnetic field rotational speed VF," the rotational speeds of the first and second rotors will be referred to as the "first and second rotor rotational speeds VR1 and VR2," respectively, and the rotational speeds of the first to third elements will be referred to as the "first to third element rotational speeds V1 to V3," respectively. From the above-described relationship between the rotational speeds of the respective rotary elements, the relationship between the rotational speed of the heat engine, the speed of the driven parts, the magnetic field rotational speed VF, the first and second rotor rotational speeds VR1 and VR2, the first to third element rotational speeds V1 to V3, and the rotational speed of the second rotating machine is indicated, for example, by thick solid lines in FIG. 60.

Figure 60:
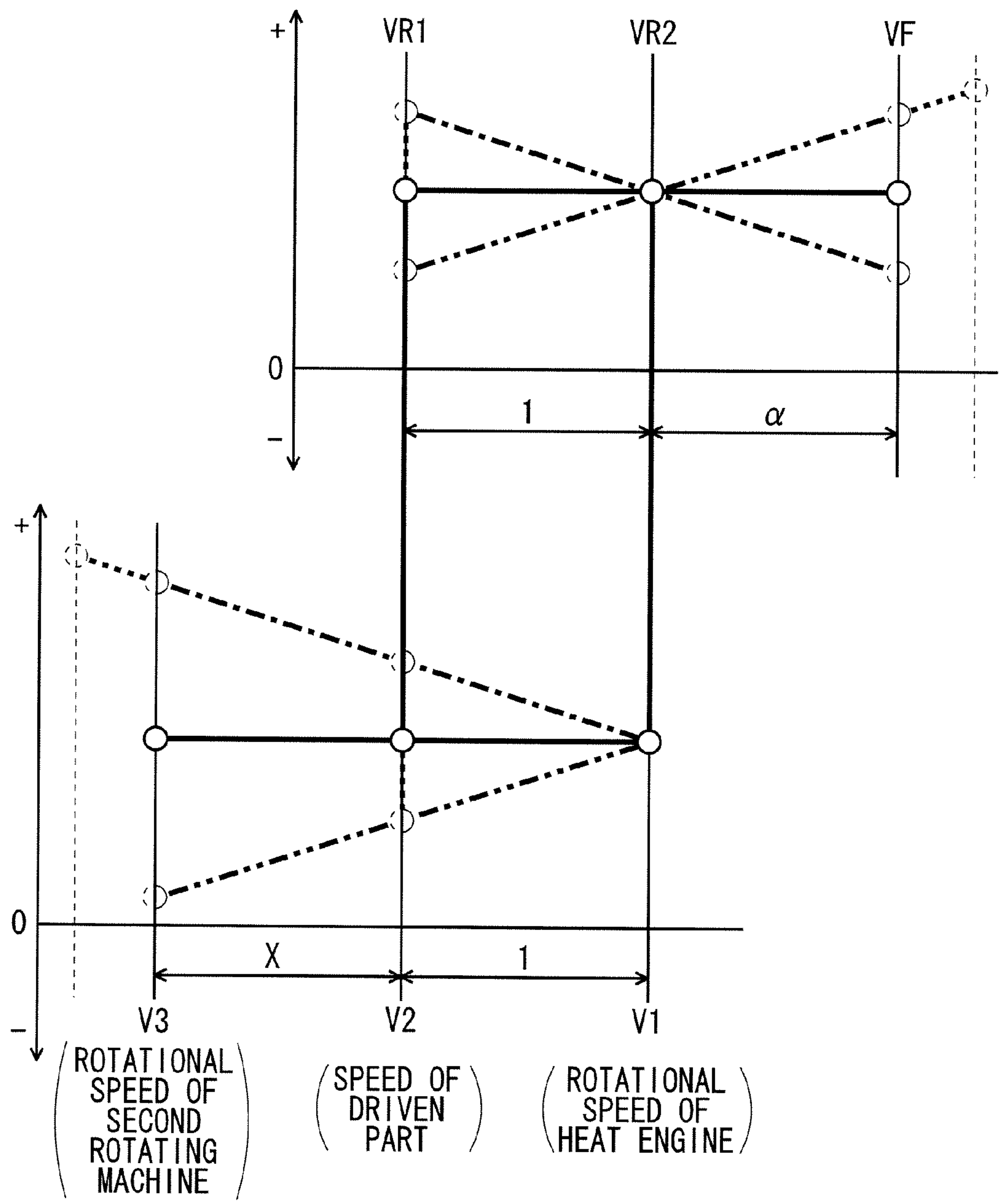
FIG. 60 is a diagram for explaining a speed-changing operation of the first power unit shown in FIG. 59.

Therefore, as indicated by two-dot chain lines in FIG. 60, for example, by increasing the magnetic field rotational speed VF and decreasing the rotational speed of the second rotating machine, with respect to the second rotor rotational speed VR2 and the first element rotational speed V1, it is possible to transmit the motive power from the heat engine to the driven parts while steplessly reducing the speed thereof. Conversely, as indicated by one-dot chain lines in FIG. 60, by decreasing the magnetic field rotational speed VF and increasing the rotational speed of the second rotating machine, with respect to the second rotor rotational speed VR2 and the first element rotational speed V1, it is possible to transmit the motive power from the heat engine to the driven parts while steplessly increasing the speed thereof.

Moreover, when the pole pair number ratio $\alpha$ of the first rotating machine is relatively large, if the rotational speed of the heat engine is higher than the speed of the driven parts (see the two-dot chain lines in FIG. 60), the magnetic field rotational speed VF becomes higher than the rotational speed of the heat engine and sometimes becomes too high. Therefore, by setting the pole pair number ratio $\alpha$ of the first rotating machine to a smaller value, as is apparent from a comparison between the broken lines and the two-dot chain lines in the collinear chart in FIG. 60, the magnetic field rotational speed VF can be reduced, whereby it is possible to prevent the driving efficiency from being lowered by occurrence of loss caused by the magnetic field rotational speed VF becoming too high.

Furthermore, when the collinear relationship with respect to the rotational speeds of the first to third elements of the differential gear is set such that the difference between the rotational speeds of the first element and the second element and the difference between the rotational speeds of the second element and the third element are 1.0:X (X>0), and when X is set to a relatively large value, if the speed of the driven parts is higher than the rotational speed of the heat engine (see the one-dot chain lines in FIG. 60), the rotational speed of the second rotating machine becomes higher than the speed of the driven parts and sometimes becomes too high. Therefore, by setting the above-described X to a smaller value, as is apparent from a comparison between the broken lines and the one-dot chain lines in the collinear chart in FIG. 60, the rotational speed of the second rotating machine can be reduced, whereby it is possible to prevent the driving efficiency from being lowered by occurrence of loss caused by the rotational speed of the second rotating machine becoming too high.

Figure 61:
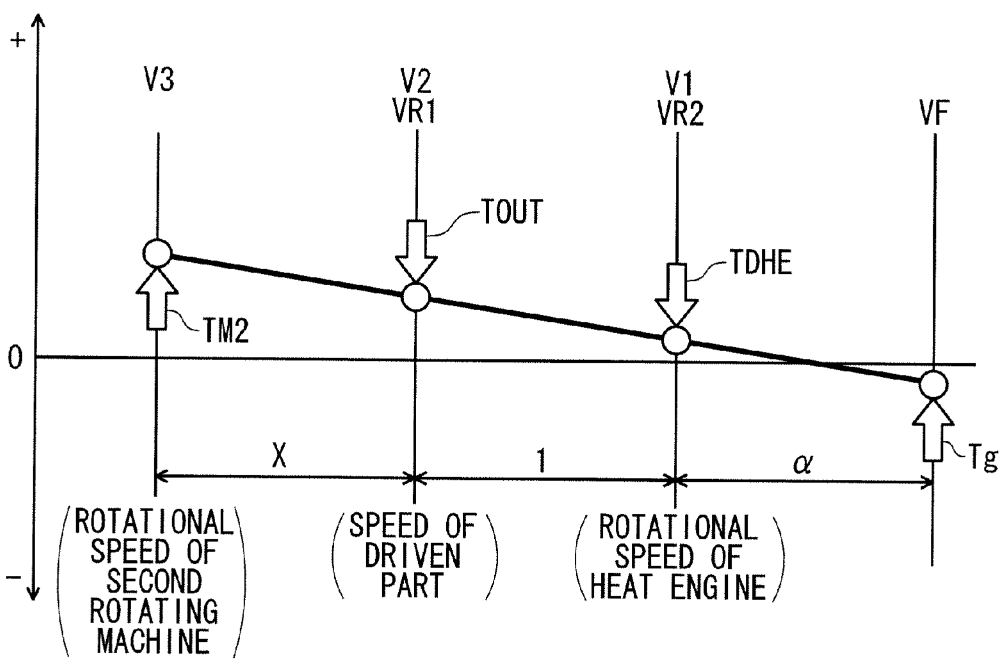
FIG. 61 is a diagram showing an example of the relationship between the rotational speeds and torques of various rotary elements of the first power unit shown in FIG. 59 in a case where a heat engine is started during driving of driven parts by the first and second rotating machines.

Moreover, in the first power unit, by supplying electric power to the second rotating machine and generating electric power by the first stator, torque output to the second output portion of the second rotating machine (hereinafter referred to as the "second rotating machine torque") can be transmitted to the driven parts in a state where the first output portion of the heat engine is stopped, using the above-described electric power-generating equivalent torque of the first rotating machine as a reaction force, whereby it is possible to drive the driven parts. Furthermore, during such driving of the driven parts, if the heat engine is an internal combustion engine, it is possible to start the internal combustion engine. FIG. 61 shows the relationship between torques of various rotary elements in this case together with the relationship between the rotational speeds thereof. In the figure, TOUT represents the driven part-transmitted torque, similarly to the case of claim 1, and TDHE, Tg and TM2 represent torque transmitted to the first output portion of the heat engine (hereinafter referred to as the "heat engine-transmitted torque"), the electric power-generating equivalent torque, and the second rotating machine torque, respectively.

When the heat engine is started as described above, as is clear from FIG. 61, the second rotating machine torque TM2 is transmitted to both the driven parts and the first output portion of the heat engine using the electric power-generating equivalent torque Tg of the first rotating machine as a reaction force, and hence the torque required of the first rotating machine becomes larger than in the other cases. In this case, the torque required of the first rotating machine, that is, the electric power-generating equivalent torque Tg is expressed by the following equation (54).

$$Tg=-\{X\cdot TOUT+(X+1)TDHE\}/(\alpha+1+X) \tag{54}$$

As is apparent from the equation (54), as the pole pair number ratio α of the first rotating machine is larger, the electric power-generating equivalent torque Tg becomes smaller with respect to the driven part-transmitted torque TOUT and the heat engine-transmitted torque TDHE assuming that the respective magnitudes thereof are unchanged. Therefore, by setting the pole pair number ratio α to a larger value, it is possible to further reduce the size and costs of the first rotating machine.

Figure 62:
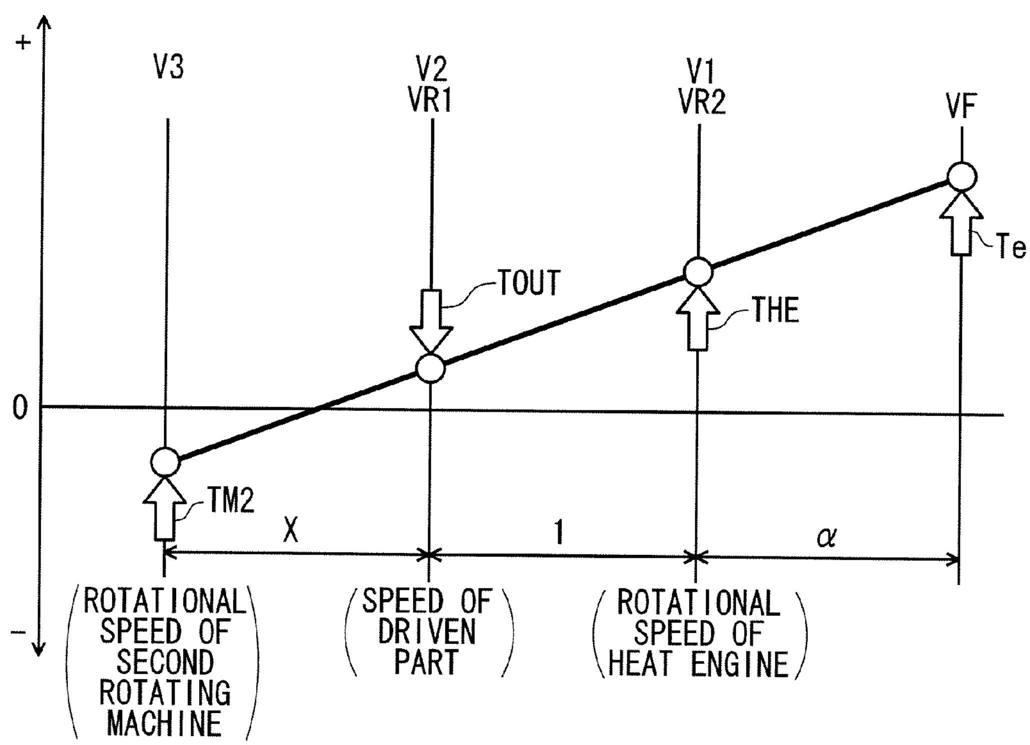
FIG. 62 is a diagram showing an example of the relationship between the rotational speeds and torques of various rotary elements of the first power unit shown in FIG. 59 in a case where the speed of the driven parts is rapidly increased.

Moreover, in the first power unit, the speed of the driven parts in a low-speed condition can be rapidly increased, for example, by controlling the heat engine and the first and second rotating machines in the following manner. FIG. 62 shows the relationship between the rotational speeds of various rotary elements at the start of operation for rapidly increasing the speed of the driven parts, as described above, together with the relationship between the torques of various rotary elements. In the figure, THE represents, similarly to the case of claim 1, the torque of the heat engine, and Te represents the driving equivalent torque of the first rotating machine. In this case, the rotational speed of the heat engine is increased to such a predetermined rotational speed that the maximum torque thereof is obtained. As shown in FIG. 62, the speed of the driven parts is not immediately increased, and hence as the rotational speed of the heat engine becomes higher than the speed of the driven parts, the difference therebetween increases, which causes the second output portion of the second rotating machine to perform reverse rotation. Moreover, in order to cause positive torque from the second output portion of the second rotating machine performing such reverse rotation to act on the driven parts, the second rotating machine performs electric power generation. Moreover, electric power generated by the second rotating machine is supplied to the stator of the first rotating machine to cause the rotating magnetic field generated by the stator to perform normal rotation.

From the above, the heat engine torque THE, the driving equivalent torque Te and the second rotating machine torque TM2 are all transmitted to the driven parts as positive torque, which results in a rapid increase in the speed of the driven parts. Moreover, when the speed of the driven parts in the low-speed condition is rapidly increased as described above, as is apparent from FIG. 62, the heat engine torque THE and the driving equivalent torque Te are transmitted to the driven parts using the second rotating machine torque TM2 as a reaction force, so that the torque required of the second rotating machine becomes larger than in the other cases. In this case, the torque required of the second rotating machine, that is, the second rotating machine torque TM2 is expressed by the following equation (55).

$$TM2=-\{\alpha\cdot THE+(1+\alpha)TOUT\}/(X+1+\alpha) \tag{55}$$

As is apparent from the equation (55), as X is larger, the second rotating machine torque TM2 becomes smaller with respect to the driven part-transmitted torque TOUT and the heat engine torque THE assuming that the respective magnitudes thereof are unchanged. Therefore, by setting X to a larger value, it is possible to further reduce the size and costs of the second rotating machine.

Figure 63:
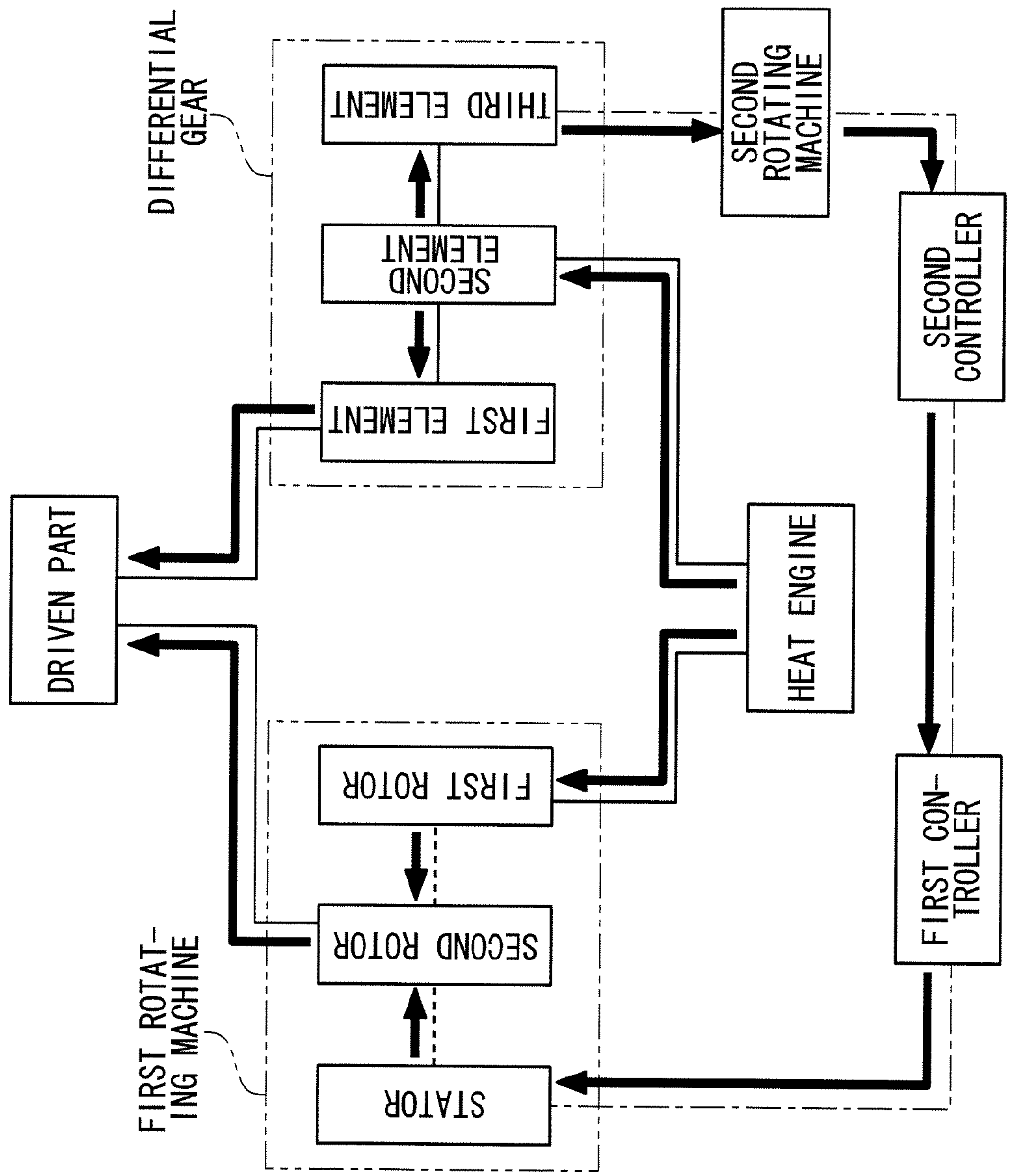
FIG. 63 is a diagram for explaining another example of the operation of a second power unit including a rotating machine and a differential gear.

Moreover, FIG. 63 schematically shows an example of the state of transmission of the motive power from the heat engine of the above-described second power unit to the driven parts. It should be noted that the method of indicating the connection relationship between the respective rotary elements in the figure is the same as the method employed in FIG. 59. In the second power unit, the motive power from the heat engine is transmitted to the driven parts, for example, as follows. Electric power is generated by the second rotating machine using part of the motive power from the heat engine under the control of the first and second controllers, and the generated electric power is supplied to the stator of the first rotating machine. During the electric power generation by the second rotating machine, as shown in FIG. 63, part of the motive power from the heat engine is transmitted to the second element connected to the first output portion of the heat engine, and is distributed to the first and third elements. The motive power distributed to the first element is transmitted to the driven parts, while the motive power distributed to the third element is transmitted to the second rotating machine to be converted to electric power and is then supplied to the stator.

Furthermore, when the electric power generated by the second rotating machine is supplied to the stator, as described above, the electric power is converted to motive power, and is then transmitted to the second rotor by the magnetism of magnetic force lines. In accordance with this, the remainder of the motive power from the heat engine is transmitted to the first rotor, and is further transmitted to the second rotor by the magnetism of magnetic force lines. Moreover, the motive power transmitted to the second rotor is transmitted to the driven parts. As a result, motive power equal in magnitude to the motive power from the heat engine is transmitted to the driven parts.

As described above, also in the second power unit, similarly to the above-described first power unit, the motive power from the heat engine is transmitted to the driven parts without being recirculated, and hence it is possible to reduce motive power passing through the first rotating machine, the differential gear and the second rotating machine. Therefore, similarly to the first power unit, it is possible to reduce the sizes and costs of the first rotating machine, the differential gear and the second rotating machine. As a result, it is possible to attain further reduction of the size and costs of the second power unit and enhance the driving efficiency of the second power unit. Moreover, the first power unit and the second power unit are only different in that the distributing and combining of motive power in the first rotating machine and the differential gear are in an opposite relationship, and hence also in the second power unit, as shown in FIG. 63, the motive power from the heat engine is transmitted to the driven parts in a divided state through the total of three transmission paths, that is, the above-described first to third transmission paths. Therefore, similarly to the first power unit, it is possible to reduce the sizes and costs of the first and second controllers. As a result, it is possible to attain further reduction of the size and costs of the second power unit.

Figure 64:
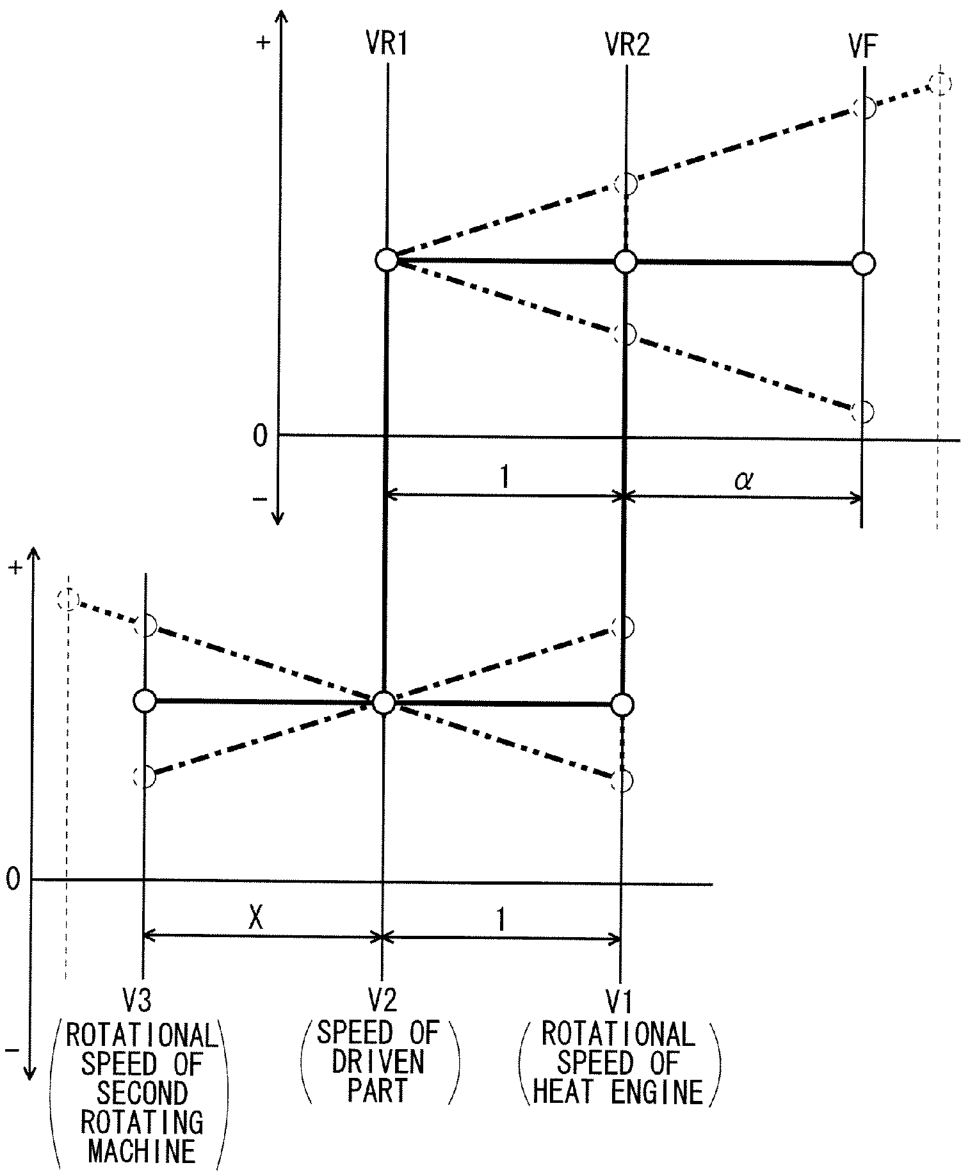
FIG. 64 is a diagram for explaining a speed-changing operation of the second power unit shown in FIG. 63.

Furthermore, also in the second power unit, similarly to the first power unit, when motive power is transmitted to the driven parts, as described above, by controlling the magnetic field rotational speed VF and the rotational speed of the second rotating machine using the first and second controllers, respectively, it is possible to transmit the motive power from the heat engine to the driven parts while steplessly changing the speed of the motive power. More specifically, in the second power unit, the relationship between the rotational speed of the heat engine, the speed of the driven parts, the magnetic field rotational speed VF, the first and second rotor rotational speeds VR1 and VR2, the first to third element rotational speeds V1 to V3, and the rotational speed of the second rotating machine is indicated, for example, by thick solid lines in FIG. 64. As indicated by two-dot chain lines in the figure, for example, by increasing the rotational speed of the second rotating machine and decreasing the magnetic field rotational speed VF, with respect to the second element rotational speed V2 and the first rotor rotational speed VR1, it is possible to transmit the motive power from the heat engine to the driven parts while steplessly reducing the speed thereof. Conversely, as indicated by one-dot chain lines in FIG. 64, by decreasing the rotational speed of the second rotating machine and increasing the magnetic field rotational speed VF, with respect to the second element rotational speed V2 and the first rotor rotational speed VR1, it is possible to transmit the motive power from the heat engine to the driven parts while steplessly increasing the speed thereof.

Moreover, when the pole pair number ratio α of the first rotating machine is relatively large, if the speed of the driven parts is higher than the rotational speed of the heat engine (see the one-dot chain lines in FIG. 64), the magnetic field rotational speed VF becomes higher than the speed of the driven parts and sometimes becomes too high. Therefore, by setting the pole pair number ratio α to a smaller value, as is apparent from a comparison between the broken lines and the one-dot chain lines in the collinear chart in FIG. 64, the magnetic field rotational speed VF can be reduced, whereby it is possible to prevent the driving efficiency from being lowered by occurrence of loss caused by the magnetic field rotational speed VF becoming too high.

Furthermore, when the above-described X determining the collinear relationship with respect to the rotational speeds of the differential gear is relatively large, if the rotational speed of the heat engine is higher than the speed of the driven parts (see the two-dot chain lines in FIG. 64), the rotational speed of the second rotating machine becomes higher than the rotational speed of the heat engine and sometimes becomes too high. Therefore, by setting the above X to a smaller value, as is apparent from a comparison between the broken lines and the two-dot chain lines in the collinear chart in FIG. 64, the rotational speed of the second rotating machine can be reduced, whereby it is possible to prevent the driving efficiency from being lowered by occurrence of loss caused by the rotational speed of the second rotating machine becoming too high.

Figure 65:
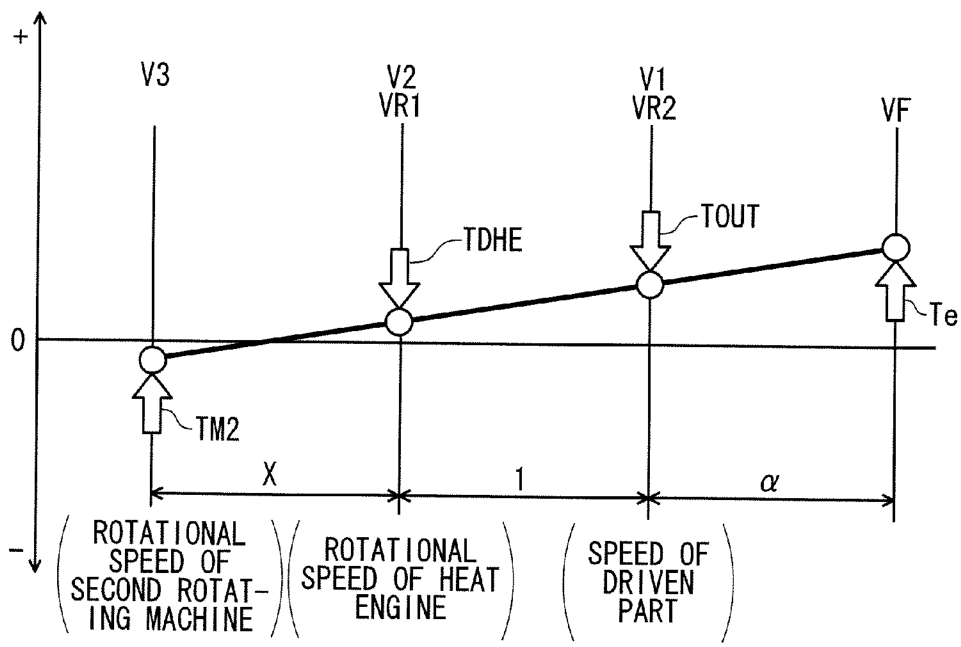
FIG. 65 is a diagram showing an example of the relationship between the rotational speeds and torques of various rotary elements of the second power unit shown in FIG. 63 in a case where a heat engine is started during driving of driven parts by the first and second rotating machines.

Moreover, in the second power unit, by supplying electric power to the stator of the first rotating machine and generating electric power by the second rotating machine, the driving equivalent torque Te of the first rotating machine can be transmitted to the driven parts in a state where the first output portion of the heat engine is stopped, using the second rotating machine torque TM2 as a reaction force, whereby it is possible to drive the driven parts. Furthermore, during such driving of the driven parts, if the heat engine is an internal combustion engine, similarly to the first power unit, it is possible to start the internal combustion engine. FIG. 65 shows the relationship between torques of various rotary elements in this case together with the relationship between the rotational speeds of the same.

When the heat engine is started as described above, as is apparent from FIG. 65, the driving equivalent torque Te is transmitted to both the driven parts and the output portion of the heat engine using the second rotating machine torque TM2 as a reaction force, and hence the torque required of the second rotating machine becomes larger than in the other cases. In this case, the torque required of the second rotating machine, that is, the second rotating machine torque TM2 is expressed by the following equation (56).

$$TM2=-\{\alpha\cdot TOUT+(1+\alpha)TDHE\}/(X+\alpha+1) \tag{56}$$

As is apparent from the equation (56), as X is larger, the second rotating machine torque TM2 becomes smaller with respect to the driven part-transmitted torque TOUT and the heat engine-transmitted torque TDHE assuming that the respective magnitudes thereof are unchanged. Therefore, by setting X to a larger value, it is possible to further reduce the size and costs of the second rotating machine.

Figure 66:
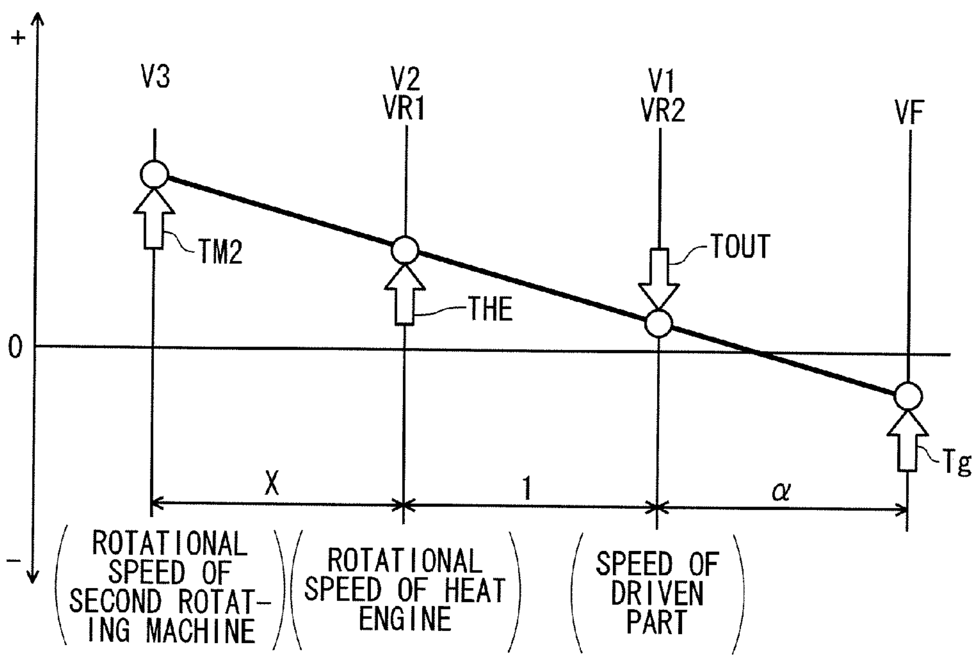
FIG. 66 is a diagram showing an example of the relationship between the rotational speeds and torques of various rotary elements of the second power unit shown in FIG. 63 in a case where the speed of the driven parts is rapidly increased.

Moreover, in the second power unit, similarly to the first power unit, the speed of the driven parts in a low-speed condition can be rapidly increased, for example, by controlling the heat engine and the first and second rotating machines in the following manner. FIG. 66 shows the relationship between the rotational speeds of various rotary elements together with the relationship between torques of the same at the start of such an operation for rapidly increasing the speed of the driven parts. In this case, the rotational speed of the heat engine is increased to such a predetermined rotational speed that the maximum torque thereof is obtained. As shown in FIG. 66, the speed of the driven parts is not immediately increased, and hence as the rotational speed of the heat engine becomes higher than the speed of the driven parts, the difference therebetween increases, whereby the direction of rotation of the rotating magnetic field determined by the relationship therebetween becomes the direction of reverse rotation. Therefore, in order to cause positive torque to act on the driven parts from the stator of the first rotating machine that generates such a rotating magnetic field, electric power generation is performed by the stator. Moreover, electric power generated by the stator is supplied to the second rotating machine to cause the second output portion of the second rotating machine to perform normal rotation.

From the above, the heat engine torque THE, the second rotating machine torque TM2 and the electric power-generating equivalent torque Tg are all transmitted to the driven parts as positive torque, which results in a rapid increase in the speed of the driven parts. Moreover, when the speed of the driven parts in the low-speed condition is rapidly increased as described above, as is apparent from FIG. 66, the heat engine torque THE and the second rotating machine torque TM2 are transmitted to the driven parts using the electric power-generating equivalent torque Tg of the first rotating machine as a reaction force, so that the torque required of the first rotating machine becomes larger than in the other cases. In this case, the torque required of the first rotating machine, that is, the electric power-generating equivalent torque Tg is expressed by the following equation (57).

$$Tg=-\{T\cdot THE+(1+X)TOUT\}/(\alpha+1+X) \tag{57}$$

As is apparent from the equation (57), as the pole pair number ratio α is larger, the electric power-generating equivalent torque Tg becomes smaller with respect to the driven part-transmitted torque TOUT and the heat engine torque THE assuming that the respective magnitudes thereof are unchanged. Therefore, by setting the pole pair number ratio α to a larger value, it is possible to further reduce the size and costs of the first rotating machine.

Figure 67:
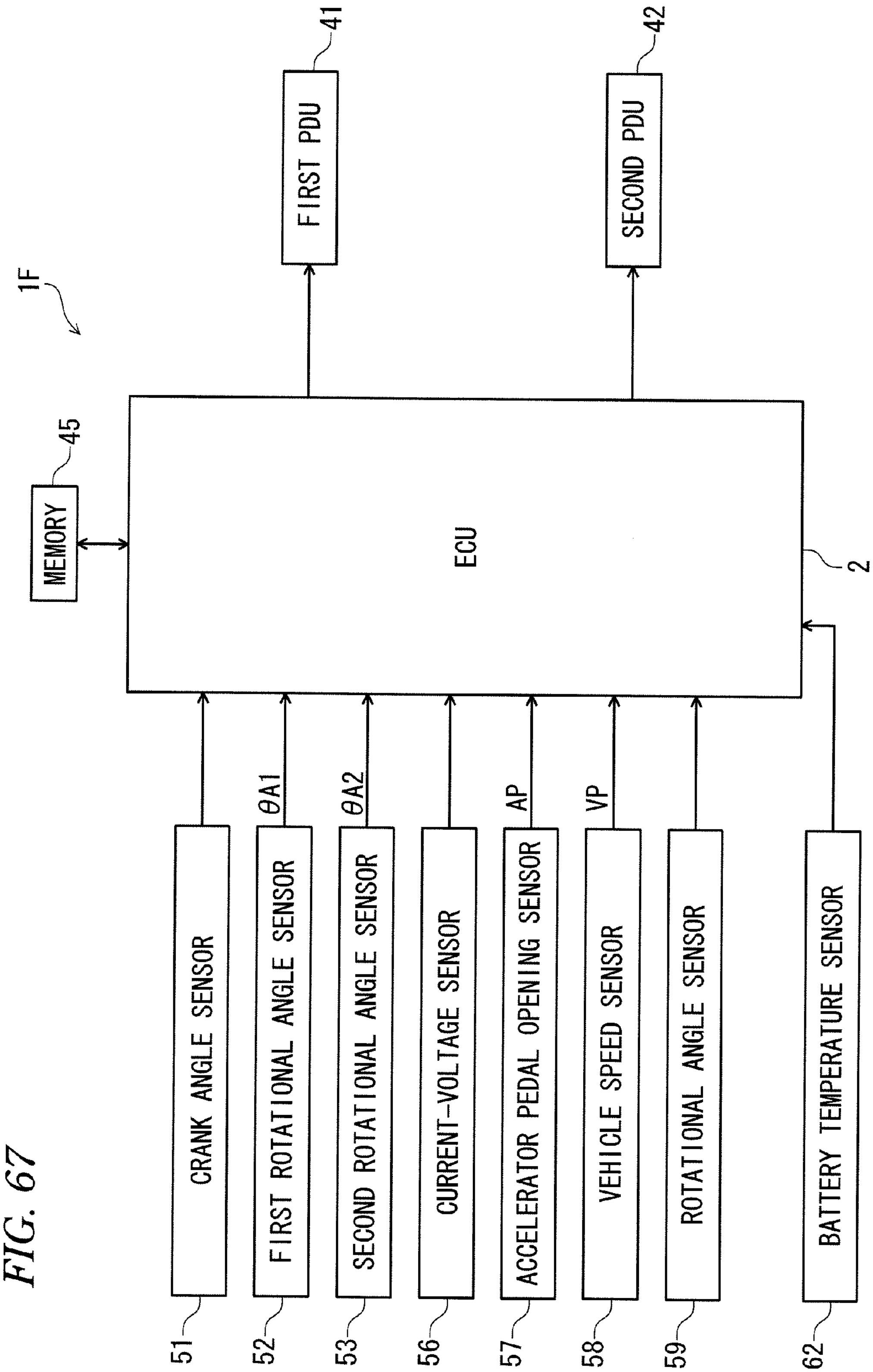
FIG. 67 is a block diagram showing a control system for controlling an engine and the like shown in FIG. 58.

Moreover, as shown in FIG. 67, a rotational angle sensor 59 is connected to the ECU 2. This rotational angle sensor 59 detects a rotational angle position of the rotor 103 of the rotating machine 101, and delivers the detection signal to the ECU 2. The ECU 2 calculates the rotational speed of the rotor 103 (hereinafter referred to as the "rotor rotational speed") based on the signal. Moreover, the ECU 2 controls the second PDU 42 based on the detected rotational angle position of the rotor 103 to thereby control the electric power supplied to the stator 102 of the rotating machine 101, electric power generated by the stator 102, and the rotor rotational speed. The ECU 2 reads data from the memory 45 storing various maps and the like necessary when performing the control. Moreover, the ECU 2 calculates the temperature of the battery 43 from a signal detected by the battery temperature sensor 62 attached to an outer covering of the battery 43 or the periphery thereof.

Figure 68:
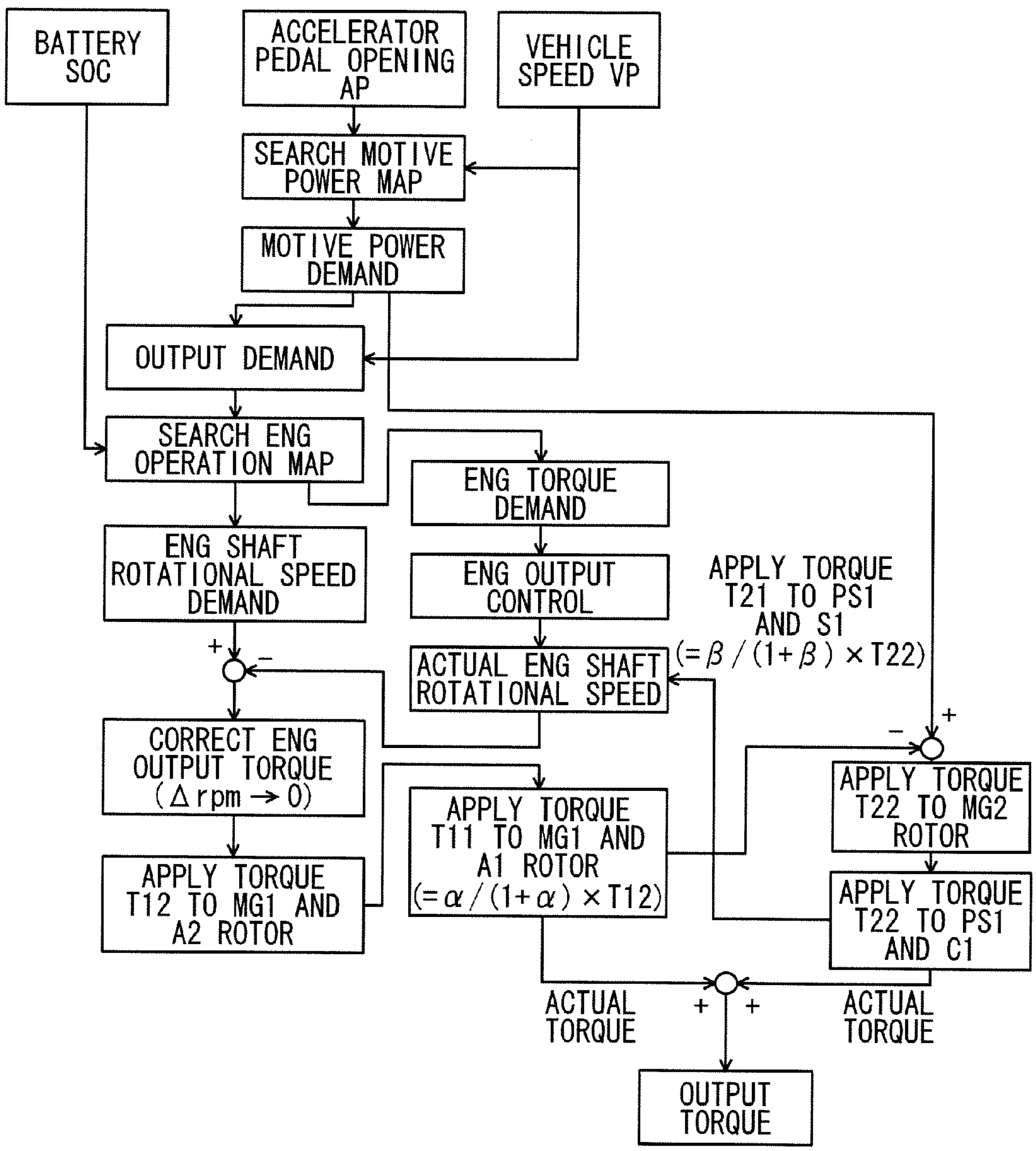
FIG. 68 is a block diagram showing motive power control in a power unit 1F shown in FIG. 58.
Figure 69:
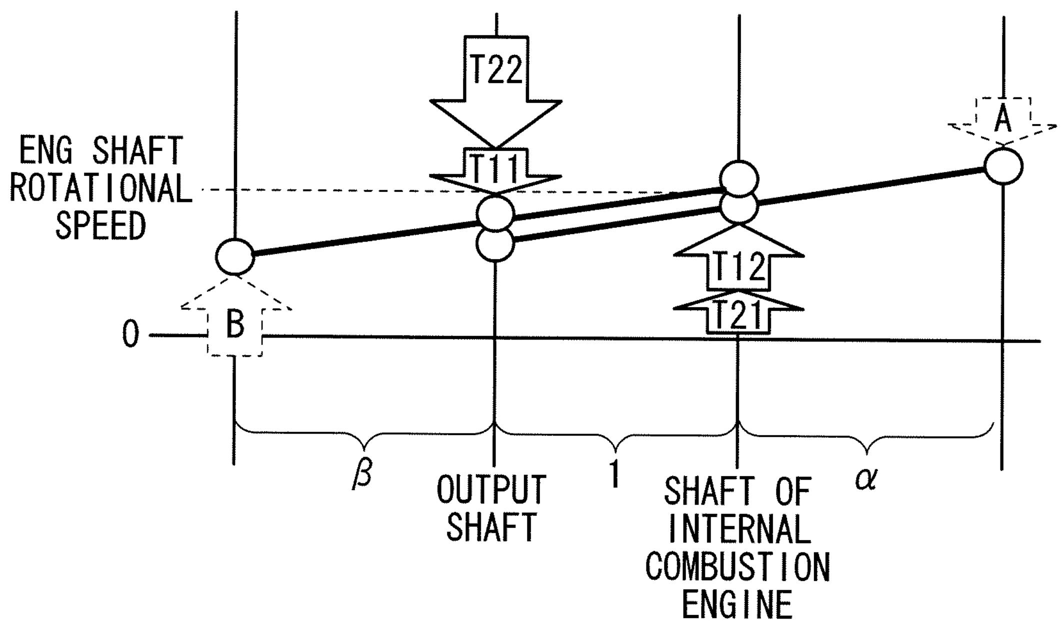
FIG. 69 is a collinear chart of the power unit 1F having a 1-common line 4-element structure.

Hereinafter, motive power control performed by the ECU 2 in the power unit 1F having the 1-common line 4-element structure described above will be described with reference to FIGS. 68 and 69. FIG. 68 is a block diagram showing motive power control in the power unit 1F of the seventh embodiment. FIG. 69 is a collinear chart in the power unit 1 having the 1-common line 4-element structure.

As shown in FIG. 68, the ECU 2 acquires a detection signal indicative of the aged negative plate AP and a detection signal indicative of the vehicle speed VP. Subsequently, the ECU 2 calculates a motive power (hereinafter referred to as a "motive power demand") corresponding to the accelerator pedal opening AP and the vehicle speed VP using a motive power map stored in the memory 45. Subsequently, the ECU 2 calculates an output (hereinafter referred to as a "output demand") corresponding to the motive power demand and the vehicle speed VP. The output demand is an output required for a vehicle to perform traveling according to an accelerator pedal operation of the driver.

Subsequently, the ECU 2 acquires information on a remaining capacity (SOC: State of Charge) of the battery 43 from the detection signal indicative of the current and voltage values input and output to and from the battery 43 described above. Subsequently, the ECU 2 determines the output ratio of the engine 3 to the output demand, corresponding to the SOC of the battery 43. Subsequently, the ECU 2 calculates an optimum operating point corresponding to the output of the engine 3 using an ENG operation map stored in the memory 45. The ENG operation map is a map based on BSFC (Brake Specific Fuel Consumption) indicative of a fuel consumption rate at each operating point corresponding to the relationship between the shaft rotational speed, torque, and output of the engine 3. Subsequently, the ECU 2 calculates a shaft rotational speed (hereinafter referred to as a "ENG shaft rotational speed demand") of the engine 3 at the optimum operating point. In addition, the ECU 2 calculates the torque (hereinafter referred to as the "ENG torque demand") of the engine 3 at the optimum operating point.

Subsequently, the ECU 2 controls the engine 3 so as to output the ENG torque demand. Subsequently, the ECU 2 detects the shaft rotational speed of the engine 3. The shaft rotational speed of the engine 3 detected at that time is referred to as an "actual ENG shaft rotational speed". Subsequently, the ECU 2 calculates a difference Δrpm between the ENG shaft rotational speed demand and the actual ENG shaft rotational speed. The ECU 2 controls the output torque of the first rotating machine 21 so that the difference Δrpm approaches 0. The control is performed when the stator 23 of the first rotating machine 21 regenerates electric power. As a result, the torque T12 shown in the collinear chart of FIG. 69 is applied to the A2 rotor 25 of the first rotating machine 21 (MG1).

The torque T12 is applied to the A2 rotor 25 of the first rotating machine 21, whereby the torque T11 is generated in the A1 rotor 24 of the first rotating machine 21 (MG1). The torque T11 is calculated by the following equation (58).

$$T11=\alpha/(1+\alpha)\times T12 \quad (58)$$

Moreover, electric energy (regenerative energy) generated by the electric power regenerated by the stator 23 of the first rotating machine 21 is delivered to the first PDU 41. In the collinear chart of FIG. 69, the regenerative energy generated by the stator 23 of the first rotating machine 21 is indicated by dotted lines A.

Subsequently, the ECU 2 controls the second PDU 42 so that the torque T22 obtained by subtracting the calculated torque T11 from the motive power demand calculated previously is applied to the first carrier C1 of the first planetary gear unit PS1. As a result, the torque is applied to the rotor 103 of the rotating machine 101 (MG2) and is transmitted to the first carrier C1 of the first planetary gear unit PS1. The collinear chart of FIG. 69 shows a case where electric energy is supplied to the stator 102 of the rotating machine 101, and the electric energy at that time is indicated by dotted lines B. In this case, in supplying electric energy to the rotating machine 101, regenerative energy obtained by the electric power regenerated by the first rotating machine 21 may be used.

As above, the torque T11 is applied to the A1 rotor 24 of the first rotating machine 21, and the torque T22 is applied to the first carrier C1 of the first planetary gear unit PS1. The A1 rotor 24 of the first rotating machine 21 is connected to the first carrier C1 of the first planetary gear unit PS1 through the connection shaft 6, and the first carrier C1 of the first planetary gear unit PS1 is connected to the second rotating shaft 7. Therefore, the sum of the torque T11 and the torque T22 is applied to the drive wheels DW and DW.

When the torque T22 is applied to the first carrier C1 of the first planetary gear unit PS1, a torque T21 is generated in the first sun gear S1 of the first planetary gear unit PS1. The torque T21 is expressed by the following equation (59).

$$T21=\beta/(1+\beta)\times T22 \quad (59)$$

Since the first sun gear S1 of the first planetary gear unit PS1 is connected to the shaft of the engine 3, the actual ENG shaft rotational speed of the engine 3 is influenced by the torque T21. However, even when the actual ENG shaft rotational speed changes, the ECU 2 controls the output torque of the first rotating machine 21 so that the difference Δrpm approaches 0. The torque T12 is changed by the control, and the torque T11 generated in the A1 rotor 24 of the first rotating machine 21 also changes. Thus, the ECU 2 changes the torque applied to the rotor 103 of the rotating machine 101. In this case, the torque T21 generated due to the changed torque also changes. As above, the torques applied to the A1 rotor 24 and the A2 rotor 25 of the first rotating machine 21 and first sun gear S1 and the first carrier C1 of the first planetary gear unit PS1 circulate (T12→T11→T22→T21), and the respective torques converge.

As described above, the ECU 2 controls the torque generated in the A2 rotor 25 of the first rotating machine 21 so that the engine 3 operates at the optimum operating point, and controls the torque generated in the rotor 103 of the rotating machine 101 so that the motive power demand is transmitted to the drive wheels DW and DW.

In the above description, although the vehicle speed VP is used when calculating the motive power demand and the output demand, information on the rotational speed of an axle may be used in place of the vehicle speed VP.

As described above, the power unit 1F according to the present embodiment is distinguished from the power unit 1 according to the first embodiment only in that the second rotating machine 31 is replaced by the first planetary gear unit PS1 and the rotating machine 101, and has quite the same functions as those of the power unit 1. Moreover, in the power unit 1F, operations in the operation modes, such as the EV creep, described in the first embodiment, are carried out in the same manner. In this case, the operations in these operation modes are performed by replacing the parameters (for example, the second magnetic field rotational speed VMF2) concerning the second rotating machine 31 by corresponding parameters concerning the rotating machine 101. In the following description, the operation modes will be described briefly by focusing on different points from the first embodiment.

EV Creep

During the EV creep, electric power is supplied from the battery 43 to the stator 102 of the rotating machine 101, and the rotor 103 is caused to perform normal rotation. Moreover, electric power generation is performed by the stator 23 using motive power transmitted to the A1 rotor 24 of the first rotating machine 21, as described later, and the generated electric power is further supplied to the stator 102. In accordance with this, torque output to the rotor 103 of the rotating machine 101 (hereinafter referred to as the "rotating machine torque") acts on the first carrier C1 to cause the first carrier C1 to perform normal rotation, and at the same time acts on the first sun gear S1 to cause the first sun gear S1 to perform reverse rotation. Moreover, part of the torque transmitted to the first carrier C1 is transmitted to the drive wheels DW and DW through the second rotating shaft 7 and the like, whereby the drive wheels DW and DW perform normal rotation.

Furthermore, during the EV creep, the remainder of the torque transmitted to the first carrier C1 is transmitted to the A1 rotor 24 through the connection shaft 6, and is then transmitted to the stator 23 as electric energy along with the electric power generation by the stator 23 of the first rotating machine 21. Moreover, as described in the first embodiment, the first rotating magnetic field generated along with the electric power generation by the stator 23 performs reverse rotation, so that the first electric power-generating equivalent torque TGE1 acts on the A2 rotor 25 to cause the A2 rotor 25 to perform normal rotation. Moreover, the torque transmitted to the A1 rotor 24 such that it is balanced with the first electric power-generating equivalent torque TGE1 is further transmitted to the A2 rotor 25, thereby acting on the A2 rotor 25 to cause the A2 rotor 25 to perform normal rotation.

In this case, the electric power supplied to the stator 102 and the electric power generated by the stator 23 are controlled such that the above-described torque for causing the first sun gear S1 to perform reverse rotation and the torques for causing the A2 rotor 25 to perform normal rotation are balanced with each other, whereby the A2 rotor 25, the first sun gear S1 and the crankshaft 3*a*, which are connected to each other, are held stationary. As a consequence, during the EV creep, the A2 rotor rotational speed VRA2 and the first sun gear rotational speed VSU1 become equal to 0, and the engine speed NE as well becomes equal to 0.

Moreover, during the EV creep, the electric power supplied to the stator 102, the electric power generated by the stator 23, the first magnetic field rotational speed VMF1 and the rotor rotational speed are controlled such that the speed relationships expressed by the above-described equations (43) and (53) are maintained and at the same time the first carrier rotational speed VCA1 and the A1 rotor rotational speed VRA1 become very small. From the above, the creep operation with a very low vehicle speed VP is carried out. As described above, it is possible to perform the creep operation using the first rotating machine 21 and the rotating machine 101 in a state where the engine 3 is stopped.

<EV Start>

At the time of the EV start, the electric power supplied to the stator 102 of the rotating machine 101 and the electric power generated by the stator 23 of the first rotating machine 21 are both increased. Moreover, while maintaining the relationships between the rotational speeds shown in the equations (43) and (53) and at the same time holding the engine speed NE at 0, the first magnetic field rotational speed VMF1 of the first rotating magnetic field that has been performing reverse rotation during the EV creep and the rotor rotational speed of the rotor 103 that has been performing normal rotation during the EV creep are increased in the same rotation directions as they have been. From the above, the vehicle speed VP is increased to cause the vehicle to start.

<ENG Start During EV Traveling>

At the time of the ENG start during EV traveling, while holding the vehicle speed VP at the value assumed then, the first magnetic field rotational speed VMF1 of the first rotating magnetic field that has been performing reverse rotation during the EV start, as described above, is controlled to 0, and the rotor rotational speed of the rotor 103 that has been performing normal rotation during the EV start, is controlled such that it is lowered. Then, after the first magnetic field rotational speed VMF1 becomes equal to 0, electric power is supplied from the battery 43 not only to the stator 102 of the rotating machine 101 but also to the stator 23 of the first rotating machine 21, whereby the first rotating magnetic field generated in the stator 23 is caused to perform normal rotation and the first magnetic field rotational speed VMF1 is caused to be increased.

By supplying the electric power to the stator 102 as described above, the rotating machine torque of the rotating machine 101 is transmitted to the first carrier C1 through the first ring gear R1, and in accordance In this way, torque transmitted to the first sun gear S1, as described later, is transmitted to the first carrier C1. That is, the rotating machine torque and the torque transmitted to the first sun gear S1 are combined, and the combined torque is transmitted to the first carrier C1. Moreover, part of the torque transmitted to the first carrier C1 is transmitted to the A1 rotor 24 through the connection shaft 6, and the remainder thereof is transmitted to the drive wheels DW and DW through the second rotating shaft 7 and the like.

At the time of the ENG start during EV traveling, as described in the first embodiment, by supplying the electric power from the battery 43 to the stator 23, the first driving equivalent torque TSE1 is transmitted to the A2 rotor 25, and in accordance with this, the torque transmitted to the A1 rotor 24 as described above is transmitted to the A2 rotor 25. Moreover, part of the torque transmitted to the A2 rotor 25 is transmitted to the first sun gear S1 through the first rotating shaft 4, and the remainder thereof is transmitted to the crankshaft 3*a* through the first rotating shaft 4 and the like, whereby the crankshaft 3*a* performs normal rotation. Furthermore, in this case, the electric power supplied to the stators 102 and 23 is controlled such that sufficient motive power is transmitted to the drive wheels DW and DW and the engine 3.

From the above, at the time of the ENG start during EV traveling, while the vehicle speed VP is held at the value assumed then, the engine speed NE is increased. In this state, similarly to the first embodiment, the ignition operation of the fuel injection valves and the spark plugs of the engine 3 is controlled according to the crank angle position, whereby the engine 3 is started. Moreover, by controlling the first magnetic field rotational speed VMF1 and the rotor rotational speed, the engine speed NE is controlled to a relatively small value suitable for starting the engine 3.

Figure 70:
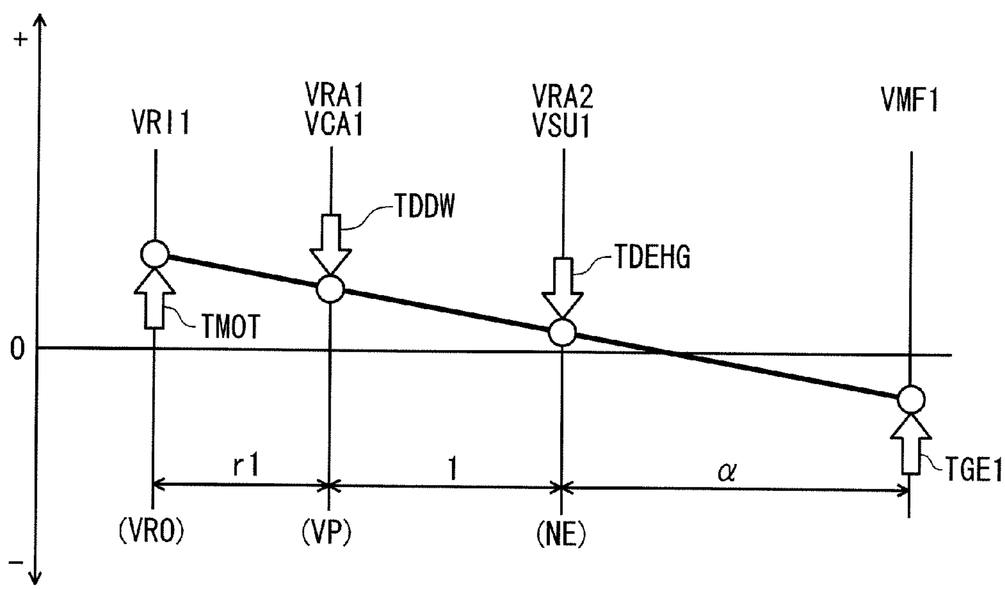
FIG. 70 is a diagram showing an example of the relationship between the rotational speeds and torques of various rotary elements of the power unit shown in FIG. 58 at the start of ENG start during EV traveling.

FIG. 70 shows an example of the relationship between the rotational speeds and torques of various rotary elements at the start of the ENG start during EV traveling. In the figure, VRO and TMOT represent the rotor rotational speed and the rotating machine torque of the rotating machine 101, respectively. In this case, as is apparent from FIG. 70, the rotating machine torque TMOT is transmitted to both the drive wheels DW and DW and the crankshaft 3*a* using the first electric power-generating equivalent torque TGE1 as a reaction force, and hence similarly to the first embodiment, the torque required of the first rotating machine 21 becomes larger than in the other cases. In this case, similarly to the first embodiment, the torque required of the first rotating machine 21, that is, the first electric power-generating equivalent torque TGE1 is expressed by the following equation (60).

$$TGE1=-\{r1\cdot TDDW+(1+r1)TDENG\}/(\alpha+1+r1) \quad (60)$$

As is clear from the above equation (60), as the first pole pair number ratio α is larger, the first electric power-generating equivalent torque TGE1 becomes smaller with respect to the drive wheel-transmitted torque TDDW and the engine-transmitted torque TDENG assuming that the respective magnitudes thereof are unchanged. In the present embodiment, similarly to the first embodiment, the first pole pair number ratio α is set to 2.0, so that the first electric power-generating equivalent torque TGE1 can be made smaller than that when the first pole pair number ratio α is set to a value smaller than 1.0.

<ENG Traveling>

During the ENG traveling, the operations in the battery input/output zero mode, the assist mode, and the drive-time charging mode are executed according to the executing conditions described in the first embodiment. In the battery input/output zero mode, by using the engine motive power transmitted to the A2 rotor 25, electric power generation is performed by the stator 23 of the first rotating machine 21, and the generated electric power is supplied to the stator 102 of the rotating machine 101 without charging it into the battery 43. In this case, similarly to the first embodiment, part of the engine torque TENG is distributed to the stator 23 and the A1 rotor 24 through the A2 rotor 25. Moreover, the remainder of the engine torque TENG is transmitted to the first sun gear S1 through the first rotating shaft 4. Furthermore, similarly to the case of the ENG start during EV traveling, the rotating machine torque TMOT and the torque transmitted to the first sun gear S1 as described above are combined, and the combined torque is transmitted to the first carrier C1. Moreover, the engine torque TENG distributed to the A1 rotor 24 as described above is further transmitted to the first carrier C1 through the connection shaft 6.

As described above, the combined torque formed by combining the engine torque TENG distributed to the A1 rotor 24, the rotating machine torque TMOT and the engine torque TENG transmitted to the first sun gear S1 is transmitted to the first carrier C1. Moreover, this combined torque is transmitted to the drive wheels DW and DW, for example, through the second rotating shaft 7 and the like. As a consequence, assuming that there is no transmission loss caused by the gears, in the battery input/output zero mode, motive power equal in magnitude to the engine motive power is transmitted to the drive wheels DW and DW, similarly to the first embodiment.

Furthermore, in the battery input/output zero mode, the engine motive power is transmitted to the drive wheels DW and DW while having the speed thereof steplessly changed through the control of the first magnetic field rotational speed VMF1 and the rotor rotational speed VRO. In short, the first rotating machine 21, the first planetary gear unit PS1 and the rotating machine 101 function as a stepless transmission.

Figure 71:
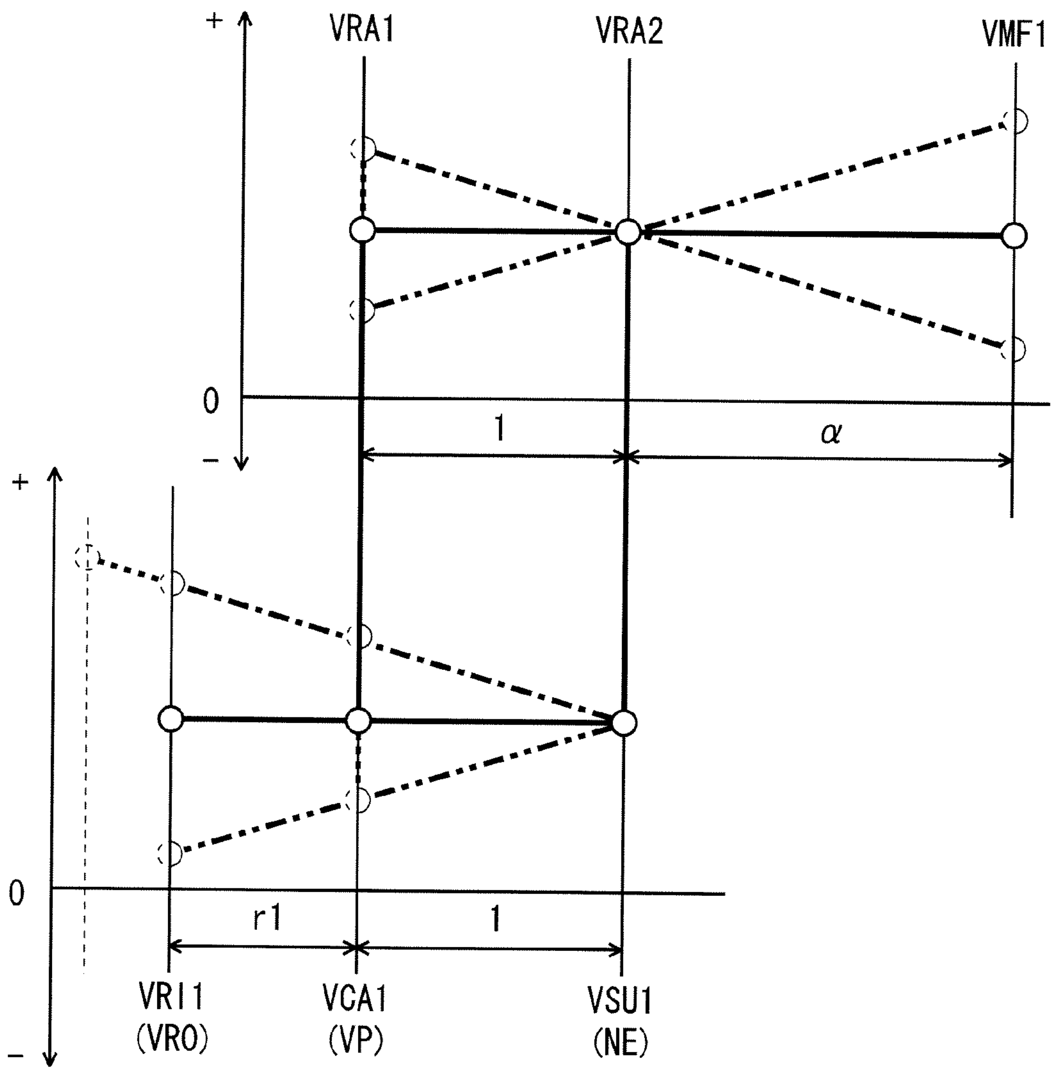
FIG. 71 is a diagram for explaining speed-changing operations by a first rotating machine and a rotating machine of the power unit shown in FIG. 58.

More specifically, as indicated by two-dot chain lines in FIG. 71, while maintaining the speed relationships expressed by the above-described equations (43) and (53), by increasing the first magnetic field rotational speed VMF1 and decreasing the rotor rotational speed VRO with respect to the A2 rotor rotational speed VRA2 and the first sun gear rotational speed VSU1, that is, the engine speed NE, it is possible to steplessly decrease the A1 rotor rotational speed VRA1 and the first carrier rotational speed VCA1, that is, the vehicle speed VP. Conversely, as indicated by one-dot chain lines in FIG. 71, by decreasing the first magnetic field rotational speed VMF1 and increasing the rotor rotational speed VRO with respect to the engine speed NE, it is possible to steplessly increase the vehicle speed VP. Moreover, in this case, the first magnetic field rotational speed VMF1 and the rotor rotational speed VRO are controlled such that the engine speed NE becomes equal to the target engine speed.

As described above, in the battery input/output zero mode, the engine motive power is once divided by the first rotating machine 21, the first planetary gear unit PS1 and the rotating machine 101, and is transmitted to the first carrier C1 through the following first to third transmission paths, and is then transmitted to the drive wheels DW and DW in a combined state.

First transmission path: A2 rotor 25→magnetic forces caused by magnetic force lines ML→A1 rotor 24→connection shaft 6→first carrier C1

Second transmission path: first sun gear S1→first planetary gears P1→first carrier C1

Third transmission path: A2 rotor 25→magnetic forces caused by magnetic force lines ML→stator 23→first PDU 41→second PDU 42→rotating machine 101→first ring gear R1→first planetary gears P1→first carrier C1

In the above first and second transmission paths, the engine motive power is transmitted to the drive wheels DW and DW by the magnetic paths and so-called mechanical paths formed by the meshing of gears without being converted to electric power.

Moreover, in the battery input/output zero mode, the electric power generated by the stator 23, the first magnetic field rotational speed VMF1 and the rotor rotational speed VRO are controlled such that the speed relationships expressed by the above-described equations (43) and (53) are maintained.

More specifically, in the assist modes, electric power is generated by the stator 23 using the engine motive power transmitted to the A2 rotor 25, and electric power charged in the battery 43 is supplied to the stator 102 of the rotating machine 101 in addition to the electric power generated by the stator 23. Therefore, the rotating machine torque TMOT based on the electric power supplied from the stator 23 and the battery 43 to the stator 102 is transmitted to the first carrier C1. Moreover, similarly to the above-described battery input/output zero mode, this rotating machine torque TMOT, the engine torque TENG distributed to the A1 rotor 24 along with the electric power generation by the stator 23, and the engine torque TENG transmitted to the first sun gear S1 are combined, and the combined torque is transmitted to the drive wheels DW and DW through the first carrier C1. As a result, assuming that there is no transmission loss caused by the gears or the like, in the assist mode, similarly to the first embodiment, the motive power transmitted to the drive wheels DW and DW becomes equal to the sum of the engine motive power and the electric power (energy) supplied from the battery 43.

Moreover, in the assist mode, the electric power generated by the stator 23, the electric power supplied from the battery 43 to the stator 102, the first magnetic field rotational speed VMF1 and the rotor rotational speed VRO are controlled such that the speed relationships expressed by the above-described equations (43) and (53) are maintained. As a consequence, similarly to the first embodiment, the insufficient amount of the engine motive power with respect to the vehicle motive power demand is made up for by supply of electric power from the battery 43 to the stator 102. It should be noted that if the insufficient amount of the engine motive power with respect to the vehicle motive power demand is relatively large, electric power is supplied from the battery 43 not only to the stator 102 of the rotating machine 101 but also to the stator 23 of the first rotating machine 21.

Moreover, in the drive-time charging mode, electric power, which has a magnitude obtained by subtracting the electric power charged into the battery 43 from the electric power generated by the stator 23 of the first rotating machine 21, is supplied to the stator 102 of the rotating machine 101, and the rotating machine torque TMOT based on this electric power is transmitted to the first carrier C1. Furthermore, similarly to the battery input/output zero mode, this rotating machine torque TMOT, the engine torque TENG distributed to the A1 rotor 24 along with the electric power generation by the stator 23; and the engine torque TENG transmitted to the first sun gear S1 are combined, and the combined torque is transmitted to the drive wheels DW and DW through the first carrier C1. As a result, during the drive-time charging mode, assuming that there is no transmission loss caused by the gears or the like, similarly to the first embodiment, the motive power transmitted to the drive wheels DW and DW has a magnitude obtained by subtracting the electric power (energy) charged into the battery 43 from the engine motive power.

Furthermore, in the drive-time charging mode, the electric power generated by the stator 23, the electric power charged into the battery 43, the first magnetic field rotational speed VMF1 and the rotor rotational speed VRO are controlled such that the speed relationships expressed by the equations (43) and (53) are maintained. As a result, similarly to the first embodiment, the surplus amount of the engine motive power with respect to the vehicle motive power demand is converted to electric power by the stator 23 of the first rotating machine 21, and is charged into the battery 43.

Moreover, during the ENG traveling, when the electric power generation is not performed by the stator 23 of the first rotating machine 21 but electric power is supplied from the battery 43 to the stator 102 of the rotating machine 101, and this electric power is controlled such that the rotating machine torque TMOT has a magnitude 11*d* times as large as the engine torque TENG, all of the engine torque TENG and the rotating machine torque TMOT are combined by the first carrier C1, and then the combined torque is transmitted to the drive wheels DW and DW. More specifically, in this case, it is possible to transmit the engine motive power to the drive wheels DW and DW only by the mechanical paths without transmitting the same by the above-described electrical paths. Moreover, in this case, torque having a magnitude (r1+1)/r1 times as large as that of the engine torque TENG is transmitted to the drive wheels DW and DW.

Figure 72:
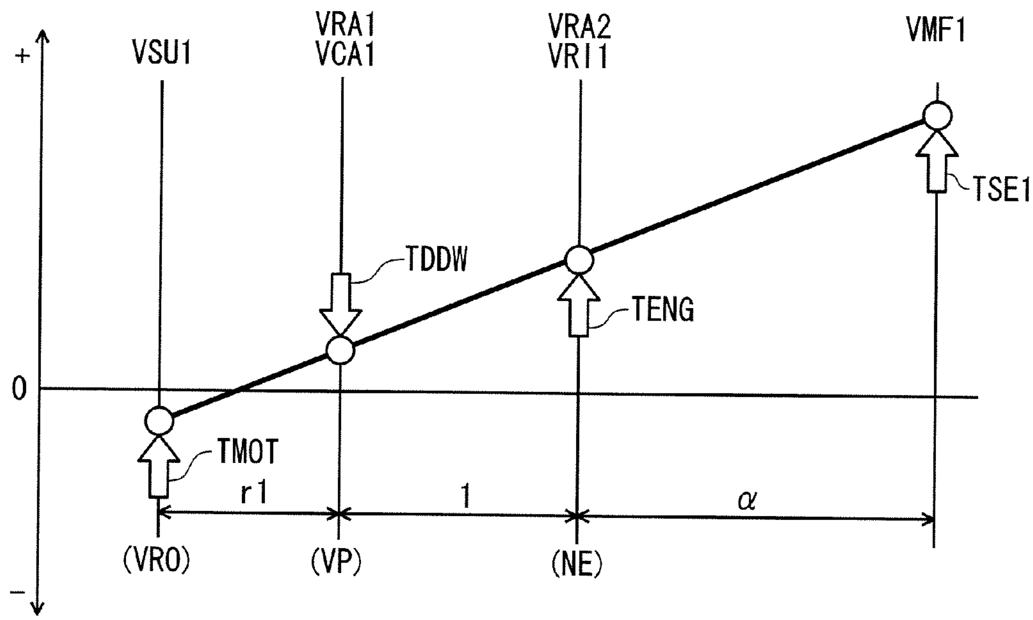
FIG. 72 is a diagram showing an example of the relationship between the rotational speeds and torques of various rotary elements of the power unit shown in FIG. 58 at the start of the rapid acceleration operation during ENG traveling.

Furthermore, at the time of the rapid acceleration operation during the ENG traveling described in the first embodiment, the engine 3, the first rotating machine 21 and the rotating machine 101 are controlled in the following manner. FIG. 72 shows an example of the relationship between the rotational speeds and torques of various rotary elements at the start of the rapid acceleration operation during ENG traveling. In this case, similarly to the first embodiment, the engine speed NE is increased to such a predetermined engine speed that the maximum torque thereof is obtained. Moreover, as shown in FIG. 72, the vehicle speed VP is not immediately increased, and hence as the engine speed NE becomes higher than the vehicle speed VP, the difference between the engine speed NE and the vehicle speed VP becomes larger, whereby the rotor 103 of the rotating machine 101 performs reverse rotation. In order to cause positive torque from the rotor 103 thus performing reverse rotation to act on the drive wheels DW and DW, the stator 102 performs electric power generation. Moreover, electric power generated by the stator 102 is supplied to the stator 23 of the first rotating machine 21 to cause the first rotating magnetic field to perform normal rotation.

As described above, the engine torque TENG, the first driving equivalent torque TSE1, and the rotating machine torque TMOT are all transmitted to the drive wheels DW and DW as positive torque, which results in a rapid increase in the vehicle speed VP. Moreover, at the start of the rapid acceleration operation during the ENG traveling, as is apparent from FIG. 72, the engine torque TENG and the first driving equivalent torque TSE1 are transmitted to the drive wheels DW and DW using the rotating machine torque TMOT as a reaction force, so that torque required of the rotating machine 101 becomes larger than otherwise. In this case, the torque required of the rotating machine 101, that is, the rotating machine torque TMOT is expressed by the following equation (61).

$$TMOT=-\{\alpha\cdot TENG+(1+\alpha)TDDW\}/(r1+1+\alpha) \quad (61)$$

As is clear from this equation (61), as the first planetary gear ratio r1 is larger, the rotating machine torque TMOT becomes smaller with respect to the drive wheel-transmitted torque TDDW and the engine torque TENG assuming that the respective magnitudes thereof are unchanged. In the present embodiment, since the first planetary gear ratio r1 is set to a relatively large one of the values that can be taken by a general planetary gear unit, the rotating machine torque TMOT can be made smaller than that when the first planetary gear ratio r1 is set to a smaller value.

<Deceleration Regeneration>

During the deceleration regeneration, when the ratio of the torque of the drive wheels DW and DW transmitted to the engine 3 to the torque of the drive wheels DW and DW (torque by inertia) is small, electric power generation is performed by the stators 23 and 102 using part of motive power from the drive wheels DW and DW, and the generated electric power is charged into the battery 43. Along with the electric power generation by the stator 102, combined torque formed by combining all the torque of the drive wheels DW and DW and torque distributed to the A1 rotor 24, as described later, is transmitted to the first carrier C1. Moreover, the above-described combined torque transmitted to the first carrier C1 is distributed to the first sun gear S1 and the first ring gear R1. The torque distributed to the first ring gear R1 is transmitted to the rotor 103.

Moreover, part of the torque distributed to the first sun gear S1 is transmitted to the engine 3, and the remainder thereof is, similarly to the case of the above-described battery input/output zero mode, transmitted to the A2 rotor 25 along with the electric power generation by the stator 23, and is then distributed to the stator 23 and the A1 rotor 24. Moreover, the torque distributed to the A1 rotor 24 is transmitted to the first carrier C1. As a result, during the deceleration regeneration, assuming that there is no transmission loss caused by the gears, similarly to the first embodiment, the sum of the motive power transmitted to the engine 3 and the electric power (energy) charged into the battery 43 becomes equal to the motive power from the drive wheels DW and DW.

<ENG Start During Stoppage of the Vehicle>.

At the time of the ENG start during stoppage of the vehicle, electric power is supplied from the battery 43 to the stator 23 of the first rotating machine 21, whereby the first rotating magnetic field generated by the stator 23 is caused to perform normal rotation, and electric power generation is performed by the stator 102 of the rotating machine 101 to further supply the generated electric power to the stator 23. As described in the first embodiment, as the electric power is supplied to the stator 23, the first driving equivalent torque TSE1 from the stator 23 acts on the A2 rotor 25 to cause A2 rotor 25 to perform normal rotation, and acts on the A1 rotor 24 to cause the A1 rotor 24 to perform reverse rotation. Moreover, part of the torque transmitted to the A2 rotor 25 is transmitted to the crankshaft 3*a*, whereby the crankshaft 3*a* performs normal rotation.

Furthermore, at the time of the ENG start during stoppage of the vehicle, the remainder of the torque transmitted to the A2 rotor 25 is transmitted to the first sun gear S1, and is then transmitted to the stator 102 as electric energy through the first planetary gears P1, the first ring gear R1 and the rotor 103 along with the electric power generation by the stator 102 of the rotating machine 101. Moreover, the vehicle speed VP is approximately equal to 0, whereas the crankshaft 3*a* performs normal rotation as described above, and hence the rotor 103 performs reverse rotation. As a result, the rotating machine torque TMOT generated along with the electric power generation by the stator 102 is transmitted to the first carrier C1 through the first ring gear R1, thereby acting on the first carrier C1 to cause the first carrier C1 to perform normal rotation. Moreover, the torque transmitted to the first sun gear S1 such that it is balanced with the rotating machine torque TMOT is further transmitted to the first carrier C1, thereby acting on the first carrier C1 to cause the first carrier C1 to perform normal rotation.

In this case, the electric power supplied to the stator 23 of the first rotating machine 21 and the electric power generated by the stator 102 of the rotating machine 101 are controlled such that the above-described torque for causing the A1 rotor 24 to perform reverse rotation, and the torques for causing the first carrier C1 to perform normal rotation are balanced with each other, whereby the A1 rotor 24, the first carrier C1 and the drive wheels DW and DW, which are connected to each other, are held stationary. As a consequence, the A1 rotor rotational speed VRA1 and the first carrier rotational speed VCA1 become equal to 0, and the vehicle speed VP as well become equal to 0.

Moreover, in this case, the electric power supplied to the stator 23, the electric power generated by the stator 102, the first magnetic field rotational speed VMF1 and the rotor rotational speed VRO are controlled such that the speed relationships expressed by the equations (43) and (53) are maintained and at the same time, the A2 rotor rotational speed VRA2 and the first sun gear rotational speed VSU1 take relatively small values. From the above, at the time of the ENG start during stoppage of the vehicle, similarly to the first embodiment, while holding the vehicle speed VP at 0, the engine speed NE is controlled to a relatively small value suitable for the start of the engine 3. Moreover, in this state, the ignition operation of the fuel injection valves and the spark plugs of the engine 3 is controlled according to the crank angle position, whereby the engine 3 is started.

<ENG Creep>

During the ENG creep, electric power generation is performed by the stators 23 and 102. Moreover, electric power thus generated by the stators 23 and 102 is charged into the battery 43. Similarly to the case of the above-described battery input/output zero mode, along with the above-described electric power generation by the stator 23, part of the engine torque TENG is transmitted to the A2 rotor 25, and the engine torque TENG transmitted to the A2 rotor 25 is distributed to the stator 23 and the A1 rotor 24. Moreover, the vehicle speed VP is approximately equal to 0, whereas the crankshaft 3*a* is performing normal rotation, and hence the rotor 103 of the rotating machine 101 performs reverse rotation. As a result, similarly to the case of the above-described ENG start during stoppage of the vehicle, the rotating machine torque TMOT generated along with the electric power generation by the stator 102 acts on the first carrier C1 to cause the first carrier C1 to perform normal rotation. Moreover, the engine torque TENG transmitted to the first sun gear S1 such that it is balanced with the rotating machine torque TMOT is further transmitted to the first carrier C1, thereby acting on the first carrier C1 to cause the first carrier C1 to perform normal rotation. Furthermore, the engine torque TENG distributed to the A1 rotor 24 as described above is transmitted to the first carrier C1.

As described above, during the ENG creep, combined torque formed by combining the engine torque TENG distributed to the A1 rotor 24, the rotating machine torque TMOT and the engine torque TENG transmitted to the first sun gear S1 is transmitted to the first carrier C1. Moreover, this combined torque is transmitted to the drive wheels DW and DW to cause the drive wheels DW and DW to perform normal rotation. Furthermore, the electric power generated by the stators 23 and 102, the first magnetic field rotational speed VMF1 and the rotor rotational speed VRO are controlled such that the A1 rotor rotational speed VRA1 and the first carrier rotational speed VCA1, that is, the vehicle speed VP becomes very small, whereby the creep operation is carried out.

Moreover, during the ENG creep, as described above, the engine torque TENG distributed to the A1 rotor 24 along with the electric power generation by the stator 23, and the engine torque TENG transmitted to the first carrier C1 through the first sun gear S1 along with the electric power generation by the stator 102 are transmitted to the drive wheels DW and DW. Thus, similarly to the first embodiment, part of the engine torque TENG can be transmitted to the drive wheels DW and DW. As a result, it is possible to perform the creep operation without causing engine stall.

<ENG-Based Start>

At the time of the ENG-based start, the rotor rotational speed VRO of the rotor 103 that has been performing reverse rotation during the ENG creep is controlled such that it becomes equal to 0, the first magnetic field rotational speed VMF1 of the first rotating magnetic field that has been performing normal rotation during the ENG creep is increased, and the engine motive power is increased. Then, after the rotor rotational speed VRO becomes equal to 0, the operation in the above-described battery input/output zero mode is performed. This increases the vehicle speed VP to cause the vehicle to start.

<EV-Based Rearward Start>

At the time of the EV-based rearward start, electric power is supplied from the battery 43 to both the stator 102 of the rotating machine 101 and the stator 23 of the first rotating machine 21. As a result, the first rotating magnetic field generated by the stator 23 is caused to perform normal rotation, and the second rotating magnetic field generated by the stator 102 is caused to perform normal rotation. During the EV-based rearward start, as the electric power is supplied to the stator 23 of the first rotating machine 21, the first driving equivalent torque from the stator 23 acts on the A2 rotor 25 to cause the A2 rotor 25 to perform normal rotation, and acts on the A1 rotor 24 to cause the A1 rotor 24 to perform reverse rotation. Moreover, as the electric power is supplied to the stator 102 of the rotating machine 101, the second driving equivalent torque TSE2 from the stator 102 acts on the first carrier C1 of the first planetary gear unit PS1 to cause the first carrier C1 to perform reverse rotation, and acts on the first sun gear S1 of the first planetary gear unit PS1 to cause the first sun gear S1 to perform normal rotation. This causes the vehicle speed VP to be increased in the negative direction, causing the vehicle to start rearward.

<ENG-Based Rearward Start>

At the time of the ENG-based rearward start, the second magnetic field rotational speed VMF2 of the second rotating magnetic field that has been performing reverse rotation during the ENG creep is controlled to be increased further in the negative direction. The first magnetic field rotational speed VMF1 of the first rotating magnetic field that has been performing normal rotation increased, and the engine motive power is increased. This causes the vehicle speed VP to be increased in the negative direction, causing the vehicle to start rearward.

As described heretofore, according to the present embodiment, the first rotating machine 21 has the same functions as those of an apparatus formed by combining a planetary gear unit and a general one-rotor-type rotating machine, so that differently from the above-described conventional power unit, the power unit 1F does not require two planetary gear units for distributing and combining motive power for transmission but requires only the first planetary gear unit PS1. In this way, it is possible to reduce the size of the power unit 1F by the corresponding extent. Moreover, in the power unit 1F, as already described in the description of the operation in the battery input/output zero mode, differently from the above-described conventional case, the engine motive power is transmitted to the drive wheels DW and DW without being recirculated, so that it is possible to reduce motive power passing through the first rotating machine 21, the first planetary gear unit PS1 and the rotating machine 101. In this way, it is possible to reduce the sizes and costs of the first rotating machine 21, the first planetary gear unit PS1 and the rotating machine 101. As a result, it is possible to attain further reduction of the size and costs of the power unit 1F. Moreover, by using the first rotating machine 21, the first planetary gear unit PS1 and the rotating machine 101, each having a torque capacity corresponding to motive power reduced as described above, it is possible to suppress the loss of motive power to improve the driving efficiency of the power unit 1F.

Moreover, the engine motive power is transmitted to the drive wheels DW and DW in a divided state through a total of three transmission paths: a first transmission path (the A2 rotor 25, magnetic forces caused by magnetic force lines ML, the A1 rotor 24, the connection shaft 6, and the first carrier C1), a second transmission path (the first sun gear S1, the first planetary gears P1, and the first carrier C1), a third transmission path (the A2 rotor 25, magnetic forces caused by magnetic force lines ML, the stator 23, the first PDU 41, the second PDU 42, the rotating machine 101, the first ring gear R1, the first planetary gears P1, and the first carrier C1). In this way, it is possible to reduce electric power (energy) passing through the first and second PDUs 41 and 42 through the third transmission path, so that it is possible to reduce the sizes and costs of the first and second PDUs 41 and 42. As a result, it is possible to attain further reduction of the size and costs of the power unit 1F.

Furthermore, as described above with reference to FIG. 71, the engine motive power is transmitted to the drive wheels DW and DW while having the speed thereof steplessly changed through the control of the first magnetic field rotational speed VMF1 and the rotor rotational speed VRO. Moreover, in this case, the first magnetic field rotational speed VMF1 and the rotor rotational speed VRO are controlled such that the engine speed NE becomes equal to the target engine speed set to a value that will make it possible to obtain the optimum fuel economy of the engine 3, and therefore it is possible to drive the drive wheels DW and DW while controlling the engine motive power such that the optimum fuel economy of the engine 3 can be obtained. In this way, it is possible to further enhance the driving efficiency of the power unit 1F.

Moreover, similarly to the first embodiment, the first pole pair number ratio α of the first rotating machine 21 is set to 2.0. In this way, at the time of the ENG start during EV traveling in which the torque required of the first rotating machine 21 becomes particularly large, as described above with reference to FIG. 70 using the above-described equation (60), it is possible to make the first electric power-generating equivalent torque TGE1 smaller than that when the first pole pair number ratio α is set to less than 1.0, and therefore it is possible to further reduce the size and costs of the first rotating machine 21. Furthermore, the first planetary gear ratio r1 of the first planetary gear unit PS1 is set to a relatively large one of the values that can be taken by a general planetary gear unit. As a consequence, at the start of the rapid acceleration operation during the ENG traveling in which torque required of the rotating machine 101 becomes particularly large, as described above with reference to FIG. 72 using the above-described equation (61), it is possible to make the rotating machine torque TMOT smaller than that when the first planetary gear ratio r1 is set to a small value. Therefore, it is possible to further reduce the size and costs of the rotating machine 101. In addition, according to the present embodiment, it is possible to obtain the same advantageous effects as provided by the first embodiment.

The power unit 1F of the present embodiment performs the same control as the "battery SOC-based control" performed by the power plant 1 of the first embodiment. In the present embodiment, the second rotating machine 31 of the first embodiment is replaced by the first planetary gear unit PS1 and the one-rotor-type rotating machine 101. Thus, the second rotating machine 31 is replaced by the rotating machine 101, the stator 33 of the second rotating machine 31 is replaced by the stator 102 of the rotating machine 101, and the B2 rotor 35 is replaced by the first carrier C1 of the first planetary gear unit PS1.

Eighth to Twelfth Embodiments

Next, power units 1G, 1H, 1I, 1J and 1K according to eighth to twelfth embodiments will be described with reference to FIGS. 73 to 77. These power units 1G to 1K are distinguished from the seventh embodiment mainly in that they further include transmissions 111, 121, 131, 141 and 151, respectively. In any of the eighth to twelfth embodiments, the connection relationship between the engine 3, the first rotating machine 21, the first planetary gear unit PS1, the rotating machine 101, and the drive wheels DW and DW is the same as the connection relationship in the seventh embodiment. More specifically, the A2 rotor 25 and the first sun gear S1 are mechanically connected to the crankshaft 3a of the engine 3, and the A1 rotor 24 and the first carrier C1 are mechanically connected to the drive wheels DW and DW.

Moreover, the rotor 103 of the rotating machine 101 is mechanically connected to the first ring gear R1. Moreover, in FIGS. 73 to 77, the constituent elements identical to those of the seventh embodiment are denoted by the same reference numerals. This also similarly applies to figures for use in describing the other embodiments described later. In the following description, different points of the power units 1G to 1K from the seventh embodiment will be mainly described in order from the power unit 1G of the eighth embodiment.

Eighth Embodiment

Figure 73:
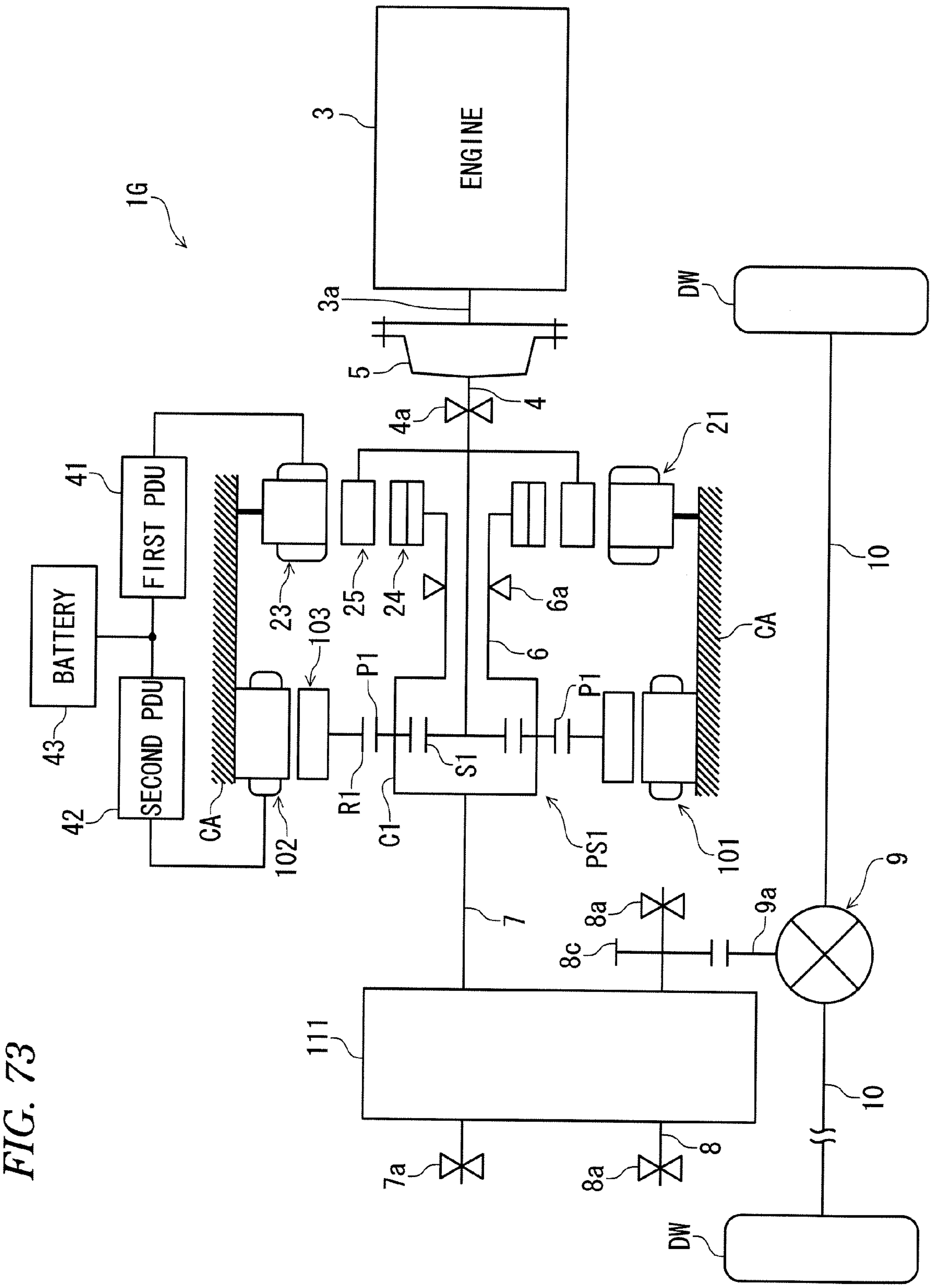
FIG. 73 is a diagram schematically showing a power unit according to an eighth embodiment.

Referring to FIG. 73, in the power unit 1G, the transmission 111 is provided in place of the above-described gear 7*b* and first gear 8*b* which are in mesh with each other. This transmission 111 is a belt-type stepless transmission, and includes an input shaft connected to the above-described second rotating shaft 7, an output shaft connected to the idler shaft 8, pulleys provided on the input shaft and the output shaft, respectively, and a metal belt wound around the pulleys, none of which are shown. The transmission 111 changes the effective diameters of the pulleys, thereby outputting motive power input to the input shaft to the output shaft while changing the speed thereof. Moreover, the transmission ratio of the transmission 111 (the rotational speed of the input shaft/the rotational speed of the output shaft) is controlled by the ECU 2.

As described above, the transmission 111 is provided between the A1 rotor 24 and the first carrier C1, and the drive wheels DW and DW, and the motive power transmitted to the A1 rotor 24 and the first carrier C1 is transmitted to the drive wheels DW and DW while having the speed thereof changed by the transmission 111.

In the power unit 1G configured as above, when a very large torque is transmitted from the A1 rotor 24 and the first carrier C1 to the drive wheels DW and DW, for example, during the above-described EV start and ENG-based start, the transmission ratio of the transmission 111 is controlled to a predetermined lower-speed value larger than 1.0. This causes the torque transmitted to the A1 rotor 24 and the first carrier C1 to be increased by the transmission 111, and then be transmitted to the drive wheels DW and DW. In accordance with this, electric power generated by the first rotating machine 21 and electric power supplied to the rotating machine 101 (generated electric power) are controlled such that the torque transmitted to the A1 rotor 24 and the first carrier C1 becomes smaller. Therefore, according to the present embodiment, it is possible to reduce the respective maximum values of torque required of the first rotating machine 21 and the rotating machine 101. As a result, it is possible to further reduce the sizes and costs of the first rotating machine 21 and the rotating machine 101. In addition, the maximum value of the torque transmitted to the first carrier C1 through the first sun gear S1 and the first ring gear R1 can be reduced, and hence it is possible to further reduce the size and costs of the first planetary gear unit PS1.

Furthermore, during traveling of the vehicle including the EV traveling and the ENG traveling, in cases where the A1 rotor rotational speed VRA1 becomes too high, for example, when the vehicle speed VP becomes very high, the transmission ratio of the transmission 111 is controlled to a predetermined higher-speed value smaller than 1.0. In this way, according to the present embodiment, the A1 rotor rotational speed VRA1 can be decreased with respect to the vehicle speed VP, and hence it is possible to prevent failure of the first rotating machine 21 from being caused by the A1 rotor rotational speed VRA1 becoming too high. This is particularly effective because the A1 rotor 24 is formed by magnets and the magnets are lower in strength than soft magnetic material elements, so that the above-described inconveniences are liable to occur.

Moreover, in cases where the rotor rotational speed VRO, which is determined by the relationship between the vehicle speed VP and the engine speed NE, becomes too high, for example, during high-vehicle speed operation of the vehicle in which the vehicle speed VP is higher than the engine speed NE, the transmission ratio of the transmission 111 is controlled to a predetermined higher-speed value smaller than 1.0. In this way, according to the present embodiment, the first carrier rotational speed VCA1 is lowered with respect to the vehicle speed VP, whereby as is apparent from FIG. 71, referred to hereinabove, it is possible to make the rotor rotational speed VRO lower. As a result, it is possible to prevent failure of the rotating machine 101 from being caused by the rotor rotational speed VRO becoming too high.

Furthermore, during traveling of the vehicle, the transmission ratio of the transmission 111 is controlled such that the first magnetic field rotational speed VMF1 and the rotor rotational speed VRO become equal to first and second predetermined target values, respectively. The first and second target values are calculated by searching a map according to the vehicle speed VP when only the first rotating machine 21 and the rotating machine 101 are used as motive power sources, whereas when the engine 3, the first rotating machine 21 and the rotating machine 101 are used as motive power sources, the first and second target values are calculated by searching a map other than the above-described map according to the engine speed NE and the vehicle speed VP. Moreover, in these maps, the first and second target values are set to such values that will make it possible to obtain high efficiencies of the first rotating machine 21 and the rotating machine 101 with respect to the vehicle speed VP (and the engine speed NE) assumed at the time. Furthermore, in parallel with the above-described control of the transmission 111, the first magnetic field rotational speed VMF1 and the rotor rotational speed VRO are controlled to the first and second target values, respectively. In this way, according to the present embodiment, during traveling of the vehicle, it is possible to obtain the high efficiencies of the first rotating machine 21 and the rotating machine 101.

Moreover, also in the present embodiment, as described above with reference to FIG. 71, using the first rotating machine 21, the first planetary gear unit PS1 and the rotating machine 101, it is possible to transmit the engine motive power to the drive wheels DW and DW while steplessly changing the speed thereof, and hence it is possible to reduce the frequency of the speed-changing operation of the transmission 111. In this way, it is possible to suppress heat losses by the speed-changing operation, and thereby secure the high driving efficiency of the power unit 1G. In addition to this, according to the present embodiment, it is possible to obtain the same advantageous effects as provided by the seventh embodiment.

It should be noted that although in the present embodiment, the transmission 111 is a belt-type stepless transmission, it is to be understood that a toroidal-type or a hydraulic-type stepless transmission or a gear-type stepped transmission may be employed.

Ninth Embodiment

Figure 74:
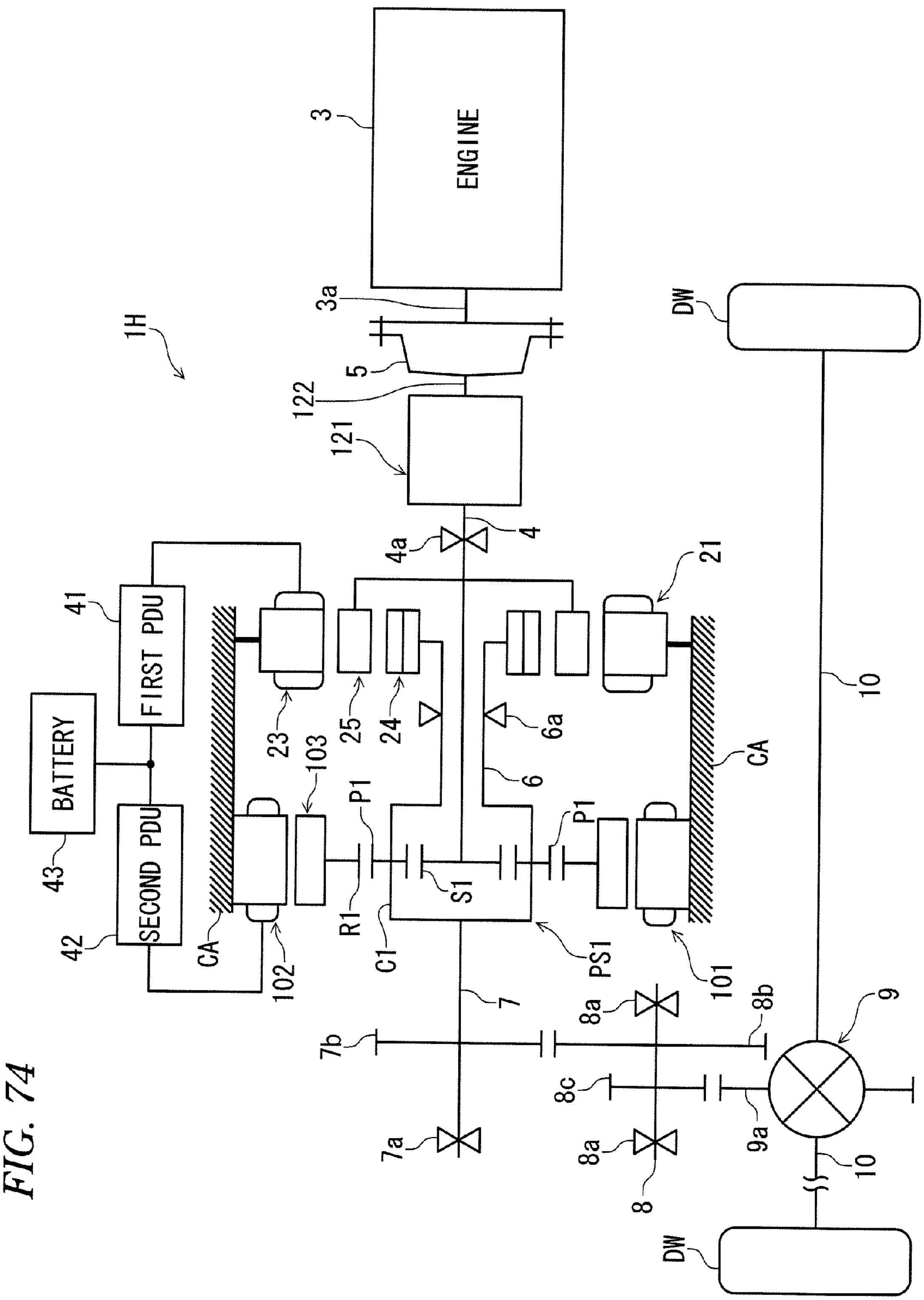
FIG. 74 is a diagram schematically showing a power unit according to a ninth embodiment.

In the power unit 1H according to the ninth embodiment shown in FIG. 74, the transmission 121 is a gear-type stepped transmission formed by a planetary gear unit and the like, and includes an input shaft 122 and an output shaft (not shown). In the transmission 121, a total of two speed positions, that is, a first speed (transmission ratio=the rotational speed of the input shaft 122/the rotational speed of the output shaft=1.0) and a second speed (transmission ratio<1.0) are set as speed positions. The ECU 2 performs a change between these speed positions. Moreover, the input shaft 122 of the transmission 121 is directly connected to the crankshaft 3a through the flywheel 5, and the output shaft (not shown) thereof is directly connected to the above-described first rotating shaft 4. As described above, the transmission 121 is provided between the crankshaft 3a and the A2 rotor 25 and the first sun gear S1, for transmitting the engine motive power to the A2 rotor 25 and the first sun gear S1 while changing the speed of the engine motive power.

Furthermore, the number of the gear teeth of the gear 9a of the above-described differential gear mechanism 9 is larger than that of the gear teeth of the second gear 8c of the idler shaft 8, whereby motive power transmitted to the idler shaft 8 is transmitted to the drive wheels DW and DW in a speed-reduced state.

In the power unit 1H configured as above, in cases where a very large torque is transmitted from the A1 rotor 24 and the first carrier C1 to the drive wheels DW and DW, for example, during the ENG-based start, the speed position of the transmission 121 is controlled to the second speed (transmission ratio<1.0). This reduces the engine torque TENG input to the A2 rotor 25 and the first sun gear S1. In accordance with this, electric power generated by the first rotating machine 21 and electric power supplied to the rotating machine 101 (generated electric power) are controlled such that the engine torque TENG transmitted to the A1 rotor 24 and the first carrier C1 becomes smaller. Moreover, the engine torque TENG transmitted to the A1 rotor 24 and the first carrier C1 is transmitted to the drive wheels DW and DW in a state increased by deceleration by the second gear 8c and the gear 9a. In this way, according to the present embodiment, it is possible to reduce the respective maximum values of torque required of the first rotating machine 21 and the rotating machine 101. As a result, it is possible to reduce the sizes and costs of the first rotating machine 21 and the rotating machine 101. In addition, it is possible to reduce the maximum value of the torque transmitted to the first carrier C1 through the first sun gear S1 and the first ring gear R1. Therefore, it is possible to further reduce the size and costs of the first planetary gear unit PS1.

Moreover, when the engine speed NE is very high, the speed position of the transmission 121 is controlled to the first speed (transmission ratio=1.0). In this way, according to the present embodiment, compared with the case of the speed position being the second speed, the A2 rotor rotational speed VRA2 can be reduced, whereby it is possible to prevent failure of the first rotating machine 21 from being caused by the A2 rotor rotational speed VRA2 becoming too high.

Moreover, in cases where the rotor rotational speed VRO becomes too high, for example, during the high-vehicle speed operation of the vehicle in which the vehicle speed VP is higher than the engine speed NE, the speed position of the transmission 121 is controlled to the second speed. In this way, according to the present embodiment, a second sun gear rotational speed VSU2 is increased with respect to the engine speed NE, whereby as is apparent from FIG. 71, it is possible to reduce the rotor rotational speed VRO. As a result, it is possible to prevent failure of the rotating machine 101 from being caused by the rotor rotational speed VRO becoming too high.

Furthermore, during the ENG traveling, the speed position of the transmission 121 is changed according to the engine speed NE and the vehicle speed VP such that the first magnetic field rotational speed VMF1 and the rotor rotational speed VRO take such respective values that will make it possible to obtain the high efficiencies of the first rotating machine 21 and the rotating machine 101. Moreover, in parallel with such a change in the speed position of the transmission 121, the first magnetic field rotational speed VMF1 and the rotor rotational speed VRO are controlled to respective values determined based on the engine speed NE, the vehicle speed VP, and the speed position of the transmission 121, which are assumed then, and the above-described equations (43) and (53). In this way, according to the present embodiment, during traveling of the vehicle, it is possible to obtain the high efficiencies of the first rotating machine 21 and the rotating machine 101.

Furthermore, during the ENG traveling, and at the same time during the speed-changing operation of the transmission 121, that is, when the engine 3 is disconnected from the A2 rotor 25 and the first sun gear S1 by the transmission 121, to suppress a speed-change shock, the first rotating machine 21 and the rotating machine 101 are controlled as described later. Hereinafter, such control of the first rotating machine 21 and the rotating machine 101 will be referred to as the "speed-change shock control".

More specifically, electric power is supplied to the stator 23 of the first rotating machine 21, causing the first rotating magnetic field generated in the stator 23 in accordance therewith to perform normal rotation, and electric power is supplied to the stator 102 of the rotating machine 101, causing the rotor 103 to perform normal rotation. This causes the first driving equivalent torque TSE1 and torque transmitted to the A1 rotor 24 as described hereafter to be combined, and this combined torque is transmitted to the A2 rotor 25. The torque transmitted to the A2 rotor 25 is transmitted to the first sun gear S1 without being transmitted to the crankshaft 3a, by the above-described disconnection by the transmission 121. Moreover, this torque is combined with the rotating machine torque TMOT transmitted to the first ring gear R1, and is then transmitted to the first carrier C1. Part of the torque transmitted to the first carrier C1 is transmitted to the A1 rotor 24, and the remainder thereof is transmitted to the drive wheels DW and DW.

Therefore, according to the present embodiment, during the speed-changing operation, it is possible to suppress a speed-change shock, which can be caused by interruption of transmission of the engine torque TENG to the drive wheels DW and DW. As a result, it is possible to improve marketability. It should be noted that this speed-change shock control is performed only during the speed-changing operation of the transmission 121. In addition to this, according to the present embodiment, it is possible to obtain the same advantageous effects as provided by the seventh embodiment.

Tenth Embodiment

Figure 75:
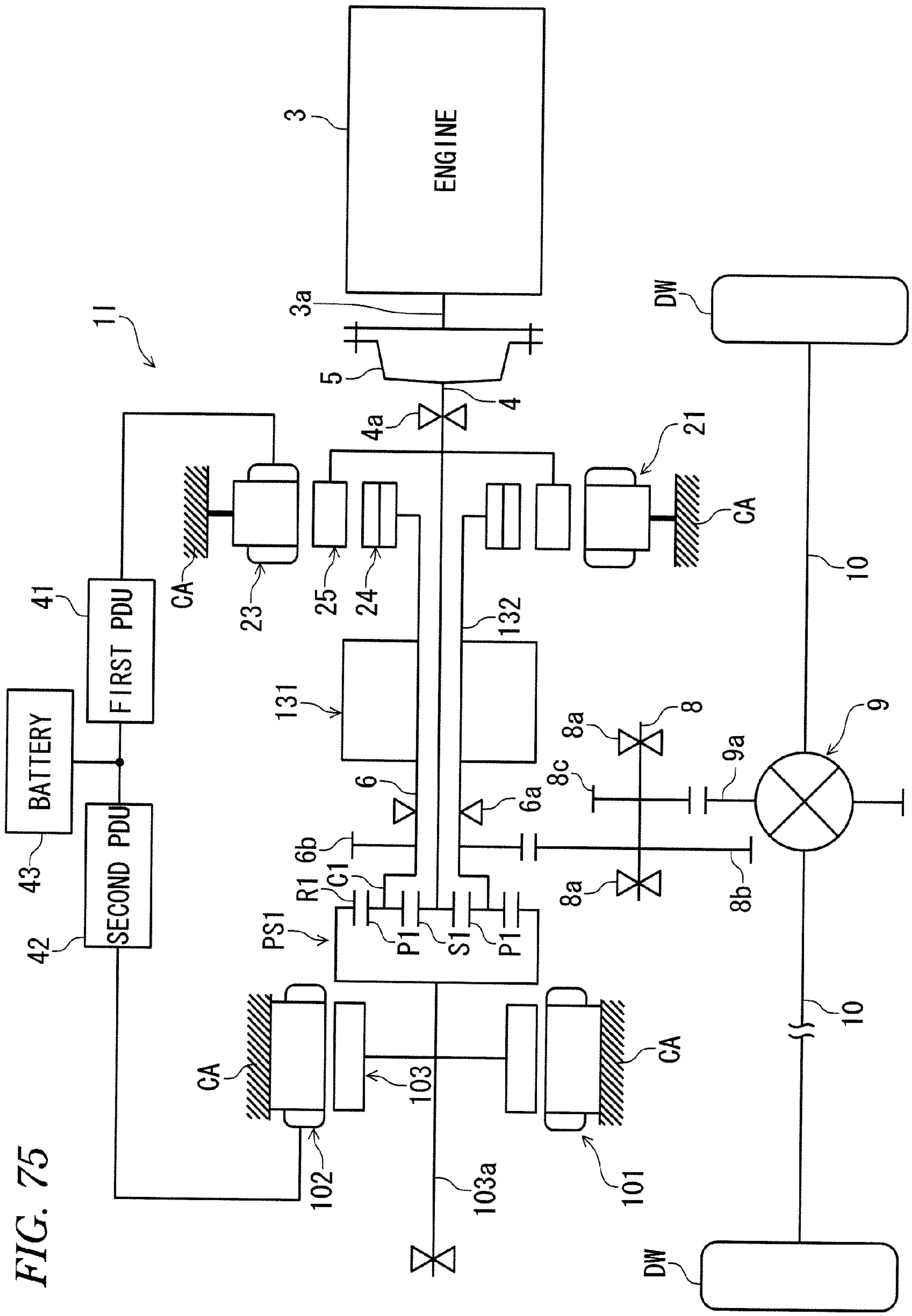
FIG. 75 is a diagram schematically showing a power unit according to a tenth embodiment.

In the power unit 1I according to the tenth embodiment shown in FIG. 75, the transmission 131 is a gear-type stepped transmission including an input shaft 132 and an output shaft (not shown), a plurality of gear trains different in gear ratio from each other, and clutches (not shown) for engaging and disengaging respectively between the gear trains, and the input shaft 132 and the output shaft, on a gear train-by-gear train basis. The transmission 131 changes the speed of motive power inputted to the input shaft 132 by using one of the gear trains, and outputs the motive power to the output shaft. Moreover, in the transmission 131, a total of four speed positions, that is, a first speed (transmission ratio=the rotational speed of the input shaft 132/the rotational speed of the output shaft>1.0), a second speed (transmission ratio=1.0), a third speed (transmission ratio<1.0) for forward travel, and one speed position for rearward travel can be set using these gear trains, and the ECU 2 controls a change between these speed positions.

Moreover, in the power unit 1I, differently from the seventh embodiment, the second rotating shaft 7 is not provided, and the A1 rotor 24 is directly connected to the input shaft 132 of the transmission 131, while the output shaft of the transmission 131 is directly connected to the above-described connection shaft 6. The connection shaft 6 is integrally formed with the gear 6*b*, and the gear 6*b* is in mesh with the above-described first gear 8*b*.

As described above, the A1 rotor 24 is mechanically connected to the drive wheels DW and DW through the transmission 131, the connection shaft 6, the gear 6*b*, the first gear 8*b*, the idler shaft 8, the second gear 8*c*, the gear 9*a*, the differential gear mechanism 9, and the like. Moreover, the motive power transmitted to the A1 rotor 24 is transmitted to the drive wheels DW and DW while having the speed thereof changed by the transmission 131. Furthermore, the first carrier C1 is mechanically connected to the drive wheels DW and DW through the connection shaft 6, the gear 6*b*, the first gear 8*b*, and the like, without passing through the transmission 131.

Moreover, the rotor 103 of the rotating machine 101 is integrally formed with a rotating shaft 103*a*, and the rotating shaft 103*a* is directly connected to the first ring gear R1 through a flange. In this way, the rotor 103 is mechanically directly connected to the first ring gear R1, and the rotor 103 is rotatable integrally with the first ring gear R1.

In the power unit 1I configured as above, in cases where a very large torque is transmitted from the A1 rotor 24 to the drive wheels DW and DW, for example, during the ENG-based start, the speed position of the transmission 131 is controlled to the first speed (transmission ratio>1.0). In this way, torque transmitted to the A1 rotor 24 is increased by the transmission 131, and is then transmitted to the drive wheels DW and DW. In accordance with this, the electric power generated by the first rotating machine 21 is controlled such that the torque transmitted to the A1 rotor 24 becomes smaller. In this way, according to the present embodiment, the maximum value of the torque required of the first rotating machine 21 can be reduced. As a result, it is possible to further reduce the size and costs of the first rotating machine 21.

Moreover, in cases where the A1 rotor rotational speed VRA1 becomes too high, for example, during the high-vehicle speed operation in which the vehicle speed VP is very high, the speed position of the transmission 131 is controlled to the third speed (transmission ratio<1.0). In this way, according to the present embodiment, since the A1 rotor rotational speed VRA1 can be lowered with respect to the vehicle speed VP, it is possible to prevent failure of the first rotating machine 21 from being caused by the A1 rotor rotational speed VRA1 becoming too high. This is particularly effective because the A1 rotor 24 is formed by magnets and the magnets are lower in strength than soft magnetic material elements, so that the above-described inconveniences are liable to occur.

Furthermore, during traveling of the vehicle including the EV traveling and the ENG traveling, the speed position of the transmission 131 is controlled such that the first magnetic field rotational speed VMF1 becomes equal to a predetermined target value. This target value is calculated by searching a map according to the vehicle speed VP when only the first rotating machine 21 and the rotating machine 101 are used as motive power sources, whereas when the engine 3, the first rotating machine 21 and the rotating machine 101 are used as motive power sources, the target value is calculated by searching a map other than the above-described map according to the engine speed NE and the vehicle speed VP. Moreover, in these maps, the target values are set to such values that will make it possible to obtain high efficiency of the first rotating machine 21 with respect to the vehicle speed VP (and the engine speed NE) assumed at the time. Furthermore, in parallel with the above-described control of the transmission 131, the first magnetic field rotational speed VMF1 is controlled to the above-described target value. In this way, according to the present embodiment, during traveling of the vehicle, it is possible to obtain the high efficiency of the first rotating machine 21.

Moreover, during the ENG traveling, and at the same time during the speed-changing operation of the transmission 131, that is, after the input shaft 132 and output shaft of the transmission, 131 are disconnected from a gear train having being selected before a speed change and until the input shaft 132 and the output shaft are connected to a gear train selected for the speed change, the first rotating machine 21 and the rotating machine 101 are controlled in the following manner. During the speed-changing operation of the transmission 131, the gear train of the transmission 131 is disconnected from the input shaft 132 and output shaft to thereby disconnect between the A1 rotor 24 and the drive wheels DW and DW, whereby the load of the drive wheels DW and DW ceases to act on the A1 rotor 24. Therefore, no electric power is generated by the first rotating machine 21, and the stator 102 of the rotating machine 101 is supplied with electric power from the battery 43.

In this way, according to the present embodiment, during the speed-changing operation of the transmission 131, the rotating machine torque TMOT transmitted to the first ring gear R1 and the engine torque TENG transmitted to the first sun gear S1 are combined, and the combined torque is transmitted to the drive wheels DW and DW through the first carrier C1. In this way, it is possible to suppress a speed-change shock, which is caused by interruption of transmission of the engine torque TENG to the drive wheels DW and DW. Therefore, it is possible to improve marketability.

Moreover, by using the first rotating machine 21, the first planetary gear unit PS1 and the rotating machine 101, it is possible to transmit the engine motive power to the drive wheels DW and DW while steplessly changing the speed thereof, and hence it is possible to reduce the frequency of the speed-changing operation of the transmission 131. Therefore, it is possible to enhance the driving efficiency of the power unit 1I. In addition to this, according to the present embodiment, it is possible to obtain the same advantageous effects as provided by the seventh embodiment.

Eleventh Embodiment

Figure 76:
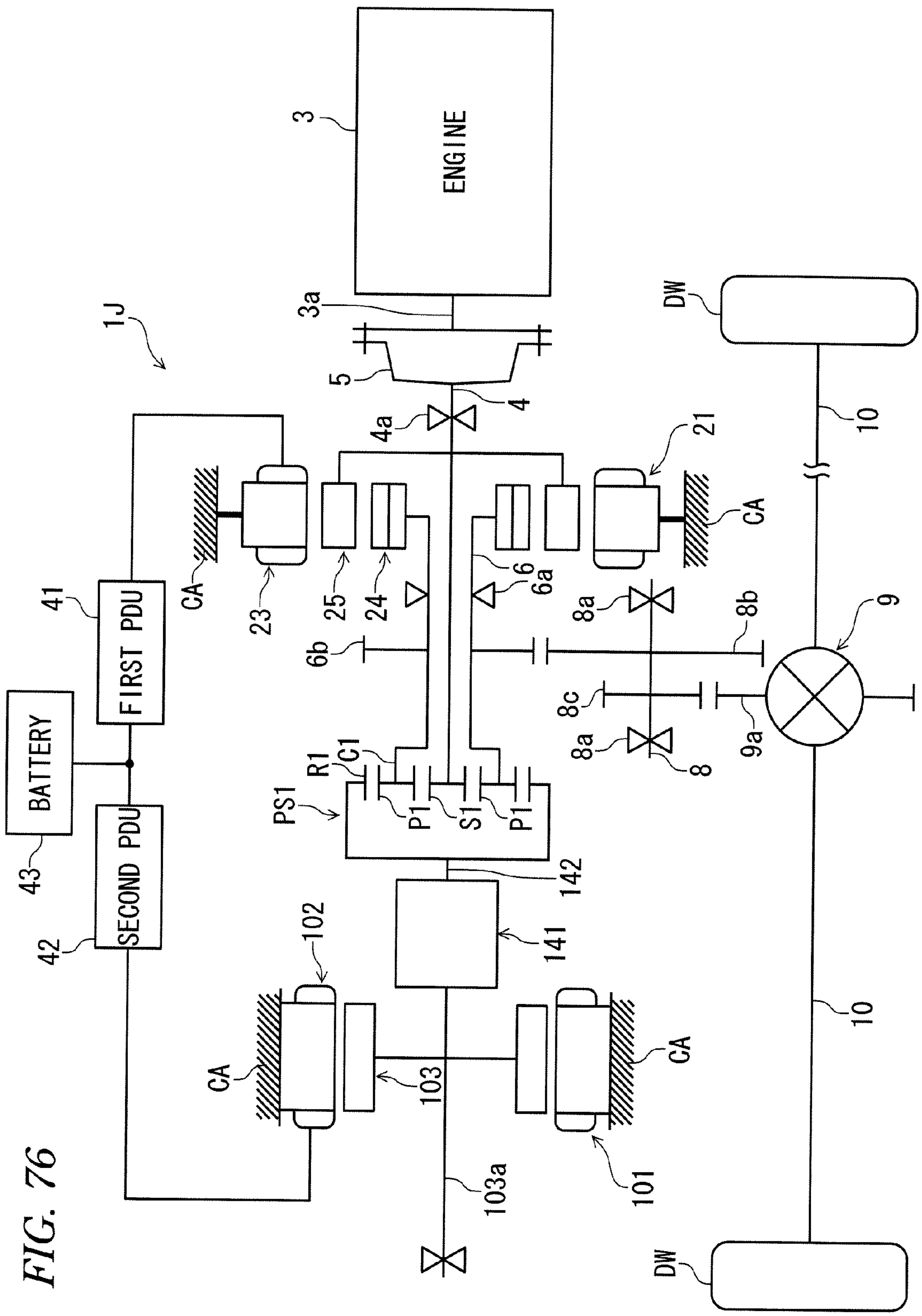
FIG. 76 is a diagram schematically showing a power unit according to an eleventh embodiment.

In the power unit 1J according to the eleventh embodiment shown in FIG. 76, similarly to the tenth embodiment, the second rotating shaft 7 is not provided, and the first gear 8*b* is in mesh with the gear 6*b* integrally formed with the connection shaft 6. In this way, the A1 rotor 24 and the first carrier C1 are mechanically connected to the drive wheels DW and DW through the connection shaft 6, the gear 6*b*, the first gear 8*b*, the idler shaft 8, the second gear 8*c*, the gear 9*a* and the differential gear mechanism 9, without passing through the transmission 141.

Moreover, the transmission 141 is a gear-type stepped transmission configured, similarly to the transmission 131 according to the tenth embodiment, to have speed positions including a first speed to a third speed. The transmission 141 includes an input shaft (not shown) directly connected to the rotor 103 of the rotating machine 101 through the rotating shaft 103*a*, and an output shaft 142 directly connected to the first ring gear R1, and transmits motive power input to the input shaft to the output shaft 142 while changing the speed of the motive power. Moreover, the ECU 2 controls a change between the speed positions of the transmission 141. As described above, the rotor 103 is mechanically connected to the first ring gear R1 through the transmission 141. Moreover, the motive power of the rotor 103 is transmitted to the first ring gear R1 while having the speed thereof changed by the transmission 141.

In the power unit 1J configured as above, when a very large torque is transmitted from the rotor 103 to the drive wheels DW and DW, for example, during the EV start and the ENG-based start, the speed position of the transmission 141 is controlled to the first speed (transmission ratio>1.0). In this way, the rotating machine torque TMOT is increased by the transmission 141, and is then transmitted to the drive wheels DW and DW through the first ring gear R1 and the first carrier C1. In accordance with this, electric power supplied to the rotating machine 101 (generated electric power) is controlled such that the rotating machine torque TMOT becomes smaller. Therefore, according to the present embodiment, it is possible to reduce the maximum value of torque required of the rotating machine 101. As a result, it is possible to further reduce the size and costs of the rotating machine 101.

Moreover, when the rotor rotational speed VRO becomes too high, for example, during the high-vehicle speed operation in which the vehicle speed VP is higher than the engine speed NE, the speed position of the transmission 141 is controlled to the third speed (transmission ratio<1.0). In this way, according to the present embodiment, the rotor rotational speed VRO can be reduced with respect to the first ring gear rotational speed VRI1, which is determined by the relationship between the vehicle speed VP and engine speed NE, assumed at the time, and hence it is possible to prevent failure of the rotating machine 101 from being caused by the rotor rotational speed VRO becoming too high.

Furthermore, during traveling of the vehicle including the EV traveling and the ENG traveling, the speed position of the transmission 141 is controlled such that the rotor rotational speed VRO becomes equal to a predetermined target value. This target value is calculated by searching a map according to the vehicle speed VP when only the first rotating machine 21 and the rotating machine 101 are used as motive power sources, whereas when the engine 3, the first rotating machine 21 and the rotating machine 101 are used as motive power sources, the target value is calculated by searching a map other than the above-described map according to the engine speed NE and the vehicle speed VP. Moreover, in these maps, the target values are set to such values that will make it possible to obtain high efficiency of the rotating machine 101 with respect to the vehicle speed VP (and the engine speed NE) assumed at the time. Furthermore, in parallel with the above-described control of the transmission 141, the rotor rotational speed VRO is controlled to the above-described target value. In this way, according to the present embodiment, during traveling of the vehicle, it is possible to obtain the high efficiency of the rotating machine 101.

Moreover, during the ENG traveling, and at the same time during the speed-changing operation of the transmission 141, that is, when the rotor 103 and the drive wheels DW and DW are disconnected from each other by the transmission 141, as described in the seventh embodiment, part of the engine torque TENG is transmitted to the drive wheels DW and DW through the A1 rotor 24. Therefore, according to the present embodiment, during the speed-changing operation of the transmission 141, it is possible to suppress a speed-change shock, which can be caused by interruption of transmission of the engine torque TENG to the drive wheels DW and DW. In this way, it is possible to improve marketability.

Moreover, by using the first rotating machine 21, the first planetary gear unit PS1 and the rotating machine 101, it is possible to transmit the engine motive power to the drive wheels DW and DW while steplessly changing the speed thereof, so that it is possible to reduce the frequency of the speed-changing operation of the transmission 141. In this way, it is possible to enhance the driving efficiency of the power unit 1J. In addition to this, according to the present embodiment, it is possible to obtain the same advantageous effects as provided by the seventh embodiment.

Twelfth Embodiment

Figure 77:
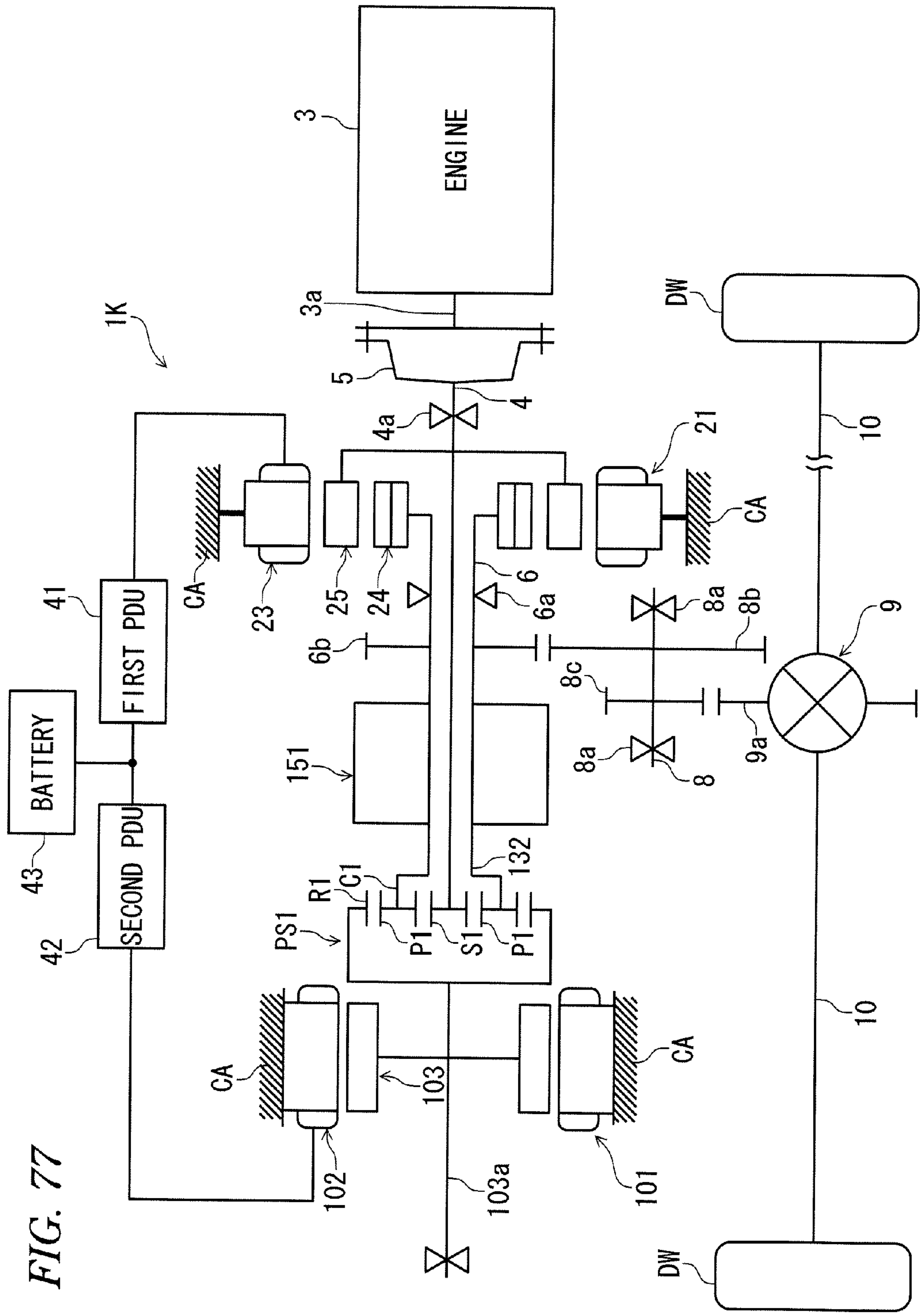
FIG. 77 is a diagram schematically showing a power unit according to a twelfth embodiment.

In the power unit 1K according to the twelfth embodiment shown in FIG. 77, similarly to the tenth and eleventh embodiments, the second rotating shaft 7 is not provided, and the first gear 8*b* is in mesh with the gear 6*b* integrally formed with the connection shaft 6. Moreover, the transmission 151 is a gear-type stepped transmission which is configured similarly to the transmission 131 according to the tenth embodiment and has speed positions of the first to third speeds. The transmission 151 includes an input shaft 152 directly connected to the first carrier C1, and an output shaft (not shown) directly connected to the connection shaft 6, and transmits motive power input to the input shaft 152 to the output shaft while changing the speed of the motive power. Furthermore, the ECU 2*a* controls a change between the speed positions of the transmission 151.

As described above, the first carrier C1 is mechanically connected to the drive wheels DW and DW through the transmission 151, the connection shaft 6, the gear 6*b*, the first gear 8*b*, and the like. Moreover, motive power transmitted to the first carrier C1 is transmitted to the drive wheels DW and DW while having the speed thereof changed by the transmission 151. Furthermore, the A1 rotor 24 is mechanically connected to the drive wheels DW and DW through the connection shaft 6, the gear 6*b*, the first gear 8*b*, and the like without passing through the transmission 151. Moreover, similarly to the tenth embodiment, the rotor 103 is directly connected to the first ring gear R1 through the rotating shaft 103*a*, and is rotatable integrally with the first ring gear R1.

In the power unit 1K configured as above, in cases where a very large torque is transmitted from the first carrier C1 to the drive wheels DW and DW, for example, during the EV start and the ENG-based start, the speed position of the transmission 151 is controlled to the first speed (transmission ratio>1.0). In this way, the torque transmitted to the first carrier C1 is increased by the transmission 151, and is then transmitted to the drive wheels DW and DW. In accordance with this, the electric power supplied to the rotating machine 101 (generated electric power) is controlled such that the rotating machine torque TMOT becomes smaller. In this way, according to the present embodiment, the maximum value of torque required of the rotating machine 101, and the maximum value of torque to be transmitted to the first carrier C1 can be reduced. As a result, it is possible to further reduce the sizes and costs of the rotating machine 101 and the first planetary gear unit PS1.

Moreover, in cases where the rotor rotational speed VRO becomes too high, for example, during the high-vehicle speed operation in which the vehicle speed VP is higher than the engine speed NE, the speed position of the transmission 151 is controlled to the third speed (transmission ratio<1.0). In this way, according to the present embodiment, the first carrier rotational speed VCA1 is reduced with respect to the vehicle speed VP, whereby as is apparent from FIG. 71, it is possible to lower the rotor rotational speed VRO. As a result, it is possible to prevent failure of the rotating machine 101 from being caused by the rotor rotational speed VRO becoming too high.

Furthermore, during traveling of the vehicle including the EV traveling and the ENG traveling, the speed position of the transmission 151 is controlled such that the rotor rotational speed VRO becomes equal to a predetermined target value. This target value is calculated by searching a map according to the vehicle speed VP when only the first rotating machine 21 and the rotating machine 101 are used as motive power sources, whereas when the engine 3, the first rotating machine 21 and the rotating machine 101 are used as motive power sources, the target value is calculated by searching a map other than the above-described map according to the engine speed NE and the vehicle speed VP. Moreover, in these maps, the target value is set to such a value that will make it possible to obtain high efficiency of the rotating machine 101 with respect to the vehicle speed VP (and the engine speed NE) assumed at the time. Furthermore, in parallel with the above-described control of the transmission 151, the rotor rotational speed VRO is controlled to the above-described target value. In this way, according to the present embodiment, during traveling of the vehicle, it is possible to obtain the high efficiency of the rotating machine 101.

Moreover, during the ENG traveling, and at the same time during the speed-changing operation of the transmission 151, that is, when the first carrier C1 and the drive wheels DW and DW are disconnected from each other by the transmission 151, as described in the seventh embodiment, part of the engine torque TENG is transmitted to the drive wheels DW and DW through the A1 rotor 24. In this way, according to the present embodiment, similarly to the eleventh embodiment, during the speed-changing operation of the transmission 151, it is possible to suppress a speed-change shock, which is caused by interruption of transmission of the engine torque TENG to the drive wheels DW and DW. In this way, it is possible to improve marketability.

Moreover, by using the first rotating machine 21, the first planetary gear unit PS1 and the rotating machine 101, it is possible to transmit the engine motive power to the drive wheels DW and DW while steplessly changing the speed thereof, so that it is possible to reduce the frequency of the speed-changing operation of the transmission 151. In this way, it is possible to enhance the driving efficiency of the power unit 1K. In addition to this, according to the present embodiment, it is possible to obtain the same advantageous effects as provided by the seventh embodiment.

It should be noted that although in the ninth to twelfth embodiments, the transmissions 121 to 151 are each a gear-type stepped transmission, it is to be understood that a belt-type, toroidal-type or hydraulic-type stepless transmission may be employed.

Thirteenth Embodiment

Next, a power unit 1L according to a thirteenth embodiment will be described with reference to FIG. 78. This power unit 1L is distinguished from the seventh embodiment mainly in that it further includes a transmission for changing the ratio between the speed difference between the rotor rotational speed VRO and the vehicle speed VP and the speed difference between the vehicle speed VP and the engine speed NE. In the following description, different points from the seventh embodiment will be mainly described.

Figure 78:
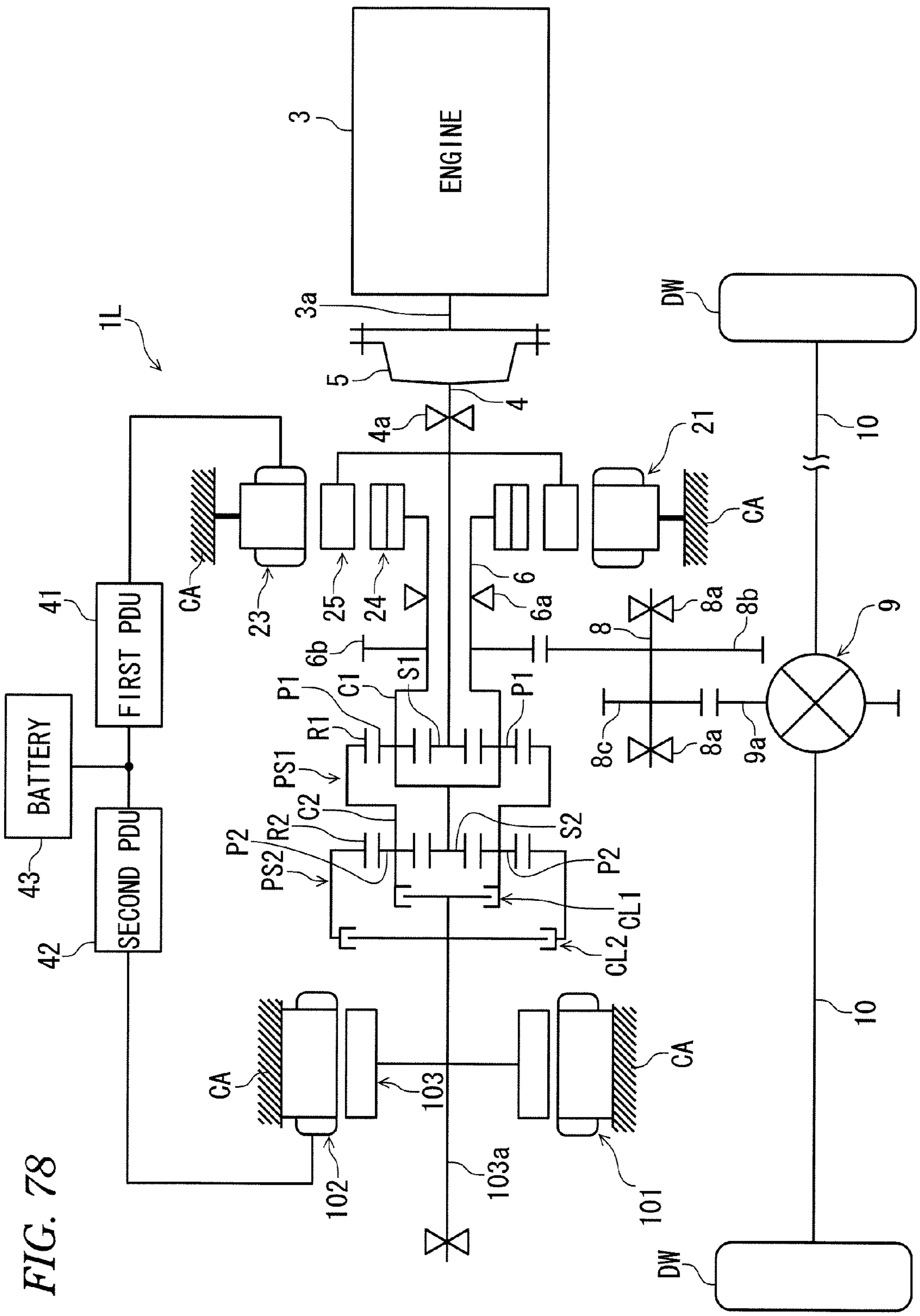
FIG. 78 is a diagram schematically showing a power unit according to a thirteenth embodiment.

Referring to FIG. 78, in this power unit 1L, similarly to the eleventh embodiment, the second rotating shaft 7 is not provided, and the first gear 8*b* is in mesh with the gear 6*b* integrally formed with the connection shaft 6, whereby the A1 rotor 24 and the first carrier C1 are mechanically connected to the drive wheels DW and DW through the connection shaft 6, the gear 6*b*, the first gear 8*b*, the differential gear mechanism 9, and the like without passing through the above-described transmission. Moreover, similarly to the tenth embodiment, the rotor 103 is rotatable integrally with the rotating shaft 103*a*.

The above-described transmission includes a second planetary gear unit PS2, a first clutch CL1 and a second clutch CL2. The second planetary gear unit PS2 is configured similarly to the first planetary gear unit PS1, and includes a second sun gear S2, a second ring gear R2, and a second carrier C2 rotatably supporting a plurality of (for example, three) second planetary gears P2 (only two of which are shown) in mesh with the two gears S2 and R2. The second sun gear S2 is mechanically directly connected to the first carrier C1 through a rotating shaft, whereby the second sun gear S2 is rotatable integrally with the first carrier C1. Moreover, the second carrier C2 is mechanically directly connected to the first ring gear R1 through a hollow shaft and flange, whereby the second carrier C2 is rotatable integrally with the first ring gear R1. Hereinafter, the rotational speeds of the second sun gear S2, the second ring gear R2 and the second carrier C2 will be referred to as the "second sun gear rotational speed VSU2, a "second ring gear rotational speed VRI2" and a "second carrier rotational speed VCA2," respectively.

The above-described first clutch CL1 is formed, for example, by a friction multiple disk clutch, and is disposed between the second carrier C2 and the rotating shaft 103*a*. That is, the second carrier C2 is mechanically directly connected to the rotor 103 through the first clutch CL1. Moreover, the first clutch CL1 has its degree of engagement controlled by the ECU 2 to thereby connect and disconnect between the second carrier C2 and the rotating shaft 103*a*, that is, between the second carrier C2 and the rotor 103.

Similarly to the first clutch CL1, the above-described second clutch CL2 is formed by a friction multiple disk clutch, and is disposed between the second ring gear R2 and the rotating shaft 103*a*. That is, the second ring gear R2 is mechanically directly connected to the rotor 103 through the second clutch CL2. Moreover, the second clutch CL2 has its degree of engagement controlled by the ECU 2 to thereby connect and disconnect between the second ring gear R2 and the rotating shaft 103*a*, that is, between the second ring gear R2 and the rotor 103.

As described above, in the power unit 1L, the rotor 103 of the rotating machine 101 is mechanically connected to the first ring gear R1 through the first clutch CL1 and the second carrier C2, and is mechanically connected to the first ring gear R1 through the second clutch CL2, the second ring gear R2, the second planetary gears P2, and the second carrier C2.

Figure 79:
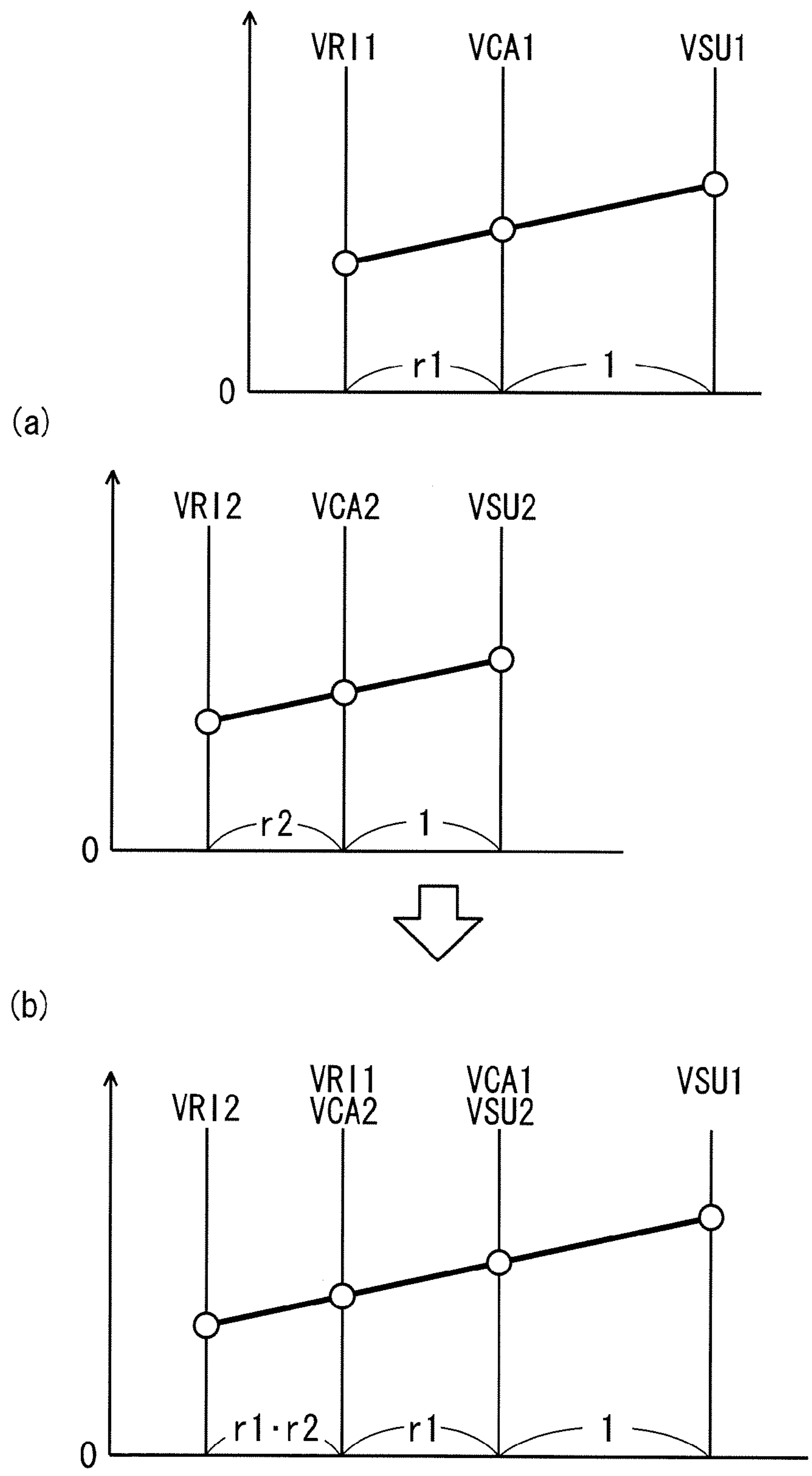
FIG. 79(*a*) is a collinear chart showing an example of the relationship between a first sun gear rotational speed, a first carrier rotational speed, and a first ring gear rotational speed, depicted together with a collinear chart showing an example of the relationship between a second sun gear rotational speed, a second carrier rotational speed, and a second ring gear rotational speed, and FIG. 79(*b*) is a collinear chart showing an example of the relationship between the rotational speeds of four rotary elements formed by connecting the first and second planetary gear units of the power unit shown in FIG. 78.

FIG. 79(*a*) shows a collinear chart showing an example of the relationship between the first sun gear rotational speed VSU1, the first carrier rotational speed VCA1 and the first ring gear rotational speed VRI1, depicted together with a collinear chart showing an example of the relationship between the second sun gear rotational speed VSU2, the second carrier rotational speed VCA2 and the second ring gear rotational speed VRI2. In the figure, r2 represents the ratio between the number of the gear teeth of the second sun gear S2 and that of the gear teeth of the second ring gear R2

(the number of the gear teeth of the second sun gear S2/the number of the gear teeth of the second ring gear R2; hereinafter referred to as the "second planetary gear ratio").

As described above, since the first carrier C1 and the second sun gear S2 are directly connected to each other, the first carrier rotational speed VCA1 and the second sun gear rotational speed VSU2 are equal to each other, and since the first ring gear R1 and the second carrier C2 are directly connected to each other, the first ring gear rotational speed VRI1 and the second carrier rotational speed VCA2 are equal to each other. Therefore, the two collinear charts concerning the first and second planetary gear units PS1 and PS2 shown in FIG. 79(*a*) can be represented by a single collinear chart as shown in FIG. 79(*b*). As shown in the figure, four rotary elements of which the rotational speeds are in a collinear relationship with each other are formed by connecting various rotary elements of the first and second planetary gear units PS1 and PS2 described above.

Figure 80:
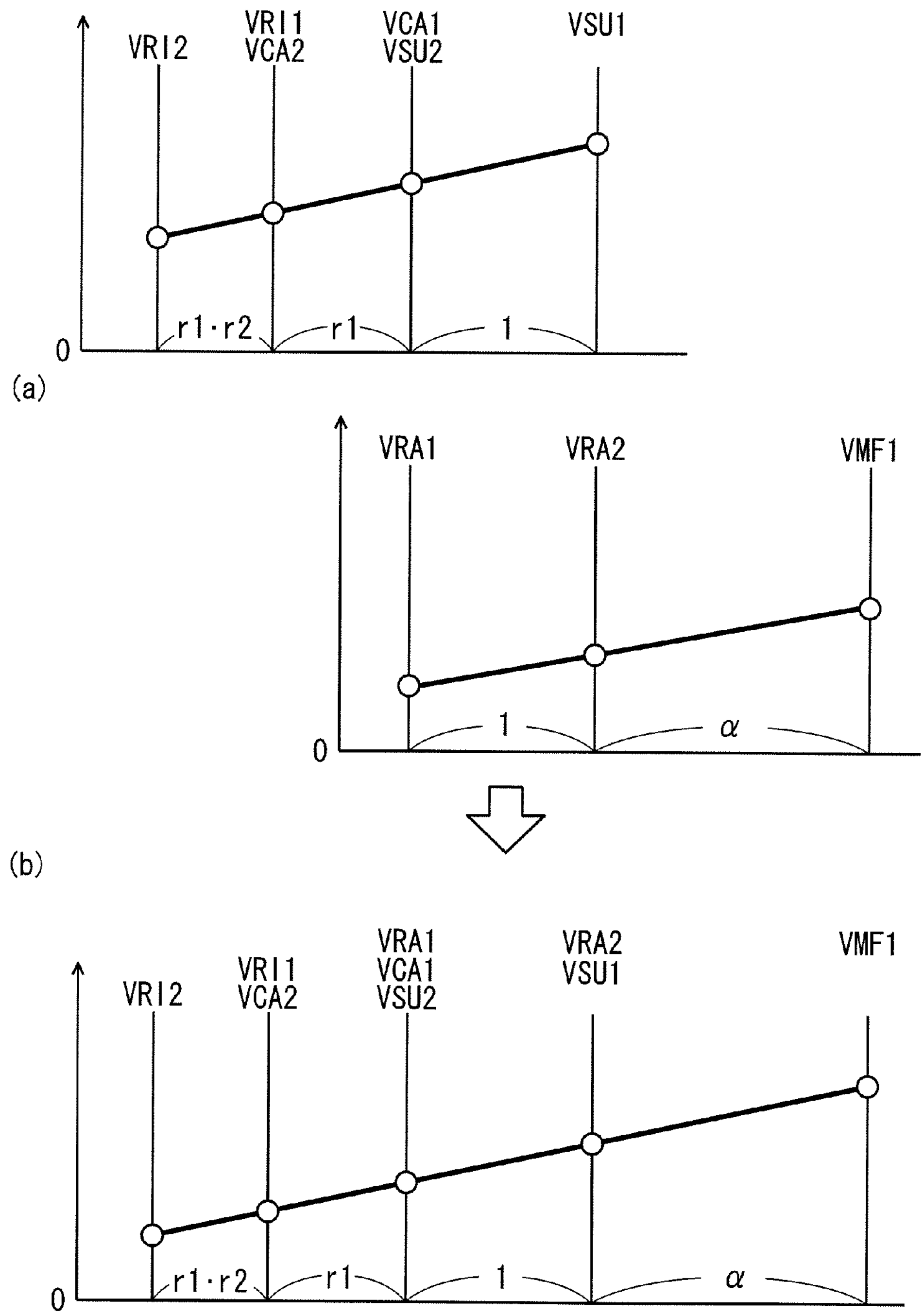
FIG. 80(*a*) is a collinear chart showing an example of the relationship between the rotational speeds of the four rotary elements formed by connecting the first and second planetary gear units of the power unit shown in FIG. 78, depicted together with a collinear chart showing an example of the relationship between the first magnetic field rotational speed and the A1 and A2 rotor rotational speeds, and FIG. 80(*b*) is a collinear chart showing an example of the relationship between the rotational speeds of five rotary elements formed by connecting the second rotating machine and the first and second planetary gear units of the power unit shown in FIG. 78.

Moreover, FIG. 80(*a*) shows a collinear chart of an example of the relationship between the rotational speeds of the above-described four rotary elements, depicted together with a collinear chart of an example of the relationship between the first magnetic field rotational speed VMF1 and the A1 and A2 rotor rotational speeds VRA1 and VRA2. As described above, since the first carrier C1 and the A1 rotor 24 are directly connected to each other, the second carrier rotational speed VCA2 and the A1 rotor rotational speed VRA1 are equal to each other. Moreover, since the first sun gear S1 and the A2 rotor 25 are directly connected to each other, the first sun gear rotational speed VSU1 and the A2 rotor rotational speed VRA2 are equal to each other. Therefore, the two collinear charts shown in FIG. 80(*a*) can be represented by a single collinear chart as shown in FIG. 80(*b*).

Moreover, since the crankshaft 3*a*, the A2 rotor 25 and the first sun gear S1 are directly connected to each other, the engine speed NE, the A2 rotor rotational speed VRA2 and the first sun gear rotational speed VSU1 are equal to each other. Furthermore, since the drive wheels DW and DW, the A1 rotor 24, the first carrier C1 and the second sun gear S2 are connected to each other, assuming that there is no change in speed by the differential gear mechanism 9 or the like, the vehicle speed VP, the A1 rotor rotational speed VRA1, the first carrier rotational speed VCA1 and the second sun gear rotational speed VSU2 are equal to each other.

Moreover, the rotor 103 is connected to the second carrier C2 and the second ring gear R2 through the first and second clutches CL1 and CL2, respectively, and hence when the first clutch CL1 is engaged and the second clutch CL2 is disengaged (hereinafter, such an engaged and disengaged state of the clutches will be referred to as the "first speed-changing mode"), the rotor rotational speed VRO and the second carrier rotational speed VCA2 are equal to each other. Furthermore, when the first clutch CL1 is disengaged and the second clutch CL2 is engaged (hereinafter, such an engaged and disengaged state of the clutches will be referred to as the "second speed-changing mode"), the rotor rotational speed VRO and the second ring gear rotational speed VRI2 are equal to each other.

Figure 81:
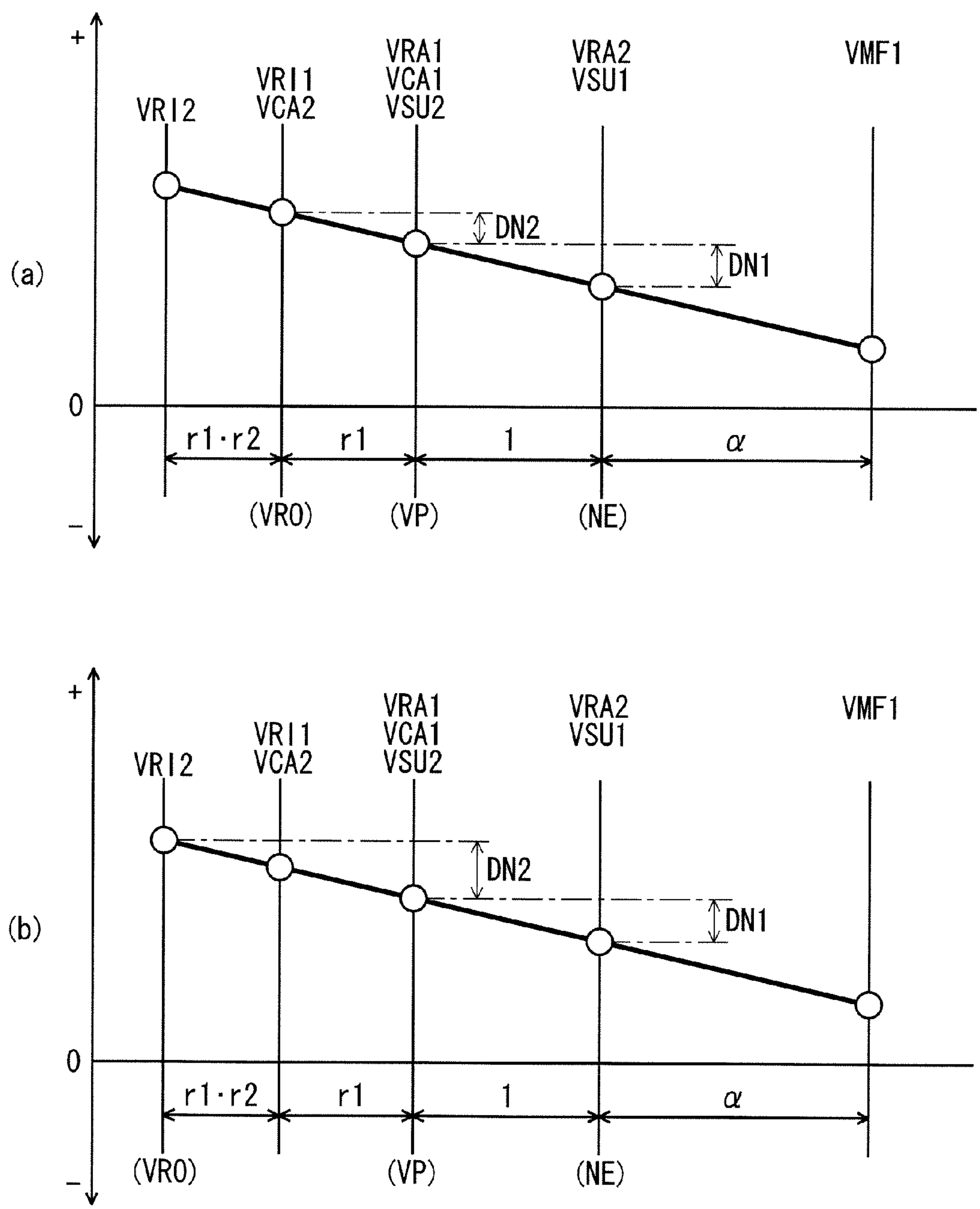
FIGS. 81(*a*) and 81(*b*) are collinear charts showing examples of the relationship between the rotational speeds of various rotary elements of the power unit shown in FIG. 78, during first and second speed-changing modes, respectively.

From the above, the first magnetic field rotational speed VMF1, the engine speed NE, the vehicle speed VP, and the rotor rotational speed VRO are in such a collinear relationship as shown, for example, in FIG. 81(*a*) in the first speed-changing mode, whereas in the second speed-changing mode, they are in such a collinear relationship as shown, for example, in FIG. 81(*b*).

As shown in FIGS. 81(*a*) and 81(*b*), the distance between the vertical line representing the vehicle speed VP and the vertical line representing the rotor rotational speed VRO in the collinear charts is shorter in the first speed-changing mode than in the second speed-changing mode, and therefore the ratio between a rotational difference DN2 between the rotor rotational speed VRO and the vehicle speed VP and a rotational difference DN1 between the vehicle speed VP and the engine speed NE (hereinafter referred to as the "rotational ratio DN2/DN1) is smaller in the first speed-changing mode.

In the power unit 1L configured as above, in cases where the rotor rotational speed VRO becomes too high, for example, during the high-vehicle speed operation in which the vehicle speed VP is higher than the engine speed NE, or when the vehicle speed VP is high during the above-described EV traveling, the first speed-changing mode is used. In this way, according to the present embodiment, as is clear from the relationship of the rotational ratio DN2/DN1, the rotor rotational speed VRO can be made lower than that when the second speed-changing mode is used, so that it is possible to prevent failure of the rotating machine 101 from being caused by the rotor rotational speed VRO becoming too high.

Figure 82:
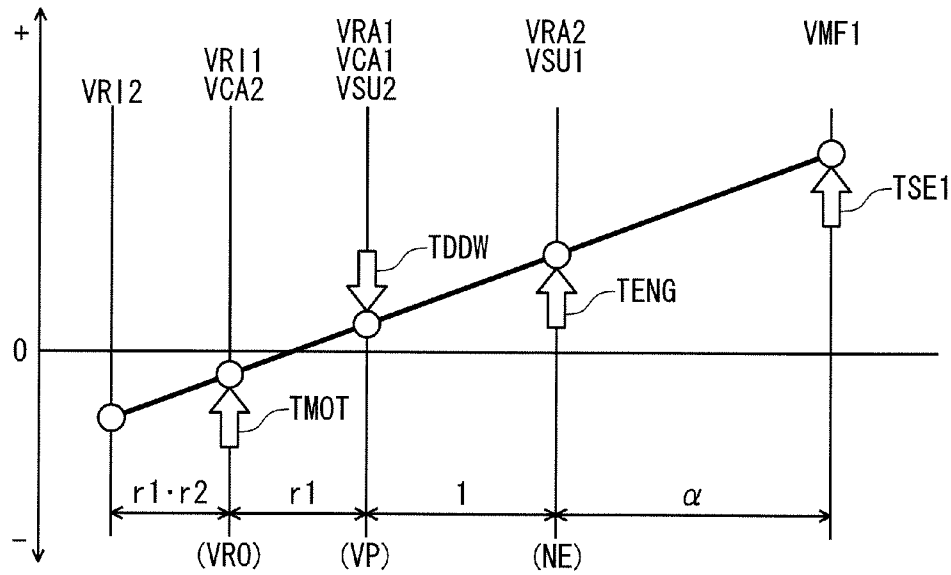
FIGS. 82(*a*) and 82(*b*) are diagrams showing examples of the relationship between the rotational speeds and torques of various rotary elements of the power unit shown in FIG. 78 at the start of rapid acceleration operation during ENG traveling during the first and second speed-changing modes, respectively.
Figure 82:
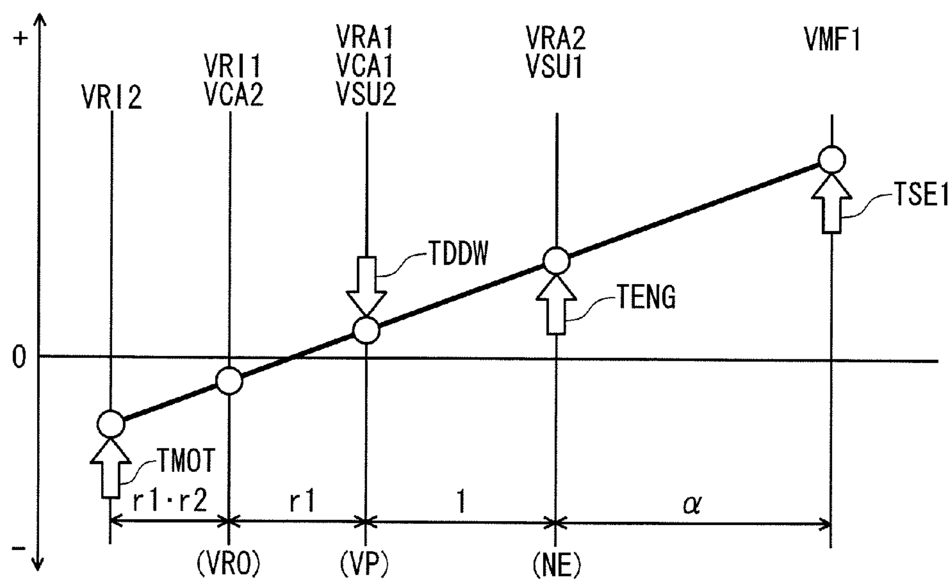

Moreover, the relationship between the rotational speeds and torques of various rotary elements of the power unit 1L at the start of the rapid acceleration operation during the ENG traveling, that is, when the torque required of the rotating machine 101 becomes large, is represented by FIG. 82(*a*) and FIG. 82(*b*) for the respective cases of use of the first and second speed-changing modes. In this case, when the first speed-changing mode is used, torque required of the rotating machine 101, that is, the rotating machine torque TMOT is expressed by the above-described equation (61). On the other hand, when the second speed-changing mode is used, the rotating machine torque TMOT is expressed by the following equation (62).

$$TMOT=-\{\alpha\cdot TENG+(1+\alpha)TDDW\}/(r1/r2+r1+1+\alpha) \quad (62)$$

As is apparent from a comparison between these equations (61) and (62), the rotating machine torque TMOT is smaller in the second speed-changing mode with respect to the drive wheel-transmitted torque TDDW and the engine torque TENG assuming that the respective magnitudes thereof are unchanged. Therefore, the second speed-changing mode is used at the time of the rapid acceleration operation during the ENG traveling.

According to the present embodiment, since the second speed-changing mode is used as described above and the electric power generated by the rotating machine 101 is controlled based on the above-described equation (62), it is possible to reduce the maximum value of torque required of the rotating machine 101 to thereby further reduce the size and costs of the rotating machine 101.

Moreover, during traveling of the vehicle including the EV traveling and the ENG traveling, a speed-changing mode that will make it possible to obtain higher efficiency of the rotating machine 101 is selected from the first and second speed-changing modes, according to the vehicle speed VP during stoppage of the engine 3, and according to the vehicle speed VP and the engine speed NE during operation of the engine 3. In this way, according to the present embodiment, it is possible to control the rotor rotational speed VRO to an appropriate value, and hence it is possible to obtain a high efficiency of the rotating machine 101.

Furthermore, the switching between the first and second speed-changing modes is performed when the second carrier rotational speed VCA2 and the second ring gear rotational speed VRI2 are equal to each other. In this way, according to the present embodiment, it is possible to smoothly switch between the first and second speed-changing modes while maintaining the respective rotations of the drive wheels DW and DW and the engine 3. As a result, it is possible to ensure excellent drivability.

Moreover, during the ENG traveling and at the same time during transition between the first and second speed-changing modes, even when both of the first and second clutches CL1 and CL2 are disengaged, as described in the seventh embodiment, part of the engine torque TENG can be transmitted to the drive wheels DW and DW through the A2 and A1 rotors 25 and 24. In this way, it is possible to suppress a speed-change shock, such as a sudden decrease in torque, whereby it is possible to improve marketability. In addition to this, according to the present embodiment, it is possible to obtain the same advantageous effects as provided by the seventh embodiment.

Moreover, although in the present embodiment, the second sun gear S2 is connected to the first carrier C1, and the second ring gear R2 is connected to the rotor 103 through the second clutch CL2, the above connection relationships may be inverted, that is, the second ring gear R2 may be connected to the first carrier C1, and the second sun gear S2 may be connected to the rotor 103 through the second clutch CL2. Moreover, although in the present embodiment, the first and second clutches CL1 and CL2 are formed by friction multiple disk clutches, they may be formed, for example, by electromagnetic clutches.

Figure 83:
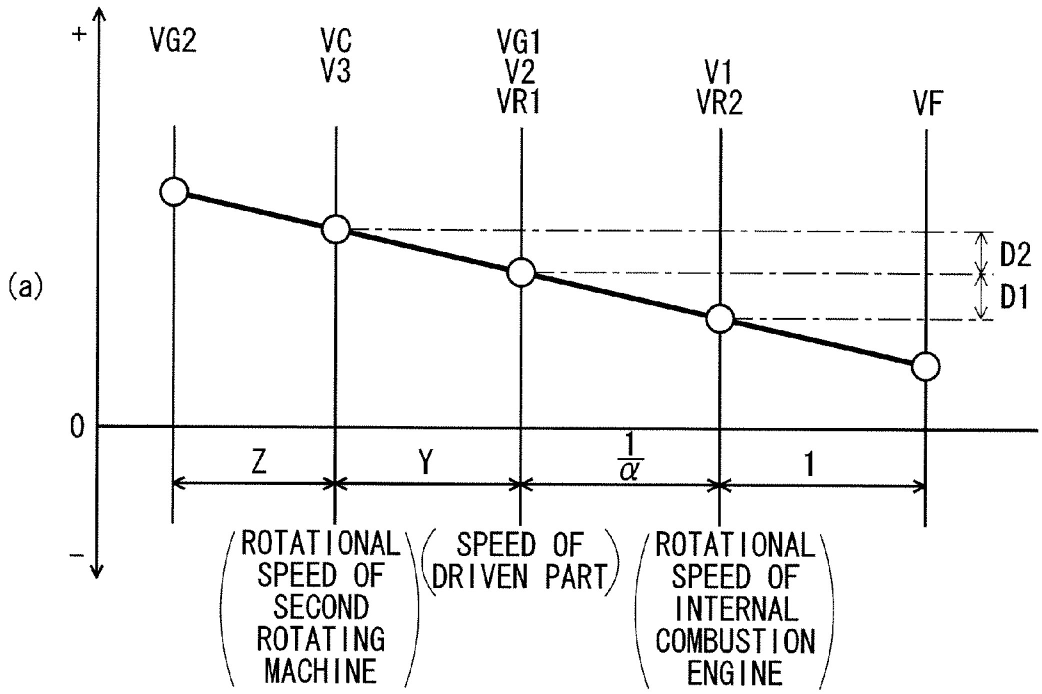
FIGS. 83(*a*) and 83(*b*) are collinear charts showing examples of the relationship between the rotational speeds of various rotary elements of the power unit during the first and second speed-changing modes, respectively.
Figure 83:
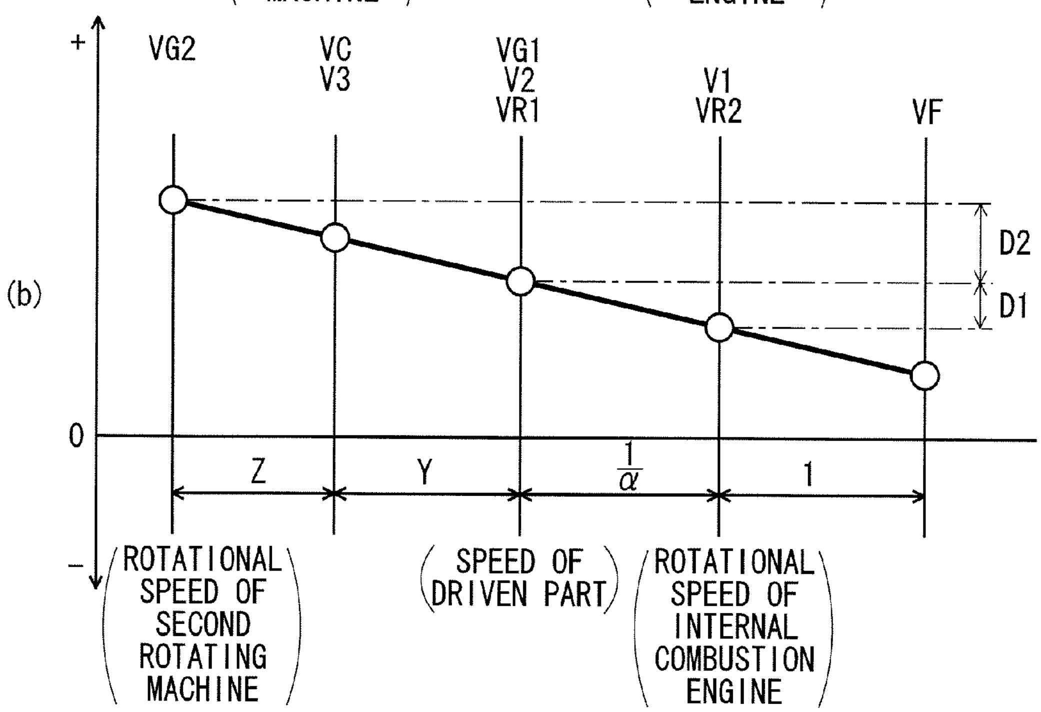

FIGS. 83(*a*) and 83(*b*) are collinear charts showing examples of the relationship between the rotational speeds of various rotary elements of the power unit 1L during the first and second speed-changing modes, respectively. It should be noted that in FIGS. 83(*a*) and 83(*b*), the rotating machine 21 is referred to as the "first rotating machine," the rotating machine 101 to as the "second rotating machine," the second sun gear S2 to as "one gear" or the "first gear," the second ring gear R2 to as "the other gear" or the "second gear," the second carrier C2 to as the "carrier," the second output portion to as the "rotating shaft 103*a*," the first clutch to as the "first clutch CL1," the second clutch to as the "first clutch CL2," the engine 3 to as the "heat engine," and the drive wheels DW and DW to as the "driven parts," respectively. Hereinafter, the rotational speed of one gear of the second planetary gear unit PS2 will be referred to as the "first gear rotational speed VG1," the rotational speed of the other gear of the second planetary gear unit PS2 to as the "second gear rotational speed VG2," and the rotational speed of the carrier of the second planetary gear unit PS2 to as the "carrier rotational speed VC". In the above-described connection relationship, when the rotary elements are directly connected to each other, and at the same time the first clutch is engaged to thereby connect the second output portion of the second rotating machine to the carrier while the second clutch is disengaged to thereby disconnect between the second output portion and the other gear (hereinafter, such a first clutch-engaged and second clutch-disengaged state will be referred to as "the first speed-changing mode"), the relationship between the rotational speed of the heat engine, the speed of the driven parts and the like is expressed, for example, as shown in FIG. 83(*a*). Moreover, when the first clutch is disengaged to thereby disconnect between the second output portion of the second rotating machine and the carrier while the second clutch is engaged to thereby connect the second output portion to the other gear (hereinafter, such a first clutch-disengaged and second clutch-engaged state will be referred to as "the second speed-changing mode"), the relationship between the rotational speed of the heat engine, the speed of the driven parts and the like is expressed, for example, as shown in FIG. 83(*b*).

It should be noted that as described above, the first rotating machine according to the present embodiment has the same functions as the first rotating machine 21 according to the first embodiment, and hence as is clear from the above-described equation (25), the relationship between the magnetic field rotational speed VF, the first rotor rotational speed VR1 and the second rotor rotational speed VR2 is expressed by an equation $VF=(\alpha+1)VR2-\alpha\cdot VR1$. Therefore, in the collinear chart shown in FIGS. 83(*a*) and 83(*b*), the ratio between the distance from a vertical line representing the magnetic field rotational speed VF to a vertical line representing the second rotor rotational speed VR2, and the distance from the vertical line representing the second rotor rotational speed VR2 to a vertical line representing the first rotor rotational speed VR1 is $1:(1/\alpha)$. Moreover, in FIGS. 83(*a*) and 83(*b*), the distance from a vertical line representing the first gear rotational speed VG1 to a vertical line representing the carrier rotational speed VC is represented by Y, and the distance from a vertical line representing the carrier rotational speed VC to a vertical line representing the second gear rotational speed VG2 is represented by Z.

As is clear from a comparison between FIGS. 83(*a*) and 83(*b*), in the collinear chart, the distance between a vertical line representing the speed of the driven parts and a vertical line representing the rotational speed of the second rotating machine is shorter in the first speed-changing mode than in the second speed-changing mode, and therefore the ratio (D2/D1) between a speed difference D2 between the second output portion of the second rotating machine and the driven parts and a speed difference D1 between the driven parts and the heat engine is smaller in the first speed-changing mode. Moreover, when the speed of the driven parts is higher than the rotational speed of the heat engine, the rotational speed of the second rotating machine becomes higher than the speed of the driven parts, and sometimes becomes too high. Therefore, in such a case, for example, by using the first speed-changing mode, as is clear from the relationship of the above-described ratio between the speed differences D1 and D2, the rotational speed of the second rotating machine can be made smaller than that when the second speed-changing mode is used, and hence it is possible to prevent failure of the second rotating machine from being caused by the rotational speed of the second rotating machine becoming too high.

Figure 84:
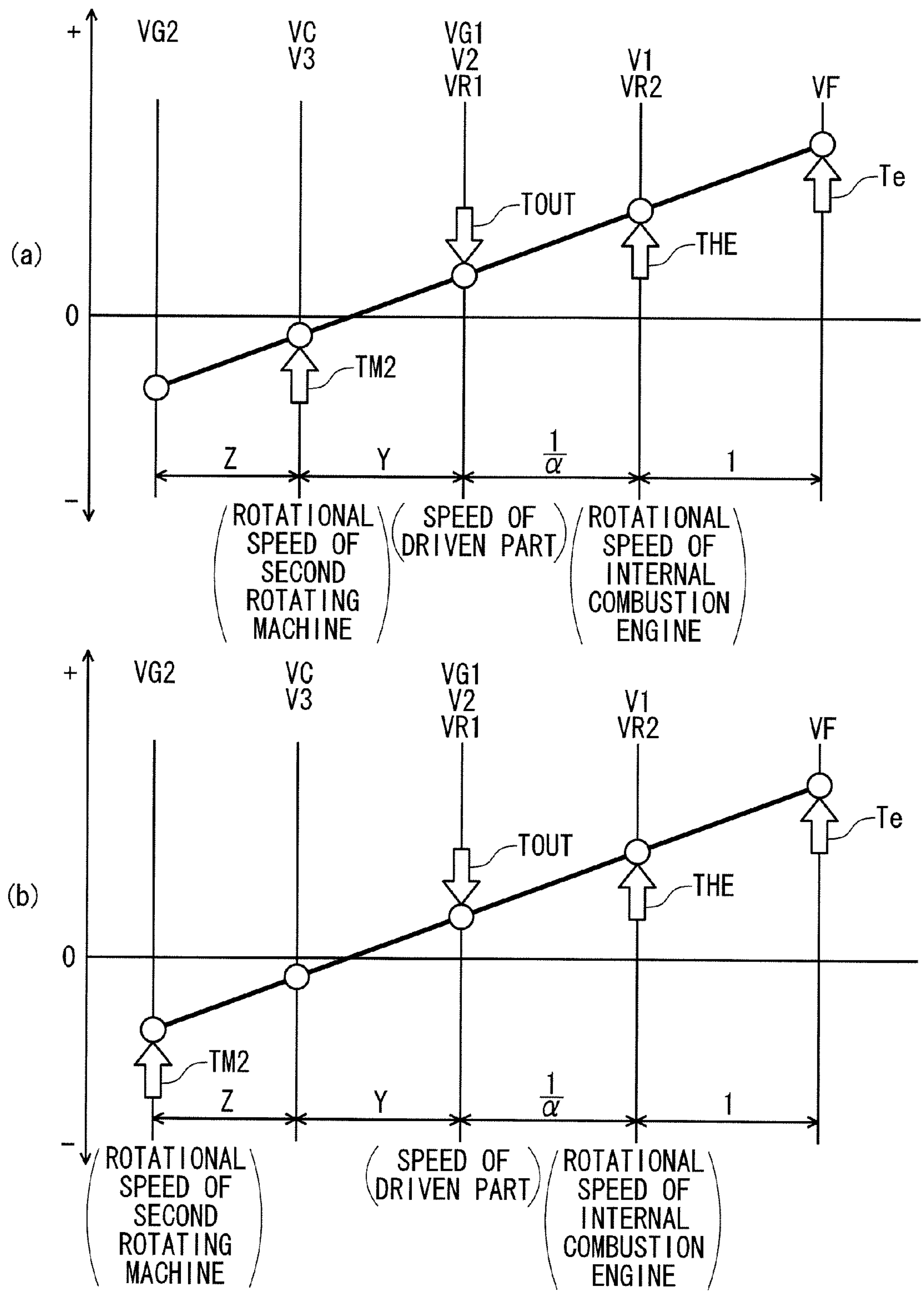
FIGS. 84(*a*) and 84(*b*) are diagrams showing examples of the relationship between the rotational speeds and torques of various rotary elements of the power unit in a case where the speed of the driven parts is rapidly increased during ENG traveling during the first and second speed-changing modes, respectively.

Moreover, in such a case where the torque required of the second rotating machine becomes large, as described above with reference to FIG. 62, when the first speed-changing mode is used, the relationship between the driving equivalent torque Te, the heat engine torque THE, the driven part-transmitted torque TOUT, and the second rotating machine torque TM2 is shown, for example, in FIG. 84(*a*). Moreover, the torque required of the second rotating machine, that is, the second rotating machine torque TM2 is represented by the following equation (63).

$$TM2=-\{THE+[(1/\alpha)+1]TOUT\}/[Y+(1/\alpha)+1] \quad (63)$$

On the other hand, when the second speed-changing mode is used, the relationship between the driving equivalent torque Te, the heat engine torque THE, the driven part-transmitted torque TOUT, and the second rotating machine torque TM2 is shown, for example, in FIG. 84(*b*). Moreover, the second rotating machine torque TM2 is represented by the following equation (64).

$$TM2=-\{THE+[(1/\alpha)+1]TOUT\}/[Z+Y+(1/\alpha)+1] \quad (64)$$

As is clear from a comparison between the above-described equations (63) and (64), the torque TM2 of the second rotating machine is smaller in the second speed-changing mode with respect to the driven part-transmitted torque TOUT and the torque THE of the heat engine assuming that the respective magnitudes thereof are unchanged. Therefore, for example, in such a case where the torque required of the second rotating machine becomes large, as mentioned above, by using the second speed-changing mode, it is possible to reduce the second rotating machine torque TM2, which in turn makes it possible to further reduce the size and costs of the second rotating machine.

Figure 85:
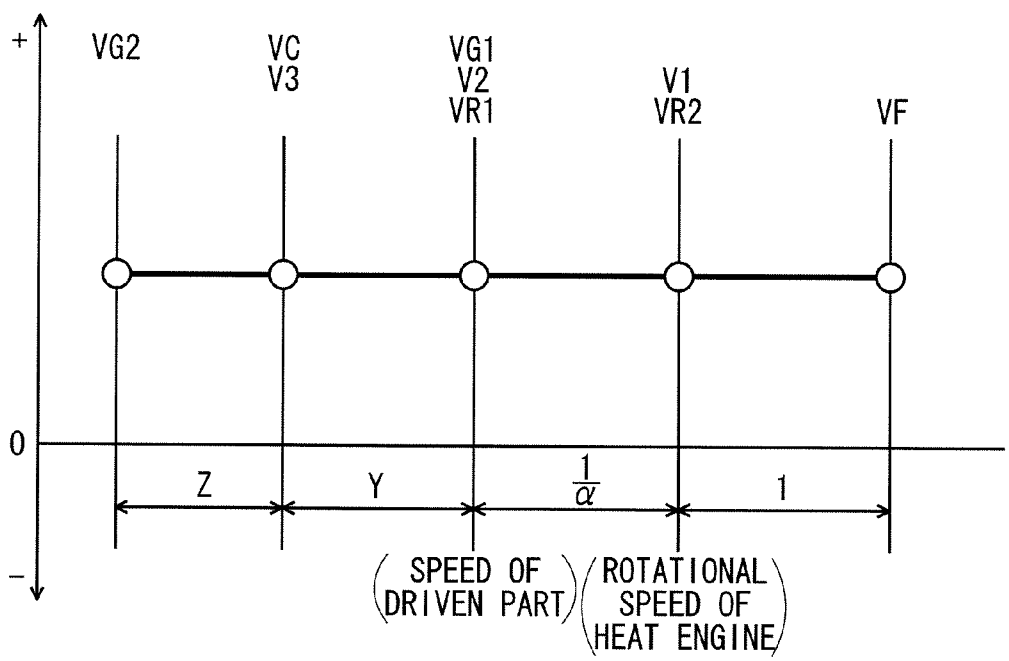
FIG. 85 is a diagram for explaining the switching between the first and second speed-changing modes in the power unit.

Moreover, for example, by selecting the first or second speed-changing mode according to the rotational speed of the heat engine and the speed of the driven parts, it is possible to control the rotational speed of the second rotating machine to an appropriate speed. As a result, it is possible to obtain high efficiency of the second rotating machine. Furthermore, by performing switching between the first and second speed-changing modes when the carrier rotational speed VC and the second gear rotational speed VG2 are equal to each other, as shown in FIG. 85, it is possible to smoothly perform the switching while maintaining the respective rotations of the driven parts and the heat engine. As a result, it is possible to ensure excellent drivability.

Moreover, for example, the first rotor can be connected to the driven parts without passing through the gear-type stepped transmission, whereby during switching between the first and second speed-changing modes, even if both the first and second clutches are disengaged to disconnect between the second rotating machine and the driven parts, as is apparent from FIG. 59, part of the torque THE of the heat engine can be transmitted to the driven parts through the second and first rotors. Therefore, during switching between the first and second speed-changing modes, it is possible to suppress a speed-change shock. As a result, it is possible to enhance marketability.

Fourteenth Embodiment

Figure 86:
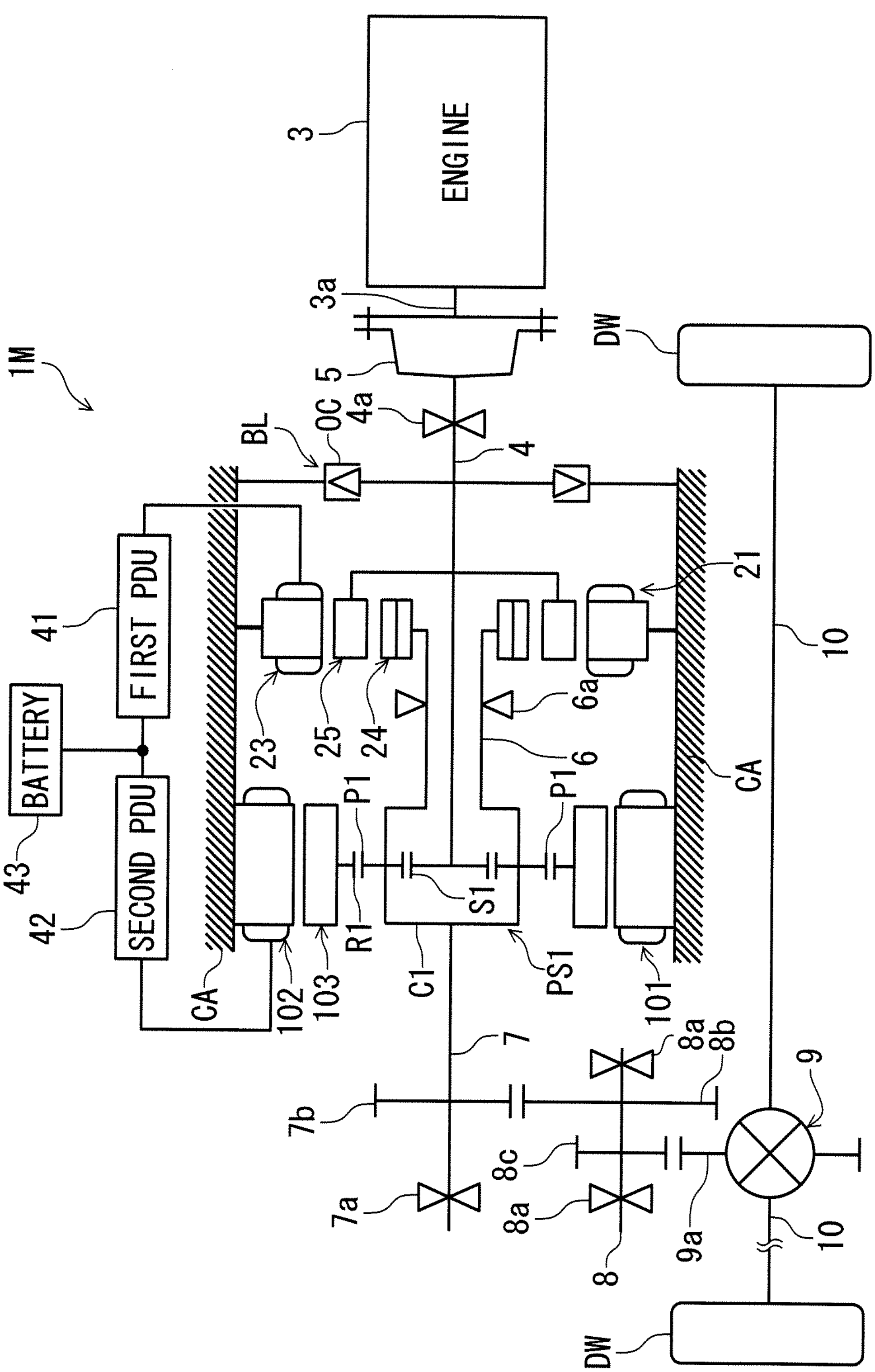
FIG. 86 is a diagram schematically showing a power unit according to a fourteenth embodiment.

Next, a power unit 1M according to a fourteenth embodiment will be described with reference to FIG. 86. This power unit 1M is configured by adding the brake mechanism BL described in the sixth embodiment to the power unit 1F according to the seventh embodiment. In the following description, different points from the seventh embodiment will be mainly described.

In the power unit 1M, the brake mechanism BL formed by the one-way clutch OC and the casing CA permits the first rotating shaft 4 to rotate only when it performs normal rotation together with the crankshaft 3*a*, the A2 rotor 25 and the first sun gear S1, but blocks rotation of the first rotating shaft 4 when it performs reserve rotation together with the crankshaft 3*a* and the like.

The power unit 1M configured as above performs the above-described EV creep operation and EV start in the following manner. The power unit 1M supplies electric power to the stator 23 of the first rotating machine 21 and the stator 102 of the rotating machine 101 and causes the first rotating magnetic field generated by the stator 23 in accordance with the supply of the electric power to perform reverse rotation, and at the same time the rotor 103 to perform normal rotation together with the first ring gear R1. Moreover, the power unit 1M controls the first magnetic field rotational speed VMF1 and the rotor rotational speed VRO such that (1+r1).¦VMF1¦=α¦VRO¦ holds. Furthermore, the power unit 1M controls the electric power supplied to the stators 23 and 102 such that sufficient torque is transmitted to the drive wheels DW and DW.

Similarly to the above-described sixth embodiment, all the electric power supplied to the stator 23 is transmitted to the A1 rotor 24 as motive power, to thereby cause the A1 rotor 24 to perform normal rotation. Moreover, while the rotor 103 performs normal rotation as described above, the first sun gear S1 is blocked from performing reverse rotation by the brake mechanism BL, and hence all the motive power from the rotating machine 101 is transmitted to the first carrier C1 through the first ring gear R1 and the first planetary gears P1, whereby the first carrier C1 is caused to perform normal rotation. Moreover, the motive power transmitted to the A1 rotor 24 and the first carrier C1 is transmitted to the drive wheels DW and DW, and as a consequence, the drive wheels DW and DW performs normal rotation.

Moreover, in this case, on the A2 rotor 25 and the first sun gear S1, which are blocked from performing reverse rotation by the brake mechanism BL, through the above-described control of the first rotating machine 21 and the rotating machine 101, torques act from the stator 23 and the rotor 103 such that the torques cause the A2 rotor 25 and the first sun gear S1 to perform reverse rotation, respectively, whereby the crankshaft 3*a*, the A2 rotor 25 and the first sun gear S1 are not only blocked from performing reverse rotation but also are held stationary.

As described above, according to the present embodiment, it is possible to drive the drive wheels DW and DW by the first rotating machine 21 and the rotating machine 101 without using the engine motive power. Moreover, during driving of the drive wheels DW and DW, the crankshaft 3*a* is not only blocked from performing reverse rotation but also is held stationary, and hence the crankshaft 3*a* is prevented from dragging the engine 3. In addition to this, it is possible to obtain the same advantageous effects as provided by the seventh embodiment.

It should be noted that although in the above-described seventh to fourteenth embodiments, similarly to the first embodiment, the first pole pair number ratio α of the first rotating machine 21 is set to 2.0, if the first pole pair number ratio α is set to less than 1.0, as is apparent from FIGS. 33(*a*) and 33(*b*) and FIG. 71, it is possible to prevent the driving efficiency from being lowered by occurrence of loss caused by the first magnetic field rotational speed VMF1 becoming too high. Moreover, although in the seventh to fourteenth embodiments, the first planetary gear ratio r1 of the first planetary gear unit PS1 is set to a relatively large value, by setting the first planetary gear ratio r1 to a smaller value, it is possible to obtain the following advantageous effects.

As is apparent from FIG. 71, if the first planetary gear ratio r1 is set to a relatively large value, when the vehicle speed VP is higher than the engine speed NE (see the one-dot chain lines in FIG. 71), the rotor rotational speed VRO becomes higher than the vehicle speed VP, and sometimes becomes too high. In contrast, if the first planetary gear ratio r1 is set to a smaller value, as is apparent from a comparison between broken lines and one-dot chain lines in the collinear chart in FIG. 71, the rotor rotational speed VRO can be reduced, and hence it is possible to prevent the driving efficiency from being lowered by occurrence of loss caused by the rotor rotational speed VRO becoming too high.

Moreover, although in the seventh to fourteenth embodiments, the A2 rotor 25 and the first sun gear S1 are directly connected to each other, and the A1 rotor 24 and the first carrier C1 are directly connected to each other, the A2 rotor 25 and the first sun gear S1 are not necessarily required to be directly connected to each other insofar as they are connected to the crankshaft 3*a*. Moreover, the A1 rotor 24 and the first carrier C1 are not necessarily required to be directly connected to each other insofar as they are connected to the drive wheels DW and DW. In this case, each of the transmissions 111 and 121 in the eighth and ninth embodiments may be formed by two transmissions, which may be arranged in the following manner. One of the two transmissions forming the transmission 111 may be disposed between the A1 rotor 24 and the drive wheels DW and DW while the other thereof may be disposed between the first carrier C1 and the drive wheels DW and DW. Moreover, one of the two transmissions forming the transmission 121 may be disposed between the A2 rotor 25 and the crankshaft 3a while the other thereof may be disposed between the first sun gear S1 and the crankshaft 3a.

Moreover, although in the seventh to fourteenth embodiments, the first sun gear S1 and the first ring gear R1 are connected to the engine 3 and the rotating machine 101, respectively, the above connection relationships may be inverted, that is, the first ring gear R1 and the first sun gear S1 may be connected to the engine 3 and the rotating machine 101, respectively. In this case, at the time of the rapid acceleration operation during the ENG traveling in which torque required of the rotating machine 101 becomes particularly large, the rotating machine torque TMOT is expressed by the following equation (65).

$$TMOT=-\{\alpha\cdot TENG+(1+\alpha)TDDW\}/(r1'+1+\alpha) \quad (65)$$

In this equation (65), r1' represents the ratio between the number of the gear teeth of the first ring gear R1 and that of the gear teeth of the first sun gear S1 (the number of the gear teeth of the first ring gear/the number of the gear teeth of the first sun gear S1), and is larger than 1.0. As is clear from this configuration, the fact that the first planetary gear ratio r1, which is the number of the gear teeth of the first sun gear S1/the number of the gear teeth of the first ring gear R1, as described above, is smaller than 1.0, and the above-described equations (61) and (65), the rotating machine torque TMOT can be reduced. As a result, it is possible to further reduce the size and costs of the rotating machine 101.

Fifteenth Embodiment

Next, a power unit 1N according to a fifteenth embodiment will be described with reference to FIG. 87. This power unit 1N is distinguished from the power unit 1 according to the first embodiment only in that it includes the first planetary gear unit PS1 and the rotating machine 101, described in the seventh embodiment, in place of the first rotating machine 21. In the following description, different points from the first embodiment will be mainly described.

Figure 87:
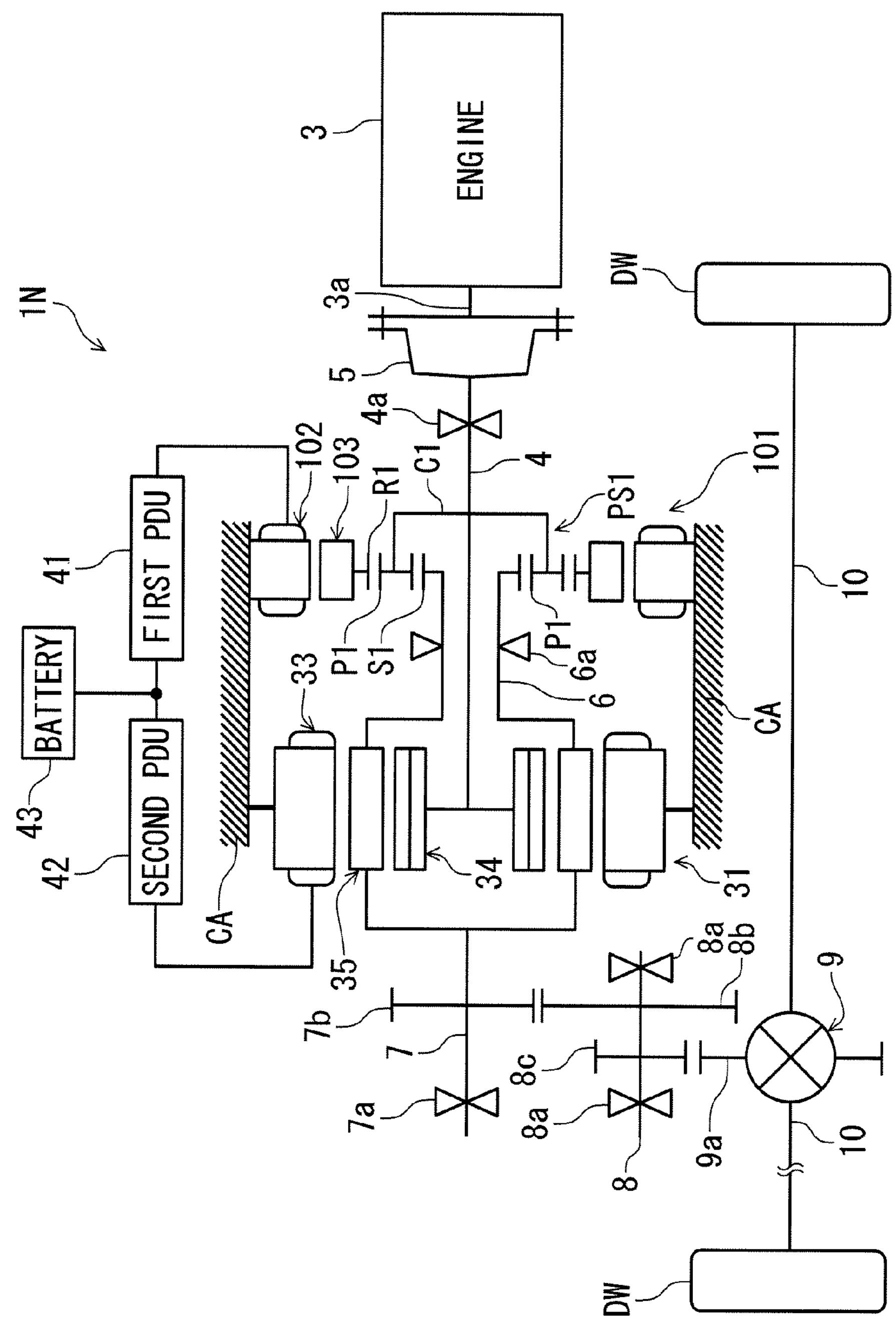
FIG. 87 is a diagram schematically showing a power unit according to a fifteenth embodiment.

As shown in FIG. 87, the first carrier C1 of the first planetary gear unit PS1 and the B1 rotor 34 of the second rotating machine 31 are mechanically directly connected to each other through the first rotating shaft 4, and are mechanically directly connected to the crankshaft 3a through the first rotating shaft 4 and the flywheel 5. Moreover, the B2 rotor 35 of the second rotating machine 31 is mechanically directly connected to the first sun gear S1 of the first planetary gear unit PS1 through the connection shaft 6, and is mechanically connected to the drive wheels DW and DW through the second rotating shaft 7, the gear 7b, the first gear 8b, the idler shaft 8, the second gear 8c, the gear 9a, the differential gear mechanism 9, and the like. In short, the first sun gear S1 and the B2 rotor 35 are mechanically connected to the drive wheels DW and DW. Moreover, the stator 102 is electrically connected to the battery 43 through the first PDU 41. More specifically, the stator 102 of the rotating machine 101 and the stator 33 of the second rotating machine 31 are electrically connected to each other through the first and second PDUs 41 and 42.

The rotational angle position of the rotor 103 of the rotating machine 101 is detected by the above-described rotational angle sensor 59, similarly to the seventh embodiment. Moreover, the ECU 2 calculates the rotor rotational speed VRO based on the detected rotational angle position of the rotor 103, and controls the first PDU 41 to thereby control the electric power supplied to the stator 102 of the rotating machine 101, the electric power generated by the stator 102, and the rotor rotational speed VRO.

As described above, the power unit 1N according to the present embodiment is distinguished from the power unit 1 according to the first embodiment only in that the first rotating machine 21 is replaced by the first planetary gear unit PS1 and the rotating machine 101, and has quite the same functions as those of the power unit 1. Moreover, in the power unit 1N, operations in various operation modes, such as the EV creep, described in the first embodiment, are carried out in the same manner as in the power unit 1. In this case, the operations in these operation modes are performed by replacing various parameters (for example, the first magnetic field rotational speed VMF1) concerning the first rotating machine 21 by the corresponding various parameters concerning the rotating machine 101. In the following description, the operation modes will be described briefly by focusing on different points from the first embodiment.

EV Creep

Similarly to the first embodiment, during the EV creep, electric power is supplied from the battery 43 to the stator 33 of the second rotating machine 31, and the second rotating magnetic field is caused to perform normal rotation. Moreover, electric power generation is performed by the stator 102 using motive power transmitted to the rotor 103 of the rotating machine 101, as described later, and the generated electric power is supplied to the stator 23. In accordance with this, as described in the first embodiment, the second driving equivalent torque TSE2 from the stator 33 acts on the B2 rotor 35 to cause the B2 rotor 35 to perform normal rotation, and acts on the B1 rotor 34 to cause the B1 rotor 34 to perform reverse rotation. Moreover, part of the torque transmitted to the B2 rotor 35 is transmitted to the drive wheels DW and DW through the second rotating shaft 7, and the like, thereby causing the drive wheels DW and DW to perform normal rotation.

Furthermore, during the EV creep, the remainder of the torque transmitted to the B2 rotor 35 is transmitted to the first sun gear S1 through the connection shaft 6, and then along with the electric power generation by the stator 102 of the rotating machine 101, is transmitted to the stator 102 as electric energy through the first planetary gears P1, the first ring gear R1 and the rotor 103. Moreover, in this case, since the rotor 103 performs reverse rotation, the rotating machine torque TMOT generated along with the electric power generation by the stator 102 is transmitted to the first carrier C1 through the first ring gear R1 and the first planetary gears P1, thereby acting on the first carrier C1 to cause the first carrier C1 to perform normal rotation. Moreover, the torque transmitted to the first sun gear S1 such that it is balanced with the rotating machine torque TMOT is further transmitted to the first carrier C1 through the first planetary gears P1, thereby acting on the first carrier C1 to cause the first carrier C1 to perform normal rotation.

In this case, the electric power supplied to the stator 33 and the electric power generated by the stator 102 are controlled such that the above-described torque for causing the B1 rotor 34 to perform reverse rotation and the torques for causing the first carrier C1 to perform normal rotation are balanced with each other, whereby the B1 rotor 34, the first carrier C1 and the crankshaft 3a, which are connected to each other, are held stationary. As a consequence, during the EV creep, the B1 rotor rotational speed VRB1 and the first carrier rotational speed VCA1 become equal to 0, and the engine speed NE as well becomes equal to 0.

Moreover, during the EV creep, the electric power supplied to the stator 33, the electric power generated by the stator 102, the second magnetic field rotational speed VMF2 and the rotor rotational speed VRO are controlled such that the speed relationships expressed by the above-described equations (44) and (53) are maintained and at the same time the B2 rotor rotational speed VRB2 and the first sun gear rotational speed VSU1 become very small. In this way, the creep operation with a very low vehicle speed VP is carried out. As described above, it is possible to perform the creep operation using the rotating machine 101 and the second rotating machine 31 in a state where the engine 3 is stopped.

<EV Start>

At the time of the EV start, the electric power supplied to the stator 33 of the second rotating machine 31 and the electric power generated by the stator 102 of the rotating machine 101 are both increased. Moreover, while maintaining the relationships between the rotational speeds shown in the equations (44) and (53) and at the same time holding the engine speed NE at 0, the rotor rotational speed VRO of the rotor 103 that has been performing reverse rotation during the EV creep and the second magnetic field rotational speed VMF2 of the second rotating magnetic field that has been performing normal rotation during the EV creep are increased in the same rotation directions as they have been. From the above, the vehicle speed VP is increased to cause the vehicle to start.

<ENG Start During EV Traveling>

At the time of the ENG start during EV traveling, while holding the vehicle speed VP at the value assumed then, the rotor rotational speed VRO of the rotor 103 that has been performing reverse rotation during the EV start, as described above, is controlled to 0, and the second magnetic field rotational speed VMF2 of the second rotating magnetic field that has been performing normal rotation during the EV start, is controlled such that it is lowered. Then, after the rotor rotational speed VRO becomes equal to 0, electric power is supplied from the battery 43 not only to the stator 33 of the second rotating machine 31 but also to the stator 102 of the rotating machine 101, whereby the rotor 103 is caused to perform normal rotation, and the rotor rotational speed VRO is caused to be increased.

The electric power is supplied to the stator 33 as described above, whereby as described in the first embodiment, the second driving equivalent torque TSE2 and torque transmitted to the B1 rotor 34, as described later, are combined, and the combined torque is transmitted to the B2 rotor 35. Moreover, part of the torque transmitted to the B2 rotor 35 is transmitted to the first sun gear S1 through the connection shaft 6, and the remainder thereof is transmitted to the drive wheels DW and DW through the second rotating shaft 7 and the like Moreover, at the time of the ENG start during EV traveling, the electric power is supplied from the battery 43 to the stator 102, whereby as the rotating machine torque TMOT is transmitted to the first carrier C1 through the first ring gear R1 and the first planetary gears P1, the torque transmitted to the first sun gear S1 as described above is transmitted to the first carrier C1 through the first planetary gears P1. Moreover, part of the torque transmitted to the first carrier C1 is transmitted to the B1 rotor 34 through the first rotating shaft 4, and the remainder thereof is transmitted to the crankshaft 3a through the first rotating shaft 4 and the like, whereby the crankshaft 3a performs normal rotation. Furthermore, in this case, the electric power supplied to the stators 33 and 102 is controlled such that sufficient motive power is transmitted to the drive wheels DW and DW and the engine 3.

From the above, at the time of the ENG start during EV traveling, the vehicle speed VP is held at the value assumed then, and the engine speed NE is increased. In this state, similarly to the first embodiment, the ignition operation of the fuel injection valves and the spark plugs of the engine 3 is controlled according to the crank angle position, whereby the engine 3 is started. Moreover, by controlling the rotor rotational speed VRO and the second magnetic field rotational speed VMF2, the engine speed NE is controlled to a relatively small value suitable for starting the engine 3.

Figure 88:
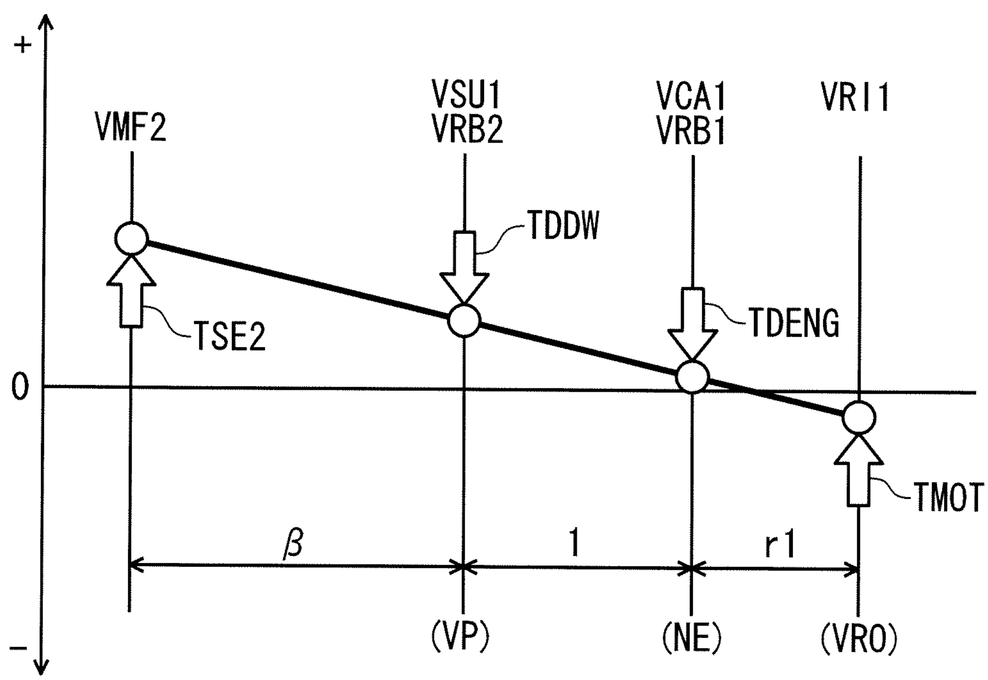
FIG. 88 is a diagram showing an example of the relationship between the rotational speeds and torques of various rotary elements of the power unit shown in FIG. 87 at the start of ENG start during EV traveling.

FIG. 88 shows an example of the relationship between the rotational speeds and torques of various rotary elements of the power unit 1N at the start of the ENG start during EV traveling. As is apparent from the above-described connection relationship between various rotary elements, the first carrier rotational speed VCA1, the B1 rotor rotational speed VRB1 and the engine speed NE are equal to each other; the first sun gear rotational speed VSU1 and the B2 rotor rotational speed VRB2 are equal to each other; and the first ring gear rotational speed VRI1 and the rotor rotational speed VRO are equal to each other. Moreover, assuming that there is no change in speed by the differential gear mechanism 9 or the like, the vehicle speed VP, the first sun gear rotational speed VSU1 and the B2 rotor rotational speed VRB2 are equal to each other. From this and the equations (44) and (53), the relationship between these rotational speeds VCA1, VRB1, NE, VSU1, VRB2, VP, VRI1 and VRO, and the second magnetic field rotational speed VMF2 is illustrated, for example, as in FIG. 88.

In this case, as is apparent from FIG. 88, the second driving equivalent torque TSE2 is transmitted to both the drive wheels DW and DW and the crankshaft 3a using the rotating machine torque TMOT as a reaction force, so that torque required of the rotating machine 101 becomes larger than in the other cases. In this case, the torque required of the rotating machine 101, that is, the rotating machine torque TMOT is expressed by the following equation (66).

$$TMOT=-\{\beta\cdot TDDW+(1+\beta)TDENG\}/(r1+1+\beta) \quad (66)$$

As is clear from this equation (66), as the first planetary gear ratio r1 is larger, the rotating machine torque TMOT becomes smaller with respect to the drive wheel-transmitted torque TDDW and the engine-transmitted torque TDENG assuming that the respective magnitudes thereof are unchanged. As described above, since the first planetary gear ratio r1 is set to a relatively large one of the values that can be taken by a general planetary gear unit, it is possible to reduce the size and costs of the rotating machine 101.

<ENG Traveling>

During the ENG traveling, the operations in the battery input/output zero mode, the assist mode, and the drive-time charging mode are executed according to the executing conditions described in the first embodiment. In the battery input/output zero mode, by using the engine motive power transmitted to the rotor 103, electric power generation is performed by the stator 102 of the rotating machine 101, and the generated electric power is supplied to the stator 33 of the second rotating machine 31 without charging it into the battery 43. In this case, through the electric power generation by the stator 102, part of the engine torque TENG is transmitted to the rotor 103 through the first carrier C1, the first planetary gears P1 and the first ring gear R1, and along In this way, part of the engine torque TENG is transmitted also to the first sun gear S1 through the first carrier C1 and the first planetary gears P1. In short, part of the engine torque TENG is distributed to the first sun gear S1 and the first ring gear R1.

Moreover, the remainder of the engine torque TENG is transmitted to the B1 rotor 34 through the first rotating shaft 4. Furthermore, similarly to the case of the ENG start during EV traveling, the second driving equivalent torque TSE2 and the torque transmitted to the B1 rotor 34 as described above are combined, and the combined torque is transmitted to the B2 rotor 35. Moreover, the engine torque TENG distributed to the first sun gear S1 as described above is further transmitted to the B2 rotor 35 through the connection shaft 6.

As described above, the combined torque formed by combining the engine torque TENG distributed to the first sun gear S1, the second driving equivalent torque TSE2, and the engine torque TENG transmitted to the B1 rotor 34 is transmitted to the B2 rotor 35. Moreover, this combined torque is transmitted to the drive wheels DW and DW, for example, through the second rotating shaft 7. As a consequence, in the battery input/output zero mode, assuming that there is no transmission loss caused by the gears, motive power equal in magnitude to the engine motive power is transmitted to the drive wheels DW and DW, similarly to the first embodiment.

Furthermore, in the battery input/output zero mode, the engine motive power is transmitted to the drive wheels DW and DW while having the speed thereof steplessly changed through the control of the rotor rotational speed VRO and the second magnetic field rotational speed VMF2. In short, the first planetary gear unit PS1, the rotating machine 101 and the second rotating machine 31 function as a stepless transmission.

Figure 89:
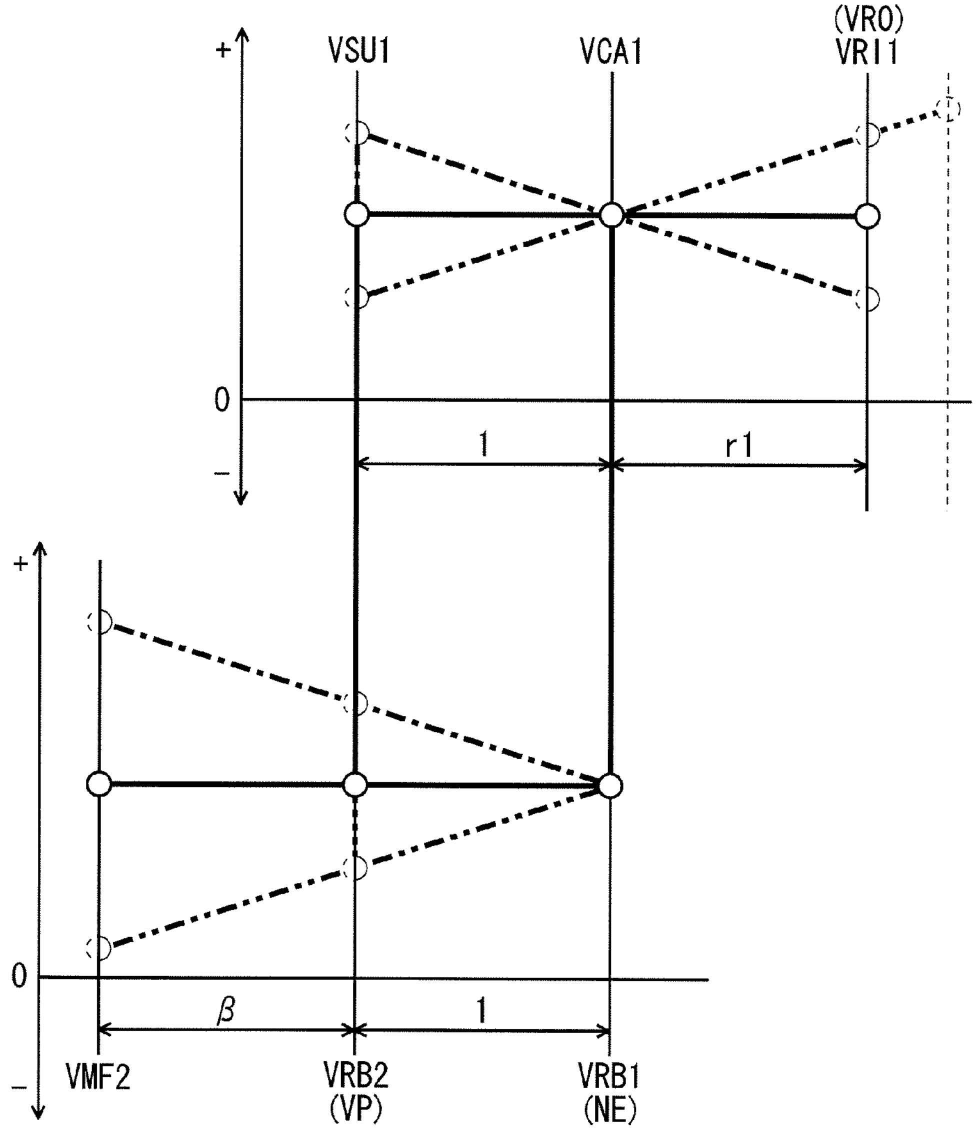
FIG. 89 is a diagram for explaining speed-changing operations by a rotating machine and a second rotating machine of the power unit shown in FIG. 87.

More specifically, as indicated by two-dot chain lines in FIG. 89, while maintaining the speed relationships expressed by the above-described equations (53) and (44), by increasing the rotor rotational speed VRO and decreasing the second magnetic field rotational speed VMF2 with respect to the first carrier rotational speed VCA1 and the B1 rotor rotational speed VRB1, that is, the engine speed NE, it is possible to steplessly reduce the first sun gear rotational speed VSU1 and the B2 rotor rotational speed VRB2, that is, the vehicle speed VP. Conversely, as indicated by one-dot chain lines in FIG. 89, by decreasing the rotor rotational speed VRO and increasing the second magnetic field rotational speed VMF2 with respect to the engine speed NE, it is possible to steplessly increase the vehicle speed VP. Moreover, in this case, the rotor rotational speed VRO and the second magnetic field rotational speed VMF2 are controlled such that the engine speed NE becomes equal to the target engine speed.

As described above, in the battery input/output zero mode, after once being divided by the first planetary gear unit PS1, the rotating machine 101 and the second rotating machine 31, the engine motive power is transmitted to the B2 rotor 35 through the following first to third transmission paths, and is then transmitted to the drive wheels DW and DW in a combined state.

First transmission path: first carrier C1→first planetary gears P1→first sun gear S1→connection shaft 6→B2 rotor 35

Second transmission path: B1 rotor 34→magnetic forces caused by magnetic force lines→B2 rotor 35

Third transmission path: first carrier C1→first planetary gears P1→first ring gear R1→rotor 103→stator 102→first PDU 41→second PDU 42→stator 33→magnetic forces caused by magnetic force lines→B2 rotor 35

In the above first and second transmission paths, the engine motive power is transmitted to the drive wheels DW and DW by the magnetic paths and the mechanical paths without being converted to electric power. Moreover, in the third transmission path, the engine motive power is transmitted to the drive wheels DW and DW by the electrical path.

Moreover, in the battery input/output zero mode, the electric power generated by the stator 102, the rotor rotational speed VRO and the second magnetic field rotational speed VMF2 are controlled such that the speed relationships expressed by the equations (53) and (44) are maintained.

More specifically, in the assist modes, electric power is generated by the stator 102 of the rotating machine 101, and electric power charged in the battery 43 is supplied to the stator 33 of the second rotating machine 31 in addition to the electric power generated by the stator 102. Therefore, the second driving equivalent torque TSE2 based on the electric power supplied from the stator 102 and the battery 43 to the stator 33 is transmitted to the B2 rotor 35. Moreover, similarly to the above-described battery input/output zero mode, this second driving equivalent torque TSE2, the engine torque TENG distributed to the first sun gear S1 along with the electric power generation by the stator 102, and the engine torque TENG transmitted to the B1 rotor 34 are combined, and the combined torque is transmitted to the drive wheels DW and DW through the B2 rotor 35. As a result, in the assist mode, assuming that there is no transmission loss caused by the gears or the like, similarly to the first embodiment, the motive power transmitted to the drive wheels DW and DW becomes equal to the sum of the engine motive power and the electric power (energy) supplied from the battery 43.

Moreover, in the assist mode, the electric power generated by the stator 102, the electric power supplied from the battery 43 to the stator 33, the rotor rotational speed VRO, and the second magnetic field rotational speed VMF2 are controlled such that the speed relationships expressed by the above-described equations (53) and (44) are maintained. As a consequence, similarly to the first embodiment, the insufficient amount of the engine motive power with respect to the vehicle motive power demand is made up for by the supply of electric power from the battery 43 to the stator 33 of the second rotating machine 31. It should be noted that when the insufficient amount of the engine motive power with respect to the vehicle motive power demand is relatively large, electric power is supplied from the battery 43 not only to the stator 33 of the second rotating machine 31 but also to the stator 102 of the rotating machine 101.

Moreover, in the drive-time charging mode, electric power, which has a magnitude obtained by subtracting the electric power charged into the battery 43 from the electric power generated by the stator 102 of the rotating machine 101, is supplied to the stator 33 of the second rotating machine 31, and the second driving equivalent torque TSE2 based on this electric power is transmitted to the B2 rotor 35. Furthermore, similarly to the battery input/output zero mode, this second driving equivalent torque TSE2, the engine torque TENG distributed to the first sun gear S1 along with the electric power generation by the stator 102, and the engine torque TENG transmitted to the B1 rotor 34 are combined, and the combined torque is transmitted to the drive wheels DW and DW through the B2 rotor 35. As a result, in the drive-time charging mode, assuming that there is no transmission loss caused by the gears or the like, similarly to the first embodiment, the motive power transmitted to the drive wheels DW and DW has a magnitude obtained by subtracting the electric power (energy) charged into the battery 43 from the engine motive power.

Furthermore, in the drive-time charging mode, the electric power generated by the stator 102, the electric power charged into the battery 43, the rotor rotational speed VRO, and the second magnetic field rotational speed VMF2 are controlled such that the speed relationships expressed by the equations (53) and (44) are maintained. As a result, similarly to the first embodiment, the surplus amount of the engine motive power with respect to the vehicle motive power demand is converted to electric power by the stator 102 of the rotating machine 101, and is charged into the battery 43.

Moreover, during the ENG traveling, when the electric power generated by the stator 102 of the rotating machine 101 is controlled such that the rotating machine torque TMOT becomes equal to 1/(1+r1) of the engine torque TENG, it is possible to transmit the motive power from the engine 3 to the drive wheels DW and DW only by the magnetic paths. In this case, torque having a magnitude r1/(1+r1) times as large as that of the engine torque TENG is transmitted to the drive wheels DW and DW.

Figure 90:
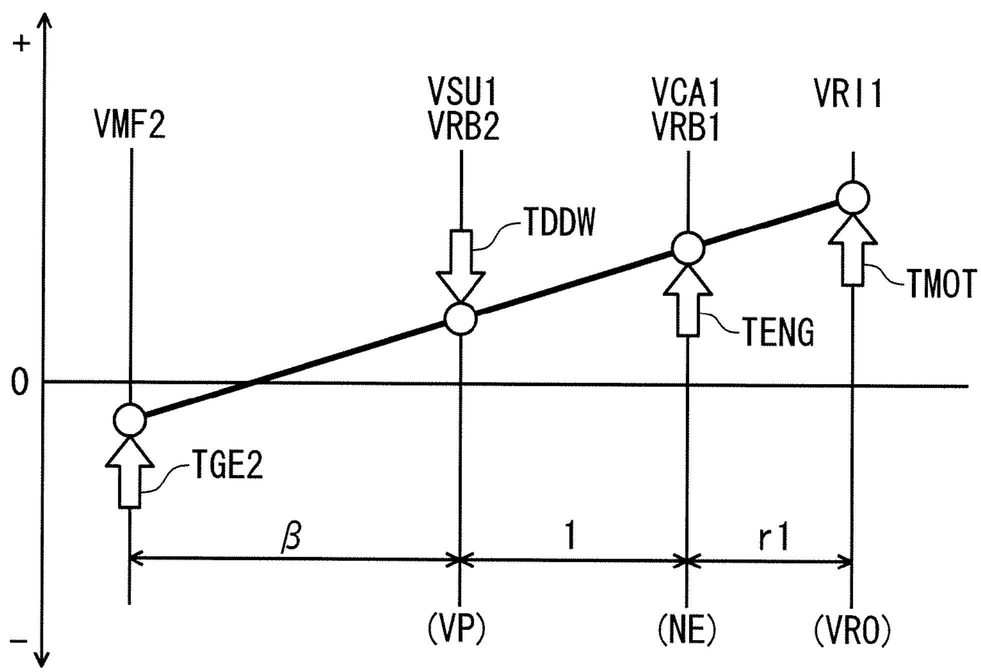
FIG. 90 is a diagram showing an example of the relationship between the rotational speeds and torques of various rotary elements of the power unit shown in FIG. 87 at the start of rapid acceleration operation during ENG traveling.

Furthermore, at the time of the rapid acceleration operation during the ENG traveling described in the first embodiment, the engine 3, the rotating machine 101 and the second rotating machine 31 are controlled in the following manner. FIG. 90 shows an example of the relationship between the rotational speeds and torques of various rotary elements at the start of the rapid acceleration operation during ENG traveling. In this case, similarly to the first embodiment, the engine speed NE is increased to such a predetermined engine speed that the maximum torque thereof is obtained. Moreover, as shown in FIG. 90, the vehicle speed VP is not immediately increased, and hence as the engine speed NE becomes higher than the vehicle speed VP, the difference between the engine speed NE and the vehicle speed VP becomes larger, so that the direction of rotation of the second rotating magnetic field determined by the relationship between the two becomes the direction of reverse rotation. In order to cause positive torque from the stator 33 that generates such a second rotating magnetic field to act on the drive wheels DW and DW, the stator 33 performs electric power generation. Moreover, the electric power generated by the stator 33 is supplied to the stator 102 of the rotating machine 101 to cause the rotor 103 to perform normal rotation.

As described above, the engine torque TENG, the rotating machine torque TMOT, and the second electric power-generating equivalent torque TGE2 are all transmitted to the drive wheels DW and DW as positive torque, which results in a rapid increase in the vehicle speed VP. Moreover, at the start of the rapid acceleration operation during the ENG traveling, as is apparent from FIG. 90, the engine torque TENG and the rotating machine torque TMOT are transmitted to the drive wheels DW and DW using the second electric power-generating equivalent torque TGE2 as a reaction force, so that torque required of the second rotating machine 31 becomes larger than in the other cases. In this case, the torque required of the second rotating machine 31, that is, the second electric power-generating equivalent torque TGE2 is expressed by the following equation (67).

$$TGE2=-\{r1\cdot TENG+(1+r1)TDDW\}/(\beta+1+r1) \quad (67)$$

As is apparent from the equation (67), as the second pole pair number ratio β is larger, the rotating machine torque TMOT becomes smaller with respect to the drive wheel-transmitted torque TDDW and the engine torque TENG assuming that the respective magnitudes thereof are unchanged. In the present embodiment, the second pole pair number ratio β is set to 2.0, and hence similarly to the first embodiment, it is possible to reduce the size and costs of the second rotating machine 31.

<Deceleration Regeneration>

During the deceleration regeneration, when the ratio of the torque of the drive wheels DW and DW transmitted to the engine 3 to the torque of the drive wheels DW and DW (torque by inertia) is small, electric power generation is performed by the stators 102 and 33 using part of the motive power from the drive wheels DW and DW, and the generated electric power is charged into the battery 43. Along with the electric power generation by the stator 33, combined torque formed by combining all the torque of the drive wheels DW and DW and torque distributed to the first sun gear S1, as described later, is transmitted to the B2 rotor 35. Moreover, the combined torque transmitted to the B2 rotor 35 is distributed to the stator 33 and the B1 rotor 34.

Moreover, part of the torque distributed to the B1 rotor 34 is transmitted to the engine 3, and the remainder thereof is, similarly to the case of the above-described battery input/output zero mode, transmitted to the first carrier C1 along with the electric power generation by the stator 102, and is then distributed to the stator 102 and the first sun gear S1. Moreover, the torque distributed to the first sun gear S1 is transmitted to the B2 rotor 35. As a result, during the deceleration regeneration, assuming that there is no transmission loss caused by the gears or the like, similarly to the first embodiment, the sum of the motive power transmitted to the engine 3 and the electric power (energy) charged into the battery 43 becomes equal to the motive power from the drive wheels DW and DW.

<ENG Start During Stoppage of the Vehicle>

At the time of the ENG start during stoppage of the vehicle, electric power is supplied from the battery 43 to the stator 102 of the rotating machine 101, thereby causing the rotor 103 to perform normal rotation and causing the stator 33 of the second rotating machine 31 to perform electric power generation to further supply the generated electric power to the stator 102. The rotating machine torque TMOT transmitted to the first ring gear R1 in accordance with the supply of the electric power to the stator 102 is transmitted to the first carrier C1 and the first sun gear S1 through the first planetary gears P1, thereby acting on the first carrier C1 to cause the first carrier C1 to perform normal rotation and acting on the first sun gear S1 to cause the first sun gear S1 to perform reverse rotation. Moreover, part of the torque transmitted to the first carrier C1 is transmitted to the crankshaft 3*a*, whereby the crankshaft 3*a* performs normal rotation.

Furthermore, at the time of the ENG start during stoppage of the vehicle, the remainder of the torque transmitted to the first carrier C1 is transmitted to the B1 rotor 34, and is then transmitted to the stator 33 as electric energy along with the electric power generation by the stator 33 of the second rotating machine 31. Moreover, in this case, as described in the first embodiment, the second rotating magnetic field performs reverse rotation. As a result, the second electric power-generating equivalent torque TGE2 generated along with the electric power generation by the stator 33 acts on the B2 rotor 35 to cause the B2 rotor 35 to perform normal rotation. Moreover, the torque transmitted to the B1 rotor 34 such that it is balanced with the second electric power-generating equivalent torque TGE2 is further transmitted to the B2 rotor 35, thereby acting on the B2 rotor 35 to cause the B2 rotor 35 to perform normal rotation.

In this case, the electric power supplied to the stator 102 of the rotating machine 101 and the electric power generated by the stator 33 of the second rotating machine 31 are controlled such that the above-described torque for causing the first sun gear S1 to perform reverse rotation and the torques for causing the B2 rotor 35 to perform normal rotation are balanced with each other, whereby the first sun gear S1, the B2 rotor 35 and the drive wheels DW and DW, which are connected to each other, are held stationary. As a consequence, the first sun gear rotational speed VSU1 and the B2 rotor rotational speed VRB2 become equal to 0, and the vehicle speed VP as well become equal to 0.

Moreover, in this case, the electric power supplied to the stator 102, the electric power generated by the stator 33, the rotor rotational speed VRO, and the second magnetic field rotational speed VMF2 are controlled such that the speed relationships expressed by the equations (53) and (44) are maintained and at the same time the first carrier rotational speed VCA1 and the B1 rotor rotational speed VRB1 take relatively small values. In this way, at the time of the ENG start during stoppage of the vehicle, similarly to the first embodiment, while holding the vehicle speed VP at 0, the engine speed NE is controlled to a relatively small value suitable for the start of the engine 3. Moreover, in this state, the ignition operation of the fuel injection valves and the spark plugs of the engine 3 is controlled according to the crank angle position, whereby the engine 3 is started.

<ENG Creep>

During the ENG creep, electric power generation is performed by the stators 102 and 33. Moreover, electric power thus generated by the stators 102 and 33 is charged into the battery 43. Similarly to the case of the above-described battery input/output zero mode, along with the above-described electric power generation by the stator 102, part of the engine torque TENG is transmitted to the first carrier C1, and the engine torque TENG transmitted to the first carrier C1 is distributed to the stator 102 and the first sun gear S1. Moreover, similarly to the first embodiment, the second rotating magnetic field generated by the above-described electric power generation by the stator 33 performs reverse rotation. As a result, the second electric power-generating equivalent torque TGE2 generated along with the above-described electric power generation by the stator 33 acts on the B2 rotor 35 to cause the B2 rotor 35 to perform normal rotation. Moreover, the engine torque TENG transmitted to the B1 rotor 34 such that it is balanced with the second electric power-generating equivalent torque TGE2 is further transmitted to the B2 rotor 35, thereby acting on the B2 rotor 35 to cause the B2 rotor 35 to perform normal rotation. Furthermore, the engine torque TENG distributed to the first sun gear S1 as described above is transmitted to the B2 rotor 35.

As described above, during the ENG creep, combined torque formed by combining the engine torque TENG distributed to the first sun gear S1, the second electric power-generating equivalent torque TGE2, and the engine torque TENG transmitted to the B1 rotor 34 is transmitted to the B2 rotor 35. Moreover, this combined torque is transmitted to the drive wheels DW and DW, for causing the drive wheels DW and DW to perform normal rotation. Furthermore, the electric power generated by the stators 102 and 33, the rotor rotational speed VRO, and the second magnetic field rotational speed VMF2 are controlled such that the first sun gear rotational speed VSU1 and the B2 rotor rotational speed VRB2, that is, the vehicle speed VP becomes very small, whereby the creep operation is carried out.

Moreover, during the ENG creep, as described above, the engine torque TENG distributed to the first sun gear S1 along with the electric power generation by the stator 102 and the engine torque TENG transmitted to the B2 rotor 35 through the B1 rotor 34 along with the electric power generation by the stator 33 are transmitted to the drive wheels DW and DW. Thus, similarly to the first embodiment, part of the engine torque TENG can be transmitted to the drive wheels DW and DW, and hence it is possible to perform the creep operation without causing engine stall.

<ENG-Based Start>

At the time of the ENG-based start, the second magnetic field rotational speed VMF2 of the second rotating magnetic field that has been performing reverse rotation during the ENG creep is controlled such that it becomes equal to 0, the rotor rotational speed VRO of the rotor 103 that has been performing normal rotation during the ENG creep is caused to be increased, and the engine motive power is caused to be increased. Then, after the second magnetic field rotational speed VMF2 becomes equal to 0, the operation in the above-described battery input/output zero mode is performed. In this way, the vehicle speed VP is increased, causing the vehicle to start.

As described heretofore, according to the present embodiment, the second rotating machine 31 has the same functions as those of an apparatus formed by combining a planetary gear unit and a general one-rotor-type rotating machine, so that differently from the above-described conventional power unit, the power unit 1N does not require two planetary gear units for distributing and combining motive power for transmission, respectively, but requires only the first planetary gear unit PS1. In this way, it is possible to reduce the size of the power unit 1N by the corresponding extent. Moreover, in the power unit 1N, as already described in the description of the operation in the battery input/output zero mode, differently from the above-described conventional case, the engine motive power is transmitted to the drive wheels DW and DW without being recirculated, so that it is possible to reduce motive power passing through the first planetary gear unit PS1, the rotating machine 101, and the second rotating machine 31. In this way, it is possible to reduce the sizes and costs of the first planetary gear unit PS1, the rotating machine 101, and the second rotating machine 31. As a result, it is possible to attain further reduction of the size and costs of the power unit 1N. Moreover, the first planetary gear unit PS1, the rotating machine 101, and the second rotating machine 31, each having a torque capacity corresponding to motive power reduced as described above, are used. As a result, it is possible to suppress the loss of motive power to improve the driving efficiency of the power unit 1N.

Moreover, the engine motive power is transmitted to the drive wheels DW and DW in a divided state through a total of three transmission paths: a first transmission path (the first carrier C1, the first planetary gears P1, the first sun gear S1, the connection shaft 6, and the B2 rotor 35), a second transmission path (the B1 rotor 34, the magnetic forces caused by magnetic force lines, and the B2 rotor 35), and a third transmission path (the first carrier C1, the first planetary gears P1, the first ring gear R1, the rotor 103, the stator 102, the first PDU 41, the second PDU 42, the stator 33, the magnetic forces caused by magnetic force lines, and the B2 rotor 35). In this way, it is possible to reduce electric power (energy) passing through the first and second PDUs 41 and 42 through the third transmission path, so that it is possible to reduce the sizes and costs of the first and second PDUs 41 and 42. As a result, it is possible to attain further reduction of the size and costs of the power unit 1N.

Furthermore, as described above with reference to FIG. 89, the engine motive power is transmitted to the drive wheels DW and DW while having the speed thereof steplessly changed through the control of the rotor rotational speed VRO and the second magnetic field rotational speed VMF2. Moreover, in this case, the rotor rotational speed VRO and the second magnetic field rotational speed VMF2 are controlled such that the engine speed NE becomes equal to the target engine speed set to such a value that will make it possible to obtain the optimum fuel economy of the engine 3, and therefore it is possible to drive the drive wheels DW and DW while controlling the engine motive power such that the optimum fuel economy of the engine 3 can be obtained. In this way, it is possible to further enhance the driving efficiency of the power unit 1N.

Moreover, the first planetary gear ratio r1 of the first planetary gear unit PS1 is set to a relatively large one of the values that can be taken by a general planetary gear unit. As a consequence, at the time of the ENG start during EV traveling, when the torque required of the rotating machine 101 becomes particularly large, as described above with reference to FIG. 88 using the above-described equation (66), the rotating machine torque TMOT can be made smaller than that when the first planetary gear ratio r1 is set to a small value, and hence it is possible to further reduce the size and costs of the rotating machine 101. Furthermore, the second pole pair number ratio β of the second rotating machine 31 is set to 2.0. As a consequence, at the time of the rapid acceleration operation during the ENG traveling in which the torque required of the second rotating machine 31 becomes particularly large, as described above with reference to FIG. 90 using the above-described equation (67), the rotating machine torque TMOT can be made smaller than that when the second pole pair number ratio β is set to less than 1.0, and hence it is possible to further reduce the size and costs of the second rotating machine 31. In addition, according to the present embodiment, it is possible to obtain the same advantageous effects as provided by the first embodiment.

The power plant 1N of the present embodiment performs the same control as the "battery SOC-based control" performed by the power plant 1 of the first embodiment. In the present embodiment, the first rotating machine 21 of the first embodiment is replaced by the first planetary gear unit PS1 and the one-rotor-type rotating machine 101. Thus, the first rotating machine 21 is replaced by the rotating machine 101, the stator 23 of the first rotating machine 21 is replaced by the stator 102 of the rotating machine 101, and the A2 rotor 25 is replaced by the first carrier C1 of the first planetary gear unit PS1.

Sixteenth to Nineteenth Embodiments

Next, power units 1O, 1P, 1Q and 1R according to sixteenth to nineteenth embodiments will be described with reference to FIGS. 91 to 94. These power units 1O to 1R are distinguished from the fifteenth embodiment mainly in that they further include transmissions 161, 171, 181, and 191, respectively. In all of the sixteenth to nineteenth embodiments, the connection relationship between the engine 3, the rotating machine 101, the first planetary gear unit PS1, the second rotating machine 31, and the drive wheels DW and DW is the same as the connection relationship in the fifteenth embodiment. That is, the first carrier C1 and the B1 rotor 34 are mechanically connected to the crankshaft 3*a* of the engine 3, and the first sun gear S1 and the B2 rotor 35 are mechanically connected to the drive wheels DW and DW. Moreover, the rotor 103 of the rotating machine 101 is mechanically connected to the first ring gear R1. Furthermore, in FIGS. 91 to 94, the constituent elements identical to those of the fifteenth embodiment are denoted by the same reference numerals. This also similarly applies to figures for use in describing the other embodiments described later. In the following description, different points from the fifteenth embodiment will be mainly described in order from the power unit 1O of the sixteenth embodiment.

Sixteenth Embodiment

Figure 91:
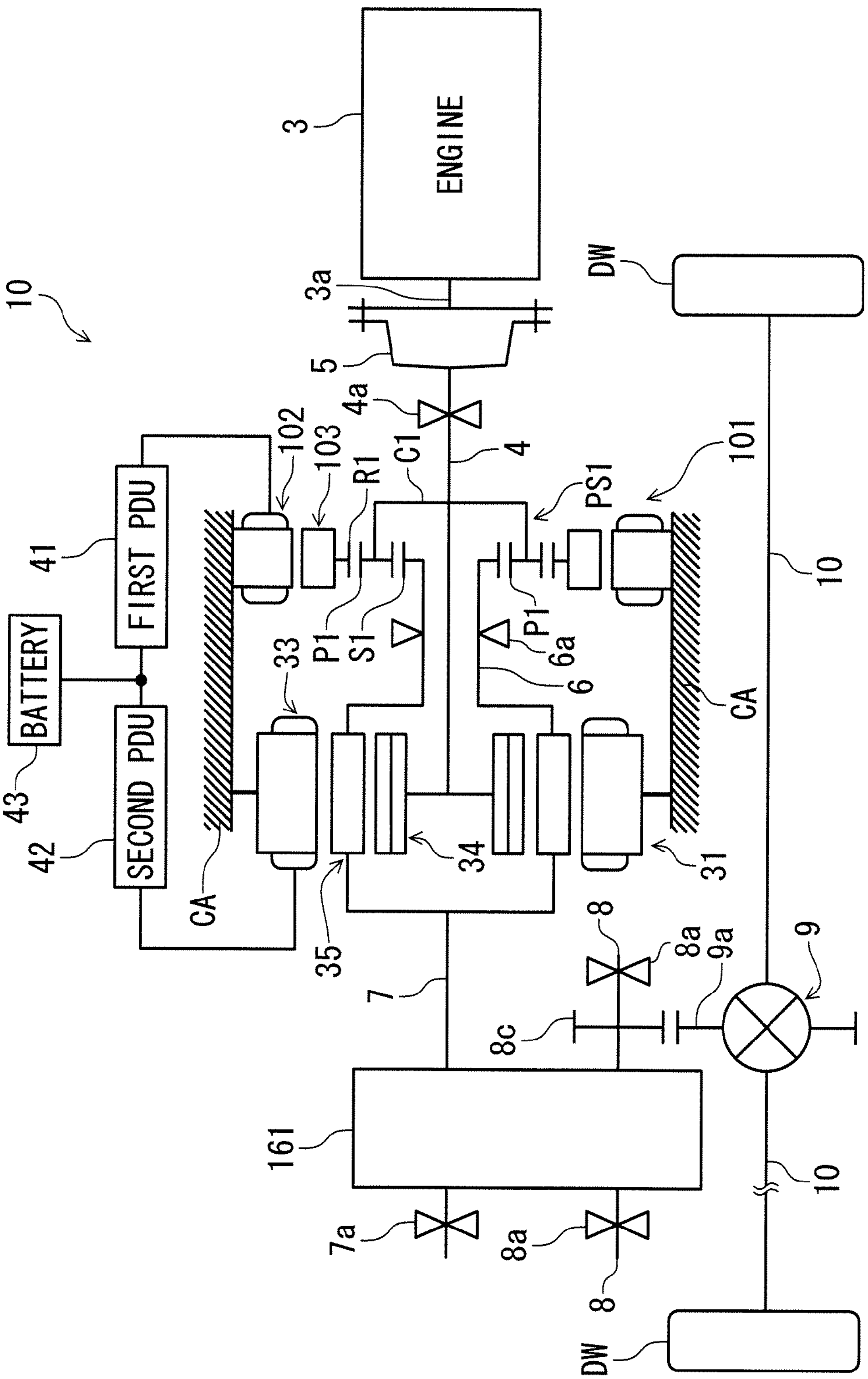
FIG. 91 is a diagram schematically showing a power unit according to a sixteenth embodiment.

Referring to FIG. 91, in the power unit 1O, the transmission 161 is provided in place of the gear 7*b* and the first gear 8*b* which are in mesh with each other. Similarly to the transmission 111 according to the eighth embodiment, this transmission 161 is a belt-type stepless transmission, and includes an input shaft connected to the above-described second rotating shaft 7, an output shaft connected to the idler shaft 8, pulleys provided on the input shaft and the output shaft, respectively, and a metal belt wound around the pulleys, none of which are shown. The transmission 161 changes the effective diameters of the pulleys, thereby outputting motive power input to the input shaft to the output shaft while changing the speed thereof. Moreover, the ECU 2 controls the transmission ratio of the transmission 161 (the rotational speed of the input shaft/the rotational speed of the output shaft).

As described above, the transmission 161 is disposed between the first sun gear S1 and the B2 rotor 35, and the drive wheels DW and DW, and the motive power transmitted to the first sun gear S1 and the B2 rotor 35 is transmitted to the drive wheels DW and DW while having the speed thereof changed by the transmission 161.

In the power unit 1O configured as above, in cases where a very large torque is transmitted from the first sun gear S1 and the B2 rotor 35 to the drive wheels DW and DW, for example, during the EV start and the ENG-based start, the transmission ratio of the transmission 161 is controlled to a predetermined lower-speed value larger than 1.0. In this way, the torque transmitted to the first sun gear S1 and the B2 rotor 35 is increased by the transmission 161, and is then transmitted to the drive wheels DW and DW. In accordance with this, the electric power generated by the rotating machine 101 and the electric power supplied to the second rotating machine 31 (generated electric power) are controlled such that the torque transmitted to the first sun gear S1 and the B2 rotor 35 becomes smaller. Therefore, according to the present embodiment, it is possible to reduce the respective maximum values of torque required of the rotating machine 101 and the second rotating machine 31. As a result, it is possible to further reduce the sizes and costs of the rotating machine 101 and the second rotating machine 31. Moreover, through the control of the above-described transmission 161 and rotating machine 101, it is possible to reduce the torque distributed to the first sun gear S1 and the first ring gear R1 through the first carrier C1, and reduce the maximum value of the torque transmitted to the first carrier C1, so that it is possible to further reduce the size and costs of the first planetary gear unit PS1.

Furthermore, in cases where the B2 rotor rotational speed VRB2 becomes too high, for example, during the high-vehicle speed operation in which the vehicle speed VP is very high, the transmission ratio of the transmission 161 is controlled to a predetermined higher-speed value smaller than 1.0. In this way, according to the present embodiment, since the B2 rotor rotational speed VRB2 can be reduced with respect to the vehicle speed VP, it is possible to prevent failure of the second rotating machine 31 from being caused by the B2 rotor rotational speed VRB2 becoming too high.

Moreover, in cases where the rotor rotational speed VRO which is determined by the relationship between the engine speed NE and the vehicle speed VP becomes too high, for example, during rapid acceleration of the vehicle in which the engine speed NE is higher than the vehicle speed VP, the transmission ratio of the transmission 161 is controlled to a predetermined lower-speed value larger than 1.0. In this way, according to the present embodiment, the first sun gear rotational speed VSU1 is increased with respect to the vehicle speed VP, whereby as is apparent from FIG. 89, referred to hereinabove, it is possible to reduce the rotor rotational speed VRO, and hence it is possible to prevent failure of the rotating machine 101 from being caused by the rotor rotational speed VRO becoming too high.

Furthermore, during traveling of the vehicle including the EV traveling and the ENG traveling, the transmission ratio of the transmission 161 is controlled such that the rotor rotational speed VRO and the second magnetic field rotational speed VMF2 become equal to first and second predetermined target values, respectively. The first and second target values are calculated by searching a map according to the vehicle speed VP when only the rotating machine 101 and the second rotating machine 31 are used as motive power sources, whereas when the engine 3, the rotating machine 101, and the second rotating machine 31 are used as motive power sources, the first and second target values are calculated by searching a map other than the above-described map according to the engine speed NE and the vehicle speed VP. Moreover, in these maps, the first and second target values are set to such values that will make it possible to obtain high efficiencies of the rotating machine 101 and the second rotating machine 31 with respect to the vehicle speed VP (and the engine speed NE) assumed at the time. Furthermore, in parallel with the above-described control of the transmission 161, the rotor rotational speed VRO and the second magnetic field rotational speed VMF2 are controlled to the first and second target values, respectively. In this way, according to the present embodiment, during traveling of the vehicle, it is possible to obtain the high efficiencies of the rotating machine 101 and the second rotating machine 31.

Moreover, also in the present embodiment, as described above with reference to FIG. 89, by using the rotating machine 101, the first planetary gear unit PS1 and the second rotating machine 31, it is possible to transmit the engine motive power to the drive wheels DW and DW while steplessly changing the speed thereof, and hence it is possible to reduce the frequency of the speed-changing operation of the transmission 161. In this way, it is possible to suppress heat losses by the speed-changing operation. As a result, it is possible to ensure the high driving efficiency of the power unit 1O. In addition, according to the present embodiment, it is possible to obtain the same advantageous effects as provided by the fifteenth embodiment.

It should be noted that although in the present embodiment, the transmission 161 is a belt-type stepless transmission, it is to be understood that a toroidal-type or a hydraulic-type stepless transmission or a gear-type stepped transmission may be employed.

Seventeenth Embodiment

Figure 92:
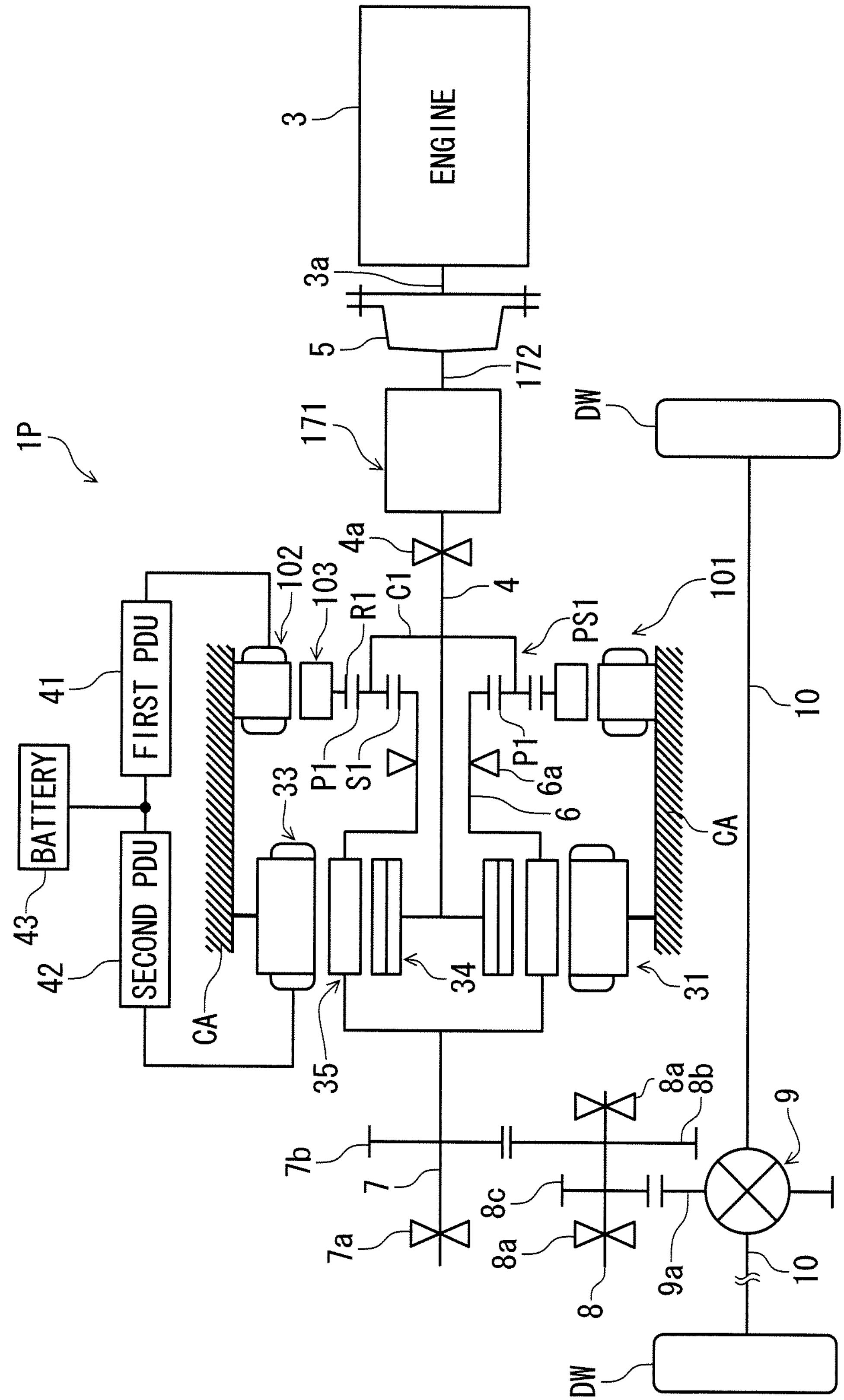
FIG. 92 is a diagram schematically showing a power unit according to a seventeenth embodiment.

In the power unit 1P according to the seventeenth embodiment shown in FIG. 92, the transmission 171 is a gear-type stepped transmission formed by a planetary gear unit and the like, similarly to the above-described transmission 121 in the ninth embodiment, and includes an input shaft 172 and an output shaft (not shown). In the transmission 171, a total of two speed positions, that is, a first speed (transmission ratio=the rotational speed of the input shaft 172/the rotational speed of the output shaft=1.0) and a second speed (transmission ratio<1.0) are set as speed positions. The ECU 2 performs a change between these speed positions. Moreover, the input shaft 172 of the transmission 171 is directly connected to the crankshaft 3*a* through the flywheel 5, and the output shaft (not shown) thereof is directly connected to the first rotating shaft 4. As described above, the transmission 171 is disposed between the crankshaft 3*a*, and the first carrier C1 and the B1 rotor 34, for transmitting the engine motive power to the first carrier C1 and the B1 rotor 34 while changing the speed of the engine motive power.

Furthermore, similarly to the ninth embodiment, the number of the gear teeth of the gear 9*a* of the above-described differential gear mechanism 9 is larger than that of the gear teeth of the second gear 8*c* of the idler shaft 8, whereby the motive power transmitted to the idler shaft 8 is transmitted to the drive wheels DW and DW in a speed-reduced state.

In the power unit 1P configured as above, in cases where a very large torque is transmitted from the first sun gear S1 and the B2 rotor 35 to the drive wheels DW and DW, for example, during the ENG-based start, the speed position of the transmission 171 is controlled to the second speed (transmission ratio<1.0). This reduces the engine torque TENG input to the first carrier C1 and the B1 rotor 34. In accordance with this, the electric power generated by the rotating machine 101 and the electric power supplied to the second rotating machine 31 (generated electric power) are controlled such that the engine torque TENG transmitted to the first sun gear S1 and the B2 rotor 35 becomes smaller. Moreover, the engine torque TENG transmitted to the first sun gear S1 and the B2 rotor 35 is transmitted to the drive wheels DW and DW in a state increased by deceleration by the second gear 8*c* and the gear 9*a*. In this way, according to the present embodiment, it is possible to reduce the respective maximum values of torque required of the rotating machine 101 and the second rotating machine As a result, it is possible to reduce the sizes and costs of the rotating machine 101 and the second rotating machine 31. In addition to this, since the respective maximum values of the torque distributed to the first sun gear S1 and the first ring gear R1 through the first carrier C1 can be reduced, it is possible to further reduce the size and costs of the first planetary gear unit PS1.

Moreover, when the engine speed NE is very high, the speed position of the transmission 171 is controlled to the first speed (transmission ratio=1.0). In this way, according to the present embodiment, compared with the case of the speed position being the second speed, the B1 rotor rotational speed VRB1 can be reduced, whereby it is possible to prevent failure of the second rotating machine 31 from being caused by the B1 rotor rotational speed VRB1 becoming too high. This control is particularly effective because the B1 rotor 34 is formed by magnets so that the above-described inconveniences are liable to occur.

Moreover, in cases where the rotor rotational speed VRO becomes too high, for example, during rapid acceleration of the vehicle in which the engine speed NE is higher than the vehicle speed VP, the speed position of the transmission 171 is controlled to the first speed. In this way, compared with the case of the speed position being the second speed, the first carrier rotational speed VCA1 becomes smaller, and hence according to the present embodiment, as is apparent from FIG. 89, the rotor rotational speed VRO can be lowered. As a result, it is possible to prevent failure of the rotating machine 101 from being caused by the rotor rotational speed VRO becoming too high.

Moreover, during the ENG traveling, the speed position of the transmission 171 is changed according to the engine speed NE and the vehicle speed VP such that the rotor rotational speed VRO and the second magnetic field rotational speed VMF2 take respective values that will make it possible to obtain the high efficiencies of the rotating machine 101 and the second rotating machine 31. Moreover, in parallel with such a change in the speed position of the transmission 171, the rotor rotational speed VRO and the second magnetic field rotational speed VMF2 are controlled to values determined based on the engine speed NE, the vehicle speed VP, and the speed position of the transmission 171, which are assumed then, and the above-described equations (44) and (53). In this way, according to the present embodiment, during traveling of the vehicle, it is possible to obtain the high efficiencies of the rotating machine 101 and the second rotating machine 31.

Furthermore, during the ENG traveling and at the same time during the speed-changing operation of the transmission 171, that is, when the engine 3, the first carrier C1 and the B1 rotor 34 are disconnected from each other by the transmission 171, to suppress a speed-change shock, the rotating machine 101 and the second rotating machine 31 are in the following manner. Hereafter, such control of the rotating machine 101 and the second rotating machine 31 will be referred to as "the speed-change shock control," similarly to the ninth embodiment.

That is, electric power is supplied to the stator 102 of the rotating machine 101, for causing the rotor 103 to perform normal rotation, and electric power is supplied to the stator 33 of the second rotating machine 31, for causing the second rotating magnetic field, which is generated in accordance with the supply of the electric power, to perform normal rotation. In this way, the rotating machine torque TMOT transmitted to the first ring gear R1 and the torque transmitted to the first sun gear S1 as described hereafter are combined, and the combined torque is transmitted to the first carrier C1. The torque transmitted to the first carrier C1 is transmitted to the B1 rotor 34 without being transmitted to the crankshaft 3*a*, by the above-described disconnection by the transmission 171. Moreover, this torque is combined with the second driving equivalent torque TSE2 from a fourth stator 232 and is then transmitted to the B2 rotor 35. Part of the torque transmitted to the B2 rotor 35 is transmitted to the first sun gear S1, and the remainder thereof is transmitted to the drive wheels DW and DW.

Therefore, according to the present embodiment, during the speed-changing operation, it is possible to suppress a speed-change shock, which can be caused by interruption of transmission of the engine torque TENG to the drive wheels DW and DW, and therefore it is possible to improve marketability. It should be noted that this speed-change shock control is performed only during the speed-changing operation of the transmission 171. In addition, according to the present embodiment, it is possible to obtain the same advantageous effects as provided by the fifteenth embodiment.

Eighteenth Embodiment

Figure 93:
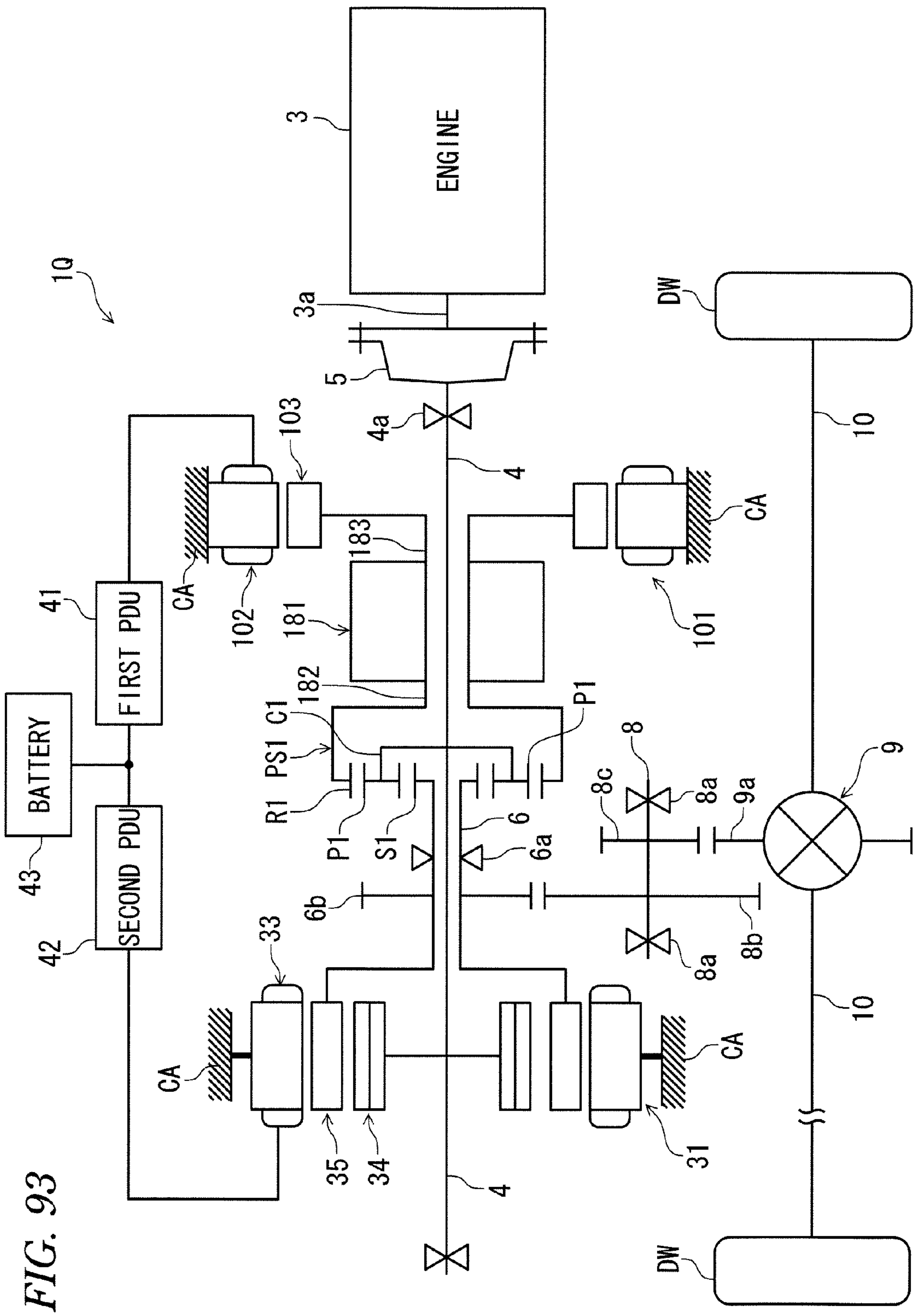
FIG. 93 is a diagram schematically showing a power unit according to an eighteenth embodiment.

In the power unit 1Q according to the eighteenth embodiment shown in FIG. 93, differently from the fifteenth embodiment, the second rotating shaft 7 is not provided, and the first gear 8*b* is in mesh with the gear 6*b* integrally formed with the connection shaft 6. As a result, the first sun gear S1 and the B2 rotor 35 are mechanically connected to the drive wheels DW and DW through the connection shaft 6, the gear 6*b*, the first gear 8*b*, the idler shaft 8, the second gear 8*c*, the gear 9*a*, the differential gear mechanism 9, and the like, without passing through the transmission 181.

The transmission 181 is a gear-type stepped transmission which is configured similarly to the transmission 131 according to the tenth embodiment and has speed positions of the first to third speeds. The transmission 181 includes an input shaft 182 directly connected to the first ring gear R1 through a flange, and an output shaft 183 directly connected to the rotor 103 through a flange, and transmits motive power input to the input shaft 182 to the output shaft 183 while changing the speed of the motive power. Furthermore, the ECU 2*a* controls a change between the speed positions of the transmission 181. As described above, the first ring gear R1 is mechanically connected to the rotor 103 through the transmission 181, and the motive power transmitted to the first ring gear R1 is transmitted to the rotor 103 while having the speed thereof changed by the transmission 181.

In the power unit 1Q configured as above, when a very large torque is transmitted to the rotor 103, for example, during the EV start and the ENG-based start, the speed position of the transmission 181 is controlled to the third speed (transmission ratio<1.0). In this way, the torque transmitted to the first ring gear R1 is reduced by the transmission 181, and is then transmitted to the rotor 103. In accordance with this, the electric power generated by the rotating machine 101 is controlled such that the torque transmitted to the rotor 103 becomes smaller. Moreover, at the time of the above-described ENG start during stoppage of the vehicle, the speed position of the transmission 181 is controlled to the third speed (transmission ratio<1.0). In this case, the input shaft 182 and the output shaft 183 are connected to the first ring gear R1 and the rotor 103, respectively, and hence through the above-described control of the transmission 181, at the time of the above-described ENG start during stoppage of the vehicle, the torque from the rotating machine 101 is increased, and is transmitted to the crankshaft 3*a* through the first ring gear R1, the first planetary gears P1 and the first carrier C1. In accordance with this, the electric power supplied to the rotating machine 101 is controlled such that the rotating machine torque TMOT from the rotating machine 101 becomes smaller. In this way, according to the present embodiment, it is possible to further reduce the size and costs of the rotating machine 101.

Moreover, during the EV start and the like, even when the speed position of the transmission 181 is controlled as described above, the magnitude itself of the motive power transmitted from the first ring gear R1 to the rotor 103 does not change, and when the electric power generated by the rotating machine 101 is transmitted to the B2 rotor 35 through the stator 33 as motive power, the torque transmitted to the drive wheels DW and DW through the B2 rotor 35 can be controlled to have a desired magnitude. In this way, it is possible to transmit torque having a sufficient magnitude to the drive wheels DW and DW.

Moreover, when the rotor rotational speed VRO, which is determined by the relationship between the engine speed NE and the vehicle speed VP, becomes too high, for example, during rapid acceleration of the vehicle in which the engine speed NE is higher than the vehicle speed VP, the speed position of the transmission 181 is controlled to the first speed (transmission ratio>1.0). In this way, it is possible to reduce the rotor rotational speed VRO with respect to the first ring gear rotational speed VRI1 which is determined by the relationship between the engine speed NE and vehicle speed VP assumed at the time, and hence it is possible to prevent failure of the rotating machine 101 from being caused by the rotor rotational speed VRO becoming too high.

Furthermore, during traveling of the vehicle including the EV traveling and the ENG traveling, the speed position of the transmission 181 is controlled such that the rotor rotational speed VRO becomes equal to a predetermined target value. This target value is calculated by searching a map according to the vehicle speed VP when only the rotating machine 101 and the second rotating machine 31 are used as motive power sources, whereas when the engine 3, the rotating machine 101 and the second rotating machine 31 are used as motive power sources, the target value is calculated by searching a map other than the above-described map according to the engine speed NE and the vehicle speed VP. Moreover, in these maps, the target value is set to such a value that will make it possible to obtain high efficiency of the rotating machine 101 with respect to the vehicle speed VP (and the engine speed NE) assumed at the time. Furthermore, in parallel with the above-described control of the transmission 181, the rotor rotational speed VRO is controlled to the above-described target value. In this way, according to the present embodiment, during traveling of the vehicle, it is possible to obtain the high efficiency of the rotating machine 101.

Furthermore, during the ENG traveling, and at the same time during the speed-changing operation of the transmission 181, the gear trains of the transmission 181 and the input shaft 182 and output shaft 183 thereof are disconnected from each other to thereby disconnect between the rotor 103 and the first ring gear R1, whereby the engine torque TENG ceases to act on the rotor 103. Therefore, no electric power is generated by the rotating machine 101, and the stator 33 of the second rotating machine 31 is supplied with electric power from the battery 43.

In this way, according to the present embodiment, during the speed-changing operation of the transmission 181, the second driving equivalent torque TSE2 from the stator 33 and the engine torque TENG transmitted to the B1 rotor 34 are combined, and the combined torque is transmitted to the drive wheels DW and DW through the B2 rotor 35. In this way, it is possible to suppress a speed-change shock, which can be caused by interruption of transmission of the engine torque TENG to the drive wheels DW and DW, and therefore it is possible to improve marketability.

Moreover, similarly to the fifteenth embodiment, by using the rotating machine 101, the first planetary gear unit PS1 and the second rotating machine 31, it is possible to transmit the engine motive power to the drive wheels DW and DW while steplessly changing the speed thereof, so that it is possible to reduce the frequency of the speed-changing operation of the transmission 181. In this way, it is possible to enhance the driving efficiency of the power unit 1Q. In addition, according to the present embodiment, it is possible to obtain the same advantageous effects as provided by the fifteenth embodiment.

Nineteenth Embodiment

Figure 94:
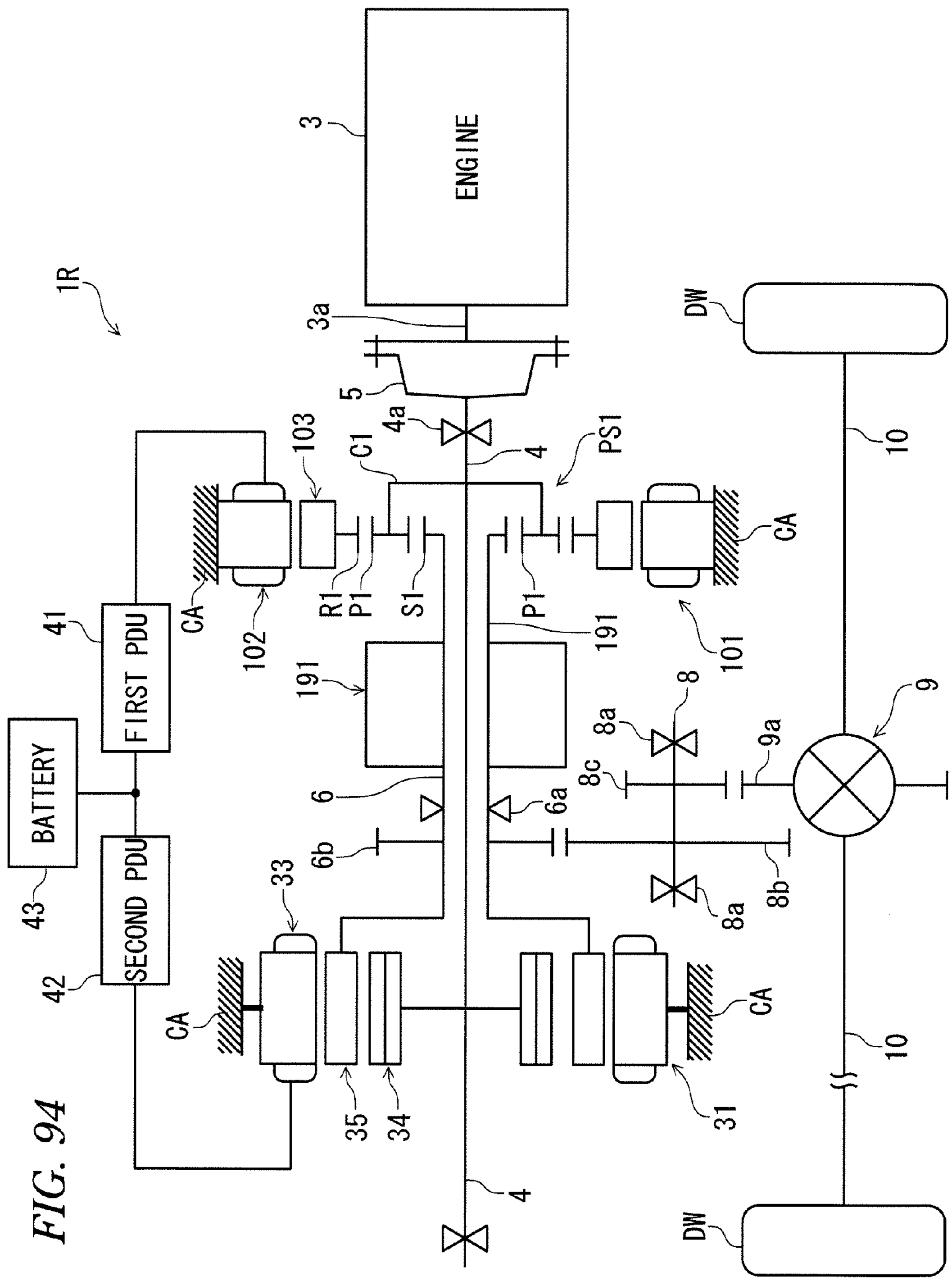
FIG. 94 is a diagram schematically showing a power unit according to a nineteenth embodiment.

In the power unit 1R according to the nineteenth embodiment shown in FIG. 94, similarly to the eighteenth embodiment, the second rotating shaft 7 is not provided, and the first gear 8*b* is in mesh with the gear 6*b* integrally formed with the connection shaft 6. Moreover, the transmission 191 is a gear-type stepped transmission which is configured similarly to the transmission 131 according to the seventh embodiment and has speed positions of the first to third speeds. The transmission 191 includes an input shaft 192 directly connected to the first sun gear S1 and an output shaft (not shown) directly connected to the connection shaft 6, and transmits motive power input to the input shaft 192 to the output shaft while changing the speed of the motive power. Furthermore, the ECU 2 controls a change between the speed positions of the transmission 191.

As described above, the first sun gear S1 is mechanically connected to the drive wheels DW and DW through the transmission 191, the connection shaft 6, the gear 6*b*, the first gear 8*b*, and the like. Moreover, the motive power transmitted to the first sun gear S1 is transmitted to the drive wheels DW and DW while having the speed thereof changed by the transmission 191. Furthermore, the B2 rotor 35 is mechanically connected to the drive wheels DW and DW through the connection shaft 6, the gear 6*b*, the first gear 8*b*, and the like, without passing through the transmission 191.

In the power unit 1R configured as above, in cases where a very large torque is transmitted from the first sun gear S1 to the drive wheels DW and DW, for example, during the ENG-based start, the speed position of the transmission 191 is controlled to the first speed (transmission ratio>1.0). In this way, the torque transmitted to the first sun gear S1 is increased by the transmission 191, and is then transmitted to the drive wheels DW and DW. In accordance with this, the electric power generated by the rotating machine 101 is controlled such that torque distributed to the first sun gear S1 and the first ring gear R1 becomes smaller. In this way, according to the present embodiment, the torque distributed to the first sun gear S1 and the first ring gear R1 through the first carrier C1 can be reduced, and hence it is possible to further reduce the size and costs of the first planetary gear unit PS1. In addition to this, since torque transmitted from the first ring gear R1 to the rotor 103 can be reduced, it is possible to further reduce the size and costs of the rotating machine 101.

Moreover, in cases where the rotor rotational speed VRO becomes too high, for example, during rapid acceleration of the vehicle in which the engine speed NE is higher than the vehicle speed VP, the speed position of the transmission 191 is controlled to the first speed. In this way, according to the present embodiment, the first sun gear rotational speed VSU1 is increased with respect to the vehicle speed VP, whereby as is apparent from FIG. 89, it is possible to reduce the rotor rotational speed VRO, so that it is possible to prevent failure of the rotating machine 101 from being caused by the rotor rotational speed VRO becoming too high.

Furthermore, during traveling of the vehicle including the EV traveling and the ENG traveling, the speed position of the transmission 191 is controlled such that the rotor rotational speed VRO becomes equal to a predetermined target value. This target value is calculated by searching a map according to the vehicle speed VP when only the rotating machine 101 and the second rotating machine 31 are used as motive power sources, whereas when the engine 3, the rotating machine 101 and the second rotating machine 31 are used as motive power sources, the target value is calculated by searching a map other than the above-described map according to the engine speed NE and the vehicle speed VP. Moreover, in these maps, the target value is set to such a value that will make it possible to obtain high efficiency of the rotating machine 101 with respect to the vehicle speed VP (and the engine speed NE) assumed at the time. Furthermore, in parallel with the above-described control of the transmission 191, the rotor rotational speed VRO is controlled to the above-described target value. In this way, according to the present embodiment, during traveling of the vehicle, it is possible to obtain the high efficiency of the rotating machine 101.

Furthermore, during the ENG traveling, and at the same time during the speed-changing operation of the transmission 191, the gear trains of the transmission 191 and the input shaft 192 and output shaft thereof are disconnected from each other to thereby disconnect between the first sun gear S1 and the drive wheels DW and DW, whereby the load of the drive wheels DW and DW ceases to act on the first sun gear S1. Therefore, no electric power is generated by the rotating machine 101 during the speed-changing operation of the transmission 191, and the stator 33 of the second rotating machine 31 is supplied with electric power from the battery 43.

In this way, according to the present embodiment, during the speed-changing operation of the transmission 191, the second driving equivalent torque TSE2 and the engine torque TENG transmitted to the B1 rotor 34 are combined, and the combined torque is transmitted to the drive wheels DW and DW through the B2 rotor 35. In this way, it is possible to suppress a speed-change shock, which can be caused by interruption of transmission of the engine torque TENG to the drive wheels DW and DW. As a result, it is possible to improve marketability.

Moreover, by using the rotating machine 101, the first planetary gear unit PS1 and the second rotating machine 31, it is possible to transmit the engine motive power to the drive wheels DW and DW while steplessly changing the speed thereof, so that it is possible to reduce the frequency of the speed-changing operation of the transmission 191. In this way, it is possible to enhance the driving efficiency of the power unit 1R. In addition to this, according to the present embodiment, it is possible to obtain the same advantageous effects as provided by the fifteenth embodiment.

It should be noted that although in the seventeenth to nineteenth embodiments, the transmissions 171 to 191 are gear-type stepped transmissions, it is to be understood that a belt-type, toroidal-type or hydraulic-type stepless transmission may be employed.

Twentieth Embodiment

Next, a power unit 1S according to a twentieth embodiment will be described with reference to FIG. 95. This power unit 1S is distinguished from the fifteenth embodiment mainly in that it further includes a transmission for changing the ratio between the speed difference between the rotor rotational speed VRO and the vehicle speed VP and the speed difference between the vehicle speed VP and the engine speed NE. In the following description, different points from the fifteenth embodiment will be mainly described.

Figure 95:
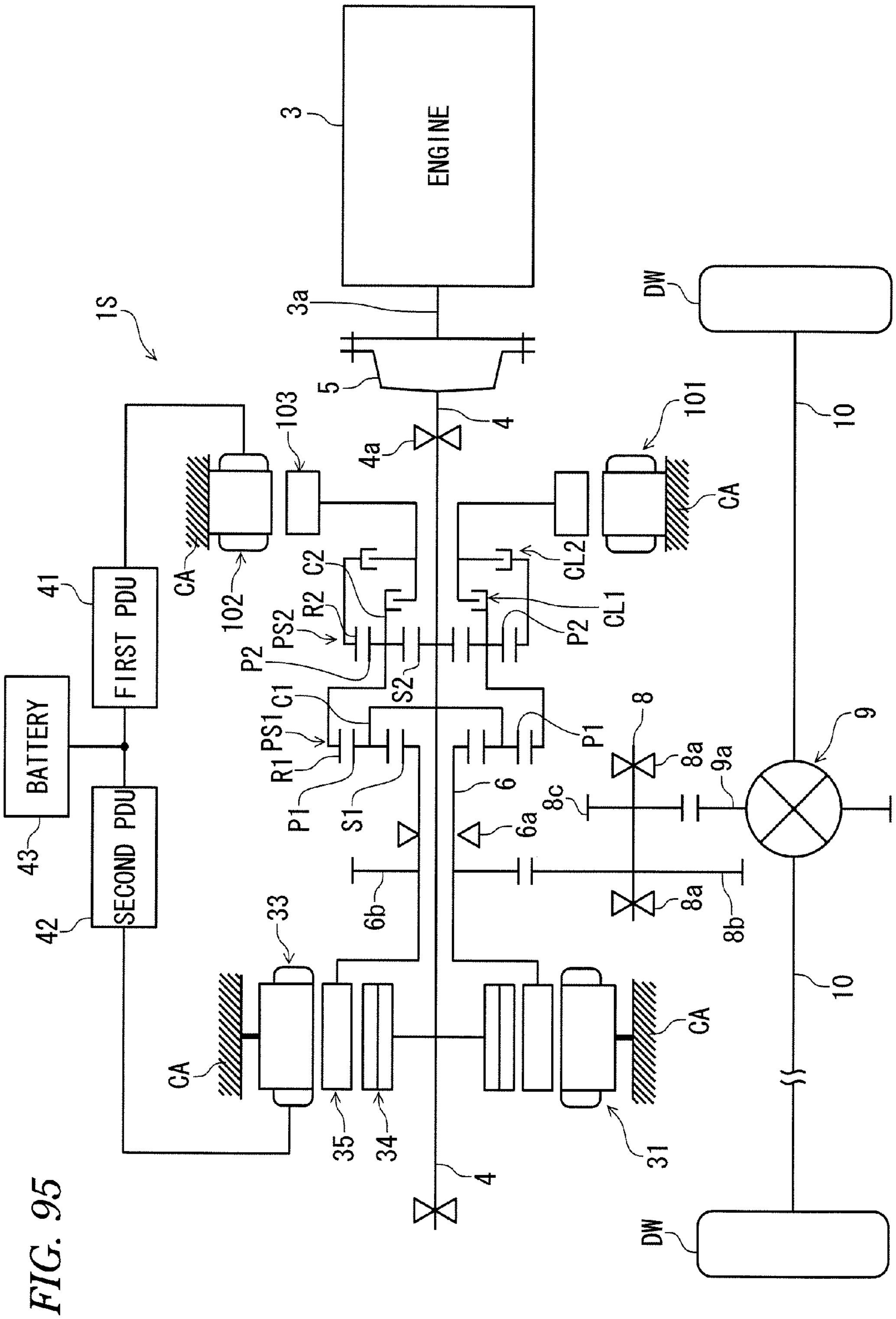
FIG. 95 is a diagram schematically showing a power unit according to a twentieth embodiment.

As shown in FIG. 95, in this power unit 1S, similarly to the eighteenth embodiment, the second rotating shaft 7 is not provided, and the first gear 8*b* is in mesh with the gear 6*b* integrally formed with the connection shaft 6, whereby the first sun gear S1 and the B2 rotor 35 are mechanically connected to the drive wheels DW and DW through the connection shaft 6, the gear 6*b*, the first gear 8*b*, the differential gear mechanism 9, and the like.

Similarly to the transmission described in the thirteenth embodiment, the above-described transmission includes the second planetary gear unit PS2, and the first and second clutches CL1 and CL2. The second sun gear S2 is integrally formed on the first rotating shaft 4, whereby the second sun gear S2 is mechanically directly connected to the first carrier C1, the crankshaft 3*a* and the B1 rotor 34. Moreover, the second carrier C2 is mechanically directly connected to the first ring gear R1 through a flange and a hollow shaft, whereby the second carrier C2 is rotatable integrally with the first ring gear R1.

The first clutch CL1 is disposed between the second carrier C2 and the rotor 103. That is, the second carrier C2 is mechanically directly connected to the rotor 103 through the first clutch CL1. Moreover, the first clutch CL1 has its degree of engagement controlled by the ECU 2 to thereby connect and disconnect between the second carrier C2 and the rotor 103. The second clutch CL2 is disposed between the second ring gear R2 and the rotor 103. That is, the second ring gear R2 is mechanically directly connected to the rotor 103 through the second clutch CL2. Moreover, the second clutch CL2 has its degree of engagement controlled by the ECU 2 to thereby connect and disconnect between the second ring gear R2 and the rotor 103.

As described above, the rotor 103 of the rotating machine 101 is mechanically connected to the first ring gear R1 through the first clutch CL1 and the second carrier C2, and is mechanically connected to the first ring gear R1 through the second clutch CL2, the second ring gear R2, the second planetary gears P2, and the second carrier C2.

Figure 96:
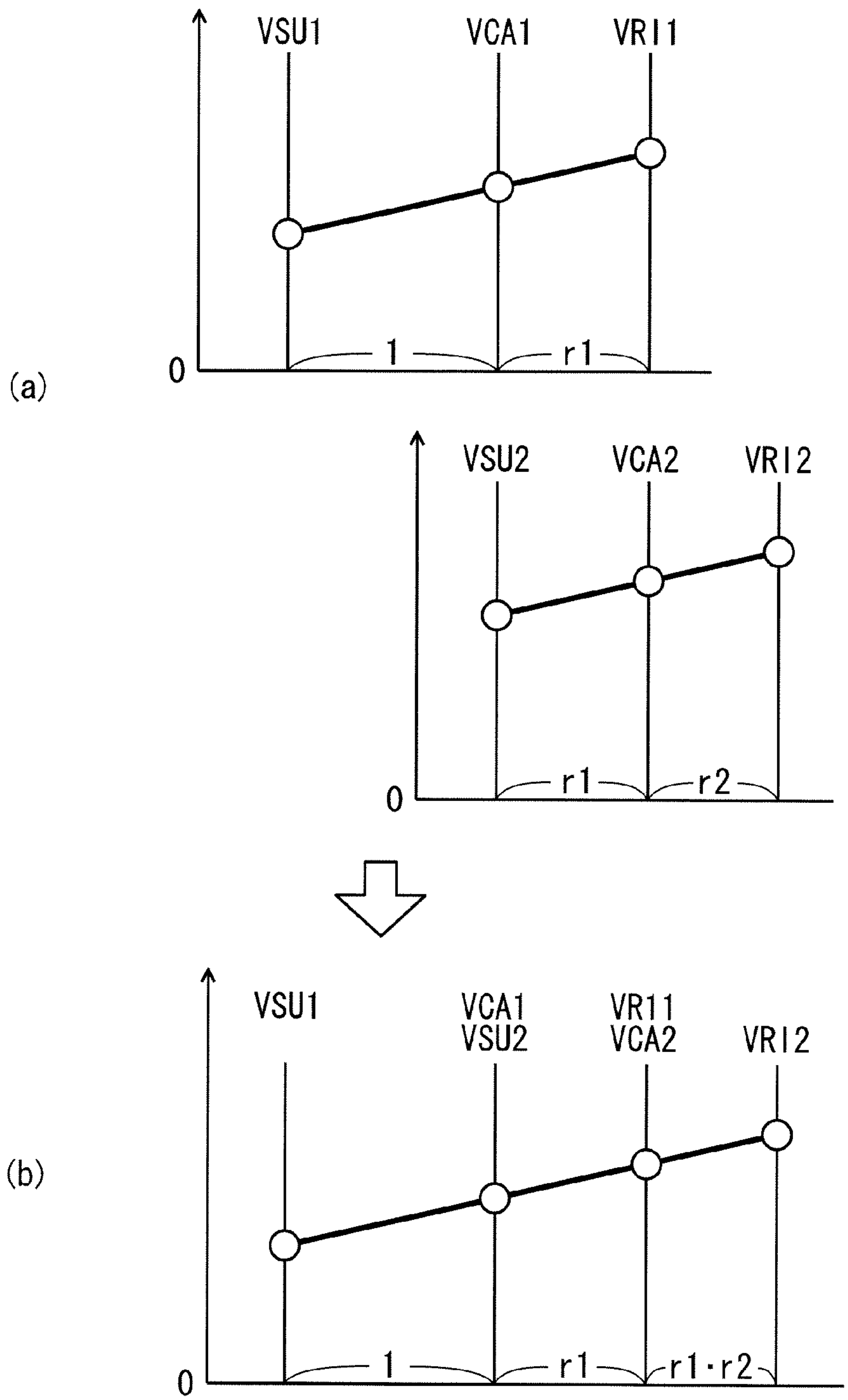
FIG. 96(*a*) is a collinear chart showing an example of the relationship between a first sun gear rotational speed, a first carrier rotational speed, and a first ring gear rotational speed, depicted together with a collinear chart showing an example of the relationship between a second sun gear rotational speed, a second carrier rotational speed, and a second ring gear rotational speed, and FIG. 96(*b*) is a collinear chart showing an example of the relationship between the rotational speeds of four rotary elements formed by connecting the first and second planetary gear units of the power unit shown in FIG. 95.

FIG. 96(*a*) shows a collinear chart showing an example of the relationship between the first sun gear rotational speed VSU1, the first carrier rotational speed VCA1 and the first ring gear rotational speed VRI1, depicted together with a collinear chart showing an example of the relationship between the second sun gear rotational speed VSU2, the second carrier rotational speed VCA2 and the second ring gear rotational speed VRI2. As described above, since the first carrier C1 and the second sun gear S2 are directly connected to each other, the first carrier rotational speed VCA1 and the second sun gear rotational speed VSU2 are equal to each other, and since the first ring gear R1 and the second carrier C2 are directly connected to each other, the first ring gear rotational speed VRI1 and the second carrier rotational speed VCA2 are equal to each other. Therefore, the two collinear charts concerning the first and second planetary gear units PS1 and PS2 shown in FIG. 96(*a*) can be represented by a single collinear chart as shown in FIG. 96(*b*). As shown in the figure, four rotary elements of which rotational speeds are in a collinear relationship with each other are formed by connecting various rotary elements of the first and second planetary gear units PS1 and PS2 described above.

Figure 97:
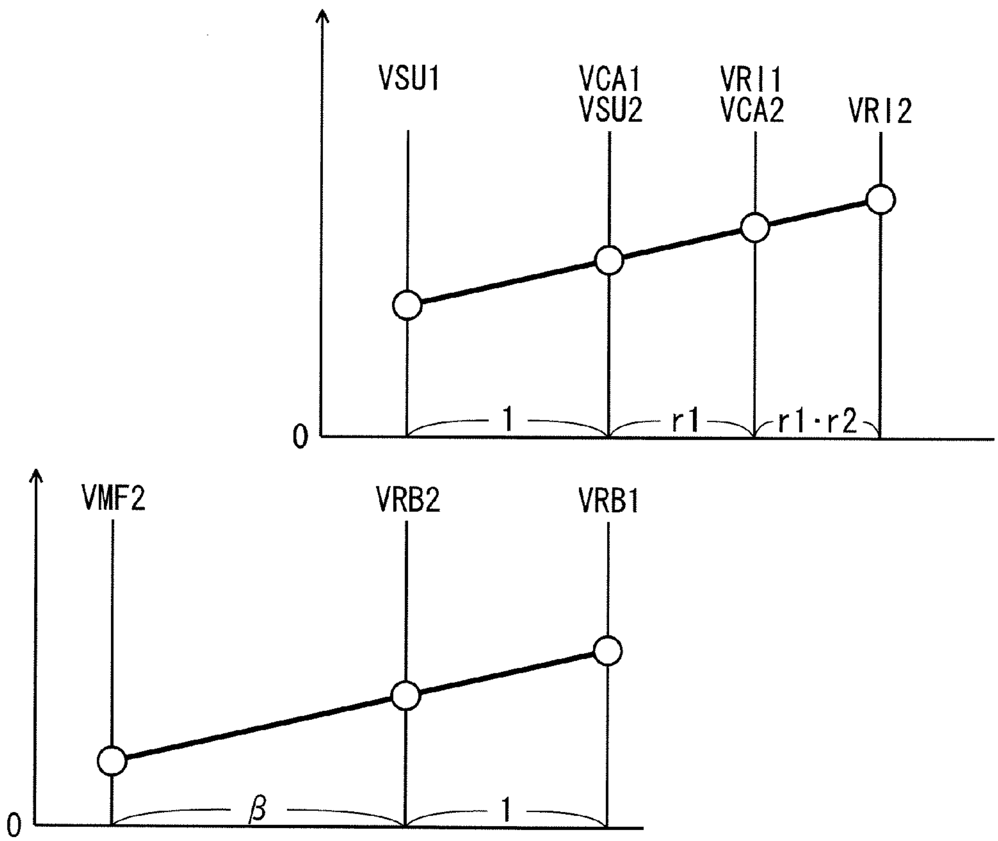
FIG. 97(*a*) is a collinear chart showing an example of the relationship between the rotational speeds of the four rotary elements formed by connecting the first and second planetary gear units of the power unit shown in FIG. 95, depicted together with a collinear chart showing an example of the relationship between the second magnetic field rotational speed and the B1 and B2 rotor rotational speeds, and FIG. 97(*b*) is a collinear chart showing an example of the relationship between the rotational speeds of five rotary elements formed by connecting the second rotating machine and the first and second planetary gear units of the power unit shown in FIG. 95.
Figure 97:
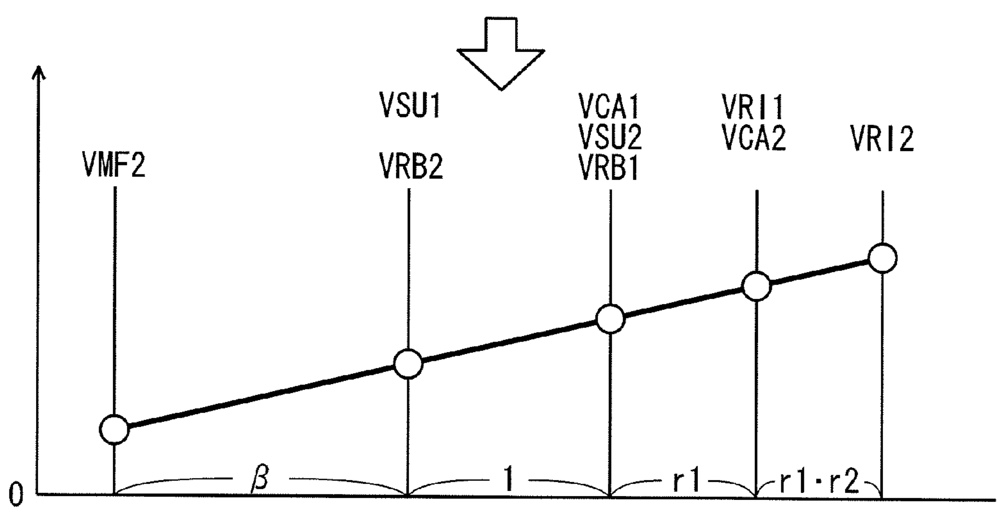

Moreover, FIG. 97(*a*) shows a collinear chart showing an example of the relationship between the rotational speeds of the above-described four rotary elements, depicted together with a collinear chart showing an example of the relationship between the second magnetic field rotational speed VMF2 and the B1 and B2 rotor rotational speeds VRB1 and VRB2. As described above, since the first carrier C1 and the B1 rotor 34 are directly connected to each other, the first carrier rotational speed VCA1 and the B1 rotor rotational speed VRB1 are equal to each other. Moreover, since the first sun gear S1 and the B2 rotor 35 are directly connected to each other, the first sun gear rotational speed VSU1 and the B2 rotor rotational speed VRB2 are equal to each other. Therefore, the two collinear charts shown in FIG. 97(*a*) can be represented by a single collinear chart as shown in FIG. 97(*b*).

Moreover, since the crankshaft 3*a*, the first carrier C1, the B1 rotor 34 and the second sun gear S2 are directly connected to each other, the engine speed NE, the first carrier rotational speed VCA1, the B1 rotor rotational speed VRB1 and the second sun gear rotational speed VSU2 are equal to each other. Furthermore, since the drive wheels DW and DW, the first sun gear S1 and the B2 rotor 35 are connected to each other, assuming that there is no transmission loss caused by the differential gear mechanism 9 or the like, the vehicle speed VP, the first sun gear rotational speed VSU1 and the B2 rotor rotational speed VRB2 are equal to each other.

Moreover, the rotor 103 is directly connected to the second carrier C2 and the second ring gear R2 through the first and second clutches CL1 and CL2, respectively, and hence when the first clutch CL1 is engaged and the second clutch CL2 is disengaged (hereinafter, such an engaged and disengaged state of the clutches will be referred to as the “first speed-changing mode”), the rotor rotational speed VRO and the second carrier rotational speed VCA2 are equal to each other.

Furthermore, when the first clutch CL1 is disengaged and the second clutch CL2 is engaged (hereinafter, such an engaged and disengaged state of the clutches will be referred to as the "second speed-changing mode"), the rotor rotational speed VRO and the second ring gear rotational speed VRI2 are equal to each other.

Figure 98:
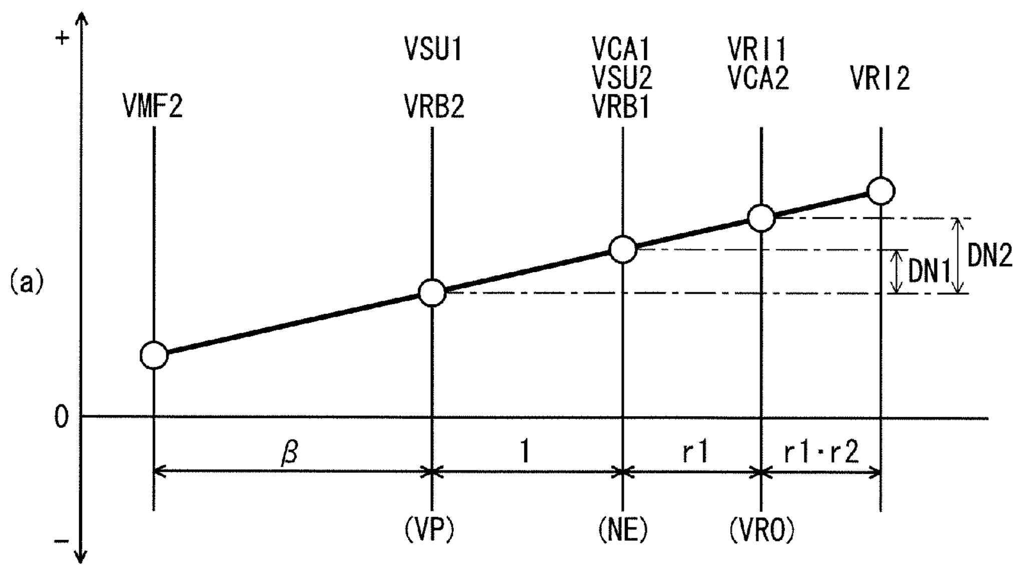
FIGS. 98(*a*) and 98(*b*) are collinear charts showing examples of the relationship between the rotational speeds of various rotary elements of the power unit shown in FIG. 95, during first and second speed-changing modes, respectively.
Figure 98:
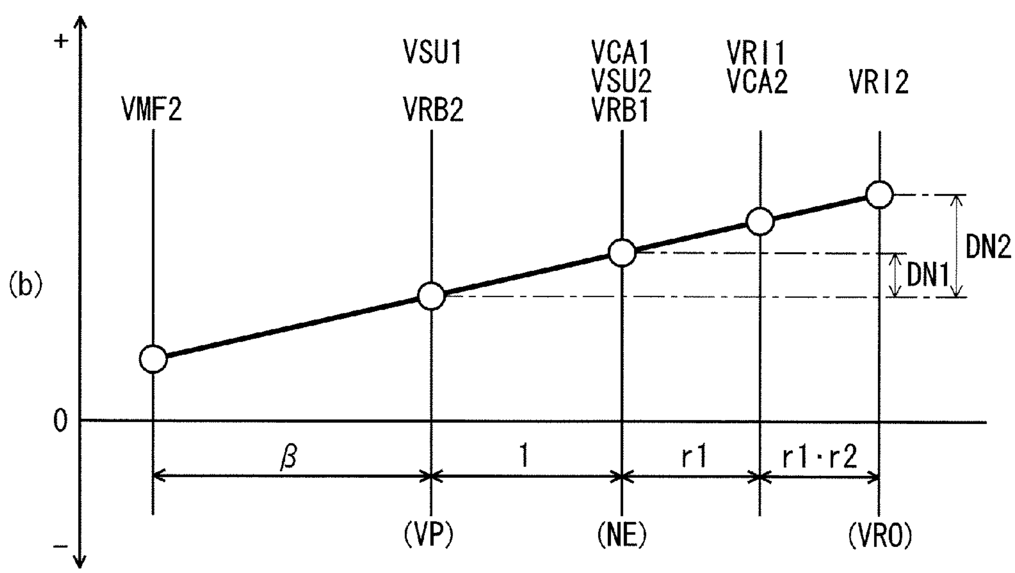

From the above, the rotor rotational speed VRO, the engine speed NE, the vehicle speed VP, and the second magnetic field rotational speed VMF2 are in a collinear relationship as shown, for example, in FIG. 98(*a*) in the first speed-changing mode, whereas in the second speed-changing mode, they are in a collinear relationship as shown, for example, in FIG. 98(*b*).

As shown in FIGS. 98(*a*) and 98(*b*), the distance between the vertical line representing the vehicle speed VP and the vertical line representing the rotor rotational speed VRO in the collinear charts is shorter in the first speed-changing mode than in the second speed-changing mode, and therefore the ratio between the rotational difference DN2 between the rotor rotational speed VRO and the vehicle speed VP and the rotational difference DN1 between the engine speed NE and the vehicle speed VP (hereinafter referred to as the "rotational ratio DN2/DN1) is smaller in the first speed-changing mode.

In the power unit 1S configured as above, in cases where the rotor rotational speed VRO which is determined by the relationship between the engine speed NE and the vehicle speed VP becomes too high, for example, during rapid acceleration of the vehicle in which the engine speed NE is higher than the vehicle speed VP, the first speed-changing mode is used. In this way, according to the present embodiment, as is clear from the relationship of the above-described rotational ratio DN2/DN1, the rotor rotational speed VRO can be made lower than that when the second speed-changing mode is used, so that it is possible to prevent failure of the rotating machine 101 from being caused by the rotor rotational speed VRO becoming too high.

Figure 99:
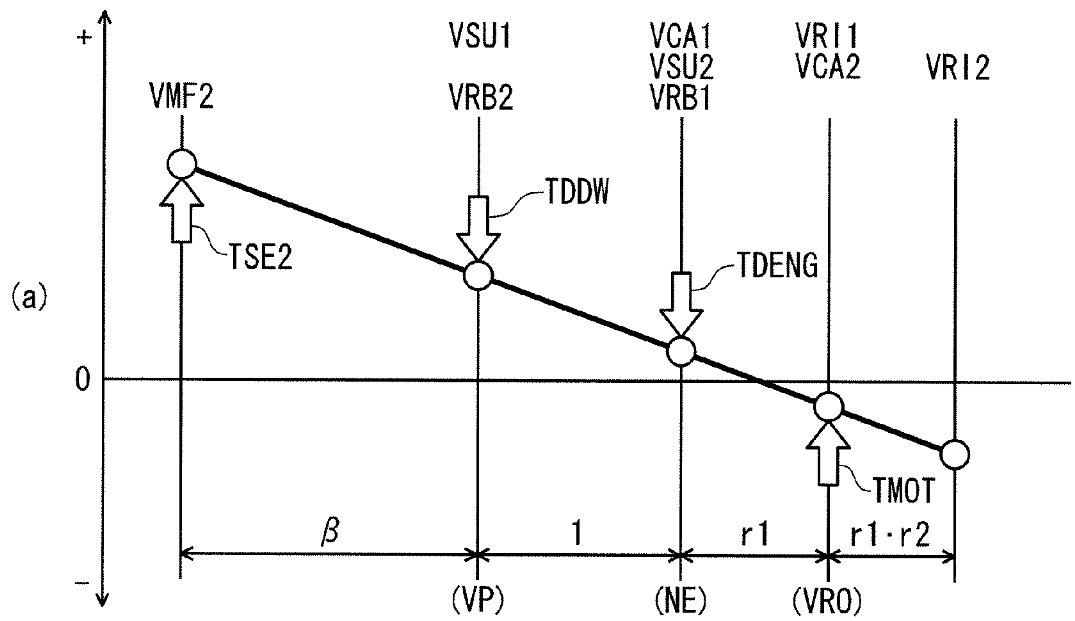
FIGS. 99(*a*) and 99(*b*) are diagrams showing examples of the relationship between the rotational speeds and torques of various rotary elements of the power unit shown in FIG. 95 at the start of ENG start during EV traveling during the first and second speed-changing modes, respectively.
Figure 99:
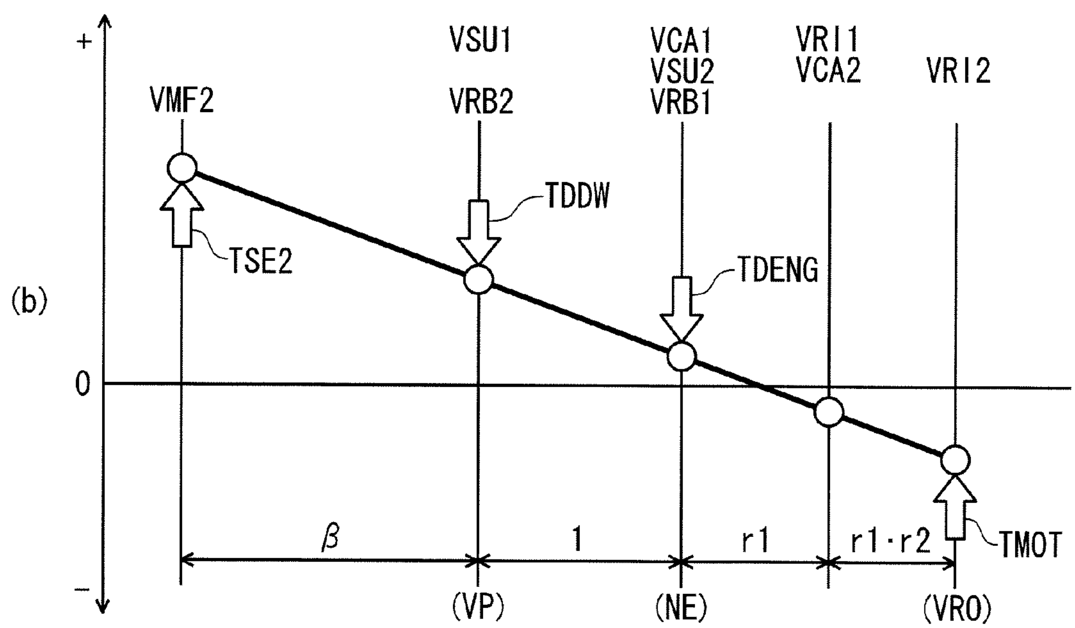

Moreover, the relationship between the rotational speeds and torques of various rotary elements of the power unit 1S at the time of the ENG start during EV traveling, when the torque required of the rotating machine 101 becomes large is represented by FIG. 99(*a*) and FIG. 99(*b*) for the respective cases of use of the first and second speed-changing modes. In this case, when the first speed-changing mode is used, the torque required of the rotating machine 101, that is, the rotating machine torque TMOT is expressed by the above-described equation (66). On the other hand, when the second speed-changing mode is used, the rotating machine torque TMOT is expressed by the following equation (68).

$$TMOT=-\{\beta\cdot TDDW+(1+\beta)TDENG\}/(r1/r2+r1+1+\beta) \quad (68)$$

As is apparent from a comparison between the equations (66) and (68), the rotating machine torque TMOT is smaller in the second speed-changing mode with respect to the drive wheel-transmitted torque TDDW and the engine-transmitted torque TDENG assuming that the respective magnitudes thereof are unchanged. Therefore, the second speed-changing mode is used at the time of the ENG start during EV traveling.

According to the present embodiment, the second speed-changing mode is used as described above, and the electric power generated by the rotating machine 101 is controlled based on the above-described equation (68). Therefore, it is possible to reduce the maximum value of torque required of the rotating machine 101 to thereby further reduce the size and costs of the rotating machine 101.

Moreover, during traveling of the vehicle including the EV traveling and the ENG traveling, a speed-changing mode that will make it possible to obtain higher efficiency of the rotating machine 101 is selected from the first and second speed-changing modes, according the vehicle speed VP during stoppage of the engine 3, and according to the vehicle speed VP and the engine speed NE during operation of the engine 3. In this way, according to the present embodiment, it is possible to control the rotor rotational speed VRO to an appropriate value, and hence it is possible to obtain a high efficiency of the rotating machine 101.

Furthermore, similarly to the thirteenth embodiment, the switching between the first and second speed-changing modes is performed when the second carrier rotational speed VCA2 and the second ring gear rotational speed VRI2 are equal to each other. In this way, according to the present embodiment, it is possible to smoothly switch between the first and second speed-changing modes while maintaining the respective rotations of the drive wheels DW and DW and the engine 3. As a result, it is possible to ensure excellent drivability.

Moreover, during the ENG traveling and at the same time during transition between the first and second speed-changing modes, after both of the first and second clutches CL1 and CL2 are disengaged and until one of the first and second clutches CL1 and CL2 is engaged, the rotor 103 and the crankshaft 3*a* remain disconnected from each other, whereby the engine torque TENG does not act on the rotor 103. Therefore, no electric power is generated by the stator 102 of the rotating machine 101, and the second stator 33 of the second rotating machine 31 is supplied with electric power from the battery 43.

In this way, according to the present embodiment, during transition between the first and second speed-changing modes, even when both of the first and second clutches CL1 and CL2 are disengaged, the second driving equivalent torque TSE2 and the engine torque TENG transmitted to the B1 rotor 34 are combined, and the combined torque is transmitted to the drive wheels DW and DW through the B2 rotor 35. In this way, it is possible to suppress a speed-change shock, which can be caused by interruption of transmission of the engine torque TENG to the drive wheels DW and DW. As a result, it is possible to improve marketability. In addition, according to the present embodiment, it is possible to obtain the same advantageous effects as provided by the fifteenth embodiment.

Moreover, although in the present embodiment, the second sun gear S2 is connected to the first carrier C1, and the second ring gear R2 is connected to the rotor 103 through the second clutch CL2, the above connection relationships may be inverted, that is, the second ring gear R2 may be connected to the first carrier C1 while the second sun gear S2 may be connected to the rotor 103 through the second clutch CL2. Moreover, although in the present embodiment, the first and second clutches CL1 and CL2 are formed by friction multiple disk clutches, they may be formed, for example, by electromagnetic clutches.

Figure 100:
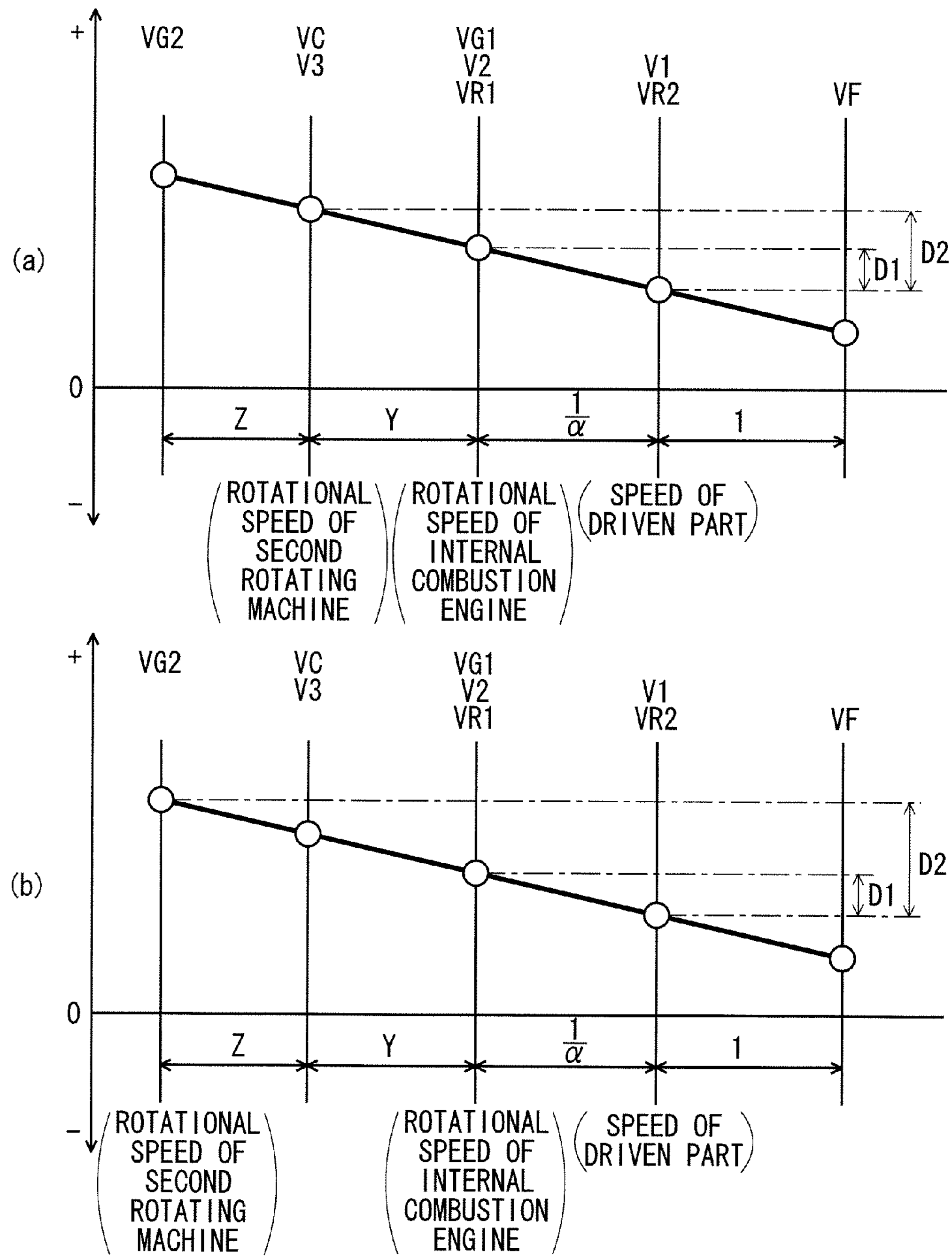
FIGS. 100(*a*) and 100(*b*) are collinear charts showing examples of the relationship between the rotational speeds of various rotary elements of the power unit during the first and second speed-changing modes, respectively.

FIGS. 100(*a*) and 100(*b*) are collinear charts showing examples of the relationship between the rotational speeds of various rotary elements of the power unit 1S during the first and second speed-changing modes, respectively. It should be noted that in FIGS. 100(*a*) and 100(*b*), the rotating machine 101 is referred to as the "first rotating machine," the rotating machine 31 to as the "second rotating machine," the second sun gear S2 to as "one gear" or the "first gear," the second ring gear R2 to as "the other gear" or the "second gear," the second carrier C2 to as the "carrier," the second output portion to as the "first rotating shaft 4," the first clutch to as the "first clutch CL1," the second clutch to as the "first clutch CL2," the engine 3 to as the "heat engine," and the drive wheels DW and DW to as the "driven parts," respectively. Hereinafter, the rotational speed of one gear of the second planetary gear unit PS2 will be referred to as the first gear rotational speed VG1, the rotational speed of the other gear of the second planetary gear unit PS2 to as the second gear rotational speed VG2, and the rotational speed of the carrier of the second planetary gear unit PS2 to as the carrier rotational speed VC. In the above-described connection relationship, when the rotary elements are directly connected to each other, and at the same time the first clutch is engaged to thereby connect the second output portion of the second rotating machine to the carrier while the second clutch is disengaged to thereby disconnect between the second output portion and the other gear, the relationship between the rotational speed of the heat engine, the speed of the driven parts and the like is expressed, for example, as shown in FIG. 100(*a*). Hereinafter, such a first clutch-engaged and second clutch-disengaged state will be referred to as "the first speed-changing mode". Moreover, when the first clutch is disengaged to thereby disconnect between the second output portion of the second rotating machine and the carrier while the second clutch is engaged to thereby connect the second output portion to the other gear, the relationship between the rotational speed of the heat engine, the speed of the driven parts and the like is expressed, for example, as shown in FIG. 100(*b*). Hereinafter, such a first clutch-disengaged and second clutch-engaged state will be referred to as "the second speed-changing mode".

It should be noted that in the collinear chart in FIGS. 100(*a*) and 100(*b*), the ratio between the distance from a vertical line representing the magnetic field rotational speed VF to a vertical line representing the second rotor rotational speed VR2, and the distance from the vertical line representing the second rotor rotational speed VR2 to a vertical line representing the first rotor rotational speed VR1 is 1:(1/α). Furthermore, in FIGS. 100(*a*) and 100(*b*), the distance from a vertical line representing the first gear rotational speed VG1 to a vertical line representing the carrier rotational speed VC is represented by Y, and the distance from the vertical line representing the carrier rotational speed VC to a vertical line representing the second gear rotational speed VG2 is represented by Z.

As is clear from a comparison between FIGS. 100(*a*) and 100(*b*), in the collinear chart, the distance between a vertical line representing the speed of the driven parts and a vertical line representing the rotational speed of the second rotating machine is shorter in the first speed-changing mode than in the second speed-changing mode, and therefore the ratio (D2/D1) between a speed difference D2 between the second output portion of the second rotating machine and the driven parts and a speed difference D1 between the heat engine and the driven parts is smaller in the first speed-changing mode. Moreover, when the rotational speed of the heat engine is higher than the speed of the driven parts, the rotational speed of the second rotating machine becomes higher than the speed of the driven parts, and sometimes becomes too high. Therefore, in such a case, for example, by using the first speed-changing mode, as is clear from the relationship of the above-described ratio between the speed differences D2 and D1, the rotational speed of the second rotating machine can be made smaller than that when the second speed-changing mode is used, and hence it is possible to prevent failure of the second rotating machine from being caused by the rotational speed of the second rotating machine becoming too high.

Figure 101:
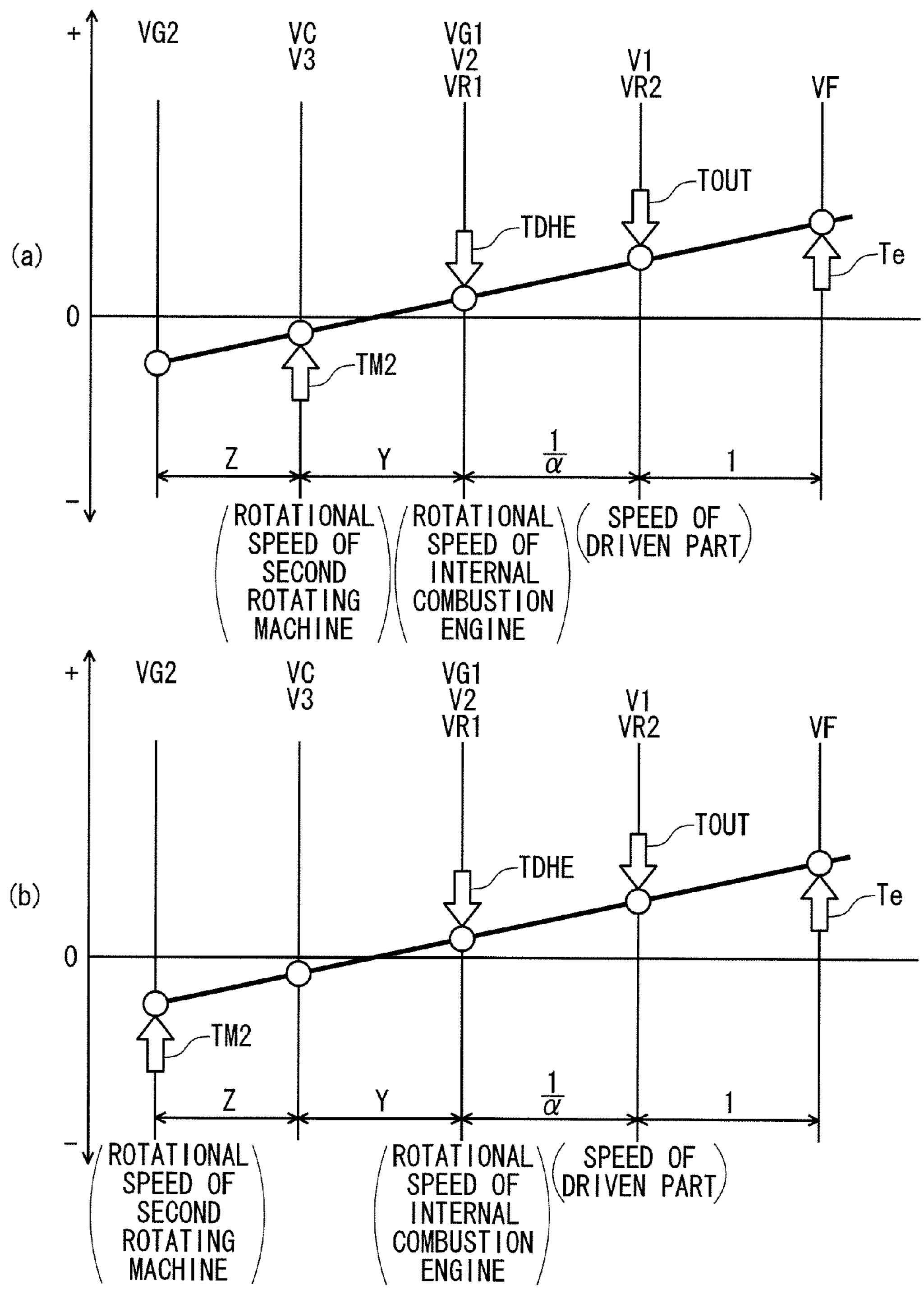
FIGS. 101(*a*) and 101(*b*) are diagrams showing examples of the relationship between the rotational speeds and torques of various rotary elements of the power unit in a case where a heat engine is started during driving of driven parts by the first and second rotating machines during the first and second speed-changing modes, respectively.

Moreover, in such a case where the torque required of the second rotating machine becomes large, as described above with reference to FIG. 65, when the first speed-changing mode is used, the relationship between the driving equivalent torque Te, the heat engine transmitting torque TDHE, the driven part-transmitted torque TOUT, and the second rotating machine torque TM2 is shown, for example, as in FIG. 101 (*a*). Moreover, the torque required of the second rotating machine, that is, the second rotating machine torque TM2 is represented by the following equation (69).

$$TM2=-\{TOUT+[(1/\alpha)+1]TDHE\}/[Y+(1/\alpha)+1] \quad (69)$$

On the other hand, when the second speed-changing mode is used, the relationship between the driving equivalent torque Te, the heat engine transmitting torque TDHE, the driven part-transmitted torque TOUT, and the second rotating machine torque TM2 is shown, for example, as in FIG. 101 (*b*). Moreover, the second rotating machine torque TM2 is represented by the following equation (70).

$$TM2=-\{TOUT+[(1/\alpha)+1]TDHE\}/[Z+Y+(1/\alpha)+1] \quad (70)$$

As is clear from a comparison between the above-described equations (69) and (70), the second rotating machine torque TM2 is smaller in the second speed-changing mode with respect to the heat engine transmitting torque TDHE and the driven part-transmitted torque TOUT assuming that the respective magnitudes thereof are unchanged. Therefore, for example, in such a case as the torque required of the second rotating machine becomes large, as described above, by using the second speed-changing mode, it is possible to reduce the second rotating machine torque TM2, which in turn makes it possible to further reduce the size and costs of the second rotating machine.

Moreover, for example, by selecting the first or second speed-changing mode according to the rotational speed of the heat engine and the speed of the driven parts, it is possible to control the rotational speed of the second rotating machine to an appropriate speed. As a result, it is possible to obtain high efficiency of the second rotating machine. Furthermore, similarly to the case of claim 15, by performing switching between the first and second speed-changing modes when the carrier rotational speed VC and the second gear rotational speed VG2 are equal to each other, it is possible to smoothly perform the switching while maintaining the respective rotations of the driven parts and the heat engine. As a result, it is possible to ensure excellent drivability.

Moreover, similarly to the case of claim 16, during the transmission of the motive power from the heat engine to the driven parts, described above with reference to FIG. 63, the torque THE of the heat engine transmitted to the second element is transmitted to the driven parts through the first element by using load torque acting on the third element along with electric power generation by the second rotating machine, as a reaction force. Therefore, during switching between the first and second speed-changing modes, if both the first and second clutches are disengaged, the third element and the second rotating machine are disconnected from each other, whereby the load torque from the second rotating machine ceases to act on the third element. As a consequence, the torque THE of the heat engine transmitted through the second and first elements becomes very small. According to the present invention, the second rotor can be connected to the driven parts without passing through the gear-type stepped transmission, for example, whereby even if both the first and second clutches are disengaged, as is apparent from FIG. 63, part of the torque THE of the heat engine can be transmitted to the driven parts through the first and second rotors. In this way, it is possible to suppress a speed-change shock, such as a sudden decrease in torque, and therefore it is possible to enhance marketability.

Twenty-First Embodiment

Next, a power unit 1T according to a twenty-first embodiment will be described with reference to FIG. 102. This power unit 1T is distinguished from the fifteenth embodiment mainly in that it further includes a transmission 201. In the following description, different points from the fifteenth embodiment will be mainly described.

Figure 102:
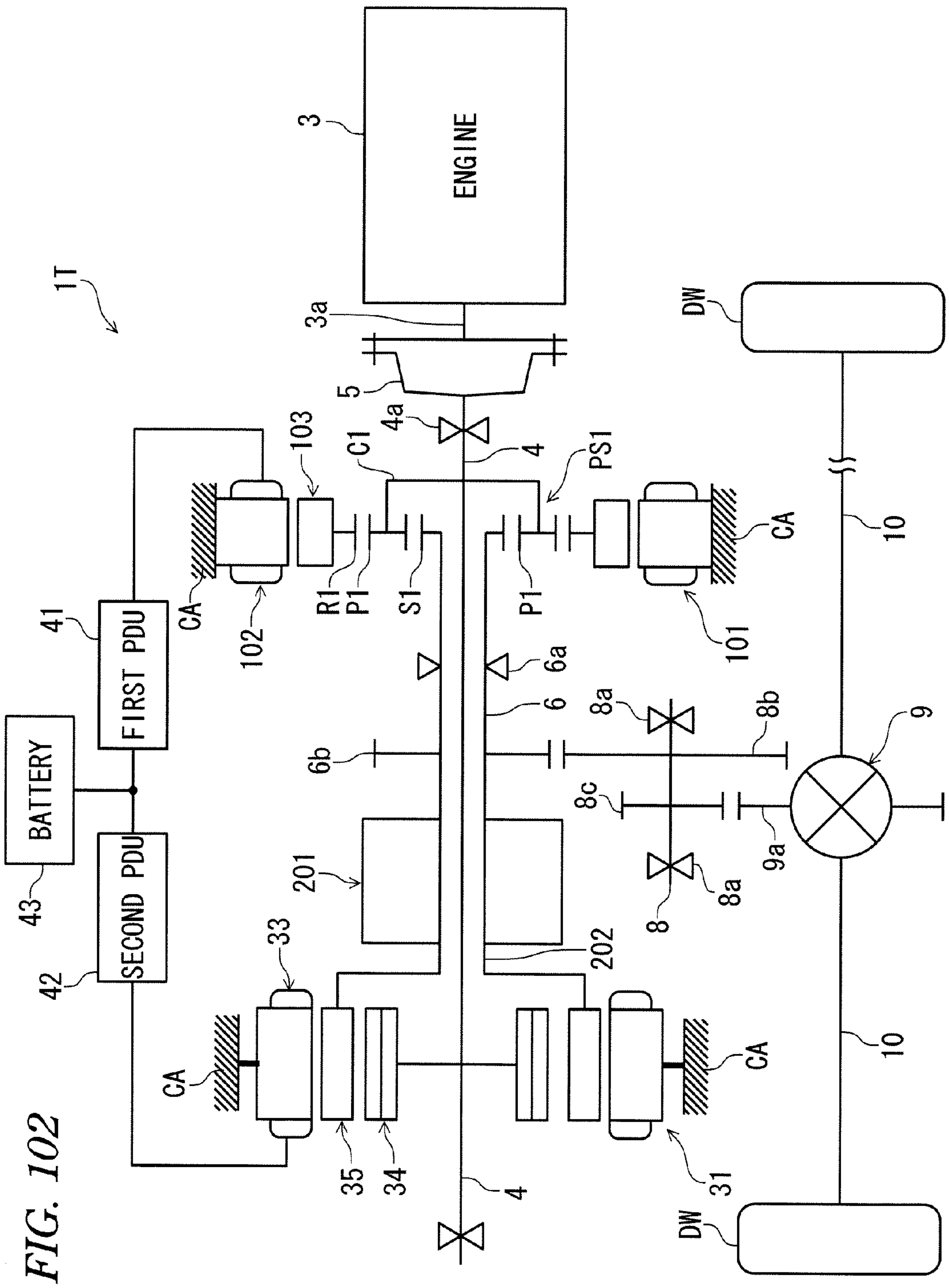
FIG. 102 is a diagram schematically showing a power unit according to a twenty-first embodiment.

As shown in FIG. 102, similarly to the eighteenth to twentieth embodiments, this power unit 1T is not provided with the second rotating shaft 7, and the first gear 8*b* is in mesh with the gear 6*b* integrally formed with the connection shaft 6. In this way, the first sun gear S1 is mechanically connected to the drive wheels DW and DW through the connection shaft 6, the gear 6*b*, the first gear 8*b*, the differential gear mechanism 9, and the like, without passing through the above-described transmission 201.

Moreover, the transmission 201 is a gear-type stepped transmission which is configured similarly to the transmission 131 according to the tenth embodiment and has speed positions of the first to third speeds. The transmission 201 includes an input shaft 202 directly connected to the B2 rotor 35, and an output shaft (not shown) directly connected to the connection shaft 6, and transmits motive power input to the input shaft 202 to the output shaft while changing the speed of the motive power. Furthermore, the ECU 2 controls a change between the speed positions of the transmission 201.

As described above, the B2 rotor 35 is connected to the drive wheels DW and DW through the transmission 201, the connection shaft 6, the gear 6*b*, the first gear 8*b*, and the like. Motive power transmitted to the B2 rotor 35 is transmitted to the drive wheels DW and DW while having the speed thereof changed by the transmission 201.

In the power unit 1T configured as above, in cases where a very large torque is transmitted from the B2 rotor 35 to the drive wheels DW and DW, for example, during the EV start and the ENG-based start, the speed position of the transmission 201 is controlled to the first speed (transmission ratio>1.0). In this way, the B2 rotor-transmitted torque TRB2 transmitted to the B2 rotor 35 is increased by the transmission 201, and is then transmitted to the drive wheels DW and DW. In accordance with this, electric power supplied to the stator 33 of the second rotating machine 31 is controlled such that the B2 rotor-transmitted torque TRB2 becomes smaller. As a consequence, according to the present embodiment, it is possible to reduce the maximum value of torque required of the second rotating machine 31. As a result, it is possible to further reduce the size and costs of the second rotating machine 31.

Moreover, in cases where the B2 rotor rotational speed VRB2 becomes too high, for example, during the high-vehicle speed operation in which the vehicle speed VP is very high, the speed position of the transmission 201 is controlled to the third speed (transmission ratio<1.0). In this way, according to the present embodiment, since the B2 rotor rotational speed VRB2 can be lowered with respect to the vehicle speed VP, it is possible to prevent failure of the second rotating machine 31 from being caused by the B2 rotor rotational speed VRB2 becoming too high.

Furthermore, during traveling of the vehicle including the EV traveling and the ENG traveling, the speed position of the transmission 201 is controlled such that the second magnetic field rotational speed VMF2 becomes equal to a predetermined target value. This target value is calculated by searching a map according to the vehicle speed VP when only the rotating machine 101 and the second rotating machine 31 are used as motive power sources, whereas when the engine 3, the rotating machine 101 and the second rotating machine 31 are used as motive power sources, the target value is calculated by searching a map other than the above-described map according to the engine speed NE and the vehicle speed VP. Moreover, in these maps, the target value is set to such a value that will make it possible to obtain high efficiency of the second rotating machine 31 with respect to the vehicle speed VP (and the engine speed NE) assumed at the time. Furthermore, in parallel with the above-described control of the transmission 201, the second magnetic field rotational speed VMF2 is controlled to the above-described target value. In this way, according to the present embodiment, during traveling of the vehicle, it is possible to obtain the high efficiency of the second rotating machine 31.

Moreover, during the ENG traveling, and at the same time during the speed-changing operation of the transmission 201 (after the input shaft 202 and output shaft of the transmission 201 are disconnected from a gear train selected before a speed change and until the input shaft 202 and the output shaft are connected to a gear train selected for the speed change), that is, when the B2 rotor 35 and the drive wheels DW and DW are disconnected from each other by the transmission 201, as described in the fifteenth embodiment, part of the engine torque TENG is transmitted to the drive wheels DW and DW through the first sun gear S1. In this way, according to the present embodiment, during the speed-changing operation of the transmission 201, it is possible to suppress a speed-change shock, which can be caused by interruption of transmission of the engine torque TENG to the drive wheels DW and DW. In this way, it is possible to improve marketability.

Furthermore, similarly to the fifteenth embodiment, by using the rotating machine 101, the first planetary gear unit PS1 and the second rotating machine 31, it is possible to transmit the engine motive power to the drive wheels DW and DW while steplessly changing the speed thereof, so that it is possible to reduce the frequency of the speed-changing operation of the transmission 201. In this way, it is possible to enhance the driving efficiency of the power unit 1T. In addition, according to the present embodiment, it is possible to obtain the same advantageous effects as provided by the fifteenth embodiment.

It should be noted that although in the present embodiment, the transmission 201 is a gear-type stepped transmission, it is to be understood that a belt-type, toroidal-type or hydraulic-type stepless transmission may be employed.

Twenty-Second Embodiment

Figure 103:
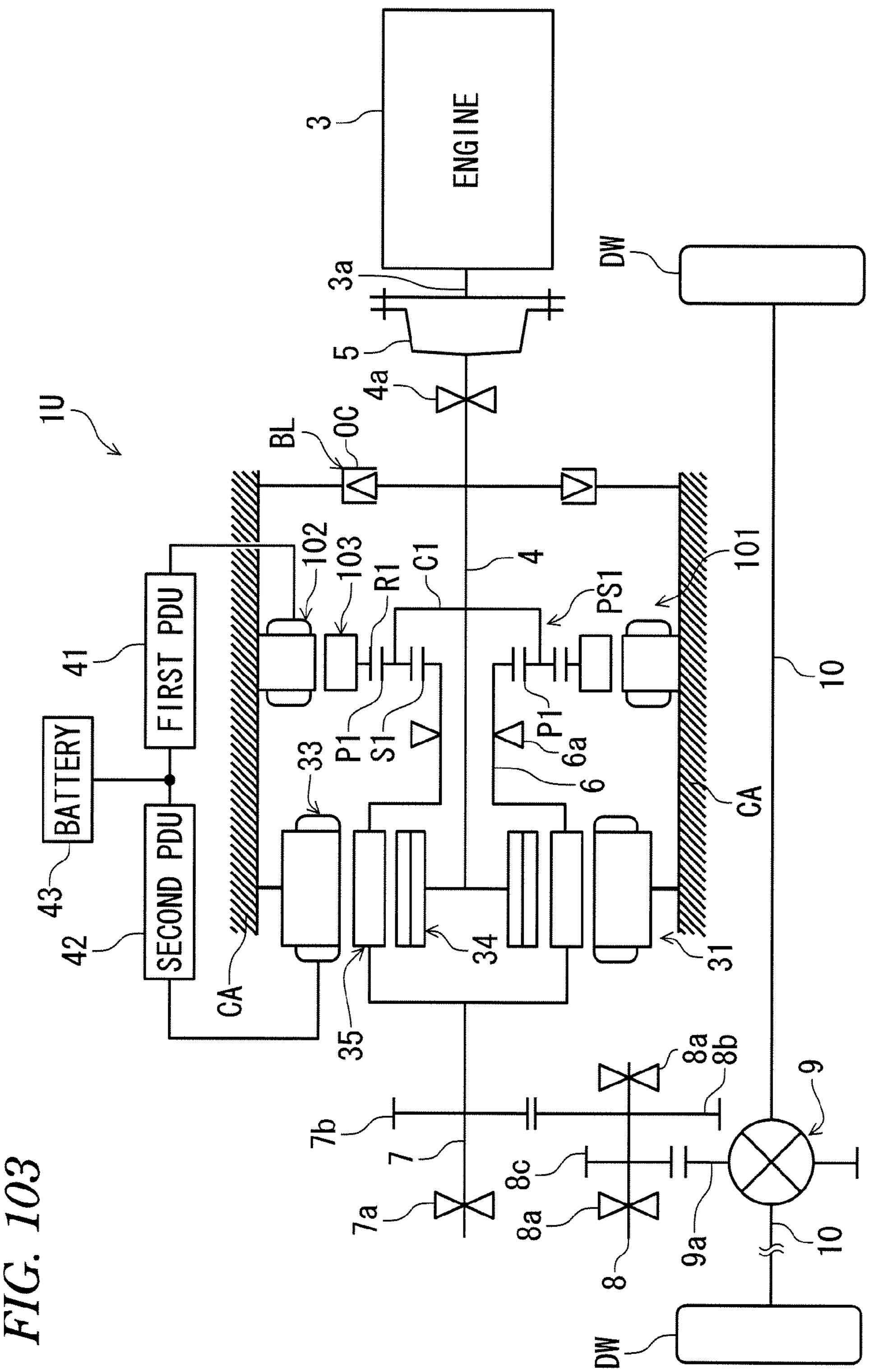
FIG. 103 is a diagram schematically showing a power unit according to a twenty-second embodiment.

Next, a power unit 1U according to a twenty-second embodiment will be described with reference to FIG. 103. As shown in the figure, this power unit 1U is configured by adding the brake mechanism BL described in the sixth embodiment to the power unit 1N according to the fifteenth embodiment. In the following description, different points from the fifteenth embodiment will be mainly described.

In the power unit 1U, the brake mechanism BL permits the first rotating shaft 4 to rotate only when it performs normal rotation together with the crankshaft 3*a*, the first carrier C1, and the B1 rotor 34, but blocks rotation of the first rotating shaft 4 when it performs reverse rotation together with the crankshaft 3*a* and the like.

Moreover, the power unit 1U performs the operations by the above-described EV creep and EV start in the following manner. The power unit 1U supplies electric power to the stator 102 of the rotating machine 101 to cause the rotor 103 to perform reverse rotation together with the first ring gear R1, and supplies electric power to the stator 33 of the second rotating machine 31 to cause the second rotating magnetic field generated by the stator 33 along with the supply of the electric power to perform normal rotation. Moreover, the power unit 1U controls the rotor rotational speed VRO and the second magnetic field rotational speed VMF2 such that $(\beta+1)\cdot|VRO|=r1\cdot|VMF2|$ holds. Furthermore, the electric power supplied to the stators 102 and 33 is controlled such that sufficient torque is transmitted to the drive wheels DW and DW.

While the first ring gear R1 performs reverse rotation together with the rotor 103, as described above, the reverse rotation of the first carrier C1 is blocked by the brake mechanism BL, as described above, so that all the motive power from the rotating machine 101 is transmitted to the first sun gear S1 through the first ring gear R1 and the first planetary gears P1, thereby acting on the first sun gear S1 to cause the first sun gear S1 to perform normal rotation. Moreover, while the second rotating magnetic field generated by the stator 33 performs normal rotation, as described above, the reverse rotation of the B1 rotor 34 is blocked by the brake mechanism BL, so that all the electric power supplied to the stator 33 is transmitted to the B2 rotor 35 as motive power, thereby acting on the B2 rotor 35 to cause the B2 rotor 35 to perform normal rotation. Furthermore, the motive power transmitted to the first sun gear S1 and the B2 rotor 35 is transmitted to the drive wheels DW and DW, and causes the drive wheels DW and DW to perform normal rotation.

Moreover, in this case, on the first carrier C1 and the B1 rotor 34, which are blocked from performing reverse rotation by the brake mechanism BL, torques act from the rotor 103 and the stator 33 through the above-described control of the rotating machine 101 and the second rotating machine 31 such that the torques cause the first carrier C1 and the B1 rotor 34 to perform reverse rotation, respectively, whereby the crankshaft 3*a*, the first carrier C1 and the B1 rotor 34 are not only blocked from performing reverse rotation but also held stationary.

As described above, according to the present embodiment, it is possible to drive the drive wheels DW and DW by the rotating machine 101 and the second rotating machine 31 without using the engine motive power. Moreover, during driving of the drive wheels DW and DW, the crankshaft 3*a* is not only prevented from reverse rotation but also held stationary, and hence the crankshaft 3*a* does not drag the engine 3. In addition, it is possible to obtain the same advantageous effects as provided by the fifteenth embodiment.

It should be noted that although in the above-described fifteenth to twenty-second embodiments, similarly to the first embodiment, the second pole pair number ratio β of the second rotating machine 31 is set to 2.0, if the second pole pair number ratio β is set to less than 1.0, as is apparent from FIGS. 33(*a*) and 33(*b*) and FIG. 89, it is possible to prevent the driving efficiency from being lowered by occurrence of loss caused by the second magnetic field rotational speed VMF2 becoming too high. Moreover, although in the fifteenth to twenty-second embodiments, the first planetary gear ratio r1 of the first planetary gear unit PS1 is set to a relatively large value, by setting the first planetary gear ratio r1 to a smaller value, it is possible to obtain the following advantageous effects.

As is apparent from FIG. 89, when the first planetary gear ratio r1 is set to a relatively large value, if the engine speed NE is higher than the vehicle speed VP (see the two-dot chain lines in FIG. 89), the rotor rotational speed VRO becomes higher than the engine speed NE, and sometimes becomes too high. In contrast, if the first planetary gear ratio r1 is set to a smaller value, as is apparent from a comparison between the broken lines and two-dot chain lines in the collinear chart in FIG. 89, the rotor rotational speed VRO can be reduced, and hence it is possible to prevent the driving efficiency from being lowered by occurrence of loss caused by the rotor rotational speed VRO becoming too high.

Moreover, although in the fifteenth to twenty-second embodiments, the first carrier C1 and the B1 rotor 34 are directly connected to each other, and the first sun gear S1 and the B2 rotor 35 are directly connected to each other, the first carrier C1 and the B1 rotor 34 are not necessarily required to be directly connected to each other insofar as they are connected to the crankshaft 3*a*. Moreover, the first sun gear S1 and the B2 rotor 35 are not necessarily required to be directly connected to each other insofar as they are connected to the drive wheels DW and DW. In this case, each of the transmissions 161 and 171 of the sixteenth and seventeenth embodiments may be formed by two transmissions, which may be arranged in the following manner. One of the two transmissions forming the transmission 161 may be disposed between the first sun gear S1 and the drive wheels DW and DW while the other thereof may be disposed between the B2 rotor 35 and the drive wheels DW and DW. Moreover, one of the two transmissions forming the transmission 171 may be disposed between the first carrier C1 and the crankshaft 3*a* while the other thereof may be disposed between the B1 rotor 34 and the crankshaft 3*a*.

Moreover, although in the fifteenth to twenty-second embodiments, the first sun gear S1 and the first ring gear R1 are connected to the drive wheels DW and DW and the rotating machine 101, respectively, the above connection relationship may be inverted, that is, the first ring gear R1 and the first sun gear S1 may be connected to the drive wheels DW and DW and the rotating machine 101, respectively. In this case, at the time of the ENG start during EV traveling in which the torque required of the rotating machine 101 becomes particularly large, the rotating machine torque TMOT is expressed by the following equation (71).

$$TMOT=-\{\beta\cdot TDDW+(1+\beta)TDENG\}/(r1'+1+\beta) \quad (71)$$

In this equation (71), r1' represents the ratio between the number of the gear teeth of the first ring gear and that of the gear teeth of the first sun gear S1 (the number of the gear teeth of the first ring gear/the number of the gear teeth of the first sun gear S1), as described above, and is larger than 1.0. As is clear from this configuration, the fact that the first planetary gear ratio r1 represents the number of the gear teeth of the first sun gear S1/the number of the gear teeth of the first ring gear, as described above, and is smaller than 1.0, and the above-described equations (66) and (71), the rotating machine torque TMOT can be reduced. As a result, it is possible to further reduce the size and costs of the rotating machine 101.

Moreover, although in the seventh to twenty-second embodiments, the first planetary gear unit PS1 is used as the differential gear, any other suitable device may be employed insofar as it has the following functions. It has three elements, and has the function of distributing motive power input to one of the three elements to the other two elements, and the function of combining the motive power input to the other two elements, and then outputting the combined motive power to the above one element, the three elements rotating while maintaining a linear speed relationship therebetween during distribution and combination of the motive power. For example, such a device may be employed that has a plurality of rollers for transmitting motive power by friction between surfaces in place of the gears of the planetary gear unit, and has the functions equivalent to the planetary gear unit. Furthermore, although detailed description thereof is not provided, such a device as is disclosed in Japanese Patent Publication No. 2008-39045, may be employed which is formed by a combination of a plurality of magnets and soft magnetic material elements. Moreover, a double pinion type planetary gear unit may be used as the differential gear. This also similarly applies to the second planetary gear unit PS2.

Moreover, although in the seventh to twenty-second embodiments, the rotating machine 101 as the second rotating machine is a DC motor, any other suitable device, such as an AC motor, may be employed insofar as it has the function of converting supplied electric power to motive power, and the function of converting input motive power to electric power. Moreover, it is to be understood that in the seventh to thirteenth embodiments and the fifteenth to twenty-first embodiments, the brake mechanism BL for blocking the reverse rotation of the crankshaft 3*a* may be provided. Moreover, although the brake mechanism BL is formed by the one-way clutch OC and the casing CA, the brake mechanism BL may be formed by another suitable mechanism, such as a hand brake, insofar as it is capable of blocking the reverse rotation of the crankshaft 3*a*.

It should be noted that the present invention is not limited to the embodiments described above, but can be practiced in various forms. For example, the ECU 2 and the first and second PDUs 41 and 42 may be capable of controlling electric power generation by the stators 23, 33, and 102, and electric power supplied thereto. For example, the ECU 2 and the first and second PDUs 41 and 42 may be formed by electric circuits having microcomputers installed thereon. Moreover, the battery 43 may be a capacitor, for example. Furthermore, the battery 43 may not be provided, depending on its necessity.

Moreover, in the above-described embodiments, there are arranged four first stator magnetic poles, eight first magnetic poles, and six cores 25*a*. That is, in the above-described embodiments, the ratio between the number of the first stator magnetic poles, the number of the first magnetic poles, and the number of the first soft magnetic material elements is 1:2:1.5, by way of example. However, respective desired numbers of the first stator magnetic poles, the first magnetic poles and the cores 25*a* can be employed, insofar as the ratio therebetween satisfies 1:m:(1+m)/2 (m≠1.0). This also similarly applies to the second rotating machine 31. Moreover, although in the above-described embodiments, the cores 25*a* and 35*a* are formed by steel plates, they may be formed by other soft magnetic materials.

Moreover, although in the above-described embodiments, the stator 23 and the A1 rotor 24 are arranged at an outer location and an inner location in the radial direction, respectively, contrary to this, they may be arranged at an inner location and an outer location in the radial direction, respectively. Moreover, although in the above-described embodiments, the first rotating machine 21 is configured as a so-called radial type by arranging the stator 23 and the A1 and A2 rotors 24 and 25 in the radial direction, the first rotating machine 21 may be configured as a so-called axial type by arranging the stator 23 and the A1 and A2 rotors 24 and 25 in the axial direction. This also similarly applies to the second rotating machine 31.

Moreover, although in the above-described embodiments, one magnetic pole is formed by a magnetic pole of a single permanent magnet 24*a*, it may be formed by magnetic poles of a plurality of permanent magnets. For example, if one magnetic pole is formed by arranging two permanent magnets in an inverted-V shape such that the magnetic poles thereof become closer to each other toward the stator 23, it is possible to improve the directivity of the above-described magnetic force line ML. Moreover, electromagnets or stators that can generate a moving magnetic field may be used in place of the permanent magnets 24*a* used in the above-described embodiments. Moreover, although in the above-described embodiments, the U-phase to W-phase coils 23*c* to 23*e* are wound in the slots 23*b* by distributed winding, this is not limitative, but they may be wound by concentrated winding. Moreover, although in the above-described embodiments, the coils 23*c* to 23*e* are formed by three-phase coils of U-phase to W-phase, the number of phases of the coils can be set as desired insofar as the coils can generate the first rotating magnetic field. Moreover, it can be understood that a desired number of slots, other than that used in the above-described embodiments may be employed as the number of the slots 23*b*. Moreover, although in the above-described embodiments, the slots 23*b*, the permanent magnets 24*a*, and the cores 25*a* are arranged at equal intervals, they may be arranged at unequal intervals. The above also similarly applies to the second rotating machine 31.

Moreover, although in the above-described embodiments, the engine 3 as a heat engine is a gasoline engine, any other suitable engine, such as a diesel engine or an external combustion engine, may be used. Furthermore, although in the above-described embodiments, the power unit is applied to a vehicle, by way of example, this is not limitative, but for example, it can be applied to, for example, a boat and an aircraft. It is to be further understood that various changes and modifications may be made without departing from the spirit and scope of the present invention.

<1-Common Line 3-Element>

Hereafter, a power unit having a 1-common line 3-element structure according to the present invention will be described with reference to the drawings. It should be noted that in the following description, the left side and the right side as viewed in FIGS. 104 to 106 will be referred to as "left" and "right".

Twenty-Third Embodiment

Figure 104:
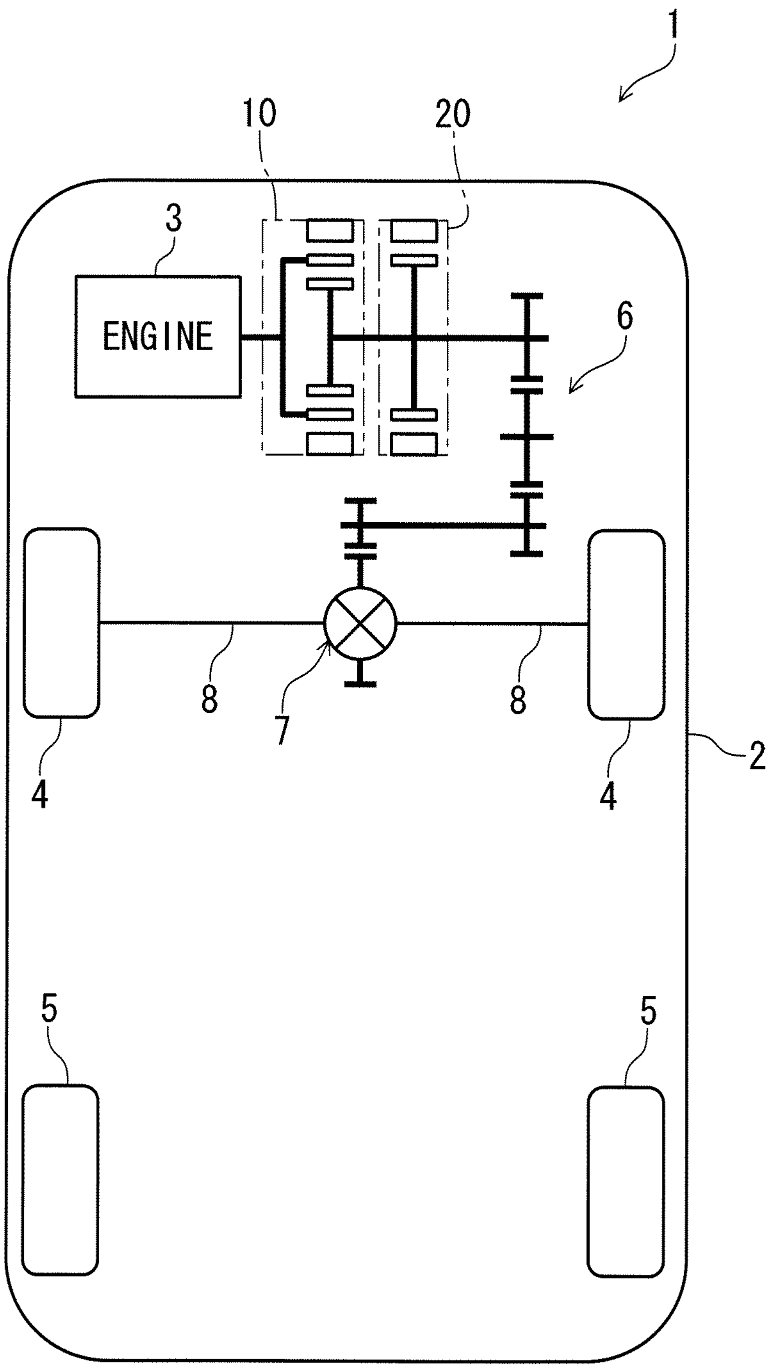
FIG. 104 is a diagram showing the general arrangement of a power unit according to a twenty-third embodiment and a hybrid vehicle to which the power unit is applied.
Figure 105:
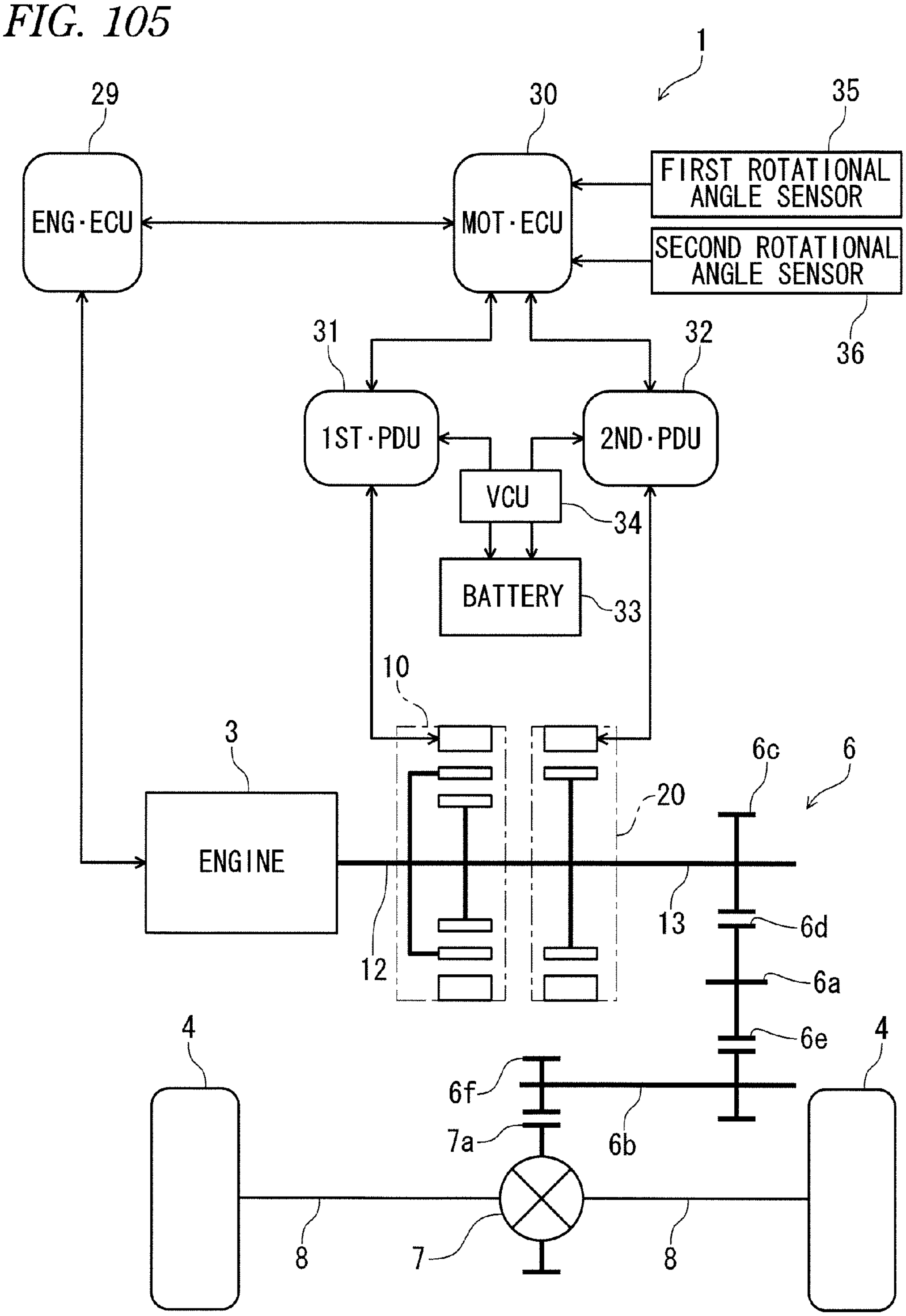
FIG. 105 is a diagram showing the general arrangement of the power unit according to the twenty-third embodiment.

As shown in FIGS. 104 and 105, the power unit 1 according to the twenty-third embodiment is for driving left and right front wheels 4 and 4 of a hybrid vehicle (hereinafter referred to as "the vehicle") 2, and includes an engine 3, a first rotating machine 10, and a second rotating machine 20, as motive power sources.

In the vehicle 2, the engine 3 is connected to the first rotating machine 10, and the first rotating machine 10 and the second rotating machine 20 are connected to the left and right front wheels 4 and 4 by a gear mechanism 6, a differential gear mechanism 7, and left and right drive shafts 8 and 8. Thus, as described later, the motive power of the engine 3, and the motive powers of the first rotating machine 10 and the second rotating machine 20 are transmitted to the front wheels 4 and 4. Moreover, the vehicle 2 includes left and right rear wheels 5 and 5, which are idler wheels. It should be noted that in the present embodiment, the engine 3 corresponds to a heat engine, and the front wheels 4 correspond to a driven part, respectively.

The engine 3 is a multi-cylinder internal combustion engine powered by gasoline, and the operating conditions thereof are controlled by an ENG-ECU 29 described later. The two rotating machines 10 and 20 and the gear mechanism 6 are all housed in a drive system housing (not shown) fixed to a cylinder block (not shown) of the engine 3.

The gear mechanism 6 includes first and second gear shafts 6*a* and 6*b* parallel to an output shaft 13, described later, of the first rotating machine 10, the output shaft 13, and four gears 6*c* to 6*f* arranged on the two gear shafts 6*a* and 6*b*. The gear 6*c* is concentrically fixed to a right end of the output shaft 13, and is in constant mesh with the gear 6*d*. The gear 6*d* is concentrically and rotatably fitted on the first gear shaft 6*a*, and is in constant mesh not only with the above gear 6*c* but also with the gear 6*e* concentrically fixed to a right end of the second gear shaft 6*b*.

Moreover, the gear 6*f* is concentrically fixed to a left end of the second gear shaft 6*b*, and is in constant mesh with a gear 7*a* of the differential gear mechanism 7. With the above arrangement, the rotation of the output shaft 13 is transmitted to the differential gear mechanism 7 through the gear mechanism 6.

Figure 106:
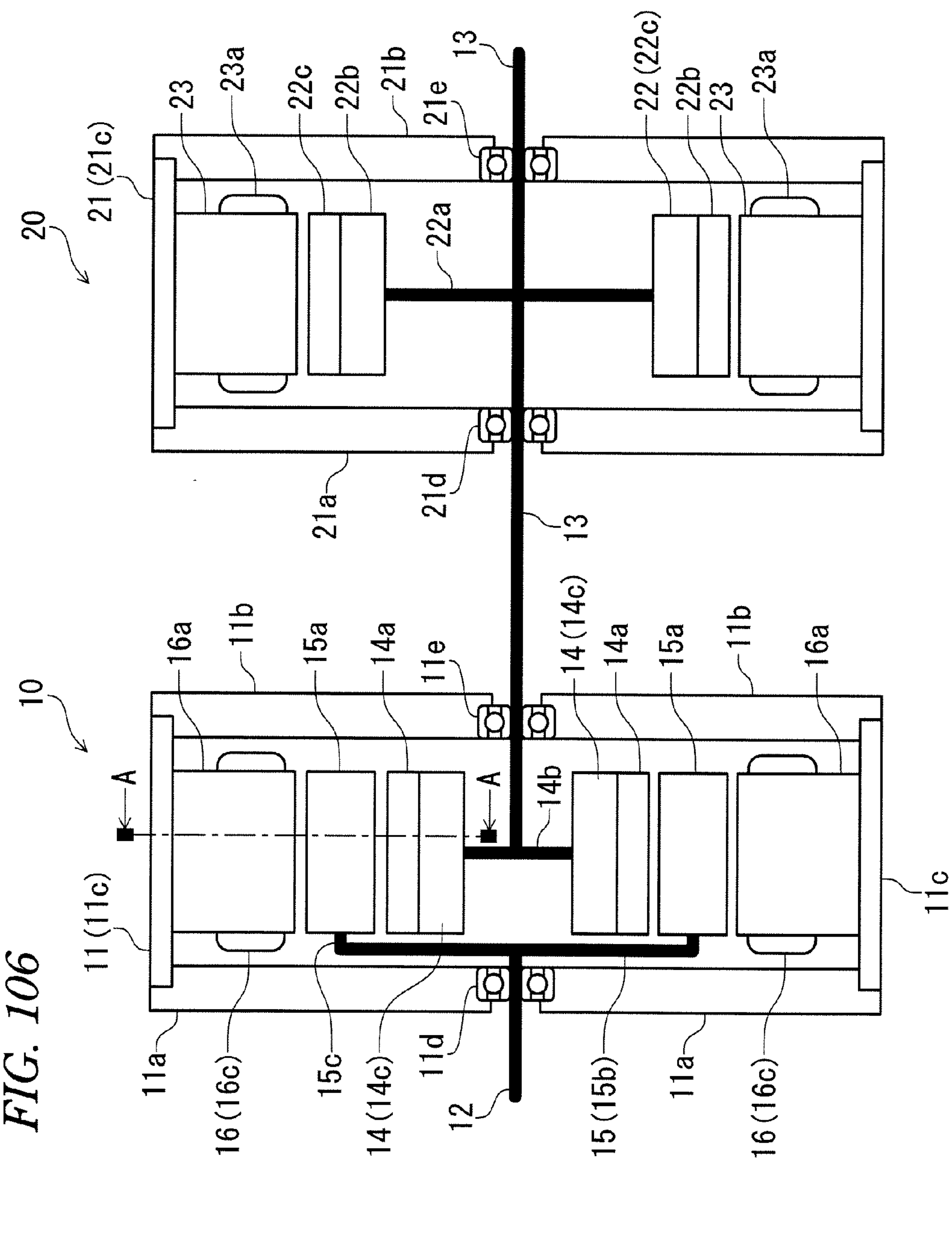
FIG. 106 is a cross-sectional view schematically showing the general arrangement of a first rotating machine and a second rotating machine.
Figure 107:
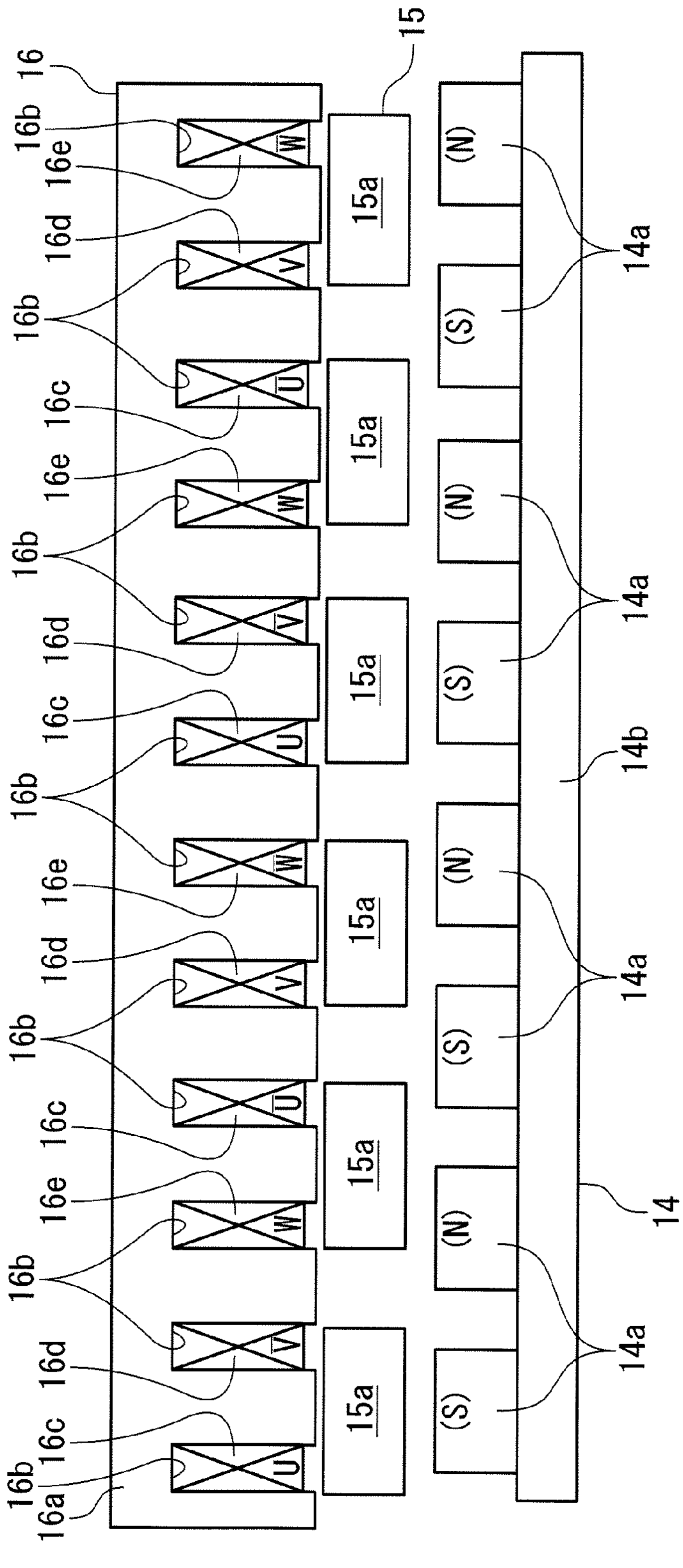
FIG. 107 is a view schematically showing part of an annular cross-section taken along a circumferential direction at the position of the A-A line of FIG. 106, in a linear representation.

Next, the first rotating machine 10 and the second rotating machine 20 will be described with reference to FIGS. 106 and 107. FIG. 106 schematically shows a cross-sectional arrangement of the first rotating machine 10 and the second rotating machine 20. FIG. 107 schematically shows part of an annular cross-section taken along A-A of FIG. 106 along a circumferential direction, in a linear representation. It should be noted that in the figures, hatching in cross-sections are not depicted for ease of understanding, and this also applies to FIGS. 111(*a*) to 111(*c*) and other figures described later.

<First Rotating Machine 10>

First, the first rotating machine 10 will be described. As shown in FIG. 106, the first rotating machine 10 includes a casing 11 fixed to the above-described drive system housing, an input shaft 12 having a left end thereof directly connected to a crankshaft of the engine 3, the output shaft 13 (rotating shaft) concentric with the input shaft 12, a first rotor 14 housed in the casing 11, for rotation integrally with the output shaft 13, a second rotor 15 housed in the casing 11, for rotation integrally with the input shaft 12, and a stator 16 fixed to the inner peripheral surface of a peripheral wall 11*c* of the casing 11. The first rotor 14, the second rotor 15, and the stator 16 are arranged concentrically with each other from the radially inner side toward the radially outer side.

The casing 11 includes left and right side walls 11*a* and 11*b*, and the peripheral wall 11*c* which has a hollow cylindrical shape and is fixed to the outer peripheral ends of the left and right side walls 11*a* and 11*b*. Bearings 11*d* and 11*e* are attached to the central portions of the left and right side walls 11*a* and 11*b*, respectively, and the input shaft 12 and the output shaft 13 are rotatably supported by the bearings 11*d* and 11*e*, respectively. Moreover, the axial motions of the two shafts 12 and 13 are restricted by thrust bearings, not shown, and the like.

The first rotor 14 includes a turntable portion 14*b* concentrically fixed to a left end of the output shaft 13, and a hollow cylindrical ring portion 14*c* fixed to an outer end of the turntable portion 14*b*. The ring portion 14*c* is formed of a soft magnetic material, and a permanent magnet row is disposed on an outer peripheral surface thereof along the circumferential direction so as to be opposed to an iron core 16*a* of the stator 16. The permanent magnet row is formed by eight permanent magnets 14*a* (magnet poles), as shown in FIG. 107.

The permanent magnets 14*a* are arranged at equal intervals such that each two adjacent ones of the permanent magnets 14*a* have different polarities, and each permanent magnet 14*a* has an axial length thereof set to a predetermined. It should be noted that in FIG. 107 and FIGS. 111(*a*) to 111(*c*) and other figures described later, the N pole and S pole of each permanent magnet 14*a* are represented by (N) and (S), respectively, and components (for example, the casing 11) other than the essential ones are omitted from illustration for ease of understanding.

On the other hand, the stator 16 is for generating a rotating magnetic field, and includes the iron core 16*a*, and U-phase, V-phase and W-phase coils 16*c*, 16*d*, and 16*e* (see FIG. 107) wound on the iron core 16*a*. The iron core 16*a*, which has a hollow cylindrical shape formed by laminating a plurality of steel plates, is fixed to the casing 11, and has an axial length thereof set to the same length as the permanent magnets 14*a*.

Moreover, twelve slots 16*b* are formed on the inner peripheral surface of the iron core 16*a*. The slots 16*b* extend in the axial direction, and are arranged at equal intervals in the direction of circumference of a first main shaft 4 (hereinafter simply referred to as "circumferentially" or "in the circumferential direction"). It should be noted that in the present embodiment, the iron core 16*a* and the U-phase to W-phase coils 16*c* to 16*e* correspond to an armature and an armature row, respectively.

Moreover, the U-phase to W-phase coils 16*c* to 16*e* are wound in the slots 16*b* by distributed winding (wave winding), and are electrically connected to a battery 33 described later, through a 1ST-PDU 31 and a bidirectional step-up/down converter (hereinafter referred to as a "VCU") 34 described later.

In the stator 16 configured as above, when electric power is supplied from the battery 33, to thereby cause electric current to flow through the U-phase to W-phase coils 16*c* to 16*e*, or when electric power is generated, as described later, four magnetic poles are generated at ends of the iron core 16*a* close to the first rotor 14 at circumferentially equal intervals (see FIGS. 111(*a*) to 111(*c*)), and a rotating magnetic field caused by the magnetic poles rotates in the circumferential direction. Hereinafter, the magnetic poles generated on the iron core 16*a* will be referred to as the "stator magnetic poles". In this case, each two stator magnetic poles which are adjacent to each other in the circumferential direction have different polarities. It should be noted that in FIGS. 111(*a*) to 111(*c*) and other figures described later, the N pole and S pole of the stator magnetic poles are represented by (N) and (S), similarly to the N pole and S pole of each permanent magnet 14*a*.

On the other hand, the second rotor 15 includes a turntable portion 15*b* fixed to a right end of the input shaft 12, a supporting portion 15*c* which extends from an outer end of the turntable portion 15*b* close to the second rotating machine 20, and a soft magnetic material core row fixed to the supporting portion 15*c*, which is disposed between the permanent magnet row of the first rotor 14 and the iron core 16*a* of the stator 16. The soft magnetic material core row is formed by six soft magnetic material cores 15*a* formed of a soft magnetic material (for example, laminate of steel plates).

The soft magnetic material cores 15*a* are arranged at circumferentially equal intervals, and are spaced from the permanent magnets 14*a* and the iron core 16*a* by predetermined distances. Moreover, the soft magnetic material core 15*a* has an axial length thereof set to the same length as the permanent magnets 14*a* and the iron core 16*a* of the stator 16.

Hereinafter, the principle of the first rotating machine 10 will be described. In the description, the stator 16 will be referred to as a "stator", the first rotor 14 to as a "first rotor", and the second rotor 15 to as a "second rotor." Hereinafter, assuming that a torque equivalent to an electrical angular velocity of the rotating magnetic field generated by electric power supplied to the stators and the supplied electric power is defined as a driving equivalent torque Te, a relationship between the driving equivalent torque Te, a torque T1 transmitted to the first rotor, and a torque T2 transmitted to the second rotor, and a relationship between the electrical angular velocities of the first and second rotors and the electrical angular velocity of the rotating magnetic field are as described below.

Figure 108:
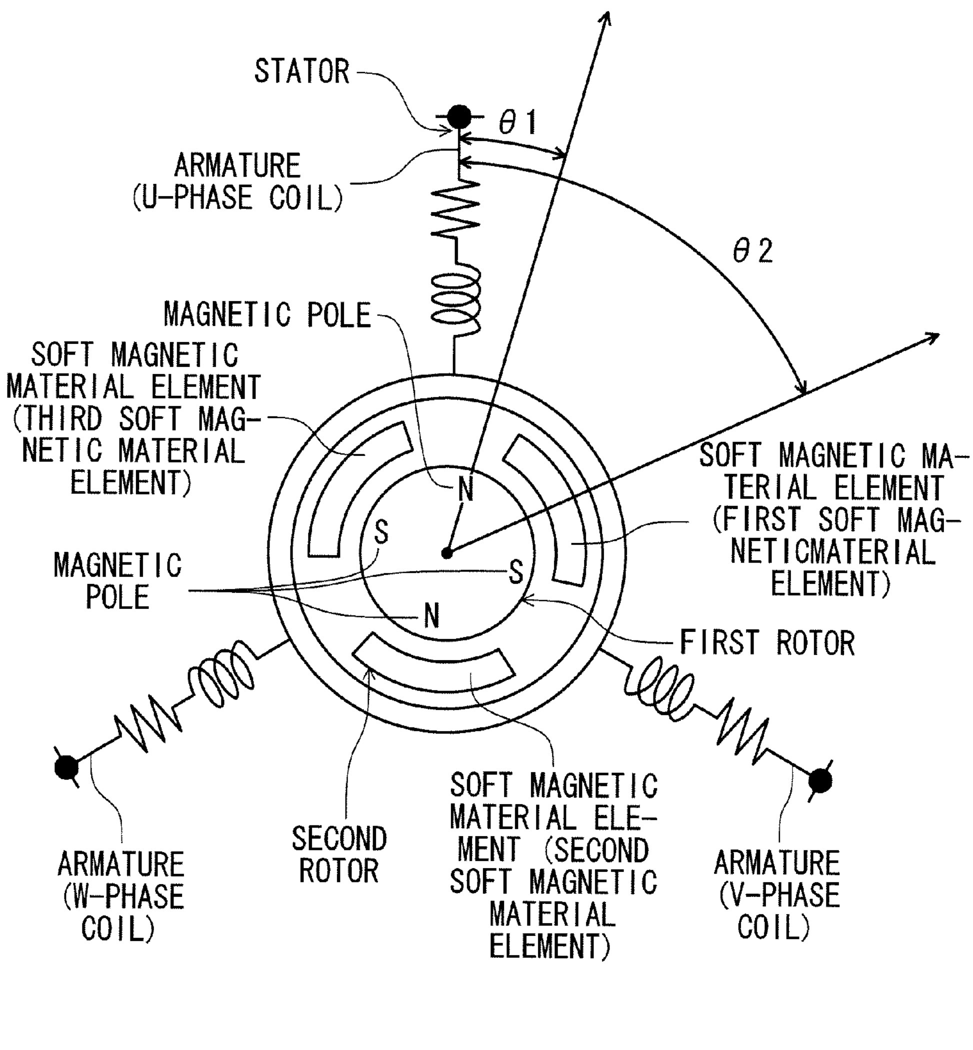
FIG. 108 is a diagram showing an equivalent circuit corresponding to the first rotating machine 10.

First, when the first rotating machine 10 is configured such that the following conditions (f1) and (f2) are satisfied, an equivalent circuit corresponding to the first rotating machine as configured above is expressed as shown in FIG. 108. It should be noted that in the present description, a pair of an N pole and an S pole will be referred to as "a pole pair," and the number of pole pairs will be referred to as "a pole pair number".

(f1) The stators have three-phase coils of U-phase, V-phase, and W-phase.

(f2) The number of the stator magnetic poles is 2, that is, the polar pair number of the stator magnetic poles has a value of 1, the number of the magnetic poles is 4, that is, the polar pair number of the magnetic poles has a value of 2, and the number of the soft magnetic material elements is 3, that is, first to third soft magnetic material elements.

In the case of the first rotating machine 10 as configured above, a magnetic flux Ψk1 of a magnetic pole passing through the first soft magnetic material element is expressed by the following equation (72).

[Mathematical Formula 42]

$$\Psi k1 = \psi f \cdot \cos[2(\theta 2 - \theta 1)] \tag{72}$$

In this equation (72), ψf represents the maximum value of the magnetic flux of the magnetic pole, and θ1 and θ2 represent a rotational angular position of the magnetic pole and a rotational angular position of the first soft magnetic material element, with respect to the U-phase coil. Moreover, since the ratio of the pole pair number of the magnetic poles to the pole pair number of the stator magnetic poles is 2, the magnetic flux of the magnetic pole rotates (changes) at a repetition period of twice the repetition period of the rotating magnetic field, so that in the above-described equation (72), (θ2−θ1) is multiplied by 2.0 to indicate this fact.

In this equation, the magnetic flux Ψu1 of the magnetic pole passing through the U-phase coil through the first soft magnetic material element corresponds to a value obtained by multiplying the magnetic flux Ψk1, expressed by the equation (72), by cos θ2, so that there is obtained the following equation (73).

[Mathematical Formula 43]

$$\Psi u1 = \psi f \cdot \cos[2(\theta 2 - \theta 1)] \cos \theta 2 \tag{73}$$

Similarly to the above, a magnetic flux Ψk2 of a magnetic pole passing through the second soft magnetic material element is expressed by the following equation (74).

[Mathematical Formula 44]

$$\Psi k2 = \psi f \cdot \cos\left[2\left(\theta 2 + \frac{2\pi}{3} - \theta 1\right)\right] \tag{74}$$

In this case, the rotational angular position of the second soft magnetic material element with respect to the stator leads that of the first soft magnetic material element by 2π/3, so that in the above-described equation (74), 2π/3 is added to θ2 to indicate this fact.

Moreover, the magnetic flux Ψu2 of a magnetic pole passing through the U-phase coil through the second soft magnetic material element corresponds to a value obtained by multiplying the magnetic flux Ψk2, expressed by the equation (74), by cos(θ2+2π/3), so that there is obtained the following equation (75).

[Mathematical Formula 45]

$$\Psi u2 = \psi f \cdot \cos\left[2\left(\theta 2 + \frac{2\pi}{3} - \theta 1\right)\right] \cos\left(\theta 2 + \frac{2\pi}{3}\right) \tag{75}$$

By the same method as described above, as an equation for calculating a magnetic flux Ψu3 of a magnetic pole passing through the U-phase coil through the third soft magnetic material element, there is obtained the following equation (76).

[Mathematical Formula 46]

$$\Psi u3 = \psi f \cdot \cos\left[2\left(\theta 2 + \frac{4\pi}{3} - \theta 1\right)\right] \cos\left(\theta 2 + \frac{4\pi}{3}\right) \tag{76}$$

In the first rotating machine 10 as shown in FIG. 108, a magnetic flux Ψu of the magnetic pole passing through the U-phase coil through the three soft magnetic material elements is obtained by adding Ψu1 to Ψu3 expressed by the above-described equations (73), (75) and (76), and hence the magnetic flux Ψu is expressed by the following equation (77).

[Mathematical Formula 47]

$$\begin{aligned} \Psi u = {} & \psi f \cdot \cos[2(\theta 2 - \theta 1)]\cos\theta 2 + \\ & \psi f \cdot \cos\left[2\left(\theta 2 + \frac{2\pi}{3} - \theta 1\right)\right]\cos\left(\theta 2 + \frac{2\pi}{3}\right) + \\ & \psi f \cdot \cos\left[2\left(\theta 2 + \frac{4\pi}{3} - \theta 1\right)\right]\cos\left(\theta 2 + \frac{4\pi}{3}\right) \end{aligned} \tag{77}$$

Moreover, when this equation (77) is generalized, the magnetic flux Ψu of the magnetic pole passing through the U-phase coil through the soft magnetic material elements is expressed by the following equation (78).

[Mathematical Formula 48]

$$\Psi u = \sum_{i=1}^{b} \psi f \cdot \cos\left\{a\left[\theta 2 + (i-1)\frac{2\pi}{b} - \theta 1\right]\right\} \cos\left\{c\left[\theta 2 + (i-1)\frac{2\pi}{b}\right]\right\} \tag{78}$$

In this equation (78), a, b and c represent the pole pair number of magnetic poles, the number of soft magnetic material elements, and the pole pair number of stator magnetic poles.

Moreover, when the above equation (78) is changed based on the formula of the sum and product of the trigonometric function, there is obtained the following equation (79).

[Mathematical Formula 49]

$$\Psi u=\sum_{i=1}^{b}\frac{1}{2}\cdot\psi f\left\{\cos\left[(a+c)\theta 2-a\cdot\theta 1+(a+c)(i-1)\frac{2\pi}{b}\right]+\cos\left[(a-c)\theta 2-a\cdot\theta 1+(a-c)(i-1)\frac{2\pi}{b}\right]\right\}\tag{79}$$

When this equation (79) is rearranged by setting b=a+c, and using the relationship of cos(θ+2π)=cos θ, there is obtained the following equation (80).

[Mathematical Formula 50]

$$\Psi u=\frac{b}{2}\cdot\psi f\cdot\cos[(a+c)\theta 2-a\cdot\theta 1]+\sum_{i=1}^{b}\frac{1}{2}\cdot\psi f\left\{\cos\left[(a-c)\theta 2-a\cdot\theta 1+(a-c)(i-1)\frac{2\pi}{b}\right]\right\}\tag{80}$$

When this equation (80) is rearranged based on the addition theorem of the trigonometric function, there is obtained the following equation (81).

[Mathmatical Formula 51]

$$\Psi u=\frac{b}{2}\cdot\psi f\cdot\cos[(a+c)\theta 2-a\cdot\theta 1]+\frac{1}{2}\cdot\psi f\cdot\cos[(a-c)\theta 2-a\cdot\theta 1]\sum_{i=1}^{b}\cos\left[(a-c)(i-1)\frac{2\pi}{b}\right]-\frac{1}{2}\cdot\psi f\cdot\sin[(a-c)\theta 2-a\cdot\theta 1]\sum_{i=1}^{b}\sin\left[(a-c)(i-1)\frac{2\pi}{b}\right]\tag{81}$$

When the integral term in the second term on the right side of the equation (81) is rearranged using the series summation formula and Euler's formula on condition that a−c≠0, there is obtained the following equation (82). That is, the second term on the right side of the equation (81) becomes equal to 0.

[Mathematical Formula 52]

$$\begin{aligned}\sum_{i=1}^{b}\cos\left[(a-c)(i-1)\frac{2\pi}{b}\right]&=\sum_{i=0}^{b-1}\frac{1}{2}\left\{e^{j\left[(a-c)\frac{2\pi}{b}i\right]}+e^{-j\left[(a-c)\frac{2\pi}{b}i\right]}\right\}\\&=\frac{1}{2}\left\{\frac{e^{j\left[(a-c)\frac{2\pi}{b}b\right]}-1}{e^{j\left[(a-c)\frac{2\pi}{b}\right]}-1}+\frac{e^{-j\left[(a-c)\frac{2\pi}{b}\right]}-1}{e^{-j\left[(a-c)\frac{2\pi}{b}\right]}-1}\right\}\\&=\frac{1}{2}\left\{\frac{e^{j[(a-c)2\pi]}-1}{e^{j\left[(a-c)\frac{2\pi}{b}\right]}-1}+\frac{e^{-j[(a-c)2\pi]}-1}{e^{-j\left[(a-c)\frac{2\pi}{b}\right]}-1}\right\}\\&=\frac{1}{2}\left\{\frac{0}{e^{j\left[(a-c)\frac{2\pi}{b}\right]}-1}+\frac{0}{e^{-j\left[(a-c)\frac{2\pi}{b}\right]}-1}\right\}\\&=0\end{aligned}\tag{82}$$

Moreover, when the integral term in the third term on the right side of the above-described equation (81) is rearranged using the series summation formula and Euler's formula on condition that that a−c≠0, there is obtained the following equation (83). That is, the third term on the right side of the equation (81) also becomes equal to 0.

[Mathematical Formula 53]

$$\begin{aligned}\sum_{i=1}^{b}\sin\left[(a-c)(i-1)\frac{2\pi}{b}\right]&=\sum_{i=0}^{b-1}\frac{1}{2}\left\{e^{j\left[(a-c)\frac{2\pi}{b}i\right]}-e^{-j\left[(a-c)\frac{2\pi}{b}i\right]}\right\}\\&=\frac{1}{2}\left\{\frac{e^{j\left[(a-c)\frac{2\pi}{b}b\right]}-1}{e^{j\left[(a-c)\frac{2\pi}{b}\right]}-1}-\frac{e^{-j\left[(a-c)\frac{2\pi}{b}b\right]}-1}{e^{-j\left[(a-c)\frac{2\pi}{b}\right]}-1}\right\}\\&=\frac{1}{2}\left\{\frac{e^{j[(a-c)2\pi]}-1}{e^{j\left[(a-c)\frac{2\pi}{b}\right]}-1}-\frac{e^{-j[(a-c)2\pi]}-1}{e^{-j\left[(a-c)\frac{2\pi}{b}\right]}-1}\right\}\\&=\frac{1}{2}\left\{\frac{0}{e^{j\left[(a-c)\frac{2\pi}{b}\right]}-1}-\frac{0}{e^{-j\left[(a-c)\frac{2\pi}{b}\right]}-1}\right\}\\&=0\end{aligned}\tag{83}$$

From the above, when a−c≠0 holds, the magnetic flux Ψu of the magnetic pole passing through the U-phase coil through the soft magnetic material elements is expressed by the following equation (84).

[Mathematical Formula 54]

$$\Psi u=\frac{b}{2}\cdot\psi f\cdot\cos[(a+c)\theta 2-a\cdot\theta 1]\tag{84}$$

In this equation, if the ratio between the pole pair number a of magnetic poles and the pole pair number c of stator magnetic poles is defined as "a pole pair number ratio α," α=a/c holds, so that when the pole pair number ratio α is substituted into the equation (84), there is obtained the following equation (85).

[Mathematical Formula 55]

$$\Psi u=\frac{b}{2}\cdot\psi f\cdot\cos[(\alpha+1)c\cdot\theta 2-\alpha\cdot c\cdot\theta 1]\tag{85}$$

Furthermore, in this equation (85), if c·θ2=θe2 and c·θ1=θe1, there is obtained the following equation (86).

[Mathmatical Formula 56]

$$\Psi u=\frac{b}{2}\cdot\psi f\cdot\cos[(\alpha+1)\theta e2-\alpha\cdot\theta e1]\tag{86}$$

In this equation, since θe2 is a value obtained by multiplying the rotational angular position θ2 of the soft magnetic material element with respect to the U-phase coil by the pole pair number c of stator magnetic poles, it represents the electrical angular position of the soft magnetic material element with respect to the U-phase coil. Moreover, since θe1 is a value obtained by multiplying the rotational angular position θ1 of the magnetic pole with respect to the U-phase coil by the pole pair number c of stator magnetic poles, it represents the electrical angular position of the magnetic pole with respect to the U-phase coil.

Moreover, since the electrical angular position of the V-phase coil leads that of the U-phase coil by an electrical angle 2π/3, a magnetic flux Ψv of the magnetic pole passing through the V-phase coil through the soft magnetic material elements is expressed by the following equation (87).

[Mathematical Formula 57]

$$\Psi v = \frac{b}{2}\cdot\psi f\cdot\cos\left[(\alpha+1)\theta e2-\alpha\cdot\theta e1-\frac{2\pi}{3}\right] \quad (87)$$

Moreover, since the electrical angular position of the W-phase coil lags that of the U-phase coil by an electrical angle 2π/3, a magnetic flux Ψw of the magnetic pole passing through the W-phase coil through the soft magnetic material elements is expressed by the following equation (88).

[Mathematical Formula 58]

$$\Psi w = \frac{b}{2}\cdot\psi f\cdot\cos\left[(\alpha+1)\theta e2-\alpha\cdot\theta e1+\frac{2\pi}{3}\right] \quad (88)$$

Next, when the above-described equations (86) to (88) are differentiated with respect to time, the following equations (89) to (91) are obtained.

[Mathematical Formula 59]

$$\frac{d\Psi u}{dt} = -\frac{b}{2}\cdot\psi f\{[(\alpha+1)\omega e2-\alpha\cdot\omega e1]\sin[(\alpha+1)\theta e2-\alpha\cdot\theta e1]\} \quad (89)$$

[Mathematical Formula 60]

$$\frac{d\Psi v}{dt} = -\frac{b}{2}\cdot\psi f\left\{[(\alpha+1)\omega e2-\alpha\cdot\omega e1]\sin\left[(\alpha+1)\theta e2-\alpha\cdot\theta e1-\frac{2\pi}{3}\right]\right\} \quad (90)$$

[Mathematical Formula 61]

$$\frac{d\Psi w}{dt} = -\frac{b}{2}\cdot\psi f\left\{[(\alpha+1)\omega e2-\alpha\cdot\omega e1]\sin\left[(\alpha+1)\theta e2-\alpha\cdot\theta e1+\frac{2\pi}{3}\right]\right\} \quad (91)$$

In the equation, ωe1 denotes a time differential value of θe1, that is, a value obtained by converting the angular velocity of the first rotor with respect to the stator to an electrical angular velocity (hereinafter referred to as "the first rotor electrical angular velocity"). Furthermore, ωe2 denotes a time differential value of θe2, that is, a value obtained by converting the angular velocity of the second rotor with respect to the stator to an electrical angular velocity (hereinafter referred to as "the second rotor electrical angular velocity").

In this case, magnetic fluxes of the magnet pole that directly pass through the U-phase to W-phase coils without passing through the soft magnetic material elements are very small, and hence influence thereof is negligible. Therefore, dΨu/dt to dΨw/dt, which are time differential values of the magnetic fluxes Ψu to Ψw of the magnetic pole, which pass through the U-phase to W-phase coils through the soft magnetic material elements, expressed by the equations (89) to (91), respectively, represent back electromotive force voltages (induced electromotive voltages), which are generated in the U-phase to W-phase coils as the magnetic pole and the soft magnetic material elements rotate with respect to the stator row.

Therefore, electric currents Iu, Iv and Iw, flowing through the U-phase, V-phase and W-phase coils, respectively, are expressed by the following equations (92), (93) and (94).

[Mathematical Formula 62]

$$Iu = I\cdot\sin[(\alpha+1)\theta e2-\alpha\cdot\theta e1] \quad (92)$$

[Mathematical Formula 63]

$$Iv = I\cdot\sin\left[(\alpha+1)\theta e2-\alpha\cdot\theta e1-\frac{2\pi}{3}\right] \quad (93)$$

[Mathematical Formula 64]

$$Iw = I\cdot\sin\left[(\alpha+1)\theta e2-\alpha\cdot\theta e1+\frac{2\pi}{3}\right] \quad (94)$$

In the equation, I represents the amplitude (maximum value) of each electric current flowing through each of the U-phase to W-phase coils.

Moreover, from the above equations (92) to (94), the electrical angular position θmf of a vector of the rotating magnetic field with respect to the U-phase coil is expressed by the following equation (95), and the electrical angular velocity ωmf of the rotating magnetic field with respect to the U-phase coil (hereinafter referred to as "the magnetic field electrical angular velocity) is expressed by the following equation (96).

[Mathematical Formula 65]

$$\theta mf=(\alpha+1)\theta e2-\alpha\cdot\theta e1 \quad (95)$$

[Mathematical Formula 66]

$$\omega mf=(\alpha+1)\omega e2-\alpha\cdot\omega e1 \quad (96)$$

Moreover, the mechanical output (motive power) W, which is output to the first and second rotors by the flowing of the currents Iu to Iw through the U-phase to W-phase coils, is represented, provided that a reluctance-associated portion is excluded therefrom, by the following equation (97).

[Mathematical Formula 67]

$$W = \frac{d\Psi u}{dt}\cdot Iu+\frac{d\Psi v}{dt}\cdot Iv+\frac{d\Psi w}{dt}\cdot Iw \quad (97)$$

When the above-described equations (89) to (94) are substituted into this equation (97) and the resulting equation is rearranged, there is obtained the following equation (98).

[Mathematical Formula 68]

$$W = -\frac{3\cdot b}{4}\cdot\psi f\cdot I[(\alpha+1)\omega e2-\alpha\cdot\omega e1] \quad (98)$$

On the other hand, the relationship between this mechanical output W, the above-described first and second rotor transmission torques T1 and T2, and the first and second rotor electrical angular velocities ωe1 and ωe2 is expressed by the following equation (99).

[Mathematical Formula 69]

$$W=T1\cdot\omega e1+T2\cdot\omega e2 \quad (99)$$

As is clear from the above equations (98) and (99), the first and second rotor transmission torques T1 and T2 are expressed by the following equations (100) and (101).

[Mathematical Formula 70]

$$T1 = \alpha \cdot \frac{3 \cdot b}{4} \cdot \psi f \cdot I \quad (100)$$

[Mathematical Formula 71]

$$T2 = -(\alpha + 1) \cdot \frac{3 \cdot b}{4} \cdot \psi f \cdot I \quad (101)$$

Moreover, since the electric power supplied to the stator row and the mechanical output W are equal to each other, provided that losses are ignored, from the relationship between the equation (96) and the equation (98), the above-described driving equivalent torque Te is expressed by the following equation (102).

[Mathematical Formula 72]

$$Te = \frac{3 \cdot b}{4} \cdot \psi f \cdot I \quad (102)$$

Moreover, by using the above equations (100) to (102), there is obtained the following equation (103).

[Mathematical Formula 73]

$$Te = \frac{T1}{\alpha} = \frac{-T2}{(\alpha + 1)} \quad (103)$$

In this case, the relationship between the three torques Te, T1, and T2, expressed by the equation (103), and the relationship between the three electrical angular velocities ωmf, ωe1, and ωe2, expressed by the above-described equation (96), are the same as the relationship between the rotational speeds and the relationship between the torques in the sun gear, the ring gear and the carrier of a planetary gear unit. Moreover, as described above, on condition that b=a+c and a−c≠0 hold, there hold the relationship between the electrical angular velocities, expressed by the equation (96), and the relationship between the torques, expressed by the equation (103). Here, assuming that the number of the magnetic poles is p and that of the stator magnetic poles is q, p=2a and q=2c hold, and hence the above condition b=a+c is can be rewritten as by b=(p+q)/2, that is, b/q=(1+p/q)/2. Moreover, if the pole number ratio m is defined as m=p/q, b/q=(1+m)/2 is obtained.

From the above, the fact that the above conditional formula of b=a+c is satisfied corresponds to the fact that the ratio between the number of stator magnetic poles, the number of magnetic poles, and the number of soft magnetic material elements q:p:b is 1:m:(1+m)/2. Moreover, the fact that the above condition of a−c≠0 is satisfied represents that c≠p, that is, the pole number ratio m is a positive number other than 1. Therefore, according to the first rotating machine 10 of the present invention, since the ratio between the number of stator magnetic poles, the number of magnetic poles, and the number of soft magnetic material elements is set to 1:m:(1+m)/2 (provided m≠1), and hence there hold the relationship between the electrical angular velocities, expressed by the equation (96), and the relationship between the torques, expressed by the equation (103), whereby it is possible to operate the first rotating machine by the same operating characteristics as those of the sun gear, the ring gear and the carrier of the planetary gear unit (hereinafter referred to as "the three elements of the planetary gear unit"). In this case, the pole pair number ratio α is α=a/c=(p/2)/(q/2)=p/q, and hence α=m holds.

As described above, according to the power unit 1 of the present embodiment, it is only required to provide one soft magnet material element row in the first rotating machine 10, and hence it is possible to reduce the size and manufacturing costs of the first rotating machine 10 to a corresponding extent. As a result, it is possible to reduce the size and manufacturing costs of the power unit itself. Furthermore, as is clear from reference to the above-described equations (96) and (103), depending on the configuration of the pole pair number ratio α, that is, the pole number ratio m, it is possible to freely set the relationship between the three electrical angular velocities ωmf, ωe1, and ωe2, and also the relationship between the three torques Te, T1, and T2. This applies not only when the rotating magnetic field is being generated by supplying electric power, but also similarly when the rotating magnetic field is being generated by electric power generation. In addition to this, as is clear from the equation (103), as the pole pair number ratio α is larger, the driving equivalent torque Te becomes smaller with respect to the first and second rotor transmission torques T1 and T2. This also applies similarly when electric power is being generated. Therefore, by setting the pole pair number ratio α to a larger value, it is possible to reduce the size of the stator, and in turn it is possible to further reduce the size of the power unit 1. For the above-described reasons, it is possible to improve the degree of freedom in design of the first rotating machine 10, that is, the power unit 1.

Figure 109:
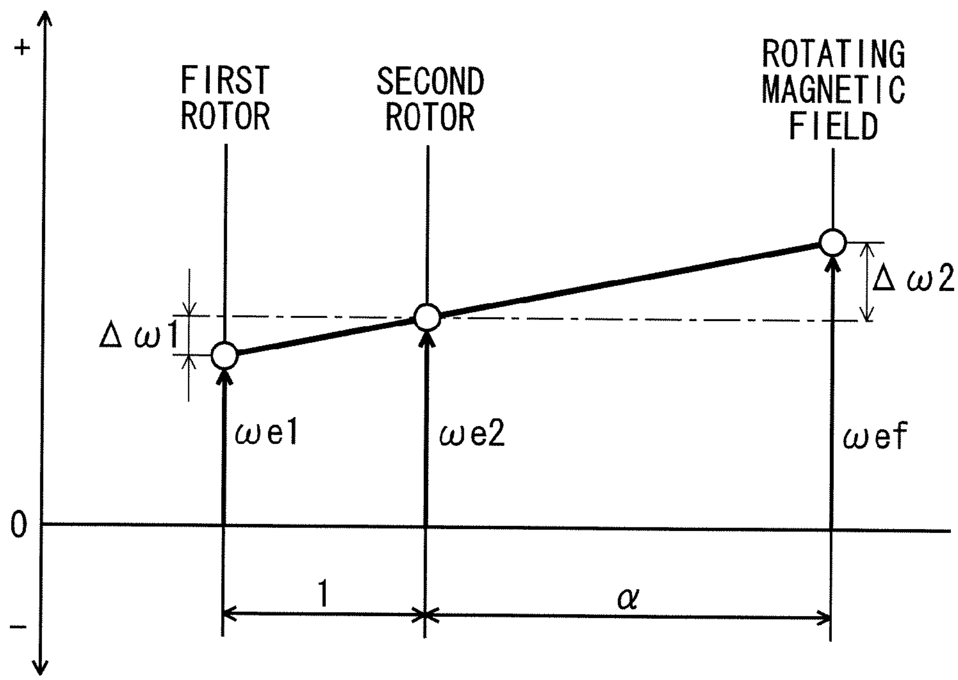
FIG. 109 is a collinear chart showing an example of the relationship between a magnetic field electrical angular velocity ωmf, a first rotor electrical angular velocity ωe1, and a second rotor electrical angular velocity ωe2 of the first rotating machine 10.

Moreover, based on the equation (96), the relationship between the three electrical angular velocities ωmf, ωe1, and ωe2 can be expressed for example, as shown in FIG. 109. The figure is a so-called collinear chart, and in this collinear chart, vertical lines which intersect with a horizontal line from a value of 0 on a vertical axis are for representing respective rotational speeds of parameters, and distances between white circles on the respective vertical lines and the horizontal line correspond to the respective rotational speeds of the parameters.

As is clear from reference to FIG. 109, as the pole pair number ratio α is smaller, the distance between a vertical line representing the magnetic field electrical angular velocity ωmf and a vertical line representing the second rotor electrical angular velocity ωe2 becomes smaller, and hence the ratio (Δω2/Δω1) of a difference Δω2 between the second rotor electrical angular velocity ωe2 and the magnetic field electrical angular velocity ωmf to a difference Δω1 between the first rotor electrical angular velocity ωe1 and the second rotor electrical angular velocity ωe2 becomes smaller. Therefore, in a case where by setting the pole pair number ratio α to a smaller value, the second rotor electrical angular velocity ωe2 exceeds the first rotor electrical angular velocity ωe1, it is possible to prevent driving efficiency and electric power generation efficiency from being lowered due to losses caused by the magnetic field electrical angular velocity ωmf becoming too high. It should be noted that the same advantageous effects can also be obtained when the number of phases of the coils of the plurality of stators is other than the above-described 3 in the first rotating machine 10.

Hereinafter, the operating principles of the first rotating machine 10 configured as above will be described. As described above, the first rotating machine 10 includes the four stator magnetic poles, the eight magnetic poles of the permanent magnets 14*a* (hereinafter referred to as the "magnet magnetic poles"), and the six soft magnetic material cores 15*a*, and hence the ratio between the number of the stator magnetic poles, the number of the magnet magnetic poles, and the number of the soft magnetic material cores 15*a* (hereinafter referred to as the "element number ratio") is set to 4:8:6=1:2:1.5=1:2:(1+2)/2. This element number ratio corresponds to the one assumed when the above-described pole number ratio m (=pole pair number ratio α) is set to 2, and hence, as is clear from the above-described equations (89) to (91), when the first rotor 14 and the second rotor 15 rotate with respect to the stator 16, a back electromotive force voltage generated along therewith by the U-phase coil 16*c* (hereinafter referred to as the "U-phase back electromotive force voltage Vcu"), a back electromotive force voltage generated along therewith by the V-phase coil 16*d* (hereinafter referred to as the "V-phase back electromotive force voltage Vcv"), and a back electromotive force voltage generated along therewith by the W-phase coil 16*e* (hereinafter referred to as the "W-phase back electromotive force voltage Vcw") are expressed by the following equations (104) to (106).

[Mathematical Formula 74]

$$Vcu = -3\cdot\psi F[(3\cdot\omega ER2 - 2\cdot\omega ER1)\sin(3\cdot\theta ER2 - 2\cdot\theta ER1)] \quad (104)$$

[Mathematical Formula 75]

$$Vcv = -3\cdot\psi F\left[(3\cdot\omega ER2 - 2\cdot\omega ER1)\sin\left(3\cdot\theta ER2 - 2\cdot\theta ER1 - \frac{2\pi}{3}\right)\right] \quad (105)$$

[Mathematical Formula 76]

$$Vcw = -3\cdot\psi F\left[(3\cdot\omega ER2 - 2\cdot\omega ER1)\sin\left(3\cdot\theta ER2 - 2\cdot\theta ER1 + \frac{2\pi}{3}\right)\right] \quad (106)$$

In these equations, ψF represents the maximum value of the magnetic fluxes of the magnet magnetic poles. Moreover, θER1 represents a first rotor electrical angle, which is a value obtained by converting a rotational angle position of a specific permanent magnet 14*a* of the first rotor 14 with respect to a specific U-phase coil 16*c* (hereinafter referred to as the "reference coil") to an electrical angular position. More specifically, the first rotor electrical angle θER1 is a value obtained by multiplying the rotational angle position of the specific permanent magnet 14*a* by a pole pair number of the stator magnetic poles, that is, a value of 2. Moreover, θER2 represents a second rotor electrical angle, which is a value obtained by converting a rotational angle position of a specific soft magnetic material core 15*a* of the second rotor 15 with respect to the above-described reference coil to an electrical angular position. More specifically, the second rotor electrical angle θER2 is a value obtained by multiplying the rotational angle position of this specific soft magnetic material core 15*a* by a pole pair number (value of 2) of the stator magnetic poles.

Moreover, ωER1 in the equations (104) to (106) represents a first rotor electrical angular velocity which is a time differential value of θER1, that is, a value obtained by converting an angular velocity of the first rotor 14 with respect to the stator 16 to an electrical angular velocity. Furthermore, ωER2 represents a second rotor electrical angular velocity which is a time differential value of θER2, that is, a value obtained by converting an angular velocity of the second rotor 15 with respect to the stator 16 to an electrical angular velocity.

Moreover, as for the first rotating machine 10, the element number ratio is set as mentioned above, and hence, as is clear from the above-described equations (92) to (94), a current flowing through the U-phase coil 16*c* (hereinafter referred to as the "U-phase current Iu"), a current flowing through the V-phase coil 16*d* (hereinafter referred to as the "V-phase current Iv"), and a current flowing through the W-phase coil 16*e* (hereinafter referred to as the "W-phase current Iw") are expressed by the following equations (107) to (109), respectively.

[Mathematical Formula 77]

$$Iu = I\cdot\sin(3\cdot\theta ER2 - 2\cdot\theta ER1) \quad (107)$$

[Mathematical Formula 78]

$$Iv = I\cdot\sin\left(3\cdot\theta ER2 - 2\cdot\theta ER1 - \frac{2\pi}{3}\right) \quad (108)$$

[Mathematical Formula 79]

$$Iw = I\cdot\sin\left(3\cdot\theta ER2 - 2\cdot\theta ER1 + \frac{2\pi}{3}\right) \quad (109)$$

In these equations (107) to (109), I represents the amplitude (maximum value) of each electric current flowing through the U-phase to W-phase coils 16*c* to 16*e*.

Furthermore, as for the first rotating machine 10, the element number ratio is set as mentioned above, and hence, as is clear from the above-described equations (95) and (96), the electrical angular position of a vector of the rotating magnetic field of the stator 16 with respect to the reference coil (hereinafter referred to as the "magnetic field electrical angular position") θMFR is expressed by the following equation (110), and the electrical angular velocity of the rotating magnetic field with respect to the stator 16 (hereinafter referred to as the "magnetic field electrical angular velocity") ωMFR is expressed by the following equation (111).

[Mathematical Formula 80]

$$\theta MFR = 3\cdot\theta ER2 - 2\cdot\theta ER1 \quad (110)$$

[Mathematical Formula 81]

$$\omega MFR = 3\cdot\omega ER2 - 2\cdot\omega ER1 \quad (111)$$

Figure 110:
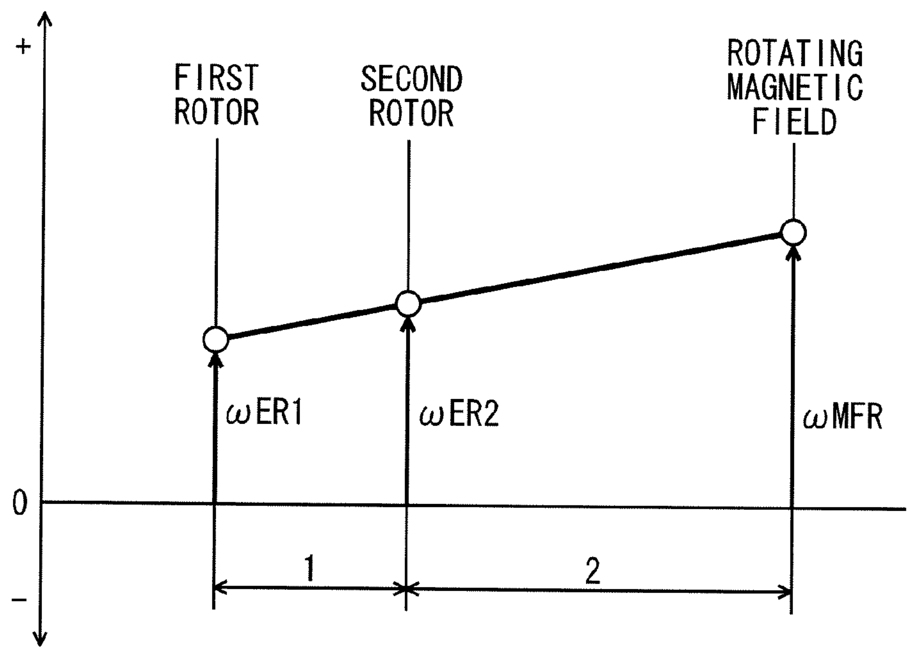
FIG. 110 is a collinear chart showing an example of the relationship between a magnetic field electrical angular velocity ωMFR, a first rotor electrical angular velocity ωER1, and a second rotor electrical angular velocity ωER2.

From the above, as for the first rotating machine 10, the relationship between the magnetic field electrical angular velocity ωMFR, the first rotor electrical angular velocity ωER1, and the second rotor electrical angular velocity ωER2 is illustrated for example, as in FIG. 110.

Moreover, assuming that a torque equivalent to electric power supplied to the stator 16 and the magnetic field electrical angular velocity ωMFR is a driving equivalent torque TSE, as is clear from the above-described pole number ratio and the above-described equation (103), the relationship between the driving equivalent torque TSE, the torque transmitted to the first rotor 14 (hereinafter referred to as the "first rotor transmission torque") TR1, and the torque transmitted to the second rotor 15 (hereinafter referred to as the "second rotor transmission torque") TR2 is expressed by the following equation (112).

[Mathematical Formula 82]

$$TSE = \frac{TR1}{2} = \frac{-TR2}{3} \quad (112)$$

The relationship of the three electrical angular velocities ωMFR, ωER1, and ωER2, expressed by the equation (111), and the relationship between the three torques TSE, TR1, and TR2, expressed by the equation (112) are the same as the relationship between the rotational speed of a sun gear, that of a ring gear, and that of a carrier of a planetary gear unit (hereinafter referred to as "the three elements of the planetary gear unit") having a gear ratio between the sun gear and the ring gear set to 1:2, and the relationship between torques of the same.

Next, an operation performed by the first rotating machine 10 when electric power supplied to the stator 16 is converted to motive power and is output from the first rotor 14 and the second rotor 15 will be described. First, a case where electric power is supplied to the stator 16 in a state in which the first rotor 14 is held unrotatable will be described with reference to FIGS. 111(*a*) to 111(*c*) to FIGS. 113(*a*) and 113(*b*). It should be noted that in FIGS. 111(*a*) to 111(*c*) to FIGS. 113(*a*) and 113(*b*), one specific stator magnetic pole and one specific soft magnetic material core 15*a* are indicated by hatching for ease of understanding.

Figure 111:
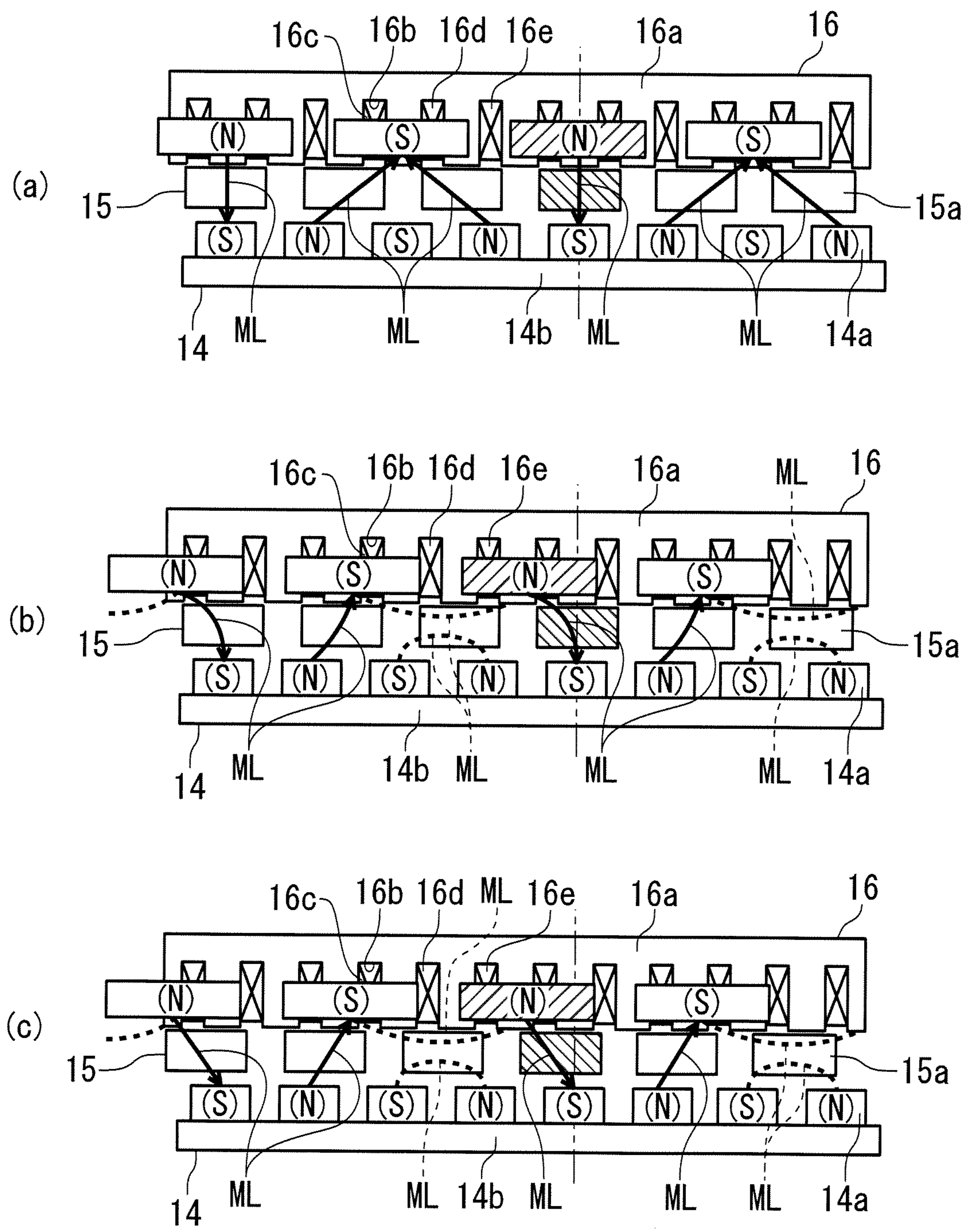
FIGS. 111(*a*) to 111(*c*) are diagrams for explaining the operation in a case where electric power is supplied to the stator in a state where the first rotor of the first rotating machine is held unrotatable.

First, as shown in FIG. 111(*a*), from a state where the center of a soft magnetic material core 15*a* at a left end as viewed in the figure and the center of a permanent magnet 14*a* at a left end as viewed in the figure are circumferentially coincident with each other, and the center of a third soft magnetic material core 15*a* from the soft magnetic material core 15*a* and the center of a fourth permanent magnet 14*a* from the permanent magnet 14*a* are circumferentially coincident with each other, the rotating magnetic field is generated such that it rotates leftward, as viewed in the figure. At the start of generation of the rotating magnetic field, the positions of stator magnetic poles that have the same polarity are made circumferentially coincident with the centers of the corresponding ones of the permanent magnets 14*a* the centers of which are coincident with the centers of the soft magnetic material cores 15*a*, and the polarity of these stator magnetic poles is made different from the polarity of the magnet magnetic poles of these permanent magnets 14*a*.

When the rotating magnetic field is generated by the stator 16 between the same and the first rotor 14 in this state, since the second rotor 15 having the soft magnetic material cores 15*a* is disposed between the stator 16 and the first rotor 14, the soft magnetic material cores 15*a* are magnetized by the stator magnetic poles and the magnet magnetic poles, and accordingly, since the soft magnetic material cores 15*a* are provided with spacings, magnetic lines of force ML are generated in a manner of connecting between the stator magnetic poles, the soft magnetic material cores 15*a*, and the magnet magnetic poles.

In the state shown in FIG. 111(*a*), the magnetic lines of force ML are generated in a manner of connecting stator magnetic poles, soft magnetic material cores 15*a*, and magnet magnetic poles, respective circumferential positions of which are coincident with each other, and at the same time in a manner of connecting stator magnetic poles, soft magnetic material cores 15*a*, and magnet magnetic poles, which are adjacent to the above-described stator magnetic pole, soft magnetic material core 15*a*, and magnet magnetic pole, respectively, on circumferentially opposite sides thereof. Moreover, in this state, since the magnetic lines of force ML are straight, no magnetic forces for circumferentially rotating the soft magnetic material cores 15*a* act on the soft magnetic material cores 15*a*.

When the stator magnetic poles rotate from the positions shown in FIG. 111(*a*) to the respective positions shown in FIG. 111(*b*) in accordance with rotation of the rotating magnetic field, the magnetic lines of force ML are bent, and accordingly magnetic forces act on the soft magnetic material cores 15*a* in such a manner that the magnetic lines of force ML are made straight. In this case, the magnetic lines of force ML are bent at the soft magnetic material cores 15*a* on which the magnetic forces act in a manner curved convexly in a direction opposite to the direction of rotation of the rotating magnetic field (hereinafter, this direction will be referred to as "the magnetic field rotation direction") with respect to associated straight lines connecting between the stator magnetic poles and the magnet magnetic poles. Therefore, the magnetic forces caused by the magnetic lines of force ML act on the soft magnetic material cores 15*a* to drive the same in the magnetic field rotation direction. This drives the soft magnetic material cores 15*a* in the magnetic field rotation direction, whereby the soft magnetic material cores 15*a* rotate to the respective positions shown in FIG. 111(*c*), and the second rotor 15 provided with the soft magnetic material cores 15*a* also rotates in the magnetic field rotation direction. It should be noted that broken lines in FIGS. 111(*b*) and 111(*c*) indicate that the magnetic flux amount of the magnetic lines of force ML is very small, and the magnetic connection between the stator magnetic poles, the soft magnetic material cores 15*a*, and the magnet magnetic poles is weak. This also applies to other figures described later.

Figure 112:
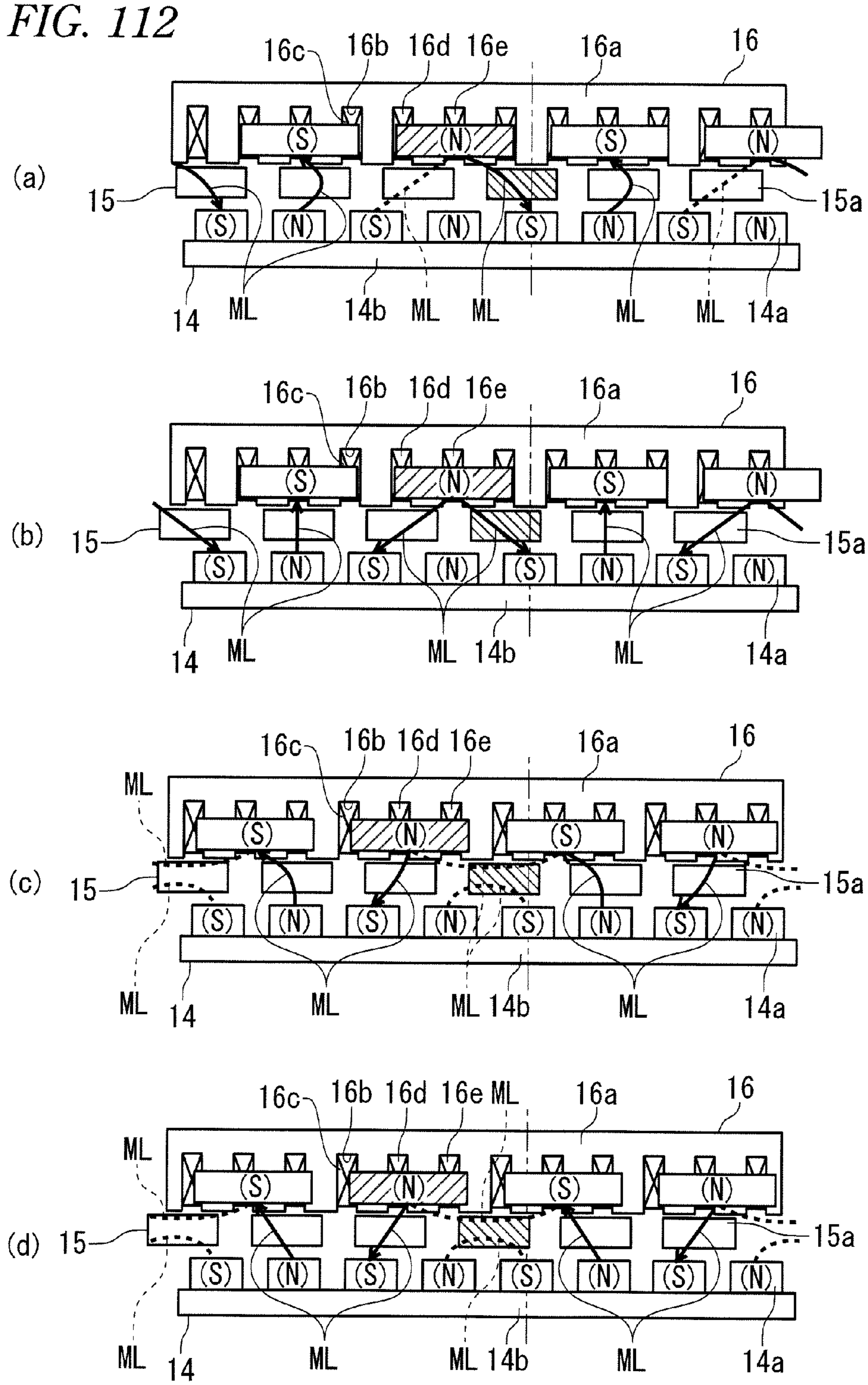
FIGS. 112(*a*) to 112(*d*) are diagrams for explaining a continuation of the operation shown in FIGS. 111(*a*) to 111(*c*).
Figure 113:
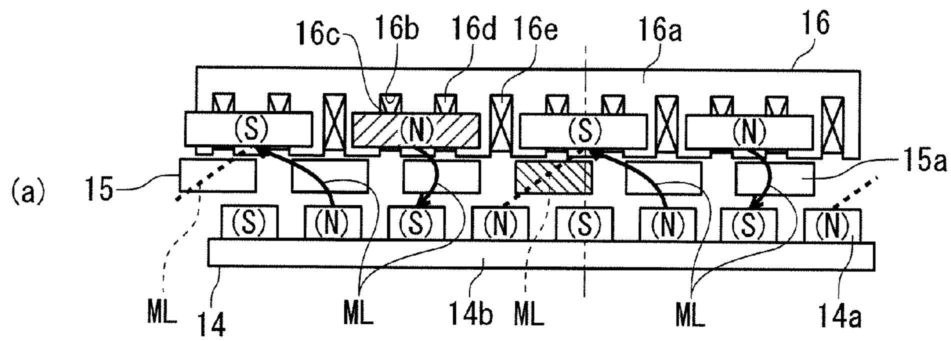
FIGS. 113(*a*) and 113(*b*) are diagrams for explaining a continuation of the operation shown in FIGS. 112(*a*) to 112(*d*).
Figure 113:
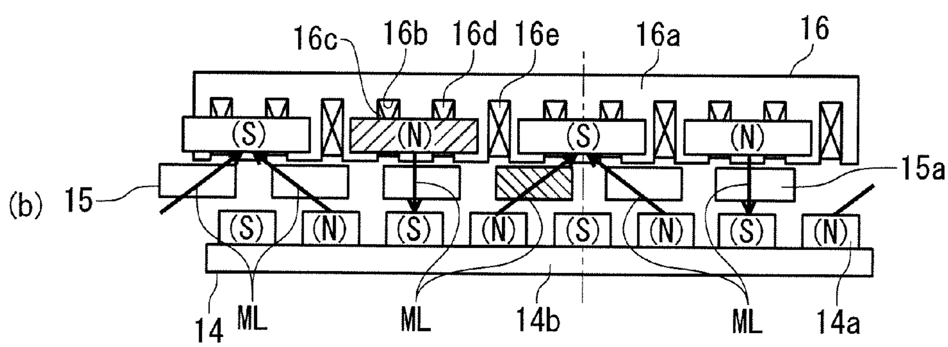

As the rotating magnetic field rotates further, a sequence of the above-described operations, that is, the operations that "the magnetic lines of force ML are bent at the soft magnetic material cores 15*a* in a manner curved convexly in the direction opposite to the magnetic field rotation direction→the magnetic forces act on the soft magnetic material cores 15*a* in such a manner that the magnetic lines of force ML are made straight→the soft magnetic material cores 15*a* and the second rotor 15 rotate in the magnetic field rotation direction" are repeatedly performed as shown in FIGS. 112(*a*) to 112(*d*) and FIGS. 113(*a*) and 113(*b*). As described above, in a case where electric power is supplied to the stator 16 in a state of the first rotor 14 being held unrotatable, the action of the magnetic forces caused by the magnetic lines of force ML converts electric power supplied to the stator 16 to motive power, and the motive power is output from the second rotor 15.

Figure 114:
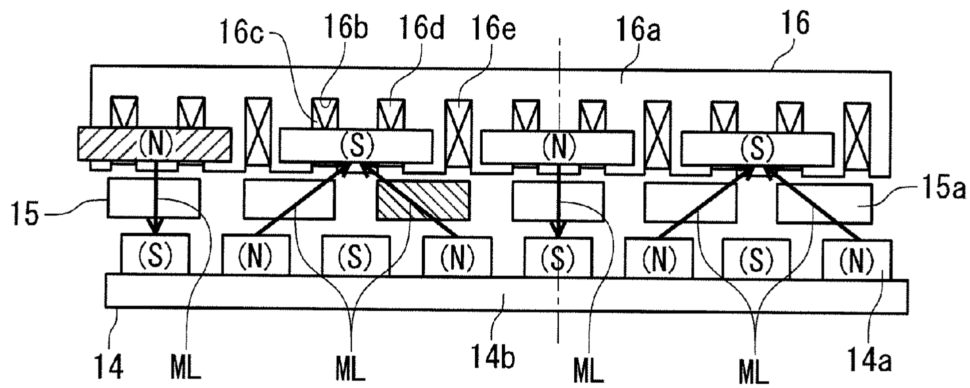
FIG. 114 is a diagram for explaining the positional relationship between stator magnetic poles and soft magnetic material cores in a case where the stator magnetic poles have rotated through an electrical angle of 2π from the state shown in FIG. 110.

FIG. 114 shows a state in which the stator magnetic poles have rotated from the FIG. 111(*a*) state through an electrical angle of $2\pi$. As is apparent from a comparison between both figures, it is understood that the soft magnetic material cores 15*a* have rotated in the same direction through ⅓ of the rotational angle of the stator magnetic poles. This agrees with the fact that by substituting ωER1=0 into the above-described equation (111), ωER2=ωMFR/3 is obtained.

Next, an operation in the case where electric power is supplied to the stator 16 in a state in which the second rotor 15 is held unrotatable will be described with reference to FIGS. 115(*a*) to 115(*c*) to FIGS. 117(*a*) and 117(*b*). It should be noted that in FIGS. 115(*a*) to 115(*c*) to FIGS. 117(*a*) and 117(*b*), one specific stator magnetic pole and one specific permanent magnet 14*a* are indicated by hatching for ease of understanding.

Figure 115:
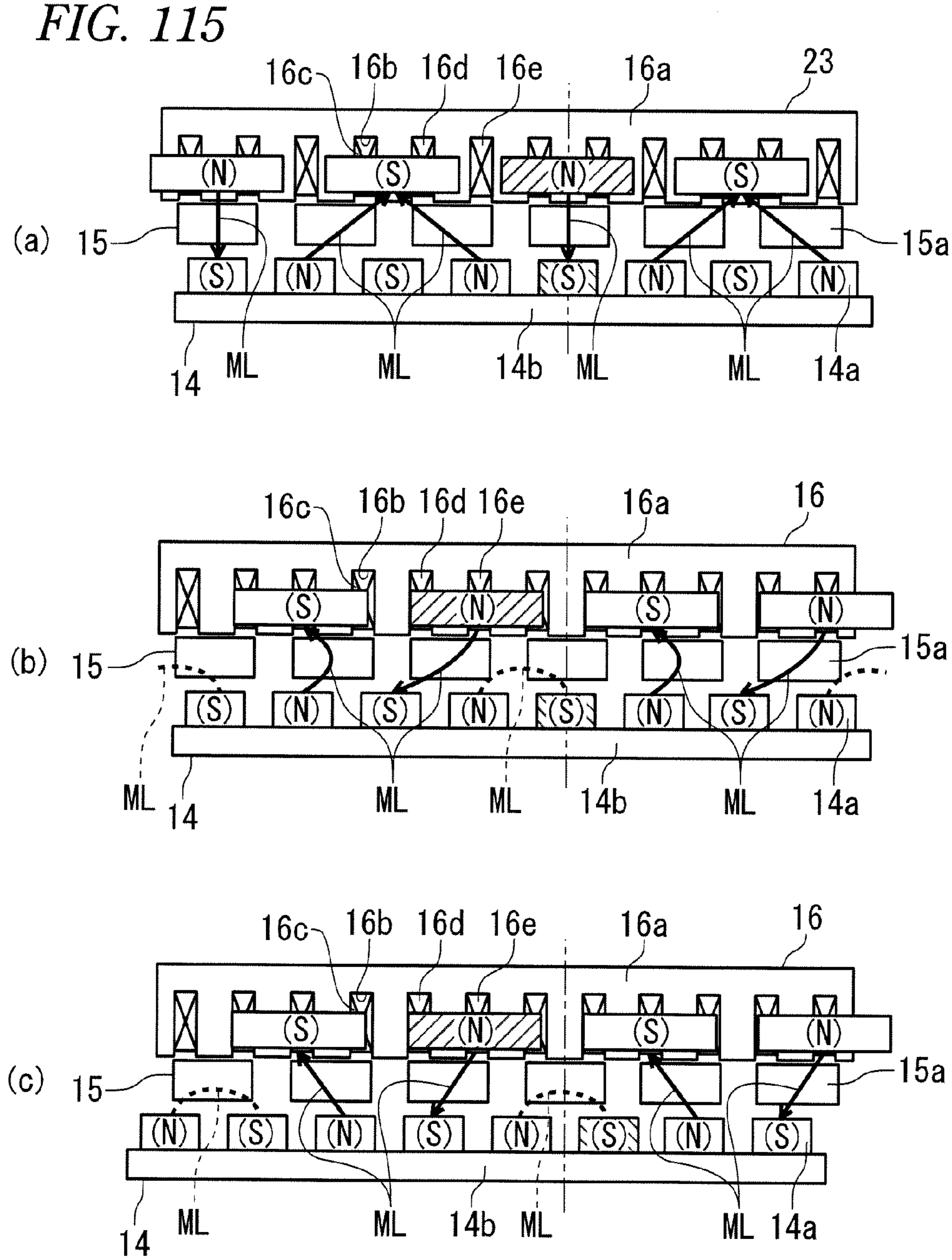
FIGS. 115(*a*) to 115(*c*) are diagrams for explaining the operation in a case where electric power is supplied to the stator in a state where the second rotor of the first rotating machine is held unrotatable.

First, as shown in FIG. 115(*a*), similarly to the case shown in FIG. 111(*a*), from a state where the center of a soft magnetic material core 15*a* at the left end as viewed in the figure and the center of a permanent magnet 14*a* at the left end as viewed in the figure are circumferentially coincident with each other, and the center of a third soft magnetic material core 15*a* from the soft magnetic material core 15*a* at the left end and the center of a fourth permanent magnet 14*a* from the permanent magnet 14*a* at the left end are circumferentially coincident with each other, the rotating magnetic field is generated such that it rotates leftward, as viewed in the figure. At the start of generation of the rotating magnetic field, the positions of stator magnetic poles that have the same polarity are made circumferentially coincident with the centers of the corresponding ones of the permanent magnets 14*a* the centers of which are coincident with the centers of the soft magnetic material cores 15*a*, and the polarity of these stator magnetic poles is made different from the polarity of the magnet magnetic poles of these permanent magnets 14*a*.

In the state shown in FIG. 115(*a*), similarly to the case shown in FIG. 111(*a*), magnetic lines of force ML are generated in a manner of connecting stator magnetic poles, soft magnetic material cores 15*a* and magnet magnetic poles, respective circumferential positions of which are coincident with each other, and at the same time in a manner of connecting stator magnetic poles, soft magnetic material cores 15*a* and magnet magnetic poles which are adjacent to the above-described stator magnetic poles, soft magnetic material cores 15*a*, and magnet magnetic poles, respectively, on circumferentially opposite sides thereof. Moreover, in this state, since the magnetic lines of force ML are straight, no magnetic forces for circumferentially rotating the soft magnetic material cores 15*a* act on the soft magnetic material cores 15*a*.

When the stator magnetic poles rotate from the positions shown in FIG. 115(*a*) to the respective positions shown in FIG. 115(*b*) in accordance with rotation of the rotating magnetic field, the magnetic lines of force ML are bent, and accordingly magnetic forces act on the permanent magnets 14*a* in such a manner that the magnetic lines of force ML are made straight. In this case, the permanent magnets 14*a* are each positioned forward of a line of extension from a stator magnetic pole and a soft magnetic material core 15*a* which are connected to each other by an associated one of the magnetic lines of force ML, in the magnetic field rotation direction, and therefore the magnetic forces caused by the magnetic lines of force ML act on the permanent magnets 14*a* such that each permanent magnet 14*a* is caused to be positioned on the extension line, that is, such that the permanent magnet 14*a* is driven in a direction opposite to the magnetic field rotation direction. This drives the permanent magnets 14*a* in a direction opposite to the magnetic field rotation direction, whereby the permanent magnets 14*a* rotate to the respective positions shown in FIG. 115(*c*), and the first rotor 14 provided with the permanent magnets 14*a* also rotates in the direction opposite to the magnetic field rotation direction.

Figure 116:
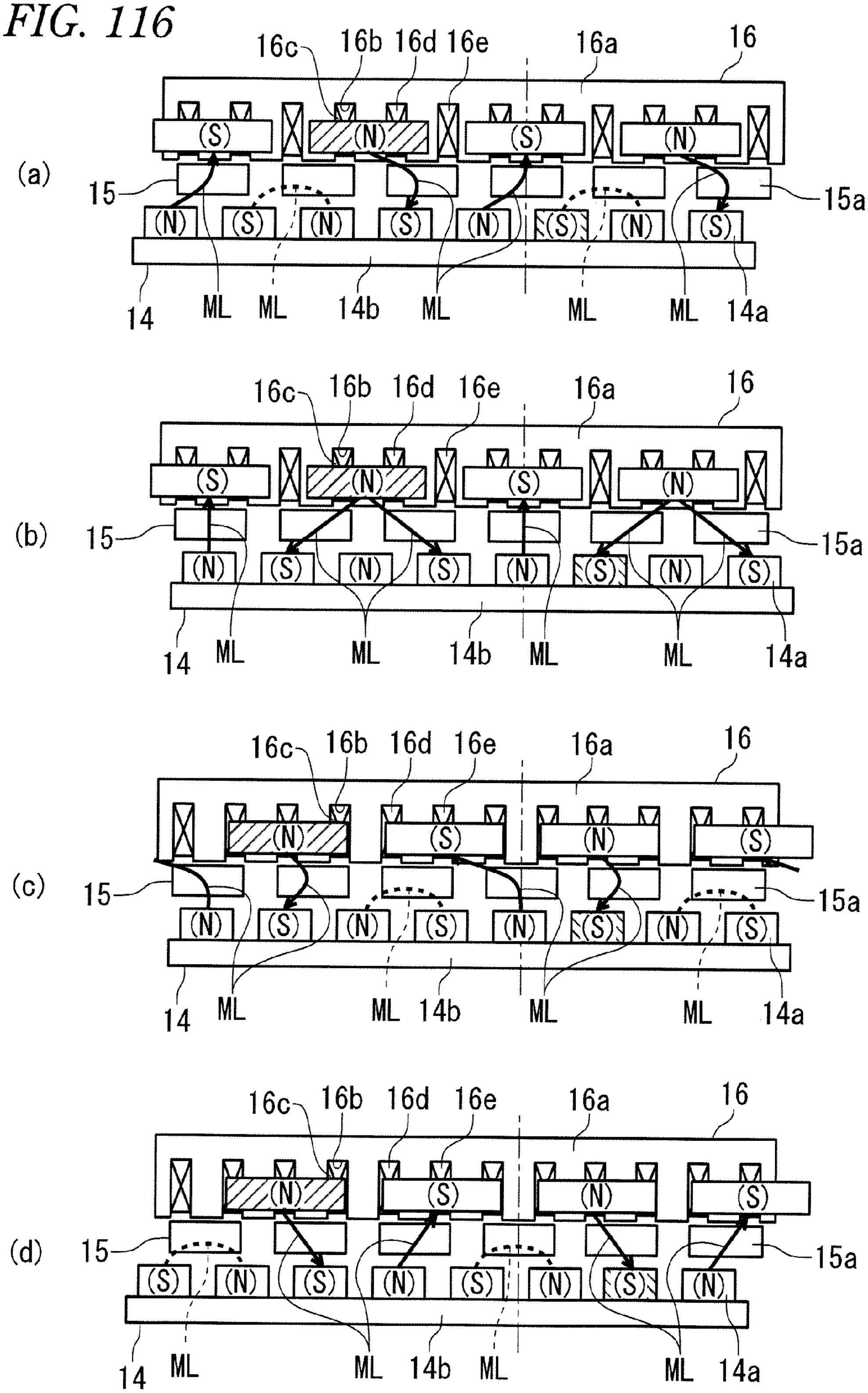
FIGS. 116(*a*) to 116(*d*) are diagrams for explaining a continuation of the operation shown in FIGS. 115(*a*) to 115(*c*).
Figure 117:
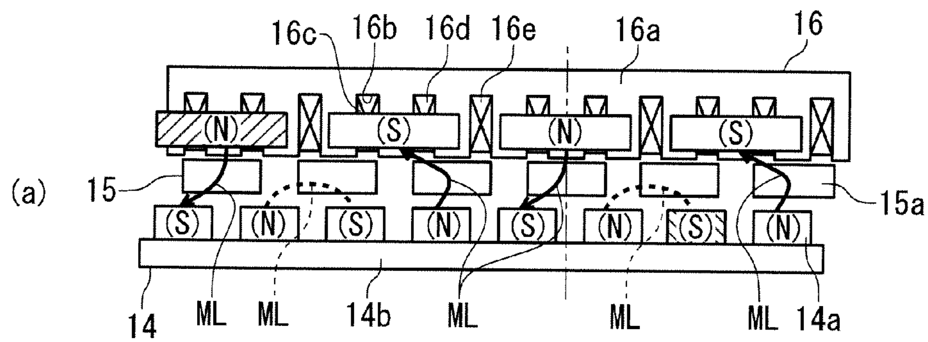
FIGS. 117(*a*) and 117(*b*) are diagrams for explaining a continuation of the operation shown in FIGS. 116(*a*) to 116(*d*).
Figure 117:
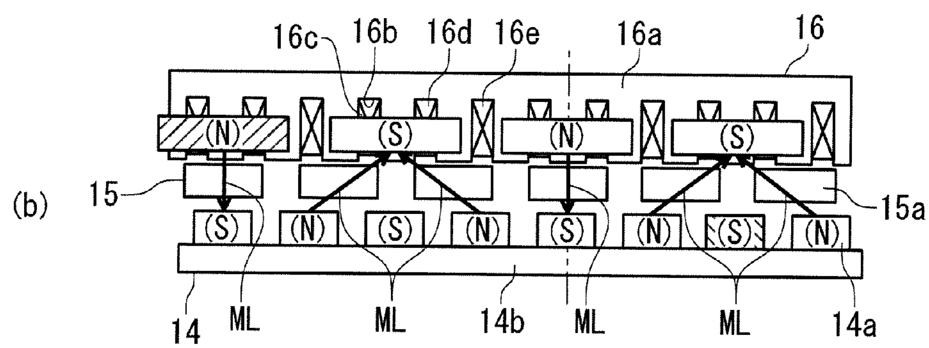

As the rotating magnetic field rotates further, a sequence of the above-described operations are repeatedly performed as shown in FIGS. 116(*a*) to 116(*d*) and FIGS. 117(*a*) and 117 (*b*). That is, the operations that "the magnetic lines of force ML are bent and the permanent magnets 14*a* are each positioned forward of a line of extension from a stator magnetic pole and a soft magnetic material core 15*a* which are connected to each other by an associated one of the magnetic lines of force ML, in the magnetic field rotation direction→the magnetic forces act on the permanent magnets 14*a* in such a manner that the magnetic lines of force ML are made straight→the permanent magnets 14*a* and the first rotor 14 rotate in the direction opposite to the magnetic field rotation direction" are repeatedly performed. As described above, in a case where electric power is supplied to the stator 16 in a state of the second rotor 15 being held unrotatable, the action of the magnetic forces caused by the magnetic lines of force ML converts electric power supplied to the stator 16 to motive power, and the motive power is output from the first rotor 14.

FIG. 117(*b*) shows a state in which the stator magnetic poles have rotated from the FIG. 115(*a*) state through an electrical angle of $2\pi$. As is apparent from a comparison between both figures, it is understood that the permanent magnets 14*a* have rotated in the opposite direction through ½ of the rotational angle of the stator magnetic poles. This agrees with the fact that by substituting ωER2=0 into the above-described equation (111), −ωER1=ωMFR/2 is obtained.

As described above, in the first rotating machine 10 of the present embodiment, when the rotating magnetic field is generated by supplying electric power to the stator 16, the above-described magnetic lines of force ML are generated in a manner of connecting between the magnet magnetic poles, the soft magnetic material cores 15*a* and the stator magnetic poles, and the action of the magnetic forces caused by the magnetic lines of force ML converts the electric power supplied to the stators to motive power, and the motive power is output from the first rotor 14 and the second rotor 15. In this case, the relationship as expressed by the above-described equation (111) holds between the magnetic field electrical angular velocity ωMFR, and the first and second rotor electrical angular velocities ωER1 and ωER2, and the relationship as expressed by the above-described equation (112) holds between the driving equivalent torque TSE, and the first and second rotor transmission torques TR1 and TR2. The relationship between the three torques TSE, TR1 and TR2, and the relationship between the three electrical angular velocities ωMFR, ωER1 and ωER2 are the same as the relationships between the torques and rotational speeds of the three elements of the planetary gear unit.

Therefore, if the first rotor 14 and/or the second rotor 15 are/is caused to rotate with respect to the stator 16 by supplying motive power to the first rotor 14 and/or the second rotor 15 without electric power being supplied to the stator 16, electric power is generated by the stator 16, and a rotating magnetic field is generated. In this case, magnetic lines of force ML are generated in a manner of connecting between the magnet magnetic poles, the soft magnetic material elements, and the stator magnetic poles, and the action of the magnetic forces caused by the magnetic lines of force ML causes the relationship of the electrical angular velocities shown in the equation (111) and the relationship of the torques shown in the equation (112) to hold. That is, assuming that a torque equivalent to the generated electric power and the magnetic field electrical angular velocity ωMFR is an electric power-generating equivalent torque TGE, there also holds the relationship expressed by the equation (112) in which "TSE" is replaced by "TGE" between this electric power-generating equivalent torque TGE, and the first and second rotor transmission torques TR1 and TR2.

As described above, as for the first rotating machine 10 of the present embodiment, the relationship between the three torques and the relationship between the three electrical angular velocities are the same as the relationships between the torques and rotational speeds of the three elements of the planetary gear unit, and hence it is possible to drive the first rotating machine 10 by the same operation characteristics as those of the planetary gear unit.

<Second Rotating Machine 20>

Next, the second rotating machine 20 will be described. The second rotating machine 20 is formed by a DC brushless motor, and as shown in FIG. 106, includes a casing 21 fixed to the above-described drive system housing, a rotor 22 housed in the casing 21 and concentrically fixed to the output shaft 13, a stator 23 fixed to the inner peripheral surface of a peripheral wall 21*c* of the casing 21, and the like.

The casing 21 includes left and right side walls 21*a* and 21*b*, and the hollow cylindrical peripheral wall 21*c* which has a hollow cylindrical shape and is fixed to outer peripheral ends of the left and right side walls 21*a* and 21*b*. Bearings 21*d* and 21*e* are attached to the inner ends of the left and right side walls 21*a* and 21*b*, respectively, and the output shaft 13 is rotatably supported by the bearings 21*d* and 21*e*.

The rotor 22 includes a turntable portion 22*a* concentrically fixed to the output shaft 13, and a hollow cylindrical ring portion 22*b* fixed to an outer end of the turntable portion 22*a*. The ring portion 22*b* is formed of a soft magnetic material, and a permanent magnet row is disposed on an outer peripheral surface of the ring portion 22*b* along the circumferential direction. The permanent magnet row is formed by a predetermined number of permanent magnets 22*c*, and the permanent magnets 22*c* are arranged at the same angular intervals of a predetermined angle such that each two adjacent ones of the permanent magnets 22*c* have different polarities.

The stator 23 has a plurality of stators 23*a* arranged on the inner peripheral surface of the peripheral wall 21*c* of the casing 21 along the circumferential direction. The stators 23*a*, which generate a rotating magnetic field, are arranged at the same angular intervals of a predetermined angle, and are electrically connected to the battery 33 through a 2ND-PDU 32 and the VCU 34 described later.

<ECU>

On the other hand, as shown in FIG. 105, the power unit 1 includes the ENG-ECU 29 for mainly controlling the engine 3, and an MOT-ECU 30 for mainly controlling the first rotating machine 10 and the second rotating machine 20. The ECUs 29 and 30 are implemented by microcomputers, not shown, each including a RAM, a ROM, a CPU, and an I/O interface (none of which are shown).

To the ENG-ECU 29 are connected various sensors, such as a crank angle sensor, a drive shaft rotational speed sensor, an accelerator pedal opening sensor, and a vehicle speed sensor (none of which are shown herein). The ENG-ECU 29 calculates an engine speed NE, a rotational speed ND of the drive shaft 8 (hereinafter referred to as "the drive shaft speed ND"), an accelerator pedal opening AP (an operation amount of an accelerator pedal, not shown), a vehicle speed VP, and the like, based on the detection signals output from these various sensors, and drives fuel injection valves and spark plugs according to these parameters, to thereby control the operation of the engine 3. Moreover, the ENG-ECU 29 is electrically connected to the MOT-ECU 30 and transmit and receive data of the engine speed NE, the drive shaft speed ND, and the like, to and from the MOT-ECU 30.

On the other hand, to the MOT-ECU 30 are connected the 1ST-PDU 31, the 2ND-PDU 32, a first rotational angle sensor 35, and a second rotational angle sensor 36. The 1ST-PDU 31 is implemented by an electric circuit including an inverter and the like, and is connected to the first rotating machine 10 and the battery 33. Moreover, similarly to the 1ST-PDU 31, the 2ND-PDU 32 is also implemented by an electric circuit including an inverter and the like, and is connected to the second rotating machine 20 and the battery 33. The 1ST-PDU 31 and the 2ND-PDU 32 are connected to the battery 33 through the VCU 34.

Moreover, the first rotational angle sensor 35 detects the rotational angle of the first rotor 14 with respect to the stator 16, and delivers a detection signal indicative of the same to the MOT-ECU 30. Moreover, the second rotational angle sensor 36 detects the rotational angle of the second rotor 15 with respect to the stator 16, and delivers a detection signal indicative of the same to the MOT-ECU 30. The MOT-ECU 30 controls the operating conditions of the two rotating machines 10 and 20 based on the detection signals from these sensors and various kinds of data from the above-described ENG-ECU 29, as described hereafter. The ENG-ECU 29 and the MOT-ECU 30 read data from a memory storing various maps and the like necessary when performing the control. Moreover, the ENG-ECU 29 or the MOT-ECU 30 calculates the temperature of the battery 33 from a signal detected by a battery temperature sensor attached to an outer covering of the battery 33 or the periphery thereof.

<Motive Power Control>

Figure 118:
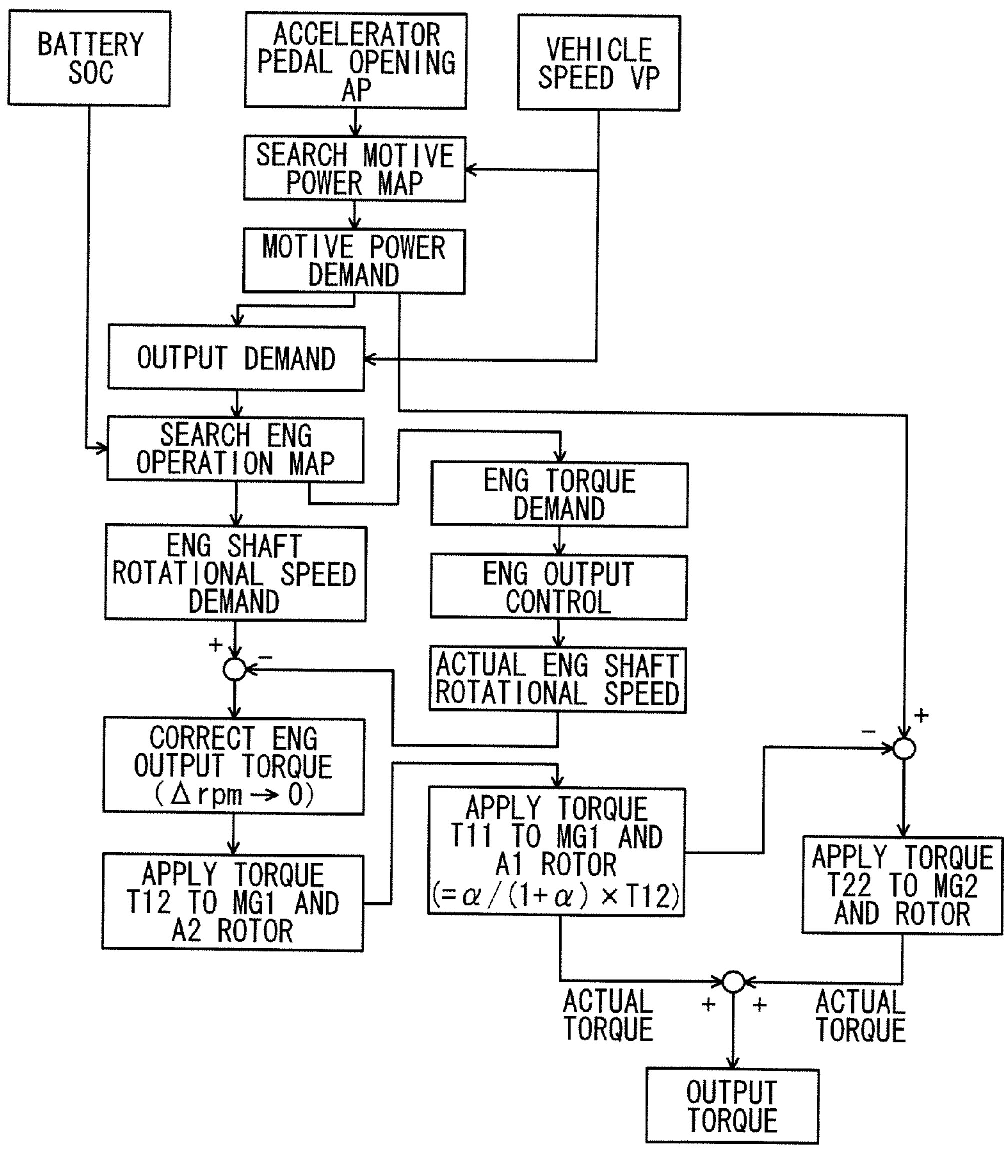
FIG. 118 is a block diagram showing motive power control in the power unit 1 shown in FIG. 104.
Figure 119:
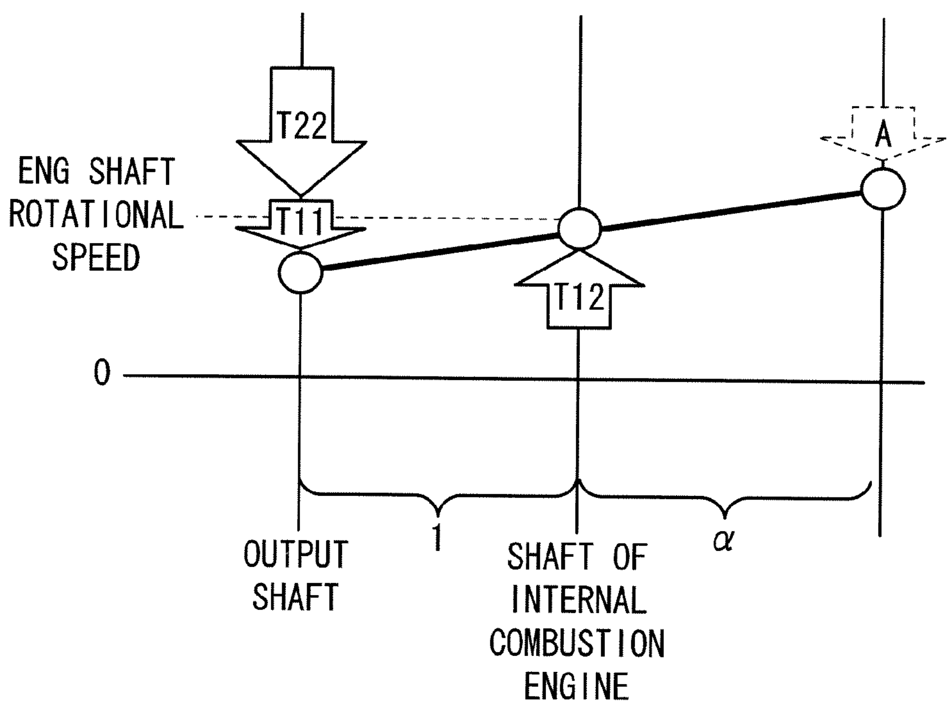
FIG. 119 is a collinear chart of the power unit 1 having a 1-common line 3-element structure.

Hereinafter, motive power control performed by the ENG-ECU 29 and the MOT-ECU 30 in the power unit 1 having the 1-common line 3-element structure described above will be described with reference to FIGS. 118 and 119. FIG. 118 is a block diagram showing motive power control in the power unit 1 of the twenty-third embodiment. FIG. 119 is a collinear chart in the power unit 1 having the 1-common line 3-element structure.

As shown in FIG. 118, the ENG-ECU 29 acquires a detection signal indicative of the aged negative plate AP and a detection signal indicative of the vehicle speed VP. Subsequently, the ENG-ECU 29 calculates a motive power (hereinafter referred to as a "motive power demand") corresponding to the accelerator pedal opening AP and the vehicle speed VP using a motive power map stored in the memory 45. Subsequently, the ENG-ECU 29 calculates an output (hereinafter referred to as "output demand") corresponding to the motive power demand and the vehicle speed VP. The output demand is an output required for a vehicle to perform traveling according to an accelerator pedal operation of the driver.

Subsequently, the ENG-ECU 29 acquires information on a remaining capacity (SOC: State of Charge) of the battery 33 from the detection signal indicative of the current and voltage values input and output to and from the battery 33 described above. Subsequently, the ENG-ECU 29 determines the output ratio of the engine 3 to the output demand, corresponding to the SOC of the battery 33. Subsequently, the ENG-ECU 29 calculates an optimum operating point corresponding to the output of the engine 3 using an ENG operation map stored in the memory 45. The ENG operation map is a map based on BSFC (Brake Specific Fuel Consumption) indicative of a fuel consumption rate at each operating point corresponding to the relationship between the shaft rotational speed, torque, and output of the engine 3. Subsequently, the ENG-ECU 29 calculates a shaft rotational speed (hereinafter referred to as a "ENG shaft rotational speed demand") of the engine 3 at the optimum operating point. In addition, the ENG-ECU 29 calculates the torque (hereinafter referred to as the "ENG torque demand") of the engine 3 at the optimum operating point.

Subsequently, the ENG-ECU 29 controls the engine 3 so as to output the ENG torque demand. Subsequently, the ENG-ECU 29 detects the shaft rotational speed of the engine 3. The shaft rotational speed of the engine 3 detected at that time is referred to as an "actual ENG shaft rotational speed". Subsequently, the ENG-ECU 29 calculates a difference Δrpm between the ENG shaft rotational speed demand and the actual ENG shaft rotational speed. The MOT-ECU 30 controls the output torque of the first rotating machine 10 so that the difference Δrpm approaches 0. The control is performed when the stator 16 of the first rotating machine 10 regenerates electric power. As a result, the torque T12 shown in the collinear chart of FIG. 119 is applied to the second rotor 15 of the first rotating machine 10 (MG1).

The torque T12 is applied to the second rotor 15 of the first rotating machine 10, whereby a torque T11 is generated in the first rotor 14 of the first rotating machine 10 (MG1). The torque T11 is calculated by the following equation (113).

$$T11=\alpha/(1+\alpha)\times T12 \quad (113)$$

Moreover, electric energy (regenerative energy) generated by the electric power regenerated by the stator 16 of the first rotating machine 10 is delivered to the 1ST-PDU 31. In the collinear chart of FIG. 119, the regenerative energy generated by the stator 16 of the first rotating machine 10 is indicated by dotted lines A.

Subsequently, the MOT-ECU 30 controls the 2ND-PDU 32 so that a torque obtained by subtracting the calculated torque T11 from the motive power demand calculated previously is applied to the rotor 22 of the second rotating machine 20. As a result, a torque T22 is applied to the rotor 22 of the second rotating machine 20 (MG2). In this case, when supplying electric energy to the second rotating machine 20, regenerative energy obtained by the electric power regenerated by the first rotating machine 10 may be used.

As such, the torque T11 is applied to the first rotor 14 of the first rotating machine 21, and the torque T22 is applied to the rotor 22 of the second rotating machine 20. The first rotor 14 of the first rotating machine 10 and the rotor 22 of the second rotating machine 20 are connected to the output shaft 13. Therefore, the sum of the torque T11 and the torque T22 is applied to the front wheels 4 and 4 of the vehicle.

As described above, the ENG-ECU 29 and the MOT-ECU 30 controls the torque generated in the second rotor 15 of the first rotating machine 10 so that the engine 3 operates at the optimum operating point, and controls the torque generated in the rotor 22 of the second rotating machine 20 so that the motive power demand is transmitted to the front wheels 4 and 4 of the vehicle.

In the above description, although the vehicle speed VP is used when calculating the motive power demand and the output demand, information on the rotational speed of an axle may be used in place of the vehicle speed VP.

Next, the method of controlling the first rotating machine 10 and the second rotating machine 20 using the MOT-ECU 30 will be described.

<During Engine Rest and Stoppage of Vehicle>

First, engine start control performed for starting the engine during stoppage of the vehicle will be described. In this control, in a case where the engine 3 is at rest and the vehicle 2 is at a stop, when predetermined engine-starting conditions are satisfied (for example, an ignition switch, not shown, is switched from an off state to an on state), the MOT-ECU 30 supplies electric power from the battery 33 to the first rotating machine 10 through the VCU 34 and the 1ST-PDU 31, to cause the stator 16 to generate the rotating magnetic field. In this case, in the first rotating machine 10, the first rotor 14 is mechanically connected to the front wheels 4, and the second rotor 15 is mechanically connected to the crankshaft of the engine 3, and therefore when the vehicle 2 is at a stop with the engine stopped, the rotational resistance of the first rotor 14 becomes much larger than that of the second rotor 15, which causes the second rotor 15 to be driven in the rotating direction of the rotating magnetic field with the first rotor 14 remaining at rest. As a result, the second rotor 15 is driven along with the rotation of the rotating magnetic field, whereby the engine 3 can be started.

<During Stoppage of Vehicle with Engine in Operation>

Moreover, in a case where the vehicle is at a stop with the engine 3 in operation, when predetermined vehicle-starting conditions are satisfied (for example, when a brake pedal, not shown, is not operated, and the accelerator pedal opening AP is not lower than a predetermined value), vehicle start control is executed. First, when the vehicle 2 is at a stop, the output shaft 13, that is, the first rotor 14 is in a state in which rotation thereof is stopped, so that all the motive powers caused by the engine 3 are transmitted to the stator 16 of the first rotating machine 10 through magnetic lines of force to cause the stator 16 to generate the rotating magnetic field, whereby an induced electromotive force (that is, back electromotive force voltage) is generated. The MOT-ECU 30 controls current supplied to the stator 16 to thereby regenerate electric power from the induced electromotive force caused by the stator 16, and supplies all the regenerated electric power to the second rotating machine 20 through the 1ST-PDU 31 and the 2ND-PDU 32. As a result, the output shaft 13 is driven by the rotor 22 of the second rotating machine 20, to drive the front wheels 4 and 4, whereby the vehicle 2 is started. After the vehicle 2 is started, the MOT-ECU 30 causes the electric power regenerated by the first rotating machine 10 to be progressively reduced as the vehicle speed increases, and at the same time causes the regenerated electric power to be supplied to the second rotating machine 20.

<During Travel of Vehicle with Engine in Operation>

Moreover, when the vehicle 2 is traveling with the engine 3 in operation, speed change control is executed. In the speed change control, depending on operating conditions of the engine 3 (for example, the engine speed NE, the accelerator pedal opening AP, and the like.) and/or traveling conditions of the vehicle 2 (for example, the vehicle speed VP), the first rotating machine 10 is controlled such that the ratio between part of motive power output from the engine 3, which is transmitted through the first rotor 14 to the front wheels 4, and part of the same, from which electric power is regenerated by the first rotating machine 10, is changed, and the second rotating machine 20 is controlled by supplying the regenerated electric power thereto. In this case, since the first rotating machine 10 can be operated by operating characteristics similar to those of a planetary gear unit, as described above, by controlling the first rotating machine 10 as described above and controlling the second rotating machine 20 by supplying the electric power regenerated by the first rotating machine 10 to the second rotating machine 20, provided that electrical losses are ignored, it is possible to change the ratio between the rotational speed of the second rotor 15 and the rotational speed of the output shaft 13, in other words, the ratio between the engine speed NE and the drive shaft speed ND as desired while transmitting all the motive power from the engine 3 to the front wheels 4 through the first rotating machine 10 and the second rotating machine 20. In short, by controlling the two rotating machines 10 and 20, it is possible to realize the functions of an automatic transmission.

Moreover, during the speed change control, when predetermined motive power-transmitting conditions are satisfied (for example, the engine speed NE and the accelerator pedal opening AP are in a predetermined region), the regeneration of electric power by the first rotating machine 10 is stopped, and the rotational speed of rotating magnetic field of the stator 16 is controlled to 0 by supplying lock current to the stator 16 or executing phase-to-phase short circuit control of the first rotating machine 10. When such control is performed, insofar as the motive power from the engine 3 is within a range capable of being transmitted by magnetism, it is possible to transmit all the motive power from the engine 3 to the front wheels 4 by magnetism, so that it is possible to enhance power transmission efficiency, compared with the case in which electric power regenerated by the first rotating machine 10 is caused to be supplied to the second rotating machine 20 through the 2ND-PDU 32.

On the other hand, in a case where the vehicle 2 is traveling with the engine 3 in operation (including when the engine 3 is in a decelerating fuel-cut operation), when a remaining charge SOC of the battery 33 is not higher than a predetermined value SOC_REF (for example, 50%), the electric power regenerated by the first rotating machine 10 and/or the second rotating machine 20 is controlled to execute charge control for charging the battery 33. In this way, it is possible to secure sufficient remaining charge SOC of the battery 33.

<Satisfaction of Assist Conditions During Operation of Engine>

Moreover, in a case where the engine 3 is in operation, when predetermined assist conditions (for example, when the vehicle 2 starts uphill, is traveling uphill, or is accelerating) are satisfied, assist control is executed. More specifically, by supplying electric power from the battery 33 to the first rotating machine 10 and/or the second rotating machine 20, the first rotating machine 10 and/or the second rotating machine 20 are controlled such that motive power from the first rotating machine 10 and/or the second rotating machine 20, and motive power from the engine 3 are transmitted to the front wheels 4. With this control, in addition to the engine 3, the first rotating machine 10 and/or the second rotating machine 20 are/is used as motive power sources, whereby the vehicle 2 can perform assist traveling or assist starting.

<Satisfaction of Rotating Machine-Driven Vehicle-Starting Conditions During Stoppage of Engine>

Moreover, in a case where the engine 3 is at rest and the vehicle 2 is at a stop, when predetermined rotating machine-driven vehicle-starting conditions are satisfied (for example, when the accelerator pedal opening AP is not lower than a predetermined value and the remaining charge SOC of the battery 33 is higher than the predetermined value SOC_REF with the brake pedal being not operated), the rotating machine-driven start control is executed. More specifically, electric power is simultaneously supplied from the battery 33 to the first rotating machine 10 and the second rotating machine 20 while the engine 3 is held at rest, whereby the two rotating machines 10 and 20 are simultaneously driven. At this time, the output shaft 13 starts to rotate simultaneously with the start of rotation of the second rotating machine 20, and in the first rotating machine 10, the rotational resistance of the second rotor 15 connected to the stopped engine 3 becomes considerably larger than that of the first rotor 14. As a result, by causing the stator 16 to generate rotating magnetic fields, the first rotor 14 can be driven, and the vehicle 2 can be started by the motive power from the first rotating machine 10 and the second rotating machine 20. It should be noted that if the rotational resistance of the engine 3 is insufficient, the engine 3 may be locked, or a device for increasing the rotational resistance may be provided.

As described above, according to the power unit 1 of the present embodiment, the engine 3, the first rotating machine 10 and the second rotating machine 20 are used as motive power sources, whereby it is possible to drive the vehicle 2. Moreover, the first rotating machine 10 is only required to be configured to include only one soft magnetic material element row, so that it is possible to reduce the size and manufacturing costs of the first rotating machine 10 to a corresponding extent. As a result, it is possible to reduce the size and manufacturing costs of the power unit 1 itself, and improve the degree of freedom in design. Moreover, as is clear from the above-described equations (111) and (112), depending on the setting of the pole pair number ratio α, that is, the pole number ratio m in the first rotating machine 10, it is possible to freely set the relationship between the three electrical angular velocities ωMFR, ωER1, and ωER2, and the relationship between the three torques TSE, TR1, and TR2. As a result, it is possible to further improve the degree of freedom in design.

Next, changes in torques when the pole pair number ratio α (=pole number ratio m) of the first rotating machine 10 is changed in the power unit 1 according to the twenty-third embodiment will be described. More specifically, a case where when the vehicle 2 is traveling with the engine 3 in operation, electric power is regenerated from part of motive power from the engine 3 by the first rotating machine 10, and the regenerated electric power is supplied to the second rotating machine 20 to thereby perform powering control of the second rotating machine 20 will be described by way of example.

First, in the power unit 1, it is assumed that the pole pair number ratio α of the first rotating machine 10 is set to a desired value other than a value of 1, and the drive wheels are directly connected to the output shaft 13. In this case, assuming that an electrical angular velocity of the input shaft 12, that is, the second rotor 15 is ωENG, an electrical angular velocity of the rotating magnetic field of the stator 16 is ωMG1, and an electrical angular velocity of the output shaft 13, that is, the first rotor 14 is ωOUT, the relationship between these electrical angular velocities is expressed for example, as shown in FIG. 120, and the following equation (114) holds.

[Mathematical Formula 83]

$$\omega MG1=(1+\alpha)\omega ENG-\alpha\cdot\omega OUT \tag{114}$$

Figure 120:
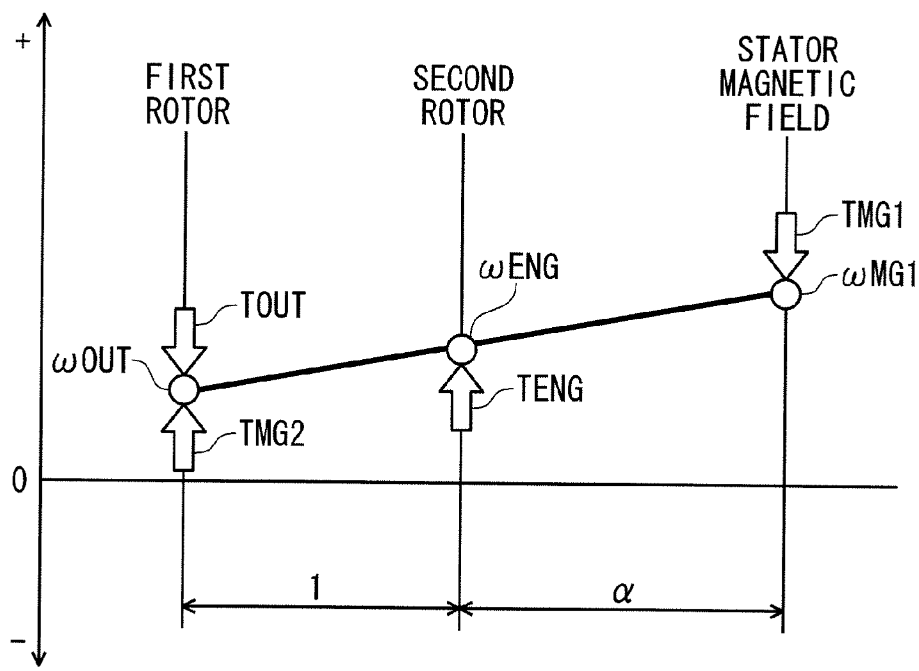

Moreover, assuming that a torque input from the engine 3 to the input shaft 12 is an engine torque TENG, a torque equivalent to the regenerated electric power and the electrical angular velocity ωMG1 of the rotating magnetic field of the stator 16 is a first rotating machine torque TMG1, a torque equivalent to the electric power supplied to the second rotating machine 20 and an electrical angular velocity ωMG2 is a second rotating machine torque TMG2, and a torque as a reaction force received by the drive wheels from a road surface, caused by the torque transmitted to the drive wheels, is a driving torque TOUT, the following equations (115) and (116) hold, and the relationship between these torques is expressed for example, as shown in FIG. 120. It should be noted that in the following equations (115) and (116), the upward torque in FIG. 120 is represented by a positive value.

[Mathematical Formula 84]

$$TMG1=-\frac{1}{1+\alpha}TENG \tag{115}$$

[Mathematical Formula 85]

$$TMG2=-\frac{\alpha}{1+\alpha}TENG-TOUT \tag{116}$$

Here, assuming that a first predetermined value α1 and a second predetermined value α2 are predetermined values of the pole pair number ratio α set such that α1<α2 holds, the first and second rotating machine torques TMG1(α1) and TMG2(α1) when α=α1 holds are expressed by the following equations (117) and (118), respectively.

[Mathematical Formula 86]

$$TMG1(\alpha 1)=-\frac{1}{1+\alpha 1}TENG \tag{117}$$

[Mathematical Formula 87]

$$TMG2(\alpha 1)=-\frac{\alpha 1}{1+\alpha 1}TENG-TOUT \tag{118}$$

Moreover, the first and second rotating machine torques TMG1(α2) and TMG2(α2) when α=α2 holds are expressed by the following equations (119) and (120), respectively.

[Mathematical Formula 88]

$$TMG1(\alpha 2) = -\frac{1}{1+\alpha 2}TENG \tag{119}$$

[Mathematical Formula 89]

$$TMG2(\alpha 2) = -\frac{\alpha 2}{1+\alpha 2}TENG - TOUT \tag{120}$$

From the above equations (117) and (119), an amount of change ΔTMG1 of the first rotating machine torque TMG1 when the pole pair number ratio α is changed from the first predetermined value α1 to the second predetermined value α2 is expressed by the following equation (121).

[Mathematical Formula 90]

$$\begin{aligned}\Delta TMG1 &= TMG1(\alpha 1) - TMG1(\alpha 1) \\ &= -\frac{\alpha 1 - \alpha 2}{(1+\alpha 1)(1+\alpha 2)}TENG\end{aligned} \tag{121}$$

Moreover, from the equations (118) and (120), an amount of change ΔTMG2 of the second rotating machine torque TMG2 when the pole pair number ratio α is changed from the first predetermined value α1 to the second predetermined value α2 is expressed by the following equation (122).

[Mathematical Formula 91]

$$\begin{aligned}\Delta TMG2 &= TMG2(\alpha 2) - TMG2(\alpha 1) \\ &= -\frac{\alpha 2 - \alpha 1}{(1+\alpha 1)(1+\alpha 2)}TENG\end{aligned} \tag{122}$$

Here, since TENG>0, TMG1<0, TMG2>0, and α1<α2 hold, as is clear from the above equations (121) and (122), by changing the pole pair number ratio α from the first predetermined value α1 to the second predetermined value α2, the absolute values of the first and second rotating machine torques TMG1 and TMG2 are reduced. That is, it is understood that by setting the pole pair number ratio α to a larger value, it is possible to reduce the size of the first and second rotating machines 10 and 20.

Moreover, if electric power is not input and output between the two rotating machines 10 and 20, and the battery 33, the electric power regenerated by the first rotating machine 10 is directly supplied to the second rotating machine 20, so that the following equation (123) holds.

[Mathematical Formula 92]

$$TMG2 = -\frac{\omega MG1}{\omega OUT}TMG1 \tag{123}$$

Here, assuming that the electric power supplied from the first rotating machine 10 to the second rotating machine 20 is a transmission electric power WMG, and the ratio of the transmission electric power WMG to an engine output WENG is an output ratio RW, the output ratio RW is calculated by the following equation (124).

[Mathematical Formula 93]

$$\begin{aligned}RW &= \frac{WMG}{WENG} \\ &= \frac{-TMG1\cdot\omega MG1}{TENG\cdot\omega ENG}\left(=\frac{TMG2\cdot\omega OUT}{TENG\cdot\omega ENG}\right)\end{aligned} \tag{124}$$

If the relationship between the above-described equations (114) and (115) is applied to the above equation (124), there is obtained the following equation (125).

[Mathematical Formula 94]

$$RW = 1 - \frac{\alpha}{1+\alpha}\cdot\frac{\omega OUT}{\omega ENG} \tag{125}$$

Here, a speed reducing ratio R is defined as expressed by the following equation (126), and if the thus defined speed reducing ratio R is applied to the above equation (125), there is obtained the following equation (127).

[Mathematical Formula 95]

$$RW = 1 - \frac{\alpha}{1+\alpha}\cdot\frac{\omega OUT}{\omega ENG} \tag{126}$$

[Mathematical Formula 96]

$$RW = 1 - \frac{\alpha}{1+\alpha}\cdot\frac{1}{R} \tag{127}$$

From the above equation (127), the output ratios RW(α1) and RW(α2) obtained when the pole pair number ratio α is set to the first predetermined value α1 and the second predetermined value α2, respectively, are calculated by the following equations (128) and (129).

[Mathematical Formula 97]

$$RW(\alpha 1) = 1 - \frac{\alpha 1}{1+\alpha 1}\cdot\frac{1}{R} \tag{128}$$

[Mathematical Formula 98]

$$RW(\alpha 2) = 1 - \frac{\alpha 2}{1+\alpha 2}\cdot\frac{1}{R} \tag{129}$$

From the above equations (128) and (129), an amount of change ΔRW of the output ratio when the pole pair number ratio cc is changed from the first predetermined value α1 to the second predetermined value α2 is expressed by the following equation (130).

[Mathematical Formula 99]

$$\begin{aligned}\Delta RW &= RW(\alpha 2) - RW(\alpha 1) \\ &= -\frac{\alpha 2 - \alpha 1}{(1+\alpha 1)(1+\alpha 2)}\cdot\frac{1}{R}\end{aligned} \tag{130}$$

Figure 121:
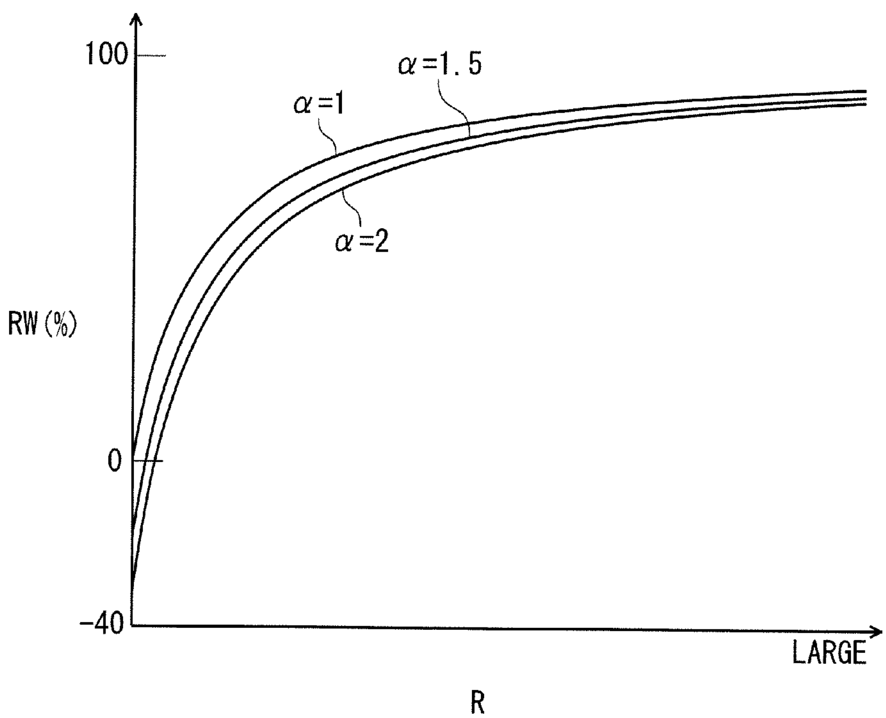

Here, since α1<α2 holds, as is clear from the above equation (130), it is understood that by changing the pole pair number ratio α from the first predetermined value α1 to the second predetermined value α2, it is possible to reduce the output ratio RW, whereby it is possible to reduce the transmission electric power WMG. Moreover, in the above-described equation (127), the relationship between the output ratio RW and the speed reducing ratio R when the pole pair number ratio α is set to values of 1, 1.5, and 2 is expressed as shown in FIG. 121. As is clear from FIG. 121, it is understood that by setting the pole pair number ratio α to a larger value, it is possible to reduce the transmission electric power WMG throughout the whole range of the speed reducing ratio R. In general, from the efficiency viewpoint, mechanical motive power transmission or motive power transmission by magnetism is more advantageous, compared with converting electric power to motive power by the rotating machine, and hence as described above, it is possible to improve transmission efficiency by reducing the transmission electric power WMG. That is, as for the power unit of the present embodiment, by setting the pole pair number ratio α (=pole number ratio m) to a larger value, it is possible to improve transmission efficiency.

It should be noted that although the twenty-third embodiment is an example in which the power unit 1 is applied to the vehicle 2 including the front wheels 4 as the driven parts, this is not limitative, but for example, the power unit can be applied to various industrial apparatuses, such as boats and aircrafts. When the power unit 1 is applied to a boat, a section which generates power for propulsion, such as a screw, corresponds to the driven part, and when the power unit is applied to an aircraft, a section which generates power of propulsion, such as a propeller and a rotor, corresponds to the driven part.

Moreover, although the twenty-third embodiment is an example in which an internal combustion engine powered by gasoline is employed as a heat engine, this is not limitative, but there may be employed any other apparatus insofar as it continuously converts heat energy to mechanical energy. For example, as a heat engine, there may be employed an internal combustion engine powered by light oil or natural gases, or an external combustion engine, such as a Stirling engine.

Moreover, although the twenty-third embodiment is an example in which in the first rotating machine 10, the number of the stator magnetic poles is set to "4," the number of magnetic poles is set to "8," and the number of the soft magnetic material cores 15*a* as the soft magnetic material elements is set to "6," respectively, the respective numbers of the stator magnetic poles, the magnetic poles, and the soft magnetic material elements in the first rotating machine of the present invention are not limited to these values, but desired numbers can be employed as the numbers of the stator magnetic poles, the magnetic poles, and the soft magnetic material elements, insofar as the ratio therebetween, that is, the element number ratio satisfies 1:m:(1+m)/2 in the case where the pole number ratio m is a positive value other than a value of 1. Moreover, although the first rotating machine 10 of the twenty-third embodiment is an example in which m=2 is set in the element number ratio, the element number ratio m is not limited to this, but it is only required to be a positive value other than a value of 1.

Moreover, although the twenty-third embodiment is an example in which the magnetic poles of the permanent magnets 14*a* are used as the magnetic poles of the first rotor 14, the first rotor 14 may be provided with a stator row, and the magnetic poles of the permanent magnets may be replaced by the magnetic poles generated in the stator row.

On the other hand, although the twenty-third embodiment is an example in which the MOT-ECU 30, the 1ST-PDU 31, and the 2ND-PDU 32 are used as control means for controlling the operations of the first rotating machine 10 and the second rotating machine 20, the control means for controlling the first rotating machine 10 and the second rotating machine 20 is not limited to these, but any other control means may be used insofar as it can control the operations of these rotating machines 10 and 20. For example, as the control means for controlling the two rotating machines 10 and 20, an electric circuit equipped with a microcomputer may be used.

Figure 122:
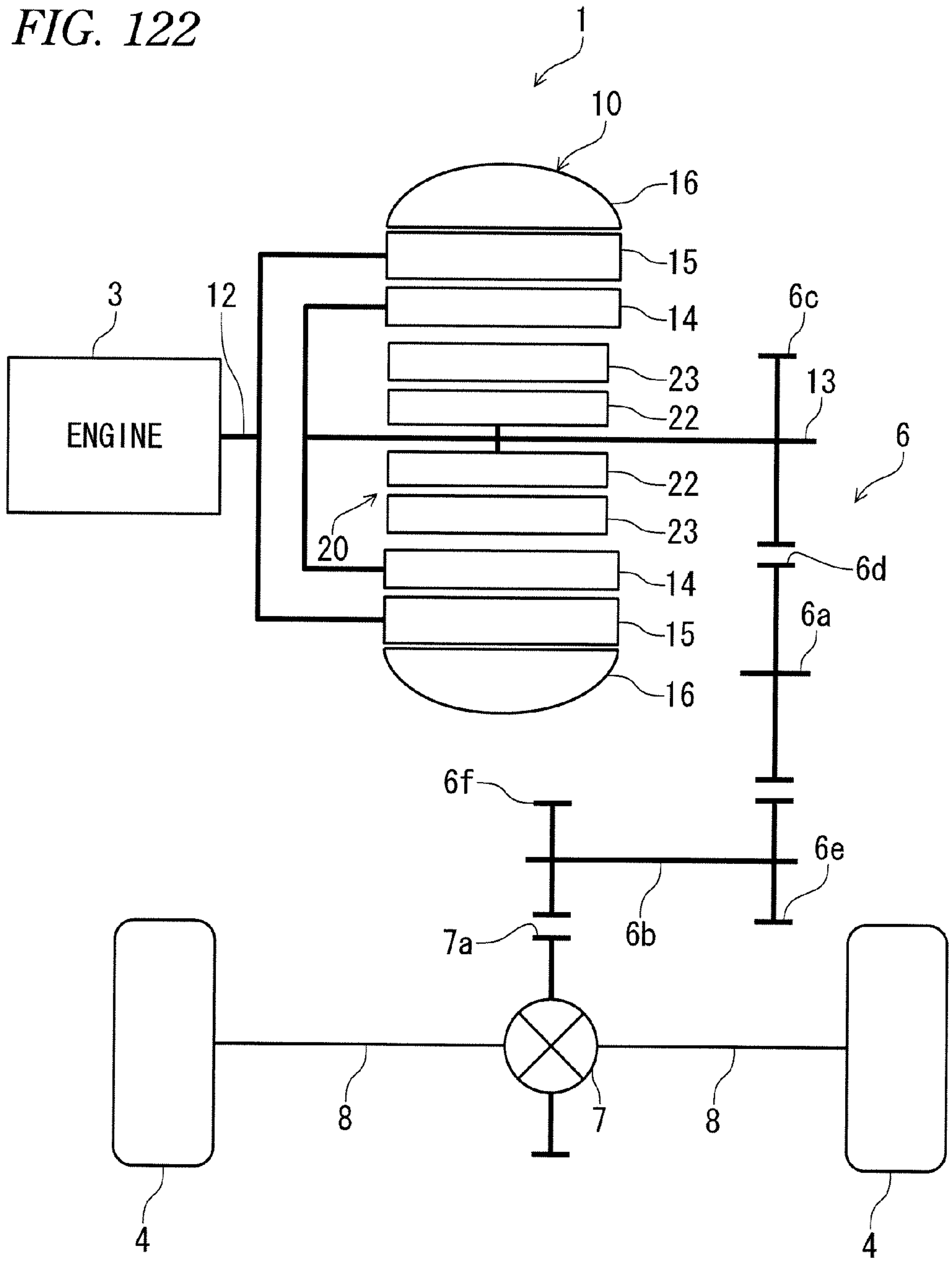

It should be noted that although the twenty-third embodiment is an example in which the first rotating machine 10 and the second rotating machine 20 are axially arranged side by side on the output shaft 13, the arrangement of the first rotating machine 10 and the second rotating machine 20 is not limited to this. For example, as shown in FIG. 122, the first and second rotating machines 10 and 20 may be radially arranged side by side such that the first rotating machine 10 is positioned outside the second rotating machine 20. By doing so, it is possible to reduce the size in the axial direction of the two rotating machines 10 and 20. As a result, it is possible to improve the degree of freedom in design of the power unit 1.

Figure 123:
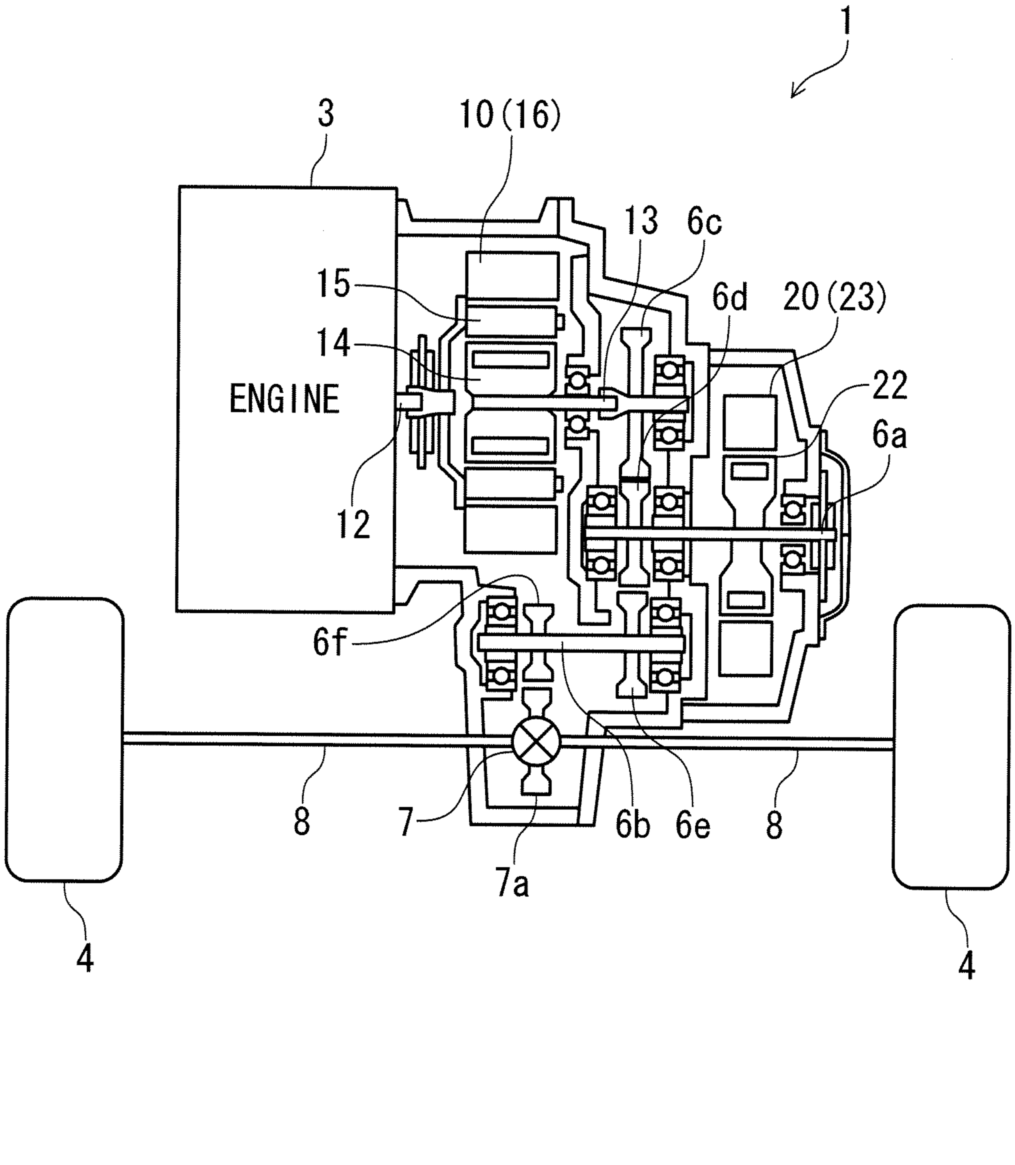

Moreover, as shown in FIG. 123, the first rotor 14 of the first rotating machine 10, and the rotor 22 of the second rotating machine 20 may be arranged on different shafts. It should be noted that in the figure, hatching in cross-sections are omitted for ease of understanding. As shown in the figure, in the second rotating machine 20, the rotor 22 is provided not on the above-described output shaft 13 but on the first gear shaft 6*a*. In this way, it is possible to improve the degree of freedom in design of the power unit 1 in respect of the arrangement of the two rotating machines 10 and 20.

Figure 124:
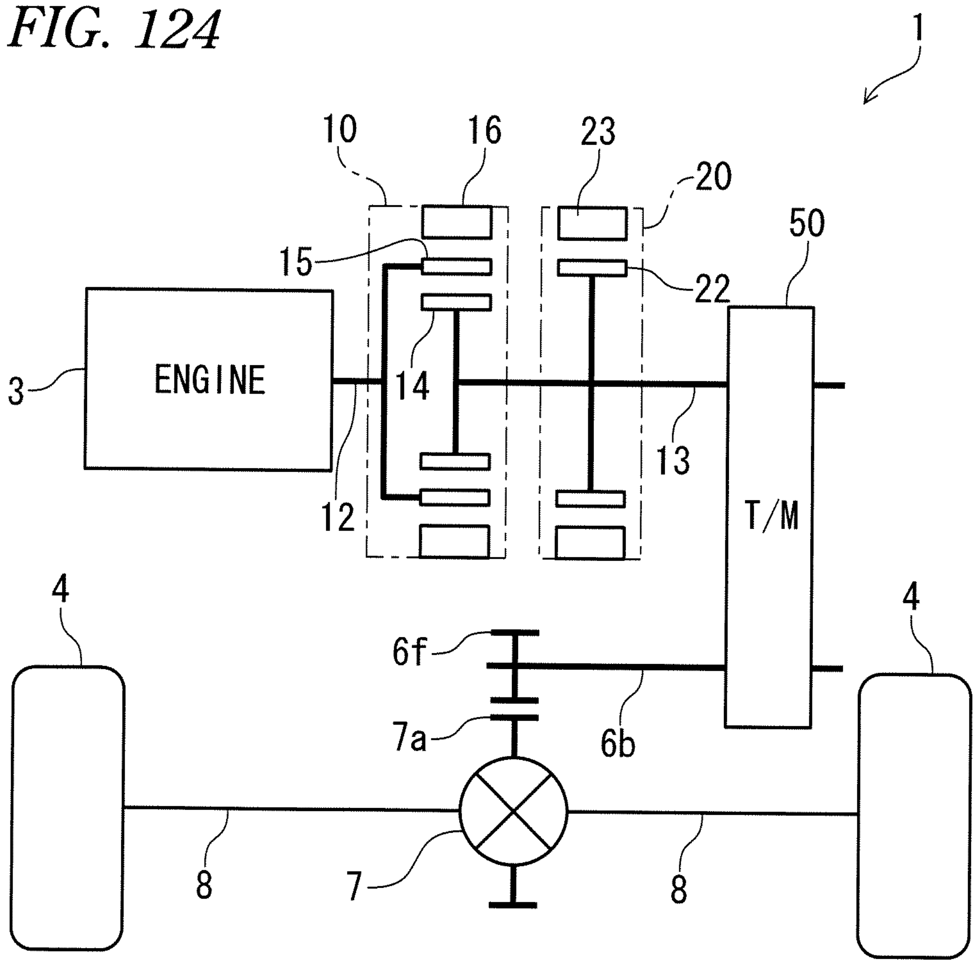

On the other hand, in the power unit 1 according to the twenty-third embodiment, as shown in FIG. 124, the gear mechanism 6 may be replaced by a transmission (indicated by "T/M" in the FIG. 50. The transmission 50 changes the speed reducing ratio between the output shaft 13 and the front wheels 4 in a stepped or stepless manner and the MOT-ECU 30 controls the speed change operation. It should be noted that as the transmission 50, there may be employed any of a stepped automatic transmission equipped with a torque converter, a belt-type stepless transmission, a toroidal-type stepless transmission, an automatic MT (stepped automatic transmission which executes a connecting or disconnecting operation of a clutch and a speed change operation, using an actuator), and the like as appropriate.

With this arrangement, it is possible to set the torque to be transmitted to the transmission 50 through each of the first rotating machine 10 and the second rotating machine 20 to a small value, for example, by setting the speed reducing ratio of the transmission 50 for a low-rotational speed and high-load region to a large value, whereby the size of the first rotating machine 10 and the second rotating machine 20 can be reduced. On the other hand, it is possible to reduce the rotational speed of the first rotating machine 10 and the second rotating machine 20, by setting the speed reducing ratio of the transmission 50 for a high-rotational speed and high-load region to a small value. Therefore, in the case of the first rotating machine 10, it is possible to reduce the magnetic field rotational speed, and hence it is possible to reduce energy loss and improve the transmission efficiency as well as prolong the service life thereof. Moreover, as for the second rotating machine 20, it is possible to improve the operating efficiency and prolong the service life thereof.

Figure 125:
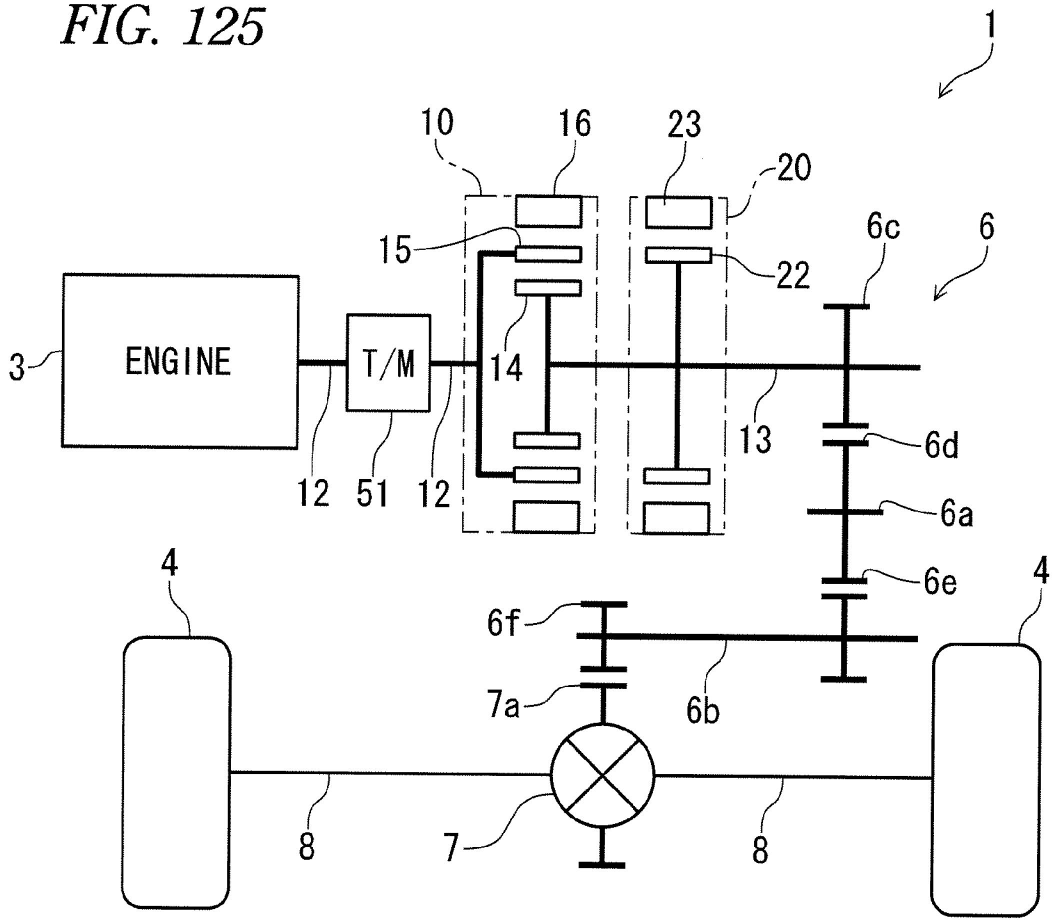

Moreover, in the power unit 1 according to the twenty-third embodiment, as shown in FIG. 125, a transmission 51 may be interposed in an intermediate portion of the input shaft 12 extending between the engine 3 and the second rotor 15. The transmission 51 changes a speed increasing ratio between the engine 3 and the second rotor 15 in a stepped or stepless manner and the MOT-ECU 30 controls the speed change operation. It should be noted that as the transmission 51, similarly to the transmission 50, there may be employed any of a stepped automatic transmission equipped with a torque converter, a belt-type stepless transmission, a toroidal-type stepless transmission, an automatic MT, and the like on an as-needed basis.

With this arrangement, for example, by setting both the speed increasing ratio of the transmission 51 for a low-rotational speed and high-load region and a final speed reducing ratio of a final reducer (that is, the differential gear mechanism 7) to large values, it is possible to set the torque to be transmitted to the final reducer side through the first rotating machine 10 and the second rotating machine 20 to a small value, whereby the size of the first rotating machine 10 and the second rotating machine 20 can be reduced. On the other hand, by setting the speed increasing ratio of the transmission 51 for a high-vehicle speed and high-load region to a small value (or 1:1), it is possible to reduce the rotational speed of the first rotating machine 10 and that of the second rotating machine 20. Therefore, as described above, in the case of the first rotating machine 10, it is possible to reduce the magnetic field rotational speed, whereby it is possible to reduce the energy loss and improve the transmission efficiency as well as prolong the service life thereof. Moreover, as for the second rotating machine 20, it is possible to improve the operating efficiency and prolong the service life thereof.

Figure 126:
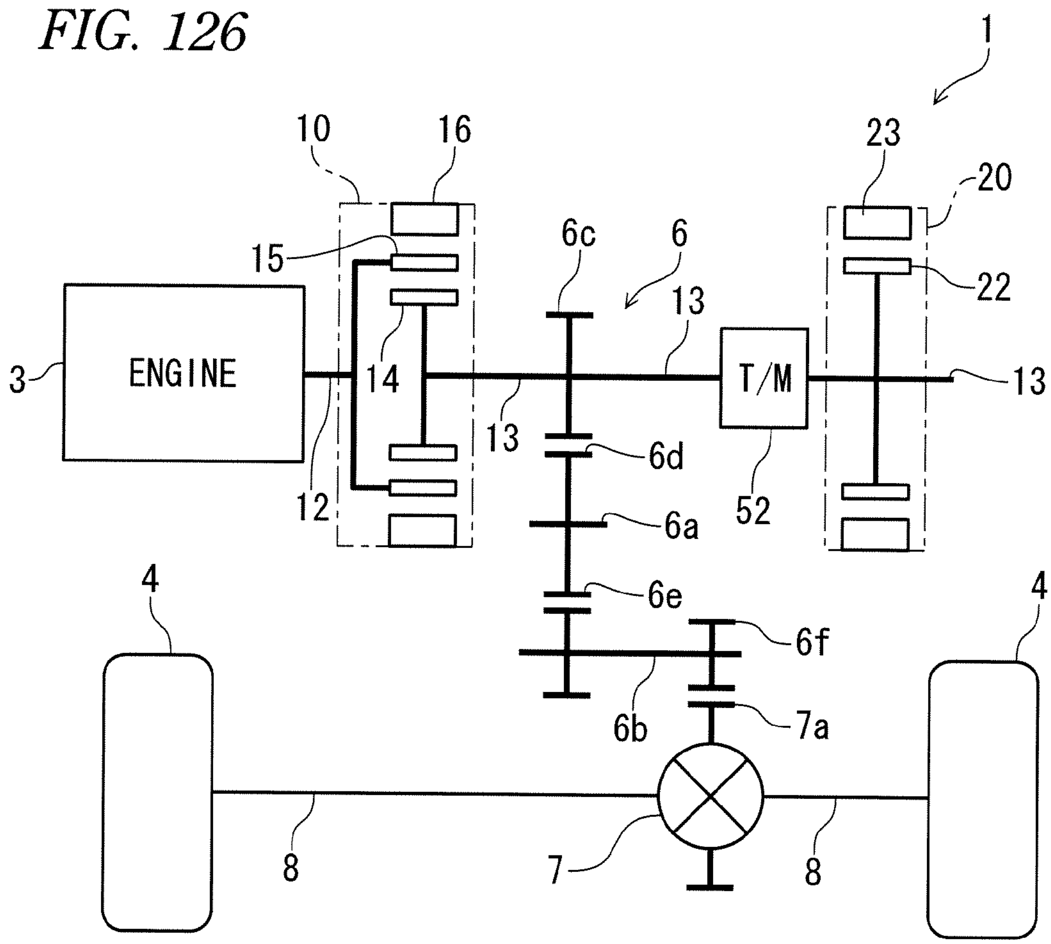

Moreover, in the power unit 1 according to the twenty-third embodiment, as shown in FIG. 126, the location of the gear mechanism 6 may be changed to a portion of the output shaft 13 between the first rotor 14 and the second rotor 22, and a transmission 52 may be provided in a portion of the output shaft 13 between the gear mechanism 6 and the rotor 22. The transmission 52 changes the speed reducing ratio between the rotor 22 and the gear 6*c* in a stepped or stepless manner and the MOT-ECU 30 controls the speed change operation. It should be noted that as the transmission 52, similarly to the transmission 50 described above, there may be employed any of a stepped automatic transmission equipped with a torque converter, a belt-type stepless transmission, a toroidal-type stepless transmission, an automatic MT, and the like on an as-needed basis.

With this arrangement, for example, by setting the speed reducing ratio of the transmission 52 for a low-rotational speed and high-load region to a large value, it is possible to set the torque to be transmitted from the second rotating machine 20 to the front wheels 4 to a small value, whereby the size of the second rotating machine 20 can be reduced. On the other hand, by setting the speed reducing ratio of the transmission 52 for a high-vehicle speed and high-load region to a small value, it is possible to reduce the rotational speed of the second rotating machine 20, whereby it is possible to improve the operating efficiency and prolong the service life thereof, as described above.

<Battery SOC-Based Control>

As described above, in accordance with the operation mode of the power unit 1 of the present embodiment, electric power is supplied from the battery 33 to the first rotating machine 10 and/or the second rotating machine 20, and electric power generated by the first rotating machine 10 and/or the second rotating machine 20 is charged into the battery 33. Moreover, as described above, the ENG-ECU 29 and the MOT-ECU 30 calculate the charge state of the battery 33 based on the detection signal from a current-voltage sensor (not shown).

Figure 127:
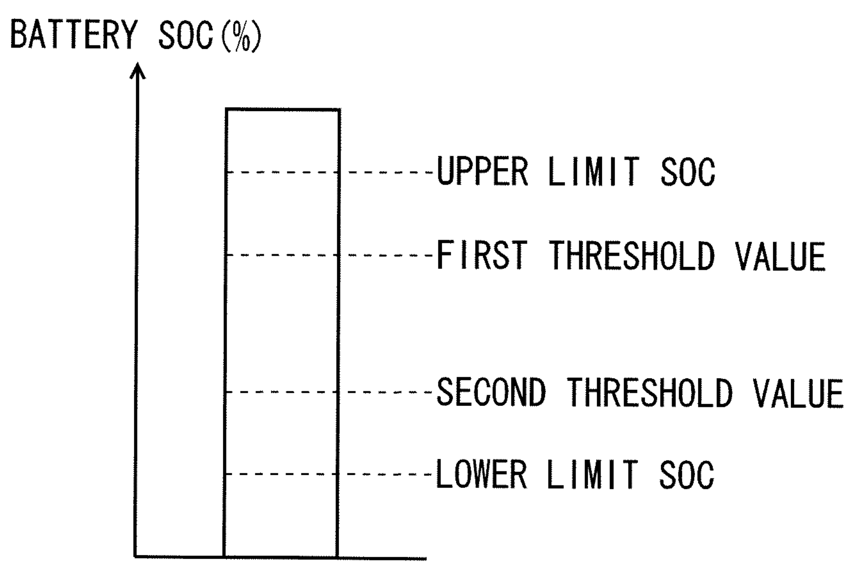

The battery 33 is formed by a secondary battery such as a nickel-hydrogen battery or a lithium-ion battery. In order to sufficiently utilize the performance of a secondary battery, it is necessary to always monitor the remaining capacity (SOC: State of Charge) thereof and prevent overcharge and overdischarge. Thus, the ENG-ECU 29 and the MOT-ECU 30 of the present embodiment perform control according to the SOC (hereinafter referred to as a "battery SOC") of the battery 33. FIG. 127 is a diagram showing the range of battery SOC when a battery is repeatedly charged and discharged. As shown in FIG. 127, the ENG-ECU 29 and the MOT-ECU 30 control the operation of the engine 3 and the first and second rotating machines 10 and 20 so that the battery SOC falls within the range from the lower limit SOC and the upper limit SOC.

<Overcharge Preventing Control at the Time of ENG-Based Start>

When the operation mode of the power unit 1 is "during engine operation," the stator 16 of the first rotating machine 10 performs regenerative electric power generation. The regenerative energy generated at that time is transmitted and charged into the battery 33. However, when the battery 33 is charged in a state where the battery SOC is close to the upper limit SOC, the battery SOC may exceed the upper limit SOC. Thus, the ENG-ECU 29 and the MOT-ECU 30 perform the following control described later when the battery SOC is not lower than a first threshold value lower than the upper limit SOC shown in FIG. 127.

When the operation mode of the power unit 1 is "during engine operation," and the battery SOC is not lower than the first threshold value, the ENG-ECU 29 controls the engine 3 so that the engine 3 operates with a shaft rotational speed lower than the ENG shaft rotational speed demand of the engine 3 described with reference to FIG. 118 without changing the output torque (the torque T12). FIGS. 128(*a*) and 128(*b*) show collinear charts when the operation mode of the power unit 1 is "during engine operation," in which FIG. 128(*a*) shows a collinear chart when the battery SOC is lower than the first threshold value, and FIG. 128(*b*) shows a collinear chart when the battery SOC is not lower than the first threshold value. As shown in FIG. 128(*b*), when the shaft rotational speed of the engine 3 is restricted to be low, the first magnetic field rotational speed VMF1 of the first rotating magnetic field in the stator 16 of the first rotating machine 10 is controlled to be lower than the first magnetic field rotational speed VMF1 shown in FIG. 128(*a*). As a result, the regenerative energy generated by the first rotating machine 10 of the case shown in FIG. 128(*b*) becomes lower than the regenerative energy of the case shown in FIG. 128(*a*).

As above, when the operation mode of the power unit 1 is "during engine operation," the ENG-ECU 29 controls the engine 3 so that the engine 3 operates with a shaft rotational speed lower than the ENG shaft rotational speed demand without changing the output torque, whereby the amount of electric power charged into the battery 33 decreases. Thus, when the battery SOC is not lower than the first threshold value close to the upper limit SOC, the ENG-ECU 29 performs such control, whereby overcharge of the battery 33 can be prevented. In this case, as the result of the control, the output of the engine 3 decreases. However, since the torque from the second rotating machine 20 is added, there is no change in the output torque transmitted to the drive wheels 4 and 4.

The torque required of the engine 3 by the ENG-ECU 29 at the time of performing the control described above may be smaller than the ENG torque demand described with reference to FIG. 118. When controlling the engine 3 so as to operate at the optimum operating point, the ENG-ECU 29 controls the engine 3 so as to output a torque corresponding to the shaft rotational speed at the time of performing the control. Since the torque at the optimum operating point in the low shaft rotational speed of the engine 3 is approximately proportional to the shaft rotational speed, the torque at that time is smaller than the ENG torque demand. Although the output of the engine 3 decreases further if such control is performed, the engine 3 can operate at the optimum operating point.

Moreover, in the above control, the engine 3 is controlled so as to operate with a shaft rotational speed lower than the ENG shaft rotational speed demand of the engine 3. However, when the regenerative energy per unit time generated in the stator 16 of the first rotating machine 10 with respect to the torque required of the engine 3 exceeds a prescribed value, the engine 3 may be controlled so as to output a torque lower than the ENG torque demand described with reference to FIG. 118. In this case, the shall rotational speed of the engine 3 may be the same as or not be larger than the ENG shaft rotational speed demand described with reference to FIG. 118.

<Overdischarge Preventing Control at the Time of EV Traveling>

When the operation mode of the power unit 1 is "EV traveling," the stator 23 of the second rotating machine 20 is in a powering operating condition. Therefore, when the operation mode of the power unit 1 is "EV traveling," the battery 33 performs discharge. However, when the battery 33 is discharged in a state where the battery SOC is close to the lower limit SOC, the battery SOC may become lower than the lower limit SOC. Thus, the ENG-ECU 29 performs the following control described later when the battery SOC is not higher than the second threshold value higher than the lower limit SOC shown in FIG. 127.

When the operation mode of the power unit 1 is "EV traveling," and the battery SOC is not higher than the second threshold value, the ENG-ECU 29 controls the engine 3 so that the engine 3 operates at the optimum operating point. FIGS. 129(*a*) and 129(*b*) show collinear charts when the operation mode of the power unit 1 is "EV traveling," in which FIG. 129(*a*) shows a collinear chart when the battery SOC is higher than the second threshold value, and FIG. 129(*b*) shows a collinear chart when the battery SOC is not higher than the second threshold value. As shown in FIG. 129(*b*), When the engine 3 is driven, regenerative energy is generated by the first rotating machine 10.

As above, when the operation mode of the power unit 1 is "EV traveling," the engine 3 is controlled to operate, whereby the amount of electric power discharged from the battery 33 decreases. Thus, when the battery SOC is not higher than the second threshold value close to the lower limit SOC, the ENG-ECU 29 performs the control, whereby overdischarge of the battery 33 is prevented.

The second threshold value is variable. The energy required for the first rotating machine 10 to start the engine 3 is different depending on the vehicle speed VP, and the required energy is large as the vehicle speed VP increases. Thus, the ENG-ECU 29 sets the second threshold value corresponding to the vehicle speed VP. That is, the ENG-ECU 29 sets the second threshold Value to be high as the vehicle speed VP increases.

<Overcharge Preventing Control at the Time of ENG-Based Rearward Start>

When the operation mode of the power unit 1 is "ENG-based rearward start," the stator 16 of the first rotating machine 10 performs regenerative electric power generation. The regenerative energy generated at that time is transmitted and charged into the battery 33. However, when the battery 33 is charged in a state where the battery SOC is close to the upper limit SOC, the battery SOC may exceed the upper limit SOC. Thus, the ENG-ECU 29 and the MOT-ECU 30 perform the following control described later when the battery SOC is not lower than a first threshold value lower than the upper limit SOC shown in FIG. 127.

When the operation mode of the power unit 1 is "ENG-based rearward start," and the battery SOC is not lower than the first threshold value, the ENG-ECU 29 controls the engine 3 so that the engine 3 operates with a shaft rotational speed lower than the ENG shaft rotational speed demand of the engine 3 described with reference to FIG. 118 without changing the output torque (the torque T12). FIGS. 130(*a*) and 130(*b*) show collinear charts when the operation mode of the power unit 1 is "ENG-based rearward start," in which FIG. 130(*a*) shows a collinear chart when the battery SOC is lower than the first threshold value, and FIG. 130(*b*) shows a collinear chart when the battery SOC is not lower than the first threshold value. As shown in FIG. 130(*b*), when the shaft rotational speed of the engine 3 is restricted to be low, the first magnetic field rotational speed VMF1 of the first rotating magnetic field in the stator 16 of the first rotating machine 10 is controlled to be lower than the first magnetic field rotational speed VMF1 shown in FIG. 130(*a*). As a result, the regenerative energy generated by the first rotating machine 10 decreases.

As above, when the operation mode of the power unit 1 is "ENG-based rearward start," the ECU 2 controls the engine 3 so that the engine 3 operates with a shaft rotational speed lower than the ENG shaft rotational speed demand without changing the output torque, whereby the amount of electric power charged into the battery 33 decreases. Thus, when the battery SOC is not lower than the first threshold value close to the upper limit SOC, the ENG-ECU 29 performs such control, whereby overcharge of the battery 33 can be prevented. In this case, as the result of the control, the output of the engine 3 decreases. However, since the output torque of the engine 3 is not changed, there is no change in the output torque transmitted to the drive wheels 4 and 4.

The torque required of the engine 3 by the ENG-ECU 29 at the time of performing the control described above may be smaller than the ENG torque demand described with reference to FIG. 118. When controlling the engine 3 so as to operate at the optimum operating point, the ENG-ECU 29 controls the engine 3 so as to output a torque corresponding to the shaft rotational speed at the time of performing the control. Since the torque at the optimum operating point in the low shaft rotational speed of the engine 3 is approximately proportional to the shaft rotational speed, the torque at that time is smaller than the ENG torque demand. Although the output of the engine 3 decreases further if such control is performed, the engine 3 can operate at the optimum operating point.

Moreover, in the above control, the engine 3 is controlled so as to operate with a shaft rotational speed lower than the ENG shaft rotational speed demand of the engine 3. However, when the regenerative energy per unit time generated in the stator 16 of the first rotating machine 10 with respect to the torque required of the engine 3 exceeds a prescribed value, the engine 3 may be controlled so as to output a torque lower than the ENG torque demand described with reference to FIG. 118. In this case, the shaft rotational speed of the engine 3 may be the same as or not be larger than the ENG shaft rotational speed demand described with reference to FIG. 118.

Twenty-fourth Embodiment

Next, a power unit 1A according to a twenty-fourth embodiment will be described with reference to FIG. 131. As shown in the figure, the power unit 1A is distinguished from the power unit 1 according to the twenty-third embodiment in that the second rotating machine 20 is employed as a motive power source for driving the rear wheels, and in the other respects, the power unit 1A is configured substantially similarly to the power unit 1 according to the twenty-third embodiment. Therefore, the following description will be given mainly of points different from the power unit 1 according to the twenty-third embodiment, and constituent elements of the power unit 1A identical to those of the power unit 1 according to the twenty-third embodiment are denoted by identical reference numerals, with detailed description omitted.

In the power unit 1A, the gear 6*d* on the first gear shaft 6*a* is in constant mesh with the gear 7*a* of the differential gear mechanism 7, whereby the rotation of the output shaft 13 is transmitted to the front wheels 4 and 4 through the gears 6*c* and 6*d*, and the differential gear mechanism 7.

Moreover, the second rotating machine 20 is connected to the left and right rear wheels 5 and 5 through a differential gear mechanism 25, and left and right drive shafts 26 and 26, whereby as described later, the motive power from the second rotating machine 20 is transmitted to the rear wheels 5 and 5 (second driven part).

The rotor 22 of the second rotating machine 20 is concentrically fixed to a left end of a gear shaft 24, and a gear 24*a* is connected to a right end of the gear shaft 24 concentrically with the gear shaft 24. The gear 24*a* is in constant mesh with a gear 25*a* of the differential gear mechanism 25. With the above arrangement, the motive power from the second rotating machine 20 is transmitted through the gear 24*a* and the differential gear mechanism 25 to the rear wheels 5 and 5.

According to the power unit 1A of the present embodiment, configured as above, it is possible to obtain the same advantageous effects as provided by the power unit 1 according to the twenty-third embodiment. In addition, at the start of the vehicle 2, by supplying electric power regenerated by the first rotating machine 10 to the second rotating machine 20, the vehicle 2 can be started in an all-wheel drive state, whereby it is possible to improve startability on low μ roads including a snowy road. Moreover, since the vehicle 2 can run in an all-wheel drive state even during traveling, it is possible to improve traveling stability of the vehicle 2 on low μ roads.

Moreover, in the power unit 1A according to the twenty-fourth embodiment, as shown in FIG. 132, a transmission 53 may be provided in an intermediate portion of the input shaft 12 extending between the engine 3 and the second rotor 15, and a transmission 54 may be provided in a portion of the gear shaft 24 between the gear 24*a* and the rotor 22. The transmission 53 changes the speed increasing ratio between the engine 3 and the second rotor 15 in a stepped or stepless manner and the MOT-ECU 30 controls the speed change operation. Moreover, the transmission 54 changes the speed reducing ratio between the second rotating machine 20 and the rear wheels 5 in a stepped or stepless manner and the MOT-ECU 30 controls the speed change operation. It should be noted that as the transmissions 53 and 54, similarly to the transmission 50 described above, there may be employed any of a stepped automatic transmission equipped with a torque converter, a belt-type stepless transmission, a toroidal-type stepless transmission, an automatic MT, and the like on an as-needed basis.

With this arrangement, for example, by setting both the speed increasing ratio of the transmission 53 for a low-rotational speed and high-load region and the final speed reducing ratio of a final reducer (that is, the differential gear mechanism 7) to large values, it is possible to set the torque to be transmitted to a final reducer side through the first rotating machine 10 to a small value, whereby the size of the first rotating machine 10 can be reduced. On the other hand, by setting the speed increasing ratio of the transmission 53 for a high-vehicle speed and high-load region to a small value (or 1:1), it is possible to reduce the rotational speed of the first rotating machine 10. This enables, as described above, the first rotating machine 10 to reduce the magnetic field rotational speed thereof, whereby it is possible to reduce the energy loss and improve the transmission efficiency as well as prolong the service life thereof.

Moreover, for example, by setting the speed reducing ratio of the transmission 54 for a low-rotational speed and high-load region to a large value, it is possible to set the torque to be generated by the second rotating machine 20 to a small value, whereby the size of the second rotating machine 20 can be reduced. On the other hand, by setting the speed reducing ratio of the transmission 54 for a high-vehicle speed and high-load region to a small value, it is possible to reduce the rotational speed of the second rotating machine 20, whereby it is possible to improve the operating efficiency and prolong the service life of the second rotating machine 20.

It should be noted that although in the example shown in FIG. 132, the two transmissions 53 and 54 are provided in the power unit 1A, one of the transmissions 53 and 54 may be omitted.

Twenty-Fifth Embodiment

Next, a power unit 1B according to a twenty-fifth embodiment will be described with reference to FIG. 133. As shown in the figure, the power unit 1B is distinguished from the power unit 1 according to the twenty-third embodiment in that the second rotating machine 20 and the 2ND-PDU 32 are omitted, and an electromagnetic brake 55 is added, and in the other respects, the power unit 1B is configured substantially similarly to the power unit 1 according to the twenty-third embodiment. Therefore, the following description will be given mainly of points different from the power unit 1 according to the twenty-third embodiment, and constituent elements of the power unit 1B identical to those of the power unit 1 according to the twenty-third embodiment are denoted by identical reference numerals, with detailed description omitted.

In the power unit 1B, similarly to the above-described power unit 1A according to the twenty-fourth embodiment, the gear 6*d* on the first gear shaft 6*a* is in constant mesh with the gear 7*a* of the differential gear mechanism 7, whereby the rotation of the output shaft 13 is transmitted to the front wheels 4 and 4 through the gears 6*c* and 6*d* and the differential gear mechanism 7.

Moreover, the electromagnetic brake 55 (brake device) is provided on the input shaft 12 between the first rotating machine 10 and the engine 3, and is electrically connected to the MOT-ECU 30. The ON/OFF state of the electromagnetic brake 55 is switched by the MOT-ECU 30. In the OFF state, the electromagnetic brake 55 permits rotation of the input shaft 12, whereas in the ON state, the electromagnetic brake 55 brakes the rotation of the input shaft 12.

Next, control of the first rotating machine 10 and the electromagnetic brake 55 by the MOT-ECU 30 will be described. It should be noted the electromagnetic brake 55 is controlled to the ON state only when rotating machine-driven start control, described later, is executed, and in the other various types of control than the rotating machine-driven start control, it is held in the OFF state.

First, engine start control will be described. The engine start control is for starting the engine 3 by the motive power from the first rotating machine 10 when the above-described predetermined engine-starting conditions are satisfied in a state where the engine 3 is at rest and the vehicle 2 is at a stop. More specifically, when the predetermined engine-starting conditions are satisfied, the electric power is supplied from the battery 33 to the first rotating machine 10 through the VCU 34 and the 1ST-PDU 31. In this way, as described above, the second rotor 15 is driven with the first rotor 14 remaining at rest. As a result, the engine 3 is started.

Moreover, in a case where the engine 3 is in operation with the vehicle at a stop, when the above-described predetermined vehicle-starting conditions are satisfied, the vehicle start control is executed. In the vehicle start control, if the predetermined vehicle-starting conditions are satisfied, first, the first rotating machine 10 regenerates electric power from motive power from the engine 3 (that is, performs electric power generation). Then, after the start of the electric power regeneration, the first rotating machine 10 is controlled such that the regenerated electric power is reduced. In this way, it is possible to start the vehicle 2 by the motive power from the engine 3 while preventing engine stalling.

Moreover, when the vehicle 2 is traveling with the engine 3 in operation, distribution control of engine power is executed. In the distribution control, depending on operating conditions of the engine 3 (for example, the engine speed NE and the accelerator pedal opening AP) and/or traveling conditions of the vehicle 2 (for example, the vehicle speed VP), the first rotating machine 10 is controlled such that the ratio between part of motive power output from the engine 3, which is transmitted through the first rotor 14 to the front wheels 4, and part of the same, from which electric power is regenerated by the first rotating machine 10, is changed. In this way, it is possible to cause the vehicle 2 to travel while appropriately controlling the regenerated electric power, depending on the operating conditions of the engine 3 and/or the traveling conditions of the vehicle 2.

Moreover, during the distribution control, when the above-described predetermined power-transmitting conditions are satisfied, the first rotating machine 10 is controlled such that the rotational speed of the rotating magnetic field of the stator 16 becomes equal to 0, whereby insofar as the motive power from the engine 3 is within a range capable of being transmitted by magnetism, it is possible to transmit all the motive power to the front wheels 4 by magnetism through the second rotor 15 and the first rotor 14.

On the other hand, in a case where the vehicle 2 is traveling with the engine 3 in operation (including when the engine 3 is in a decelerating fuel-cut operation), when the motive power from the engine is being regenerated as electric power, if the remaining charge SOC of the battery 33 is not higher than the above-described predetermined value SOC_REF, the regenerated electric power is supplied to the battery 33 whereby charge control for charging the battery 33 is executed. It should also be noted that when the electric power regeneration is performed during the above-described vehicle start control, if the remaining charge SOC of the battery 33 is not higher than the predetermined value SOC_REF, the charge control for charging the battery 33 is executed. In this way, it is possible to secure sufficient remaining charge SOC of the battery 33.

Moreover, in a case where the vehicle 2 is traveling with engine 3 in operation, when predetermined assist conditions are satisfied, the assist control is executed. More specifically, electric power in the battery 33 is supplied to the first rotating machine 10, and the first rotating machine 10 is controlled such that the front wheels 4 are driven by motive power from the engine 3 and motive power from the first rotating machine 10. With this control, the vehicle 2 can perform assist traveling by using the first rotating machine 10 as a motive power source, in addition to the engine 3.

Moreover, in a case where the engine 3 is at rest and the vehicle 2 is at a stop, when the above-described predetermined rotating machine-driven vehicle-starting conditions are satisfied, the electromagnetic brake 55 is turned on to brake the second rotor 15, and at the same time, electric power is supplied from the battery 33 to the first rotating machine 10, whereby powering control of the first rotating machine 10 is executed. In this way, it is possible to drive the front wheels 4 by the first rotating machine 10 with the engine 3 left at rest, to thereby start the vehicle 2. As a result, it is possible to improve fuel economy.

Twenty-Sixth Embodiment

Next, a power unit 1C according to a twenty-sixth embodiment will be described with reference to FIG. 134. As shown in the figure, the power unit 1C is distinguished from the power unit 1 according to the twenty-third embodiment in the arrangement of the first rotating machine 10 and the second rotating machine 20, but in the other respects, the power unit 1C is configured substantially similarly to the power unit 1 according to the twenty-third embodiment. Therefore, the following description will be given mainly of points different from the power unit 1 according to the twenty-third embodiment, and constituent elements of the power unit 1C identical to those of the power unit 1 according to the twenty-third embodiment are denoted by identical reference numerals, with detailed description omitted.

In the power unit 1C, the second rotating machine 20 is disposed between the engine 3 and the first rotating machine 10, and the rotor 22 of the second rotating machine 20 is concentrically fixed to a predetermined portion of the input shaft 12 (rotating shaft). Moreover, in the first rotating machine 10, the first rotor 14 is concentrically fixed to the right end of the input shaft 12 on the downstream side of the rotor 22, and the second rotor 15 is concentrically fixed to the left end of the output shaft 13. With this arrangement, during operation of the first rotating machine 10, when the second rotor 15 is rotating, motive power thereof is transmitted to the front wheels 4 and 4.

Next, a method of controlling both the first rotating machine 10 and the second rotating machine 20 by the MOT-ECU 30 during operation of the vehicle will be described.

<During Resting of Engine and Stoppage of Vehicle>

First, engine start control performed for starting the engine during stoppage of the vehicle will be described. In this control, in a case where the engine 3 is at rest and the vehicle 2 is at a stop, when the above-described predetermined starting conditions are satisfied, electric power is supplied from the battery 33 to the first rotating machine 10 and/or the second rotating machine 20, and powering control of the first rotating machine 10 and/or the second rotating machine 20 is executed such that motive power from the first rotating machine 10 and/or the second rotating machine 20 is transmitted to the engine 3 through the input shaft 12. With this control, the engine 3 can be started by the motive power from the first rotating machine 10 and/or the second rotating machine 20.

<During Stoppage of Vehicle with Engine in Operation>

Moreover, in a case where the vehicle 2 is at a stop with the engine 3 in operation, when the above-described predetermined vehicle-starting conditions are satisfied, vehicle start control is executed. More specifically, when the vehicle 2 is at a stop, motive power from the engine 3 is transmitted to the input shaft 12, whereby the first rotor 14 of the first rotating machine 10 is driven. In this state, if the first rotating machine 10 is controlled such that electric power regeneration is executed by the first rotating machine 10 and the regenerated electric power is supplied to the second rotating machine 20, the rotor 22 of the second rotating machine 20 drives the first rotor 14, whereby energy recirculation occurs. In this state, if the electric power regenerated by the first rotating machine 10 is controlled to be reduced, the second rotor 15 of the first rotating machine 10 rotates to drive the output shaft 13, which drives the front wheels 4 and 4, whereby the vehicle 2 is started. By controlling, after the start of the vehicle 2, the electric power regenerated by the first rotating machine 10 such that it is further reduced, and by executing, after the direction of the rotation of the magnetic field of the stator 16 of the first rotating machine 10 is changed from reverse rotation to normal rotation, regeneration control of the second rotating machine 20 and powering control of the first rotating machine 10, the vehicle speed is increased.

<During Traveling with Engine in Operation>

Moreover, when the vehicle 2 is traveling with the engine 3 in operation, speed change control is executed. In the speed change control, depending on operating conditions of the engine 3 (for example, the engine speed NE, the accelerator pedal opening AP, and the like.) and/or traveling conditions of the vehicle 2 (for example, the vehicle speed VP), the second rotating machine 20 is controlled such that the ratio between part of motive power output from the engine 3, which is transmitted through the input shaft 12 to the first rotor 14, and part of the same, from which electric power is regenerated by the second rotating machine 20, is changed, and the first rotating machine 10 is controlled by supplying the regenerated electric power to the first rotating machine 10. In this case, the first rotating machine 10 can be operated such that it exhibits operating characteristics similar to those of a planetary gear unit, as described above, and hence by controlling the second rotating machine 20, as described above, and controlling the first rotating machine 10 by supplying the electric power generated in the second rotating machine 20 to the first rotating machine 10, it is possible to change the ratio between the rotational speed of the input shaft 12 and that of the output shaft 13, in other words, the ratio between the engine speed NE and the drive shaft speed ND as desired while transmitting all the motive power from the engine 3 to the front wheels 4 through the first rotating machine 10 and the second rotating machine 20, provided that electrical losses are ignored. In short, by controlling the two rotating machines 10 and 20, it is possible to realize the functions of an automatic transmission.

Moreover, during the speed change control, when the above-described predetermined power-transmitting conditions are satisfied, the regeneration of electric power by the first rotating machine 10 is stopped, and the rotational speed of the rotating magnetic field of the stator 16 is controlled to 0 by supplying lock current to the stator 16 or executing phase-to-phase short circuit control of the first rotating machine 10. When such control is performed, insofar as the motive power from the engine 3 is within a range capable of being transmitted by magnetism, it is possible to transmit all the motive power from the engine 3 to the front wheels 4 by magnetism, so that it is possible to enhance power transmission efficiency, compared with the case in which electric power regenerated by the first rotating machine 10 is caused to be supplied to the second rotating machine 20 through the 2ND-PDU 32.

On the other hand, in a case where the vehicle 2 is traveling with the engine 3 in operation (including when the engine 3 is in a decelerating fuel-cut operation), when the remaining charge SOC of the battery 33 is not higher than the above-described predetermined value SOC_REF, the electric power regenerated by the first rotating machine 10 and/or the second rotating machine 20 is controlled and the charge control for charging the battery 33 is executed. In this way, it is possible to secure sufficient remaining charge SOC of the battery 33. It should be noted that during execution of the vehicle start control and the speed change control, described above, if the remaining charge SOC of the battery 33 is not higher than the predetermined value SOC_REF, the charge control for charging the battery 33 may be executed.

<Satisfaction of Assist Conditions During Operation of Engine>

Moreover, when the above-described predetermined assist conditions are satisfied with the engine 3 in operation, the assist control is executed. More specifically, by supplying electric power from the battery 33 to the first rotating machine 10 and/or the second rotating machine 20, the first rotating machine 10 and/or the second rotating machine 20 are/is controlled such that motive power from the first rotating machine 10 and/or the second rotating machine 20, and motive power from the engine 3 are transmitted to the front wheels 4. With this control, in addition to the engine 3, the first rotating machine 10 and/or the second rotating machine 20 are/is used as motive power source(s), whereby the vehicle 2 can perform assist traveling or assist starting.

<Satisfaction of Rotating Machine-Driven Vehicle-Starting Conditions During Stoppage of Engine>

Moreover, in a case where the engine 3 is at rest and the vehicle 2 is at a stop, when the above-described predetermined rotating machine-driven vehicle-starting conditions are satisfied, the rotating machine-driven start control is executed. More specifically, electric power is supplied from the battery 33 to the second rotating machine 20 through the VCU 34 and the 2ND-PDU 32, with the engine 3 left at rest, and the second rotating machine 20 (brake device) is controlled such that the rotor 22 is held in a rotation-inhibited state, whereby the rotation of the first rotor 14 is braked, and electric power is supplied from the battery 33 to the first rotating machine 10 through the VCU 34 and the 1ST-PDU 31 to control powering of the first rotating machine 10. As a result, the electric power of the first rotating machine 10 is transmitted to the output shaft 13 by magnetism as motive power, whereby the vehicle 2 can be started.

Next, a control method in which during operation of the vehicle 2, the control of the second rotating machine 20 by the MOT-ECU 30 is stopped, and only the first rotating machine 10 is controlled by the MOT-ECU 30 will be described.

<During Stoppage of Vehicle with Engine in Operation>

First, if the vehicle 2 is at a stop with the engine 3 is in operation, when the above-described predetermined vehicle-starting conditions are satisfied, vehicle start control is executed. In the vehicle start control, when the predetermined vehicle-starting conditions are satisfied, first, the first rotating machine 10 regenerates electric power from motive power from the engine 3. Then, after the start of the electric power regeneration, the first rotating machine 10 is controlled such that the regenerated electric power is reduced. In this way, it is possible to start the vehicle 2 by the motive power from the engine 3 while avoiding engine stalling.

<During Travel of Vehicle with Engine in Operation>

Moreover, when the vehicle 2 is traveling with the engine 3 in operation, distribution control of engine power is executed. In the distribution control, depending on operating conditions of the engine 3 (for example, the engine speed NE and the accelerator pedal opening AP) and/or traveling conditions of the vehicle 2 (for example, the vehicle speed VP), the first rotating machine 10 is controlled such that the ratio between part of motive power output from the engine 3, which is transmitted through the second rotor 15 to the front wheels 4, and part of the same, from which electric power is regenerated by the first rotating machine 10, is changed. In this way, it is possible to cause the vehicle 2 to travel while appropriately controlling the regenerated electric power, depending on the operating conditions of the engine 3 and/or the traveling conditions of the vehicle 2.

Moreover, during the distribution control, when the above-described predetermined power-transmitting conditions are satisfied, the first rotating machine 10 is controlled such that the rotational speed of the rotating magnetic field of the stator 16 becomes equal to 0, whereby insofar as the motive power from the engine 3 is within a range capable of being transmitted by magnetism, it is possible to transmit all the motive power to the front wheels 4 by magnetism through the first rotor 14 and the second rotor 15.

On the other hand, in a case where the vehicle 2 is traveling with the engine 3 in operation (including when the engine 3 is in a decelerating fuel-cut operation), and electric power is regenerated from motive power from the engine 3, when the remaining charge SOC of the battery 33 is not higher than the above-described predetermined value SOC_REF, the regenerated electric power is supplied to the battery 33 to thereby execute charge control for charging the battery 33. It should also be noted that when electric power regeneration is executed during the above-described vehicle start control, if the remaining charge SOC of the battery 33 is not higher than the predetermined value SOC_REF, the charge control for charging the battery 33 is executed. In this way, it is possible to secure sufficient remaining charge SOC of the battery 33.

<Satisfaction of Assist Conditions During Travel of Vehicle with Engine in Operation>

Moreover, in a case where the above-described predetermined assist conditions are satisfied during traveling of the vehicle 2 with the engine 3 in operation, assist control is executed. More specifically, electric power is supplied from the battery 33 to the first rotating machine 10, and the first rotating machine 10 is controlled such that motive power from the engine 3 and motive power from the first rotating machine 10 drive the front wheels 4. With this control, in addition to the engine 3, the first rotating machine 10 is used as a motive power source, whereby the vehicle 2 can perform assist traveling. By thus controlling the first rotating machine 10 alone, it is possible to operate the vehicle 2.

As described above, according to the power unit 1C of the present embodiment, the engine 3, the vehicle 2 can be driven by using the first rotating machine 10, and the second rotating machine 20, as motive power sources. Moreover, the first rotating machine 10 is only required to be configured such that it includes only one soft magnetic material element row, and hence it is possible to reduce the size and manufacturing costs of the first rotating machine 10 to a corresponding extent. As a result, it is possible to reduce the size and manufacturing costs of the power unit 1C itself, and improve the degree of freedom in design. Moreover, as described above, by configuration of the pole pair number ratio α, that is, pole number ratio m of the first rotating machine 10, it is possible to freely set the relationship between the three electric angular velocities and the relationship between the three torques in the first rotating machine 10, whereby it is possible to further improve the degree of freedom in design.

Next, changes in torques when the pole pair number ratio α (=pole number ratio m) is changed in the power unit 1C according to the twenty-sixth embodiment will be described. More specifically, a case where when the vehicle 2 is traveling with the engine 3 in operation, electric power is regenerated from part of the motive power from the engine 3 by the second rotating machine 20, and the regenerated electric power is supplied to the first rotating machine 10, whereby powering control of the first rotating machine 10 is executed will be described by way of example.

First, in the power unit 1C, it is assumed that the pole pair number ratio α of the first rotating machine 10 is set to a desired value other than a value of 1, and the drive wheels are directly connected to the output shaft 13. In this case, assuming that an electric angular velocity of the input shaft 12, that is, the first rotor 14 is ωENG, an electric angular velocity of the rotating magnetic field of the stator 16 is ωMG1, and an electric angular velocity of the output shaft 13, that is, the second rotor 15 is ωOUT, the relationship between these electric angular velocities is expressed for example, as shown in FIG. 135, and the following equation (131) holds.

[Mathematical Formula 100]

$$\omega MG1=(1+\alpha)\omega OUT-\alpha\cdot\omega ENG \tag{131}$$

Moreover, assuming that a torque input from the engine 3 to the input shaft 12 is an engine torque TENG, a torque equivalent to the electric power supplied to the first rotating machine 10 and the electrical angular velocity ωMG1 is a first rotating machine torque TMG1, a torque equivalent to the electric power regenerated by the second rotating machine 20 and the electrical angular velocity ωMG2 is a second rotating machine torque TMG2, and a torque as a reaction force received by the drive wheels from a road surface, caused by the torque transmitted to the drive wheels is a driving torque TOUT, the following equations (132) and (133) hold, and the relationship between these torques is expressed for example, as shown in FIG. 135. It should be noted that in the following equations (132) and (133), upward torques as viewed in FIG. 135 are represented by positive values.

[Mathematical Formula 101]

$$TMG=-\frac{1}{1+\alpha}TOUT \tag{132}$$

[Mathematical Formula 102]

$$TMG2=-TENG-\frac{\alpha}{1+\alpha}TOUT \tag{133}$$

Here, the first and second rotating machine torques TMG1 (α1) and TMG2(α1) assumed when the pole pair number ratio α is set to the above-described first predetermined value α1 are expressed by the following equations (134) and (135), respectively.

[Mathematical Formula 103]

$$TMG1(\alpha1)=-\frac{1}{1+\alpha1}TOUT \tag{134}$$

[Mathematical Formula 104]

$$TMG2(\alpha1)=-TENG-\frac{\alpha1}{1+\alpha1}TOUT \tag{135}$$

Moreover, the first and second rotating machine torques TMG1(α2) and TMG2(α2) assumed when the pole pair number ratio α is set to the above-described second predetermined value α2 are expressed by the following equations (136) and (137), respectively.

[Mathematical Formula 105]

$$TMG1(\alpha 2) = -\frac{1}{1+\alpha 2}TOUT \tag{136}$$

[Mathematical Formula 106]

$$TMG2(\alpha 2) = -TENG - \frac{\alpha 2}{1+\alpha 2}TOUT \tag{137}$$

From the above equations (134) and (136), an amount of change ΔTMG1 of the first rotating machine torque TMG1 occurring when the pole pair number ratio α is changed from the first predetermined value α1 to the second predetermined value α2 is expressed by the following equation (138).

[Mathematical Formula 107]

$$\begin{aligned}\Delta TMG1 &= TMG1(\alpha 2) - TMG1(\alpha 1) \\ &= -\frac{\alpha 2 - \alpha 1}{(1+\alpha 1)(1+\alpha 2)}TOUT\end{aligned} \tag{138}$$

Moreover, from the above equations (135) and (137), an amount of change ΔTMG2 of the second rotating machine torque TMG2 occurring when the pole pair number ratio α is changed from the first predetermined value α1 to the second predetermined value α2 is expressed by the following equation (139).

[Mathematical Formula 108]

$$\begin{aligned}\Delta TMG2 &= TMG2(\alpha 2) - TMG2(\alpha 1) \\ &= -\frac{\alpha 2 - \alpha 1}{(1+\alpha 1)(1+\alpha 2)}TOUT\end{aligned} \tag{139}$$

Here, since TOUT<0, TMG1>0, TMG2<0, and α1<α2 hold, as is clear from the above equations (138) and (139), by changing the pole pair number ratio α from the first predetermined value α1 to the second predetermined value α2, the absolute values of the first and second rotating machine torques TMG1 and TMG2 are reduced. That is, it is understood that by setting the pole pair number ratio α to a larger value, it is possible to reduce the size of the first and second rotating machines 10 and 20.

Moreover, assuming that electric power is not input and output between the two rotating machines 10 and 20, and the battery 33, the electric power regenerated by the second rotating machine 20 is supplied to the first rotating machine 10, as it is, so that the following equation (140) holds.

[Mathematical Formula 109]

$$TMG1 = -\frac{\omega ENG}{\omega MG1}TMG2 \tag{140}$$

Moreover, if mechanical losses and electrical losses are ignored, the following equation (141) holds.

[Mathematical Formula 110]

$$TENG \cdot \omega ENG = -TOUT \cdot \omega OUT \tag{141}$$

Here, assuming that the electric power supplied from the second rotating machine 20 to the first rotating machine 10 is a transmitted electric power WMG', and the ratio of the transmitted electric power WMG' to the engine output WENG is an output ratio RW', the output ratio RW' is calculated by the following equation (142).

[Mathematical Formula 111]

$$\begin{aligned}RW' &= \frac{WMG'}{WENG} \\ &= \frac{-TMG2 \cdot \omega ENG}{TENG \cdot \omega ENG} \\ &= -\frac{TMG1 \cdot \omega MG1}{TOUT \cdot \omega OUT}\end{aligned} \tag{142}$$

When the relationship between the above-described equations (131) and (132) is applied to the above equation (142), there is obtained the following equation (143).

[Mathematical Formula 112]

$$RW' = 1 - \frac{\alpha}{1+\alpha} \cdot \frac{\omega ENG}{\omega OUT} \tag{143}$$

Here, when a speed reducing ratio R is defined as expressed by the following equation (144), and the thus defined speed reducing ratio R is applied to the above equation (143), there is obtained the following equation (145).

[Mathematical Formula 113]

$$R = \frac{\omega ENG}{\omega OUT} \tag{144}$$

[Mathematical Formula 114]

$$RW' = 1 - \frac{\alpha}{1+\alpha} \cdot R \tag{145}$$

From the above equation (145), the output ratios RW(α1)' and RW(α2)' obtained when the pole pair number ratio α is set to the first predetermined value α1 and the second predetermined value α2 are calculated by the following equations (146) and (147), respectively.

[Mathematical Formula 115]

$$RW(\alpha 1)' = 1 - \frac{\alpha 1}{1+\alpha 1} \cdot R \tag{146}$$

[Mathematical Formula 116]

$$RW(\alpha 2)' = 1 - \frac{\alpha 2}{1+\alpha 2} \cdot R \tag{147}$$

From the above equations (146) and (147), an amount of change ΔRW' of the output ratio occurring when the pole pair number ratio $\alpha$ is changed from the first predetermined value $\alpha 1$ to the second predetermined value $\alpha 2$ is expressed by the following equation (148).

[Mathematical Formula 117]

$$\Delta RW' = RW(\alpha 2)' - RW(\alpha 1)' = -\frac{\alpha 2 - \alpha 1}{(1+\alpha 1)(1+\alpha 2)} \cdot R \quad (148)$$

In this equation, since $\alpha 1 < \alpha 2$ holds, as is clear from the above equation (148), it is understood that by changing the pole pair number ratio $\alpha$ from the first predetermined value $\alpha 1$ to the second predetermined value $\alpha 2$, it is possible to reduce the output ratio RW', whereby it is possible to reduce the transmitted electric power WMG'. Moreover, in the above-described equation (145), the relationships between the output ratio RW' and the speed reducing ratio R exhibited when the pole pair number ratio $\alpha$ is set to values of 1, 1.5, and 2 are expressed as shown in FIG. 136. As is clear from FIG. 136, it is understood that by setting the pole pair number ratio $\alpha$ to a larger value, it is possible to reduce the transmitted electric power WMG' throughout the whole range of the speed reducing ratio R. In general, from the viewpoint of efficiency, mechanical transmission or magnetic transmission of motive power is more advantageous than that when electric power is converted to motive power by the rotating machine, and hence as described above, it is possible to improve transmission efficiency by reducing the transmitted electric power WMG'. That is, in the case of the power unit 1C, by setting the pole pair number ratio $\alpha$ (=pole number ratio m) to a larger value, it is possible to improve transmission efficiency.

Although the twenty-sixth embodiment is an example in which when starting the vehicle 2 with the engine 3 at rest, the second rotating machine 20 is controlled to a braked state, and the powering control of the first rotating machine 10 is executed, in place of this, as shown in FIG. 137, in the power unit 1C, a clutch 56 may be provided between the engine 3 and the second rotating machine 20. With this arrangement, when starting the vehicle 2 with the engine 3 left at rest, the MOT-ECU 30 holds the clutch 56 in a disconnected state, and in this state, at least one of the two rotating machines 10 and 20 is subjected to powering control. In this way, it is possible to start the vehicle 2 with the engine 3 left at rest, by motive power of at least one of the rotating machines 10 and 20. In this case, the clutch 56 may be any mechanism which executes or interrupts transmission of motive power, for example, an electromagnetic clutch or a hydraulic clutch actuated by a hydraulic actuator, and which can be controlled by the MOT-ECU 30.

On the other hand, in the power unit 1C according to the twenty-sixth embodiment, as shown in FIG. 138, the gear mechanism 6 may be replaced by a transmission 57. The transmission 57 changes the speed reducing ratio between the output shaft 13 and the front wheels 4 in a stepped or stepless manner and the MOT-ECU 30 controls the speed change operation. It should be noted that as the transmission 57, similarly to the transmission 50 described above, there may be employed any of a stepped automatic transmission equipped with a torque converter, a belt-type stepless transmission, a toroidal-type stepless transmission, an automatic MT, and the like on an as-needed basis.

With this arrangement, it is possible, for example, to set the torque to be transmitted to the transmission 57 through each of the first rotating machine 10 and the second rotating machine 20 to a small value, by setting the speed reducing ratio of the transmission 57 for a low-rotational speed and high-load region to a large value, whereby the size of the first rotating machine 10 and the second rotating machine 20 can be reduced. On the other hand, by setting the speed reducing ratio of the transmission 57 for a high-vehicle speed and high-load region to a small value, it is possible to reduce the rotational speed of the first rotating machine 10 and that of the second rotating machine 20. Therefore, in the case of the first rotating machine 10, it is possible to reduce the magnetic field rotational speed thereof, whereby it is possible to reduce the energy loss and improve the transmission efficiency as well as prolong the service life thereof. Moreover, as for the second rotating machine 20, it is possible to improve the operating efficiency and prolong the service life thereof.

Moreover, in the power unit 1C according to the twenty-sixth embodiment, as shown in FIG. 139, a transmission 58 may be provided in an intermediate portion of the input shaft 12 extending between the engine 3 and the rotor 22. The transmission 58 changes the speed increasing ratio between the engine 3 and the rotor 22 in a stepped or stepless manner and the MOT-ECU 30 controls the speed change operation. It should be noted that as the transmission 58, similarly to the transmission 50 described above, there may be employed any of a stepped automatic transmission equipped with a torque converter, a belt-type stepless transmission, a toroidal-type stepless transmission, an automatic MT, and the like on an as-needed basis.

With this arrangement, for example, by setting the speed increasing ratio of the transmission 58 for a low-rotational speed and high-load region and the final speed reducing ratio of a final reducer (that is, differential gear mechanism 7) to large values, it is possible to set the torque to be transmitted to a final reducer side through the first rotating machine 10 and the second rotating machine 20 to a small value, whereby the size of the first rotating machine 10 and the second rotating machine 20 can be reduced. On the other hand, by setting the speed increasing ratio of the transmission 58 for a high-vehicle speed and high-load region to a small value (or 1:1), it is possible to reduce the rotational speed of the first rotating machine 10 and that of the second rotating machine 20. Therefore, as described above, in the case of the first rotating machine 10, it is possible to reduce the magnetic field rotational speed thereof, whereby it is possible to reduce the energy loss and improve the transmission efficiency as well as prolong the service life thereof. Moreover, as for the second rotating machine 20, it is possible to improve the operating efficiency and prolong the service life thereof.

Twenty-Seventh Embodiment

Next, a power unit 1D according to a twenty-seventh embodiment will be described with reference to FIG. 140. The power unit 1D is distinguished from the power unit 1C according to the twenty-sixth embodiment in that the location of the second rotating machine 20 in the power unit 1C according to the above-described twenty-sixth embodiment is changed from the location between the engine 3 and the first rotating machine 10 to the location toward the rear wheels 5, as in the above-described power unit 1A according to the twenty-fourth embodiment, and the second rotating machine 20 drives the rear wheels 5. According to the power unit 1D, similarly to the above-described power unit 1A according to the twenty-fourth embodiment, at the start of the vehicle 2, the vehicle 2 can be started in an all-wheel drive state, whereby it is possible to improve startability on low $\mu$ roads including a snowy road. Moreover, since the vehicle 2 can run in an all-wheel drive state even during traveling, it is possible to improve traveling stability of the vehicle 2 on low μ roads.

While the present invention has been described in detail and with reference to specific embodiments, it is obvious to those skilled in the art that various changes and modifications can be made without departing from the spirit and scope of the present invention.

The present application is based on Japanese Patent Application No. 2009-236716, filed on Oct. 13, 2009, the entire contents of which are incorporated herein by reference.

REFERENCE SIGNS LIST

1: power unit
1A: power unit
1B: power unit
1C: power unit
1D: power unit
1E: power unit
1F: power unit
1G: power unit
1H: power unit
1I: power unit
1J: power unit
1K: power unit
1L: power unit
1M: power unit
1N: power unit
1O: power unit
1P: power unit
1Q: power unit
1R: power unit
1S: power unit
1T: power unit
1U: power unit
DW: drive wheels (driven parts)
2: ECU (first controller, second controller)
3*a*: crankshaft (output portion, first output portion)
3: engine (heat engine)
21: first rotating machine
23: stator (first stator)
23*a*: iron core (first stator, stator)
23*c*: U-phase coil (first stator, stator)
23*d*: V-phase coil (first stator, stator)
23*e*: W-phase coil (first stator, stator)
24: A1 rotor (first rotor)
24*a*: permanent magnet (first magnetic pole, magnetic pole)
25: A2 rotor (second rotor)
25*a*: core (first soft magnetic material element, soft magnetic material element)
31: second rotating machine (first rotating machine)
33: stator (second stator)
33*a*: iron core (second stator, stator)
33*b*: U-phase coil (second stator, stator)
33*b*: V-phase coil (second stator, stator)
33*b*: W-phase coil (second stator, stator)
34: B1 rotor (third rotor, first rotor)
34*a*: permanent magnet (second magnetic pole, magnetic pole)
35: B2 rotor (fourth rotor, second rotor)
35*a*: core (second soft magnetic material element, soft magnetic material element)
41: first PDU (first controller, second controller)
42: second PDU (second controller, first controller)
43: battery (electric power storage device)
61: transmission
71: transmission
81: transmission
91: transmission
101: rotating machine (second rotating machine)
103: rotor (second output portion)
111: transmission
121: transmission
131: transmission
141: transmission
151: transmission
161: transmission
171: transmission
181: transmission
191: transmission
201: transmission
PS1: first planetary gear unit (differential gear)
S1: first sun gear (first element, third element)
R1: first ring gear (third element, first element)
C1: first carrier (second element)
BL: brake mechanism
PS2: second planetary gear unit (planetary gear unit)
S2: second sun gear (sun gear)
R2: second ring gear (ring gear)
P2: second planetary gear (planetary gear)
C2: second carrier (carrier)
CL1: first clutch
CL2: second clutch
1: power unit
1A to 1D: power unit
3: engine (heat engine)
4: front wheel (driven part)
5: rear wheel (second driven part)
10: first rotating machine
12: input shaft (rotating shaft)
13: output shaft (rotating shaft)
14: first rotor
14*a*: permanent magnet (magnetic pole)
15: second rotor
15*a*: soft magnetic material core (soft magnetic material element)
16: stator
16*a*: iron core (stator, stator row)
16*c*: U-phase coil (stator, stator row)
16*d*: V-phase coil (stator, stator row)
16*e*: W-phase coil (stator, stator row)
20: second rotating machine (braking device)
50 to 54: transmission
55: electromagnetic brake (brake device)
56: clutch
57, 58: transmission

The invention claimed is:

1. A hybrid vehicle driven by a power unit, the power unit comprising:

a first rotating machine comprising:

a first rotor comprising a magnetic pole row arranged in a circumferential direction, wherein the magnetic pole row has a plurality magnetic poles and the adjacent magnetic poles have different polarities;

a first stator disposed to face the first rotor in a radial direction and comprising an armature row comprising a plurality of armatures arranged in the circumferential direction, wherein a rotating magnetic field moving in the circumferential direction is generated by a change in magnetic poles generated by the plurality of armatures; and a second rotor disposed between the first rotor and the first stator and comprising a plurality of soft magnetic material elements arranged in the circumferential direction with a gap therebetween, wherein the ratio between the number of magnetic poles generated by the armature row of the first stator, the number of magnetic poles of the magnetic pole row of the first rotor, the number of the soft magnetic material elements of the second rotor is set to 1:m:(1+m)/2(m≠1), and one of the first rotor and the second rotor is connected to a drive shaft;

a power engine, wherein an output shaft of the power engine is connected to the other of the first rotor and the second rotor;

a second rotating machine configured to exchange a motive power with the drive shaft and to exchange an electric power with the first rotating machine;

a capacitor configured to exchange an electric power between the first rotating machine and the second rotating machine, the vehicle comprising:

a state detector that detects a charge state of the capacitor;

a controller that controls the power unit, wherein the controller controls the output of the power engine, based on a remaining capacity of the capacitor when driving the power engine in order to start the hybrid vehicle.

2. The vehicle of claim 1, wherein the controller controls the power unit such that the remaining capacity of the capacitor falls within a range from a lower limit value to an upper limit value, and wherein when the controller drives the power engine in order to start the hybrid vehicle in a forward direction in a state where the remaining capacity of the capacitor is higher than a first threshold value lower than the upper limit value, the controller controls a magnetic field rotational speed of the rotating magnetic field generated by the first stator of the first rotating machine and restricts a rotational speed of the power engine to a low speed so as to decrease the output of the power engine.

3. The vehicle of claim 1, wherein the controller controls the power unit such that the remaining capacity of the capacitor falls within a range from a lower limit value to an upper limit value, and wherein when the controller drives the power engine in order to start the hybrid vehicle in a rearward direction in a state where the remaining capacity of the capacitor is lower than a second threshold value higher than the lower limit value, the controller controls a magnetic field rotational speed of the rotating magnetic field generated by a stator of the second rotating machine and restricts a rotational speed of the power engine to a low speed so as to decrease the output of the power engine.

4. The vehicle of claim 2 or 3, wherein the controller controls the power engine so as to maintain an output torque of the power engine.

5. The vehicle of claim 2 or 3, wherein when regenerative energy per unit time, which is generated by the first stator of the first rotating machine, with respect to the torque required for the power engine exceeds a prescribed value, the controller controls the power engine so as to restrict the output torque of the power engine to a low speed.

6. The vehicle of claim 1, wherein the controller controls the power unit such that the remaining capacity of the capacitor falls within a range from a lower limit value to an upper limit value, and if the remaining capacity of the capacitor is not higher than a second threshold value higher than the lower limit value when the hybrid vehicle travels with the motive power from the rotating machine, the controller drives the power engine to decrease the magnetic field rotational speed of the rotating magnetic field generated by a stator of the second rotating machine.

7. The vehicle of claim 1, wherein the second rotating machine comprises:

an electric motor comprising a rotator and an armature; and a rotating mechanism comprising:

a first rotary element;

a second rotary element; and a third rotary element connected to the rotator, wherein the first rotary element, the second rotary element and the third rotary element operate while holding a collinear relationship, wherein the rotating mechanism is configured to distribute energy input to the second rotary element to the first and third rotary elements, and is configured to combine the energy input to the first and third rotary elements and output the combined energy to the second rotary element, and wherein one of a combination of the first rotor and the second rotary element and a combination of the second rotor and the first rotary element is connected to the output shaft of the power engine, and the other combination is connected to the drive shaft.

8. The vehicle of claim 1, wherein the second rotating machine comprises:

a third rotor comprising a magnetic pole row arranged in a circumferential direction, wherein the magnetic pole row has a plurality of magnetic poles and the adjacent magnetic poles have different polarities;

a second stator disposed to face the third rotor in a radial direction and comprising an armature row comprising a plurality of armatures arranged in the circumferential direction, wherein a rotating magnetic field moving in the circumferential direction is generated by a change in magnetic poles generated by the plurality of armatures; and a fourth rotor disposed between the third rotor and the second stator and comprising a plurality of soft magnetic material elements arranged in the circumferential direction with a gap therebetween, wherein the ratio between the number of magnetic poles generated by the armature row of the second stator, the number of magnetic poles of the magnetic pole row of the third rotor, the number of the soft magnetic material elements of the fourth rotor is set to 1:m:(1+m)/2(m≠1), wherein when the drive shaft and the first rotor are connected to each other, and the output shaft of the power engine and the second rotor are connected to each other, the fourth rotor is connected to the drive shaft, and the third rotor is connected to the output shaft of the power engine, and when the drive shaft and the second rotor are connected to each other, and the output shaft of the power engine and the first rotor are connected to each other, the third rotor is connected to the drive shaft, and the fourth rotor is connected to the output shaft of the power engine.

* * * * *